US011586002B2

(12) United States Patent
Weng et al.

(10) Patent No.: US 11,586,002 B2
(45) Date of Patent: Feb. 21, 2023

(54) OPTICAL MEMBER DRIVING MECHANISM

(71) Applicant: TDK TAIWAN CORP., Taoyuan (TW)

(72) Inventors: Chih-Wei Weng, Taoyuan (TW); Chao-Chang Hu, Taoyuan (TW); Yueh-Lin Lee, Taoyuan (TW); Chen-Hsien Fan, Taoyuan (TW); Chien-Yu Kao, Taoyuan (TW); Chia-Ching Hsu, Taoyuan (TW); Sung-Mao Tsai, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 485 days.

(21) Appl. No.: 16/728,994

(22) Filed: Dec. 27, 2019

(65) Prior Publication Data

US 2020/0225442 A1 Jul. 16, 2020

Related U.S. Application Data

(60) Provisional application No. 62/896,943, filed on Sep. 6, 2019, provisional application No. 62/894,295, filed (Continued)

(30) Foreign Application Priority Data

Dec. 20, 2019 (EP) .................................... 19218896

(51) Int. Cl.
*G02B 7/04* (2021.01)
*G02B 7/18* (2021.01)

(Continued)

(52) U.S. Cl.
CPC ................. *G02B 7/04* (2013.01); *G02B 7/09* (2013.01); *G02B 7/182* (2013.01); *G02B 7/1805* (2013.01);

(Continued)

(58) Field of Classification Search
None
See application file for complete search history.

(56) References Cited

U.S. PATENT DOCUMENTS 11,269,194 B2 * 3/2022 Lee ...................... G02B 27/646
2016/0381346 A1 12/2016 Hsu et al.

(Continued)

FOREIGN PATENT DOCUMENTS

CN 206002751 U 3/2017
CN 107533211 A 1/2018

(Continued)

OTHER PUBLICATIONS

Extended Search Report issued in corresponding EP application No. 19 218 896.9 dated May 4, 2020.

(Continued)

*Primary Examiner* — Rodney E Fuller
(74) *Attorney, Agent, or Firm* — Muncy, Geissler, Olds & Lowe, P.C.

(57) ABSTRACT

An optical member driving mechanism is provided. The optical member driving mechanism includes a movable portion and a fixed portion. The movable portion includes a holder for holding an optical member with an optical axis. The movable portion is movable relative to the fixed portion. The fixed portion has a housing and a base. The housing is disposed on the base, and includes a top surface and a side surface. The top surface extends in a direction that is parallel to the optical axis. The side surface extends from an edge of the top surface in a direction that is not parallel to the optical axis. The side surface has a rectangular opening.

18 Claims, 251 Drawing Sheets

1-801

Related U.S. Application Data on Aug. 30, 2019, provisional application No. 62/890,731, filed on Aug. 23, 2019, provisional application No. 62/887,905, filed on Aug. 16, 2019, provisional application No. 62/879,190, filed on Jul. 26, 2019, provisional application No. 62/836,405, filed on Apr. 19, 2019, provisional application No. 62/814,543, filed on Mar. 6, 2019, provisional application No. 62/799,886, filed on Feb. 1, 2019, provisional application No. 62/785,593, filed on Dec. 27, 2018.

(51) Int. Cl.

| | |
|---|---|
| ***G02B 7/182*** | (2021.01) |
| ***G02B 13/00*** | (2006.01) |
| ***G02B 26/08*** | (2006.01) |
| ***G02B 27/00*** | (2006.01) |
| ***H04N 5/225*** | (2006.01) |
| ***G02B 7/09*** | (2021.01) |
| ***G02B 27/64*** | (2006.01) |
| ***G03B 5/02*** | (2021.01) |

(52) U.S. Cl.

CPC ....... *G02B 13/0075* (2013.01); *G02B 26/085* (2013.01); *G02B 26/0816* (2013.01); *G02B 27/0068* (2013.01); *G02B 27/646* (2013.01); *G03B 5/02* (2013.01); *H04N 5/2253* (2013.01); *H04N 5/2254* (2013.01); *H04N 5/2257* (2013.01); *G03B 2205/0015* (2013.01); *G03B 2205/0069* (2013.01)

(56) References Cited

U.S. PATENT DOCUMENTS

| | | | | |
|---|---|---|---|---|
| 2017/0235093 | A1 | 8/2017 | Sekiguchi | |
| 2017/0329111 | A1 | 11/2017 | Hu et al. | |
| 2018/0017844 | A1 | 1/2018 | Yu et al. | |
| 2018/0367714 | A1 | 12/2018 | Im et al. | |
| 2019/0377155 | A1* | 12/2019 | Bachar | H04N 5/2253 |
| 2020/0225442 | A1* | 7/2020 | Weng | G03B 11/045 |
| 2021/0051248 | A1* | 2/2021 | Weng | G02B 7/09 |
| 2021/0072495 | A1* | 3/2021 | Shin | H04N 5/2253 |
| 2022/0197010 | A1* | 6/2022 | Wang | H01L 41/0825 |
| 2022/0206248 | A1* | 6/2022 | Washio | G03B 5/00 |

FOREIGN PATENT DOCUMENTS

| | | | |
|---|---|---|---|
| CN | 207676024 | U | 7/2018 |
| CN | 108459451 | A | 8/2018 |
| CN | 207851396 | U | 9/2018 |
| EP | 3091377 | A1 | 11/2016 |

OTHER PUBLICATIONS

Indian Office Action dated Oct. 4, 2022 for the corresponding Application No. 201924054000; pp. 1-6.

Chinese Office Action dated Aug. 26, 2022 for the corresponding Application No. 201911371920.3; pp. 1-8.

* cited by examiner 6-10

8-B-8-B 10-1601

13-100

14-101

17-401

24-800

OPTICAL MEMBER DRIVING MECHANISM

CROSS REFERENCE TO RELATED APPLICATIONS

This application claims the benefit of U.S. Provisional Application No. 62/785,593, filed on Dec. 27, 2018, Provisional Application No. 62/799,886, filed on Feb. 1, 2019, Provisional Application No. 62/814,543, filed on Mar. 6, 2019, Provisional Application No. 62/836,405, filed on Apr. 19, 2019, Provisional Application No. 62/879,190, filed on Jul. 26, 2019, Provisional Application No. 887,905, filed on Aug. 16, 2019, Provisional Application No. 62/890,731, filed on Aug. 23, 2019, Provisional Application No. 62/894,295, filed on Aug. 30, 2019, Provisional Application No. 62/896,943, filed on Sep. 6, 2019 and claims priority of European Patent Application No. 19218896.9, filed Dec. 20, 2019, the entirety of which are incorporated by reference herein.

BACKGROUND

Technical Field

The disclosure relates to an optical member driving mechanism, and in particular to an optical member driving mechanism including a light-shielding structure and/or a light-shielding member.

Description of the Related Art

With the development of technology, many electronic devices (such as smartphones and digital cameras) nowadays perform the functions of a camera or video recorder. The use of such electronic devices has become increasingly widespread, and these electronic devices have been designed for convenience and miniaturization to provide users with more choices.

Electronic devices with a camera or video function usually have a lens driving module disposed therein to drive a lens to move along an optical axis. Therefore, an autofocus (AF) and/or optical image stabilization (OIS) function is achieved. Light may pass through the lens and form an image on a photosensitive member.

However, during the formation of an optical image, external noise usually enters the photosensitive member due to reflection. As a result, the image quality is usually not good enough to meet the requirement of the image quality for users. Therefore, how to solve the aforementioned problem has become an important topic.

BRIEF SUMMARY

The present disclosure provides an optical member driving mechanism. The optical member driving mechanism includes a movable portion and a fixed portion. The movable portion includes a holder for holding an optical member with an optical axis. The movable portion is movable relative to the fixed portion. The fixed portion has a housing and a base. The housing is disposed on the base, and includes a top surface and a side surface. The top surface extends in a direction that is parallel to the optical axis. The side surface extends from an edge of the top surface in a direction that is not parallel to the optical axis. The side surface has a rectangular opening.

In an embodiment, the base further includes a barrier that protrudes towards the top surface. When viewed in a direction that is parallel to the optical axis, the barrier and the lengthwise side of the opening at least partially overlap, and a gap is formed between the barrier and the widthwise side of the opening. In an embodiment, the barrier has a jagged structure that is disposed to face the top surface.

In an embodiment, the jagged structure has a plurality of peaks, and when viewed in a direction that is perpendicular to the optical axis, the peaks are exposed from the opening. In an embodiment, when viewed in a direction that is parallel to the optical axis, the peaks overlap with the opening.

In an embodiment, a groove is formed between the barrier and the housing, and the groove is disposed to face the top surface. The optical member driving mechanism further includes a light-shielding member that is disposed in the groove, wherein the shortest distance between the light-shielding member and the top surface is shorter than the shortest distance between the barrier and the top surface.

In an embodiment, the barrier further has an upper surface and a cutting surface that intersects with the upper surface, and a fillet between the upper surface and the cutting surface is not greater than 0.05 mm. In an embodiment, the barrier has a rough surface disposed to face the top surface. In an embodiment, the base has a rough surface disposed to face the top surface.

In an embodiment, the optical member driving mechanism further includes a light-shielding member that is disposed out of the housing, wherein when viewed in a direction that is parallel to the optical axis, the light-shielding member overlaps with the lengthwise side of the opening.

In an embodiment, the movable portion further includes a light-shielding sheet disposed between the carrier and the top surface. The light-shielding sheet extends towards the side surface in a direction that is substantially parallel to the optical axis, and when viewed in a direction that is perpendicular to the optical axis, the light-shielding sheet is located on the lengthwise side of the opening.

In an embodiment, the carrier has a protruding portion that extends towards the side surface in a direction that is substantially parallel to the optical axis, and when viewed in a direction that is perpendicular to the optical axis, the protruding portion is located on the lengthwise side of the opening.

In an embodiment, the fixed portion further includes a frame that is disposed between the carrier and the housing, wherein the frame has a light-shielding structure protruding towards the base. In an embodiment, when viewed in a direction that is parallel to the optical axis, the light-shielding structure at least partially overlaps with the lengthwise side of the opening, and a gap is formed between the light-shielding structure and a widthwise side of the opening.

In an embodiment, the light-shielding structure has a jagged structure disposed to face the base. In an embodiment, a groove is formed between the light-shielding structure and the housing, and the groove is disposed to face the top surface. In an embodiment, the optical member driving mechanism further includes a light-shielding member that is disposed in the groove, wherein the shortest distance between the light-shielding member and the base is shorter than the shortest distance between the barrier and the base.

In an embodiment, the light-shielding structure further has a lower surface and a cutting surface that intersects with the lower surface, and a fillet between the lower surface and the cutting surface is not greater than 0.05 mm. In an embodiment, the optical member driving mechanism further includes an electromagnetic driving assembly for driving the movable portion to move relative to the fixed portion, wherein the electromagnetic driving assembly comprises a magnetic member and a coil. Either the magnetic member or the coil is disposed on the movable portion, and the other of the magnetic member or the coil is disposed on the fixed portion.

BRIEF DESCRIPTION OF THE DRAWINGS

The disclosure can be more fully understood by reading the subsequent detailed description and examples with references made to the accompanying drawings, wherein:

FIG. 128 is an enlarged perspective view illustrating the optical member driving mechanism in accordance with another embodiment of the present disclosure.

FIG. 129 is an enlarged perspective view illustrating the optical member driving mechanism in accordance with another embodiment of the present disclosure.

FIG. 130 is an enlarged perspective view illustrating the optical member driving mechanism in accordance with another embodiment of the present disclosure.

FIG. 131 is a schematic view illustrating a matrix structure in accordance with an embodiment of the present disclosure.

FIG. 132 is a perspective view illustrating the matrix structure in accordance with an embodiment of the present disclosure.

FIG. 133 shows a schematic view of an electrical device with an optical system according to an embodiment of the present disclosure.

FIG. 134 shows a perspective view of the optical system according to an embodiment of the present disclosure.

FIG. 135 shows an exploded view of the optical system according to an embodiment of the present disclosure.

FIG. 136 shows a perspective view of a fixed part outer frame, a circuit assembly, and two metal circuit assemblies of the optical system according to an embodiment of the present disclosure, wherein a fixed part outer frame surface of the fixed part outer frame is shown as a dashed line.

FIG. 137 shows a schematic view of the fixed part outer frame and the circuit assembly of the optical system according to another embodiment of the present disclosure.

FIG. 138 shows a schematic view of the optical system according to another embodiment of the present disclosure.

FIG. 139 shows a schematic view of the fixed part outer frame and the circuit assembly of the optical system according to another embodiment of the present disclosure.

Figure 140:
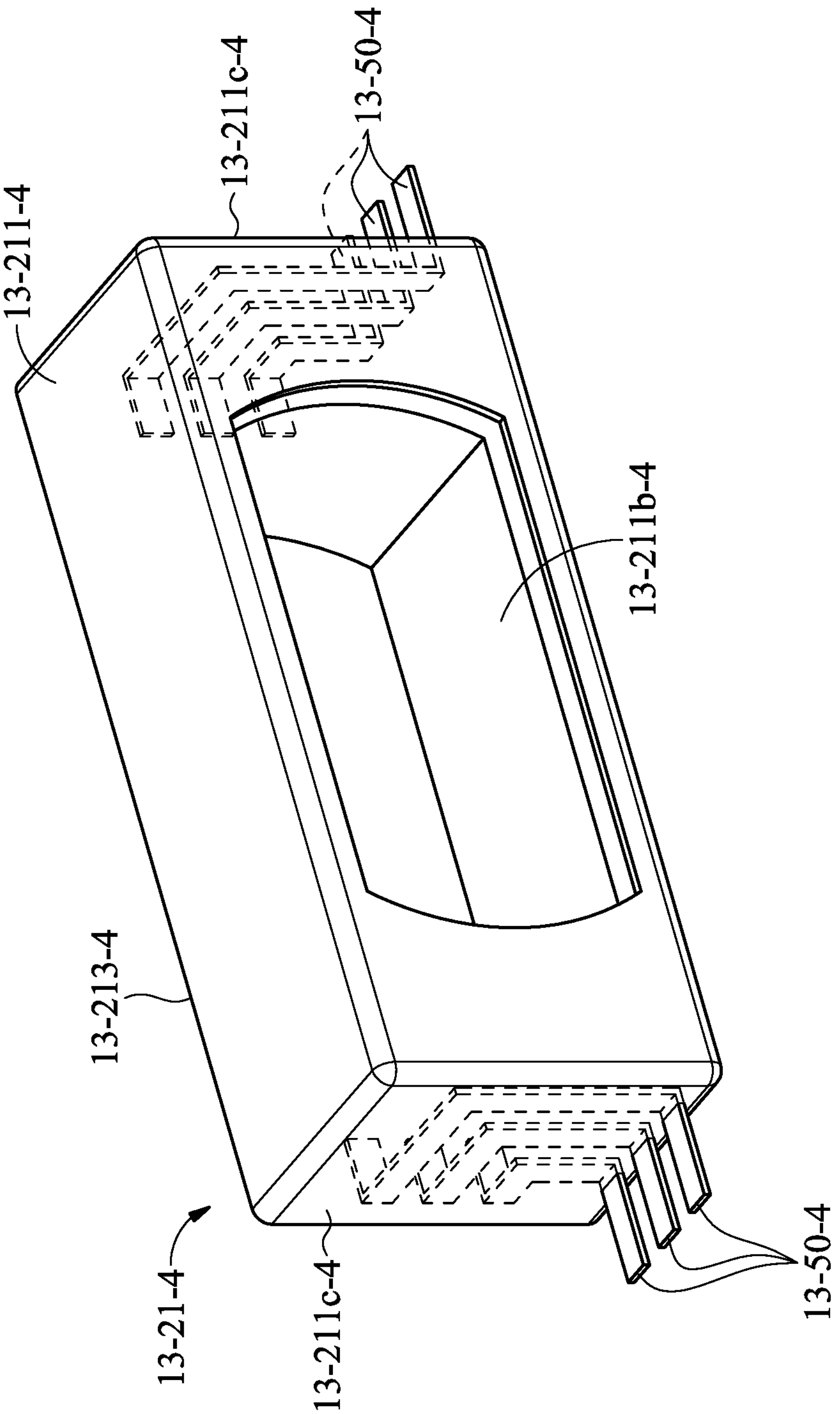

FIG. 140 shows a schematic view of the fixed part outer frame and the metal circuit assemblies of the optical system according to another embodiment of the present disclosure.

Figure 141:
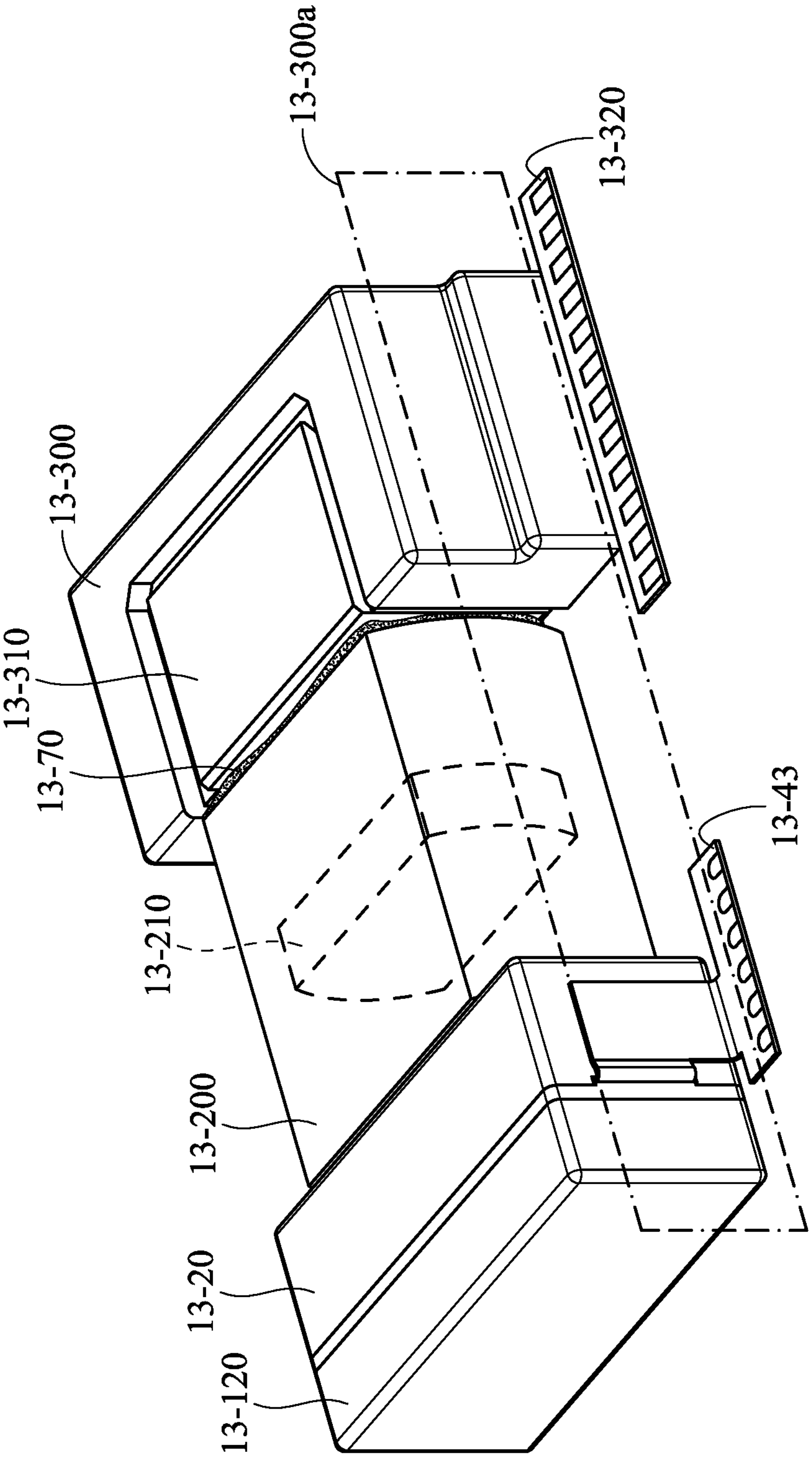

FIG. 141 shows a perspective view of the optical system according to another embodiment of the present disclosure.

Figure 142:
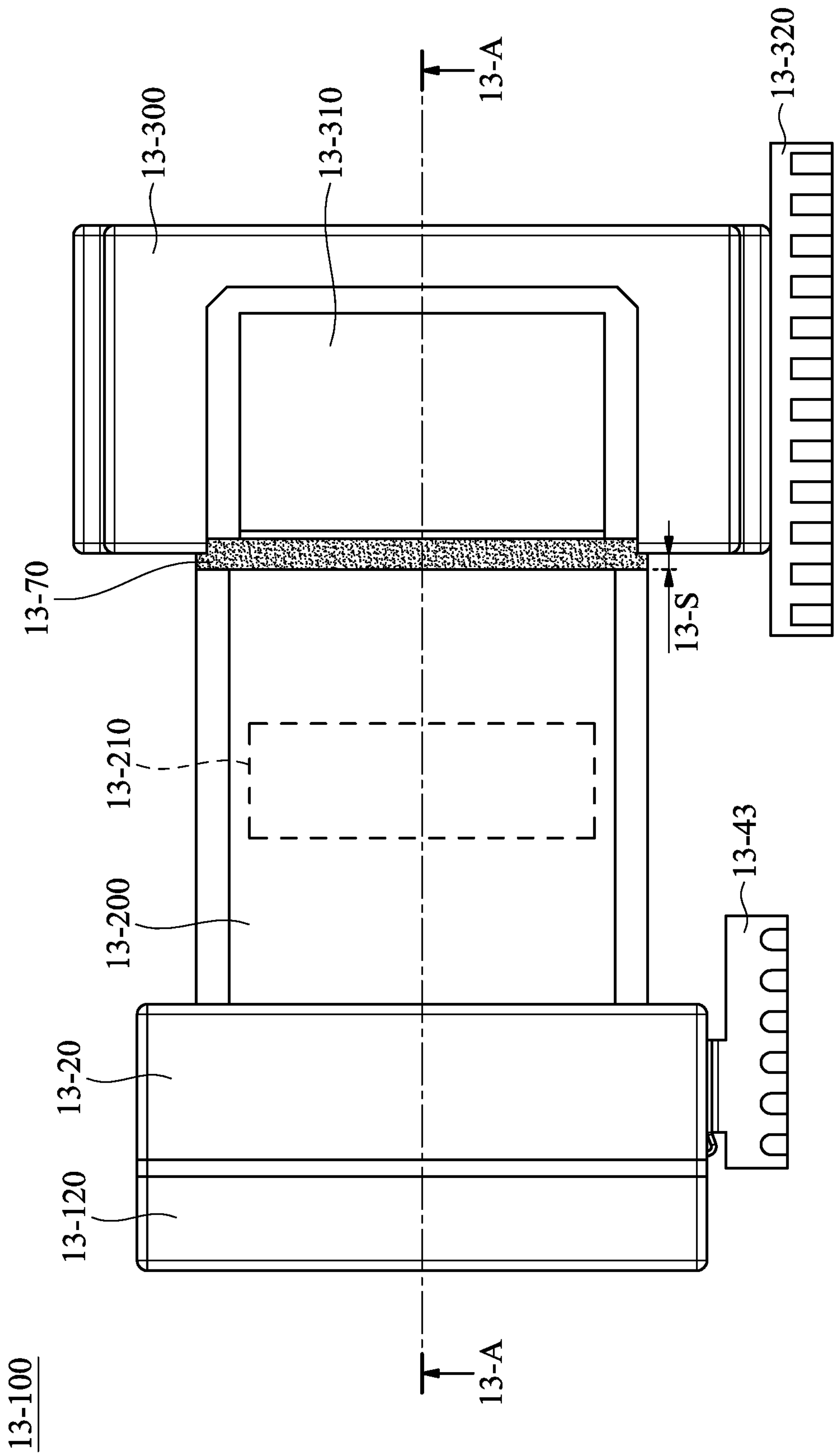

FIG. 142 shows a top view of the optical system according to another embodiment of the present disclosure.

Figure 143:
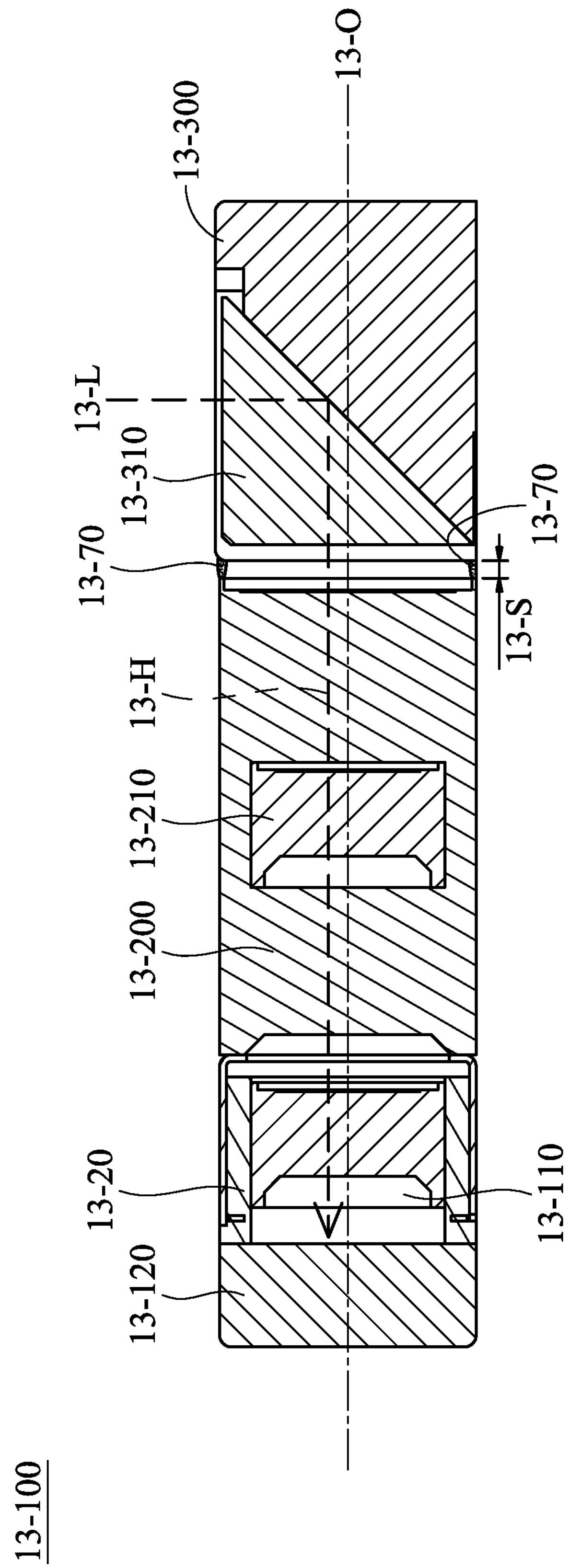

FIG. 143 shows a cross-sectional view of the optical system according to another embodiment of the present disclosure along a line 13-A-13-A in FIG. 142

Figure 144:
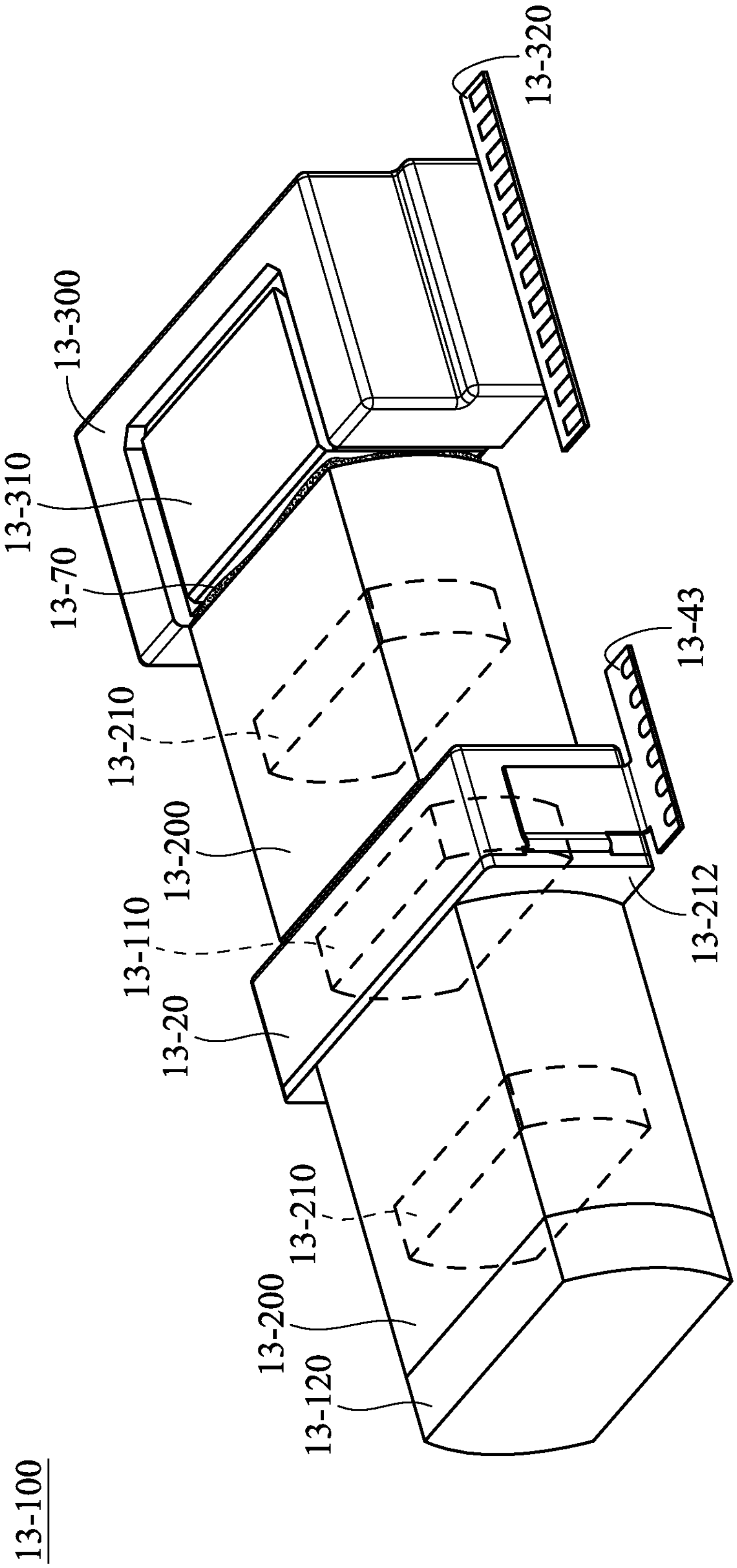

FIG. 144 shows a perspective view of the optical system according to another embodiment of the present disclosure.

Figure 145:
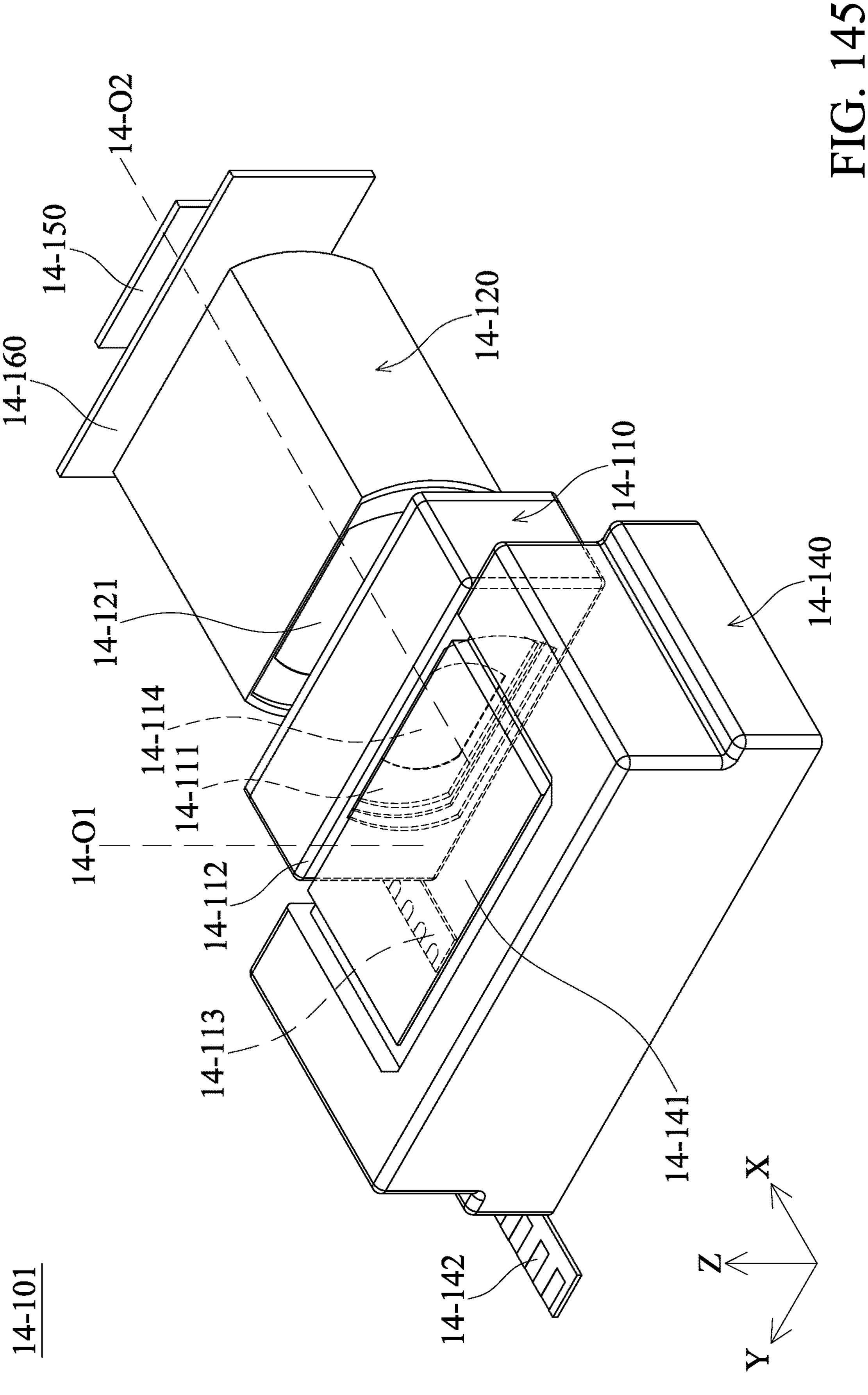

FIG. 145 is a perspective view illustrating an optical system in accordance with an embodiment of the present disclosure.

Figure 146:
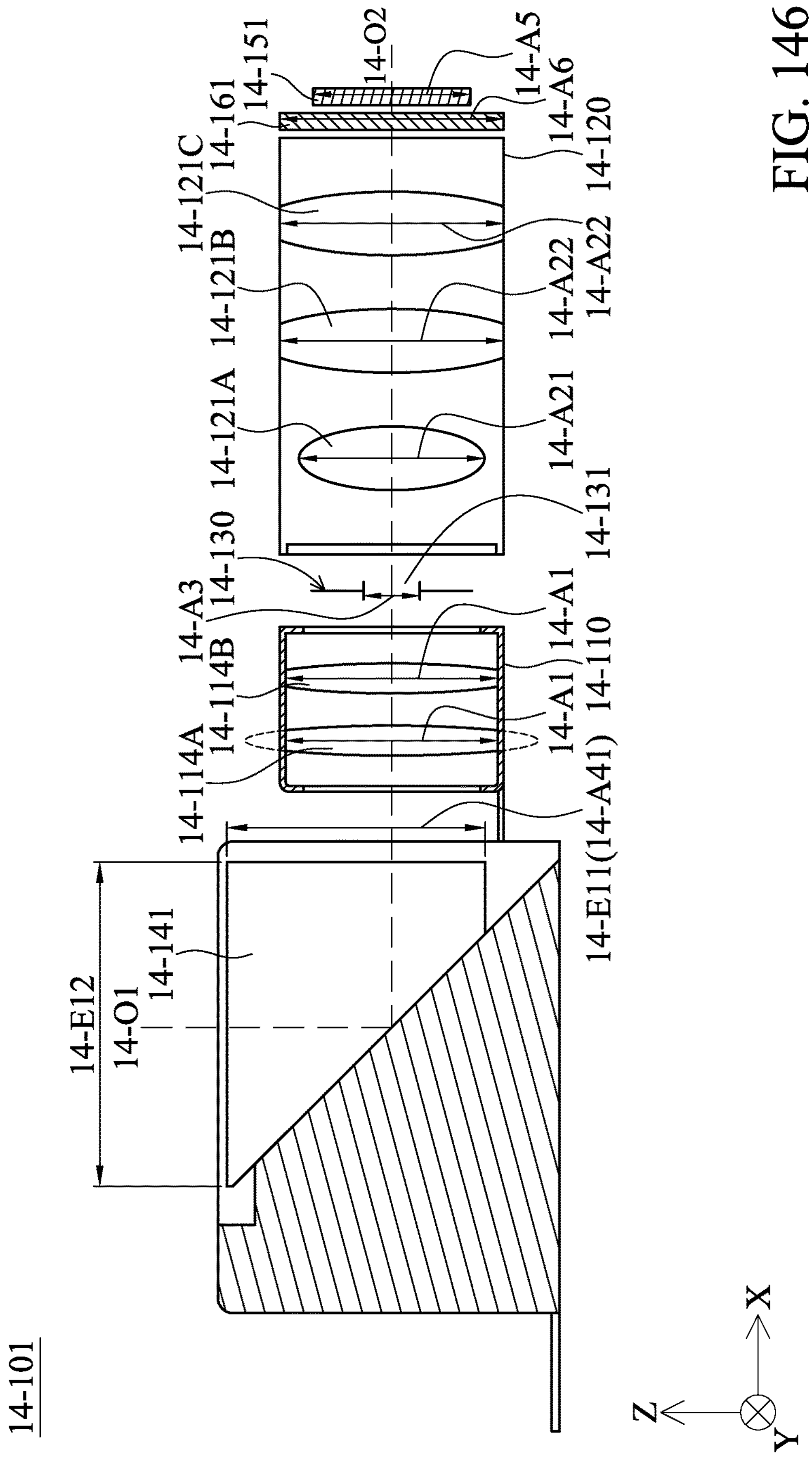

FIG. 146 is a cross-sectional view illustrating the optical system shown in FIG. 145.

Figure 147:
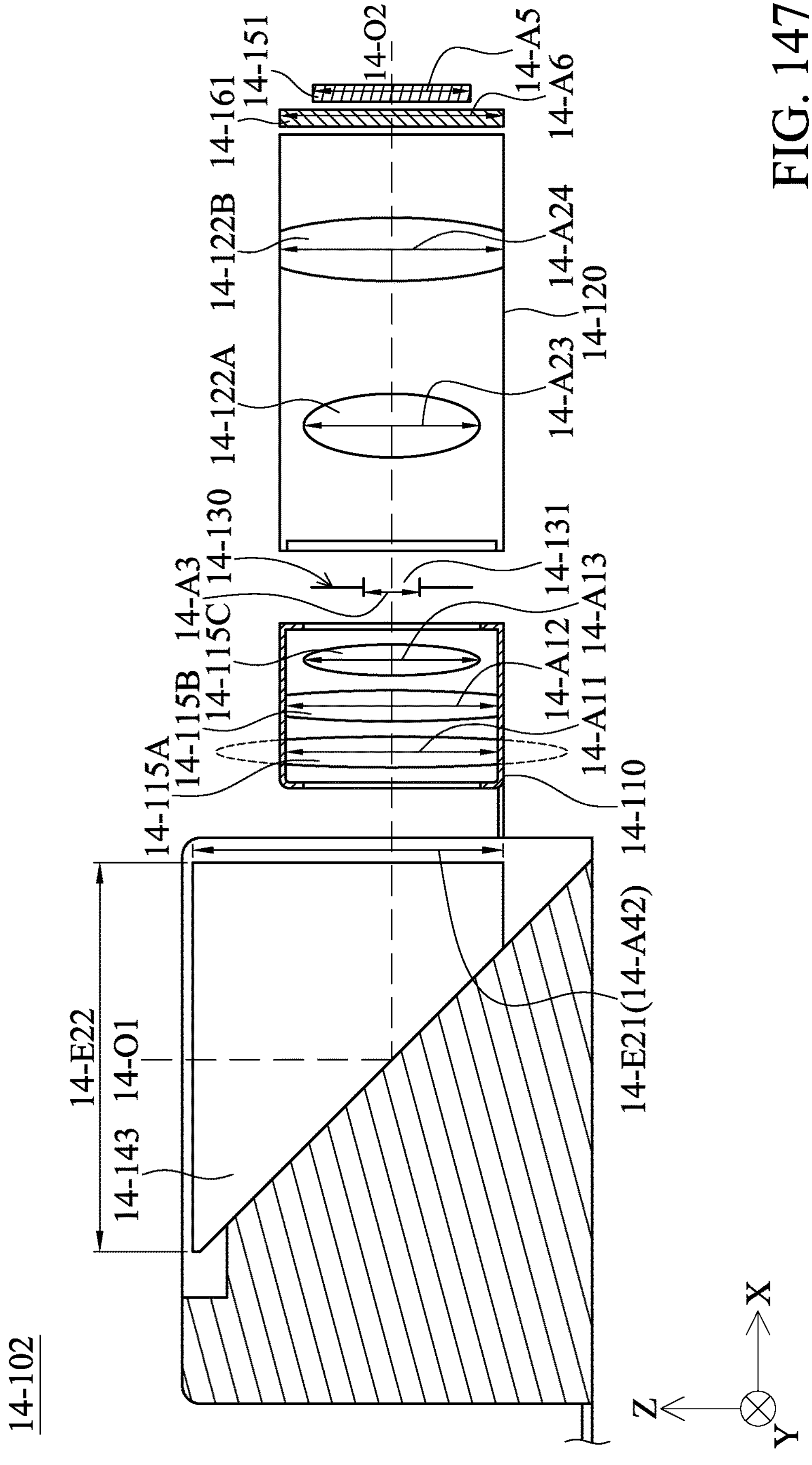

FIG. 147 is a cross-sectional view illustrating the optical system in accordance with another embodiment of the present disclosure.

Figure 148:
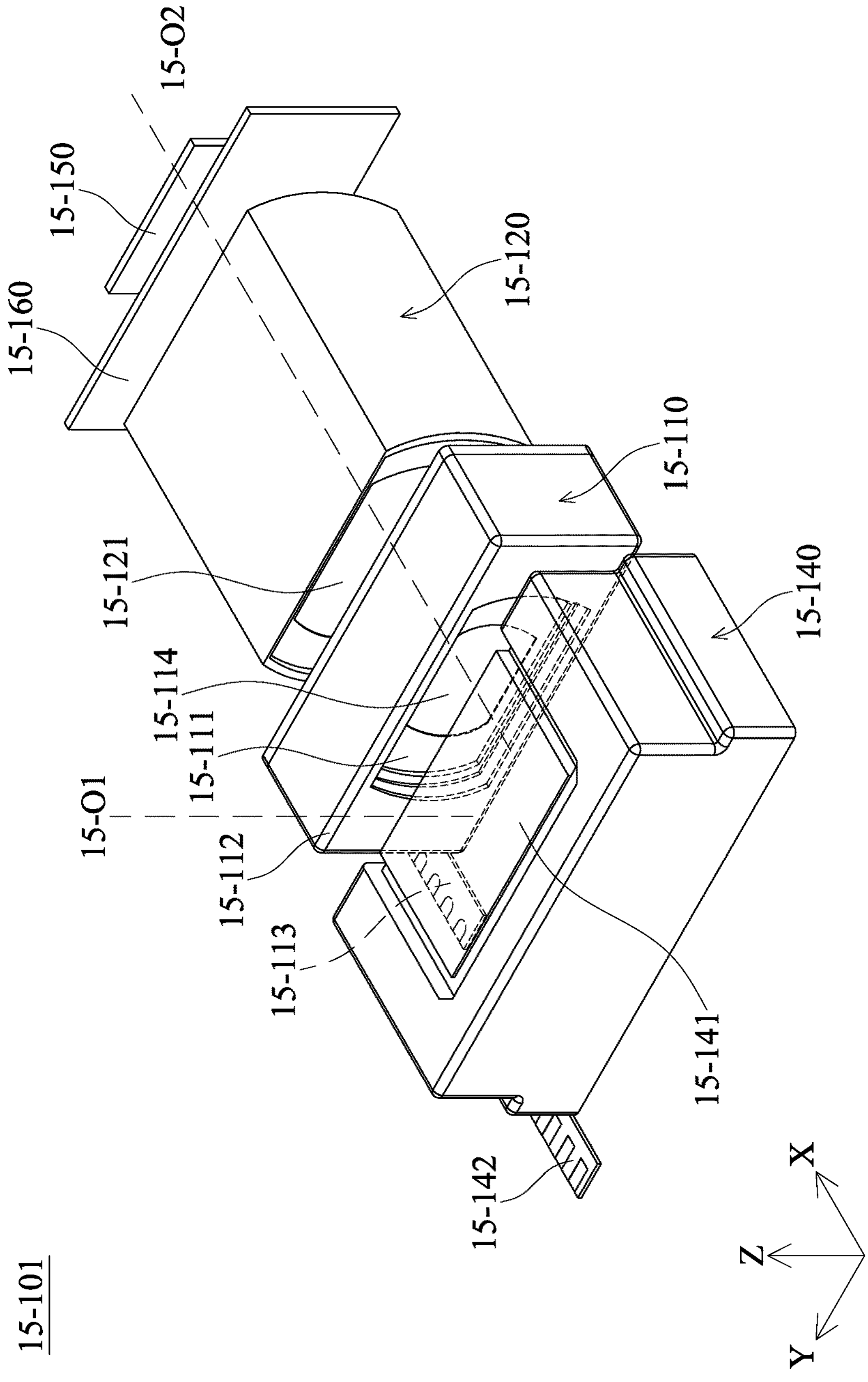

FIG. 148 is a perspective view illustrating an optical system in accordance with an embodiment of the present disclosure.

Figure 149:
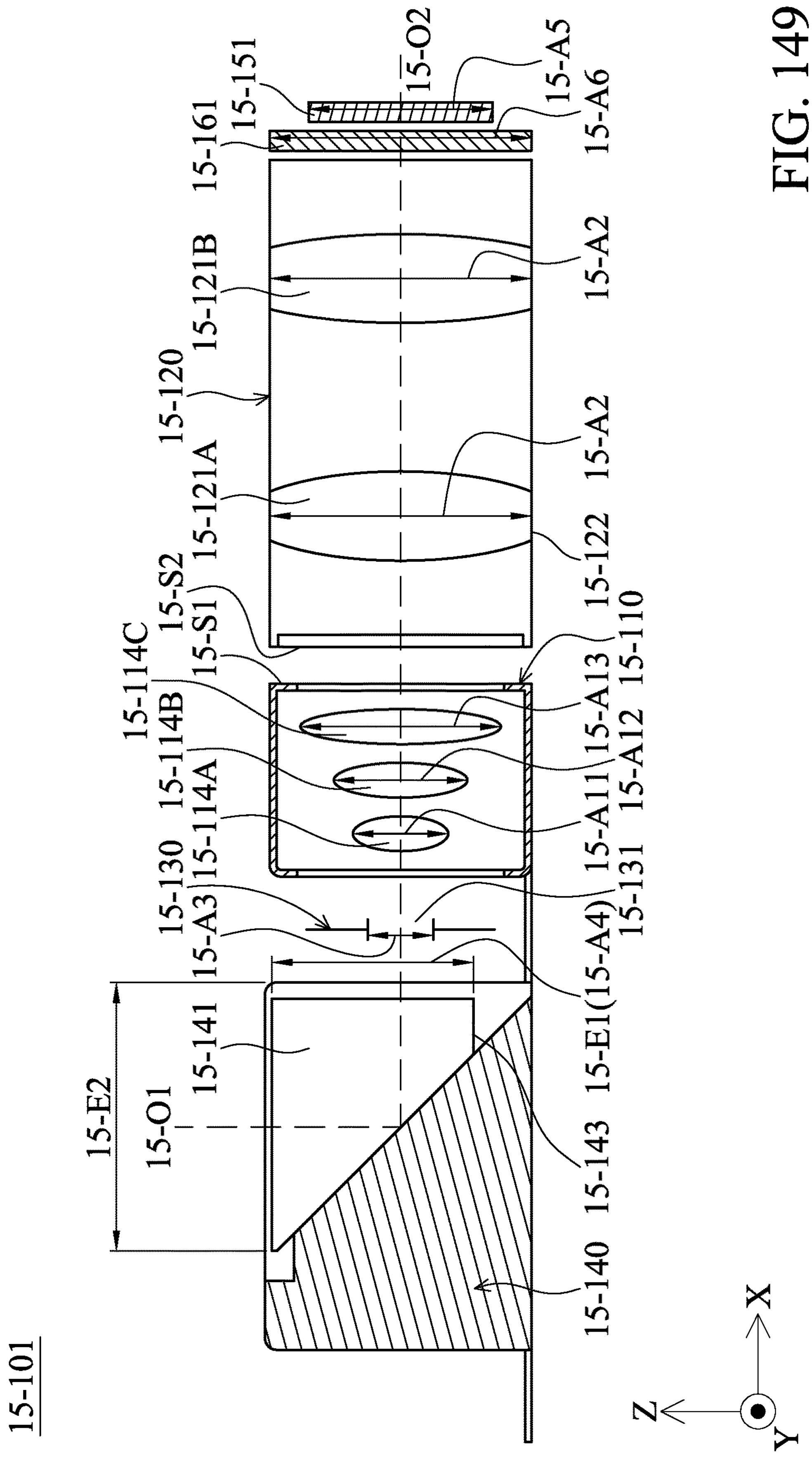

FIG. 149 is a cross-sectional view illustrating the optical system shown in FIG. 148.

Figure 150:
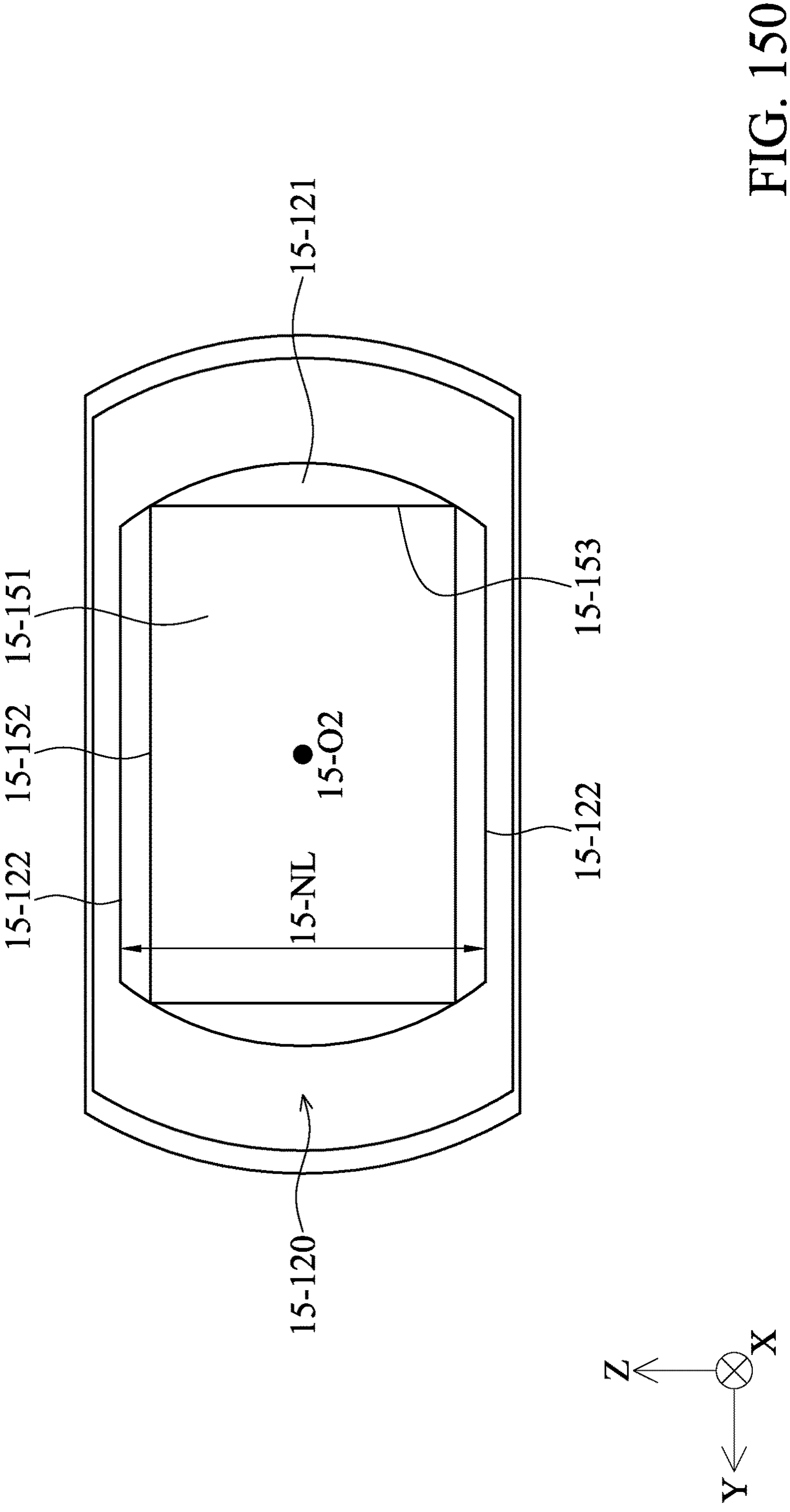

FIG. 150 is a perspective view illustrating a second optical member and a fifth optical member in accordance with an embodiment of the present disclosure.

Figure 151:
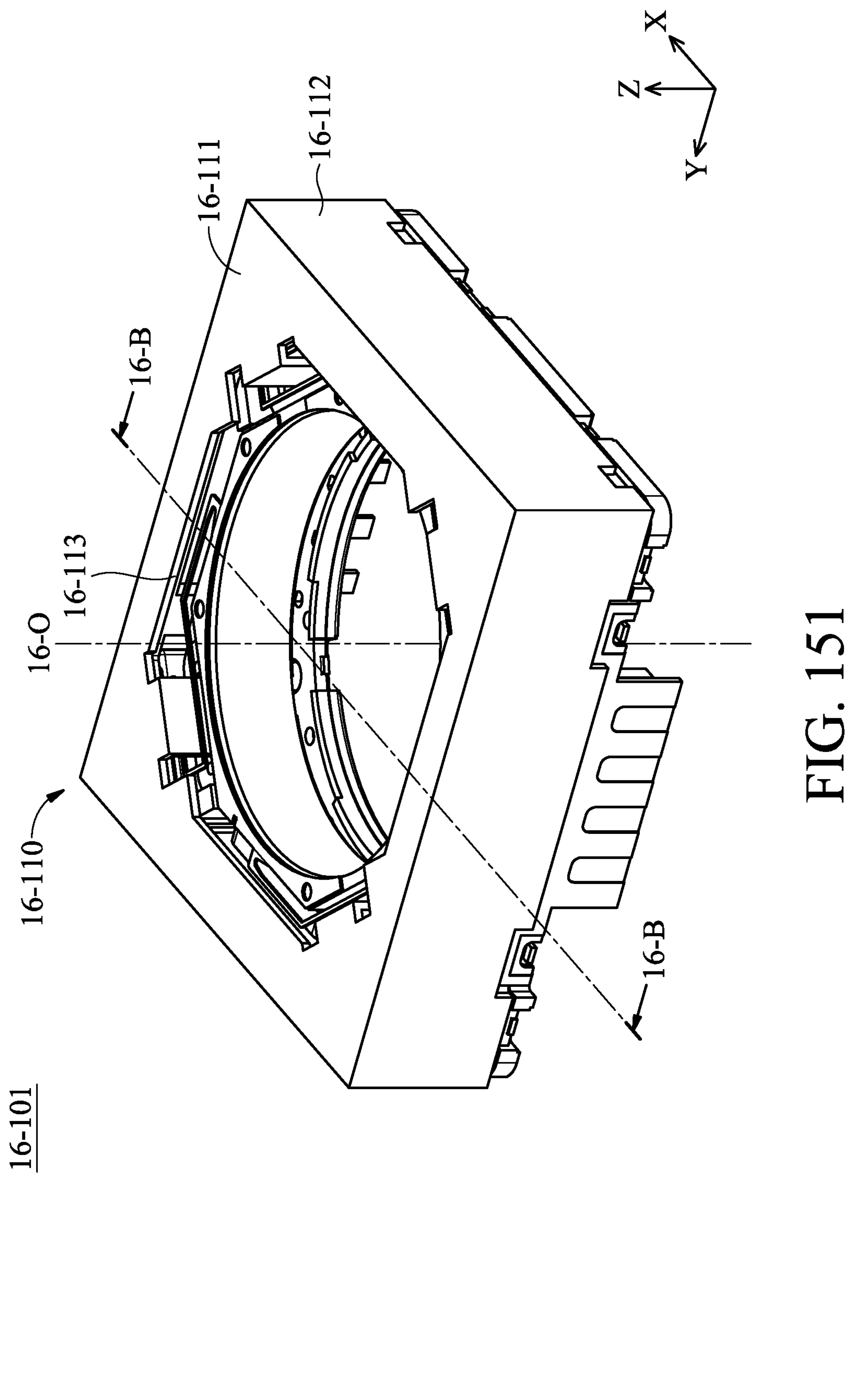

FIG. 151 is a perspective view illustrating an optical member driving mechanism in accordance with an embodiment of the present disclosure.

Figure 152:
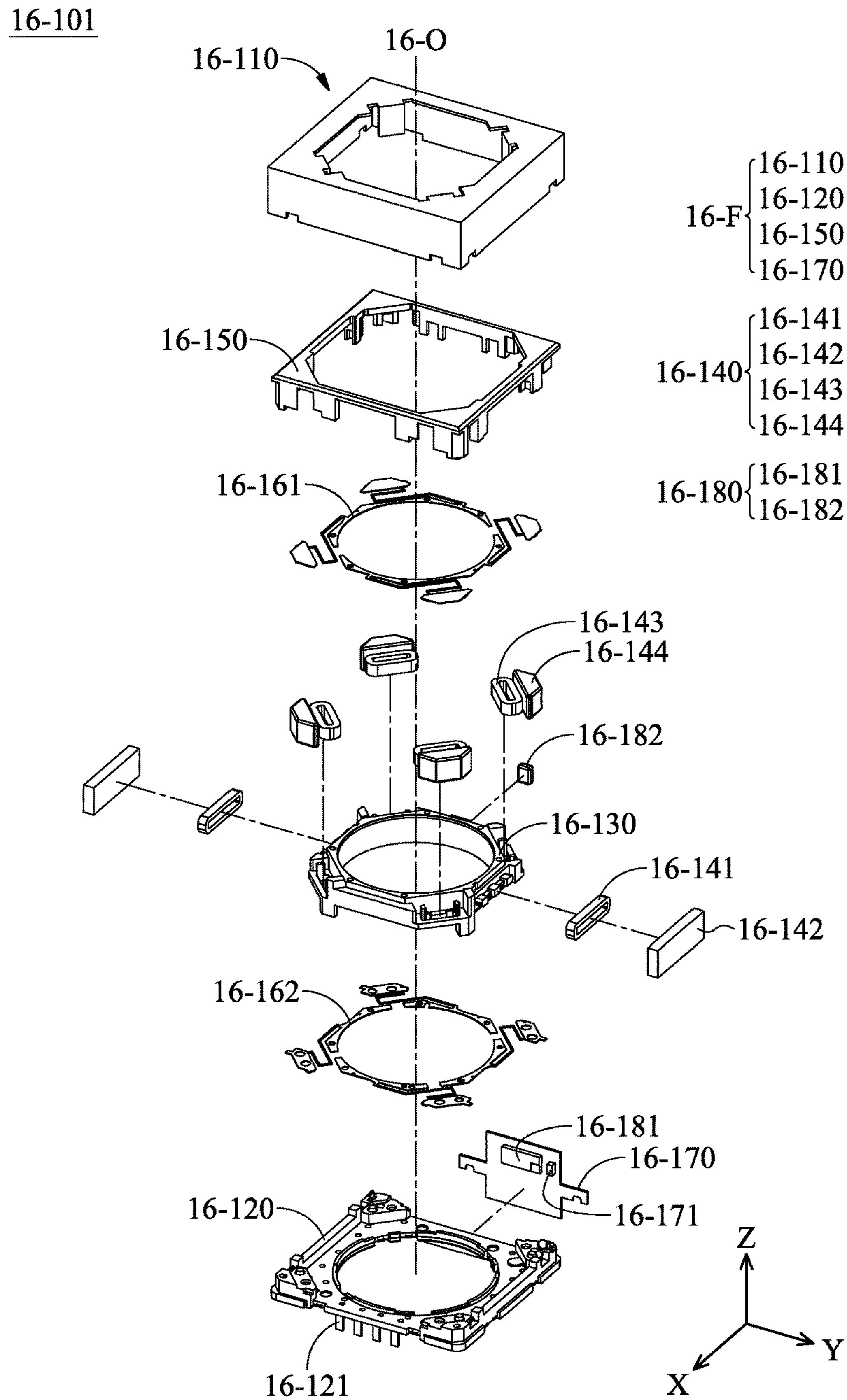

FIG. 152 is an exploded view illustrating the optical member driving mechanism shown in FIG. 151.

Figure 153:
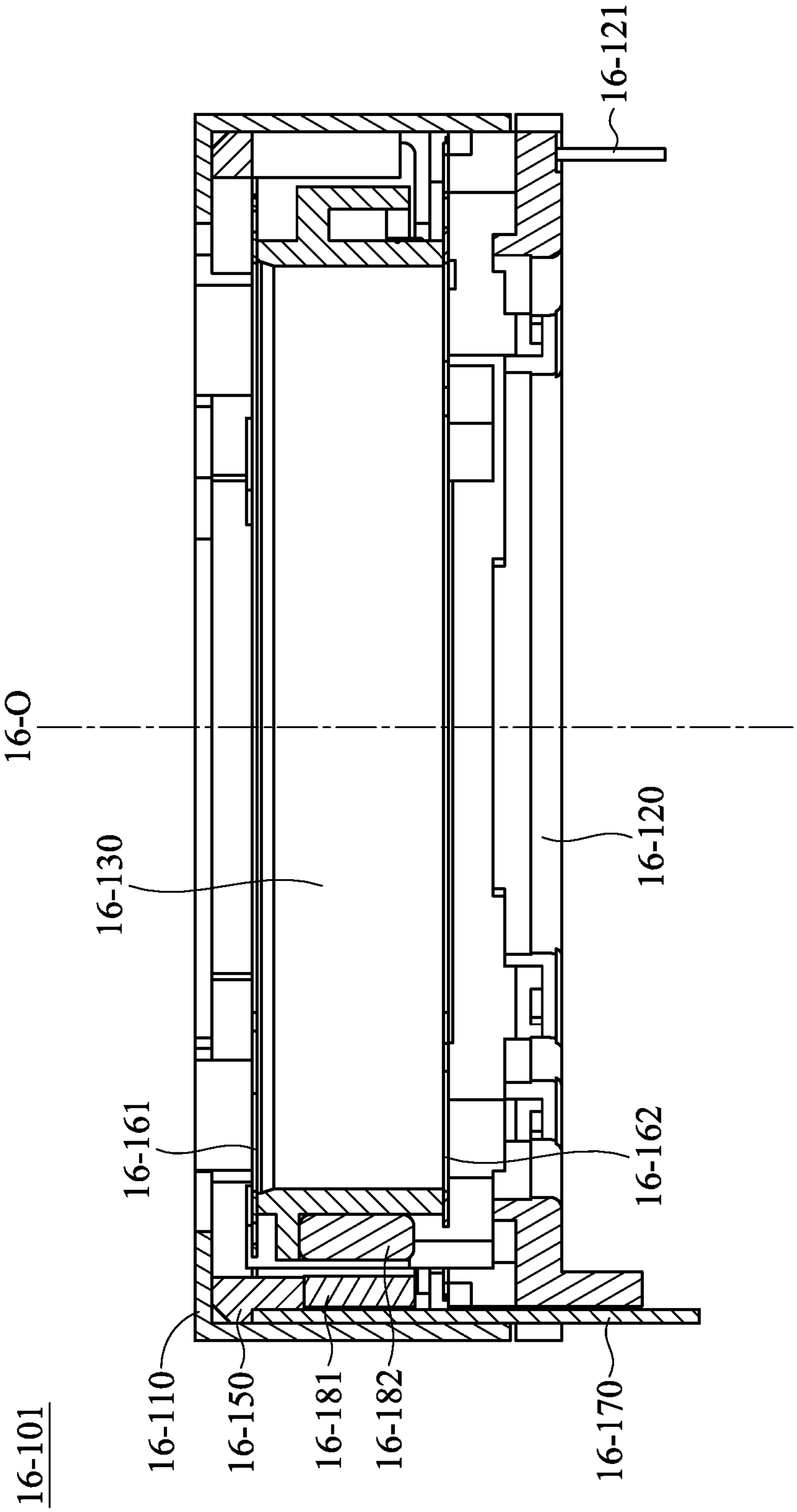

FIG. 153 is a cross-sectional view illustrating along line 16-B shown in FIG. 151.

Figure 156:
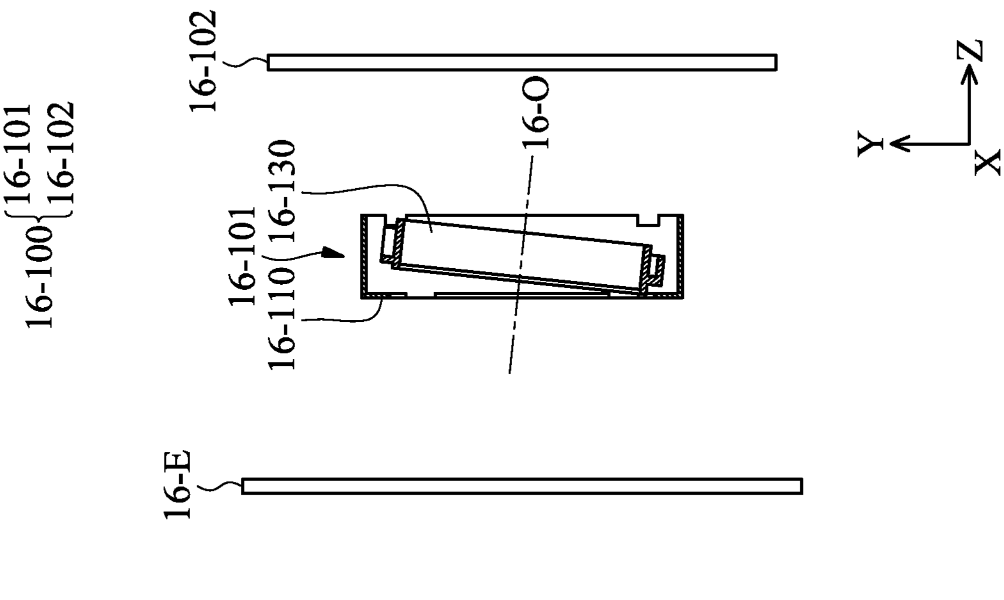
Figure 155:
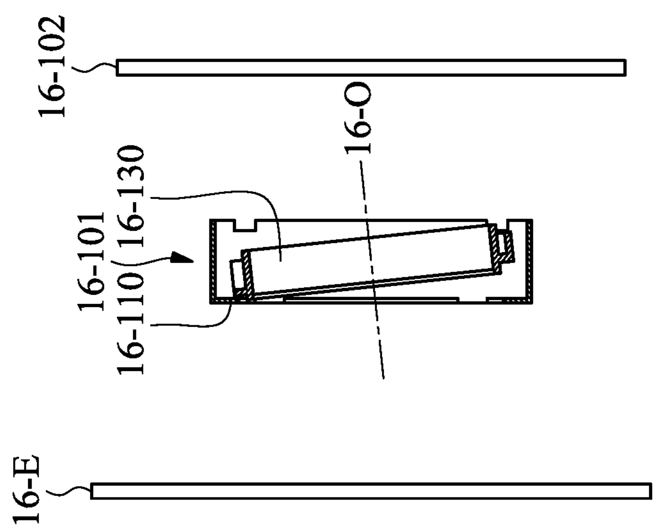
Figure 154:
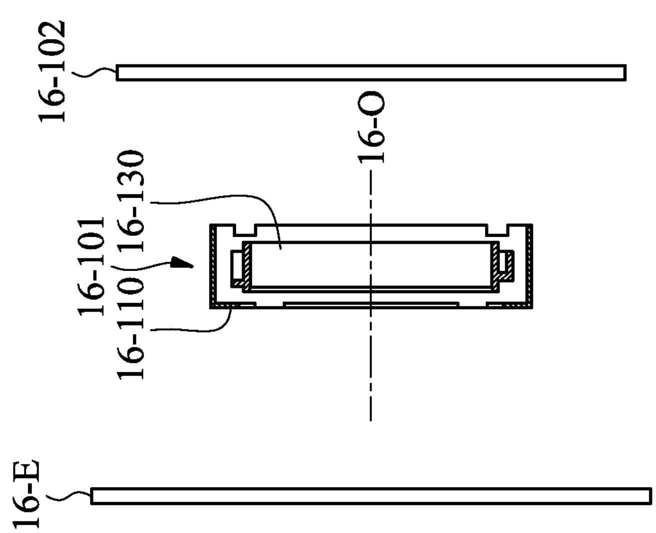

FIGS. 154-156 are schematic views illustrating an optical system in accordance with an embodiment of the present disclosure.

Figure 157:
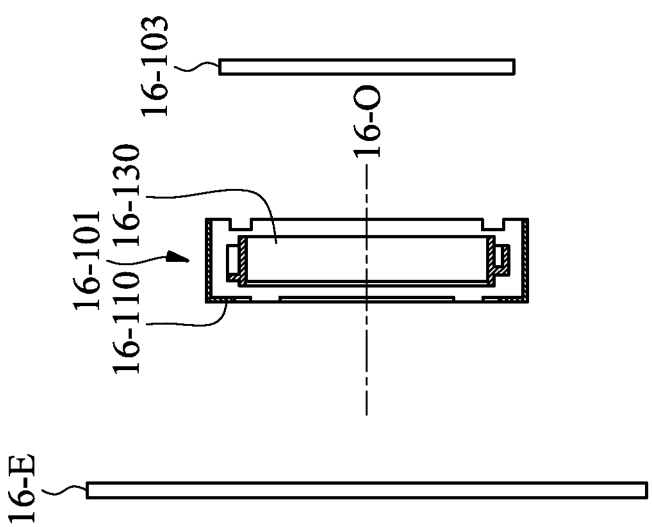
Figure 158:
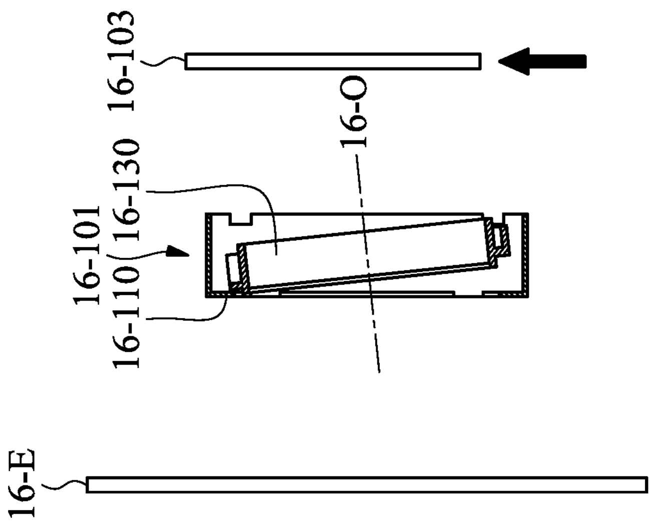
Figure 159:
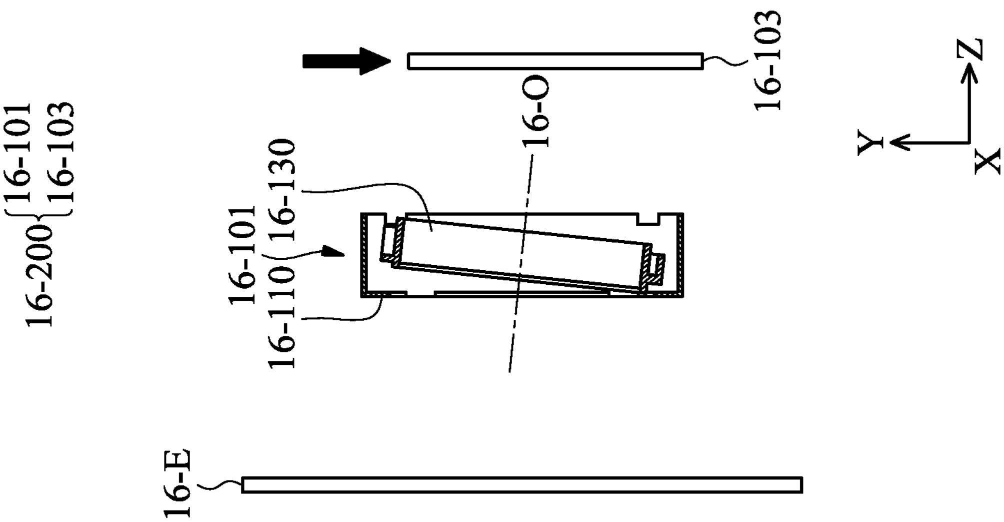

FIGS. 157-159 are schematic views illustrating the optical system in accordance with an embodiment of the present disclosure.

Figure 160:
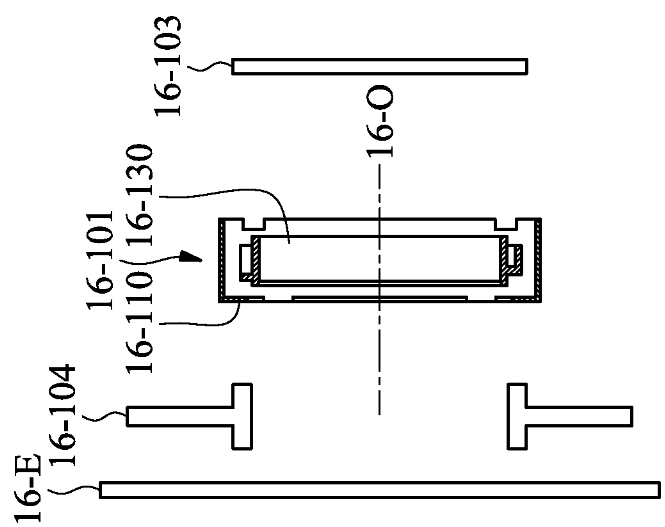
Figure 161:
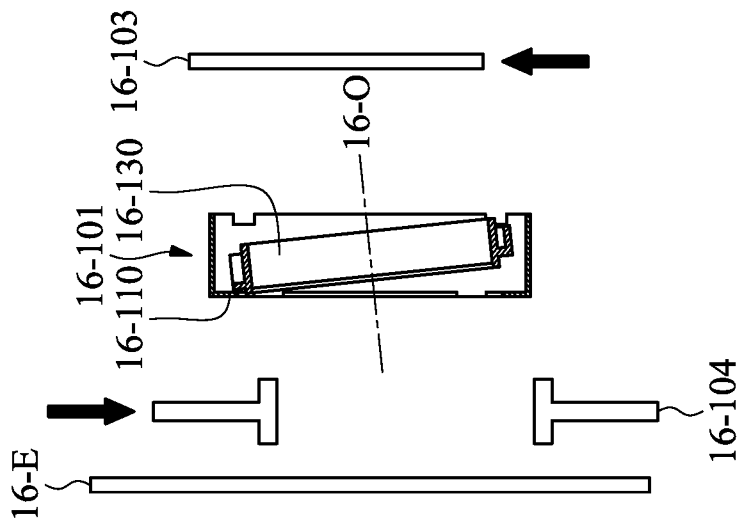
Figure 162:
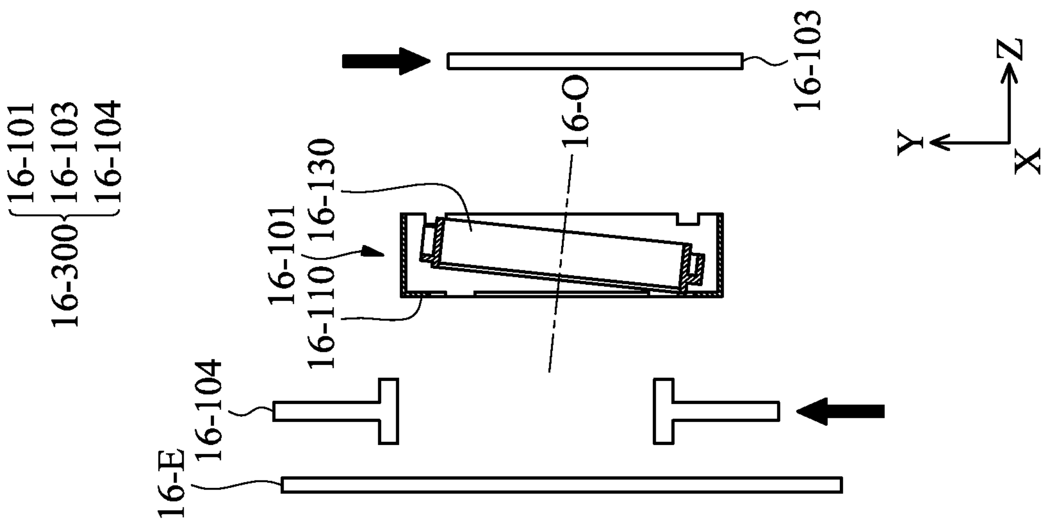

FIGS. 160-162 are schematic views illustrating the optical system in accordance with an embodiment of the present disclosure.

Figure 163:
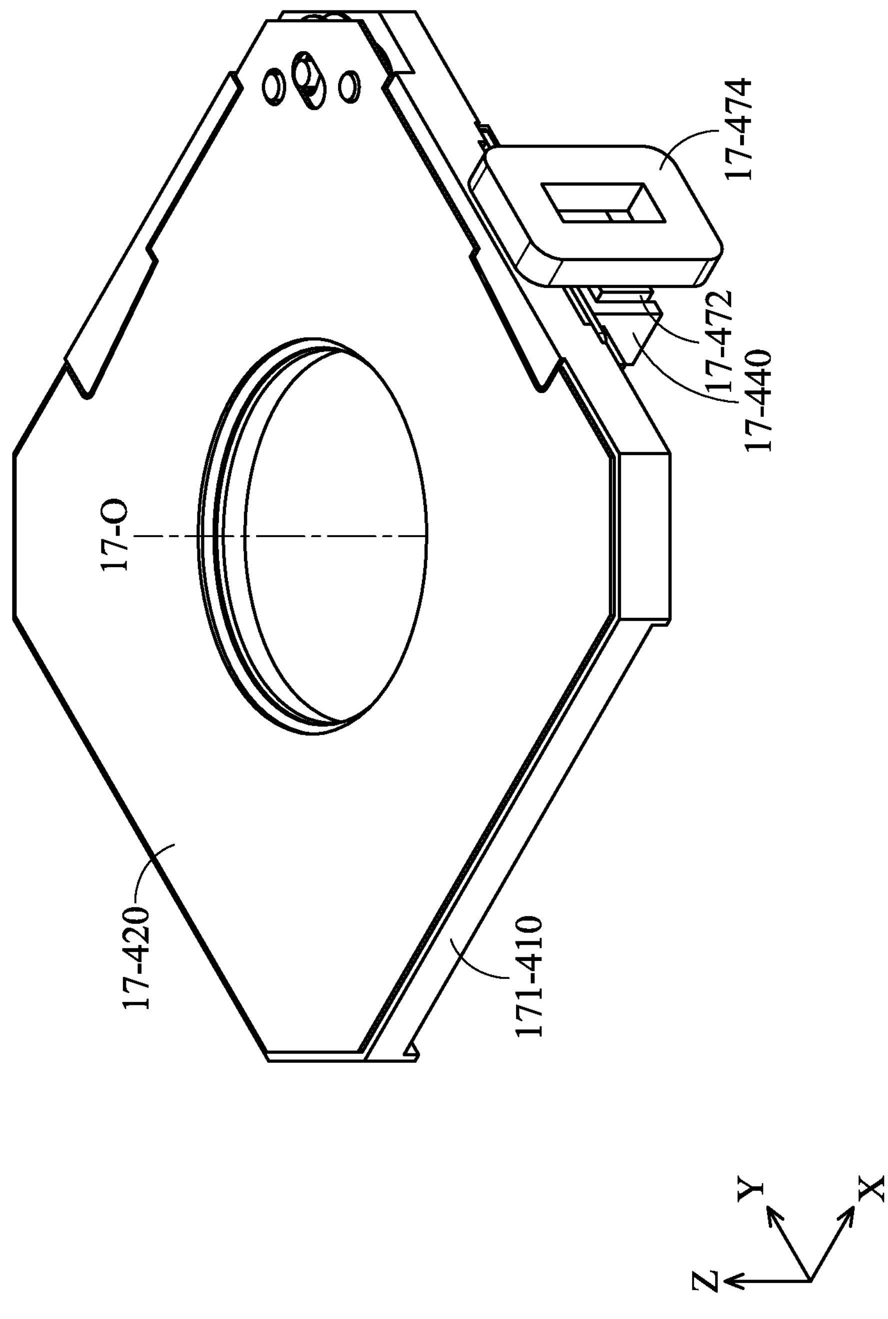

FIG. 163 is a perspective view of a light flux adjustment module in some embodiments of the present disclosure.

Figure 164:
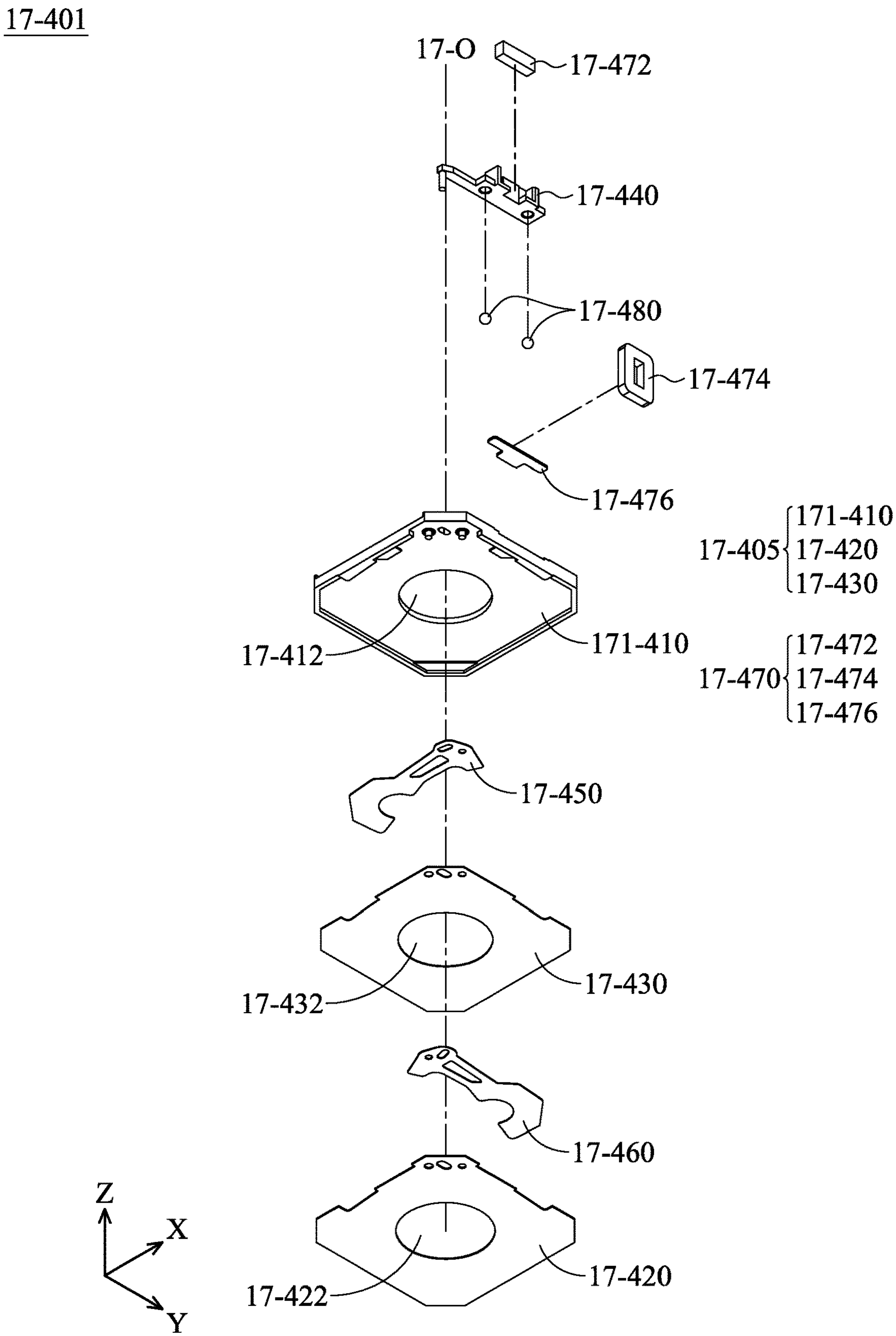

FIG. 164 is an exploded view of a light flux adjustment module in some embodiments of the present disclosure.

Figure 165:
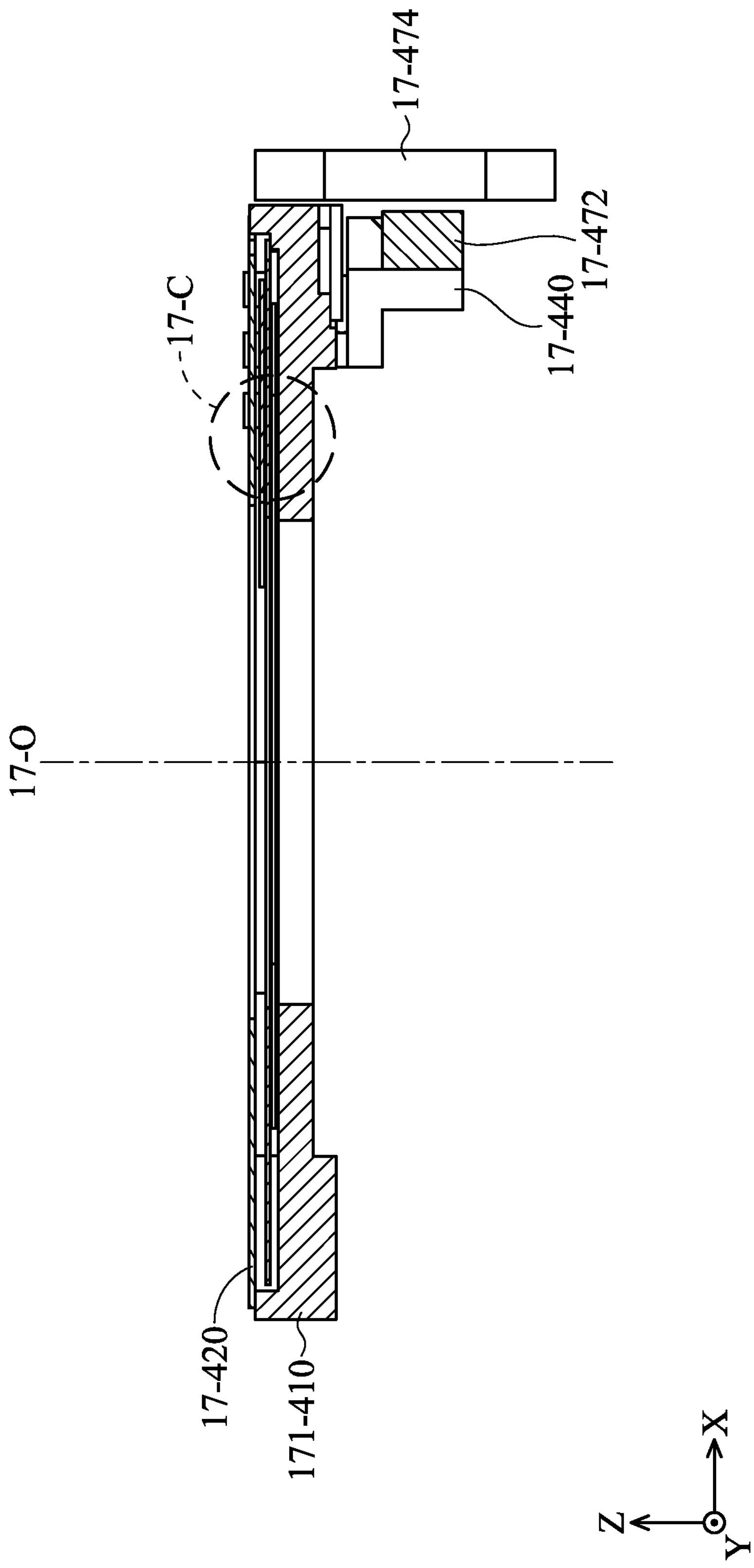

FIG. 165 is a cross-sectional view of a light flux adjustment module in some embodiments of the present disclosure.

Figure 166:
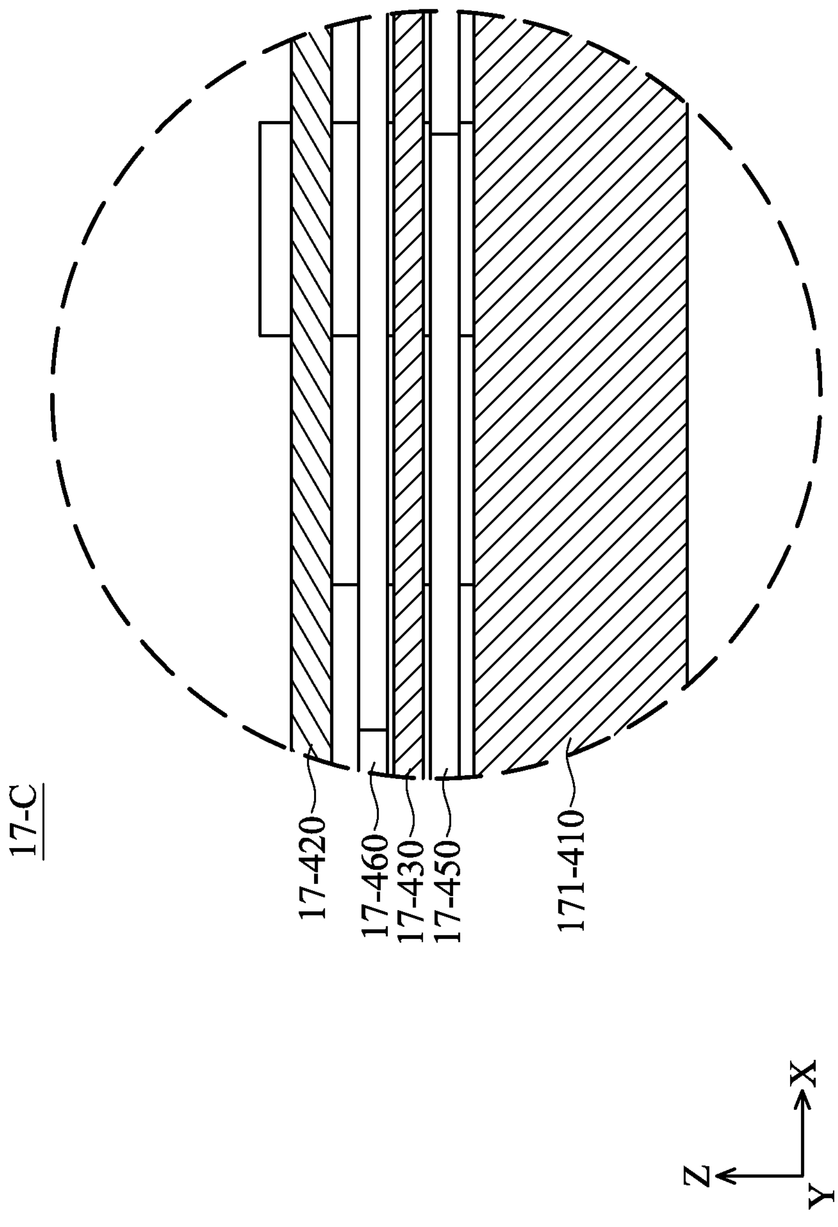

FIG. 166 is an enlarged view of the portion 17-C in FIG. 165.

Figure 167:
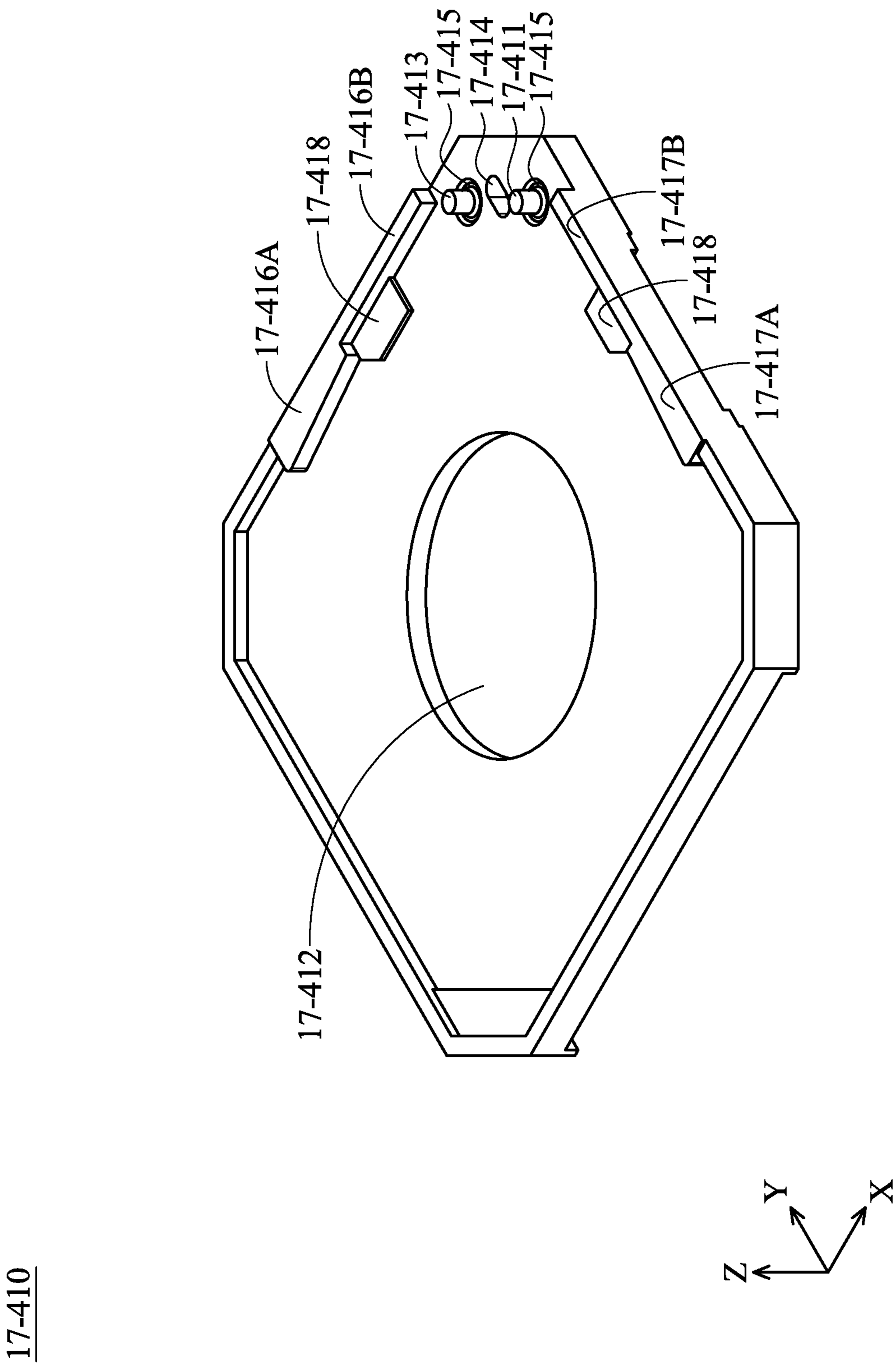

FIG. 167 is a schematic view of a case.

Figure 168:
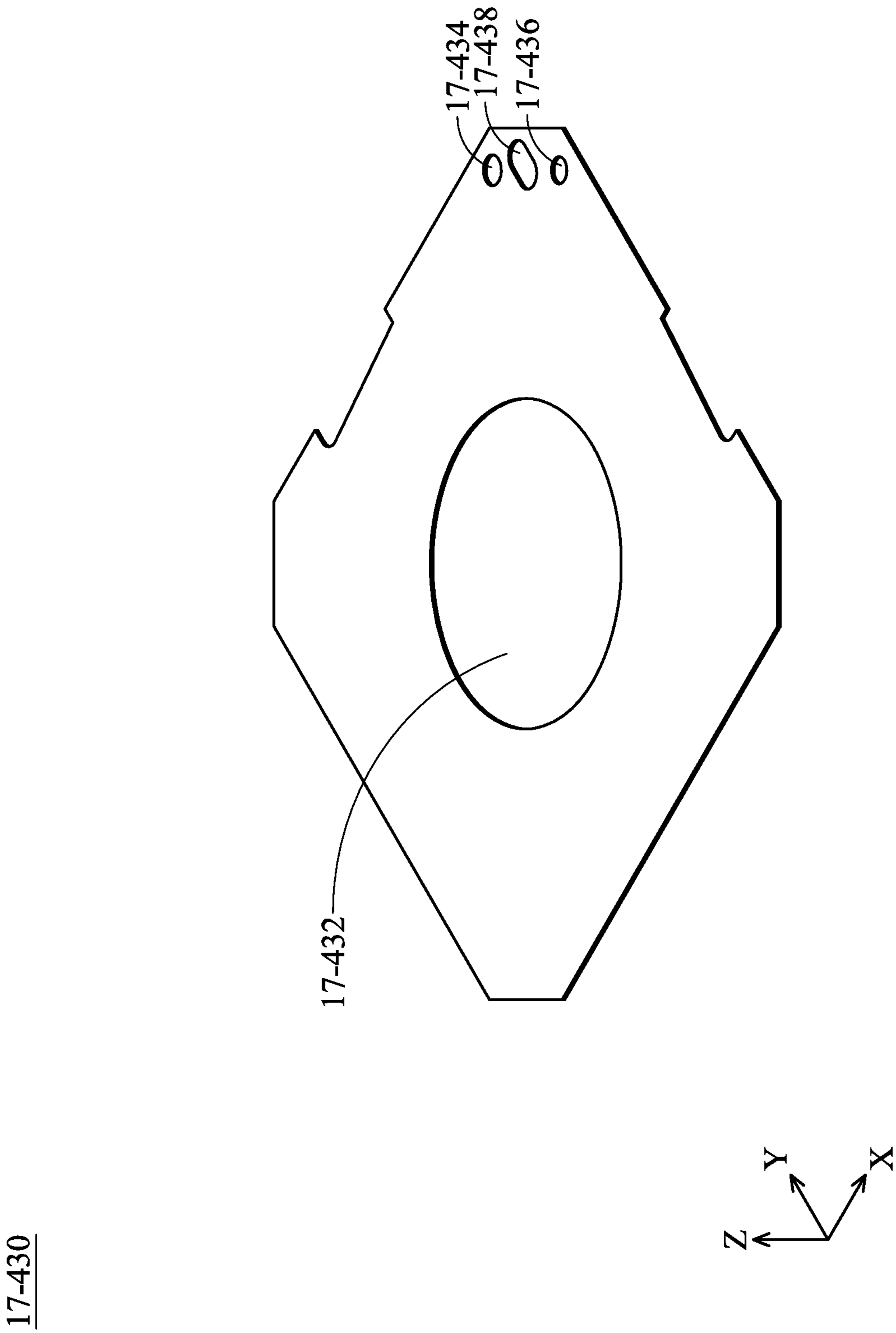

FIG. 168 is a schematic view of a middle plate.

Figure 169:
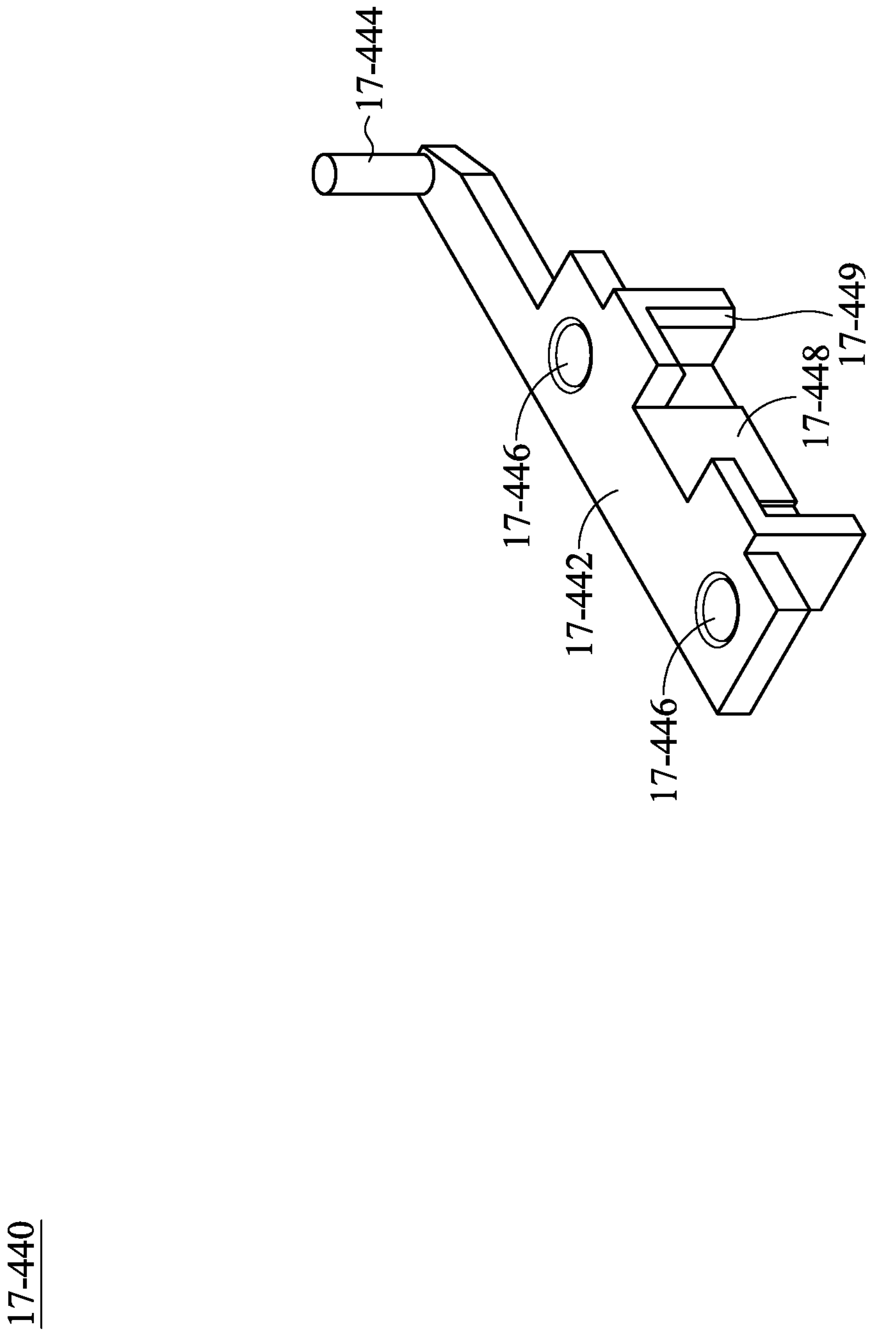

FIG. 169 is a schematic view of a connecting element.

Figure 170:
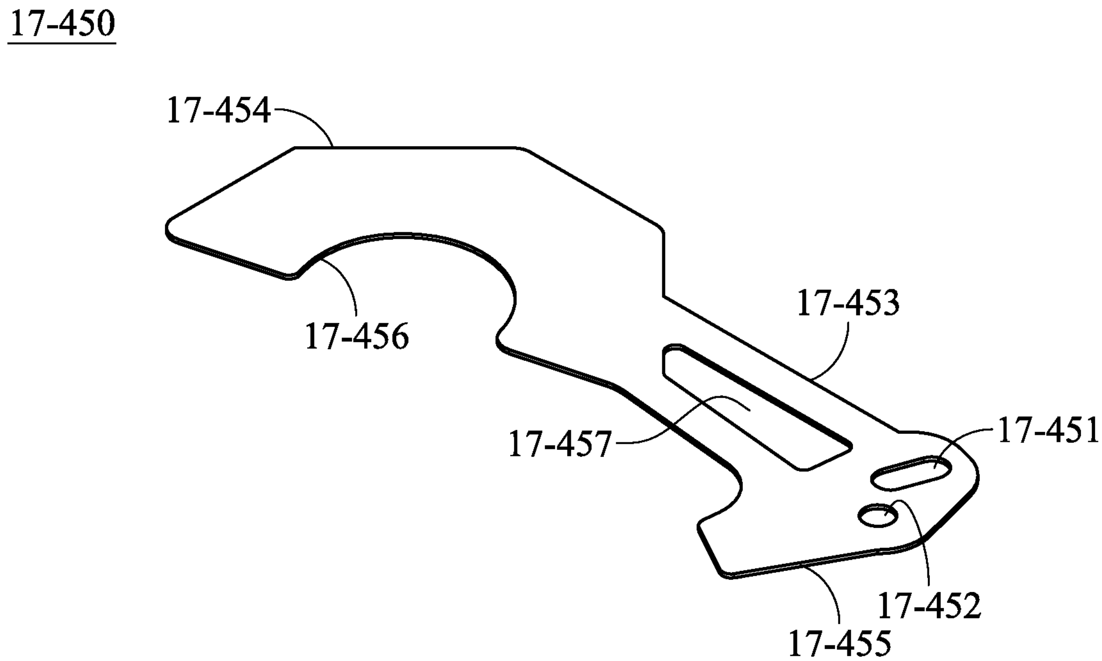

FIG. 170 is a schematic view of a first blade.

Figure 171:
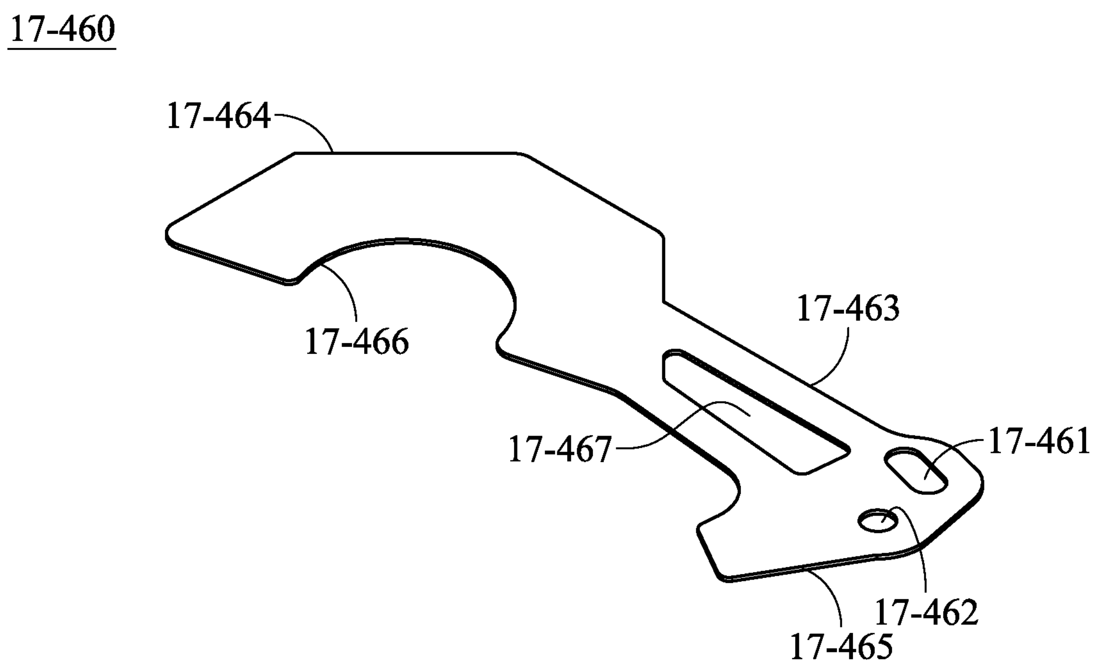

FIG. 171 is a schematic view of a second blade.

Figure 172:
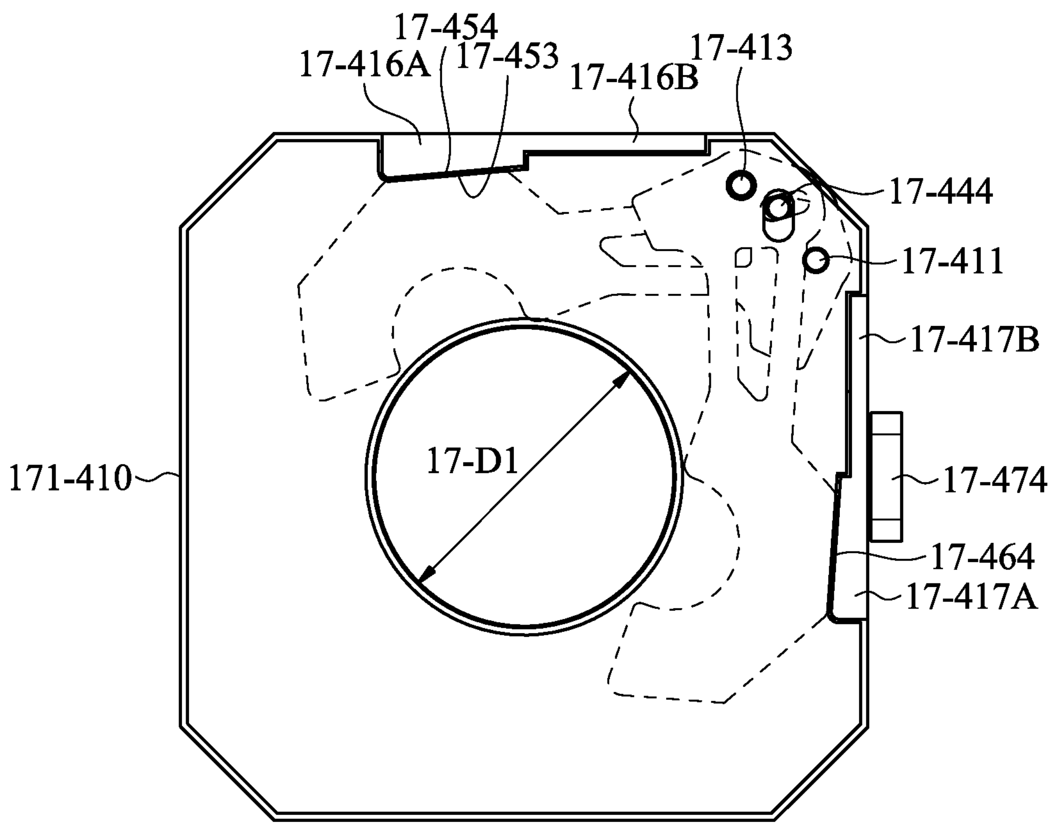
Figure 173:
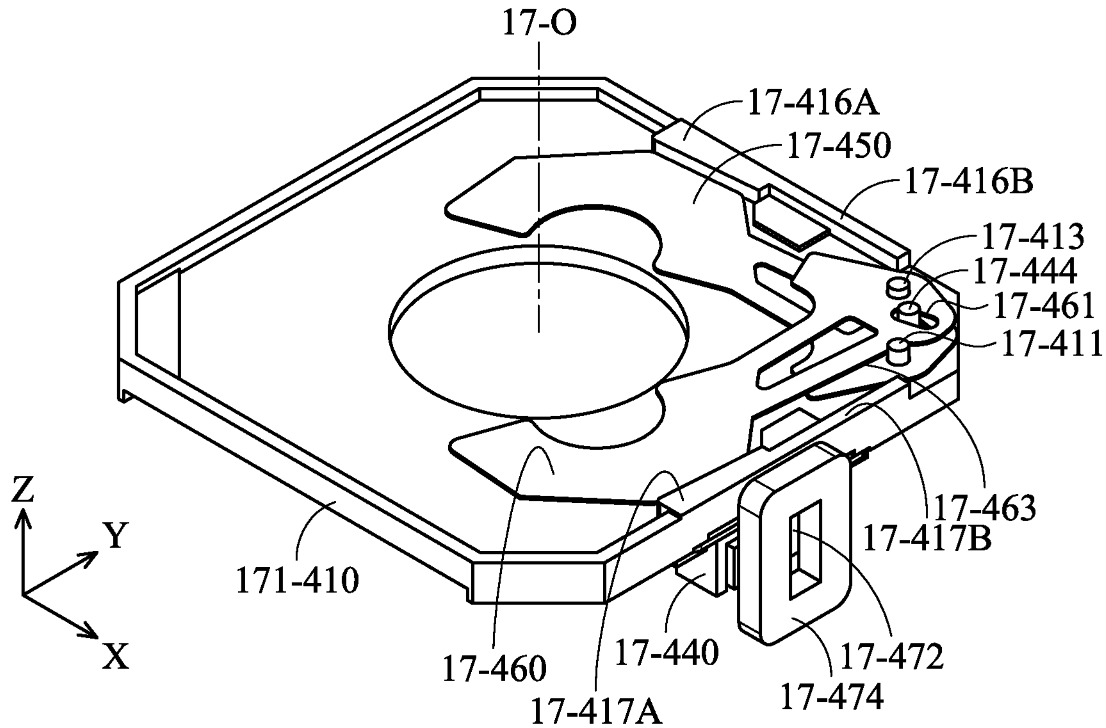
Figure 174:
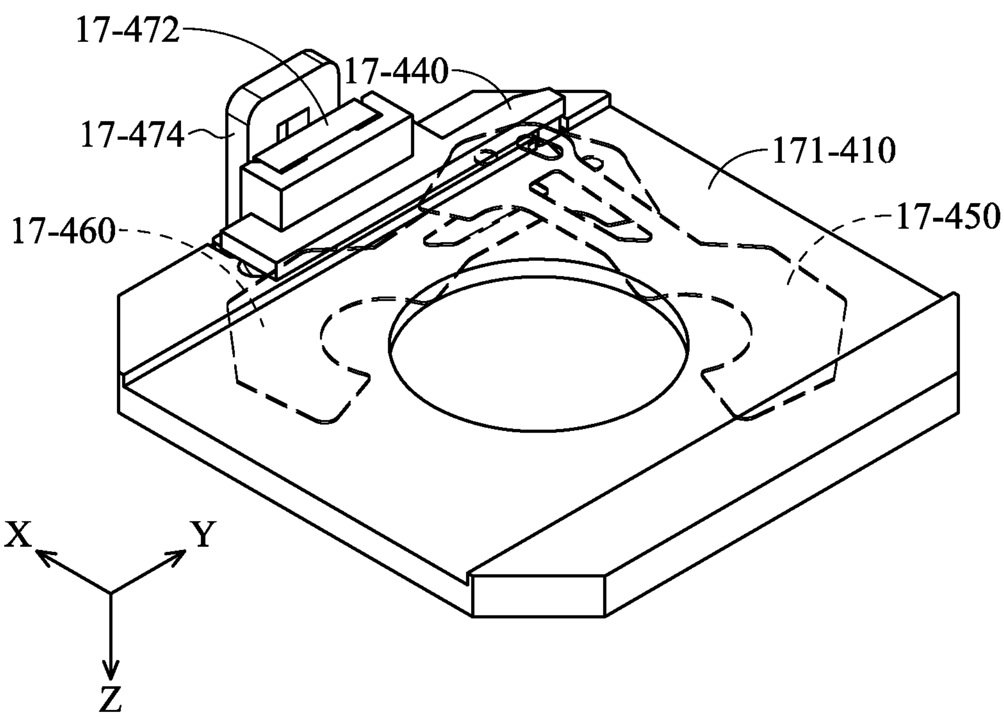

FIGS. 172 to 174 are schematic views of the light flux adjustment module when viewed in different directions.

Figure 175:
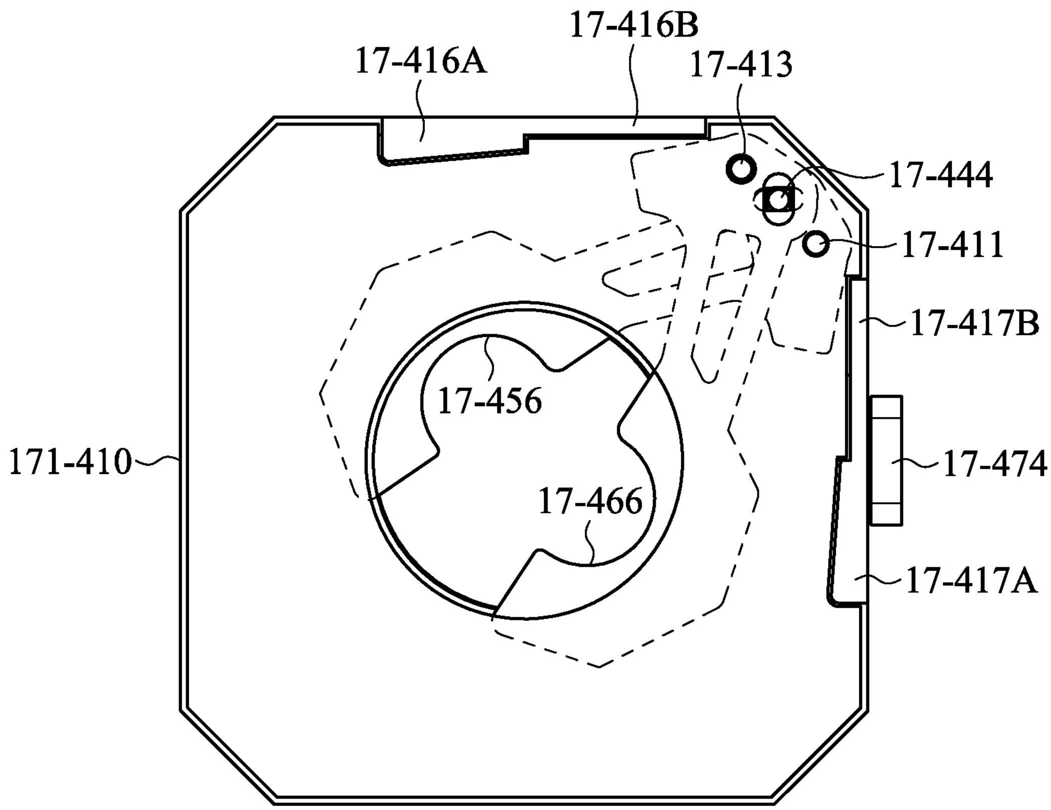
Figure 176:
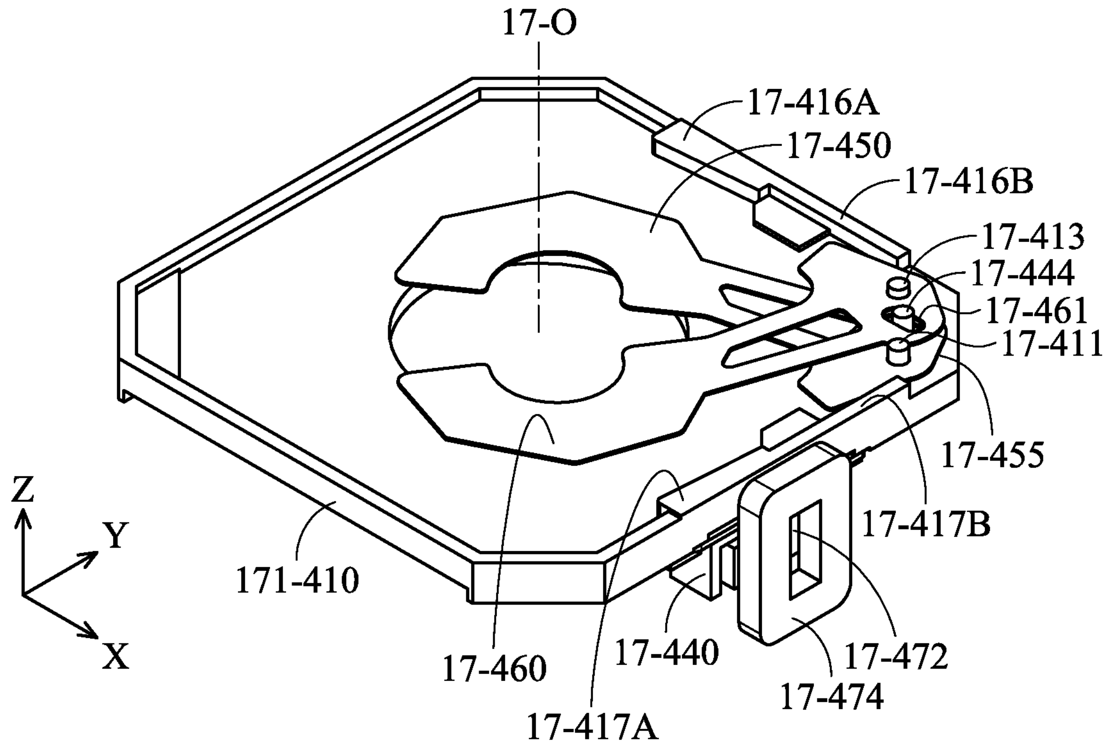
Figure 177:
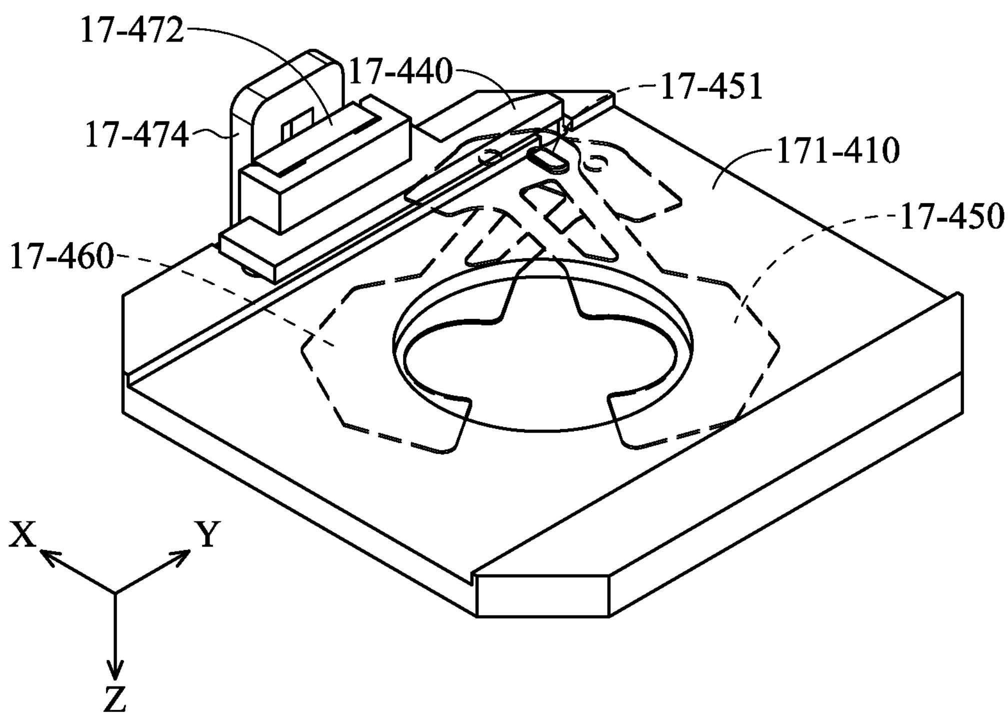

FIGS. 175 to 177 are schematic views of the light flux adjustment module when viewed in different directions.

Figure 178:
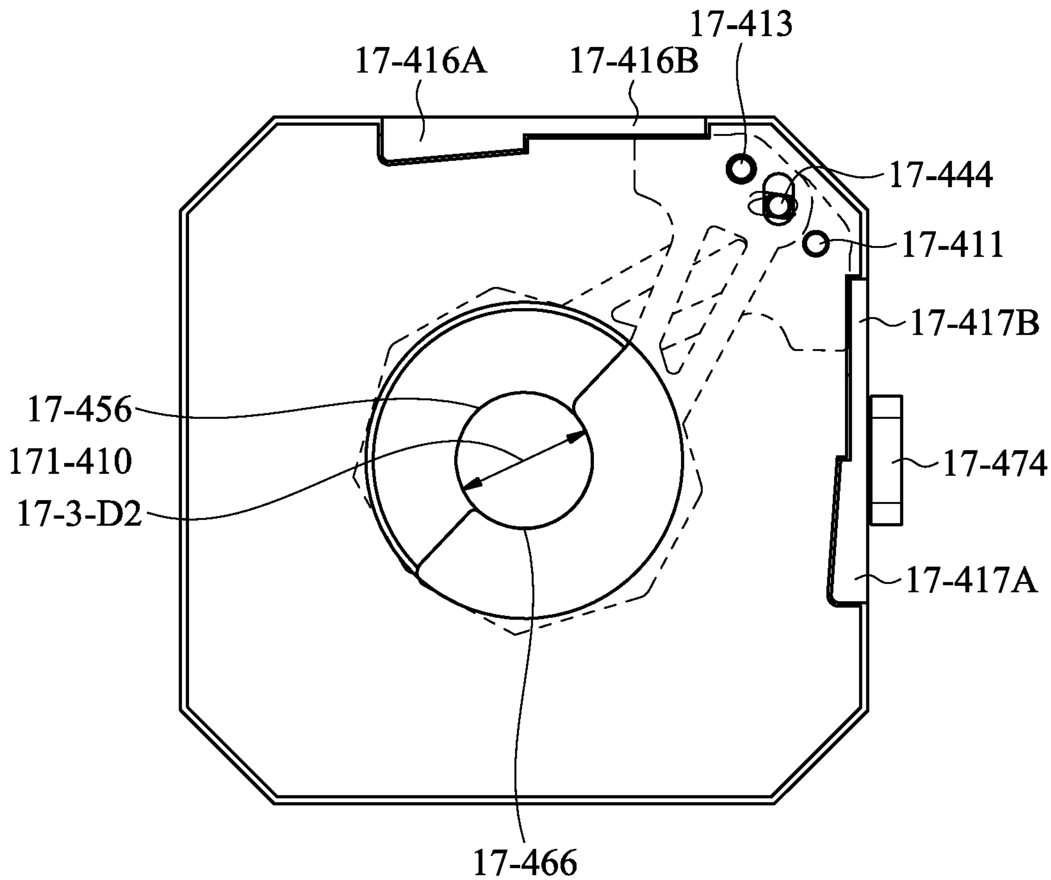
Figure 179:
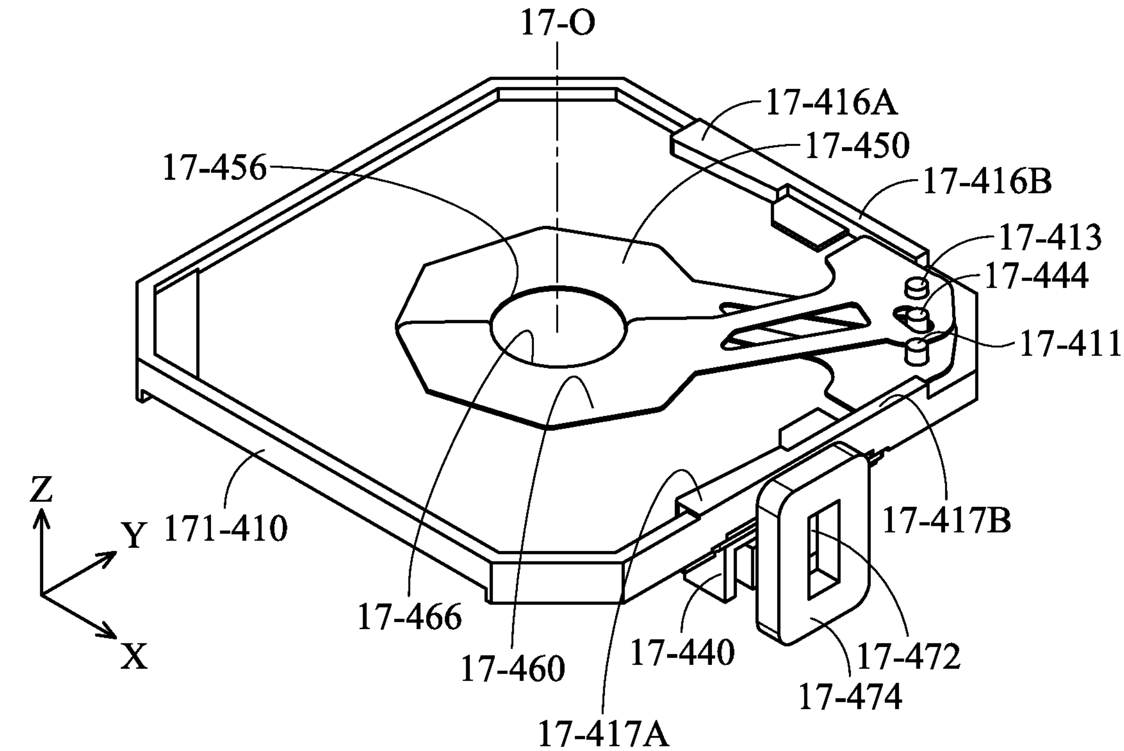
Figure 180:
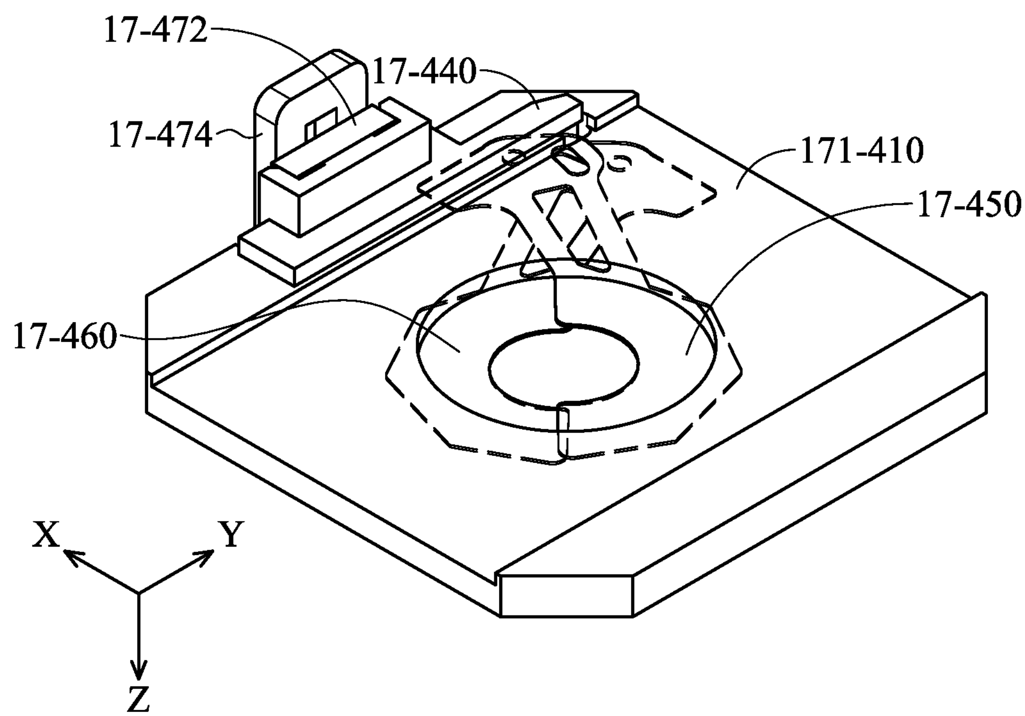

FIGS. 178 to 180 are schematic views of the light flux adjustment module when viewed in different directions, after the connecting element is further driven.

Figure 181:
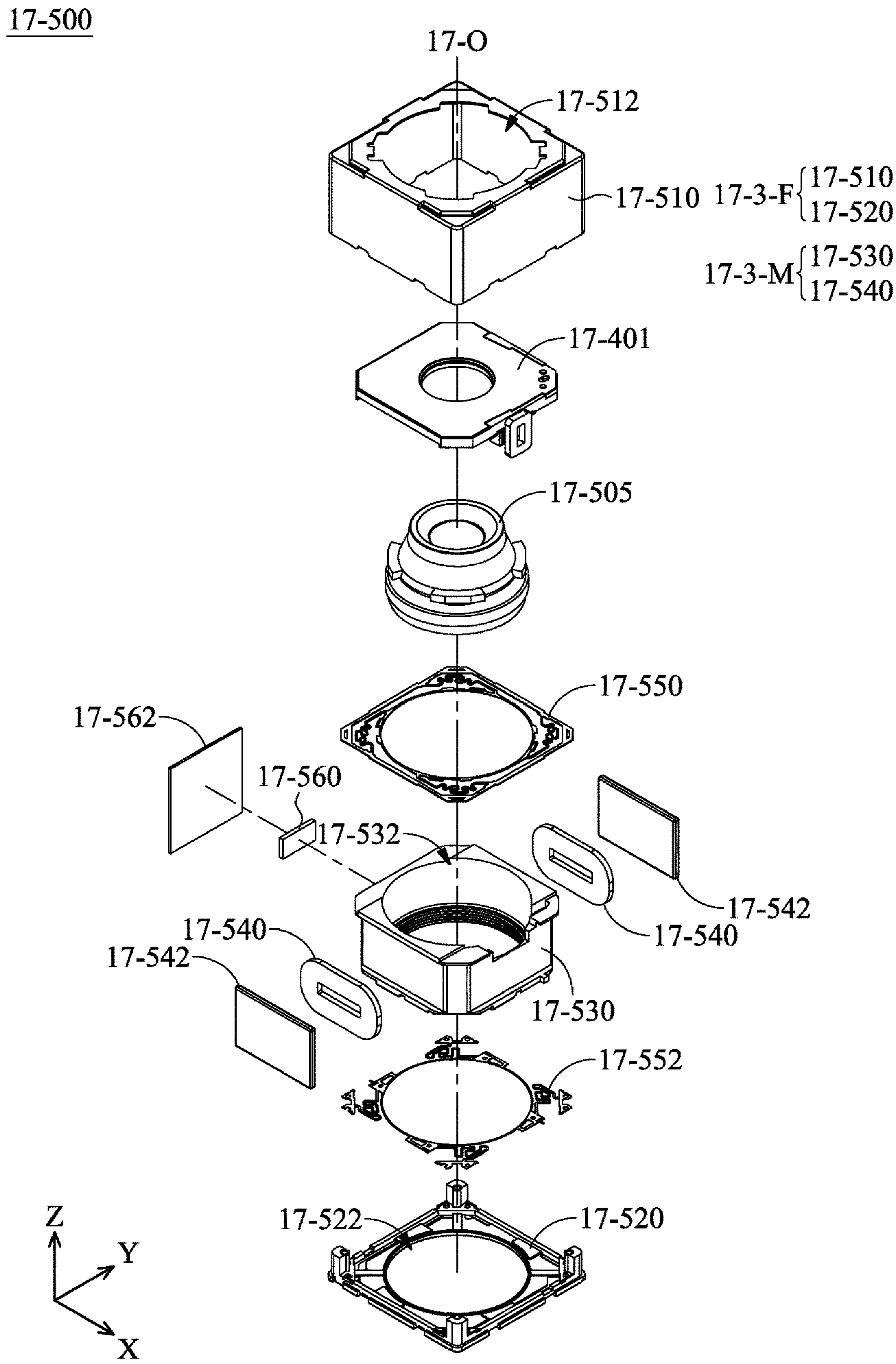

FIG. 181 is an exploded view of an optical element driving mechanism in some embodiments of the present disclosure.

Figure 182:
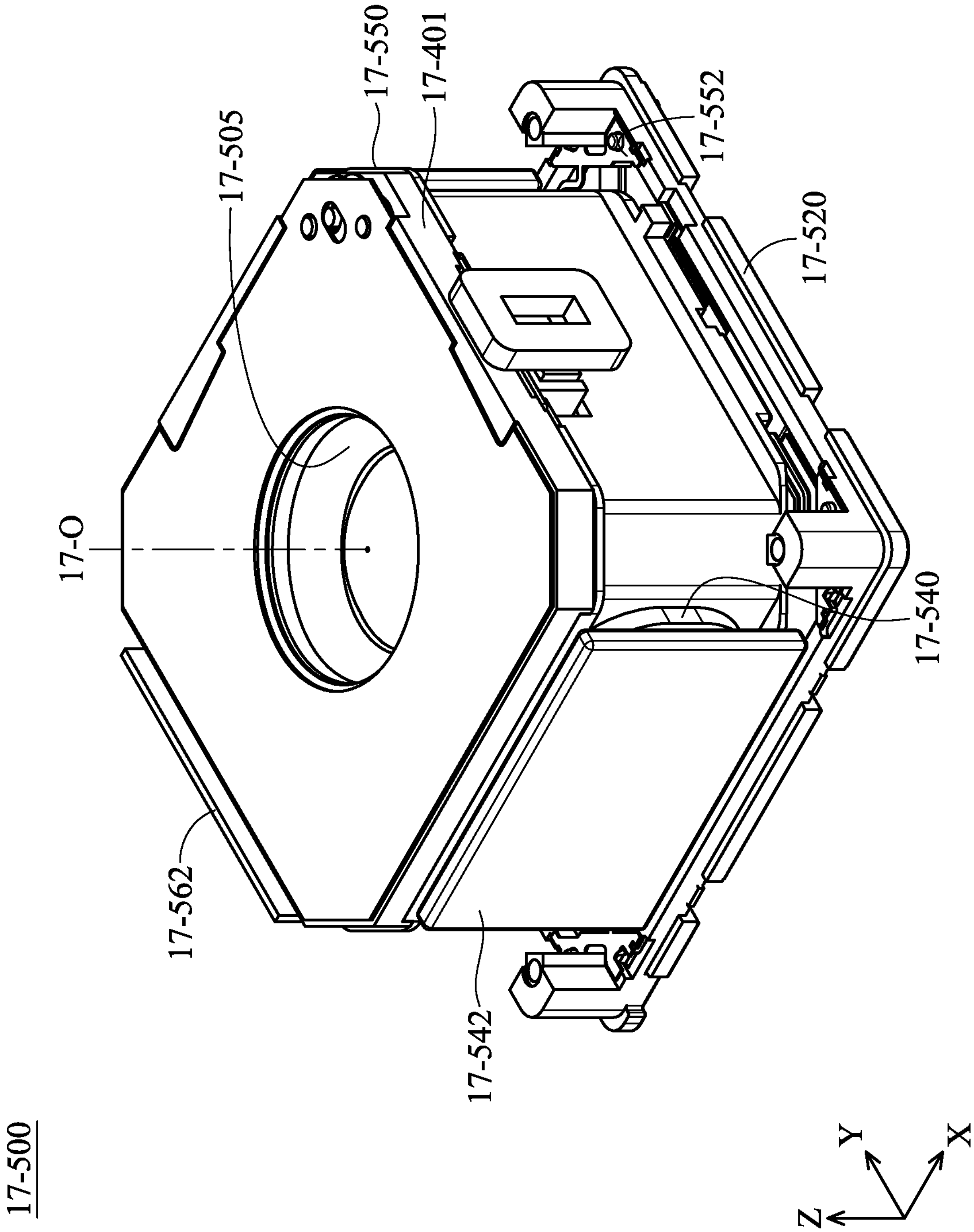

FIG. 182 is a schematic view of the optical element driving mechanism after an outer case is omitted.

Figure 183:
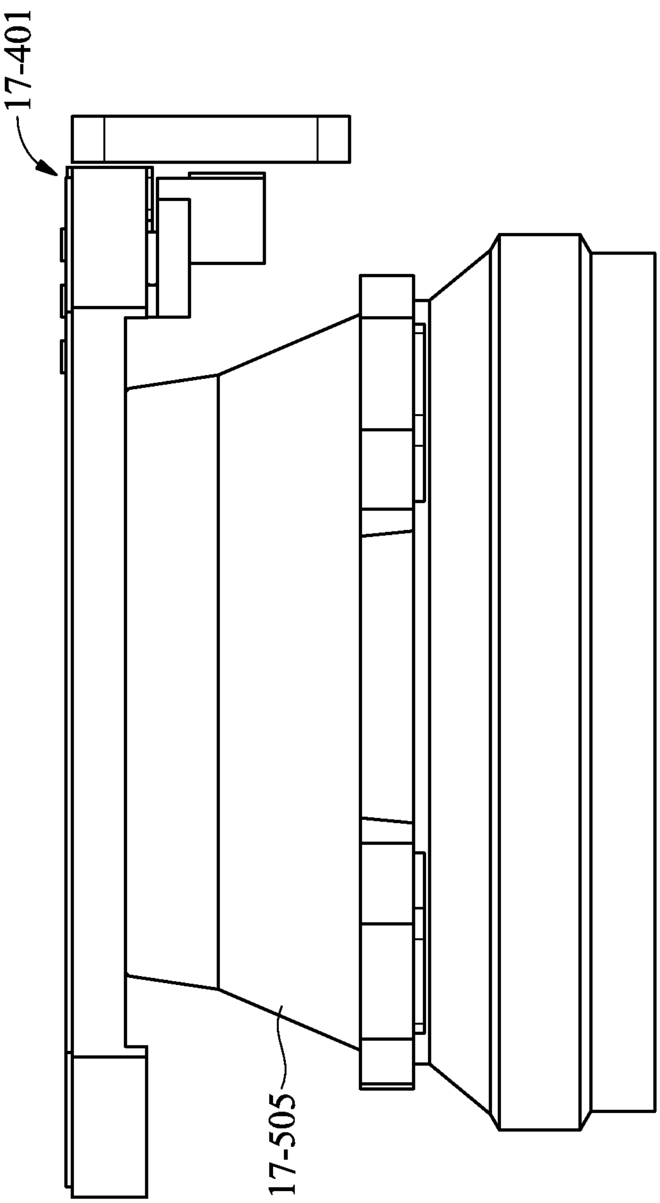

FIG. 183 is a side view of some elements of the optical element driving mechanism.

Figure 184:
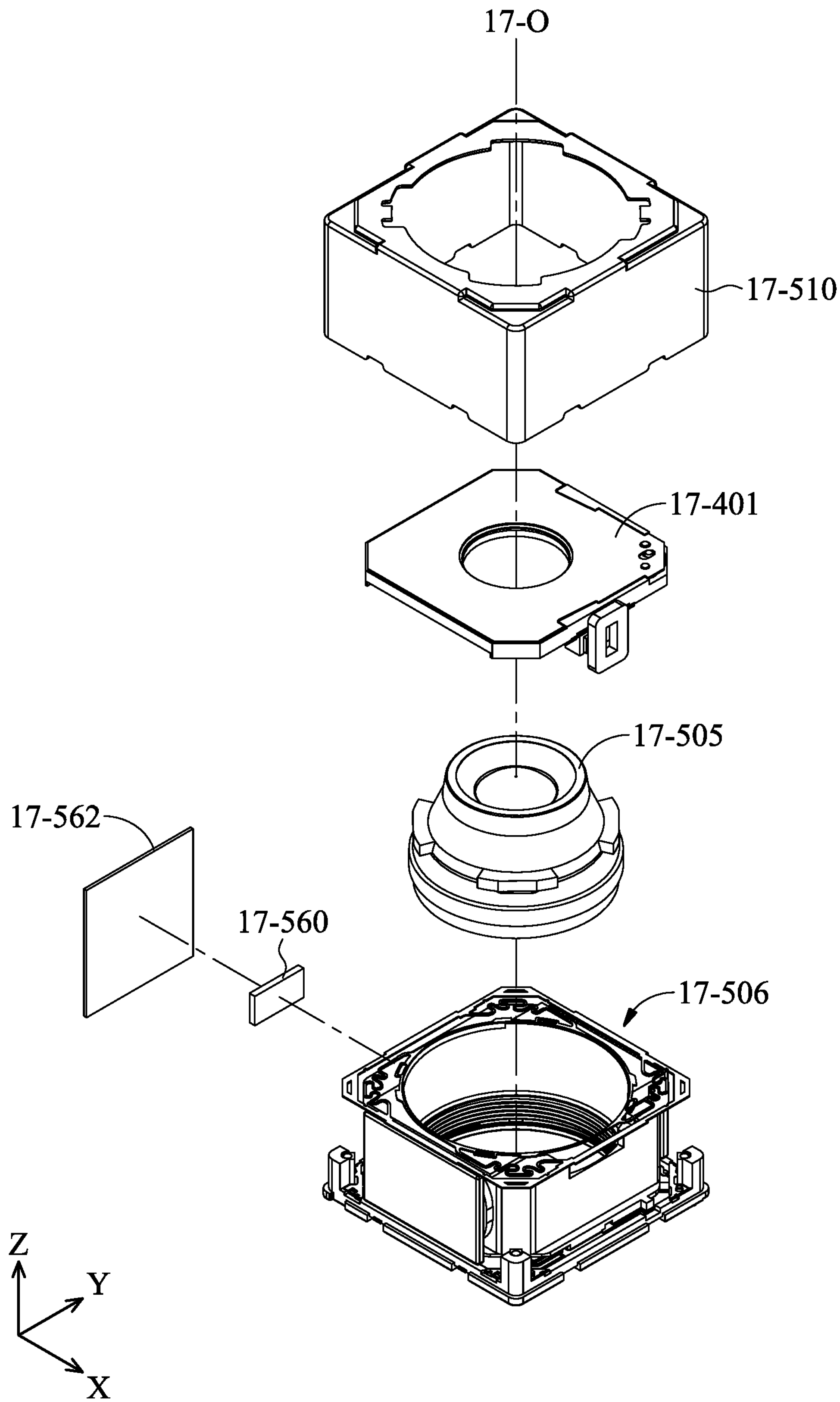

FIG. 184 is a schematic view of the optical element driving mechanism.

Figure 185:
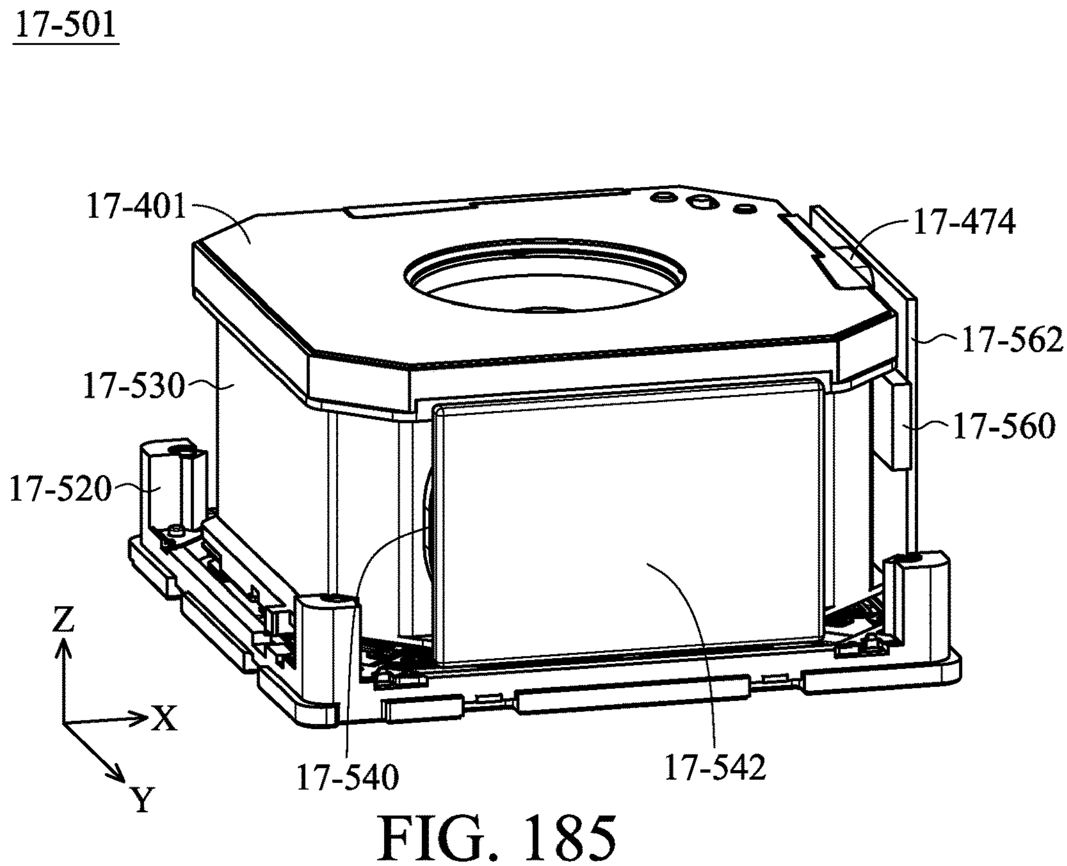

FIG. 185 is a schematic view of an optical element driving mechanism in some embodiments of the present disclosure.

Figure 186:
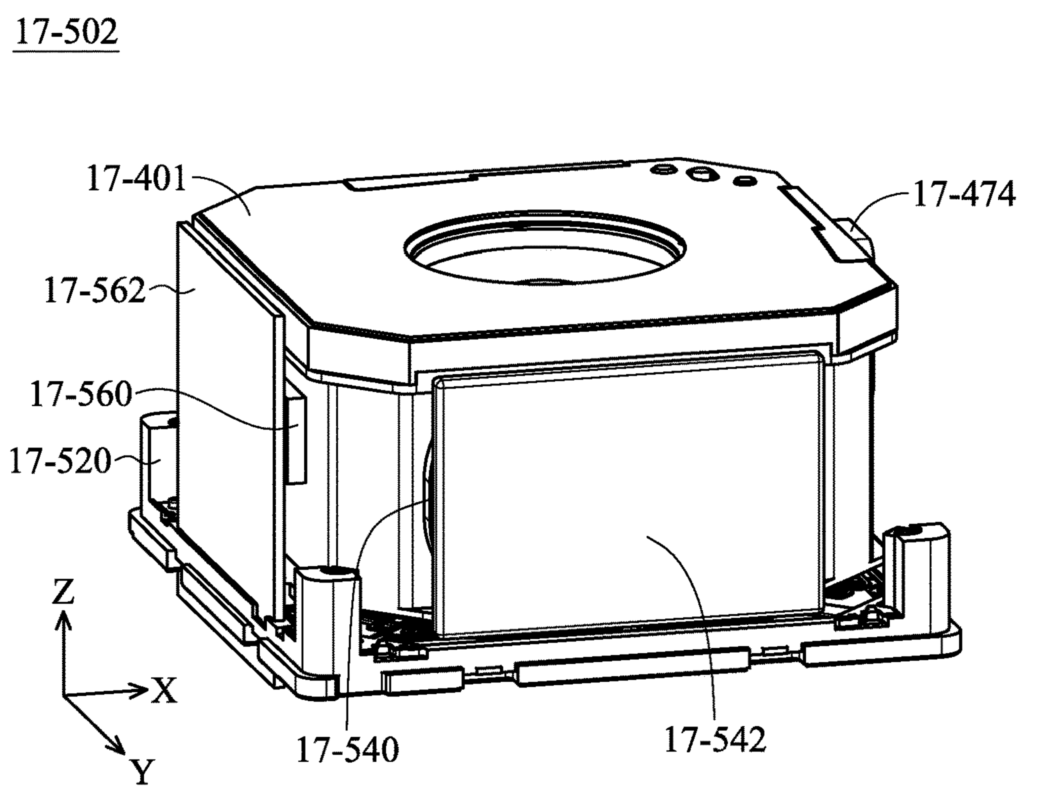

FIG. 186 is a schematic view of an optical element driving mechanism in some embodiments of the present disclosure.

Figure 187:
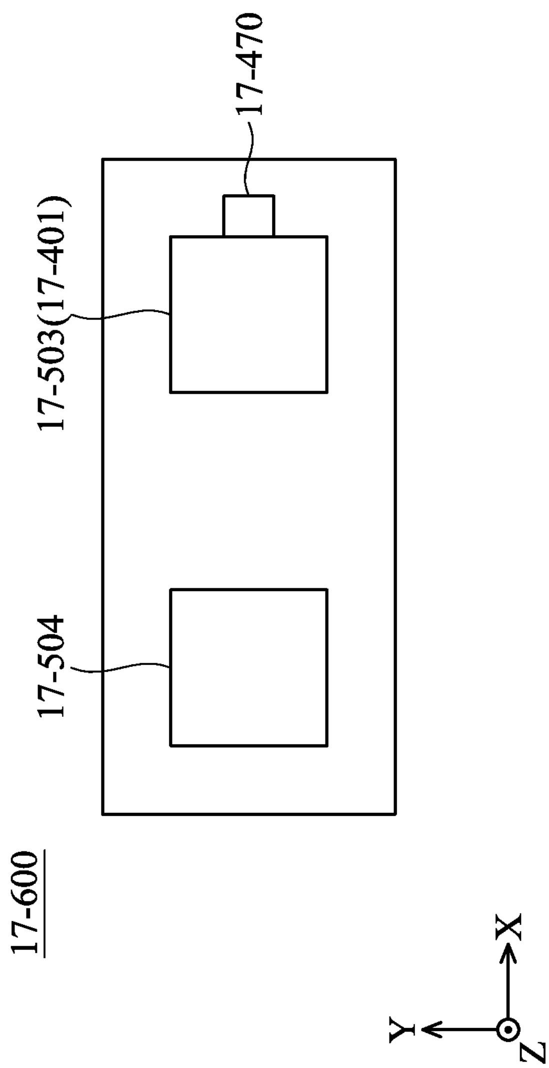

FIG. 187 is a schematic view of an optical system in some embodiments of the present disclosure.

Figure 188:
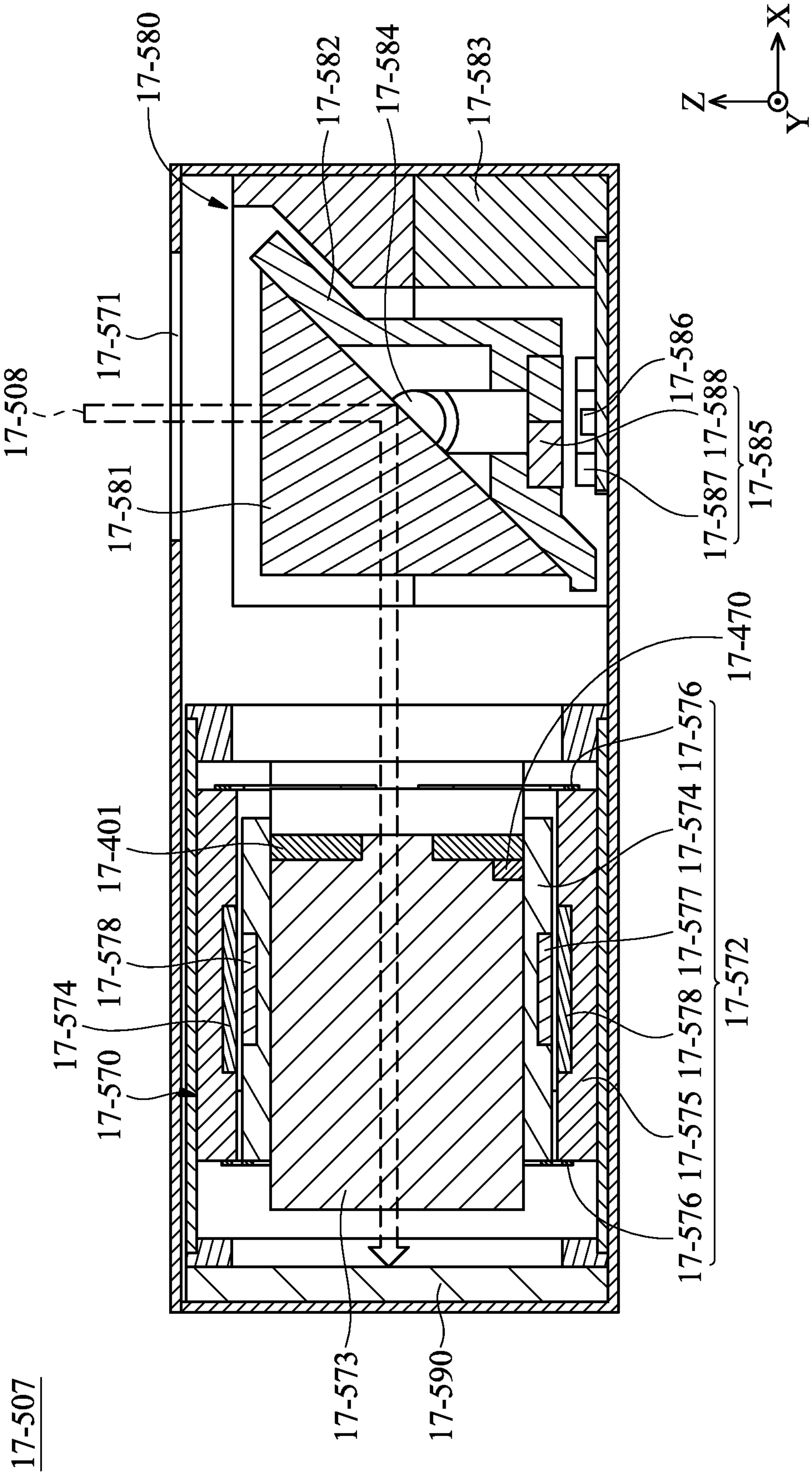

FIG. 188 is a schematic view of an optical system in some embodiments of the present disclosure.

Figure 189:
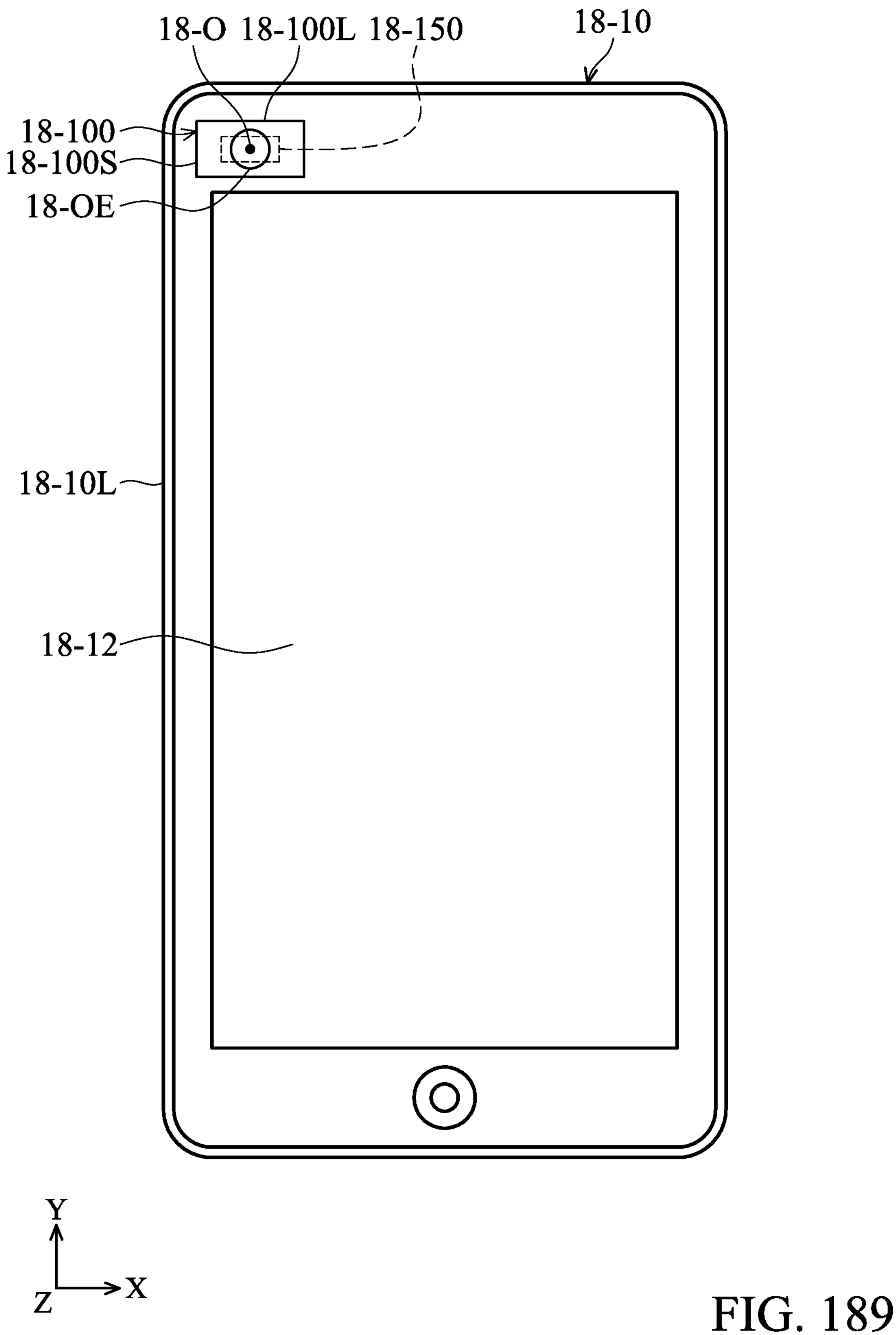

FIG. 189 shows a front view of an electronic device according to an embodiment of the present disclosure.

Figure 190:
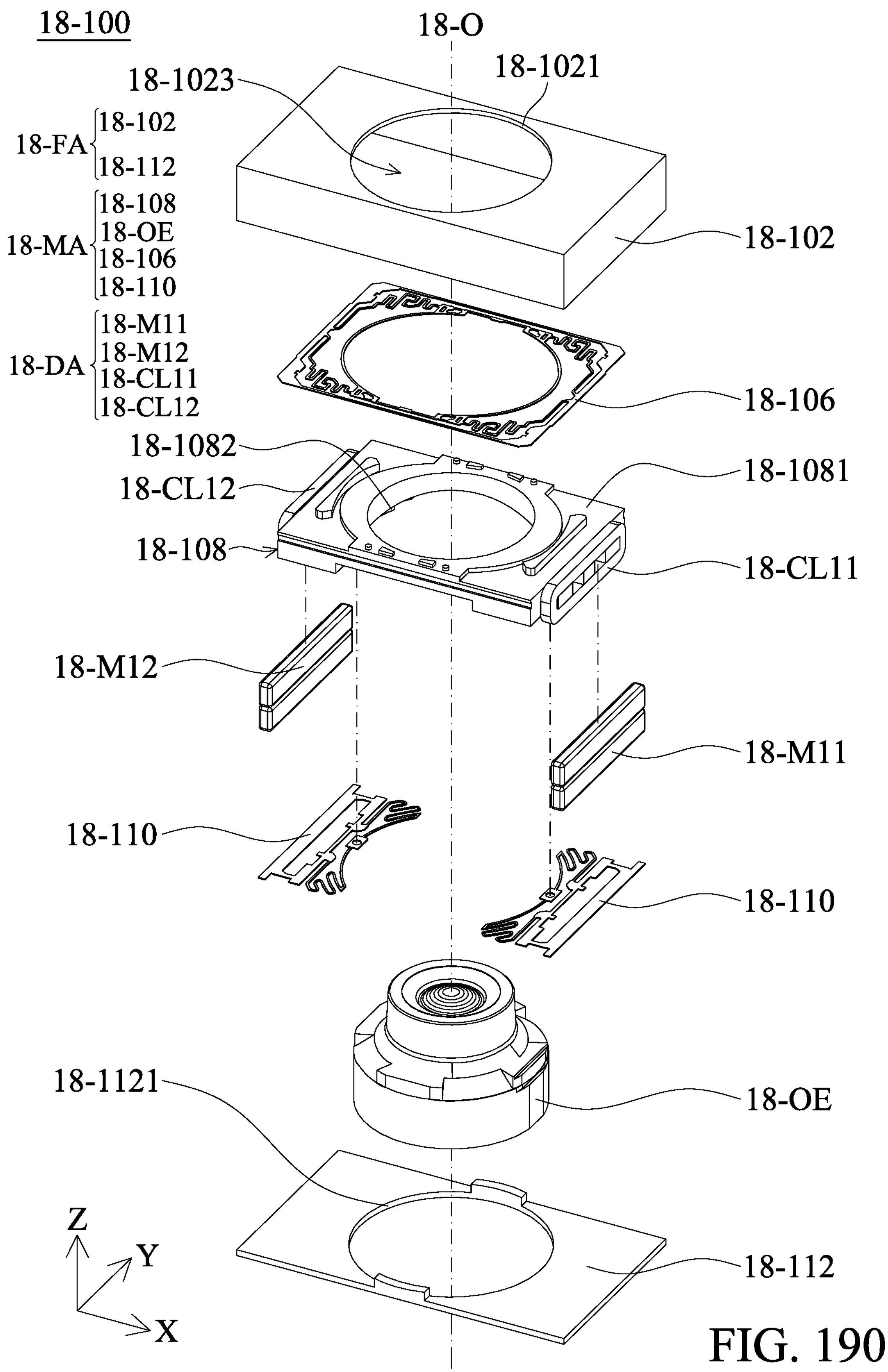

FIG. 190 is an exploded diagram of the optical element driving mechanism according to an embodiment of the present disclosure.

Figure 191:
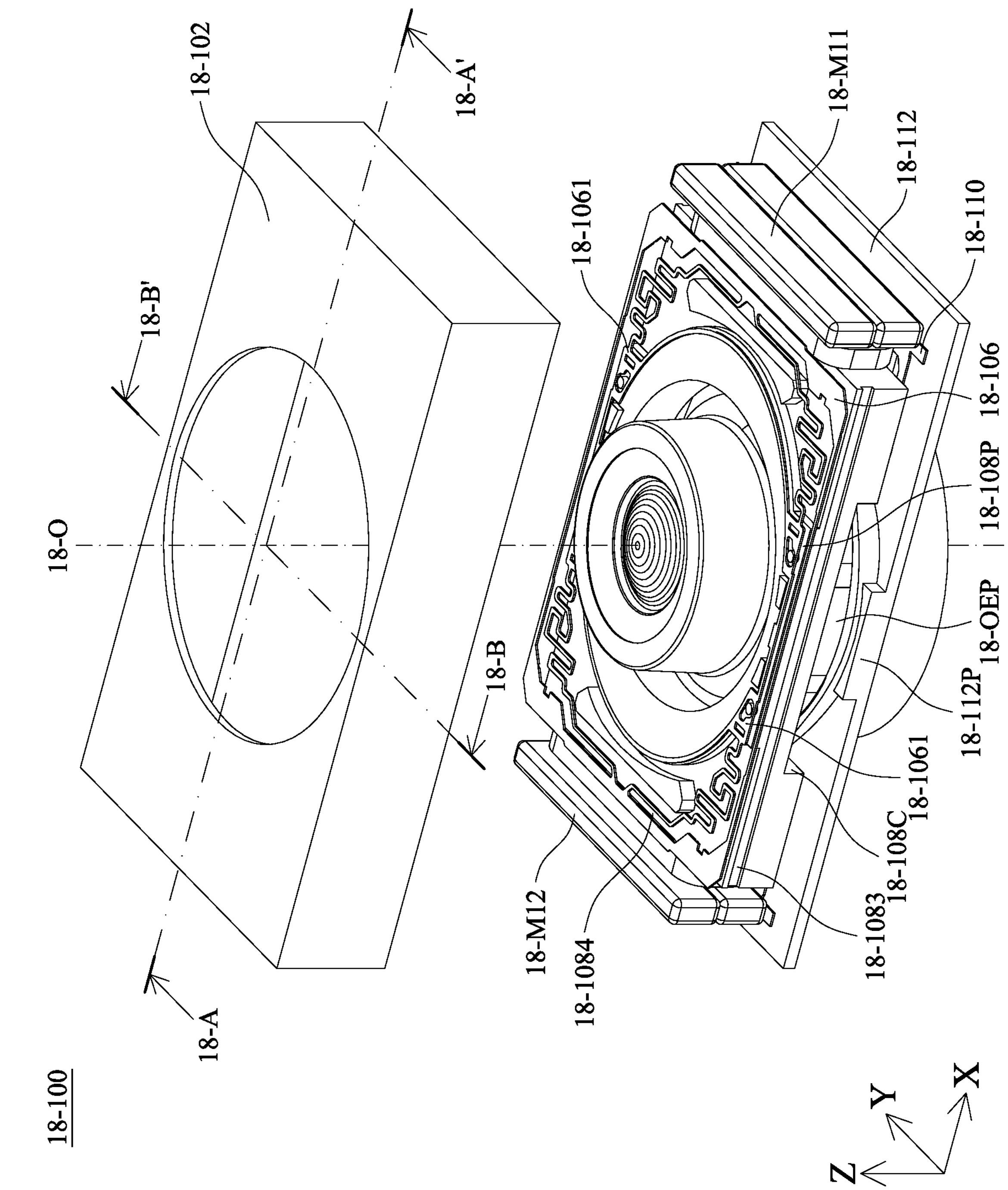

FIG. 191 is a partial exploded diagram of the optical element driving mechanism according to an embodiment of the present disclosure.

Figure 192:
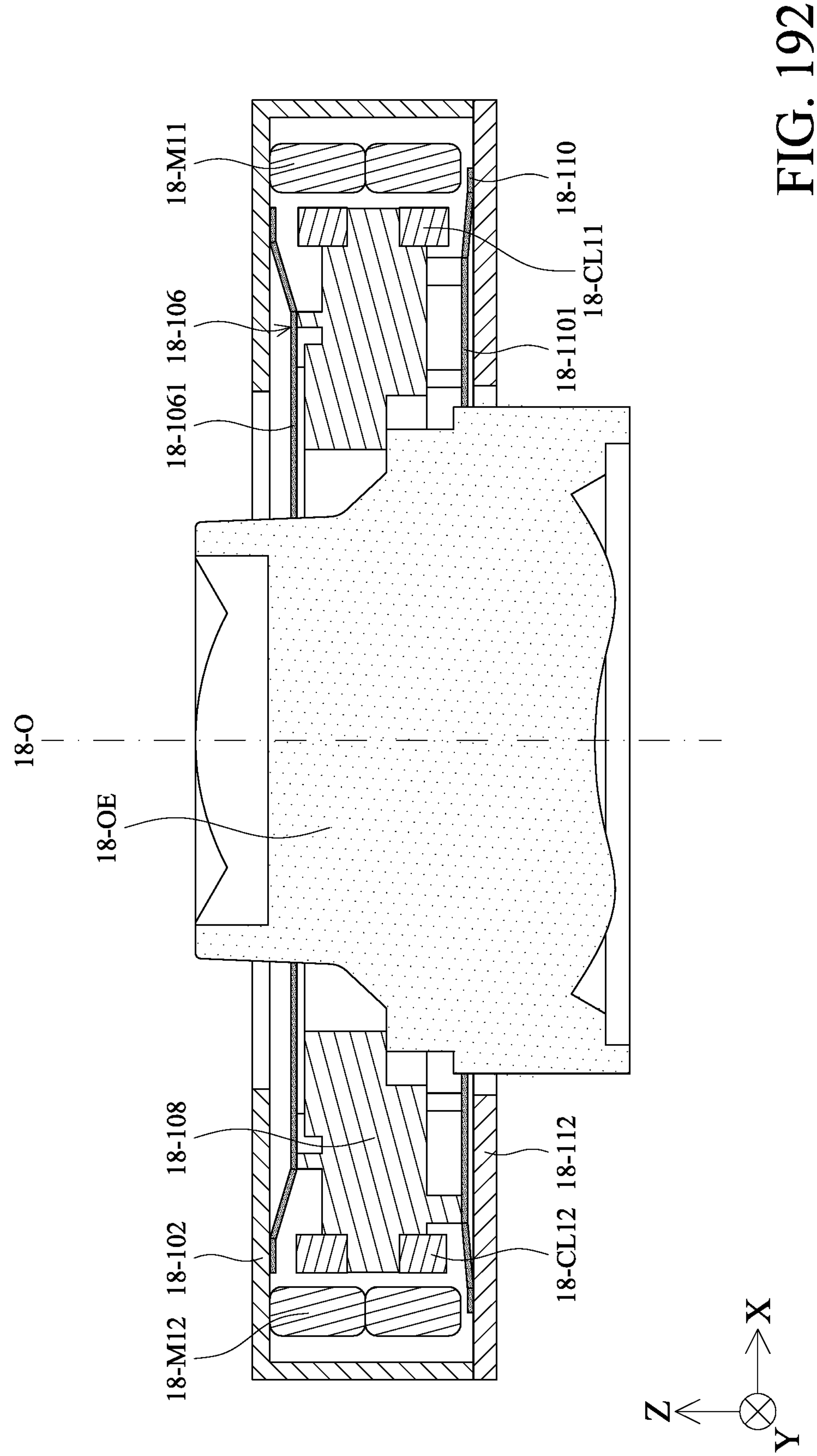

FIG. 192 is a cross-sectional view of the optical element driving mechanism along line 18-A-18-A' in FIG. 191 according to an embodiment of the present disclosure.

Figure 193:
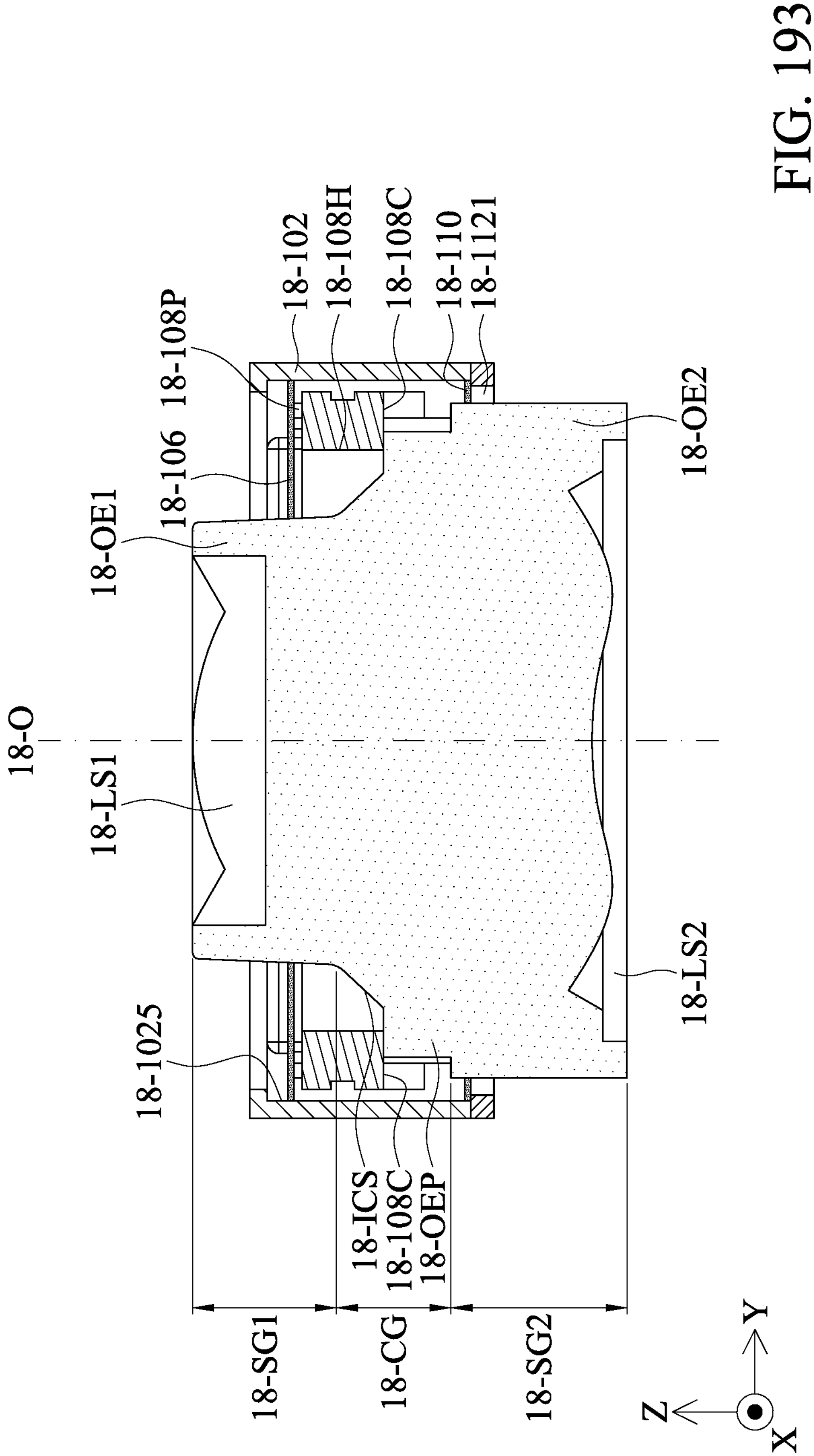

FIG. 193 is a cross-sectional view of the optical element driving mechanism along line B-B' in FIG. 191 according to an embodiment of the present disclosure.

Figure 194:
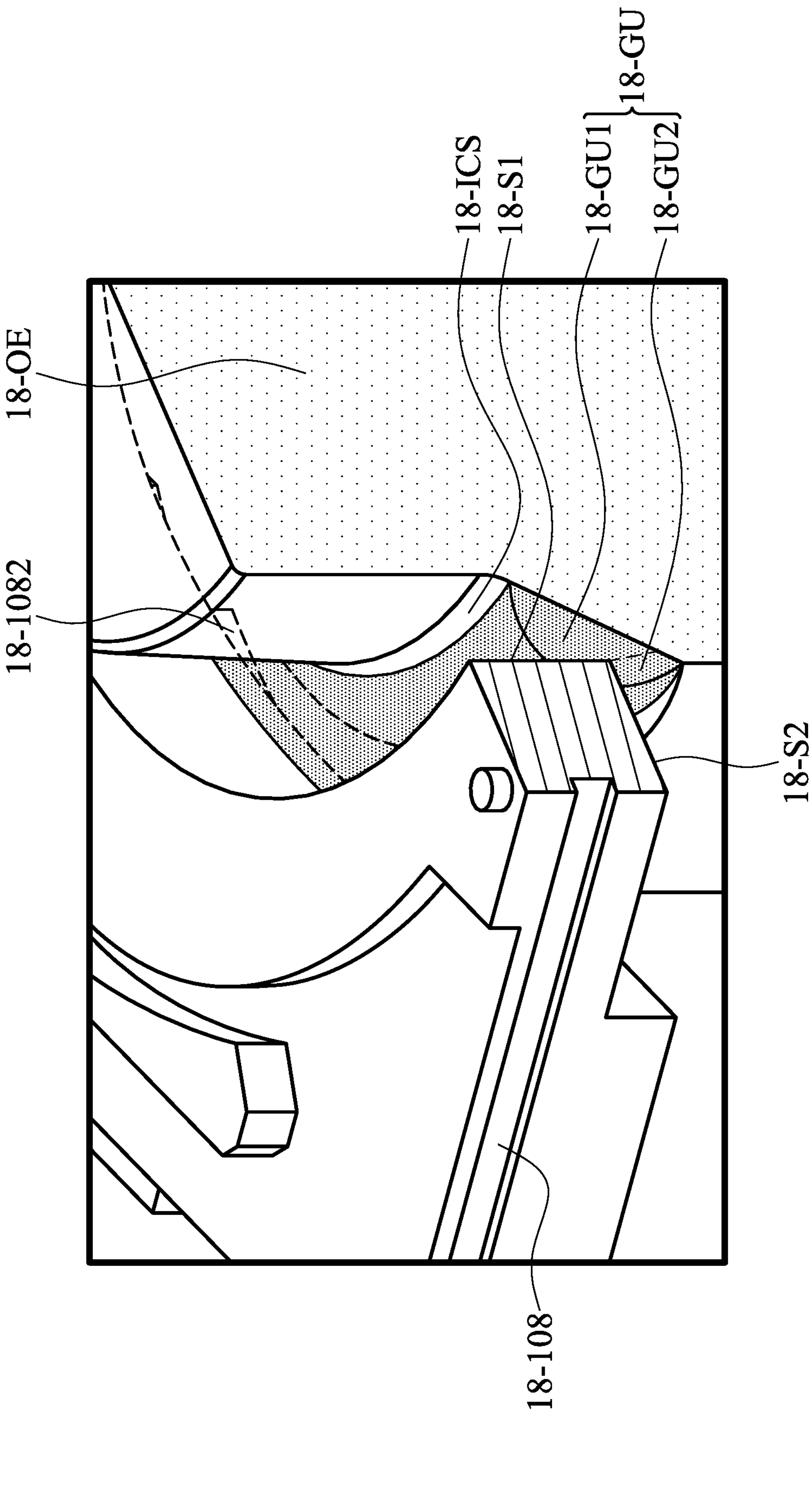

FIG. 194 is a perspective cross-sectional diagram of the optical element driving mechanism according to an embodiment of the present disclosure.

Figure 195:
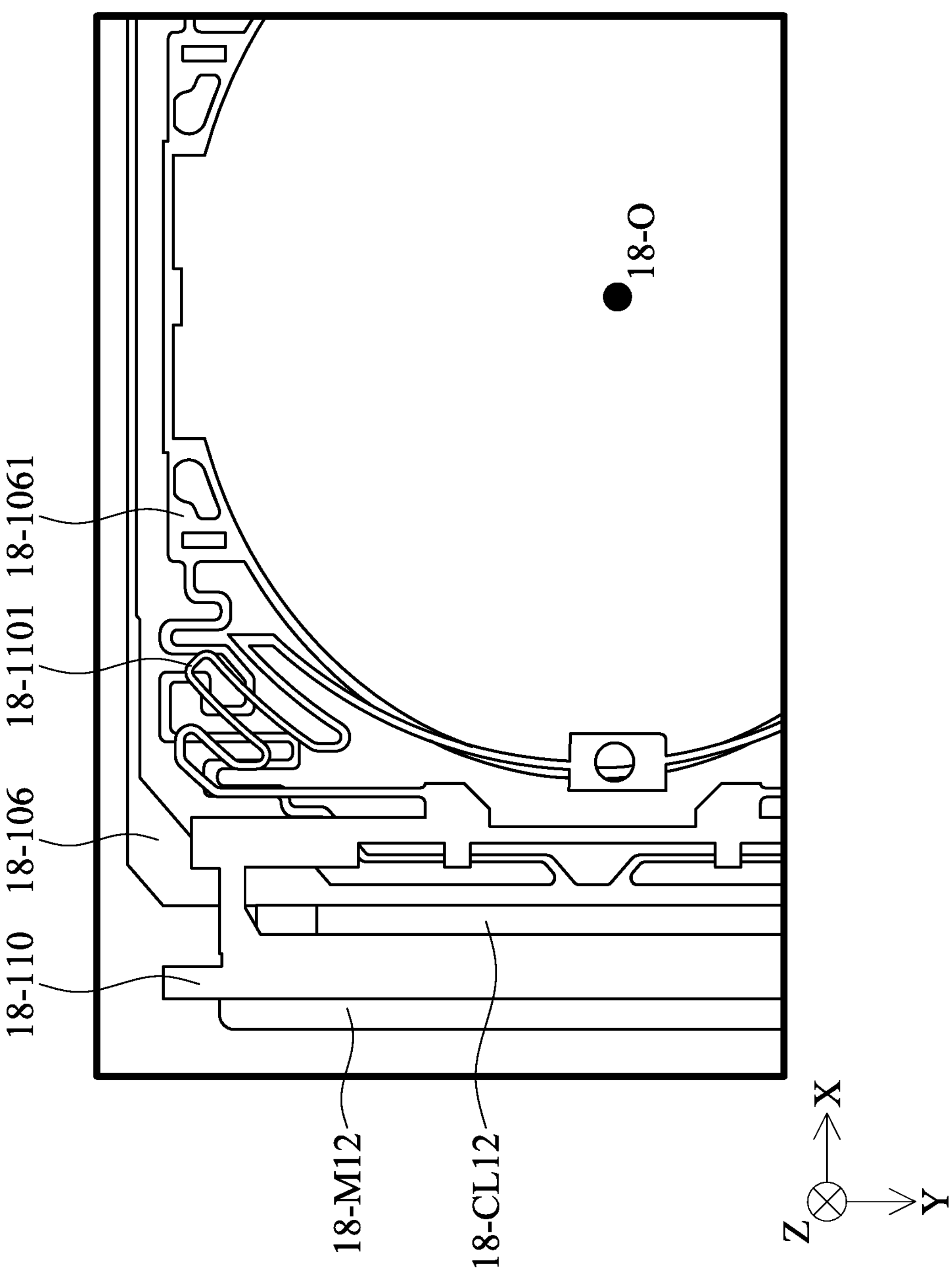

FIG. 195 is a bottom view of a part of the structure of the optical element driving mechanism according to an embodiment of the present disclosure.

Figure 196:
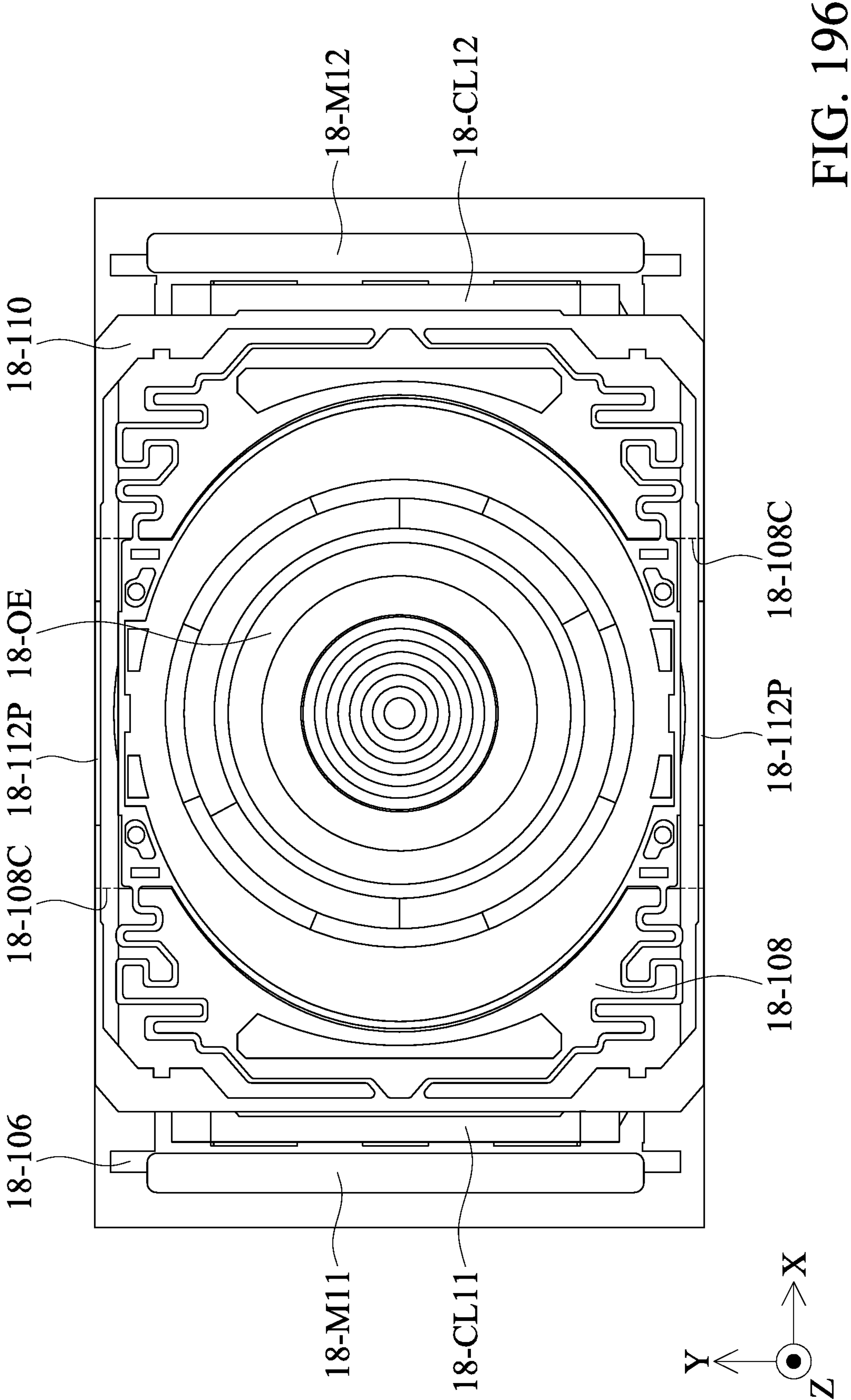

FIG. 196 is a top view of a part of the structure of the optical element driving mechanism in accordance with an embodiment of the present disclosure.

Figure 197:
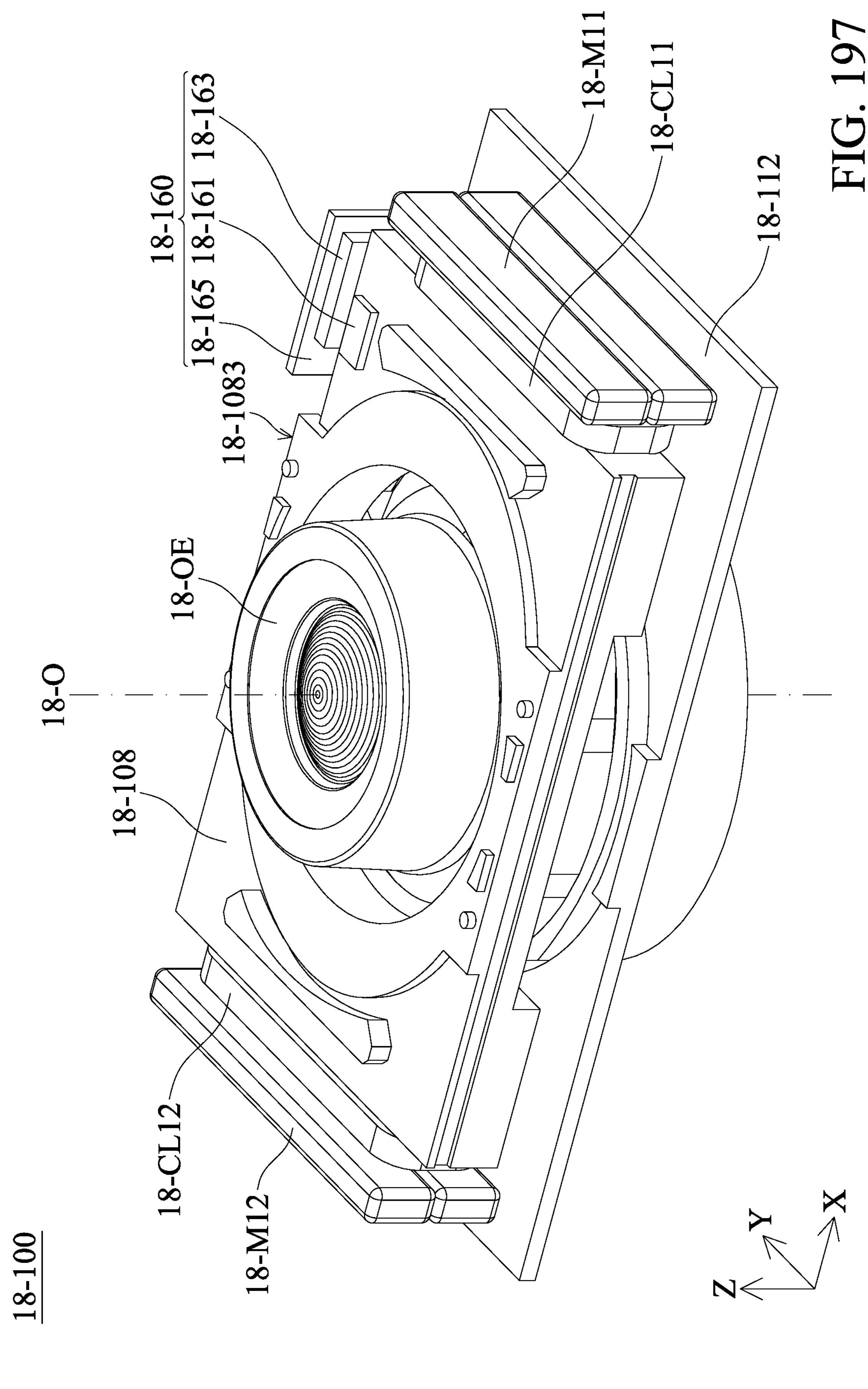

FIG. 197 is a partial structural diagram of the optical element driving mechanism according to another embodiment of the present disclosure.

Figure 198:
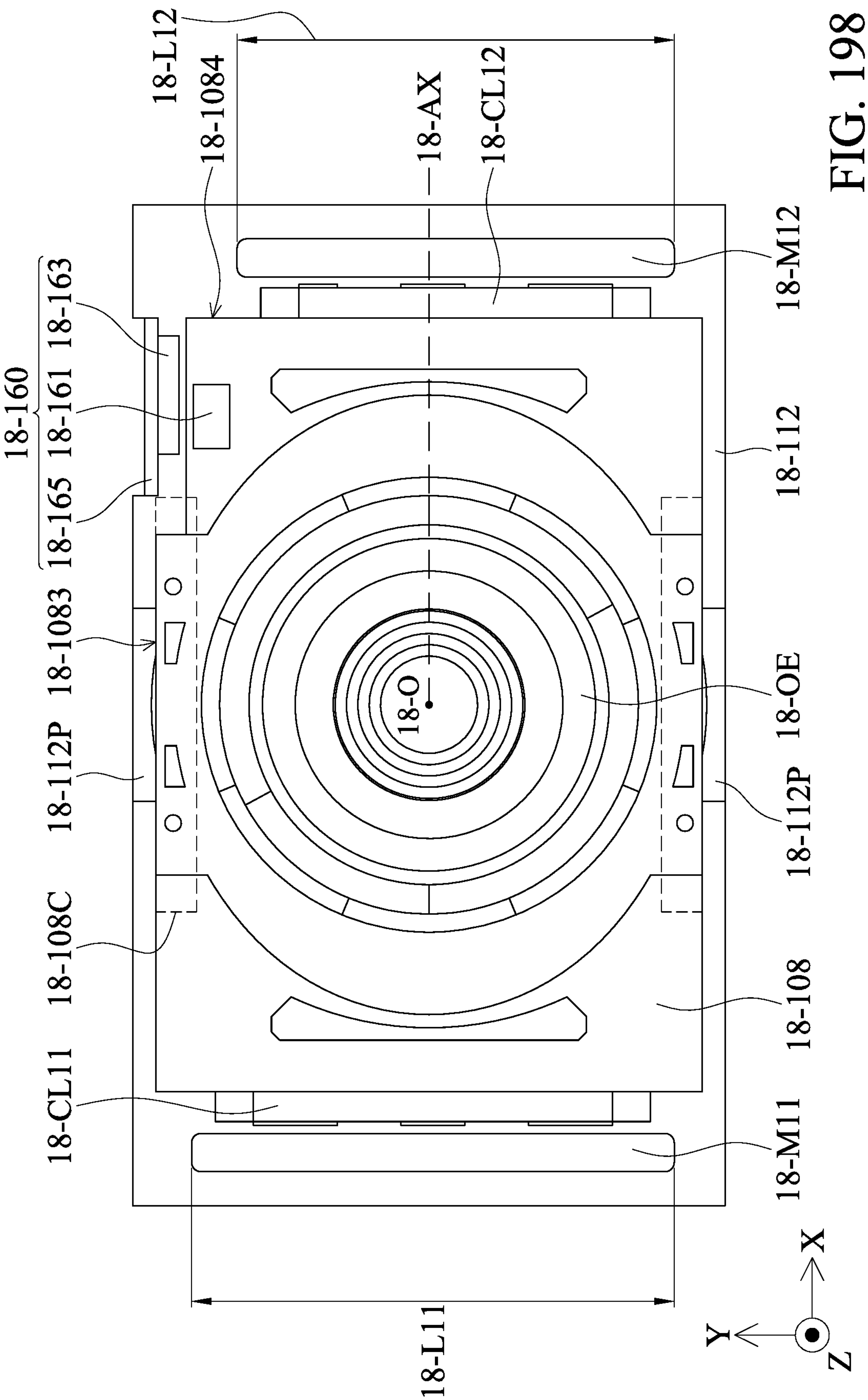

FIG. 198 is a top view of the optical element driving mechanism in FIG. 197 according to another embodiment of the present disclosure.

Figure 199:
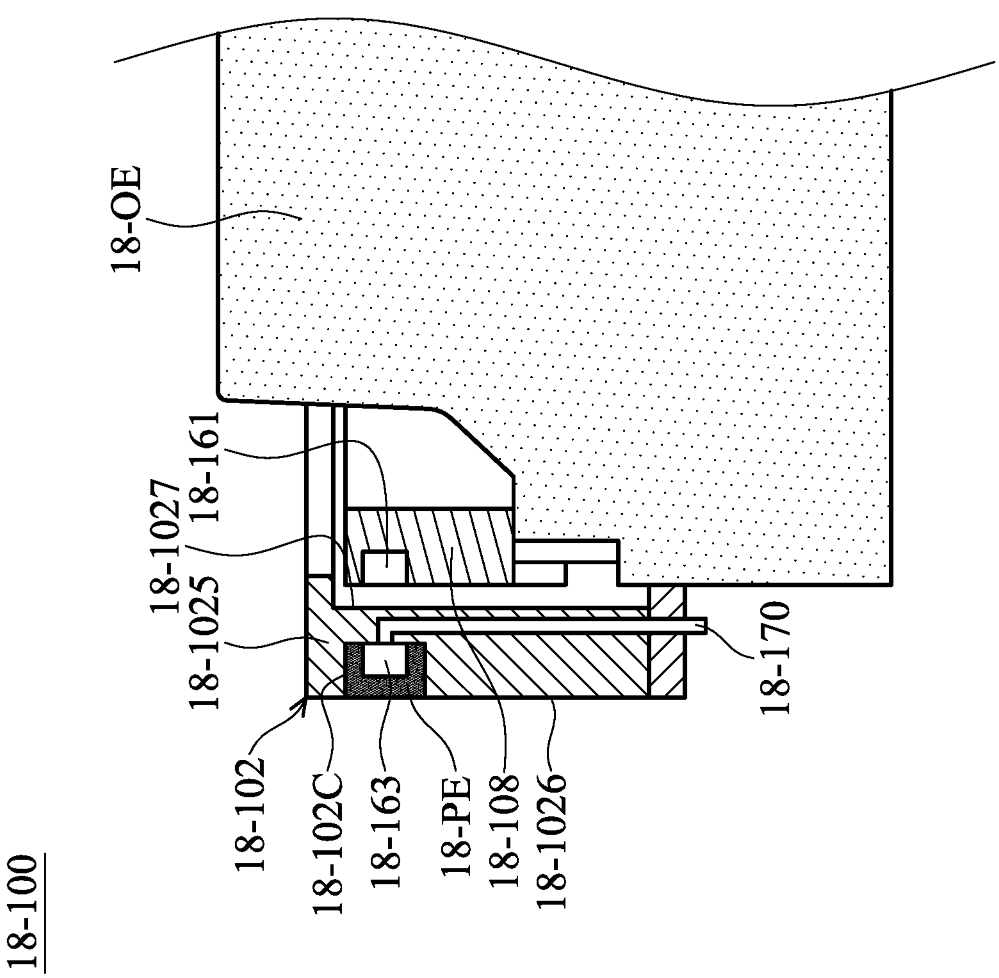

FIG. 199 is a cross-sectional view of the optical element driving mechanism according to another embodiment of the present disclosure.

Figure 200:
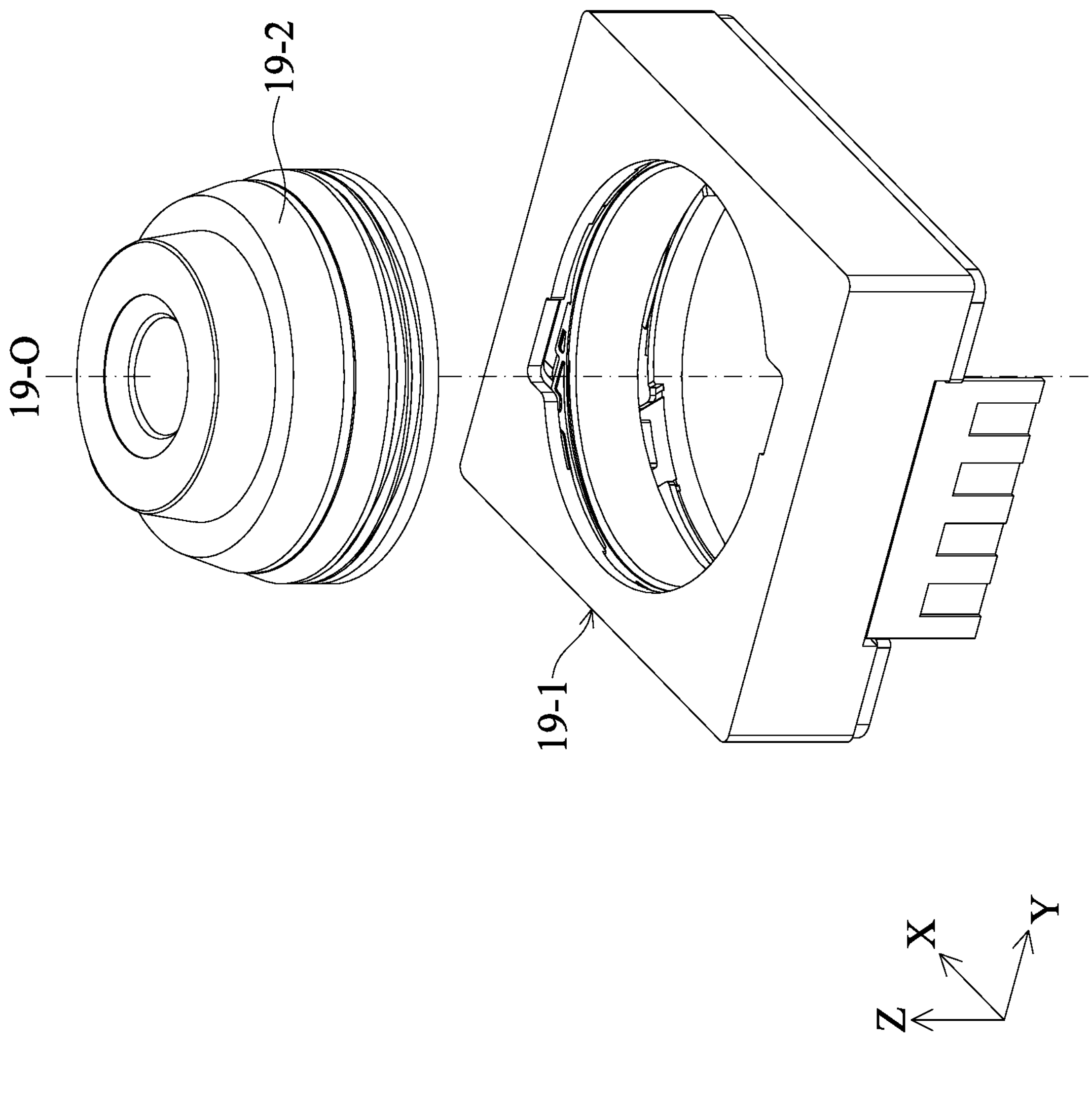

FIG. 200 is a perspective view of an optical element driving mechanism and an optical element in accordance with some embodiments of this disclosure.

Figure 201:
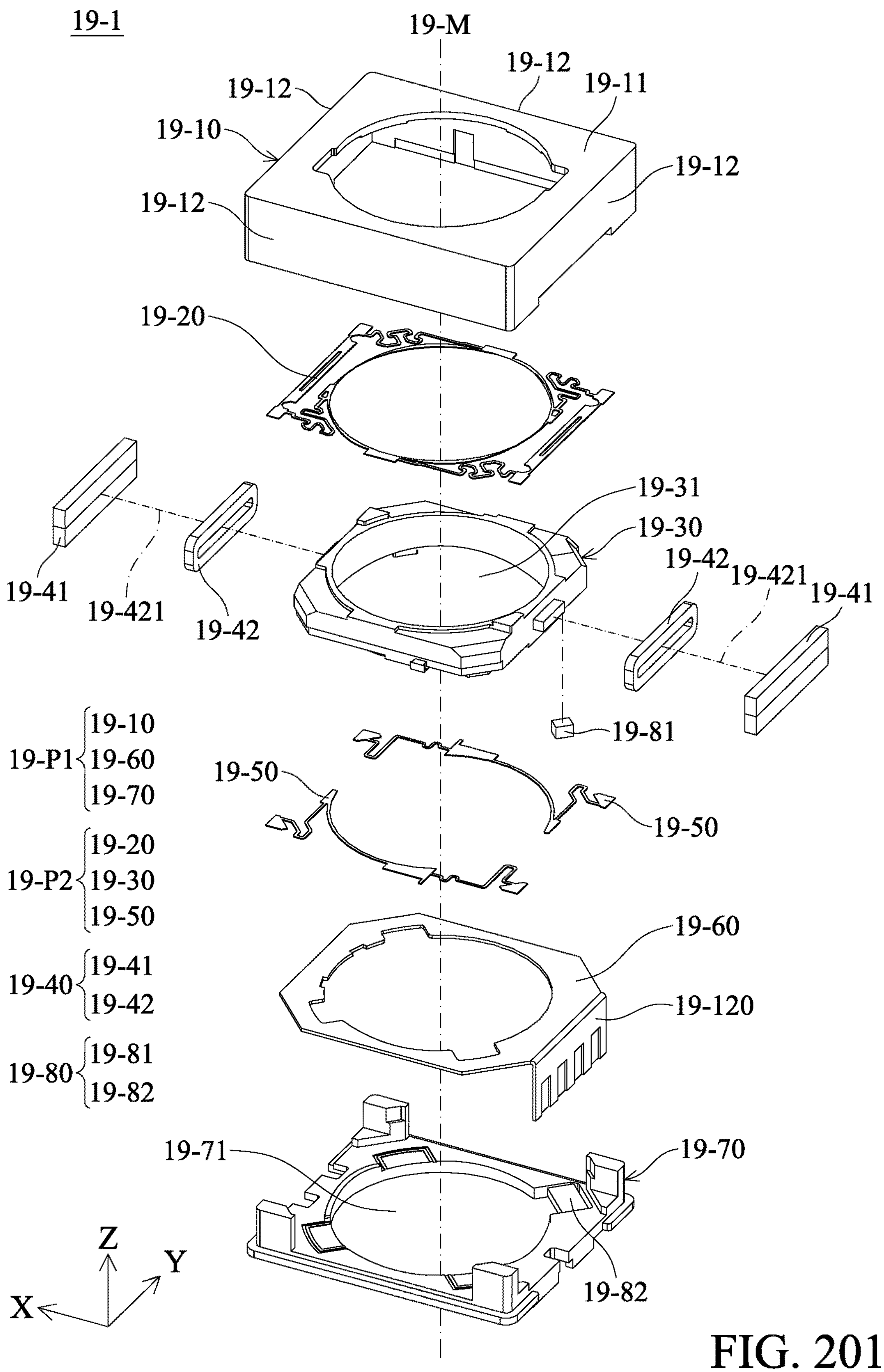

FIG. 201 is an exploded view of the optical element driving mechanism in FIG. 200.

Figure 202:
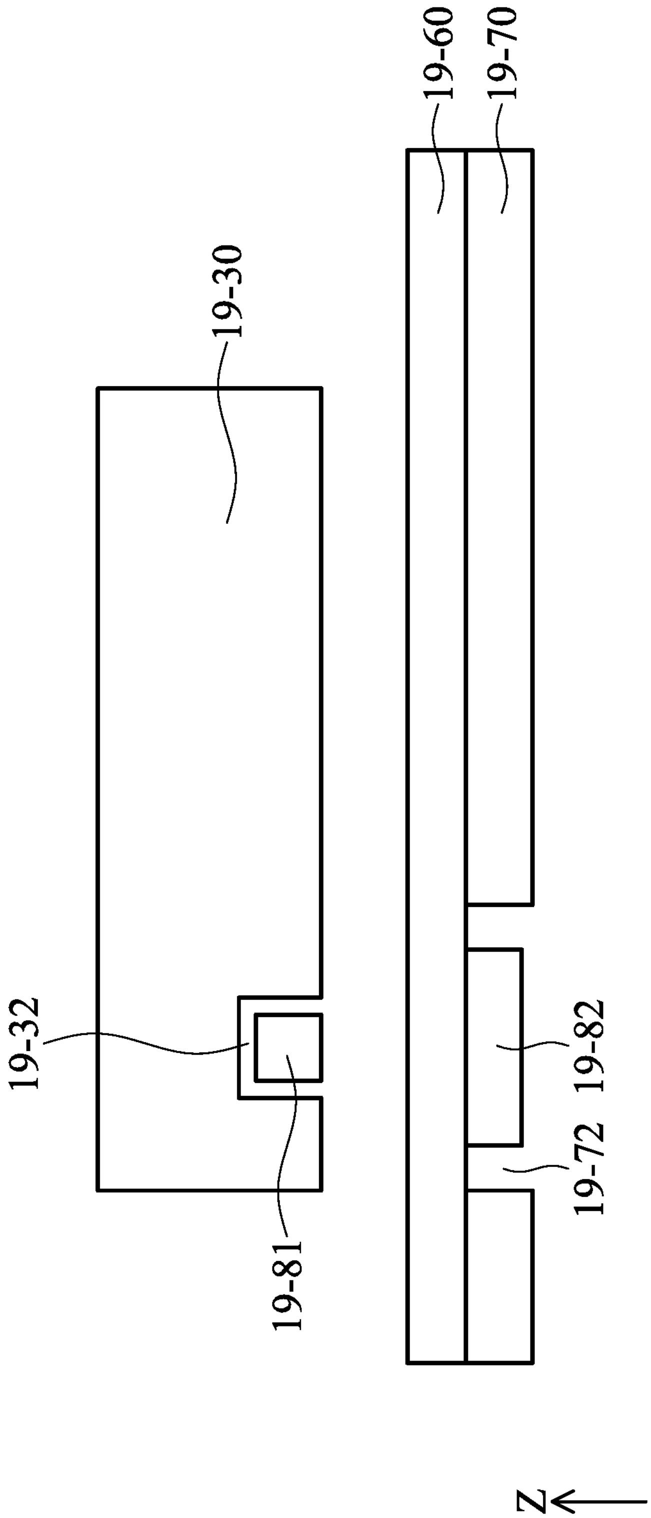

FIG. 202 is a schematic view of the optical element driving mechanism.

Figure 203:
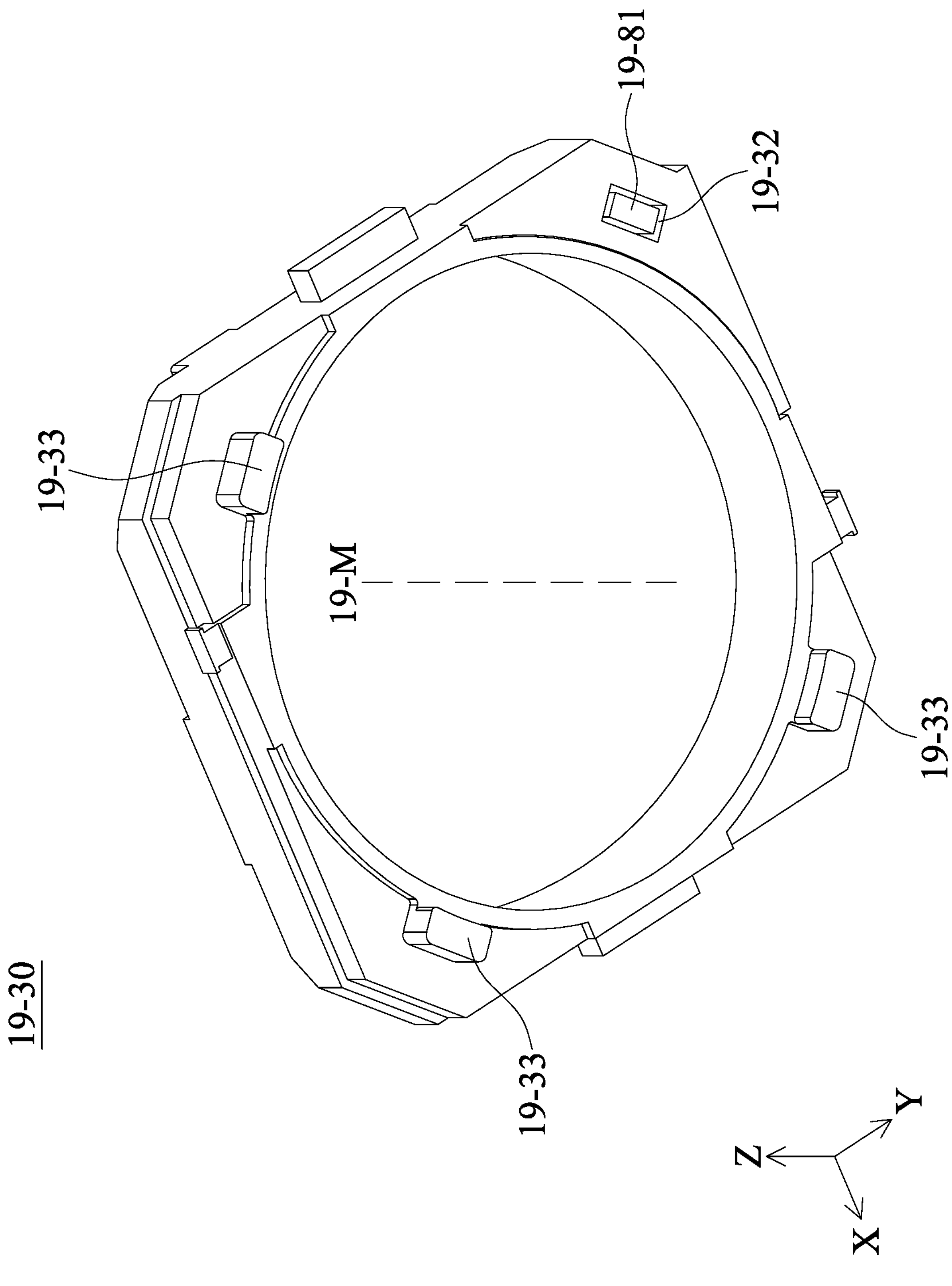

FIG. 203 is a perspective view of a holder.

Figure 204:
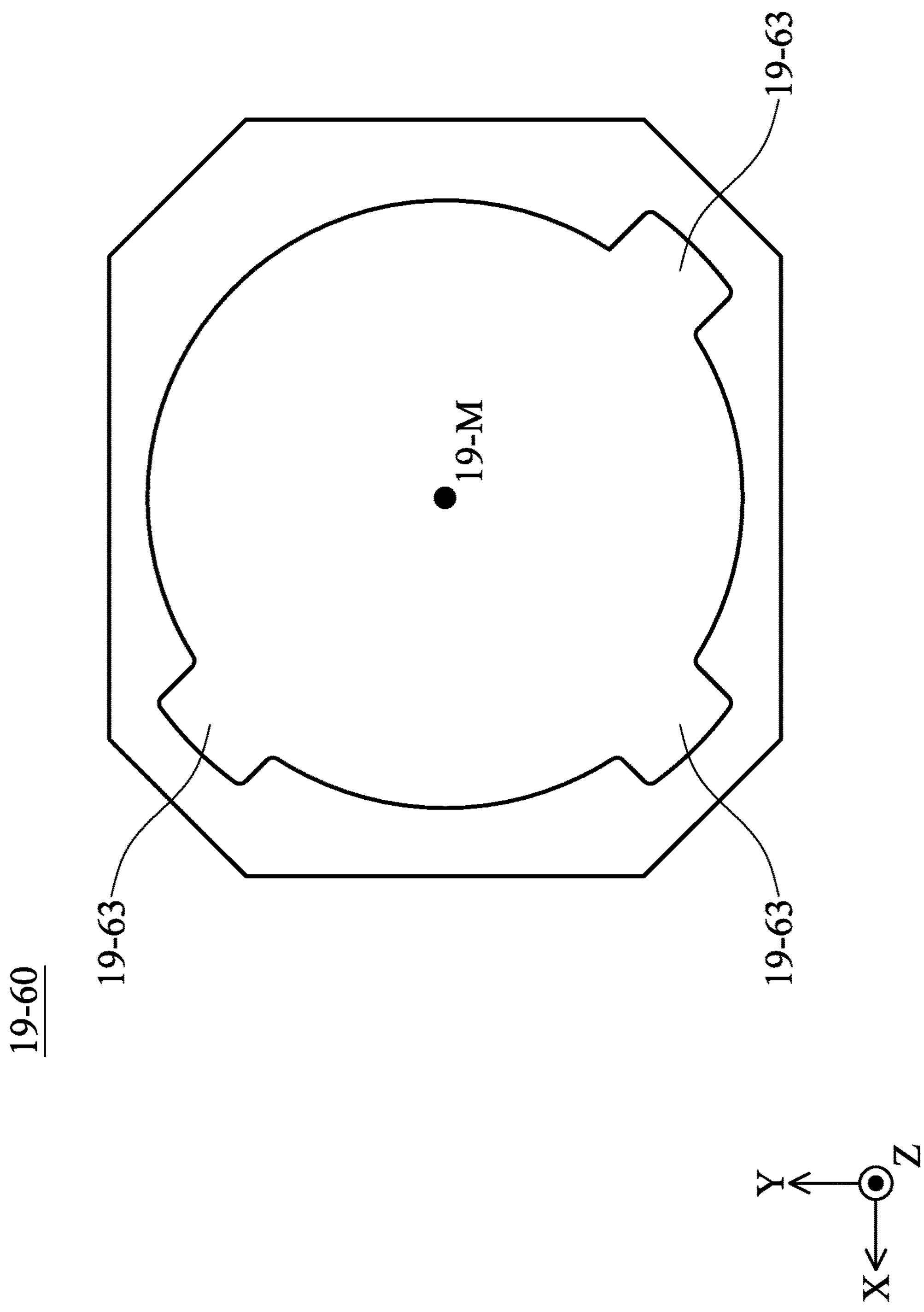

FIG. 204 is a top view of a circuit assembly.

Figure 205:
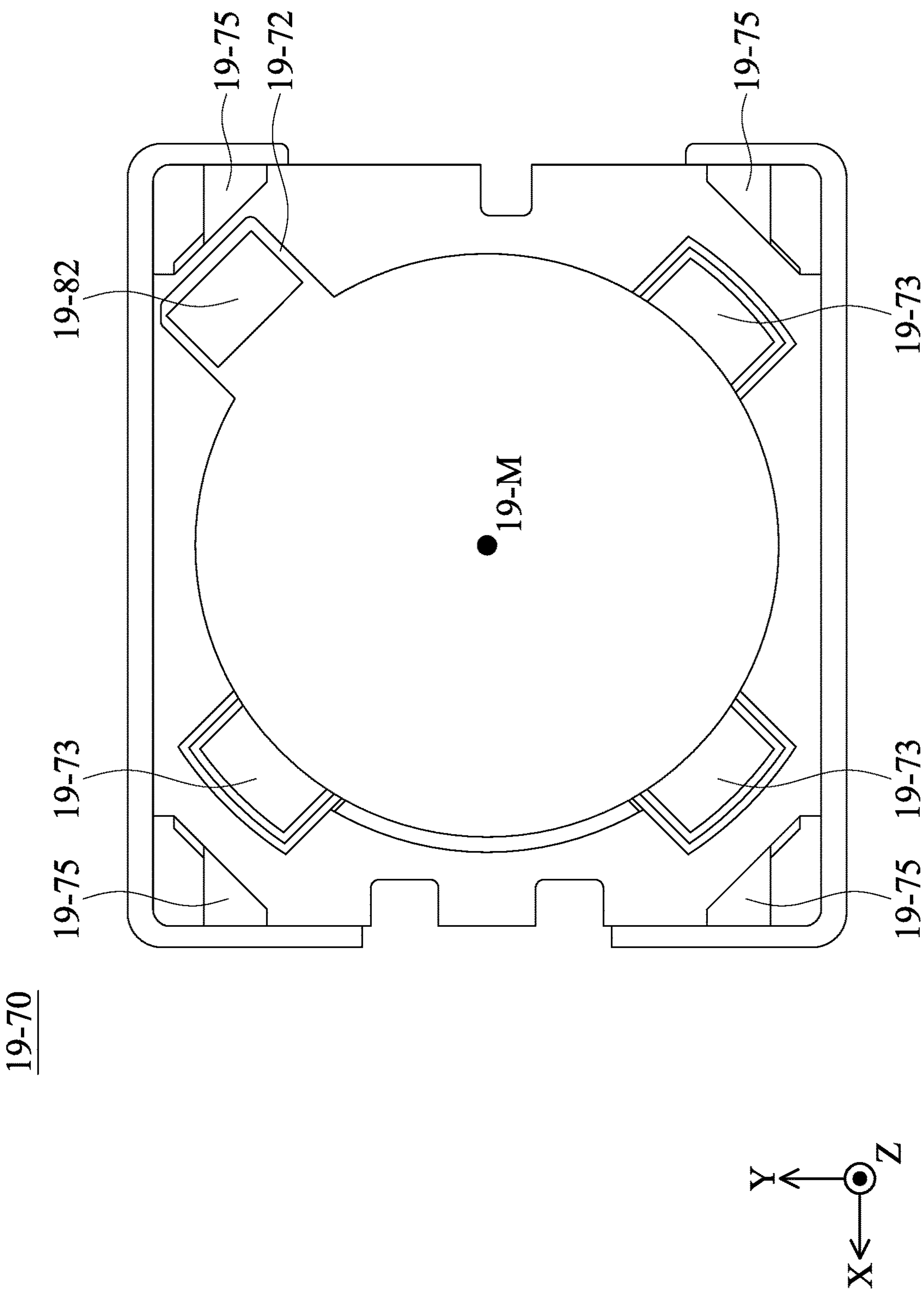

FIG. 205 is a top view of a bottom.

Figure 206:
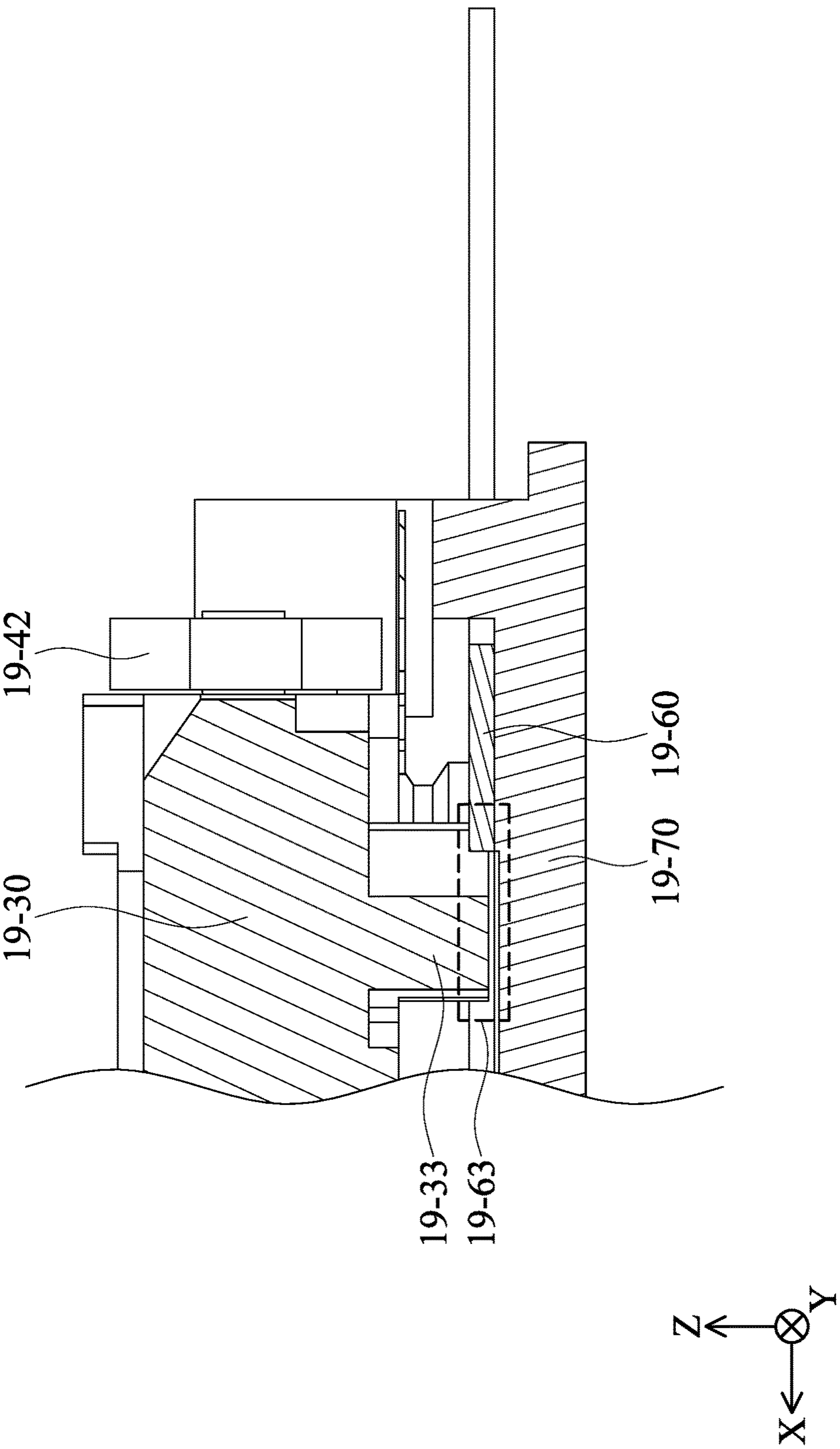

FIG. 206 is a cross-sectional view of a portion of the optical element driving mechanism.

Figure 207:
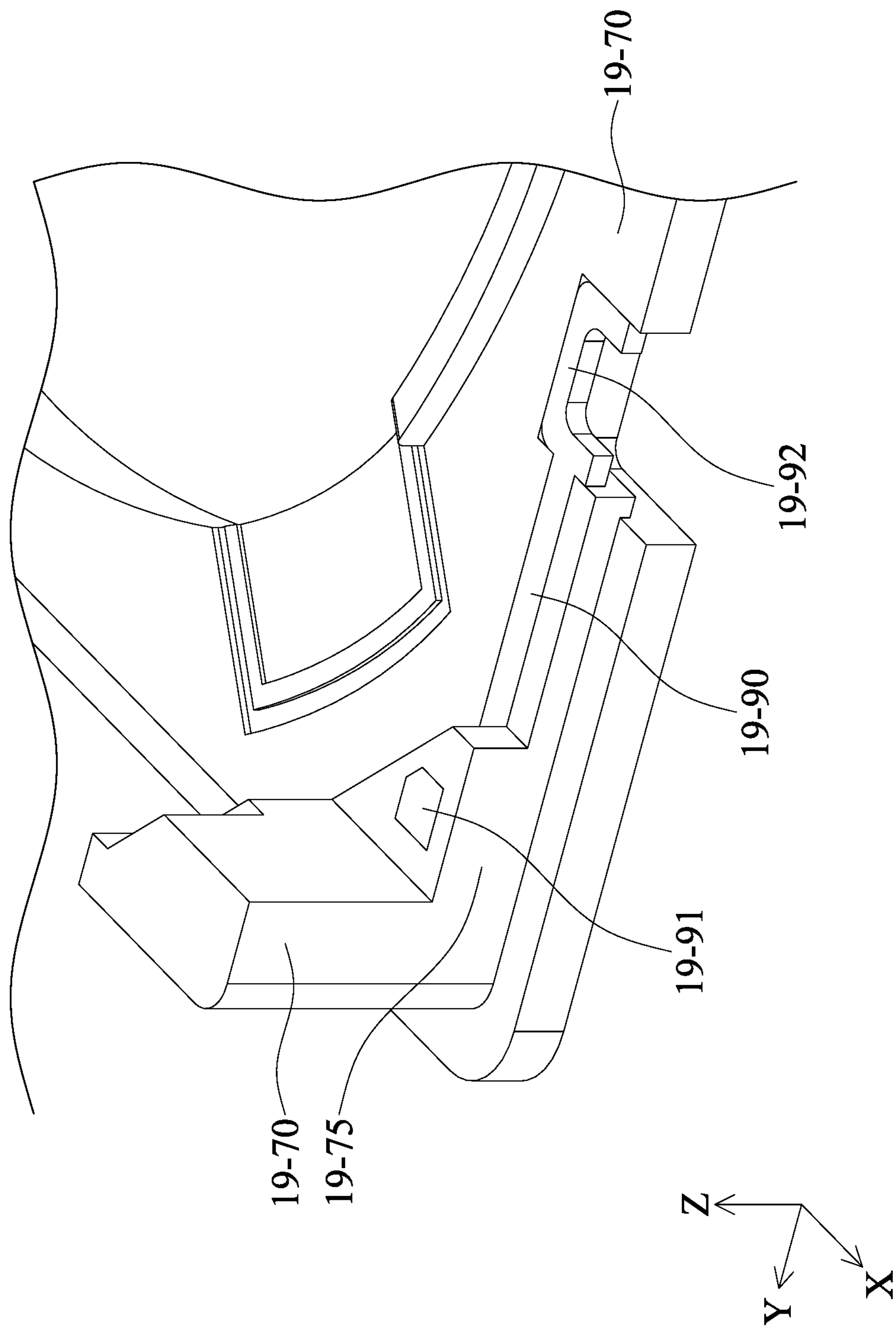

FIG. 207 is a perspective view of a portion of the bottom.

Figure 208:
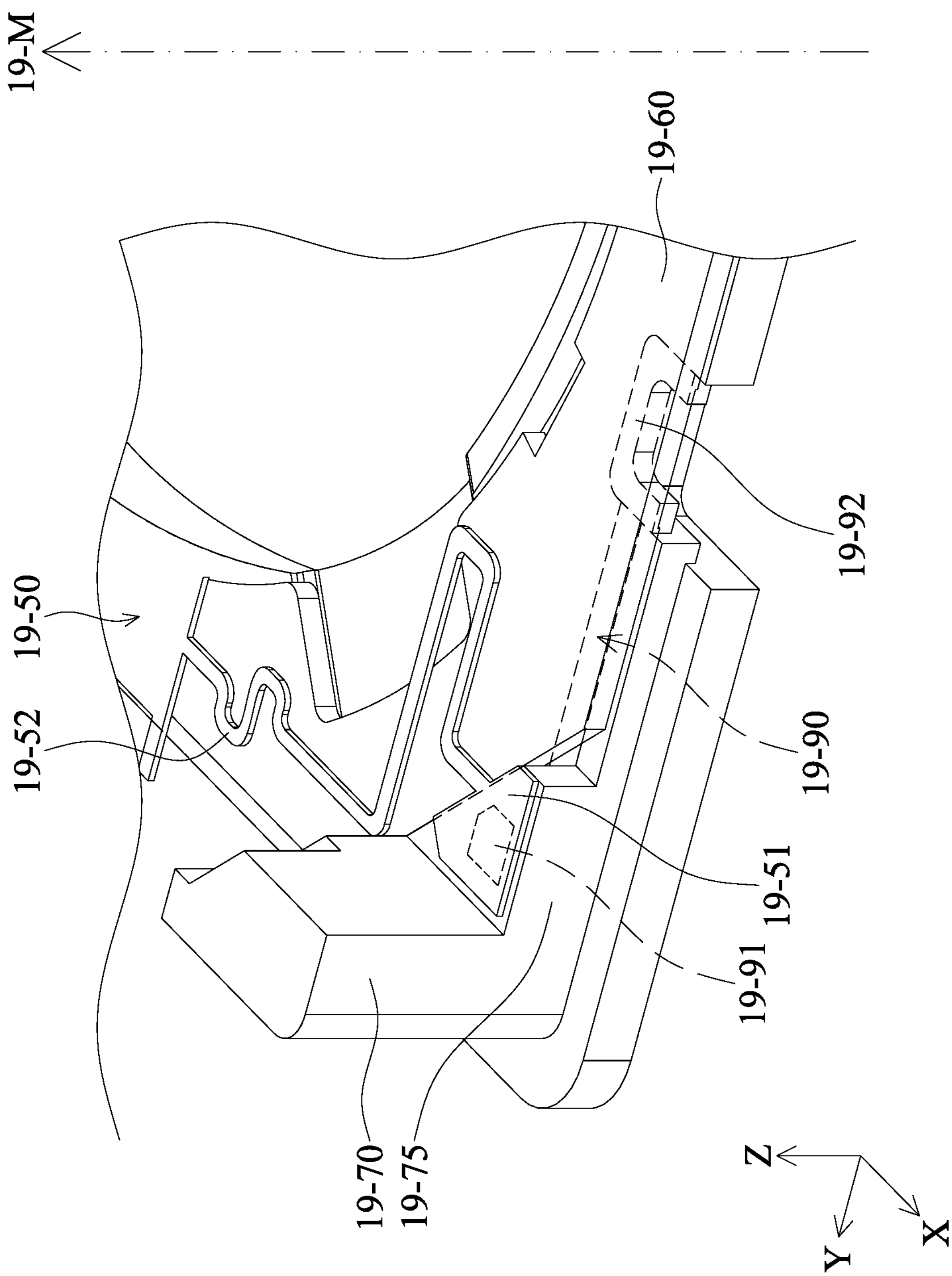

FIG. 208 is a perspective view of a portion of a second elastic element, the circuit assembly and the bottom.

Figure 209:
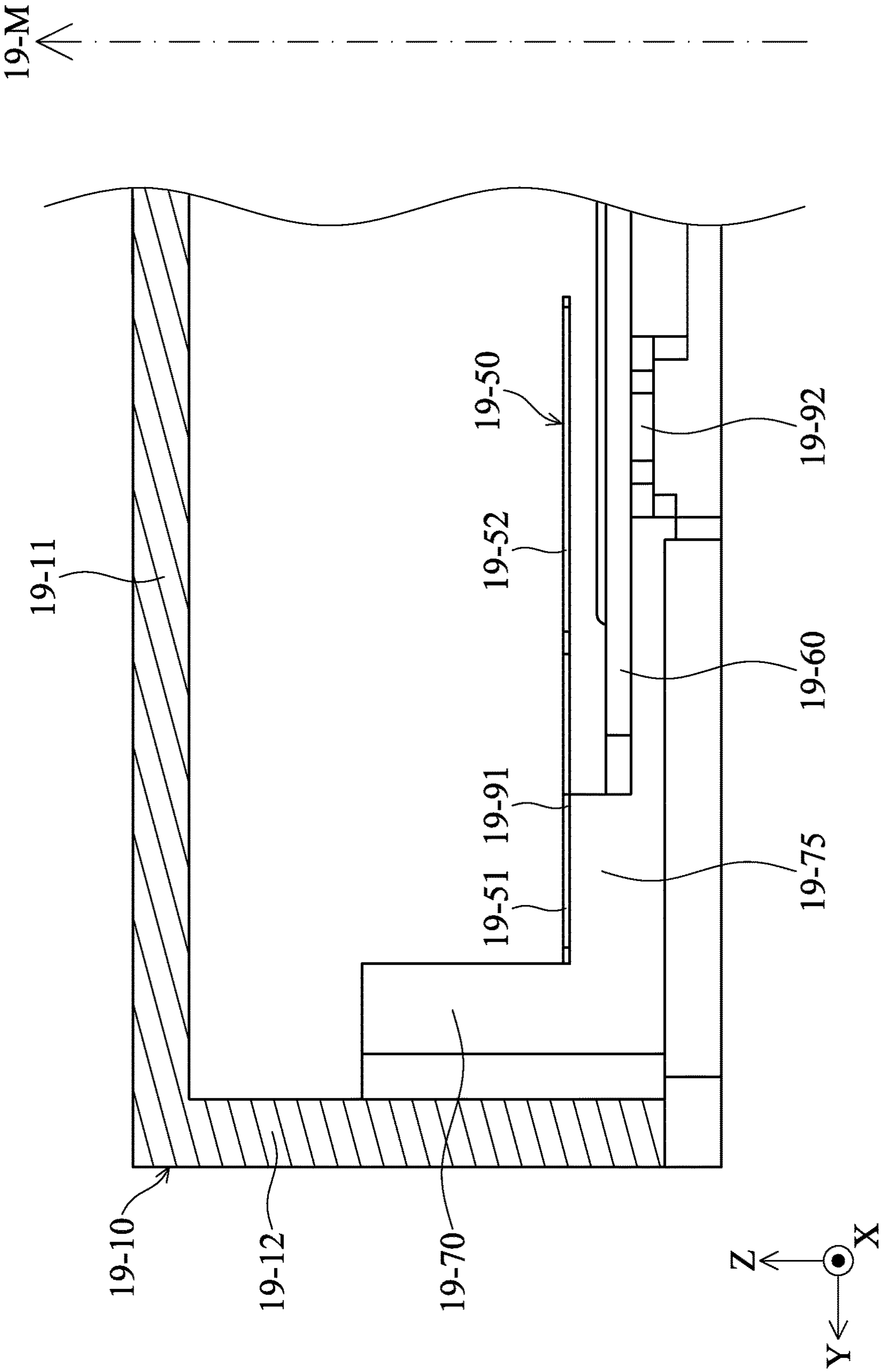

FIG. 209 is a schematic view of a portion of the optical element driving mechanism.

Figure 210:
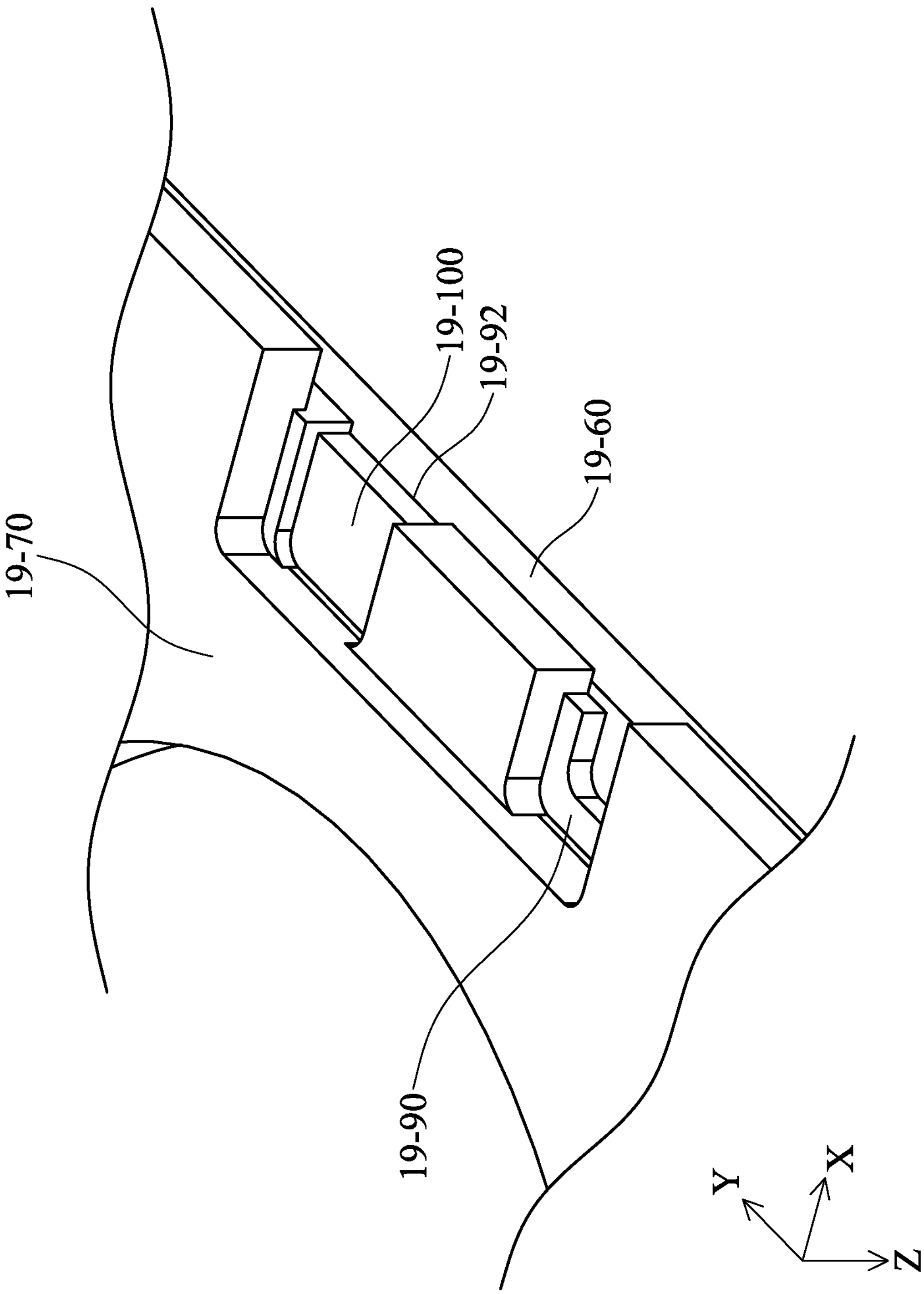
Figure 211:
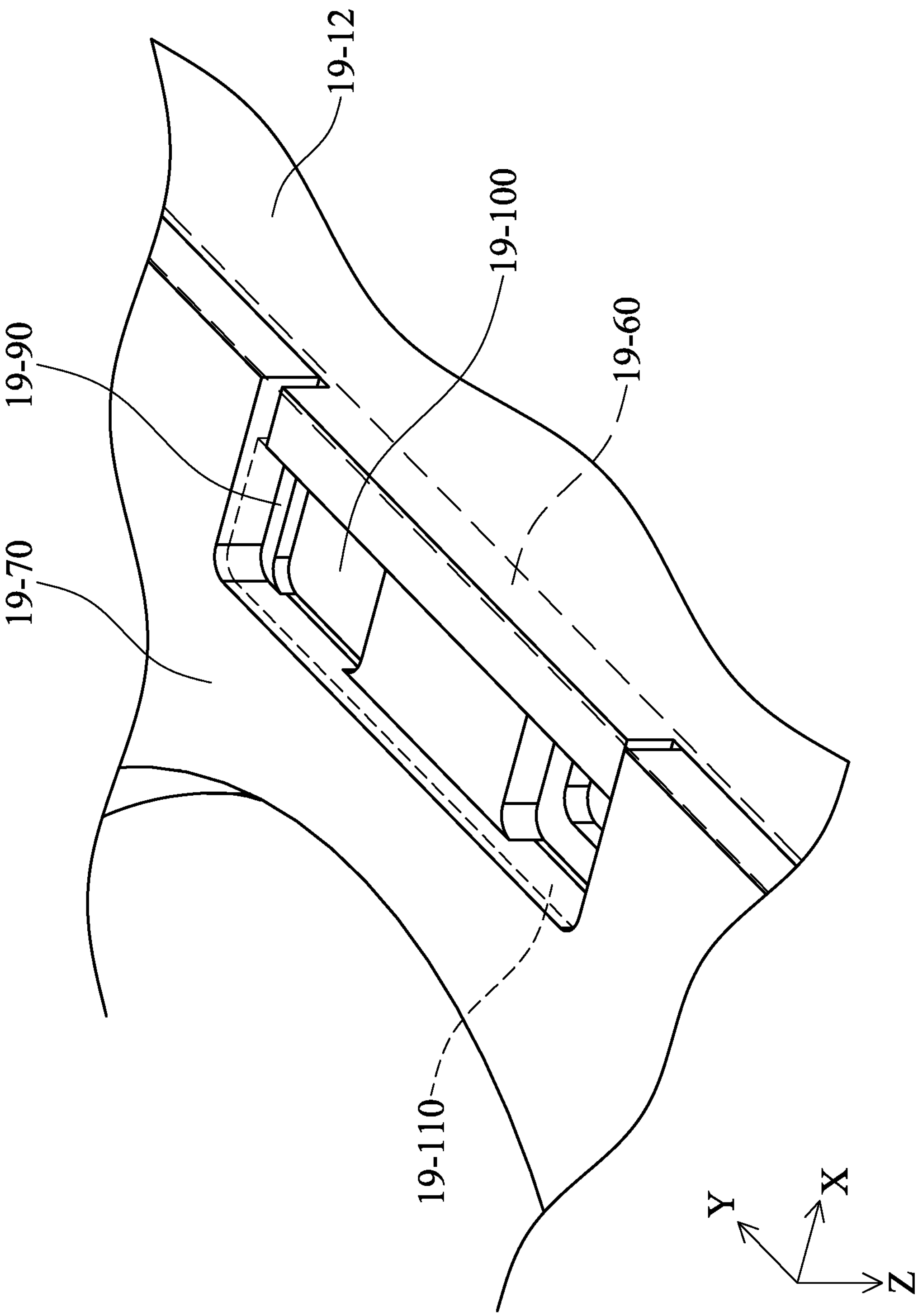

FIG. 210 and FIG. 211 are perspective views of a portion of the optical element driving mechanism.

Figure 212:
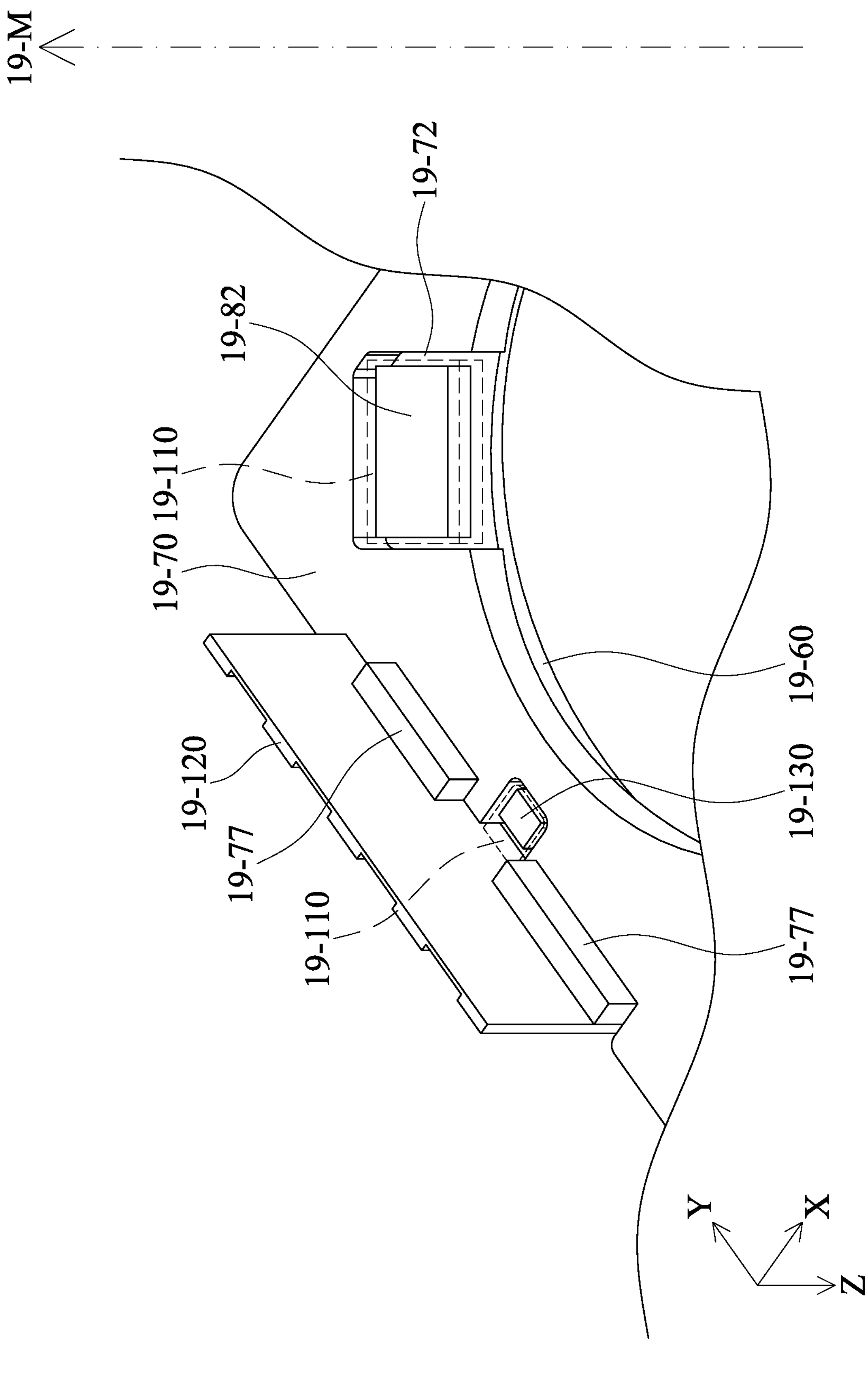

FIG. 212 is a schematic view of an outside-connection circuit member and an electronic element.

Figure 213:
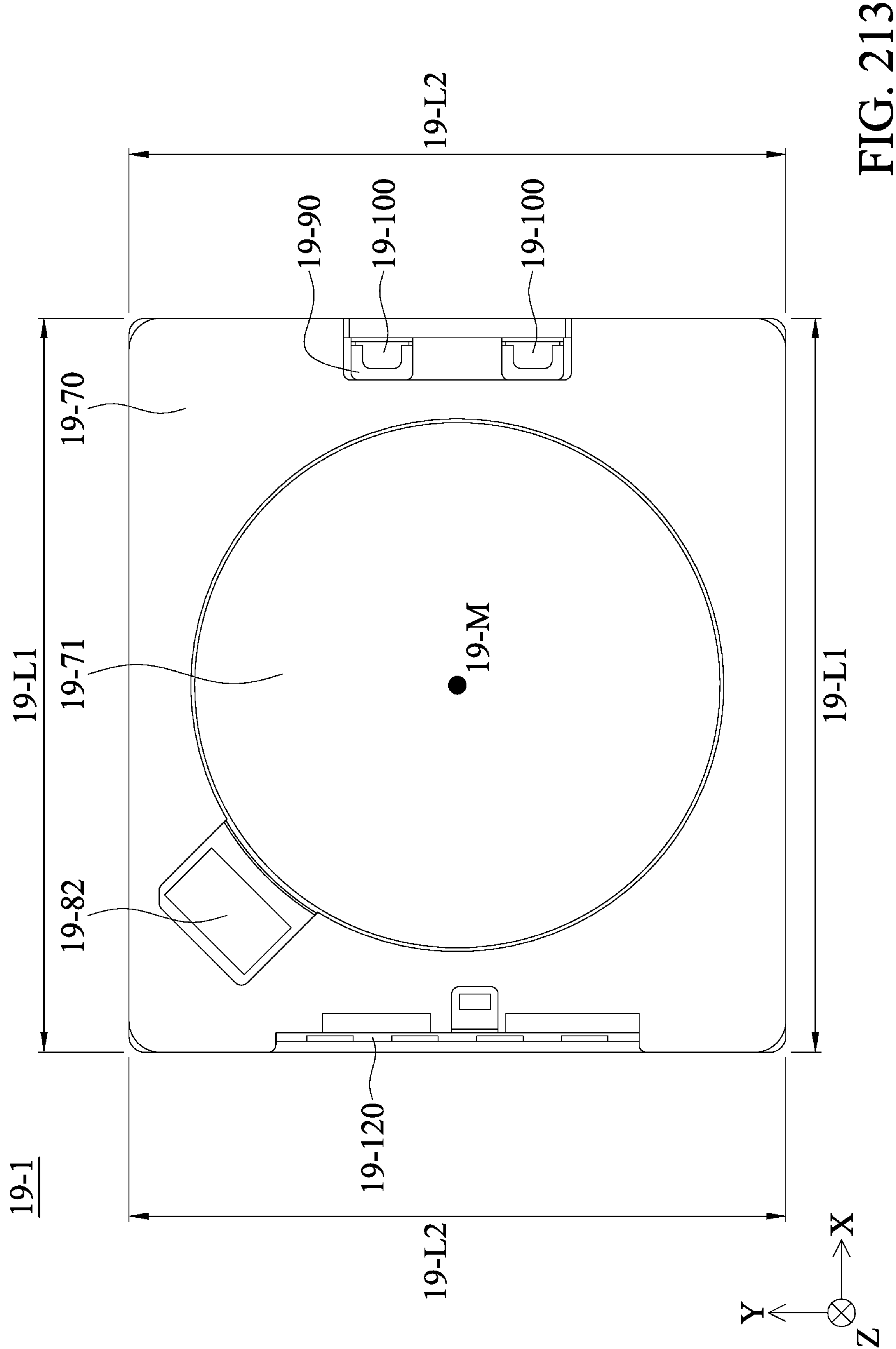

FIG. 213 is a bottom view of the optical element driving mechanism.

Figure 214:
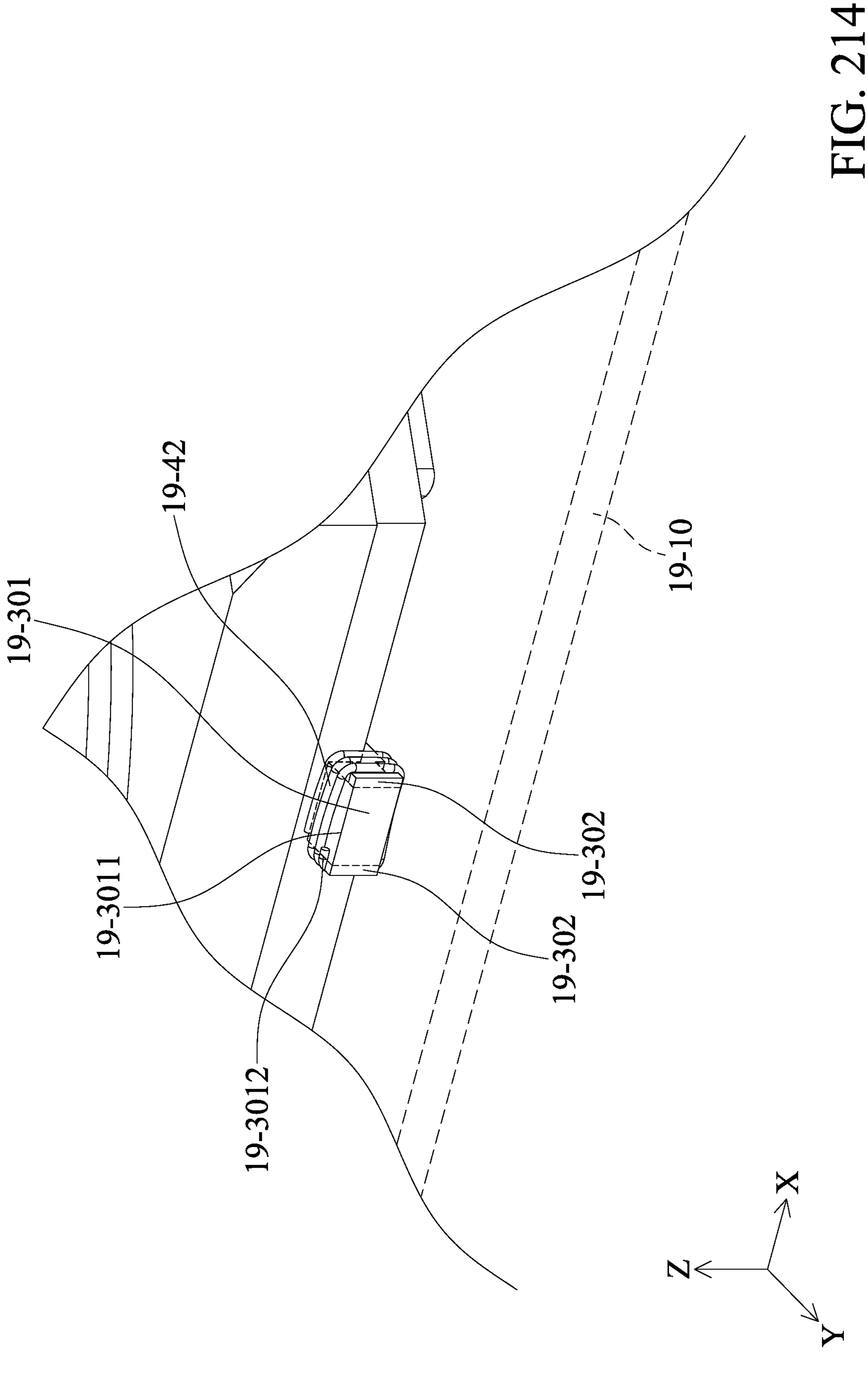

FIG. 214 is a perspective view of a portion of the holder.

Figure 215:
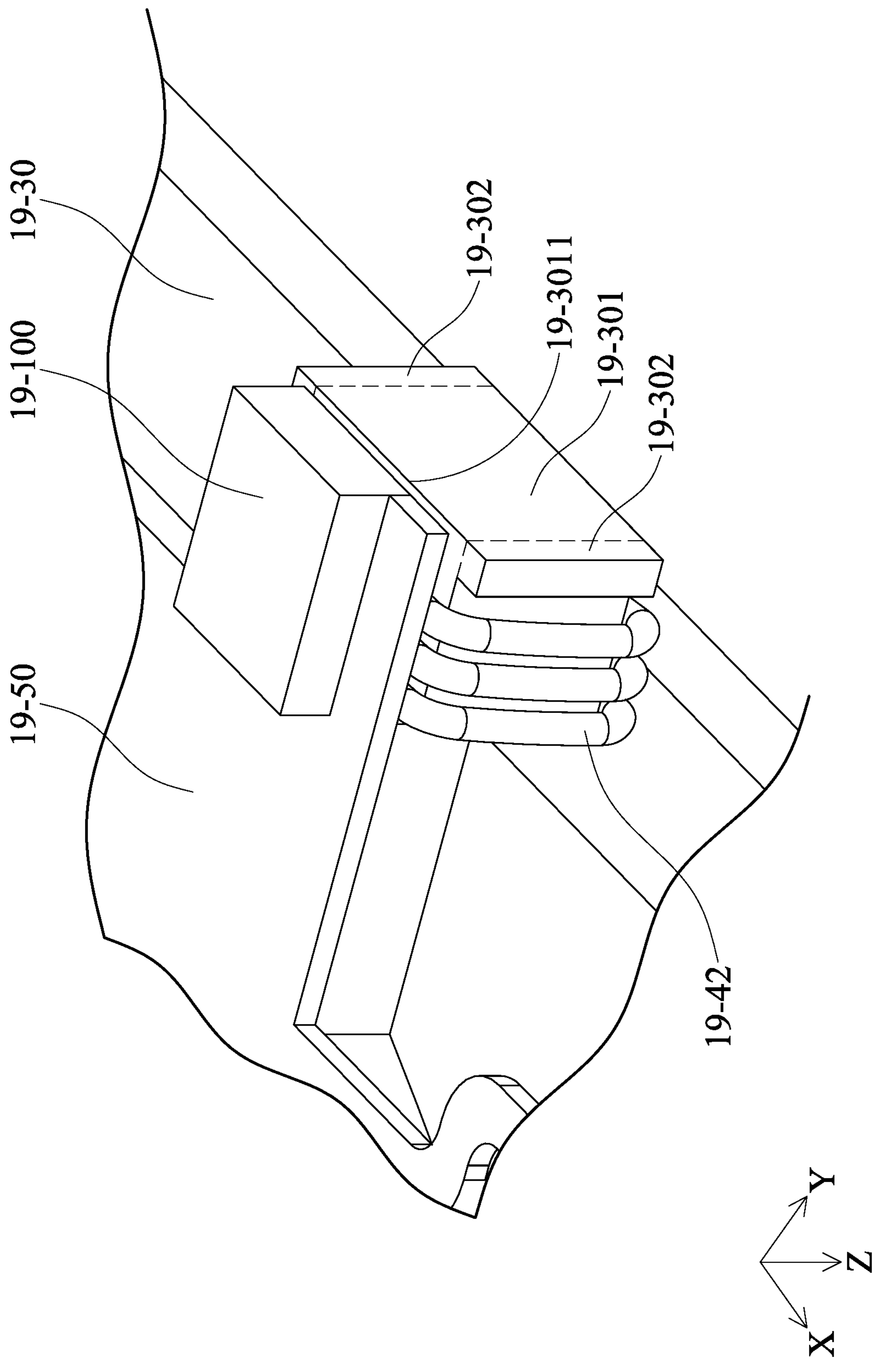

FIG. 215 is a perspective view of a portion of the holder and the second elastic element.

Figure 216:
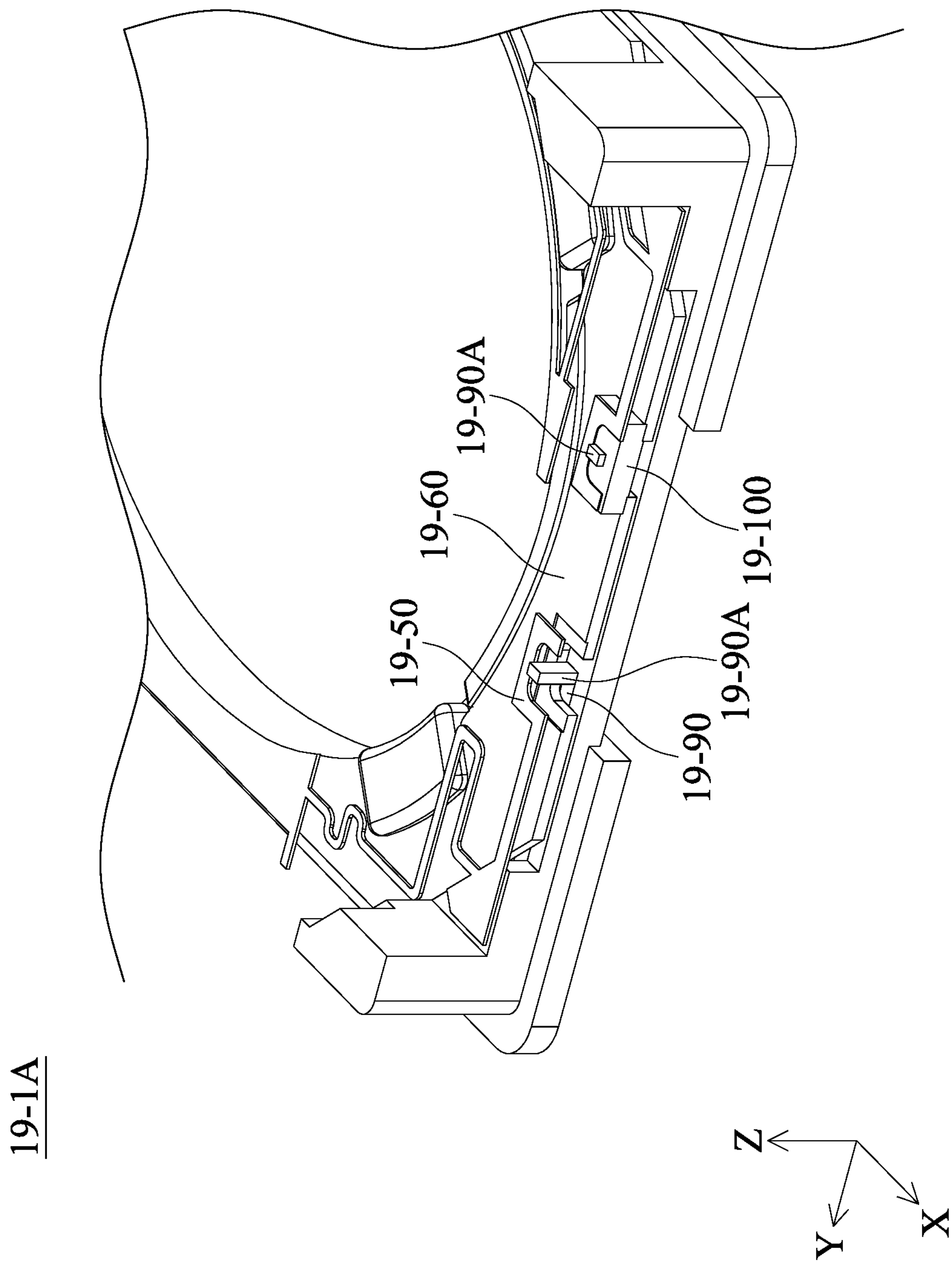

FIG. 216 is perspective view of an optical element driving mechanism in accordance with some other embodiments of this disclosure.

Figure 217:
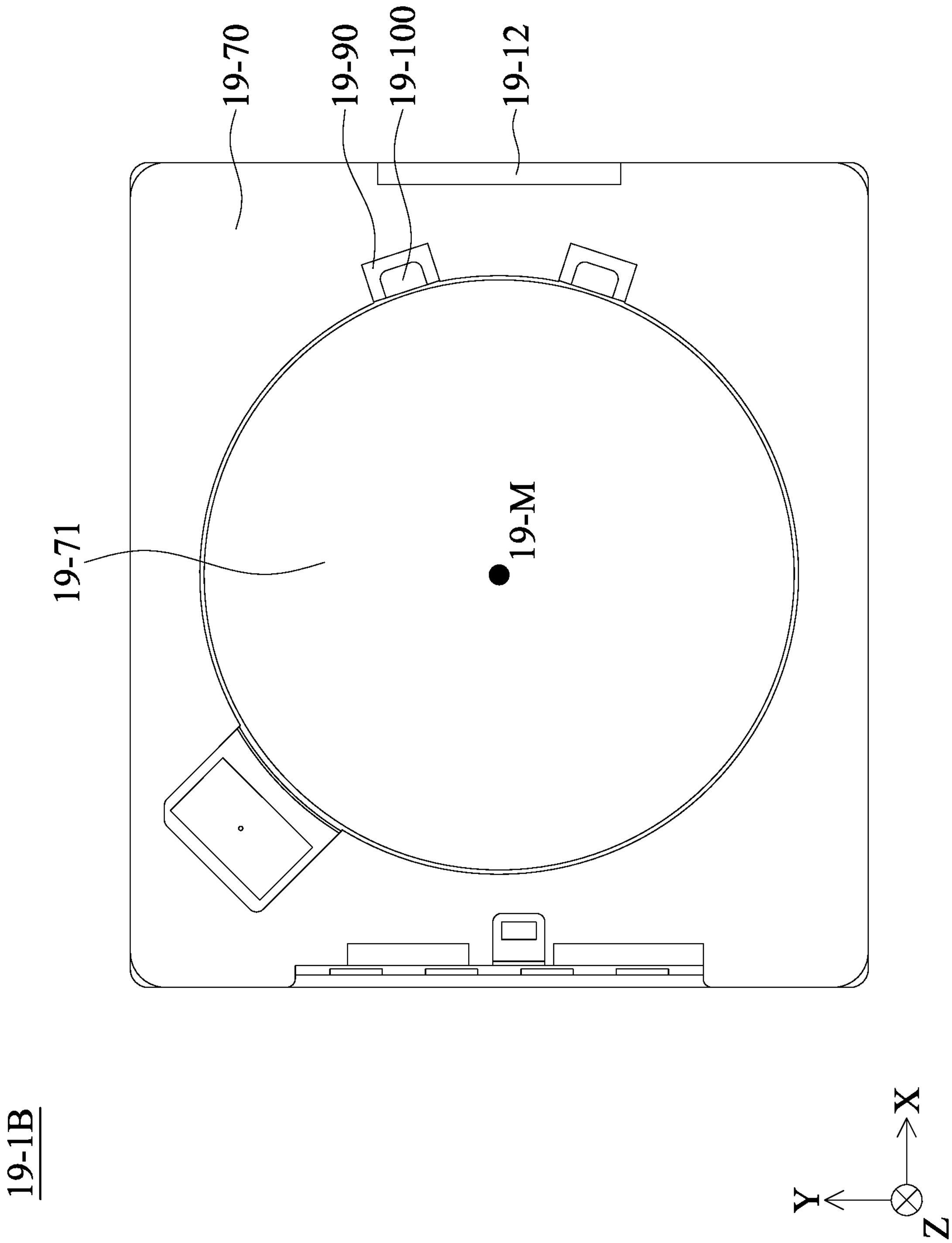

FIG. 217 is a bottom view of an optical element driving mechanism in accordance with some other embodiments of this disclosure.

Figure 218:
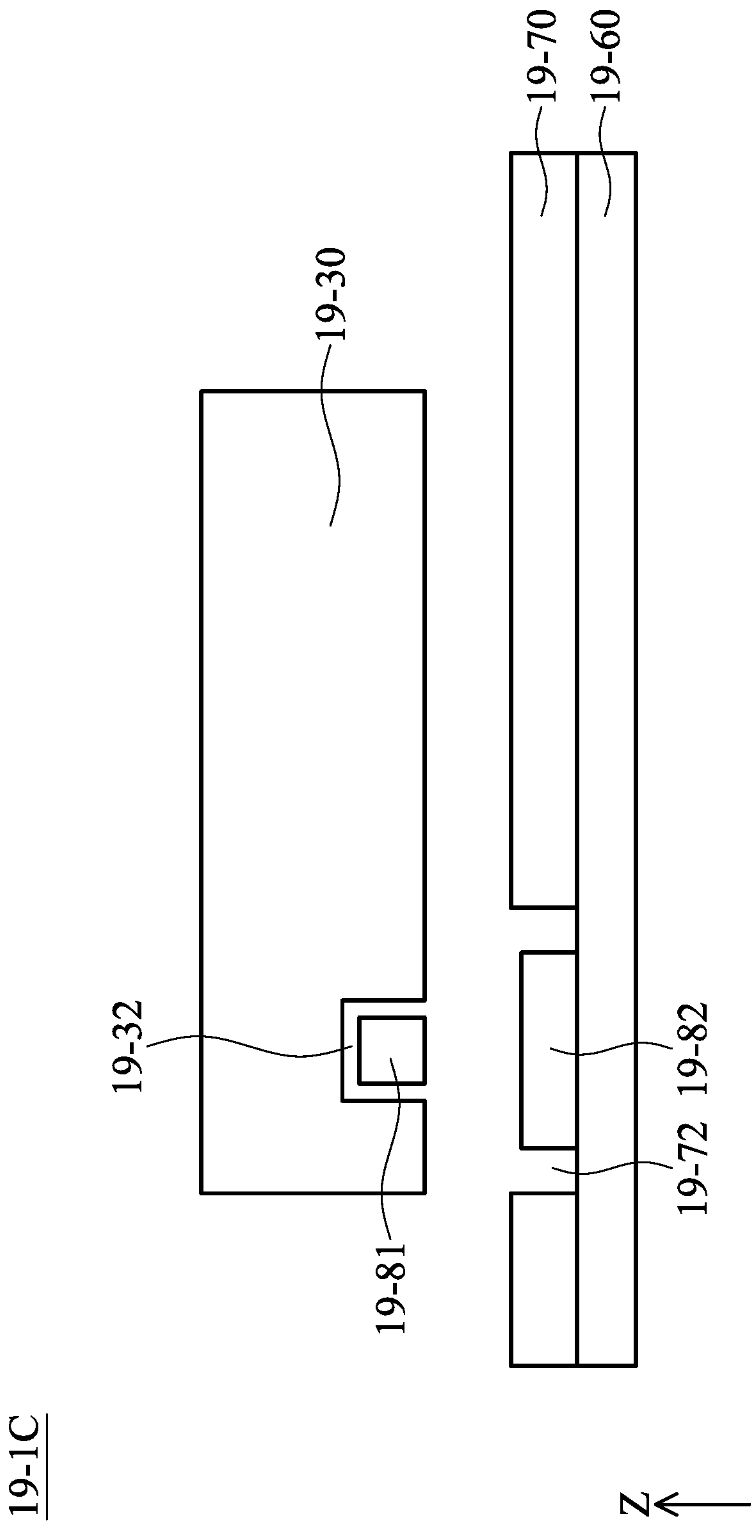

FIG. 218 is a schematic view of an optical element driving mechanism in accordance with some other embodiments of this disclosure.

Figure 219:
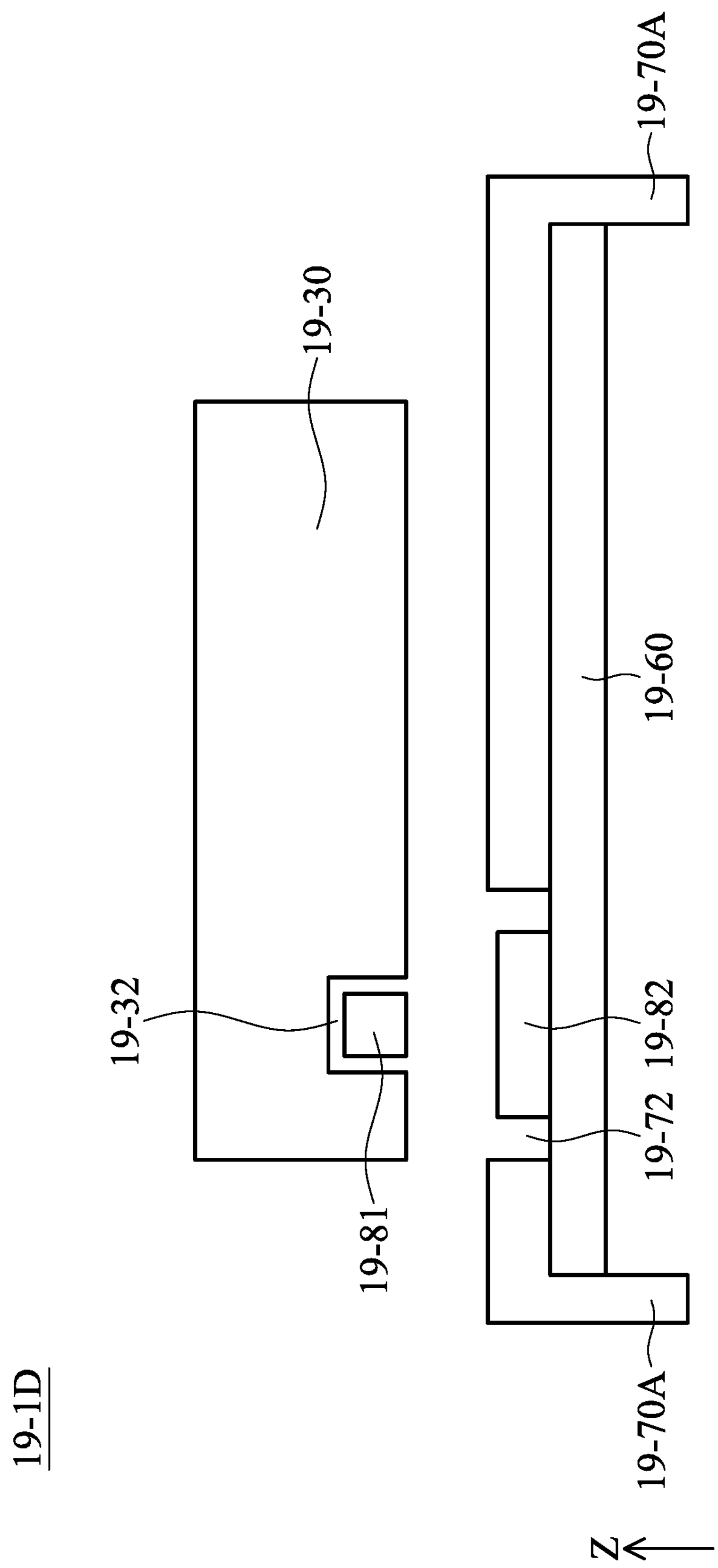

FIG. 219 is a schematic view of an optical element driving mechanism in accordance with some other embodiments of this disclosure.

Figure 220:
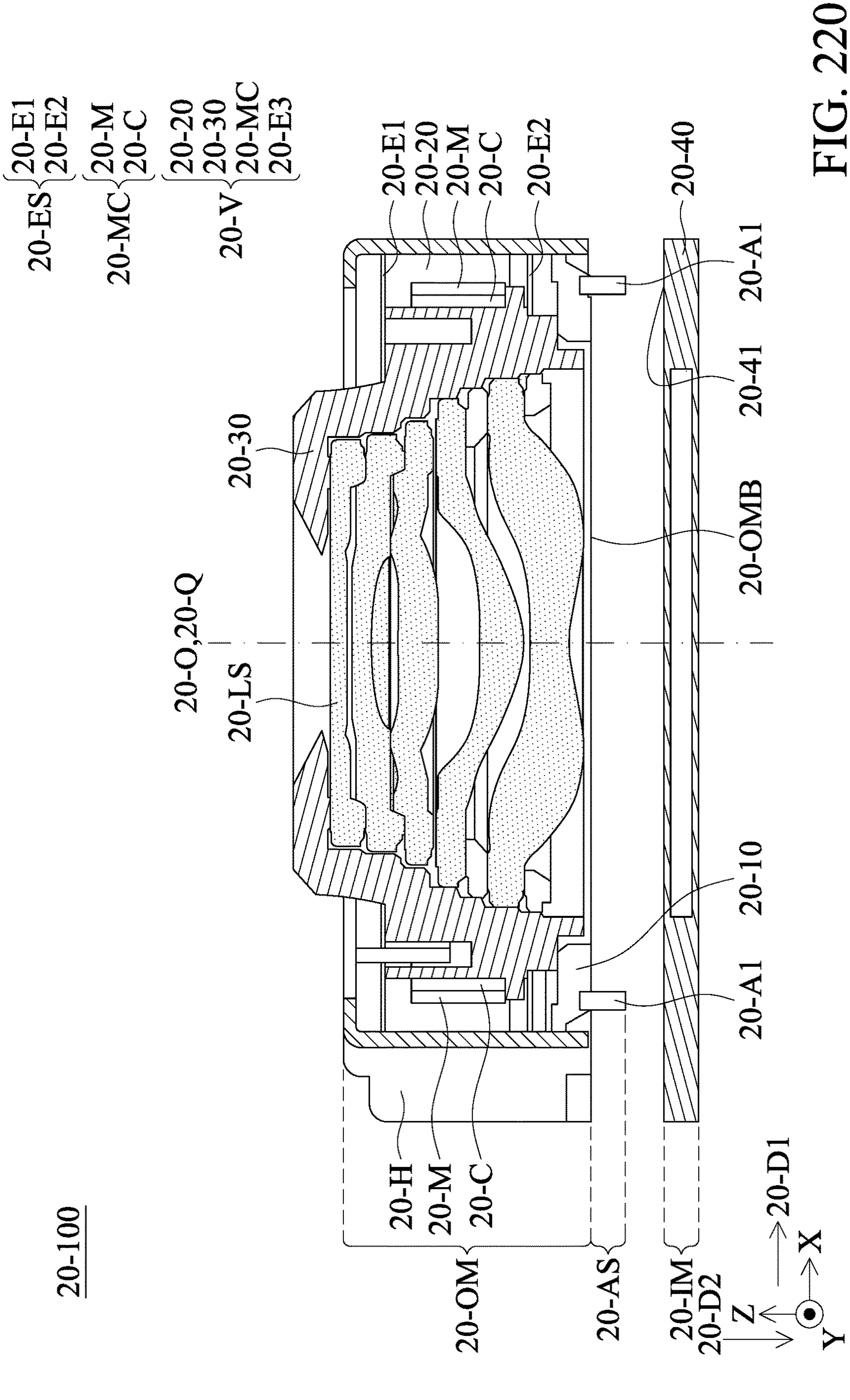

FIG. 220 is a schematic sectional view of the optical module, the adjustment assembly, and the image sensor module of the camera module optical system according to an embodiment of the present invention.

Figure 221:
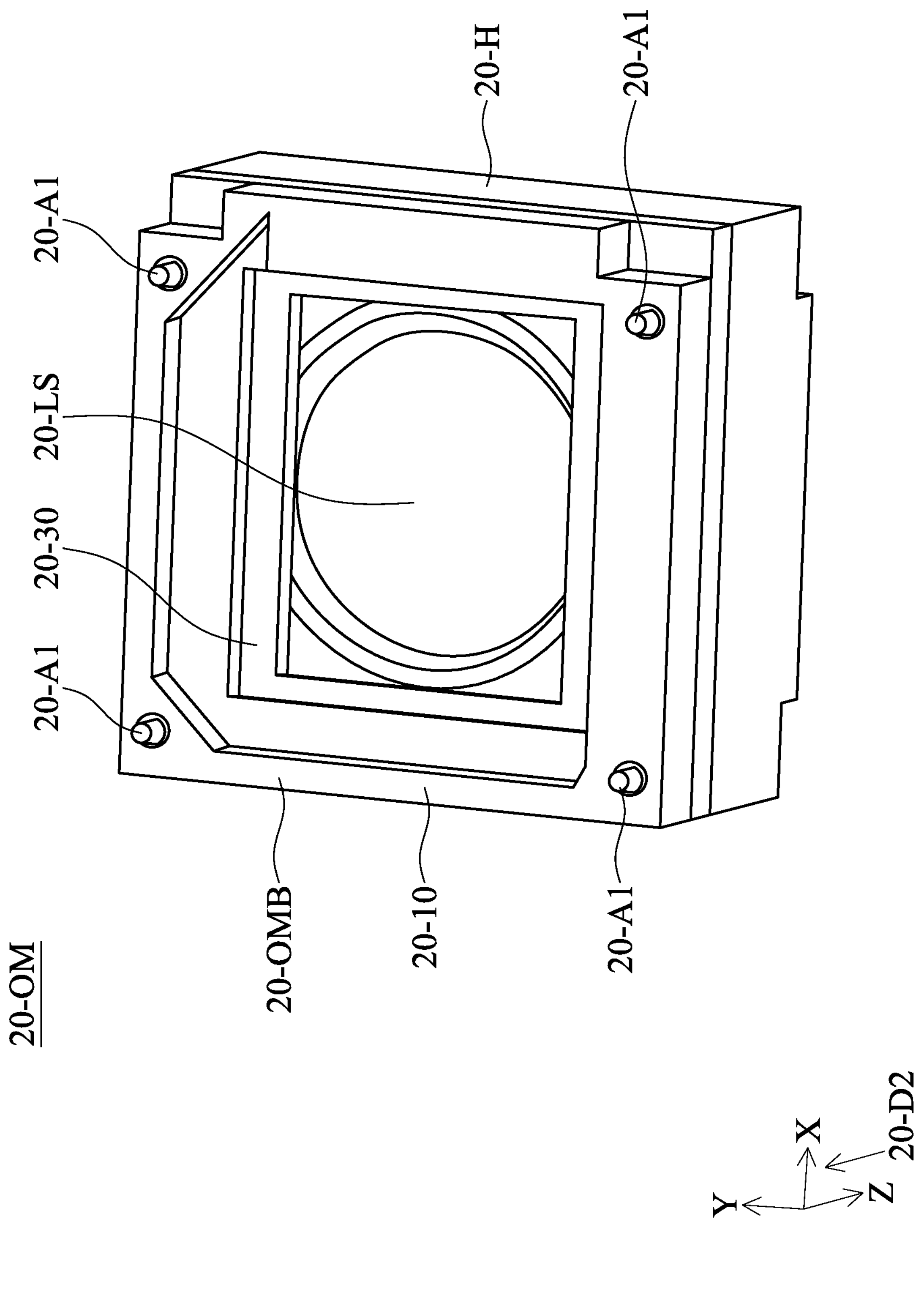

FIG. 221 is a perspective bottom view of the optical module in FIG. 220.

Figure 222:
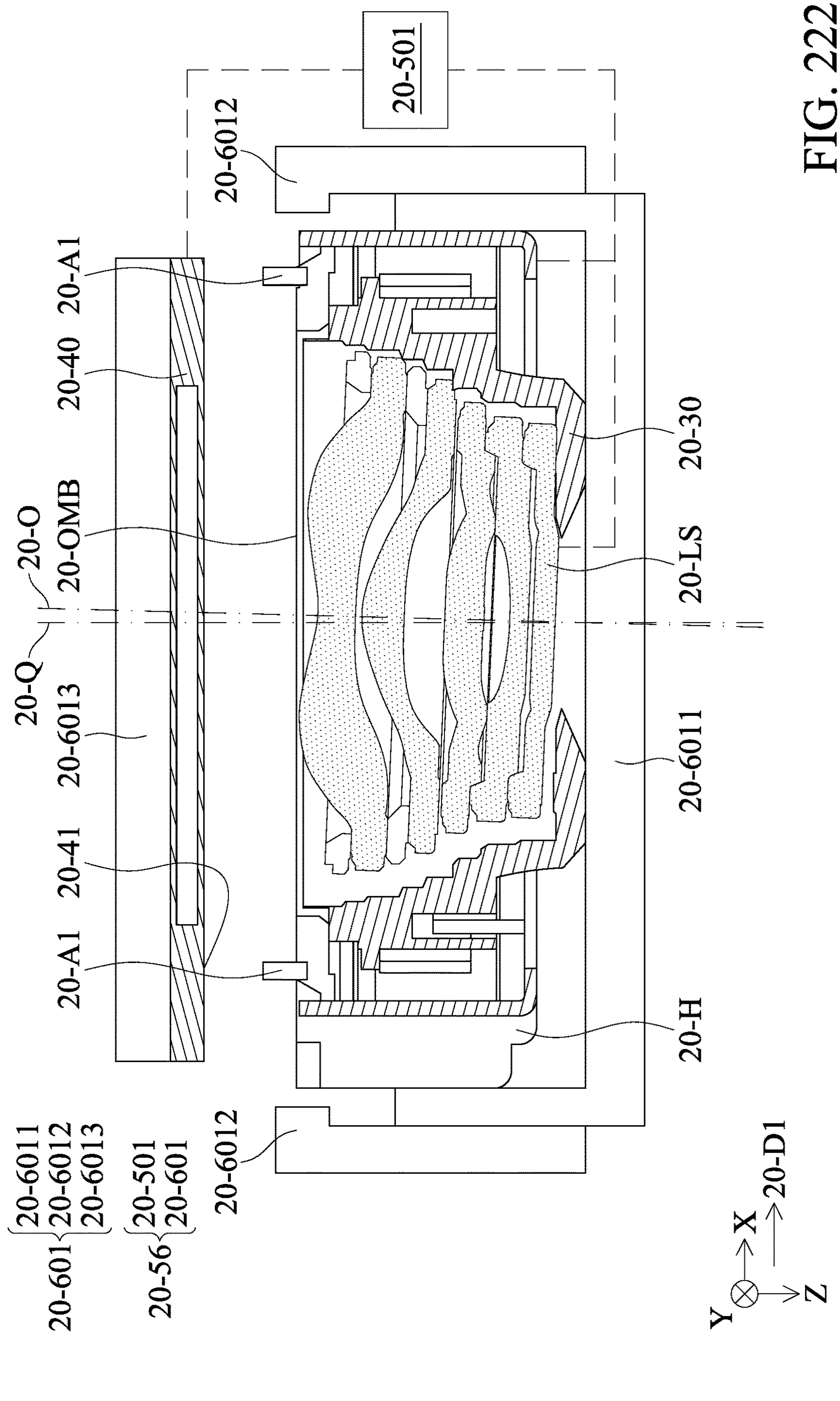
Figure 223:
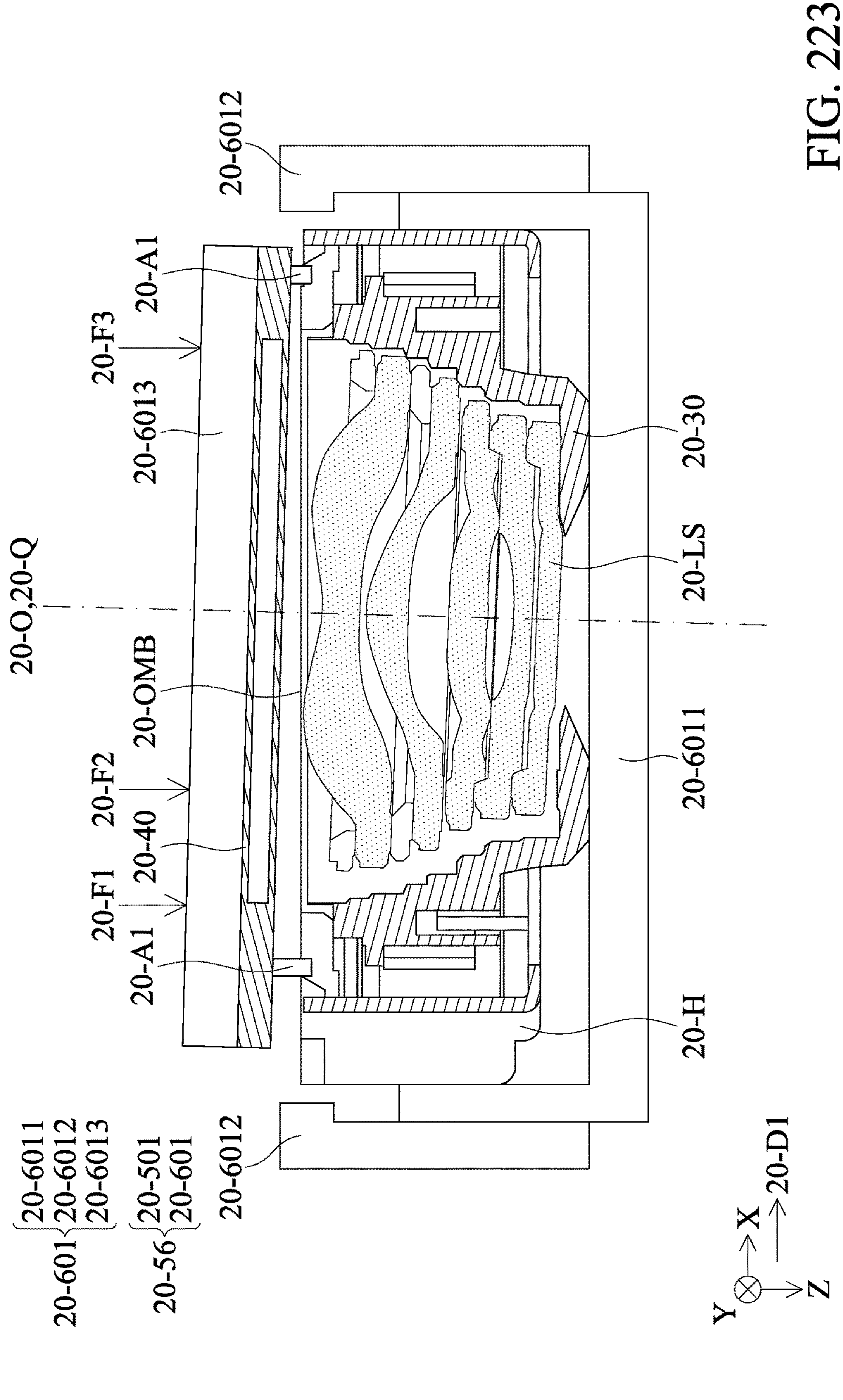

FIGS. 222 and 223 are schematic diagrams showing that the optical element in the optical module of the optical system in FIG. 220 are relatively inclined with respect to the image sensor module, and undergo adjustment process.

Figure 224:
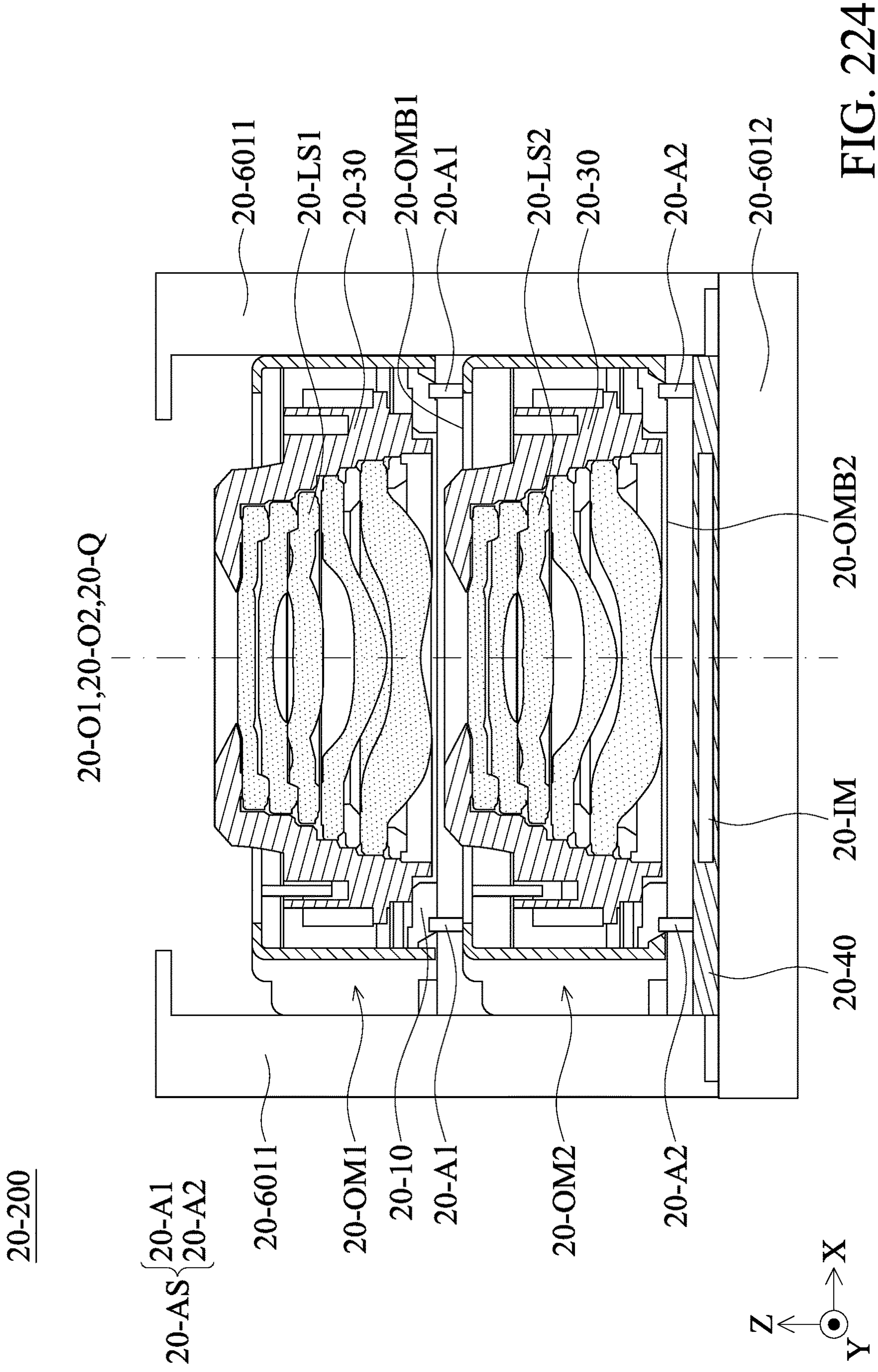

FIG. 224 is a schematic diagram of the camera module optical system according to another embodiment of the present invention.

Figure 225:
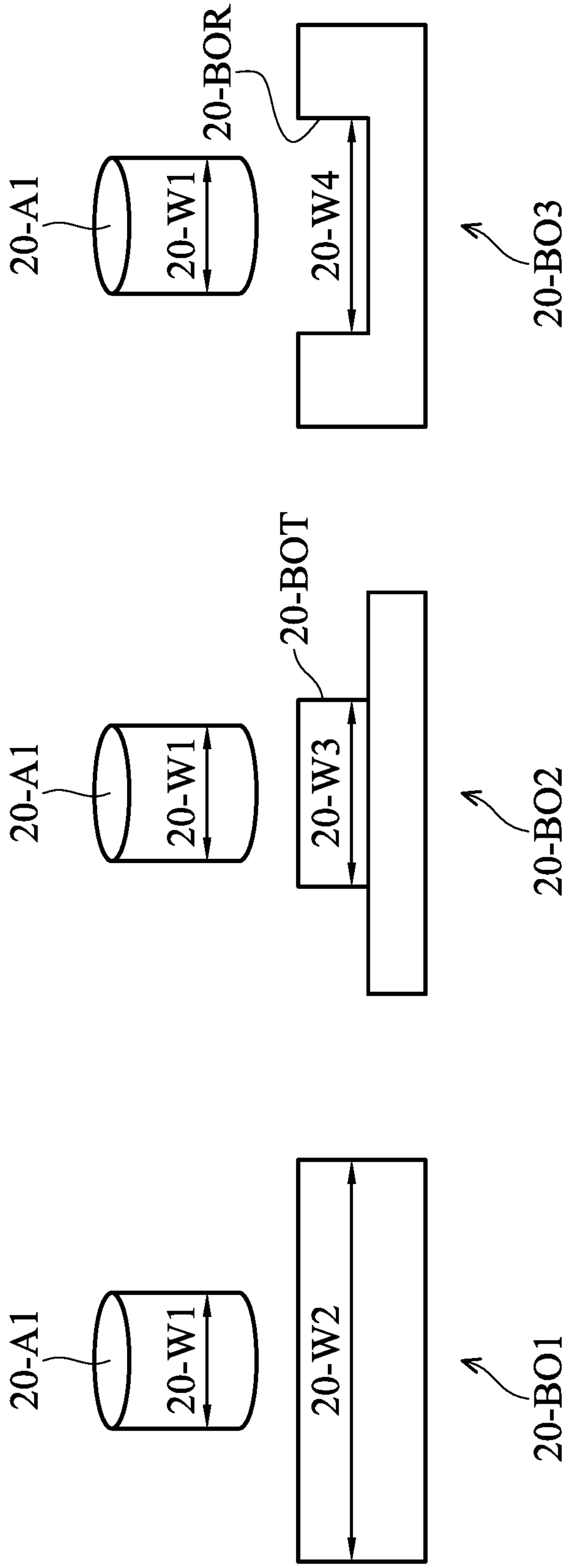

FIG. 225 is schematic diagram of the adjustment column and several different opponent members.

Figure 226:
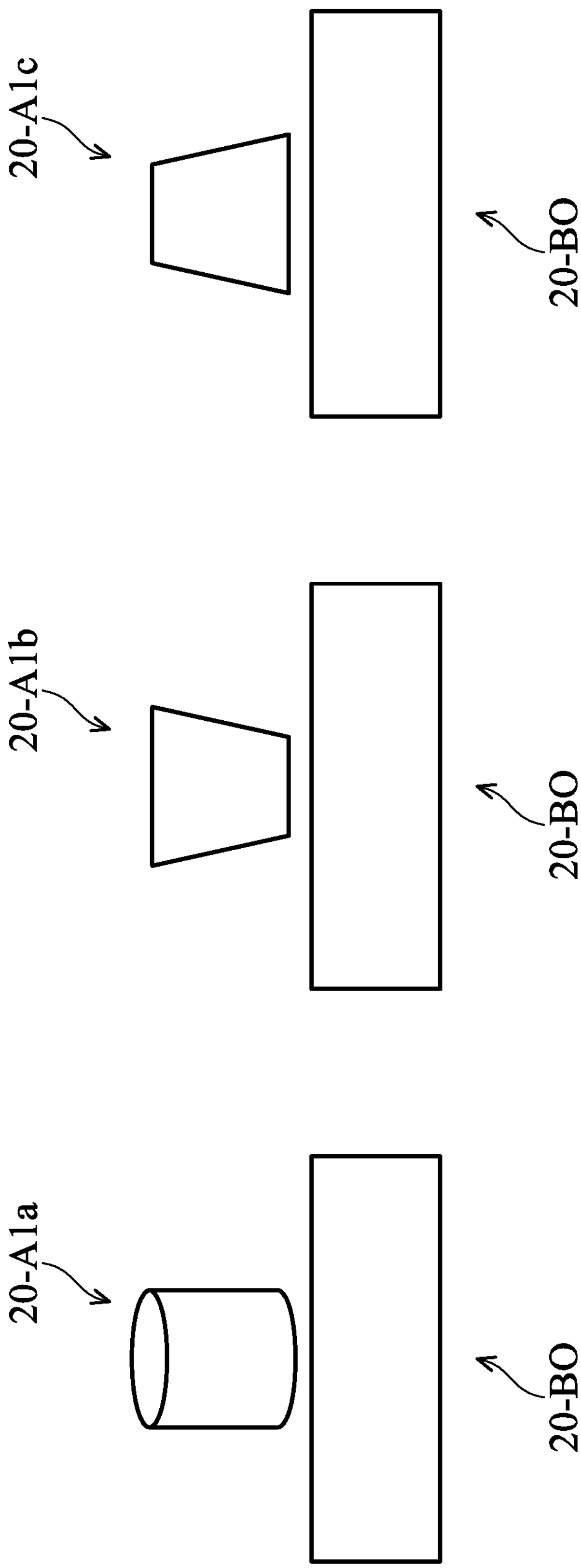

FIG. 226 is a schematic diagram showing a plurality of adjusting columns having different shapes.

Figure 227:
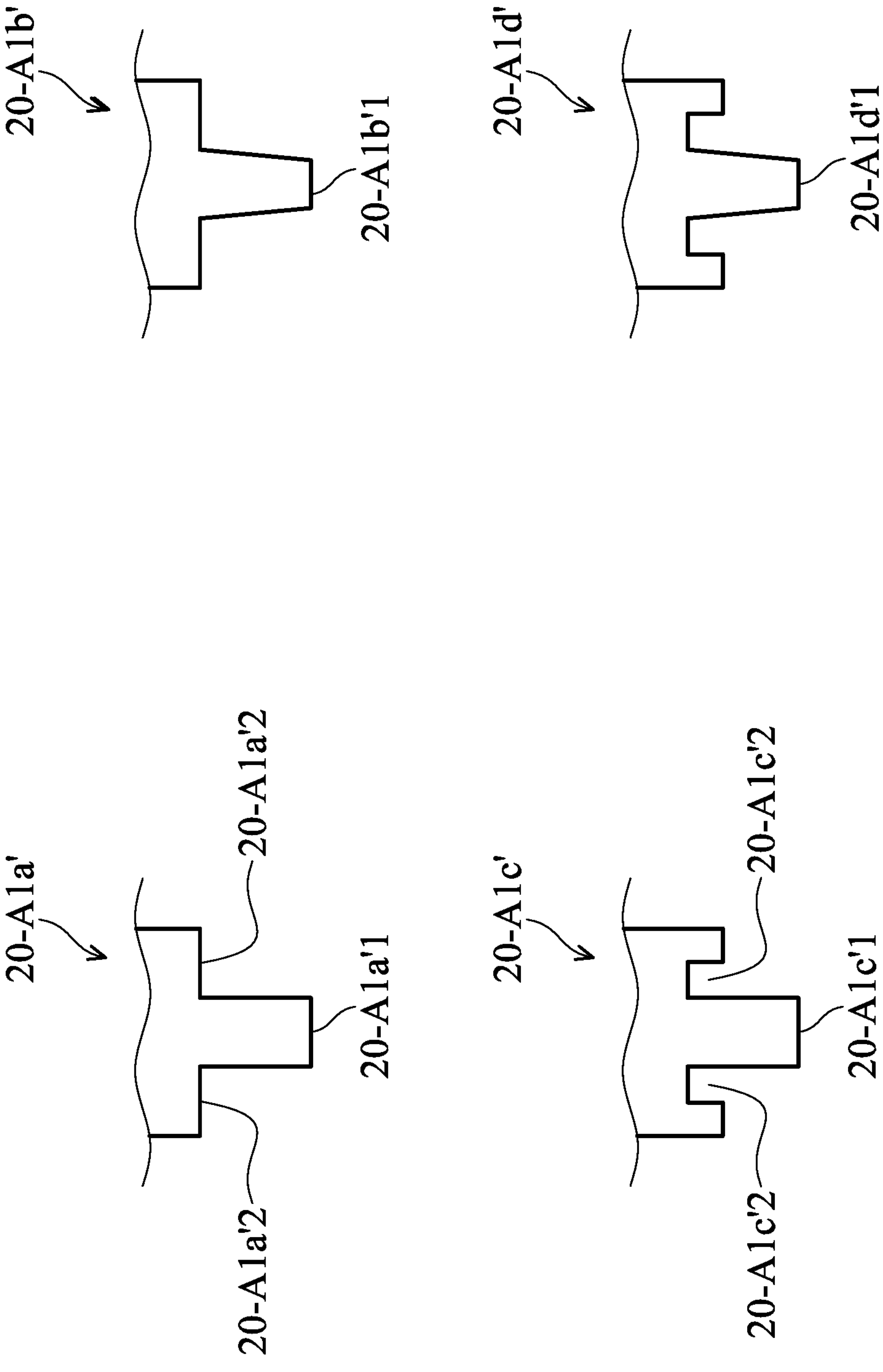

FIG. 227 is a schematic diagram showing a plurality of adjusting columns having different shapes.

Figure 228:
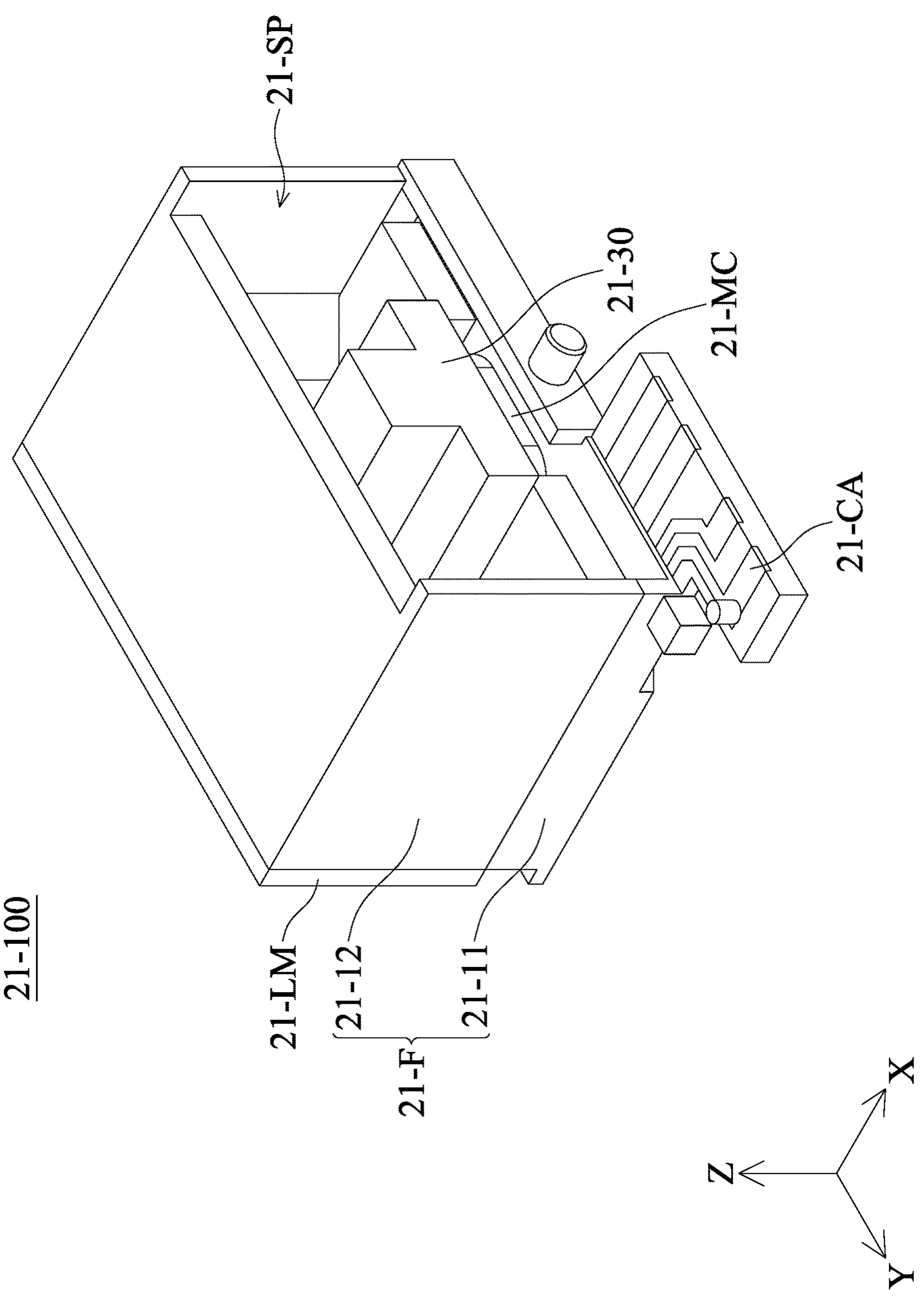

FIG. 228 is a schematic view of an optical element driving mechanism in some embodiments of the present disclosure.

Figure 229:
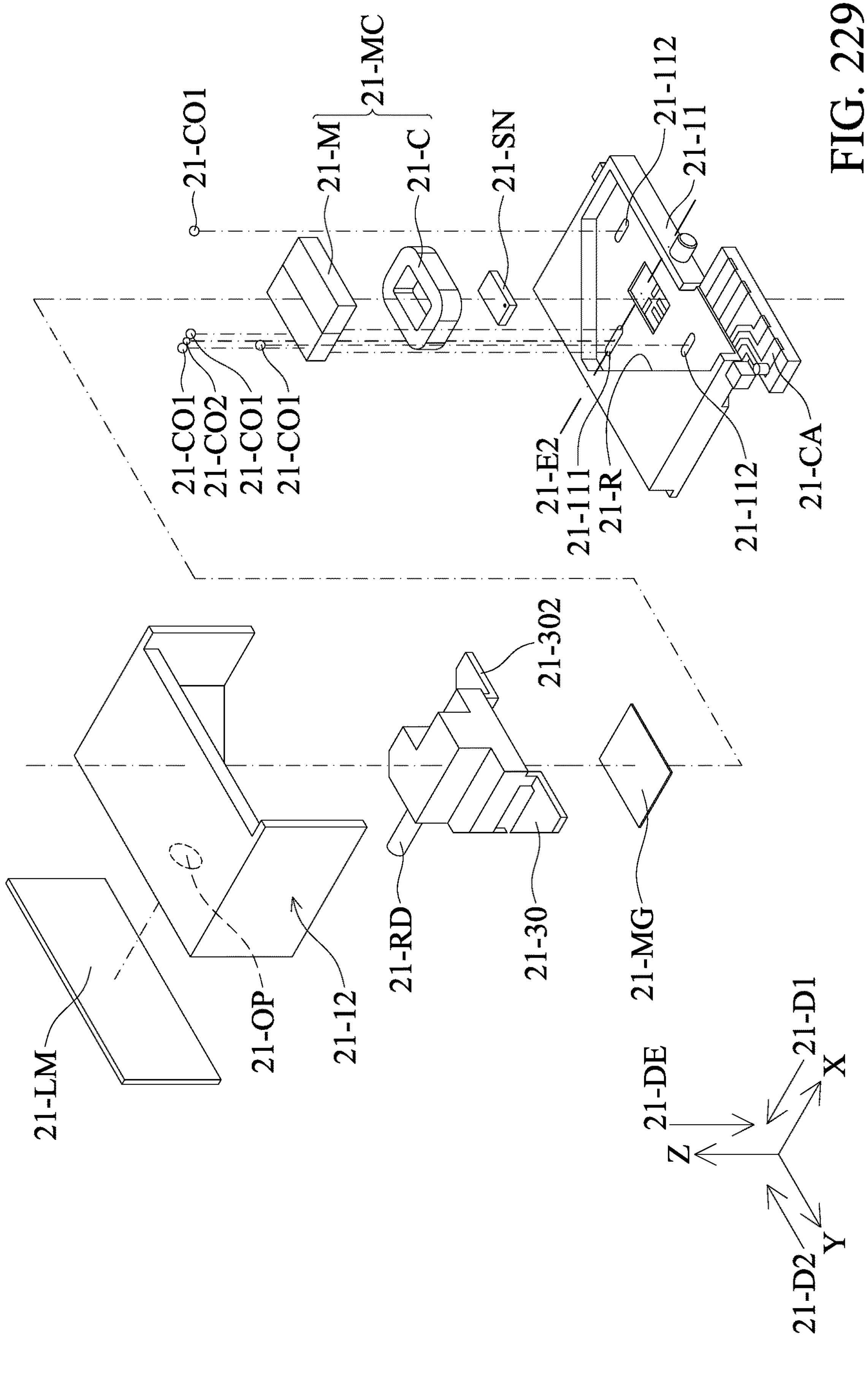

FIG. 229 is an exploded view of the optical element driving mechanism in FIG. 228.

Figure 230:
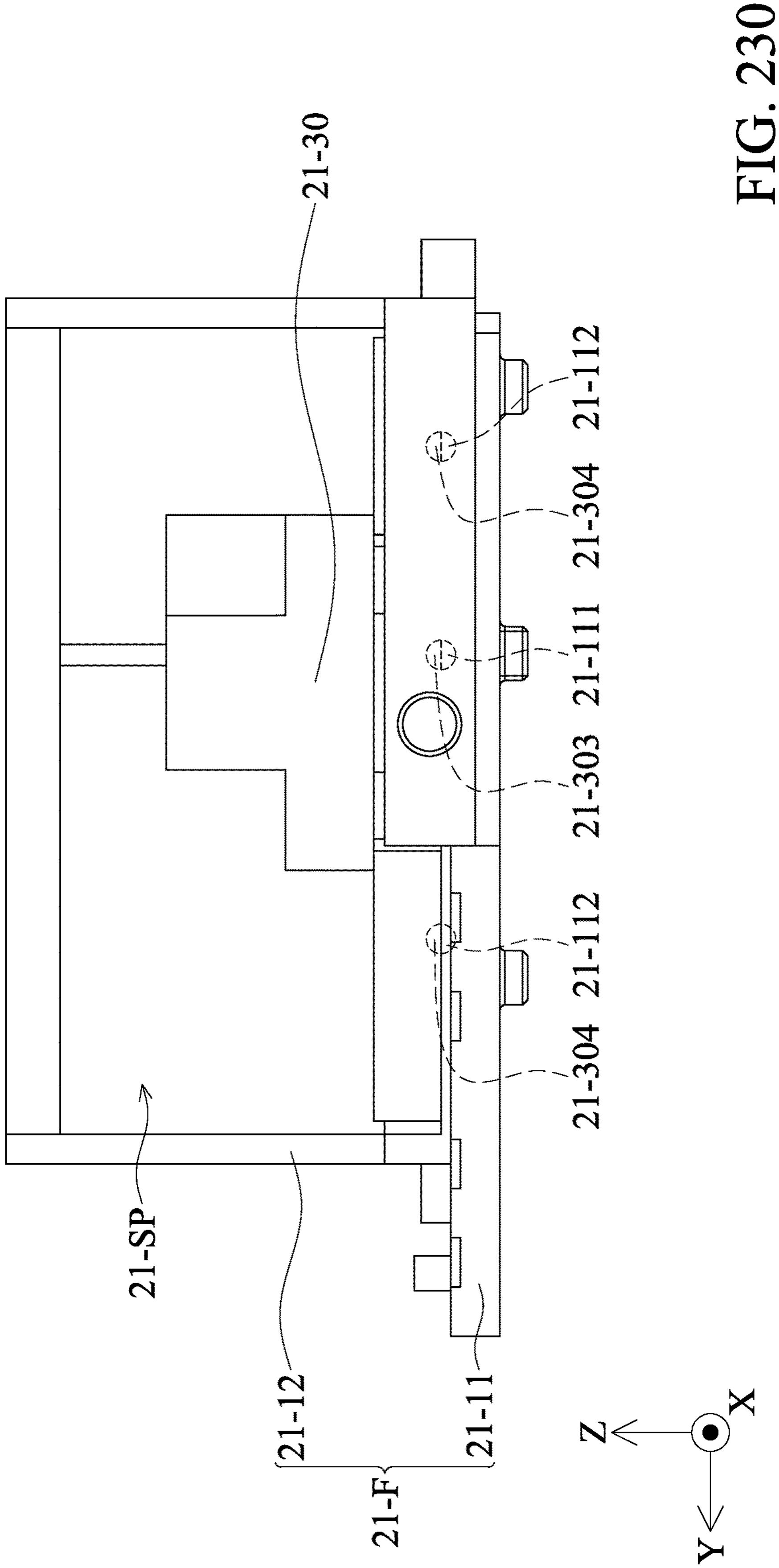

FIG. 230 is a front view of the optical element driving mechanism in FIG. 228.

Figure 231:
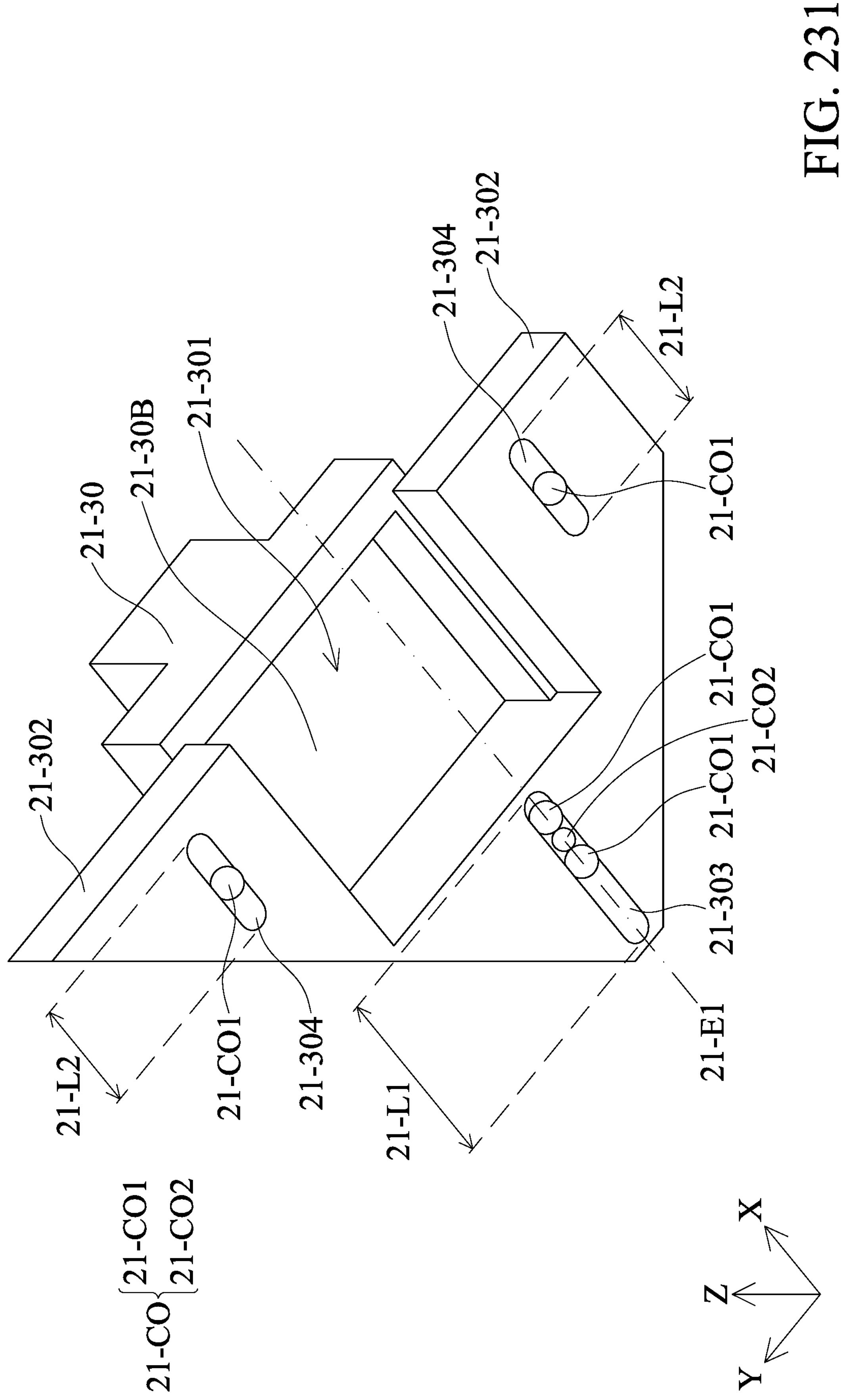

FIG. 231 is a schematic view of the movable portion and the connecting element.

Figure 232:
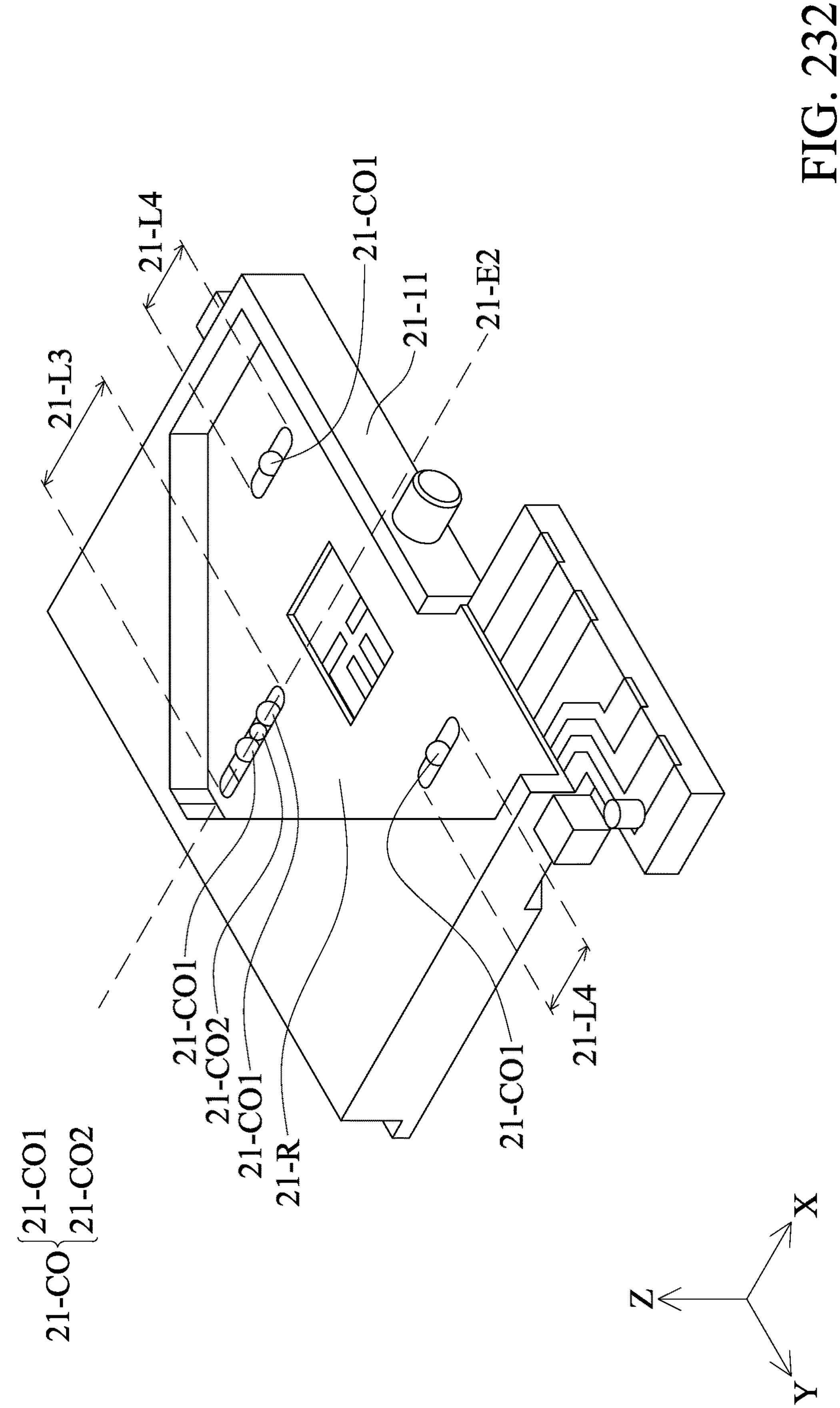

FIG. 232 is a schematic view of the base and the connecting element.

Figure 233:
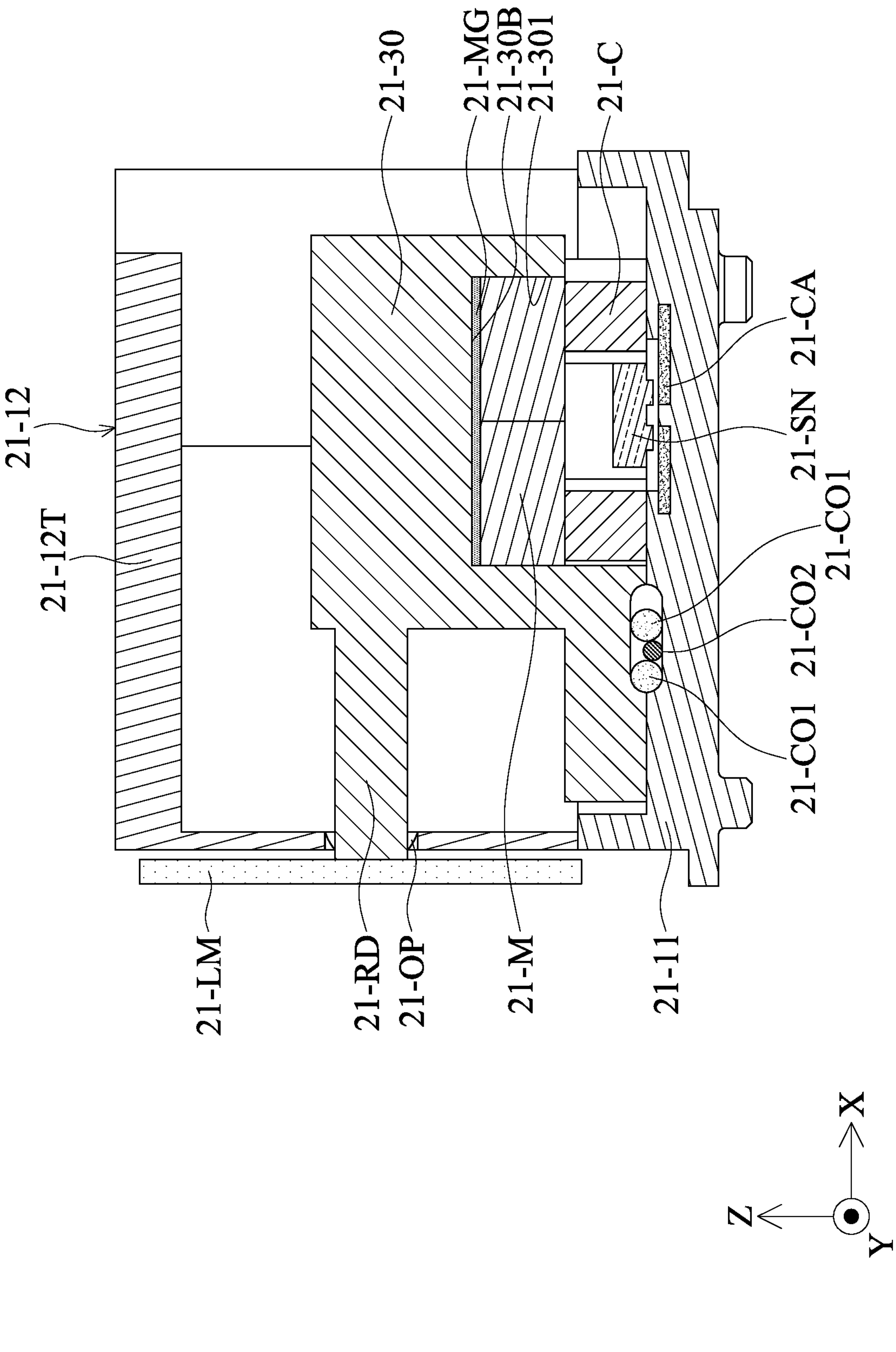
Figure 234:
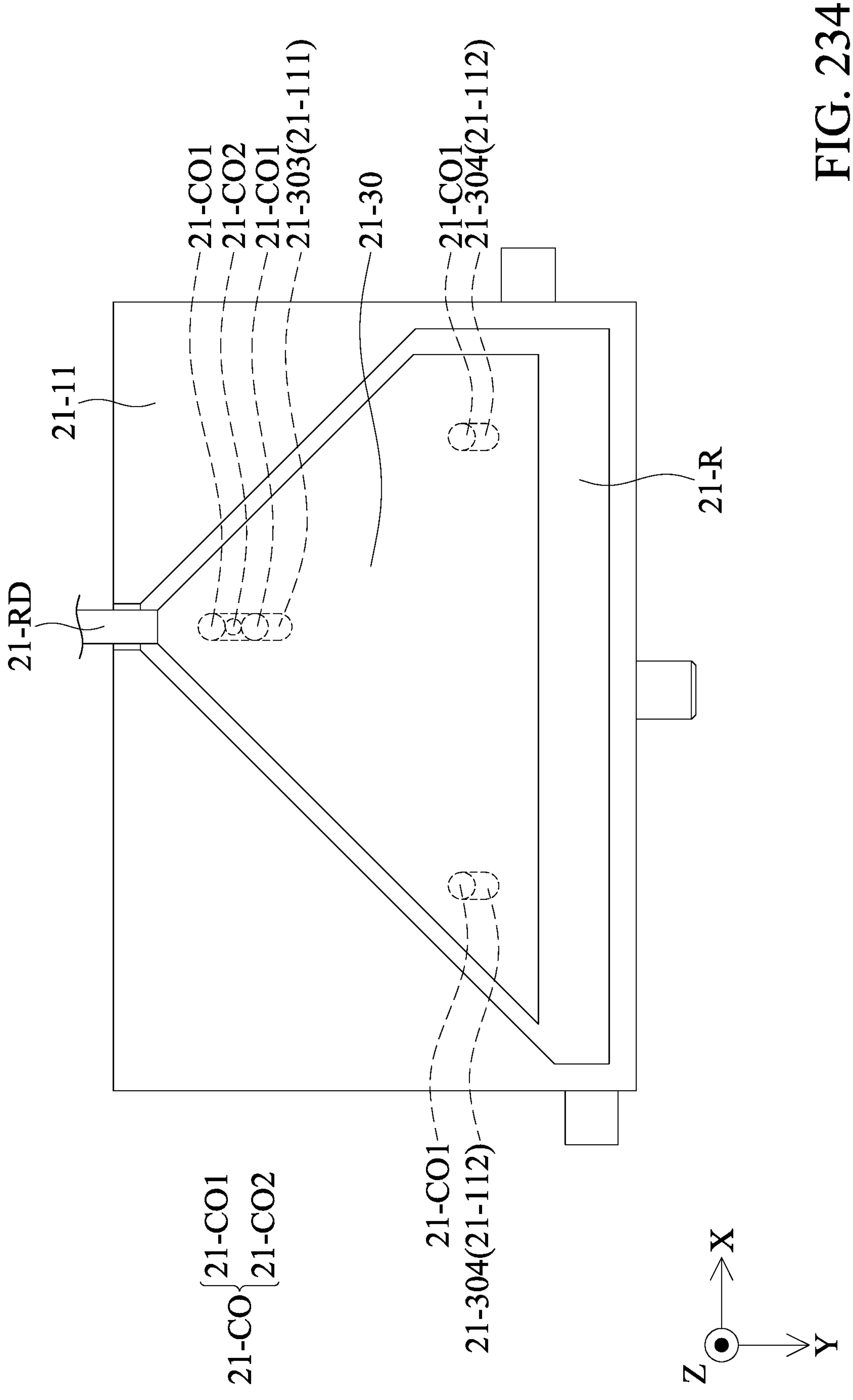

FIGS. 233 and 234 are schematic views of the optical element driving mechanism viewed from different directions when the optical element driving mechanism is operating, in some embodiments of the present disclosure.

Figure 235:
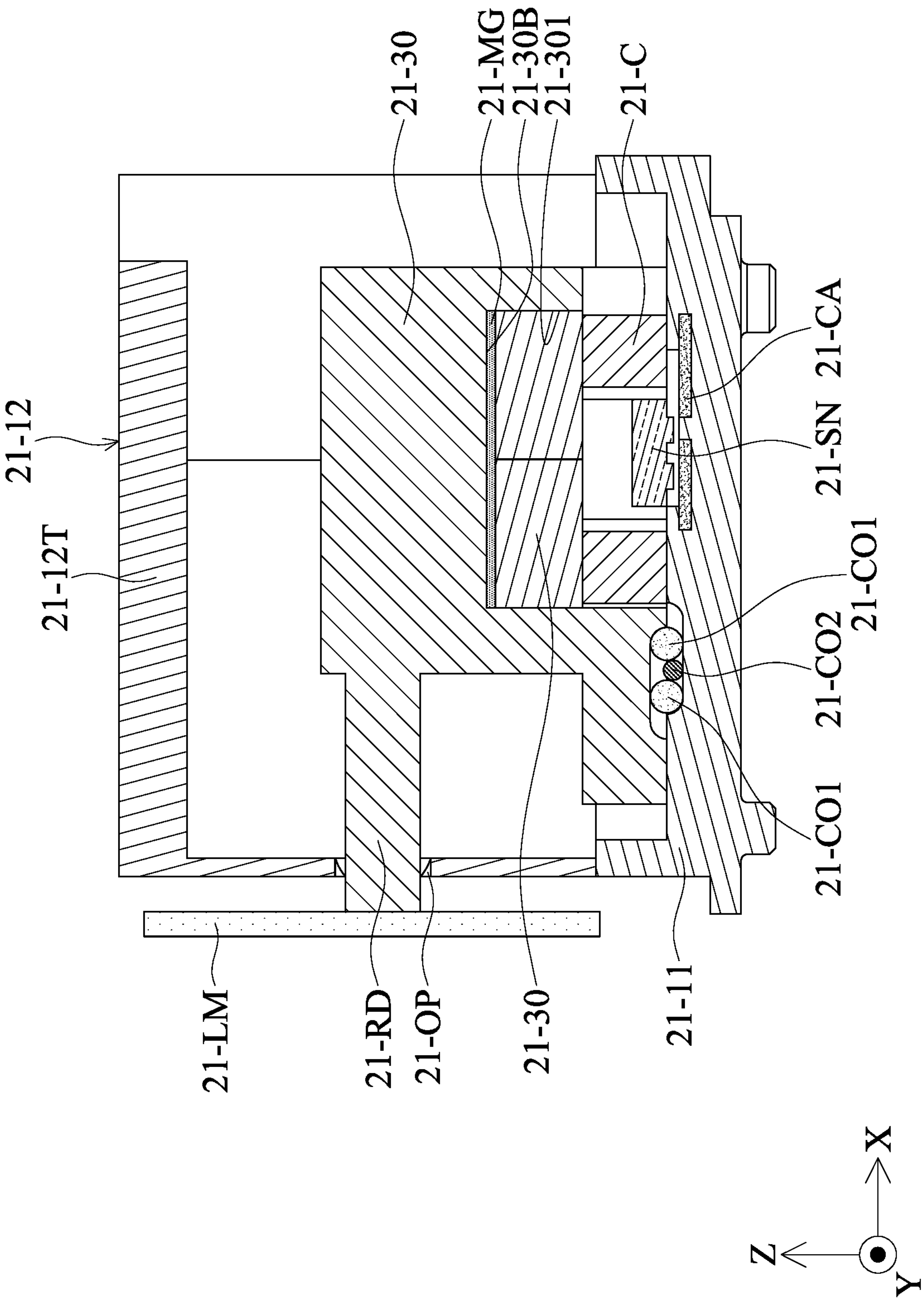
Figure 236:
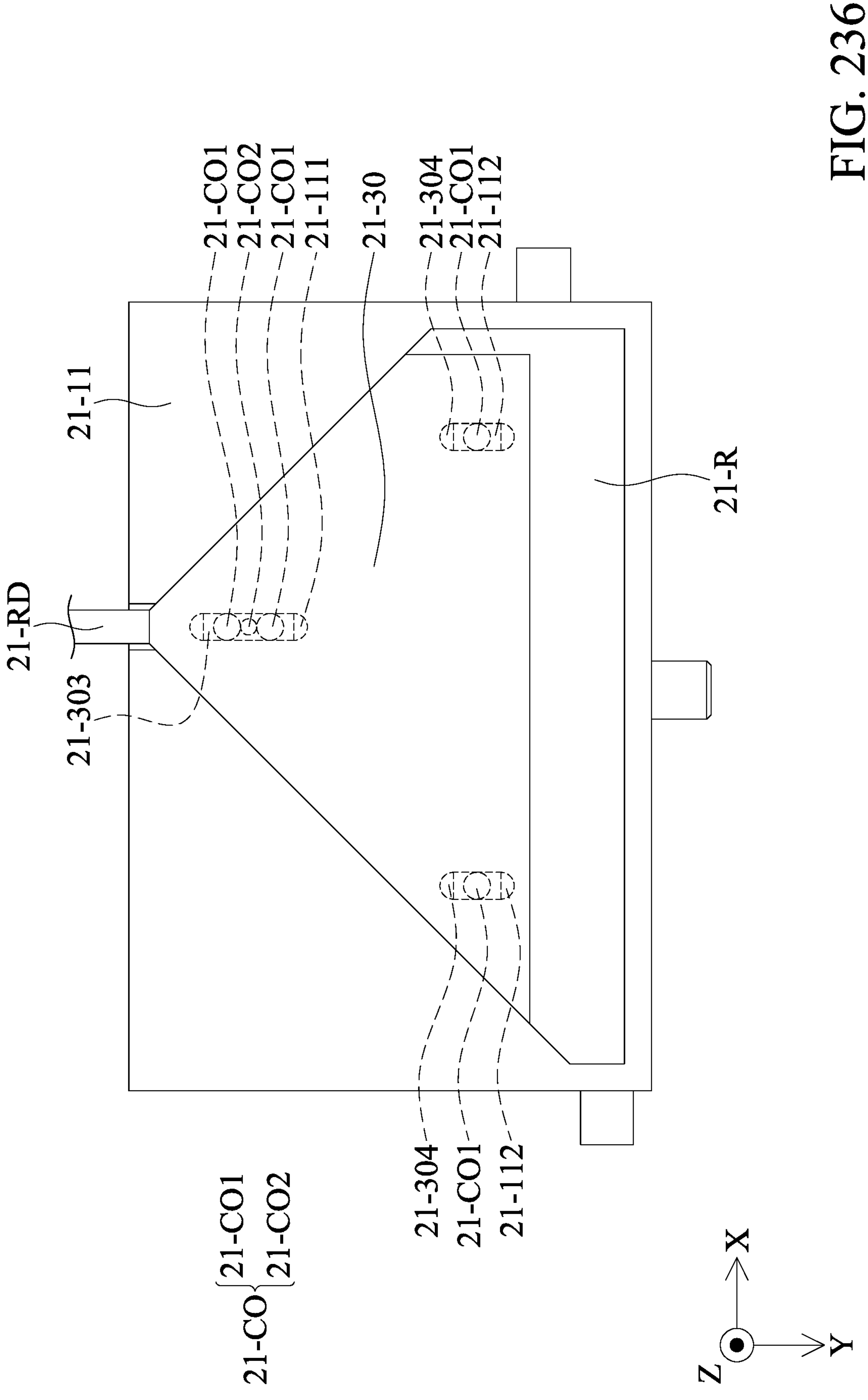

FIGS. 235 and 236 re schematic views of the optical element driving mechanism viewed from different directions when the optical element driving mechanism is operating, in some embodiments of the present disclosure.

Figure 237:
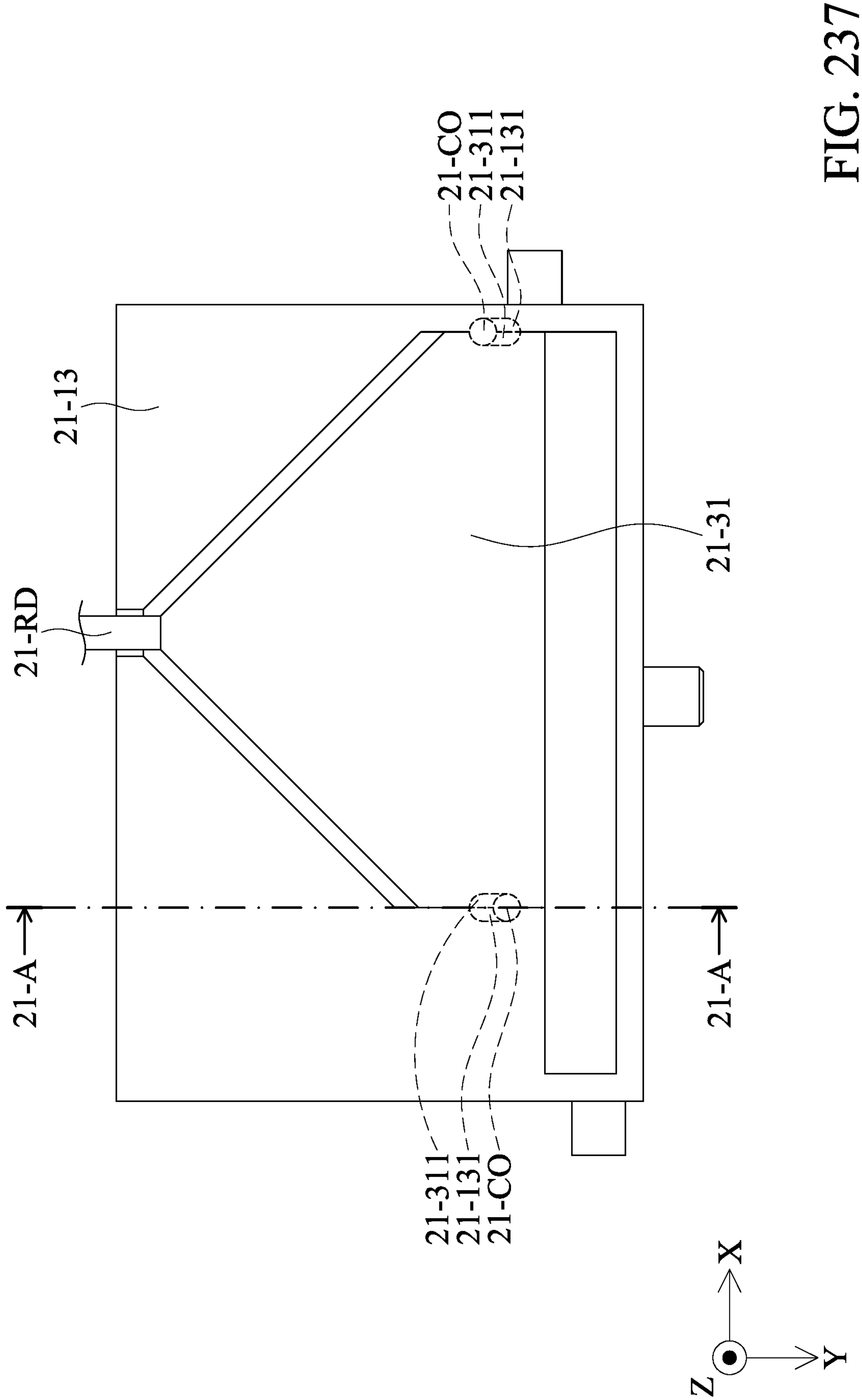

FIG. 237 is a schematic view of an optical element driving mechanism in some embodiments of the present disclosure.

Figure 238:
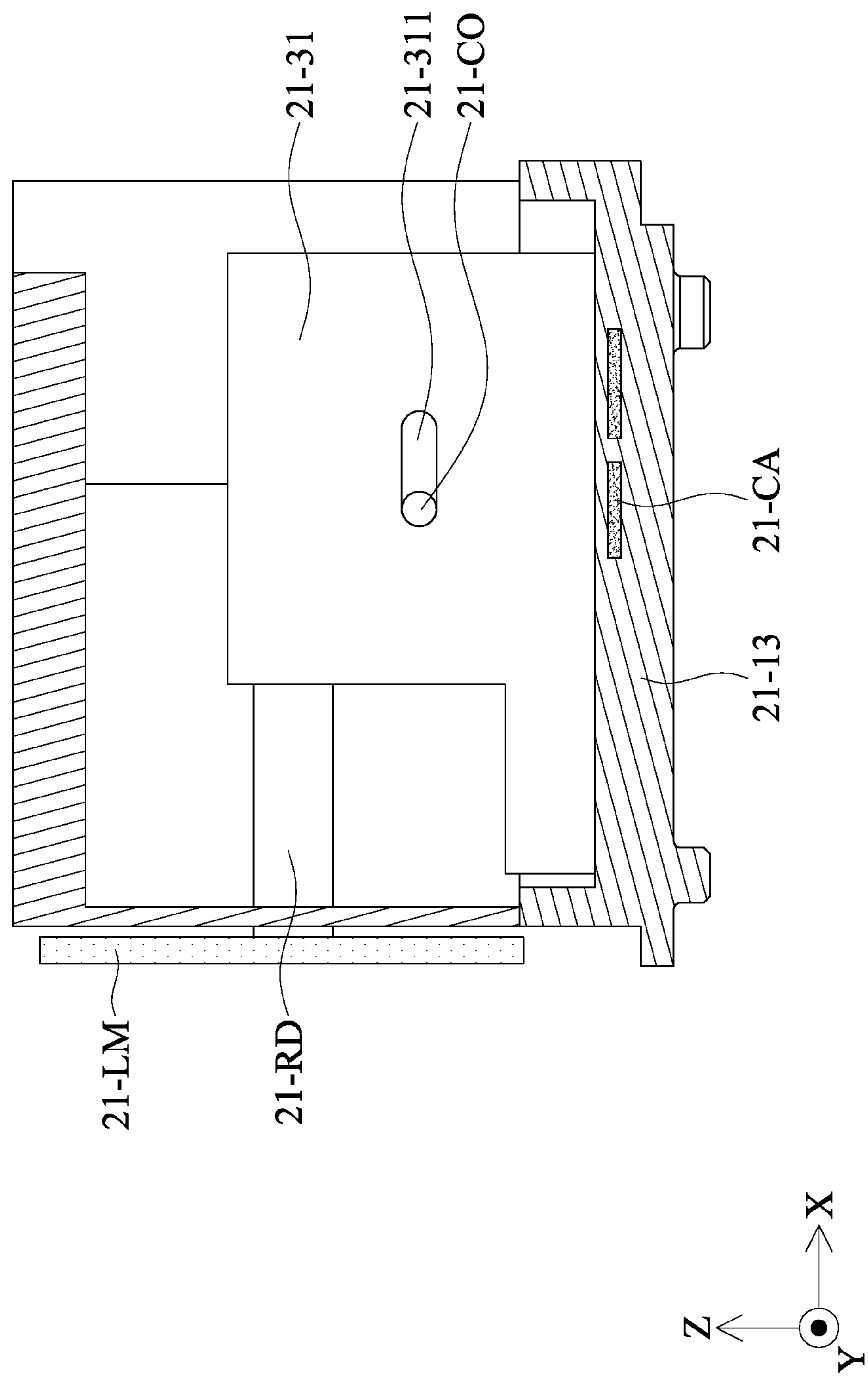

FIG. 238 is a cross-sectional view of an optical element driving mechanism in some embodiments of the present disclosure.

Figure 239:
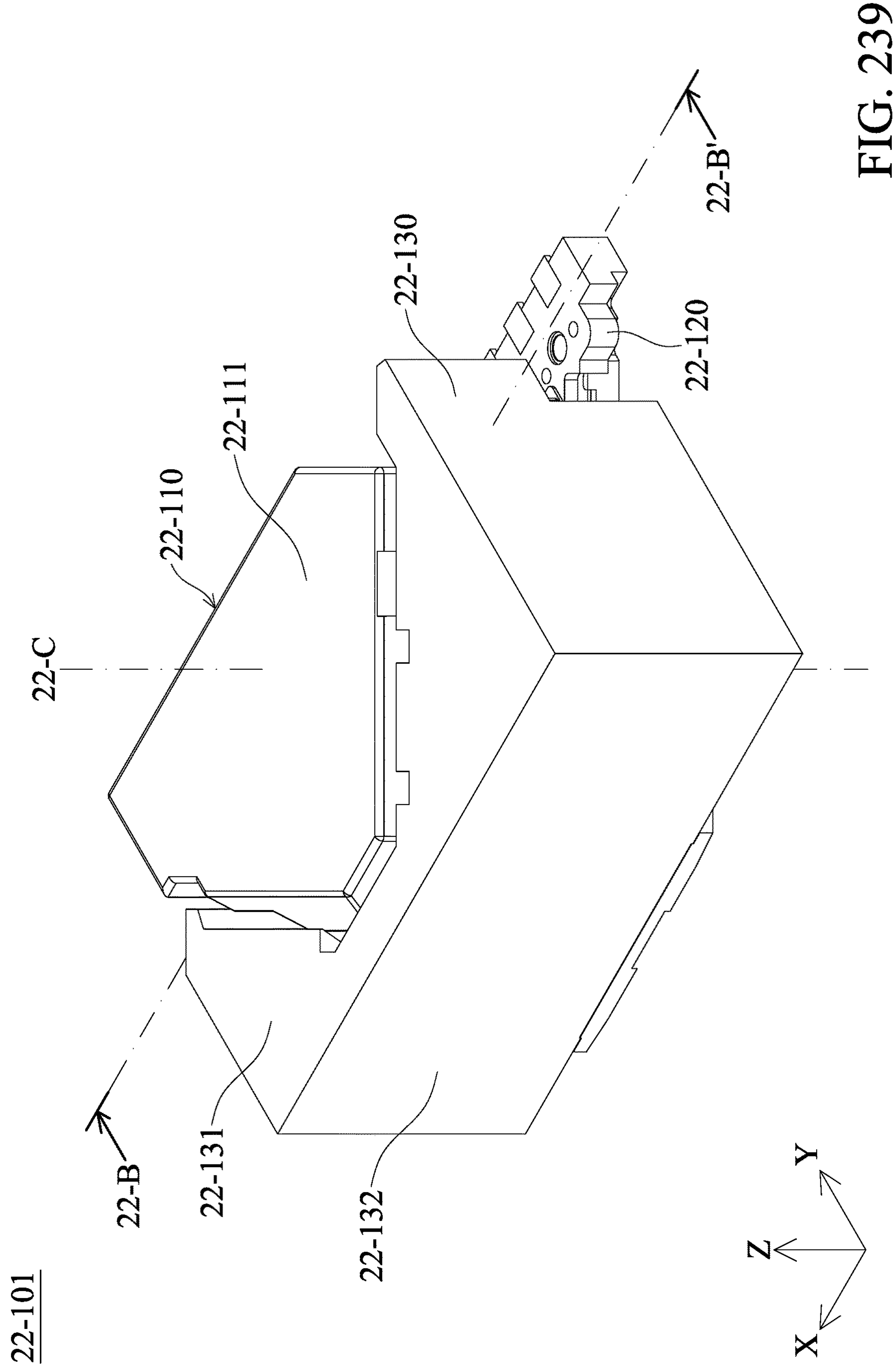

FIG. 239 is a perspective view illustrating an optical member driving mechanism in accordance with an embodiment of the present disclosure.

Figure 240:
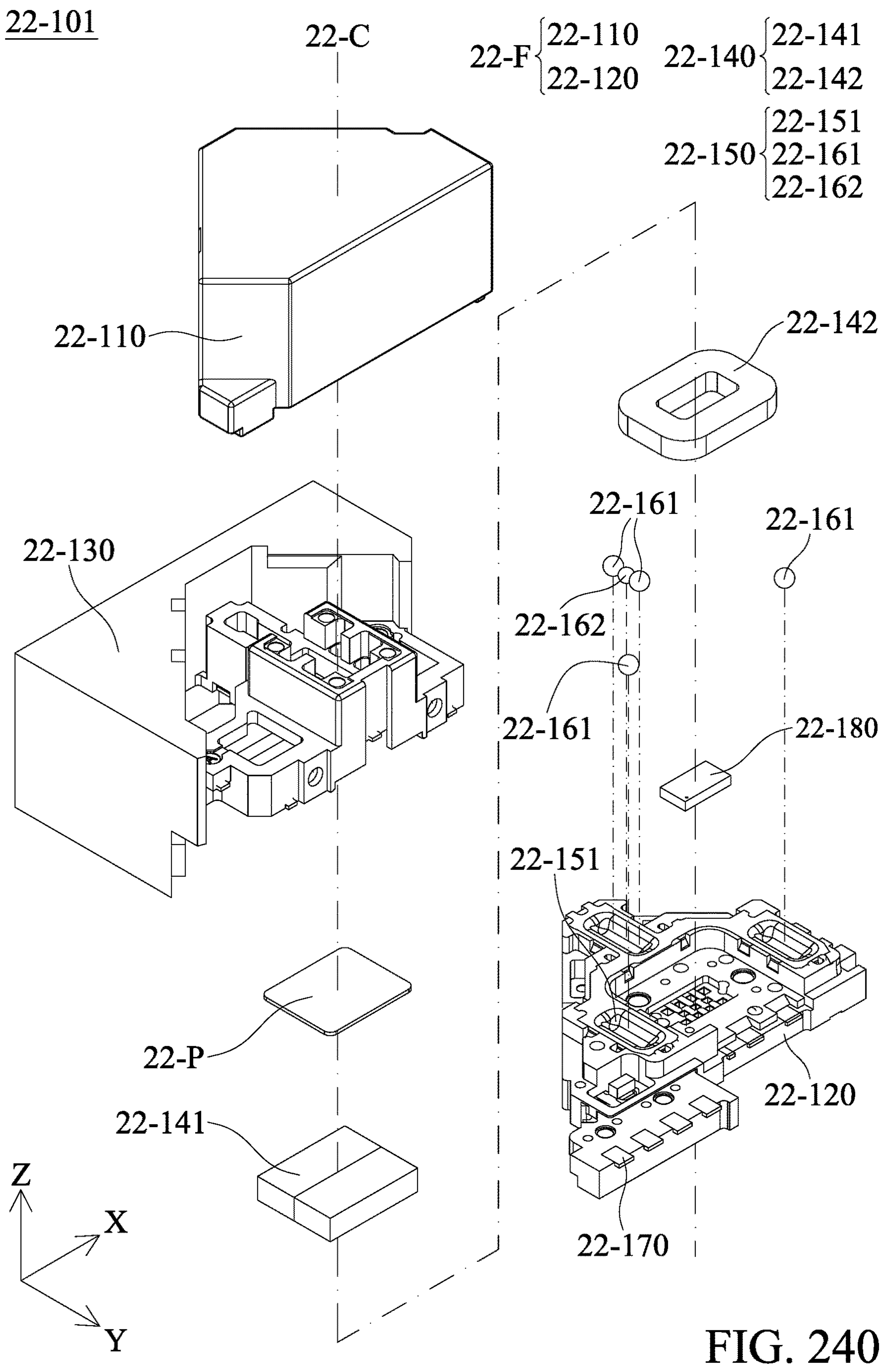

FIG. 240 is an exploded view illustrating the optical member driving mechanism shown in FIG. 239.

Figure 241:
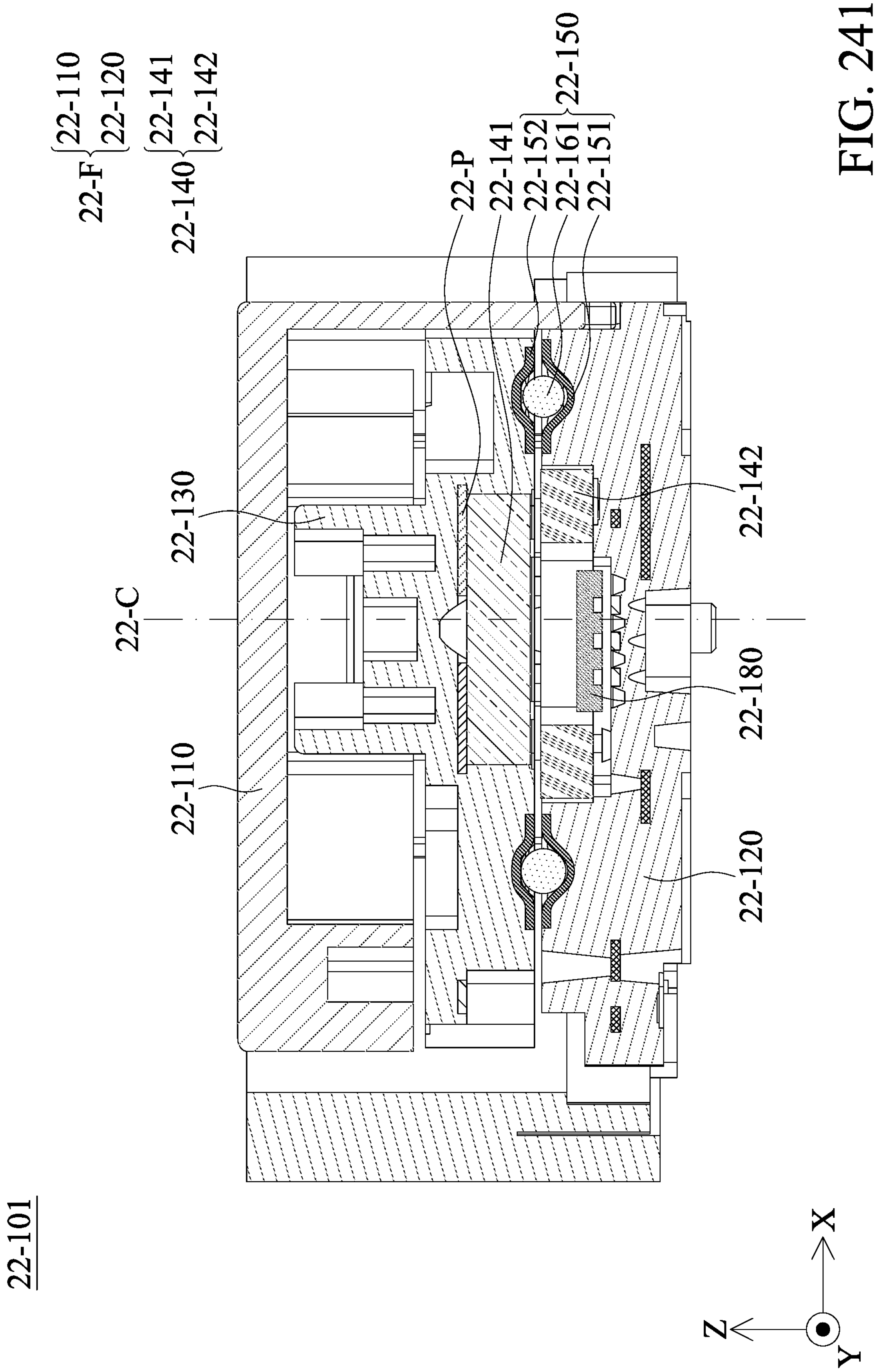

FIG. 241 is a cross-sectional view illustrating along line 22-B shown in FIG. 239.

Figure 242:
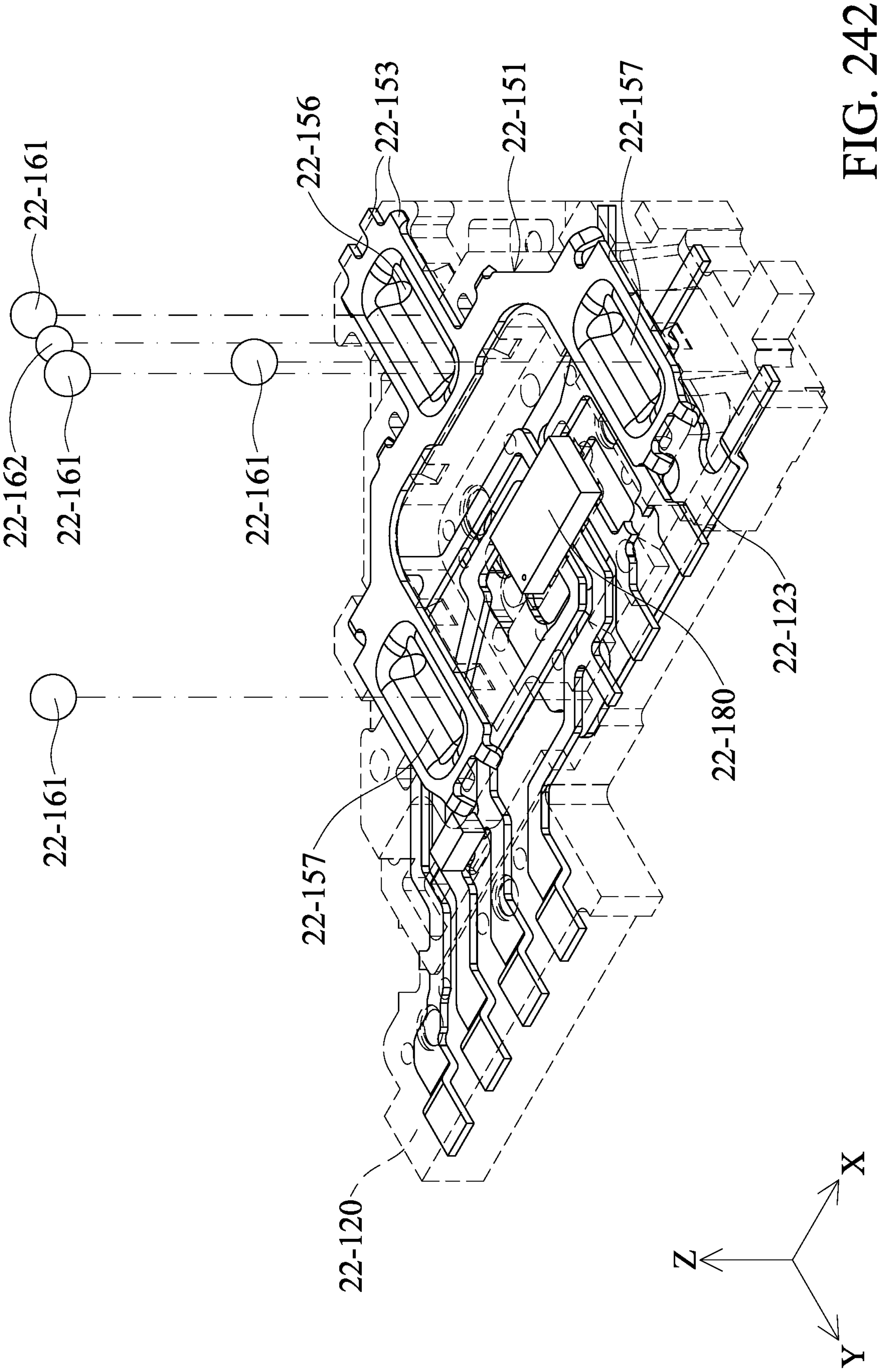

FIG. 242 is a perspective view illustrating a base and a guiding assembly in accordance with an embodiment of the present disclosure.

Figure 243:
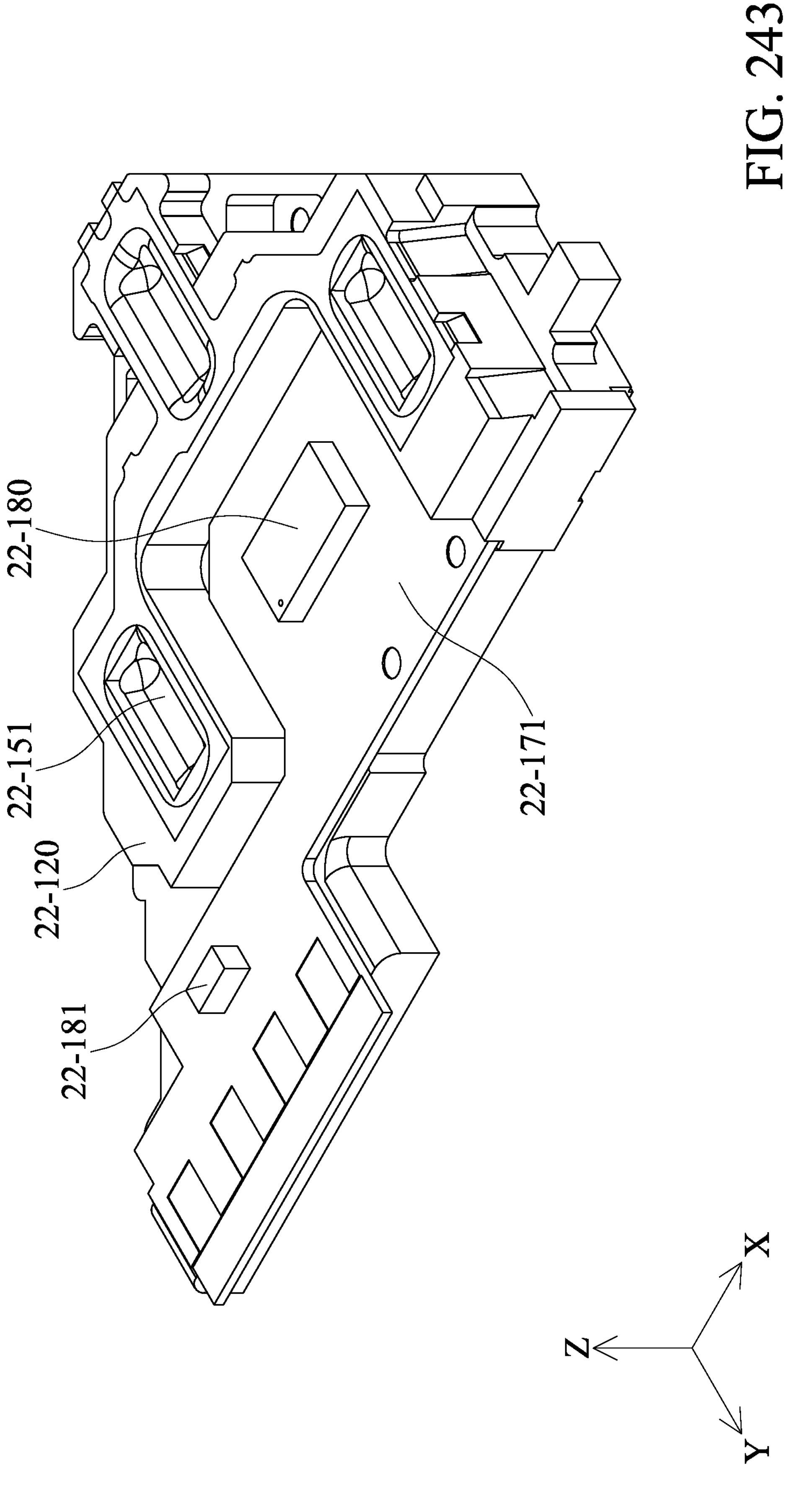

FIG. 243 is a perspective view illustrating the base and a circuit component in accordance with an embodiment of the present disclosure.

Figure 244:
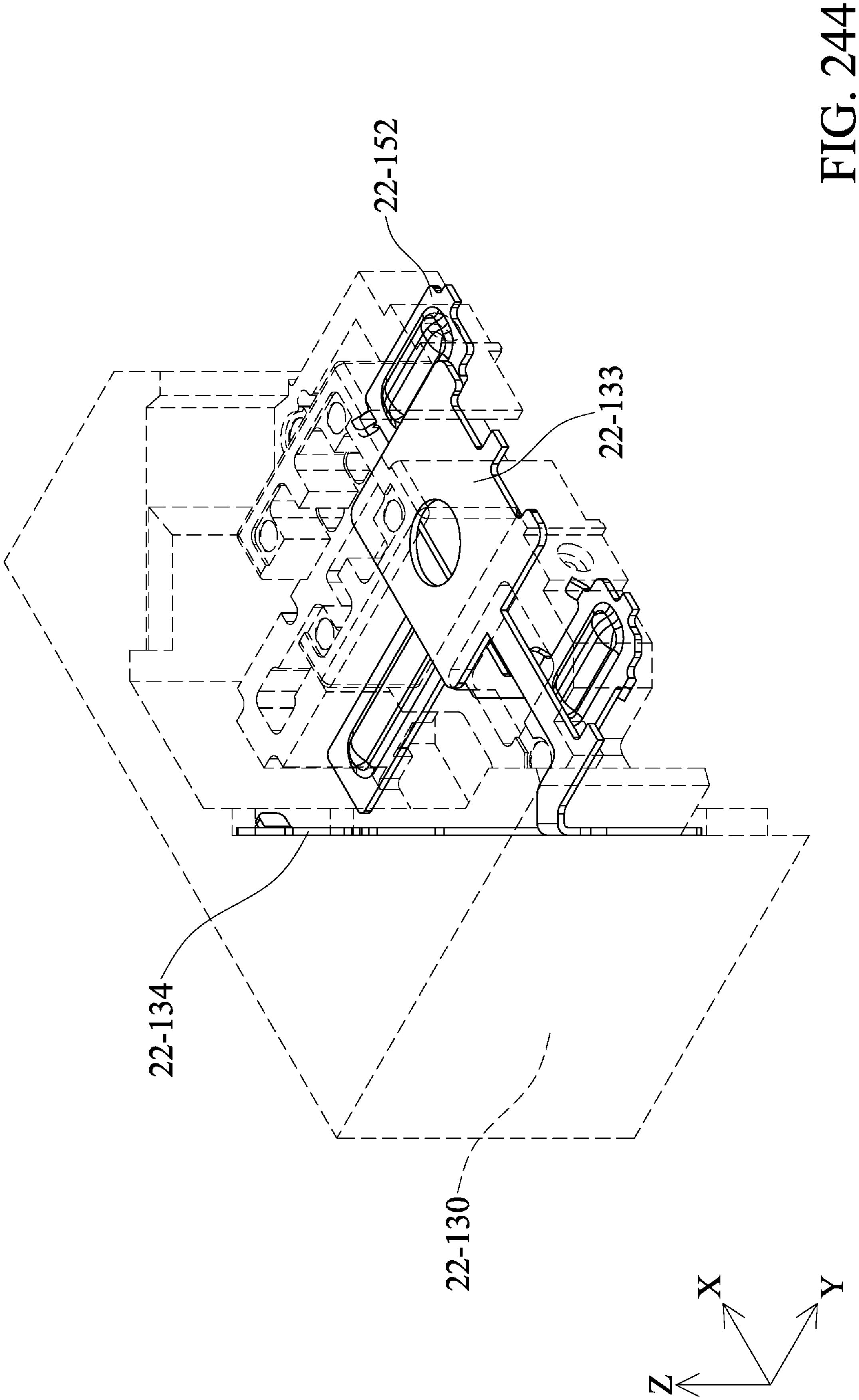

FIG. 244 is a perspective view illustrating a movable portion in accordance with an embodiment of the present disclosure.

Figure 245:
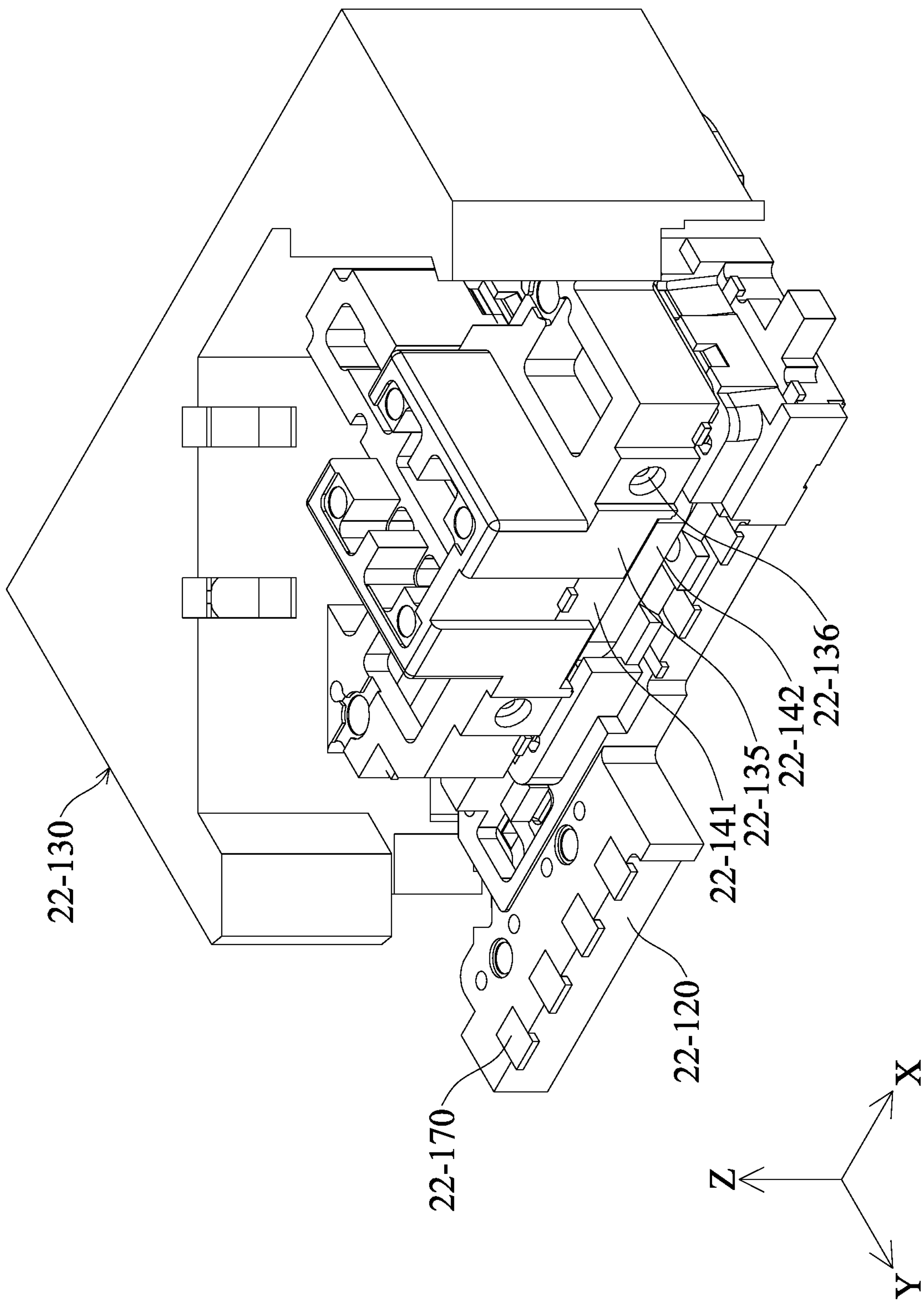

FIG. 245 is a perspective view illustrating the interior structure of the optical member driving mechanism in accordance with an embodiment of the present disclosure.

Figure 246:
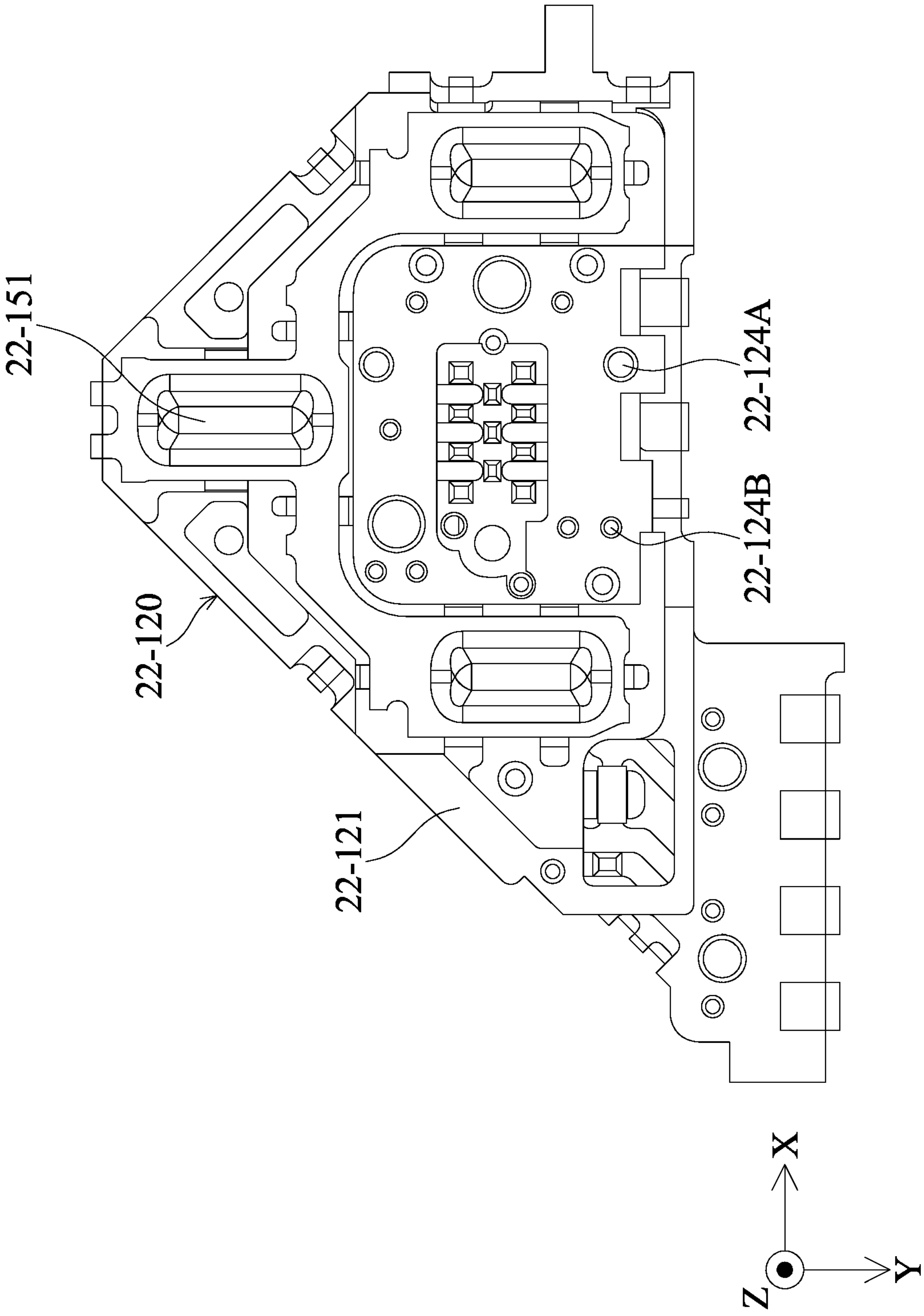

FIG. 246 is a top view illustrating the base in accordance with an embodiment of the present disclosure.

Figure 247:
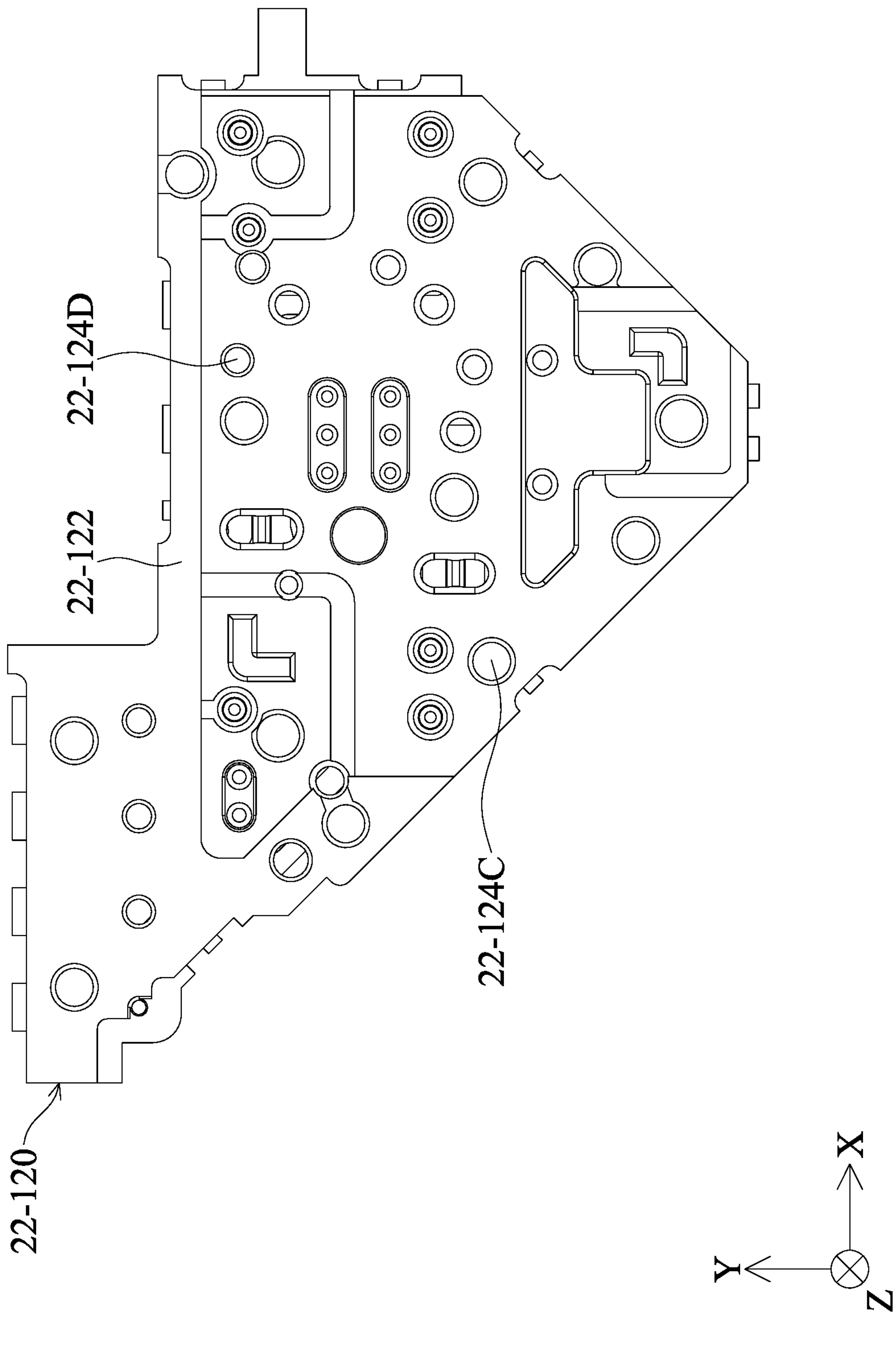

FIG. 247 is a bottom view illustrating the base in accordance with an embodiment of the present disclosure.

Figure 248:
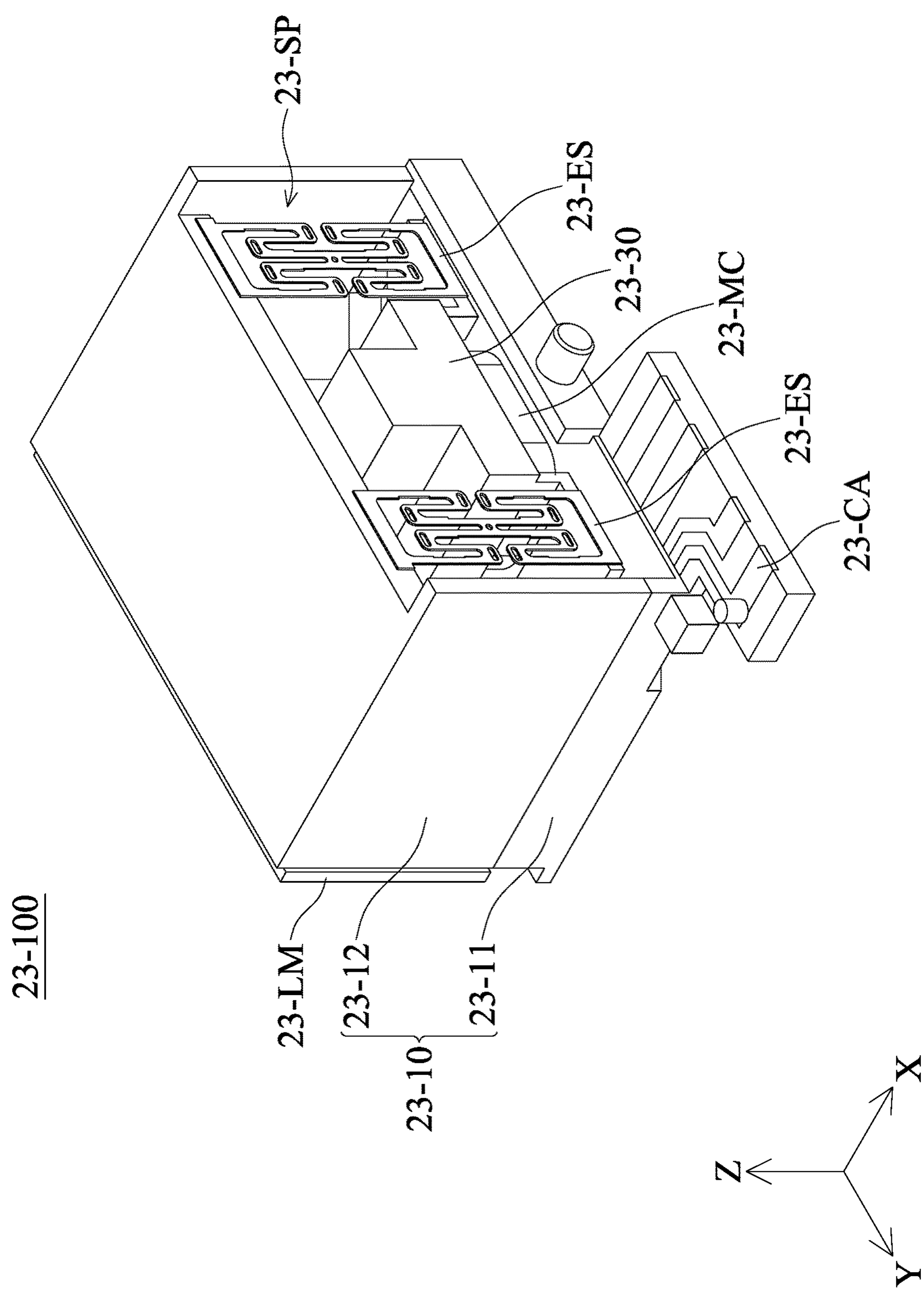

FIG. 248 is a schematic diagram showing a driving mechanism for an optical element according to an embodiment of the present invention.

Figure 249:
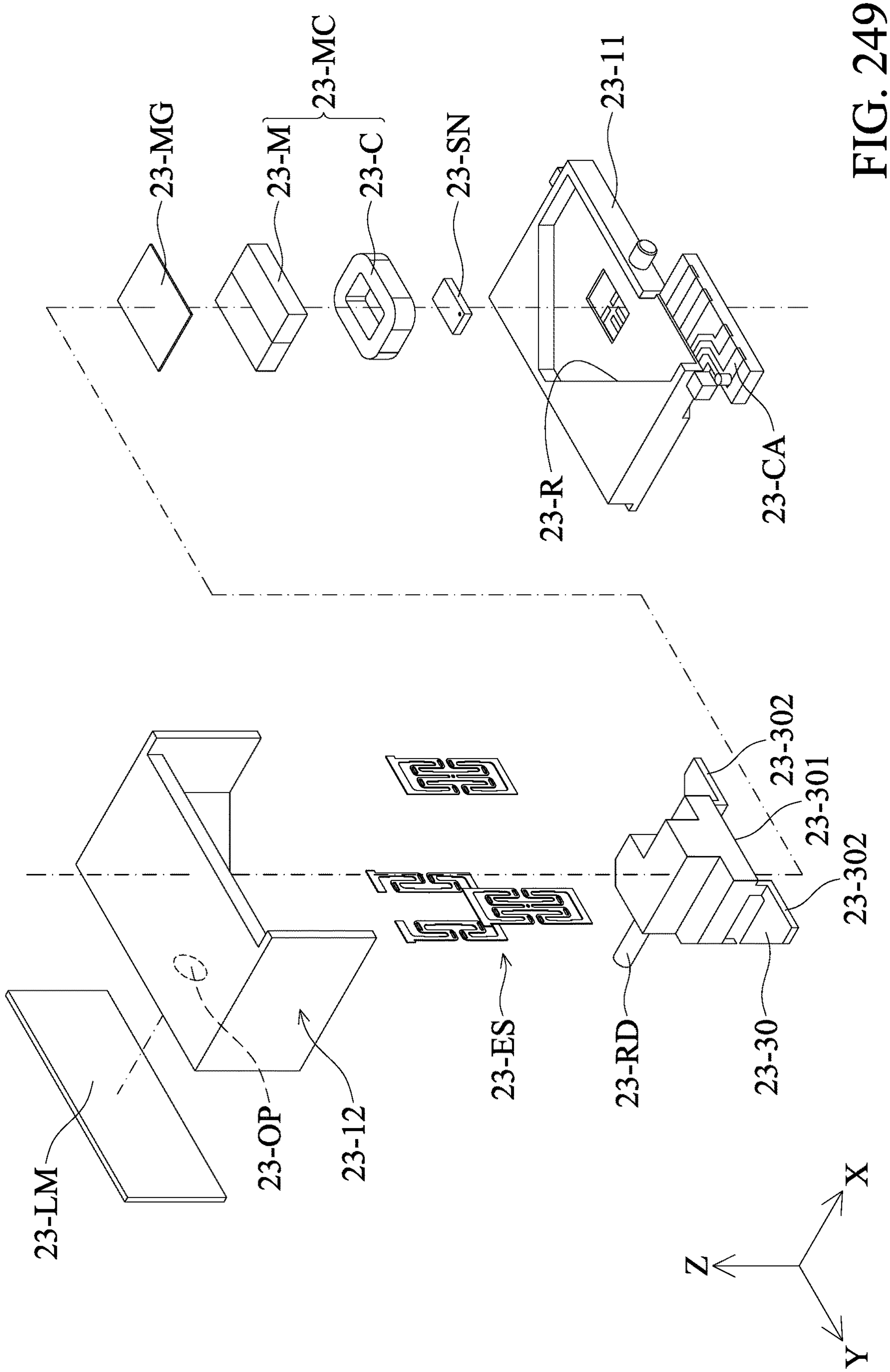

FIG. 249 is an exploded view diagram showing the driving mechanism for an optical element in FIG. 248.

Figure 250:
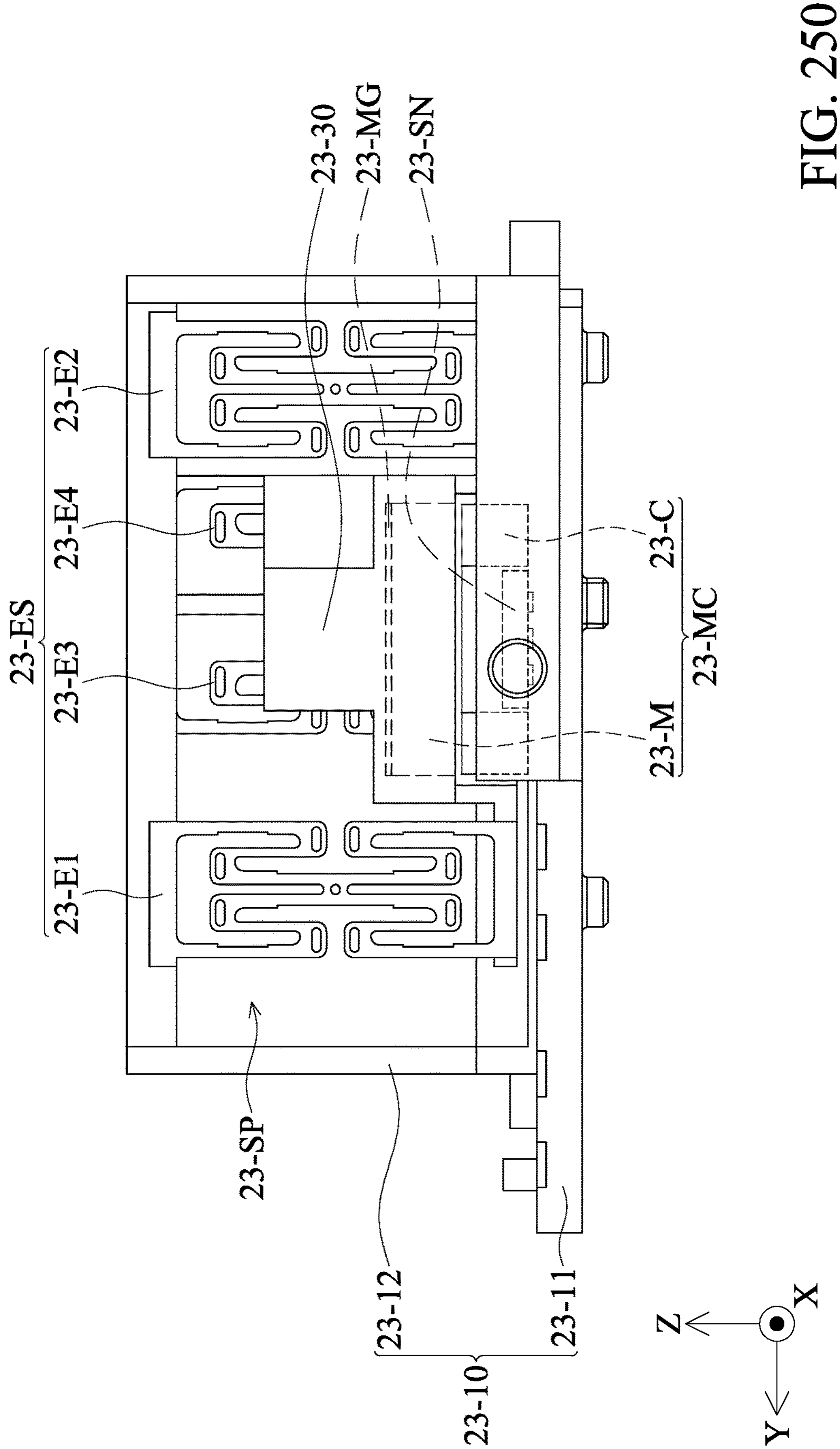

FIG. 250 is a front view diagram of the driving mechanism in FIG. 248.

Figure 251:
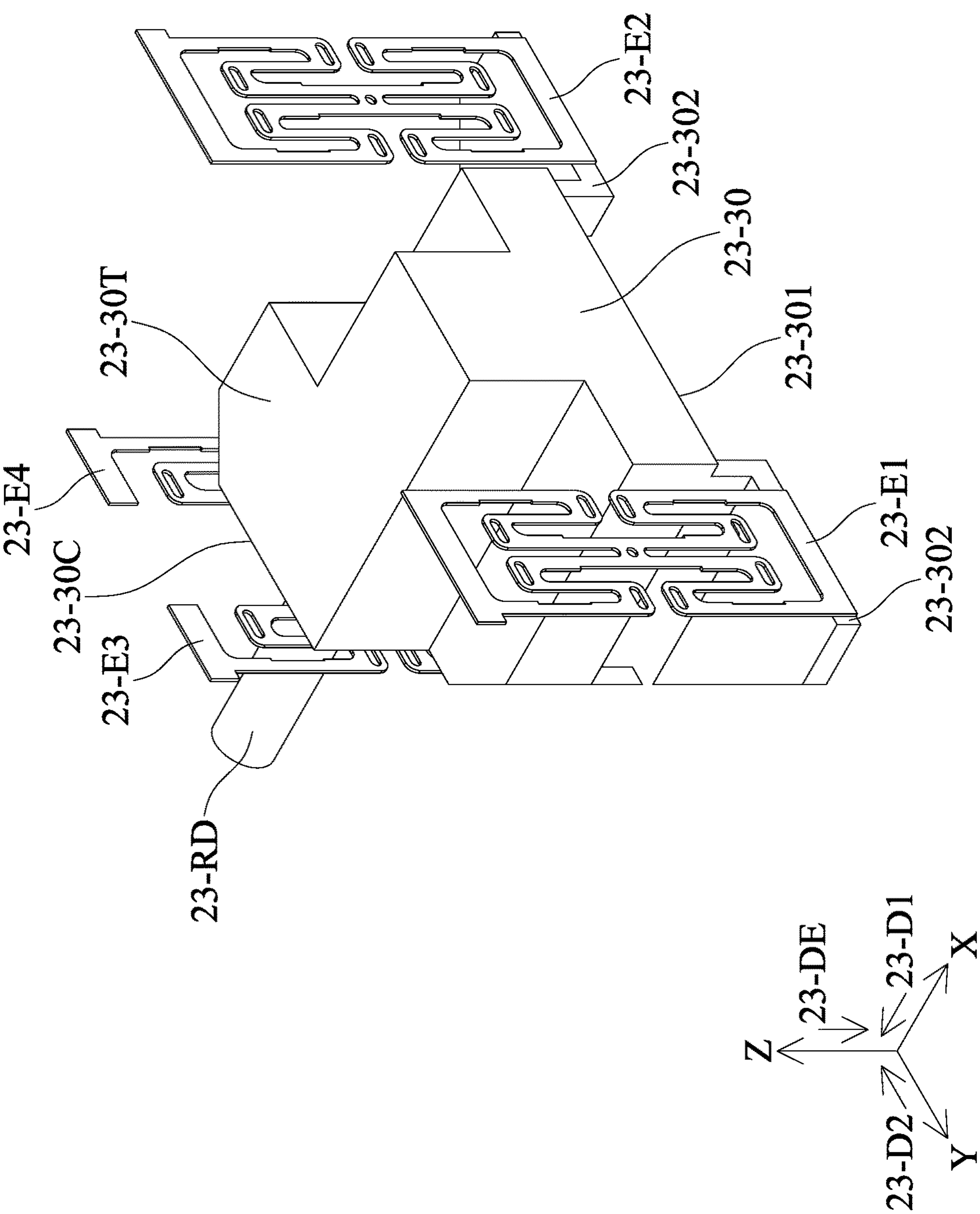

FIG. 251 is a schematic diagram of the movable portion and the elastic assembly.

Figure 252:
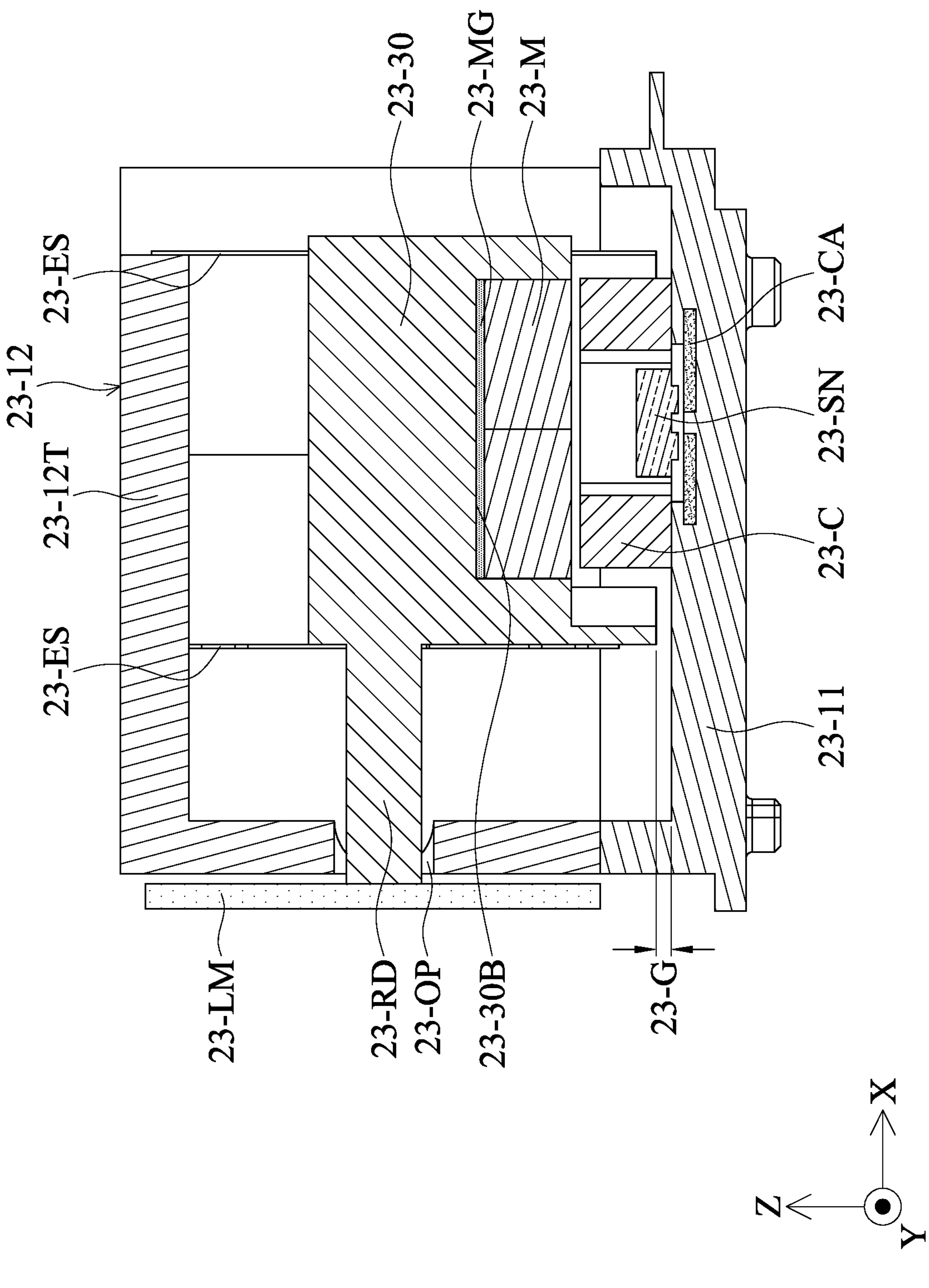
Figure 253:
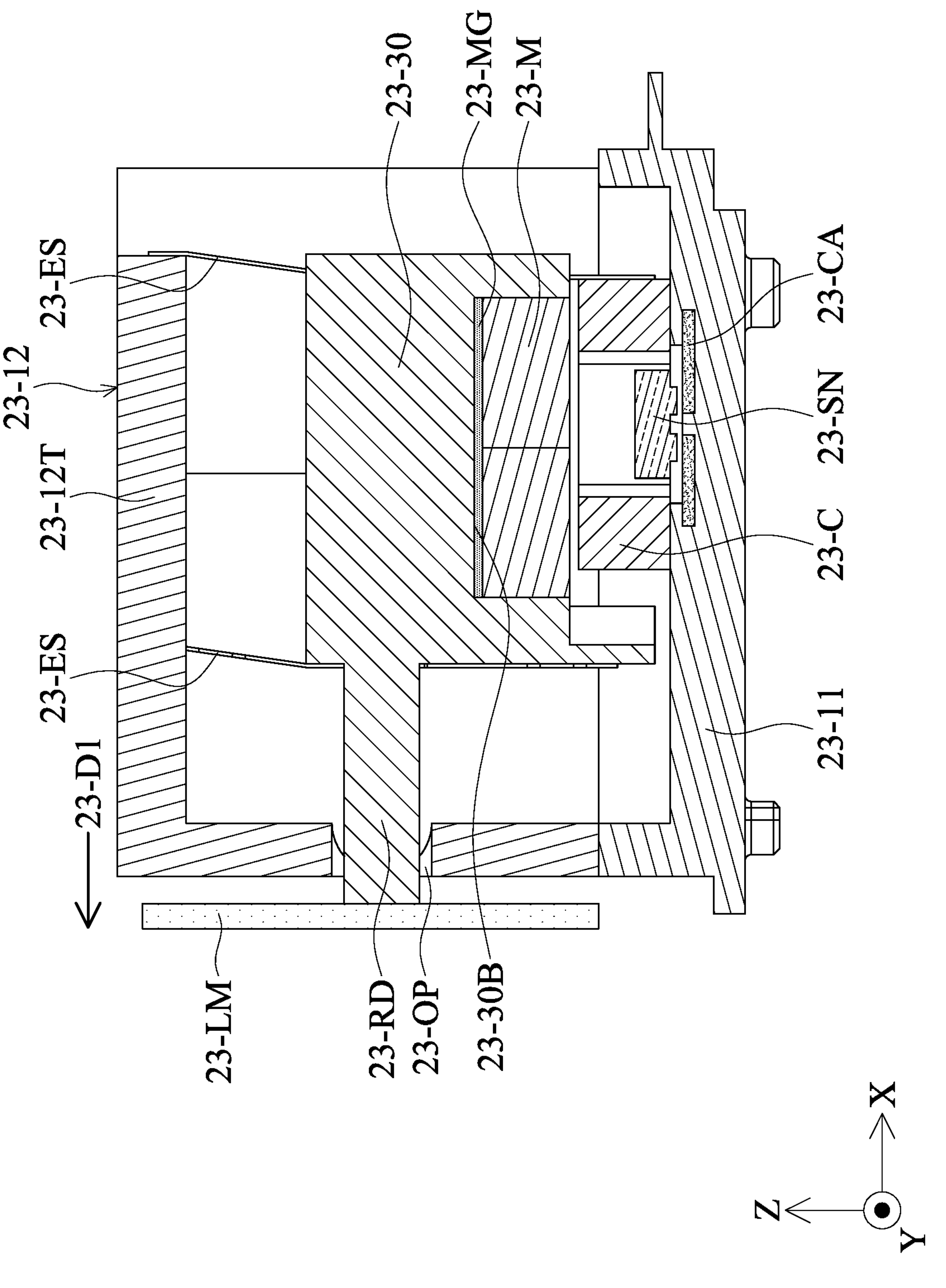

FIGS. 252 and 253 are schematic diagrams of the movable portion and the optical element driven by the driving assembly.

Figure 254:
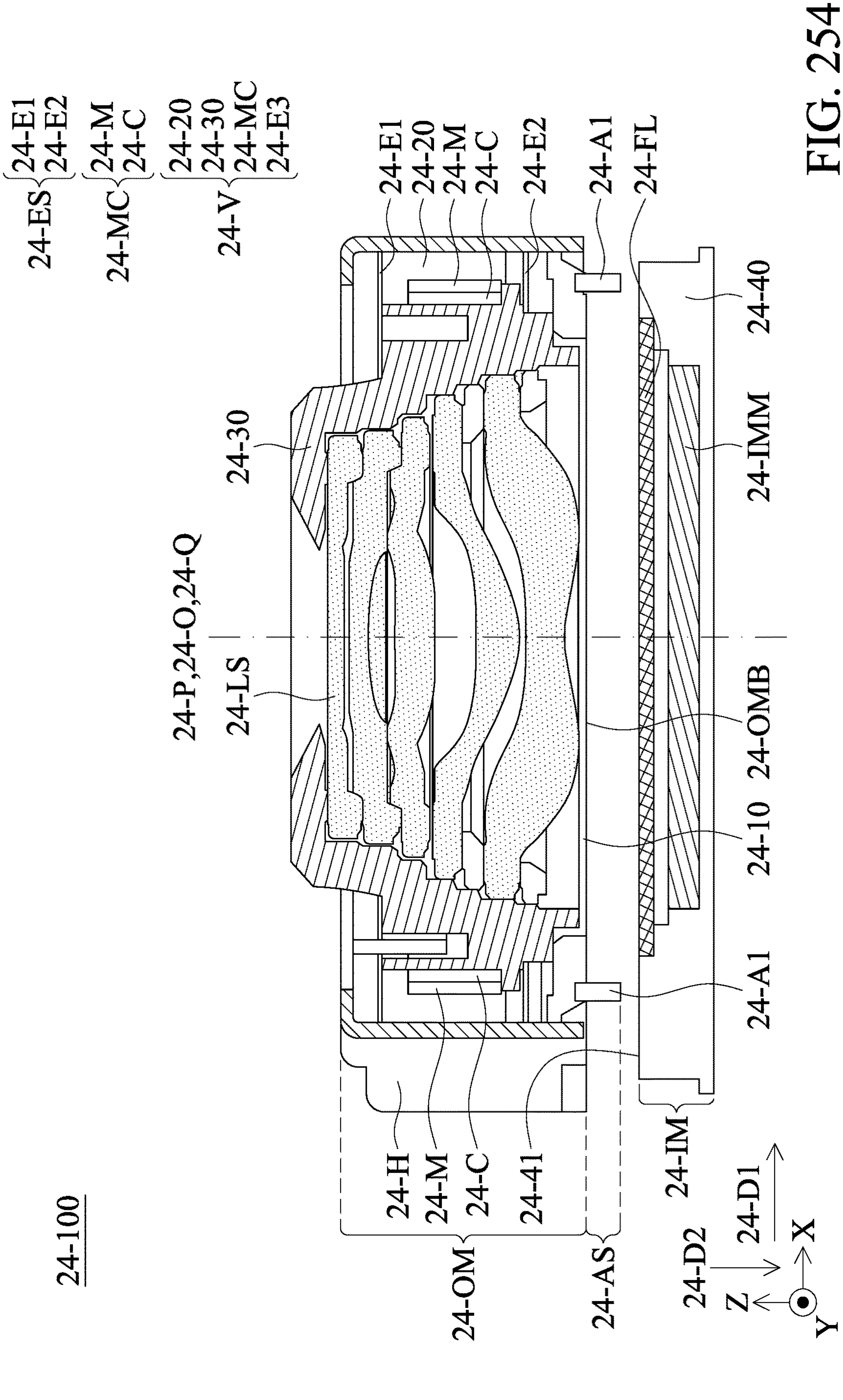

FIG. 254 is a schematic sectional view of the optical module, the adjustment assembly, and the image sensor module of the method for adjusting the optical system according to an embodiment of the present invention.

Figure 255:
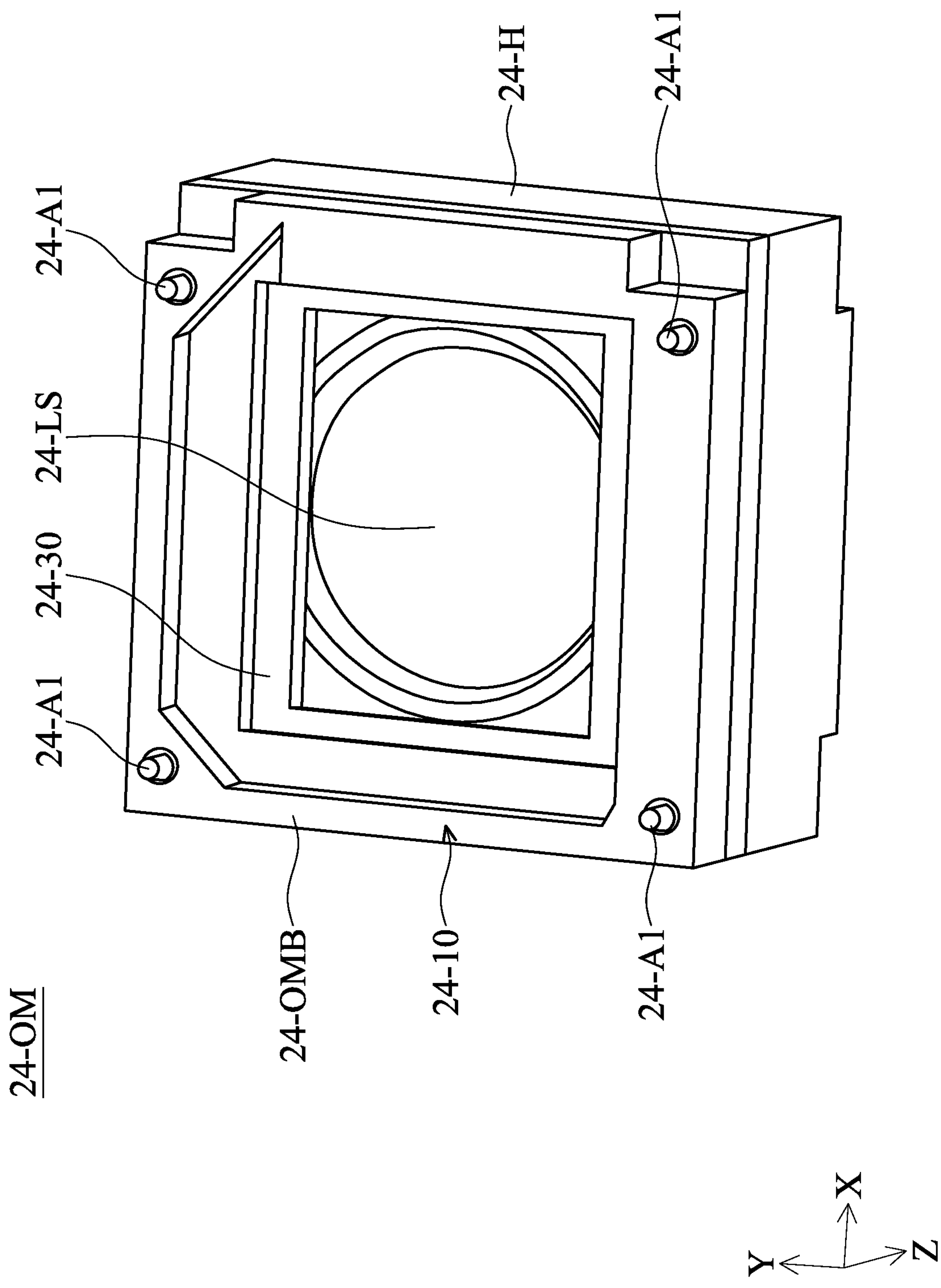

FIG. 255 is a perspective bottom view of the optical module in FIG. 254.

FIGS. 256 to 259 are schematic diagrams showing the optical system in FIG. 254 being assembled and adjusted.

Figure 260:
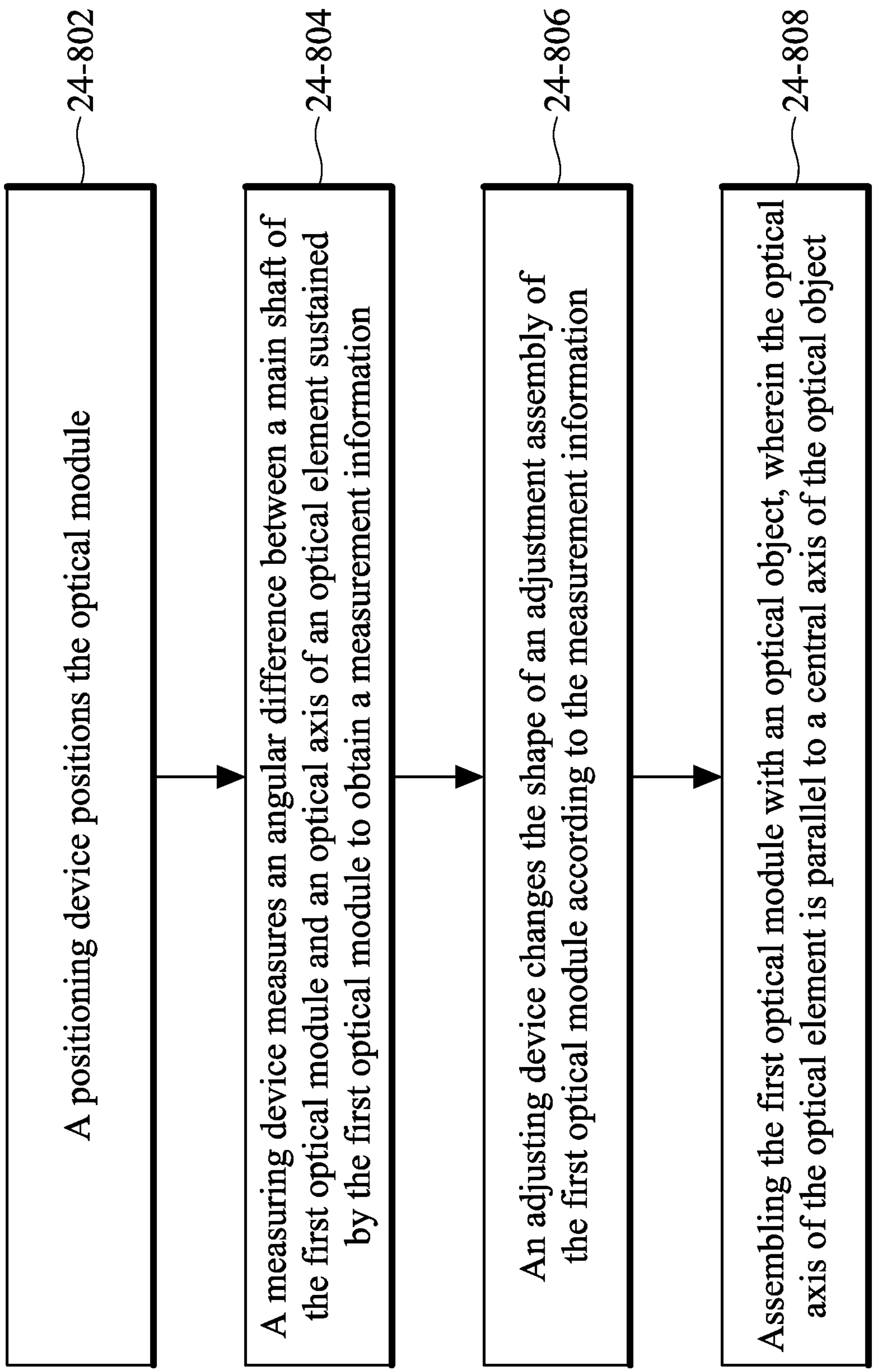

FIG. 260 is a flowchart illustrating a method for adjusting an optical system according to an embodiment of the present invention.

Figure 261:
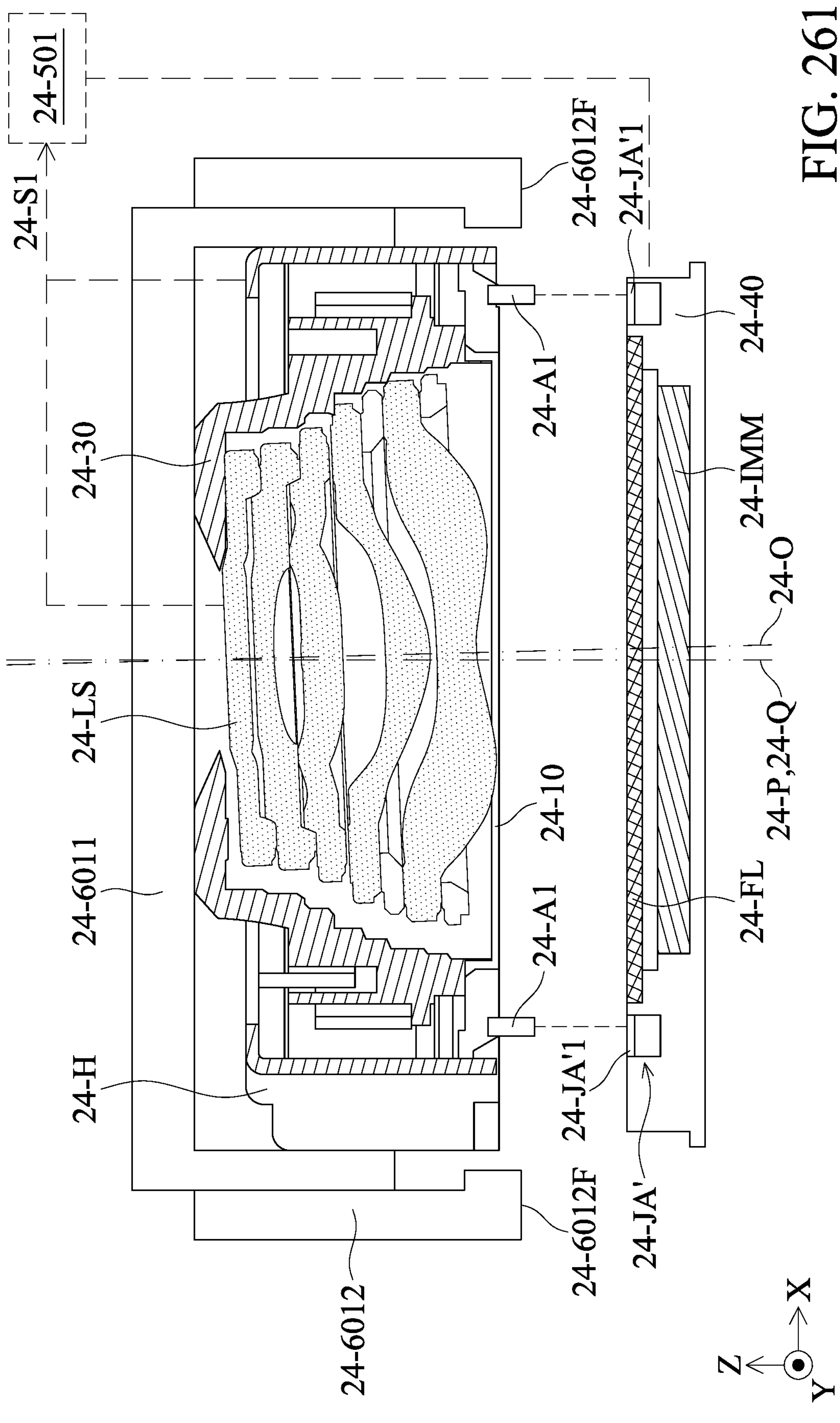
Figure 262:
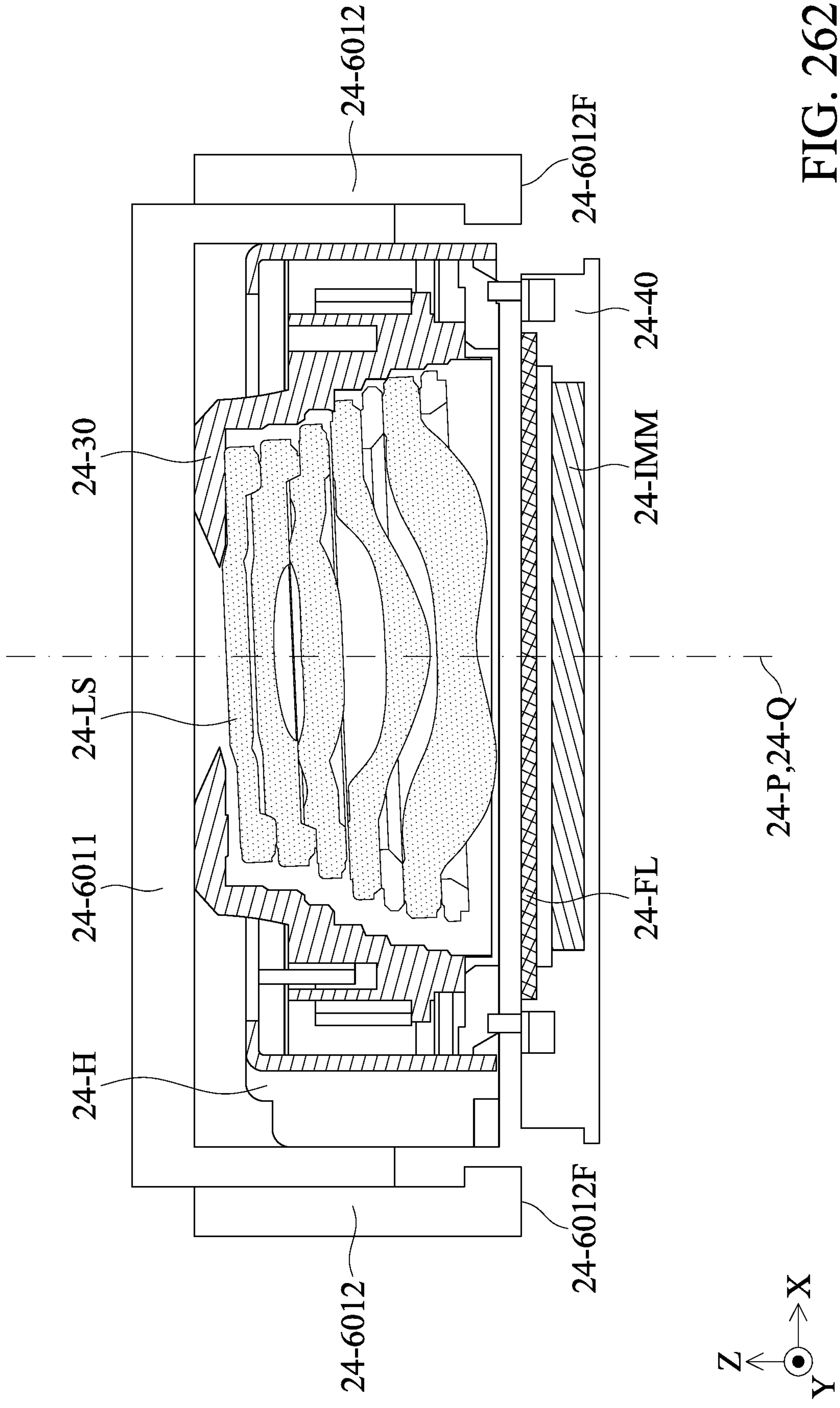

FIGS. 261 to 262 are schematic diagrams of an optical system according to another embodiment of the present invention.

Figure 263:
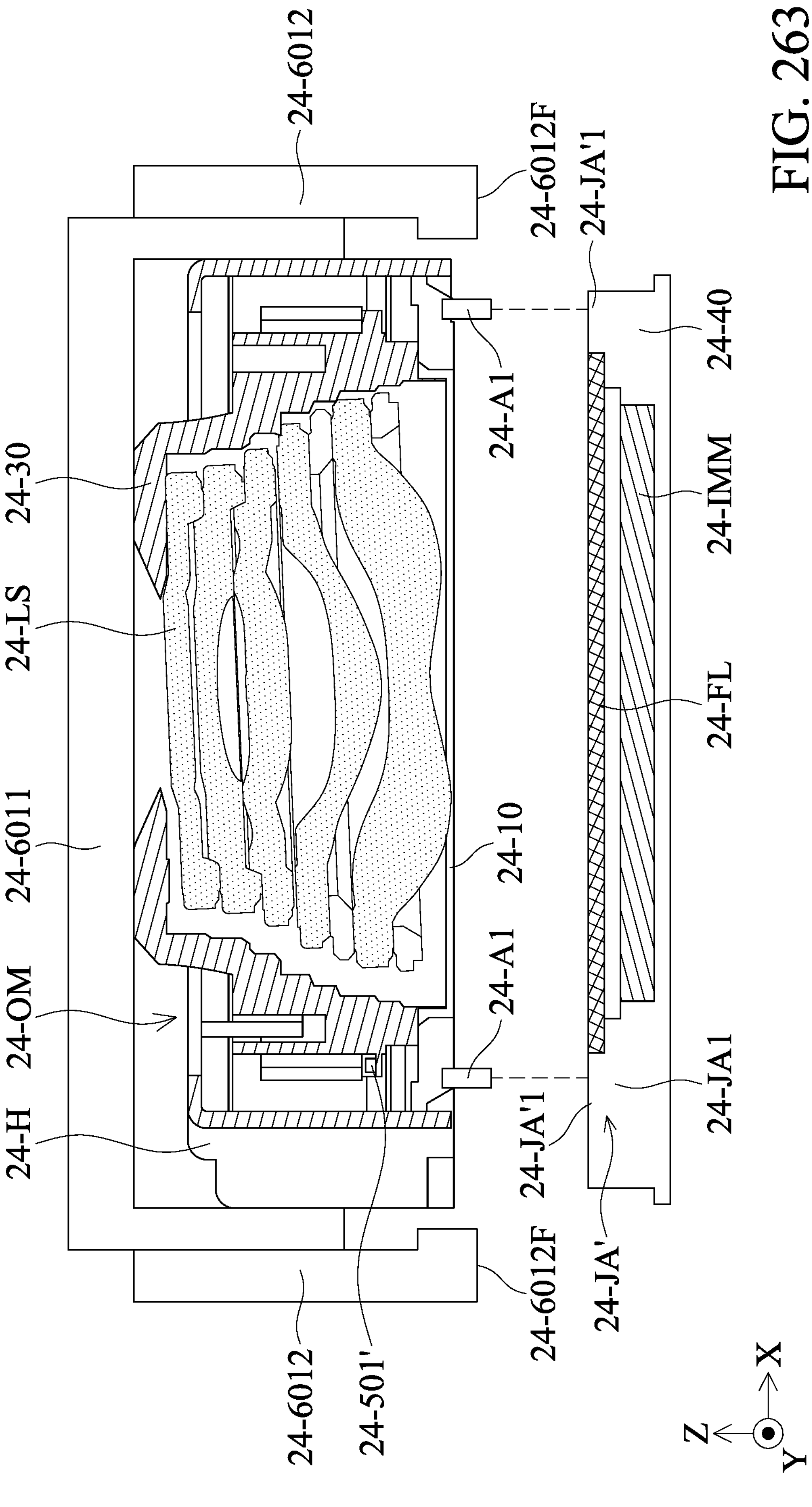

FIG. 263 is a schematic diagram of an optical system according to another embodiment of the present invention.

Figure 264:
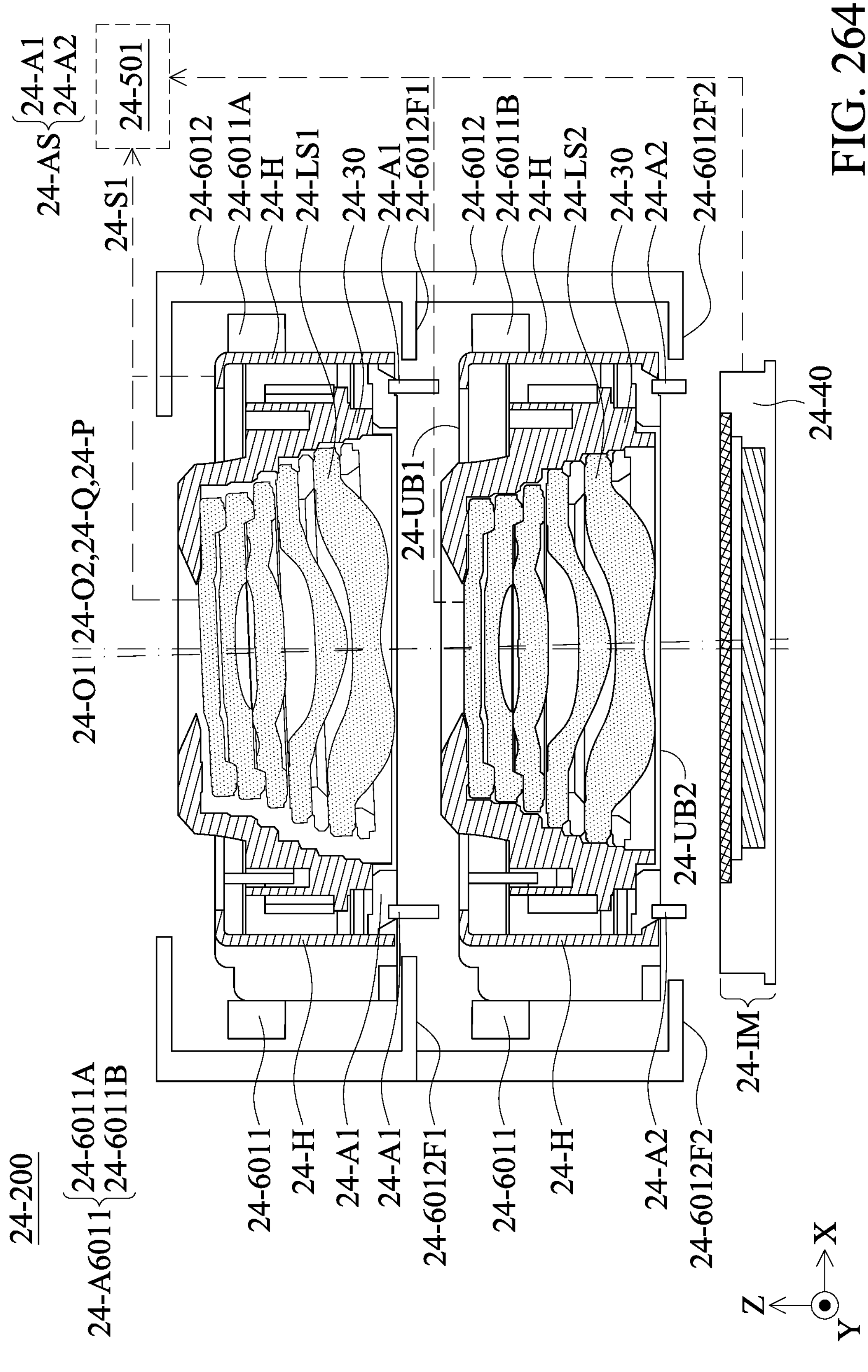
Figure 265:
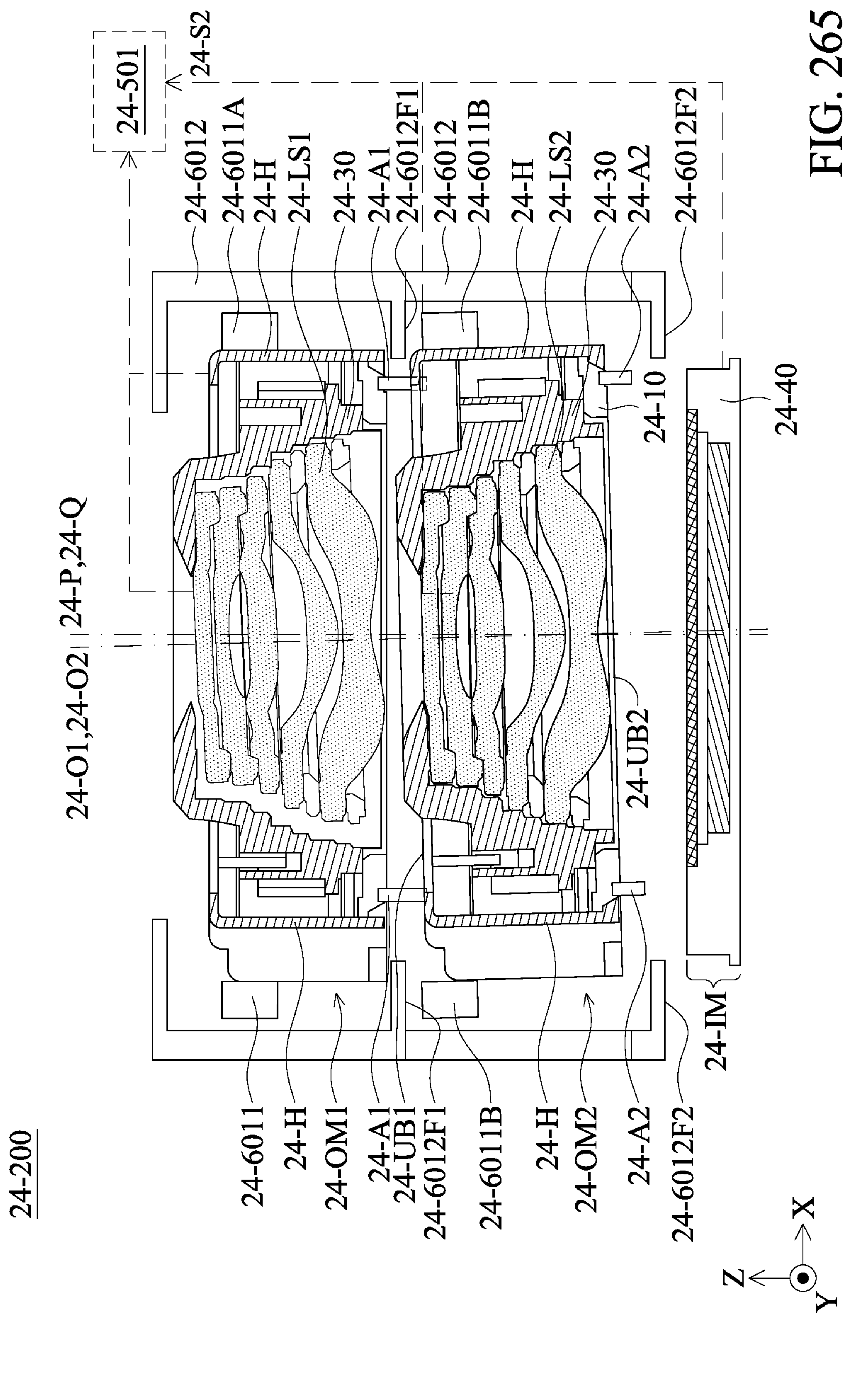
Figure 266:
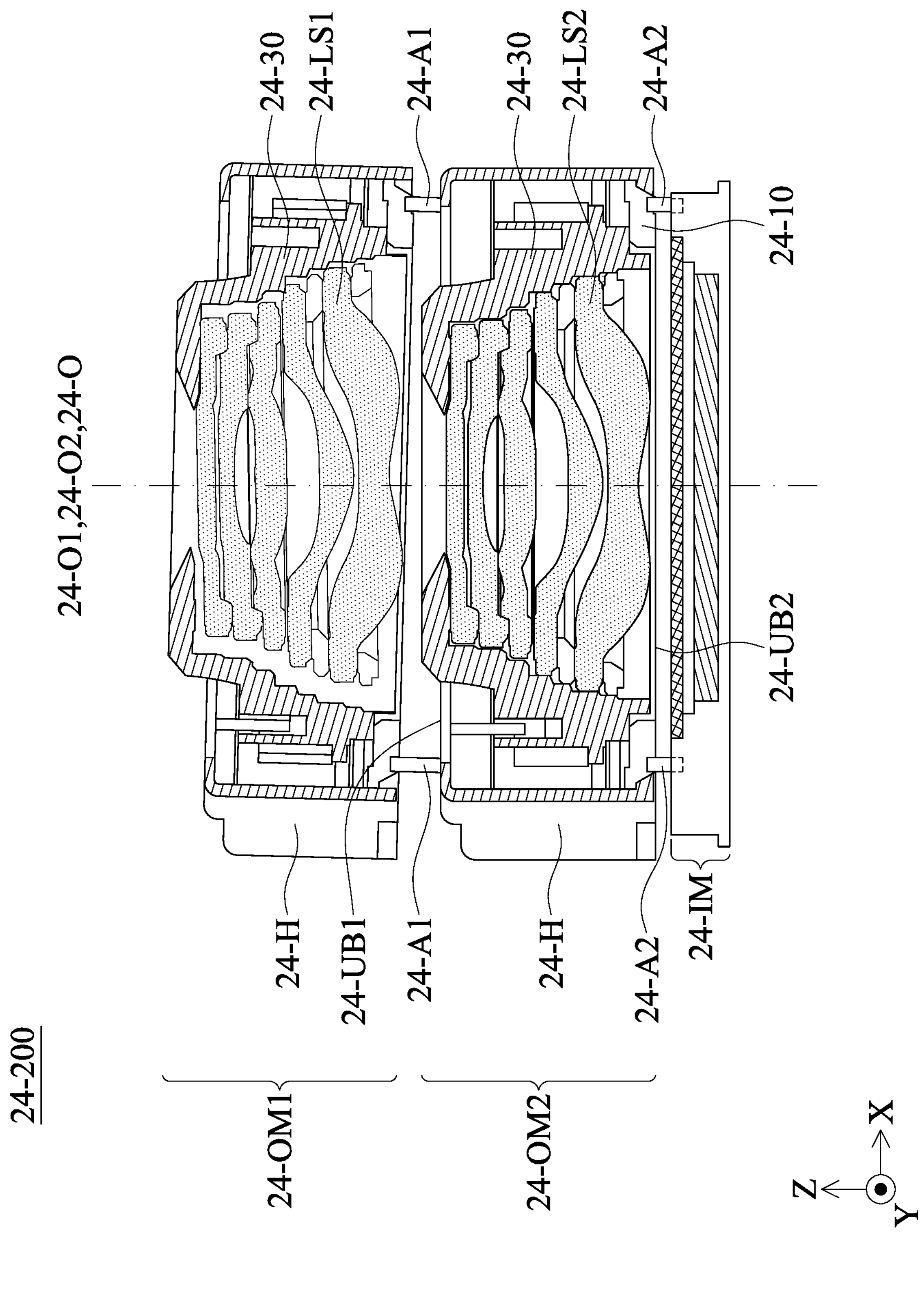

FIGS. 264 to 266 are schematic diagrams showing an optical system being assembled and adjusted according to another embodiment of the present invention.

Figure 267:
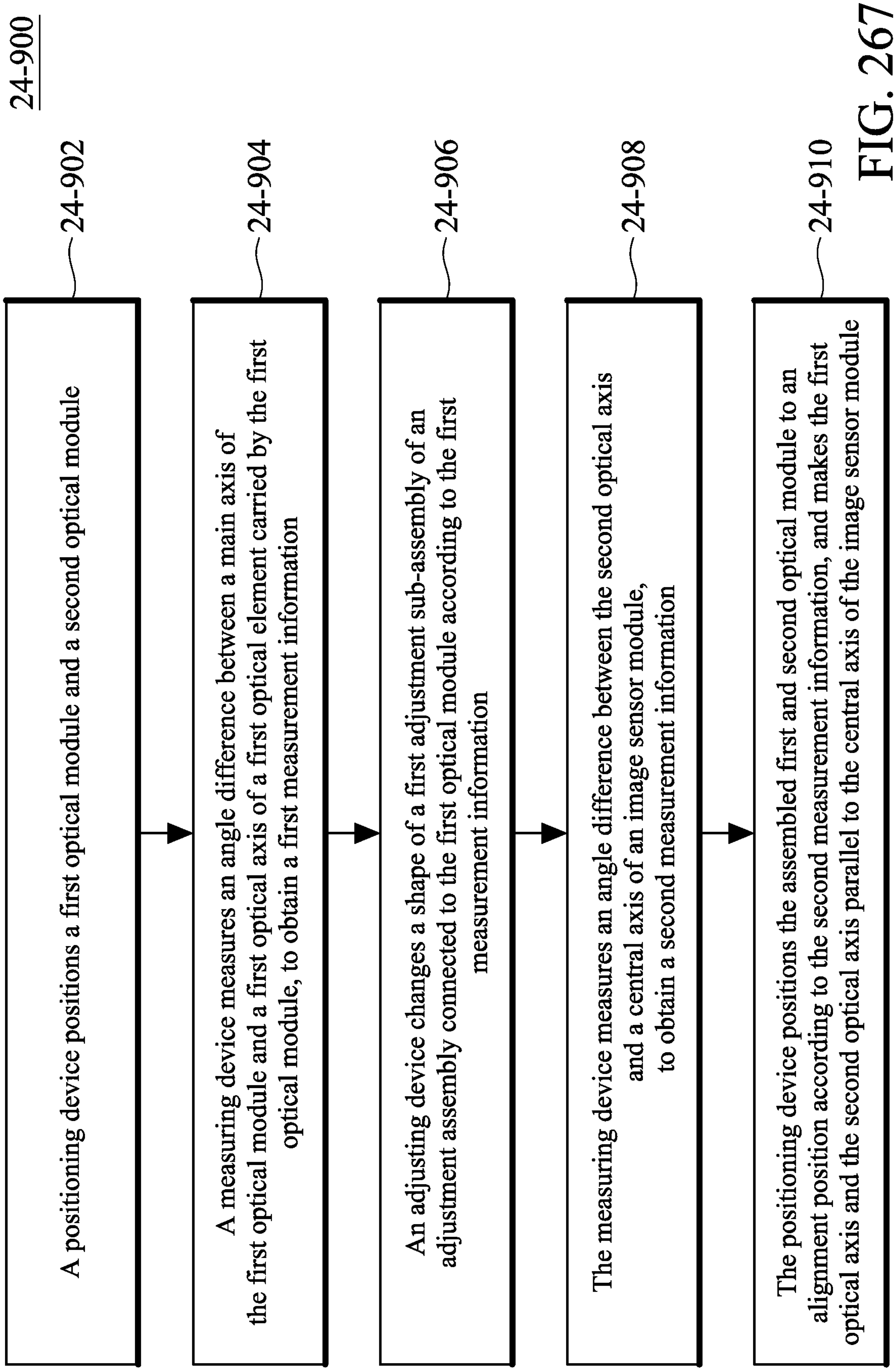

FIG. 267 is a flowchart illustrating a method for adjusting an optical system according to an embodiment of the present invention.

DETAILED DESCRIPTION OF THE INVENTION

The optical member driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as “lower” or “bottom,” “upper” or “top” may be used in the following embodiments in order to describe the relationship between one element and another element in the figures. It should be appreciated that if the device shown in the figures is flipped upside-down, the element located on the “lower” side may become the element located on the “upper” side.

It should be understood that although the terms “first,” “second,” “third,” etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

First Group of Embodiments

Figure 1:
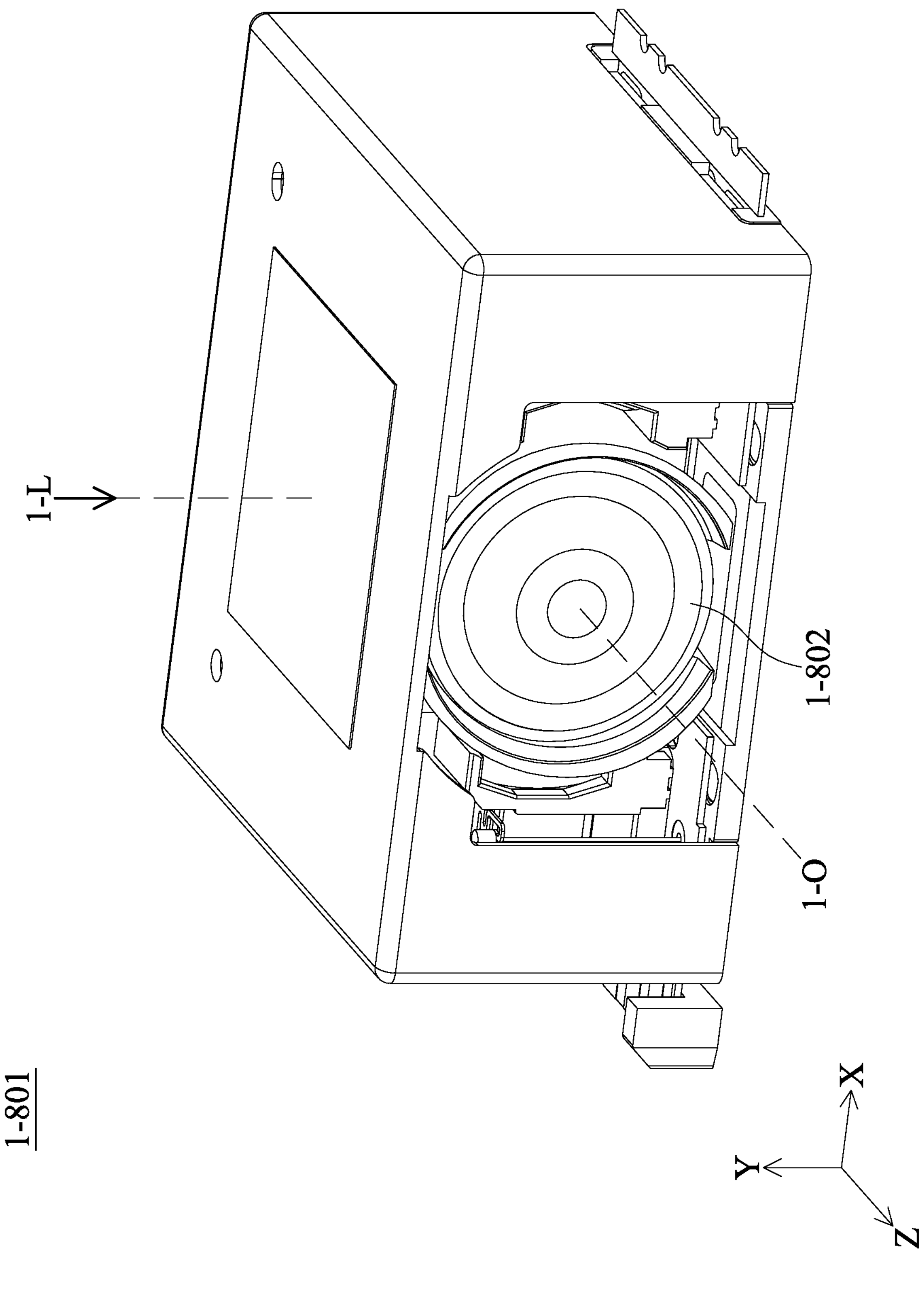
FIG. 1 is a perspective view of an optical element driving mechanism and an optical element in accordance with some embodiments of this disclosure.

FIG. 1 is a perspective view of an optical element driving mechanism 1-801 and an optical element 1-802 in accordance with some embodiments of this disclosure. The optical element 1-802 has an optical axis 1-O. The optical axis 1-O is an imaginary axis passing through the center of the optical element 1-802. The optical element driving mechanism 1-801 is a telephoto lens. Specifically, the telephoto lens means a reflecting element (not shown) is used to change the direction of a light 1-L. When the light 1-L outside the optical element driving mechanism 1-801 enters the optical element driving mechanism 1-801 from a first direction (Y-axis), the light 1-L is not parallel to the optical axis 1-O and the light 1-L may be substantially perpendicular to the optical axis 1-O as shown in FIG. 1. The reflecting element (not shown) may change the direction of the light 1-L so that the light 1-L is substantially parallel to the optical axis 1-O. After the light 1-L passes through the optical element driving mechanism 1-801, an image may be imaged on a light-detection element (not shown) (e.g. a charge-coupled detector, CCD).

The optical element driving mechanism 1-801 may drive the optical element 1-802 to move such as moving, rotating, and the like. The optical element driving mechanism 1-801 may drive the optical element 1-802 to move along a direction that is parallel to the optical axis 1-O to achieve auto focus (AF) to focus on the scene. Additionally, the optical element driving mechanism 1-801 may also drive the optical element 1-802 to move along a direction that is not parallel to the optical axis 1-O to achieve optical image stabilization (OIS) to compensate the deviation of the imaged image caused by shake or being impacted and solve the problem of blurry images or video. The quality of the image may be enhanced by AF and OIS.

Figure 2:
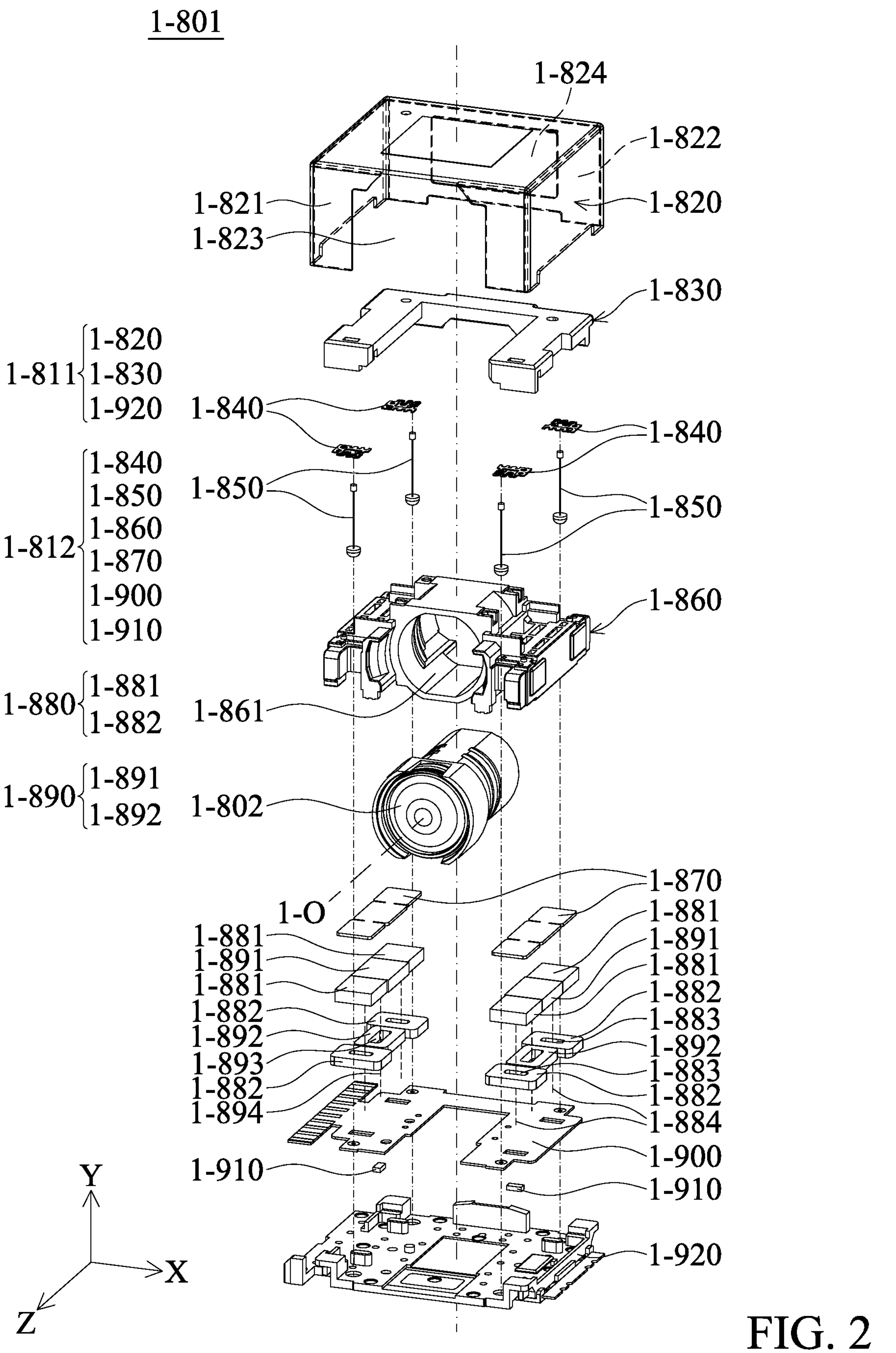
FIG. 2 is an exploded view of the optical element driving mechanism in FIG. 1.

FIG. 2 is an exploded view of the optical element driving mechanism 1-801 in FIG. 1. The optical element driving mechanism 1-801 includes a fixed part 1-811, a movable part 1-812, a first driving assembly 1-880, and a second driving assembly 1-890. The movable part 1-812 moves relative to the fixed part 1-811 and holds the optical element 1-802. The fixed part 1-811 includes a case 1-820, a frame 1-830, and a bottom 1-920. The movable part 1-812 includes four first elastic elements 1-840, four second elastic elements 1-850, a holder 1-860, two magnetic-permeable elements 1-870, a circuit assembly 1-900, and two sensing elements 1-910. The elements may be added or omitted.

The case 1-820 and the frame 1-830 are located above the bottom 1-920. The case 1-820 are connected to the bottom 1-920 and the space formed therein may accommodate the frame 1-830, the movable part 1-812, the first driving assembly 1-880, and the second driving assembly 1-890, and the like.

The case 1-820 is made of magnetic-permeable material and thus may have good magnetic retentivity, concentrate the lines of magnetic field, and the like. Magnetic materials are materials that may be magnetized when a magnetic field is applied, such as ferromagnetic material, steel (e.g. steel plate cold common, SPCC), iron/Ferrum (Fe), Nickel (Ni), Cobalt (Co), an alloy thereof. Preferably, the case 1-820 is made of material with high magnetic permeability.

The frame 1-830 may be made of non-conductive material or magnetic-permeable material such as plastic or metal alloy. When the frame 1-830 is made of magnetic-permeable material, the frame 1-830 may also have good magnetic retentivity, concentrate the lines of magnetic field, and have higher structural strength compared with non-conductive material.

The case 1-820 includes a sidewall 1-821 perpendicular to the optical axis 1-O and another sidewall 1-822 opposite to the sidewall 1-821. An opening 1-823 and an opening 1-824 are formed on the sidewall 1-821 and the sidewall 1-822, respectively. The positions of the opening 1-823 and the opening 1-824 correspond to the optical element 1-802. The optical element 1-802 is disposed between the sidewall 1-821 and the sidewall 1-822. After the light 1-L passes through the reflecting element (not shown), the light 1-L enters the optical element driving mechanism 1-801 via the opening 1-823 and leaves the optical element driving mechanism 1-801 via the opening 1-824.

The first elastic elements 1-840 are located over the holder 1-860. The first elastic elements 1-840 include elastic material and may be made of metal. The four second elastic elements 1-850 are elongated. The four second elastic elements 1-850 connect the four elastic elements 1-840 of the movable part 1-812 and the bottom 1-920 of the fixed part 1-811, respectively. Generally, a current may be supplied to the second elastic elements 1-850 to make the first driving assembly 1-880 or the second driving assembly 1-890 generates an electromagnetic force. However, the circumstances that no current is supplied to the second elastic elements 1-850 of this disclosure are acceptable. The second elastic elements 1-850 may mainly function as support.

The holder 1-860 is disposed between the frame 1-830 and the bottom 1-920. The holder 1-860 has a through hole 1-861 for holding the optical element 1-802. In some embodiments, a screw and its corresponding threaded structure may be configured between the through hole 1-861 and the optical element 1-802, so that the optical element 1-802 may be affixed in the through hole 1-861. The holder 1-860 is spaced apart from the case 1-820 and the bottom 1-920 of the fixed part 1-811, i.e. the holder 1-860 does not directly contact the case 1-820 and the bottom 1-920.

The magnetic-permeable element 1-870 is made of magnetic-permeable material. Preferably, the magnetic-permeable element 1-870 is made of material with high magnetic permeability. The functionality of the magnetic-permeable element 1-870 will be described with regard to FIG. 5.

The first driving assembly 1-880 includes four first magnetic elements 1-881 and four first coils 1-882 corresponding to the first magnetic elements 1-881. Two of the first coils 1-881 and the other two first coils 1-882 are disposed on the opposite sides of the holder 1-860. When viewed along the first direction (Y-axis), two of the first magnetic elements 1-881 and the other two first magnetic elements 1-881 are disposed on different sides of the optical axis 1-O, and two of the first coils 1-882 and the other two first coils 1-882 are disposed on different sides of the optical axis 1-O. The first magnetic element 1-881 and the first coil 1-882 are arranged along the first direction (Y-axis). The first driving assembly 1-880 may drive the holder 1-860 of the movable part 1-812 to move along a second direction (Z-axis) relative to the bottom 1-920 of the fixed part 1-811 to achieve AF.

The second driving assembly 1-890 includes two second magnetic elements 1-891 and two second coils 1-892 corresponding to the second magnetic elements 1-891. One of the second coils 1-892 and the other one of the second coils 1-892 are disposed on the opposite sides of the holder 1-860. When viewed along the first direction (Y-axis), one of the second magnetic elements 1-891 and the other one of the second magnetic elements 1-891 are disposed on different sides of the optical axis 1-O, and one of the second coils 1-892 and the other one of the second coils 1-892 are disposed on different sides of the optical axis 1-O. Therefore, when viewed along the first direction (Y-axis), the first driving assembly 1-880 and the second driving assembly 1-890 are disposed on different sides of the optical axis 1-O. The second magnetic elements 1-891 and the second coils 1-892 are arranged along the first direction (Y-axis) as well. The second driving assembly 1-890 drives the holder 1-860 of the movable part 1-812 to move along a third direction (X-axis) relative to the bottom 1-920 of the fixed part 1-811 to achieve OIS. The first direction (Y-axis), the second direction (Z-axis), and the third direction (X-axis) are different. In this embodiment, the first direction (Y-axis), the second direction (Z-axis), and the third direction (X-axis) are substantially perpendicular to each other.

The lower surface of each of the first magnetic elements 1-881 faces the first coils 1-882 and the lower surface of each of the second magnetic elements 1-891 faces the second coils 1-892. The lower surface of each of the first magnetic elements 1-881 is parallel to the lower surface of each of the second magnetic elements 1-891.

Each of the first coils 1-882 includes a perforation 1-883 and a winding axis 1-884. The winding axis 1-884 is an imaginary axis passing through the center of the perforation 1-883. Each of the second coils 1-892 includes a perforation 1-893 and a winding axis 1-894. The winding axis 1-894 is an imaginary axis passing through the center of the perforation 1-893. The winding axis 1-884 of the first coil 1-882 is parallel to the winding axis 1-894 of the second coil 1-892. When viewed along the second direction (Z-axis), the first coil 1-882 partially overlaps the second coil 1-892.

As shown in FIG. 2, each of the second magnetic elements 1-891 is disposed between two first magnetic elements 1-881, and each of the second coils 1-892 is disposed between two first coils 1-882. If one of the first magnetic elements 1-881 and one of the first coils 1-882 corresponding to each other are referred to as one first driving assembly 1-880, then there is more than one first driving assembly 1-880, and the second driving assembly 1-890 is disposed between the first driving assemblies 1-880. The first driving assemblies 1-880 and the second driving assembly 1-890 are arranged along the second direction (Z-axis). The second direction (Z-axis) is substantially parallel to the optical axis 1-O, so the optical axis 1-O is also substantially parallel to the arrangement direction of the first driving assemblies 1-880 and the second driving assembly 1-890.

When viewed along a direction that is parallel to the optical axis 1-O, the first driving assembly 1-880 at least partially overlaps the second driving assembly 1-890. Compared to the configuration that the first driving assembly 1-880 does not overlap the second driving assembly 1-890, such a configuration may reduce the size of the optical element driving mechanism 1-801 in the first direction (Y-axis). For example, if the size of the first driving assembly 1-880 in the first direction (Y-axis) is a and the size of the second driving assembly 1-890 in the first direction (Y-axis) is b, the sum of the size of the first driving assembly 1-880 and the second driving assembly 1-890 is at least a+b when the first driving assembly 1-880 does not overlap the second driving assembly 1-890. To the contrary, if the first driving assembly 1-880 does overlap the second driving assembly 1-890 when viewed along a direction that is parallel to the optical axis 1-O as in this disclosure, then the sum of the size of the first driving assembly 1-880 and the second driving assembly 1-890 is less than a+b.

The circuit assembly 1-900 is disposed on the bottom 1-920. The circuit assembly 1-900 may be a circuit board such as a flexible printed circuit (FPC), flexible-hard composite board, and the like. The circuit assembly 1-900 may include an electronic element (not shown) such as a capacitance, a resistor, an inductance, and the like. The first coils 1-882 and the second coils 1-892 are disposed on the circuit assembly 1-900.

The sensing element 1-910 may be a Hall sensor, a magnetoresistance effect (MR) sensor, a giant magnetoresistance effect (GMR) sensor, a tunneling magnetoresistance effect (TMR) sensor, and the like. The sensing element 1-910 may sense the movement condition of the holder 1-860 of the movable part 1-812 relative to the bottom 1-920 of the fixed part 1-811.

The two sensing elements 1-910 are disposed in the perforation 1-883 of one of the first coils 1-882 and the perforation 1-893 of one of the second coils 1-892, respectively. The sensing elements 1-910 are also disposed on the circuit assembly 1-900 because the first coils 1-882 and the second coils 1-892 are disposed on the circuit assembly 1-900. In this embodiment, the two sensing elements 1-910 may sense the movement condition of the holder 1-860 relative to the bottom 1-920 in different directions. For example, the sensing element 1-910 disposed in the perforation 1-883 of the first coil 1-882 may sense the movement condition of the holder 1-860 in the second direction (Z-axis) while the sensing element 1-910 disposed in the perforation 1-893 of the second coil 1-892 may sense the movement condition of the holder 1-860 in the third direction (X-axis).

Since the positions of the first coil 1-882, the second coil 1-892, and the sensing element 1-910 is pretty close to each other, the first coil 1-882, the second coil 1-892, and the sensing element 1-900 may be electrically connected to the circuit assembly 1-900 at the same time, so that the circuit is put together and thus the circuit route is simplified. That is the reason why no current flows through the second elastic element 1-850 of this disclosure is acceptable as described above.

Figure 3:
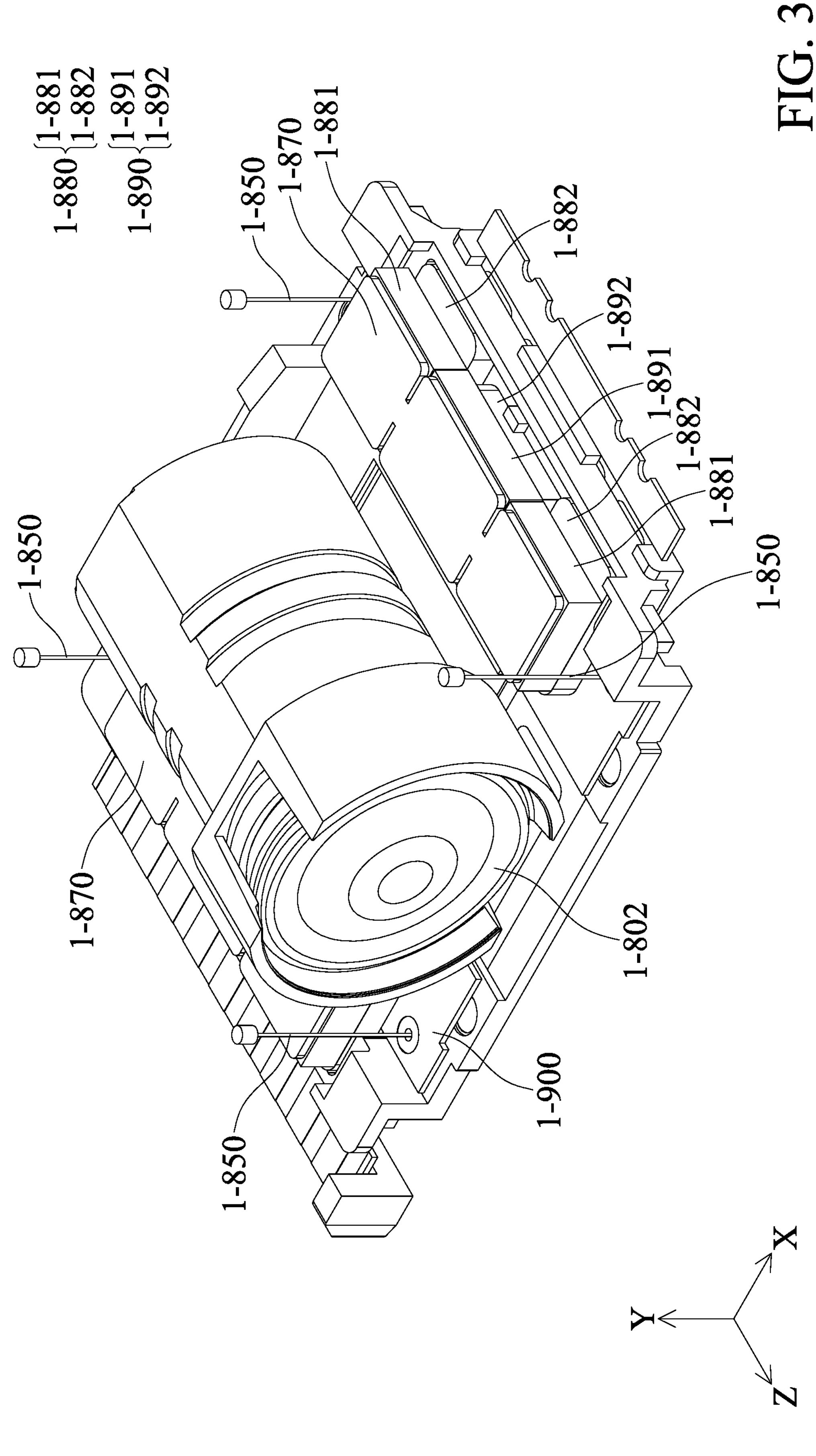
FIG. 3 is a perspective view of the optical element driving mechanism with some elements omitted.
Figure 4:
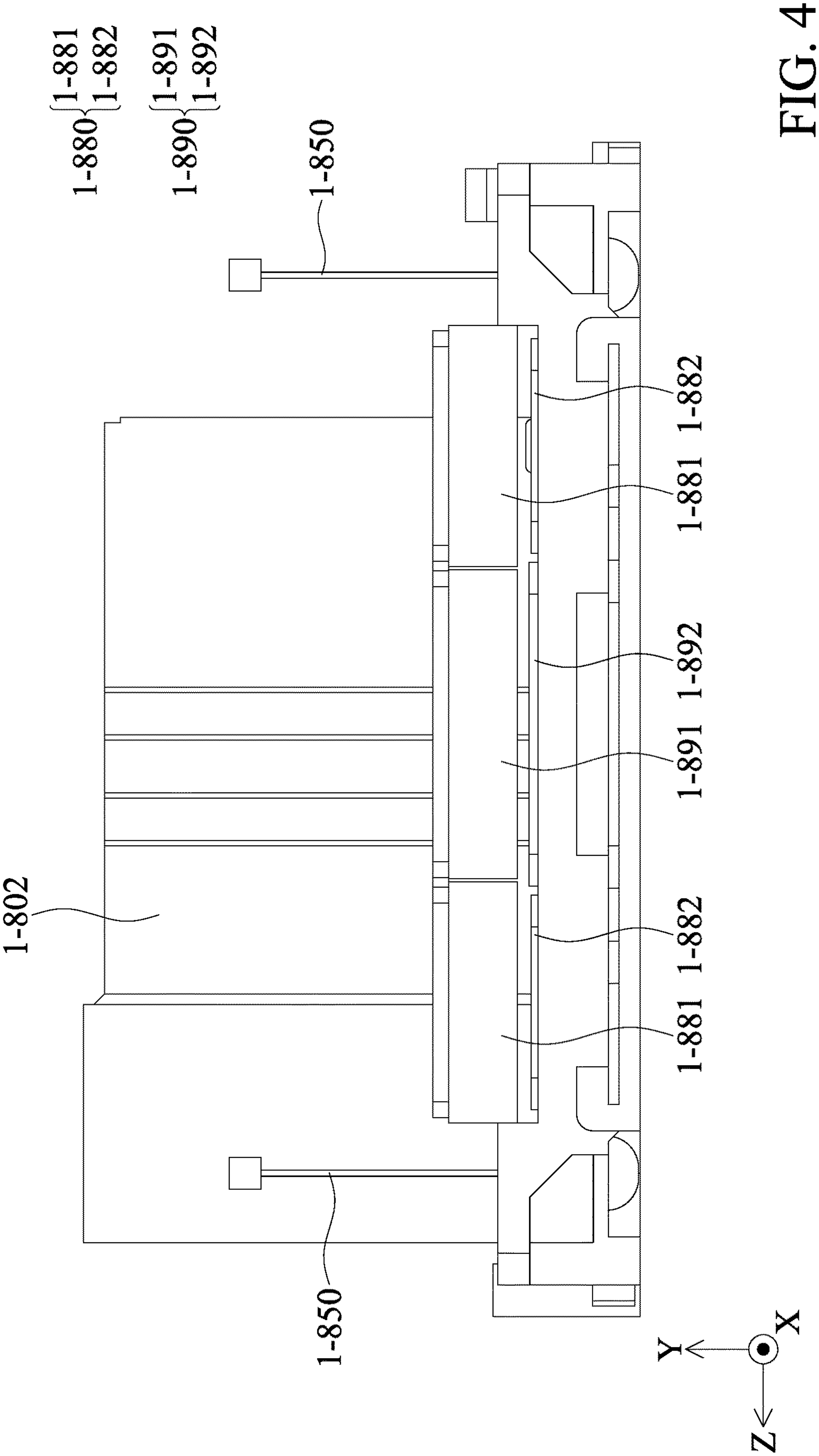
FIG. 4 is a side view of the optical element driving mechanism with some elements omitted.

Next, please refer to FIG. 3 and FIG. 4 together. FIG. 3 is a perspective view of the optical element driving mechanism 1-801 with some elements omitted. FIG. 4 is a side view of the optical element driving mechanism 1-801 with some elements omitted. As shown in FIG. 3 and FIG. 4, when viewed along the third direction (X-axis), the first driving assembly 1-880 at least partially overlaps the optical element 1-802, and the second driving assembly 1-890 at least partially overlaps the optical element 1-802 as well. Compared with configurations in which the first driving assembly 1-880 or the second driving assembly 1-890 does not overlap the optical element 1-802, such a configuration may reduce the size of the optical element driving mechanism 1-801 in the first direction (Y-axis) and achieve miniaturization of the optical element driving mechanism 1-801.

Figure 5:
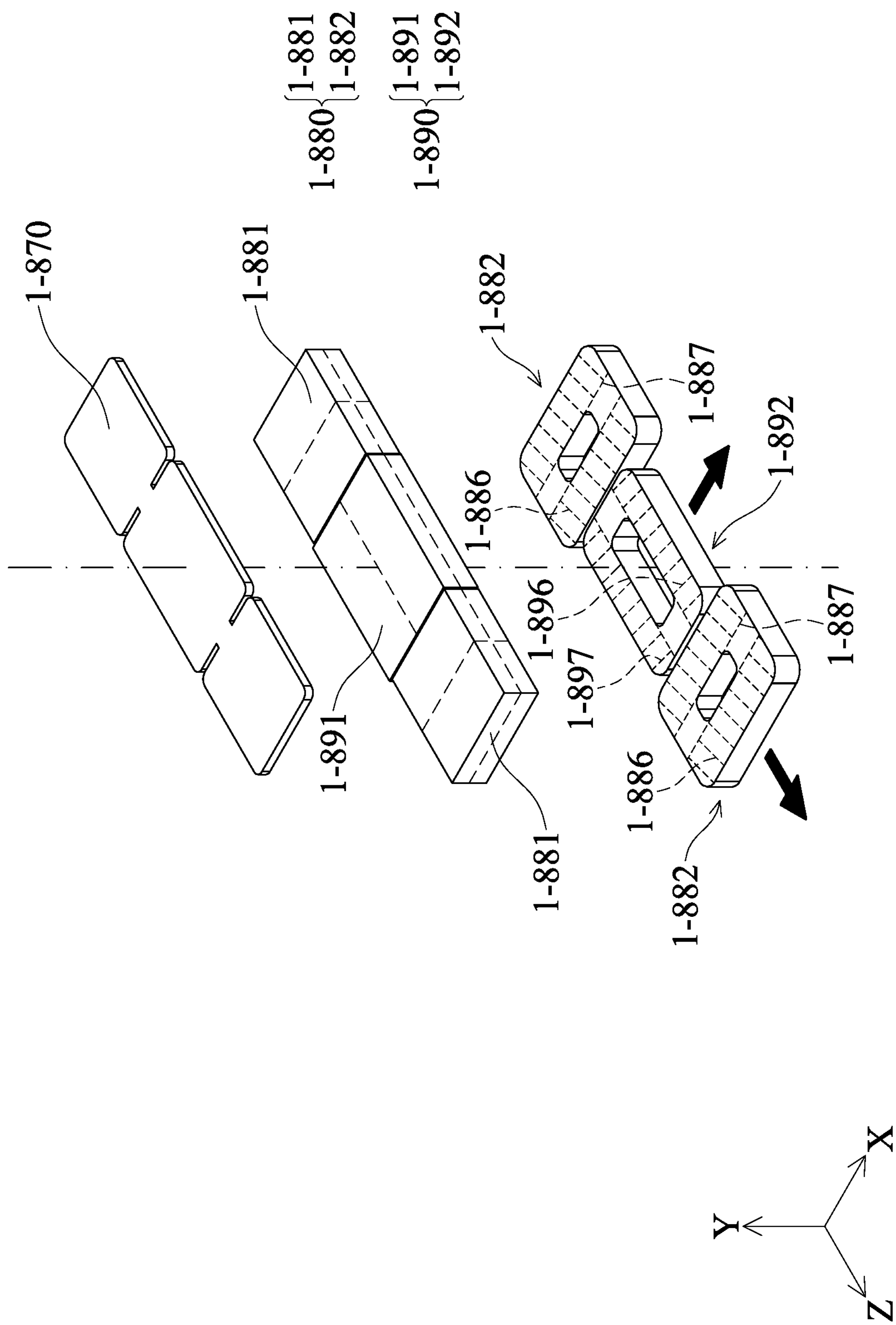
FIG. 5 is a schematic view of a magnetic-permeable element, a first driving assembly, and a second driving assembly.

FIG. 5 is a schematic view of the magnetic-permeable element 1-870, the first driving assembly 1-880, and the second driving assembly 1-890. The first magnetic elements 1-881 and the second magnetic elements 1-891 illustrated herein include multiple magnetic poles divided with dotted lines. The arrangement directions of the magnetic poles of the first magnetic elements 1-881 and the second magnetic elements 1-891 may be misunderstood. One may have the misperception that the magnetic poles of the first magnetic elements 1-881 and the second magnetic elements 1-891 are arranged in different, multiple directions. To avoid such misunderstandings, it should be noted that the word "the magnetic poles" used herein refer to a N-pole and S-pole pair that together generate closed lines of magnetic field.

Figure 6:
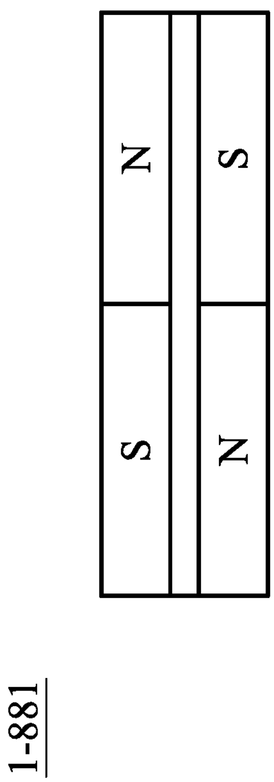
FIG. 6 and FIG. 7 are schematic views of a first magnetic element.
Figure 7:
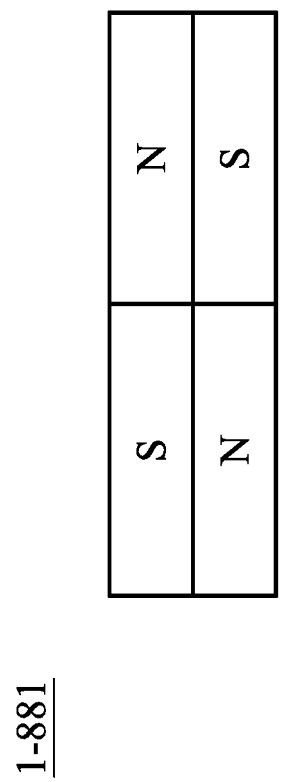

Please refer to FIG. 6 and FIG. 7 to understand the arrangement directions of the magnetic poles of the first magnetic elements 1-881. FIG. 6 and FIG. 7 are schematic views of any of the first magnetic elements 1-881 when viewed from the third direction (X-axis). The N-poles and the S-poles illustrated in FIG. 6 and FIG. 7 are exchangeable. The first magnetic element 1-881 may be a single multi-poles magnet (as shown in FIG. 6) or a magnet formed by gluing multiple magnets (as shown in FIG. 7). These two kinds of the first magnetic element 1-881 have different advantages. A single multi-poles magnet as shown in FIG. 6 is easy to be assembled, but a depletion region is formed in the middle of the multi-poles magnet during production. Magnetic force cannot be generated by the depletion region. If the first magnetic element 1-881 includes the depletion region, the weight of the optical element driving mechanism 1-801 may be increased. The magnet formed by gluing multiple magnets as shown in FIG. 7 does not have a deletion region, but additional gluing is required. It is noted that any of the second magnetic elements 1-891 may also be a single multi-poles magnet or a magnet formed by gluing multiple magnets. It means that when viewed from the second direction (Z-axis), the magnetic poles of the second magnetic elements 1-891 may have similar configurations as FIG. 6 or FIG. 7.

Please refer to FIG. 5 again. The first coil 1-882 includes a first segment 1-886 and a second segment 1-887 parallel to the third direction (X-axis) and facing to each other. The second coil 1-892 includes a third segment 1-896 and a fourth segment 1-897 parallel to the second direction (Z-axis) and facing to each other. The first segment 1-886, the second segment 1-887, the third segment 1-896, and the fourth segment 1-897 are "main current regions". Main current regions are regions that the current passing through may generate electromagnetic driving force. Therefore, the electromagnetic driving force generated by the current passing through the first segment 1-886, the second segment 1-887, the third segment 1-896, and the fourth segment 1-897 together with the first magnetic elements 1-881 and the second magnetic elements 1-891 may drive the holder 1-860 to move. The electromagnetic force generated by the regions that do not belong to "main current regions" (not labeled in inclined lines) is weaker, and thus it is more difficult for such electromagnetic force to drive the holder 1-860 to move.

The direction of the current flowing through the first segment 1-886 is opposite to that of the current flowing through the second segment 1-887. To make the whole first coil 1-882 move toward the same direction, the direction of the magnetic field corresponding the first segment 1-886 and the direction of the magnetic field corresponding to the second segment 1-887 have to be opposite as well, which may be derived from the right-hand rule (the rule describing the relationship of the current, the magnetic field, and the electromagnetic force). Therefore, the pole of the first magnetic element 1-881 corresponding to the first segment 1-886 is different than the pole of the first magnetic element 1-881 corresponding to the second segment 1-887. Similarly, the direction of the current flowing through the third segment 1-896 is opposite to the direction of the current flowing through the fourth segment 1-897, so the pole of the second magnetic element 1-891 corresponding to the third segment 1-896 is different than the pole of the second magnetic element 1-891 corresponding to the fourth segment 1-897.

The main current regions need to correspond to as much area of the poles as possible for generating as strong electromagnetic driving force as possible. Therefore, the arrangement direction of the magnetic poles of the first magnetic element 1-881 is the same as the arrangement direction of the first segment 1-886 and the second segment 1-887. Additionally, the arrangement direction of the magnetic poles of the second magnetic element 1-891 is the same as the arrangement direction of the third segment 1-896 and the fourth segment 1-897. Therefore, the magnetic poles of the first magnetic element 1-881 are arranged along the second direction (Z-axis), and the magnetic poles of the second magnetic element 1-891 are arranged along the third direction (X-axis).

In addition, for clarity of illustration, an arrow is used to indicate the direction of the electromagnetic driving force. The flow direction of the current may be clockwise or counterclockwise. When the current flows through the first coil 1-882, the direction of the generated electromagnetic driving force between the main current regions (the first segment 1-886 and the second segment 1-887) and the first magnetic element 1-881 is in the second direction (including +Z-axis and −Z-axis, only +Z-axis is shown in FIG. 5), so the holder 1-860 may be driven to move along the second direction (Z-axis).

When the current flows through the second coil 1-892, the direction of the generated electromagnetic driving force between the main current regions (the third segment 1-896 and the fourth segment 1-897) and the second magnetic element 1-891 is in the third direction (including +X-axis and −X-axis, only +X-axis is shown in FIG. 5), so the holder 1-860 may be driven to move along the third direction (X-axis).

The shape profile of the magnetic-permeable element 1-870 is designed to correspond to the shape profile of the first magnetic element 1-881 and the second magnetic element 1-891. The magnetic-permeable element 1-870 may be integrally formed to simplify the gluing process. One magnetic-permeable element 1-870 is connected to two first magnetic elements 1-881 and one second magnetic element 1-891 at the same time. For example, for gluing one magnetic-permeable element 1-870 that is integrally formed to two first magnetic elements 1-881 and one second magnetic element 1-891, the gluing process only has to be done once. If the magnetic-permeable element 1-870 is not integrally formed, then the gluing process of connecting the magnetic-permeable element 1-870 to two first magnetic elements 1-881 and one second magnetic element 1-891 has to be done several times. Thus, the magnetic-permeable element 1-870 that is integrally formed may simply the production process.

Furthermore, the volume of the first magnetic element 1-881 and the second magnetic element 1-891 may be small. If two first magnetic elements 1-881 and one second magnetic element 1-891 that are small are glued to one magnetic-permeable 1-870, then a group of elements with larger volume is formed, which is advantageous for the consequent assembling.

When viewed along the first direction (Y-axis), the magnetic-permeable element 1-870, the first driving assembly 1-880, and the second driving assembly 1-890 partially overlap. Since the magnetic-permeable element 1-870 is placed close to the first magnetic element 1-881 and the second magnetic element 1-891, the magnetic-permeable element 1-870 may attract and concentrate the lines of magnetic field of the first magnetic element 1-881 and the second magnetic element 1-891 to enhance the generated magnetic force.

Figure 8:
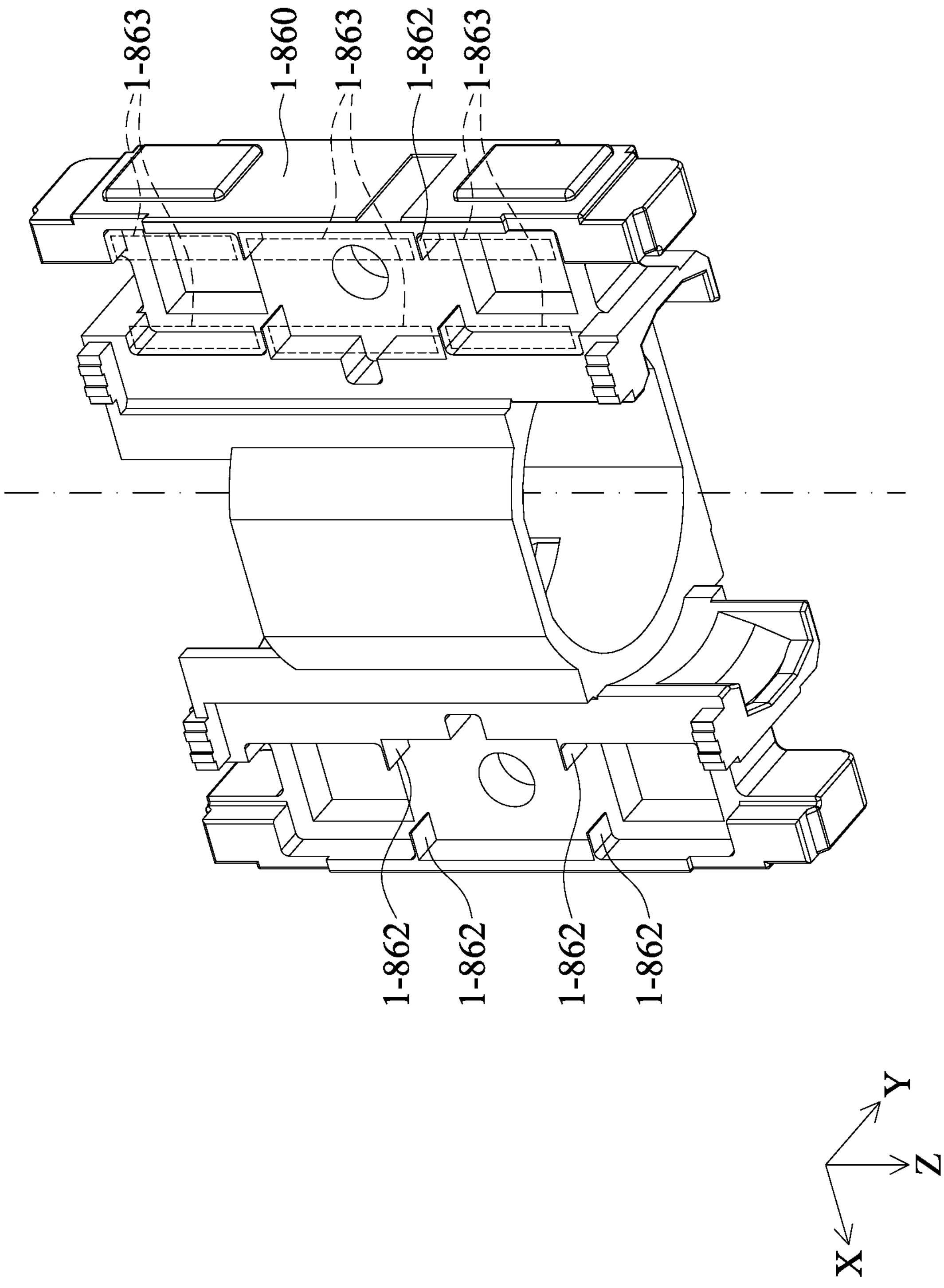
FIG. 8 is a perspective view of a holder illustrated from a different perspective than FIG. 1.

FIG. 8 is a perspective view of the holder 1-860 illustrated from a different perspective than FIG. 1. The side of the holder 1-860 that is close to the bottom 1-920 includes a plurality of protrusions 1-862 and a plurality of recesses 1-863. The holder 1-860 may be made of plastic, but plastic material deforms easily during the formation because of reasons such as thermal expansion and contraction. To avoid the magnetic-permeable element 1-870 cannot be received in the holder 1-860 because of the deformation of the holder 1-860, the protrusions 1-862 of the holder 1-860 may be engaged with the magnetic-permeable element 1-870. The protrusions 1-862 of the holder 1-860 are flakes. The recesses 1-863 of the holder 1-860 receive the magnetic-permeable element 1-870.

Figure 9:
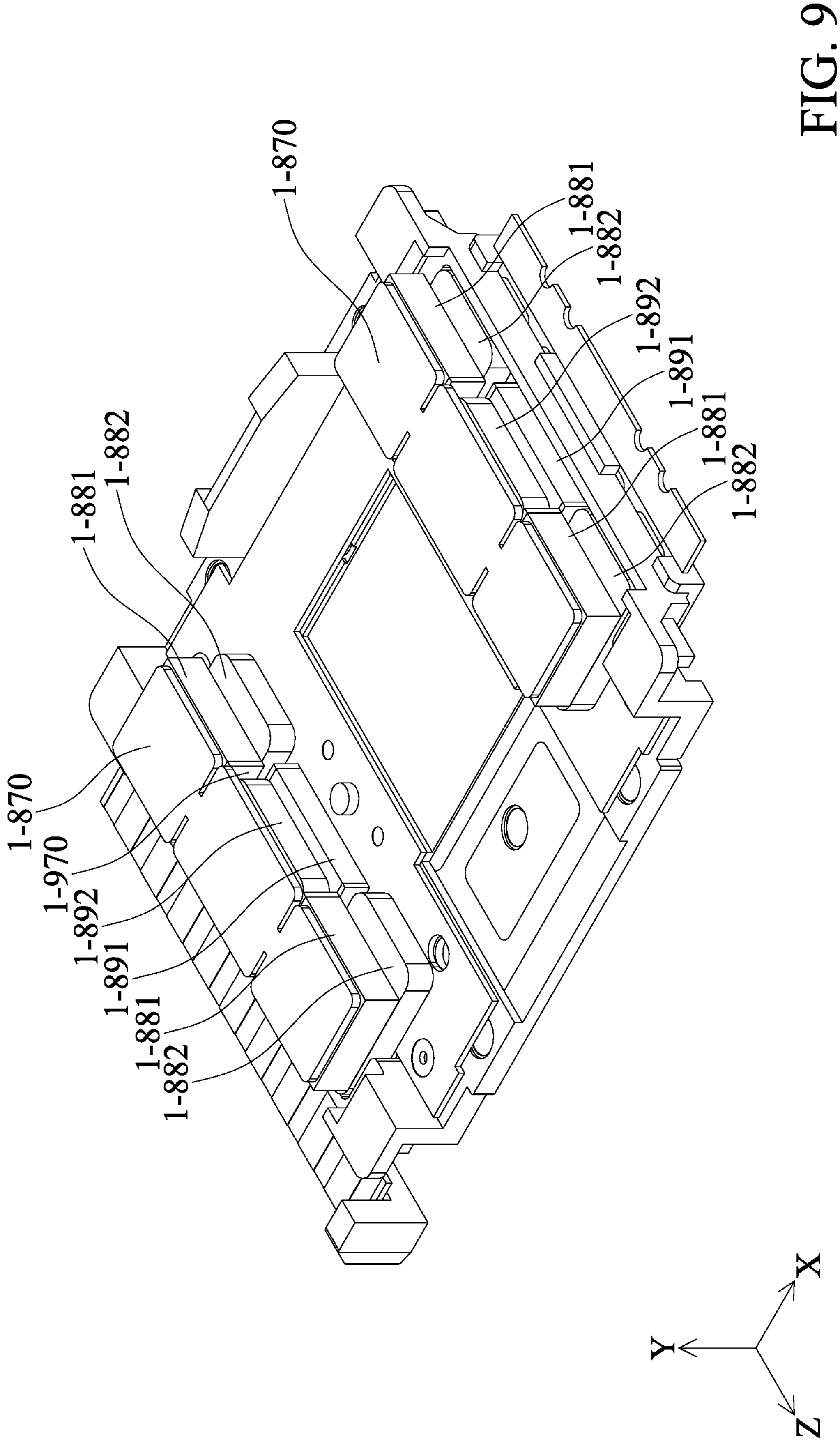
FIG. 9 is a configuration of the first driving assembly and the second driving assembly in accordance with some other embodiments of this disclosure.
Figure 10:
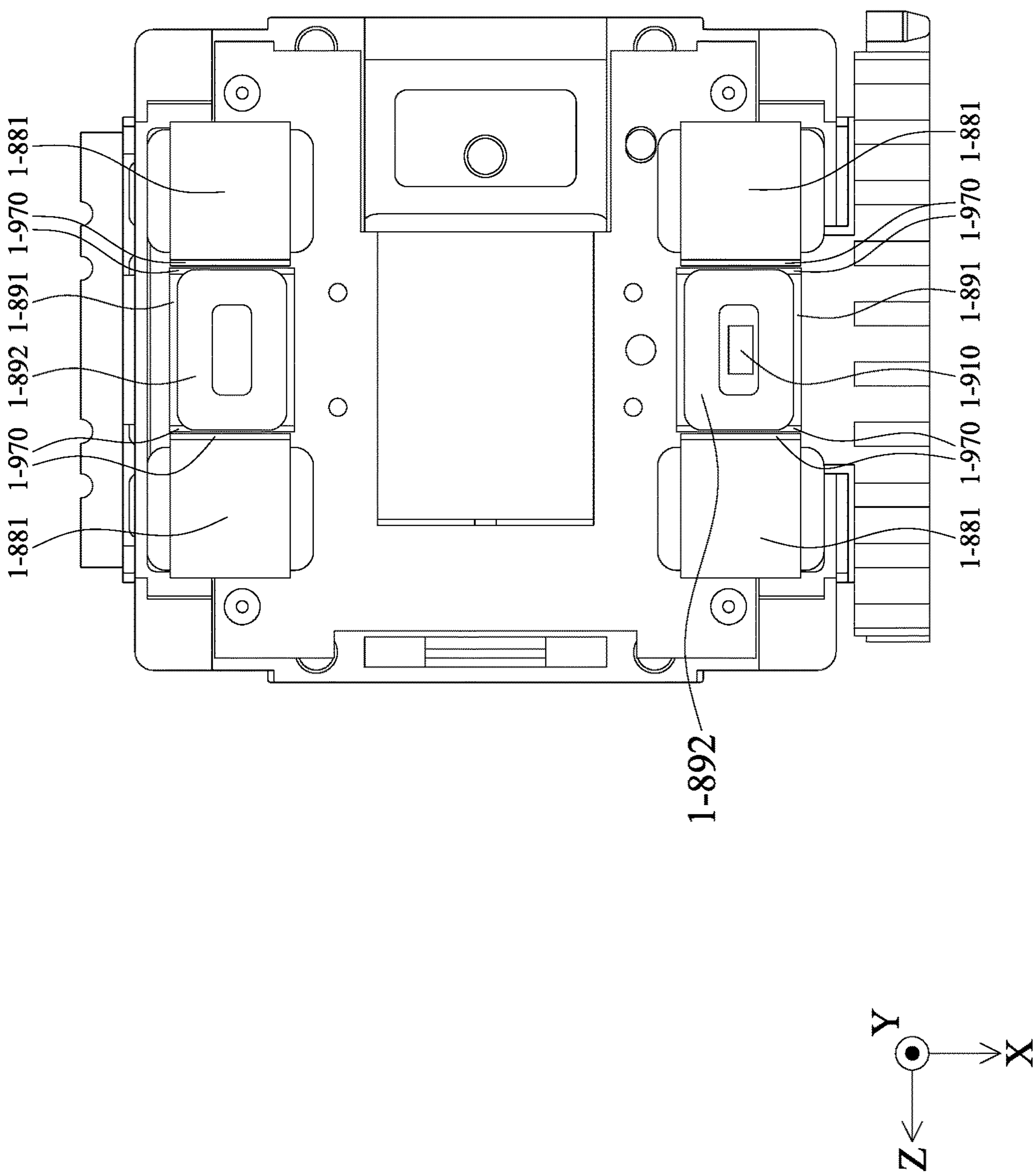
FIG. 10 is a top view of the first driving assembly and the second driving assembly in FIG. 9.

FIG. 9 is a configuration of the first driving assembly 1-880 and the second driving assembly 1-890 in accordance with some other embodiments of this disclosure. FIG. 10 is a top view of the first driving assembly 1-880 and the second driving assembly 1-890 in FIG. 9. In the following text, the same elements are denoted by the same symbols, similar elements are denoted by similar symbols, and the same contents are not repeated again.

In this embodiment, the positions of the second magnetic elements 1-891 of the second driving assembly 1-890 are exchanged with the positions of the second coils 1-892 of the second driving assembly 1-890, so that the second coils 1-892 are located over the second magnetic elements 1-891. The bottom surface of each of the first magnetic elements 1-881 faces the first coils 1-882, and the top surface of each of the second magnetic elements 1-891 faces the second coils 1-892. Additionally, the bottom surface of each of the first magnetic elements 1-881 and the top surface of each of the second magnetic elements 1-891 face different directions.

To avoid magnetic interference generated between the first magnetic elements 1-881 and the second coils 1-892 or between the second magnetic elements 1-891 and the first coils 1-882, four additional magnetic-permeable elements 1-970 are provided. The four magnetic-permeable elements 1-970 are disposed between the first driving assembly 1-880 and the second driving assembly 1-890. Therefore, when viewed along the second direction (Z-axis), the first driving assembly 1-880, the second driving assembly 1-890, and the magnetic-permeable elements 1-970 partially overlap.

As described above, an optical element driving mechanism is provided. Base on this disclosure, miniaturization of the optical element driving mechanism may be achieved by the arrangement and the configuration of the first driving assembly and the second driving assembly. Additionally, the displacement correction and the displacement compensation may be achieved by the first driving assembly and the second driving assembly.

Second Group of Embodiments

Figure 11:
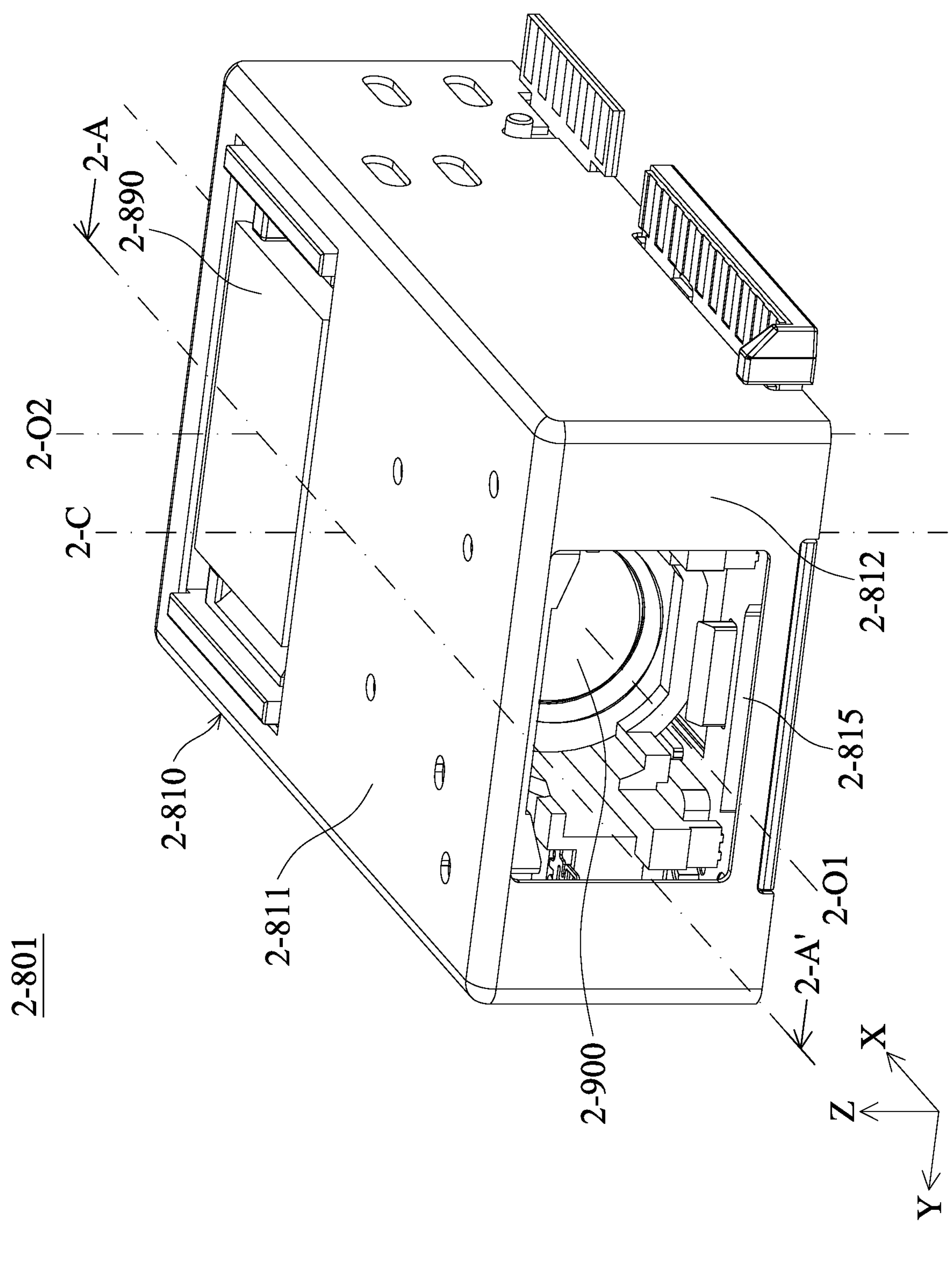
FIG. 11 is a perspective view illustrating an optical member driving mechanism in accordance with an embodiment of the present disclosure.

FIG. 11 is a schematic perspective view illustrating an optical member driving mechanism 2-801 in accordance with an embodiment of the present disclosure. It should be noted that, in this embodiment, the optical member driving mechanism 2-801 may be, for example, disposed in the electronic devices with camera function for driving an optical member 2-900, and can perform an autofocus (AF) and/or optical image stabilization (OIS) function.

As shown in FIG. 11, the optical member driving mechanism 2-801 has a central axis C that is substantially parallel to the Z axis. The optical member driving mechanism 2-801 has a first optical axis 2-O1 that is substantially parallel to the X axis. The optical member driving mechanism 2-801 includes a housing 2-810 which has a top surface 2-811 and a first side surface 2-812. The top surface 2-811 extends in a direction that is parallel to the first optical axis 2-O1 (i.e. the X-Y plane). The first side surface 2-812 extends from an edge of the top surface 2-811 along a direction (the Z axis) that is perpendicular to the first optical axis 2-O1. In some embodiments, the first side surface 2-812 extends from the edge of the top surface 2-811 along a direction that is not parallel to the first optical axis 2-O1. In addition, the housing 2-810 has a first opening 2-815 that is located on the first side surface 2-812, and the first optical axis 2-O1 may pass through the first opening 2-815.

The optical member driving mechanism 2-801 further includes a reflection member 2-890 that is disposed in the housing 2-810 of the optical member driving mechanism 2-801, and the reflection member 2-890 has a second optical axis 2-O2 that is substantially parallel to the Z axis. In the present embodiment, the first optical axis 2-O1 is substantially perpendicular to the second optical axis 2-O2, but it is not limited thereto. In some embodiments, the first optical axis 2-O1 is not parallel to the second optical axis 2-O2. As a result, light may enter the optical member driving mechanism 2-801 along the second optical axis 2-O2, and the direction of the light may be changed by the reflection member 2-890, such that the light may pass through the optical member 2-900 along the first optical axis 2-O1. After the light passes through the optical member 2-900, it may travel to an image sensor (not shown) that is disposed out of the optical member driving mechanism 2-801, and thereby an image may be generated on the electronic device.

Figure 12:
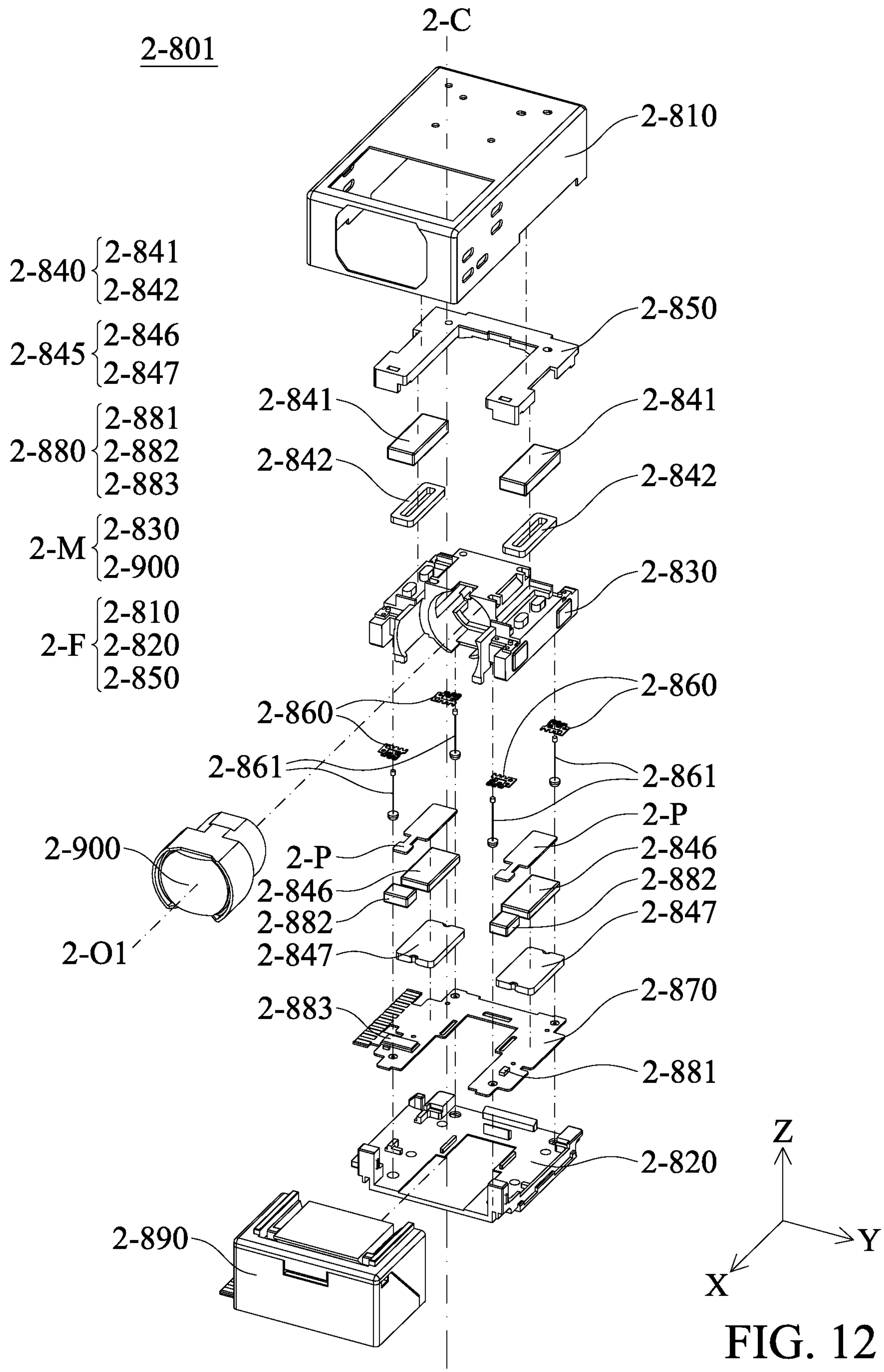
FIG. 12 is an exploded view illustrating the optical member driving mechanism shown in FIG. 11.

FIG. 12 is an exploded view illustrating the optical member driving mechanism 2-801 shown in FIG. 11. In the present embodiment, the optical member driving mechanism 2-801 has a substantial rectangular structure. The optical member driving mechanism 2-801 mainly includes a fixed portion 2-F, a movable portion 2-M, a plurality of first elastic members 2-860, a plurality of second elastic members 2-861, a first electromagnetic driving assembly 2-840 and a second electromagnetic driving assembly 2-845. The fixed portion 2-F includes a housing 2-810, a base 2-820, a frame 2-850, and a circuit component 2-870.

The housing 2-810 is disposed on the base 2-820, and protect the elements disposed inside the optical member driving mechanism 2-801. In some embodiments, the housing 2-810 is made of metal or another material with sufficient hardness to provide good protection. The frame 2-850 is disposed in and affixed to the housing 2-810. The circuit component 2-870 is disposed on the base 2-820 for transmitting electric signals, performing the autofocus (AF) and/or optical image stabilization (OIS) function. For example, the optical member driving mechanism 2-801 may control the position of the optical member 2-900 based on the aforementioned electric signals so as to form an image.

The movable portion 2-M is movable relative to the fixed portion 2-F. The movable portion 2-M mainly includes a carrier 2-830 which carries the optical member 2-900. As shown in FIG. 12, the carrier 2-830 is movably connected to the housing 2-810 and the base 2-820. The first elastic members 2-860 are disposed on the carrier 2-830. The second elastic members 2-861 extend in a vertical direction (the Z axis), and are connected to the first elastic members 2-860 and the base. As a result, the carrier 2-830 may be connected to the base 2-820 via the first elastic members 2-860 and the second elastic members 2-861. For example, the first elastic members 2-860 and the second elastic members 2-861 are made of metal or another suitable elastic material.

The first electromagnetic driving assembly 2-840 includes first magnetic members 2-841 and first driving coils 2-842. The first magnetic members 2-841 may be disposed on the frame 2-850, and the corresponding first driving coils 2-842 are disposed on the carrier 2-830. When current is applied to the first driving coils 2-842, an electromagnetic driving force may be generated by the first driving coils 2-842 and the first magnetic members 2-841 (i.e. the first electromagnetic driving assembly 2-840) to drive the carrier 2-830 and the optical member 2-900 carried therein to move along a horizontal direction (the X-Y plane) relative to the base 2-820, performing the autofocus (AF) and/or optical image stabilization (OIS) function.

In addition, the second electromagnetic driving assembly 2-845 includes second magnetic members 2-846 and second driving coils 2-847. The second magnetic members 2-846 may be disposed on the carrier 2-830, and the corresponding second driving coils 2-847 are disposed on the base 2-820. For example, the second driving coils 2-847 may be flat-plate coils such that the difficulty and the required time for assembly may be reduced. When a current is applied to the second driving coils 2-847, an electromagnetic driving force may be generated by the second electromagnetic driving assembly 2-845 to drive the carrier 2-830 and the optical member 2-900 carried therein to move along the first optical axis 2-O1 (the X axis) relative to the base 2-820, performing the autofocus (AF) function. The carrier 2-830 may be movably suspended between the frame 2-850 and the base 2-820 by the electromagnetic driving force of the first electromagnetic driving assembly 2-840, the second electromagnetic driving assembly 2-845 and the force exerted by the first elastic members 2-860, the second elastic members 2-861. Furthermore, a magnetic permeable plate 2-P is disposed on the second magnetic members 2-846 for concentrating the magnetic field of the second magnetic members 2-846 so that the efficiency of the second electromagnetic driving assembly 2-845 may be improved. In some embodiments, the magnetic permeable plate 2-P may be made of metal or another material with sufficient magnetic permeability.

The sensing assembly 2-880 includes a sensor 2-881, a reference member 2-882 and an integrated circuit (IC) component 2-883. In the present embodiment, the sensor 2-881 and the integrated circuit component 2-883 are disposed on the base 2-820, and the reference member 2-882 is disposed in the carrier 2-830. A plurality of reference members 2-882 may be disposed. For example, the reference member 2-882 is a magnetic member, the sensor 2-881 may detect the change of the magnetic field of the reference member 2-882, and the position of the carrier 2-830 (and the optical member 2-900) may be determined by the integrated circuit component 2-883. In some embodiments, one of the sensor 2-881 and the reference member 2-882 is disposed on the fixed portion 2-F, and the other of the sensor 2-881 and the reference member 2-882 is disposed on the movable portion 2-M.

Figure 13:
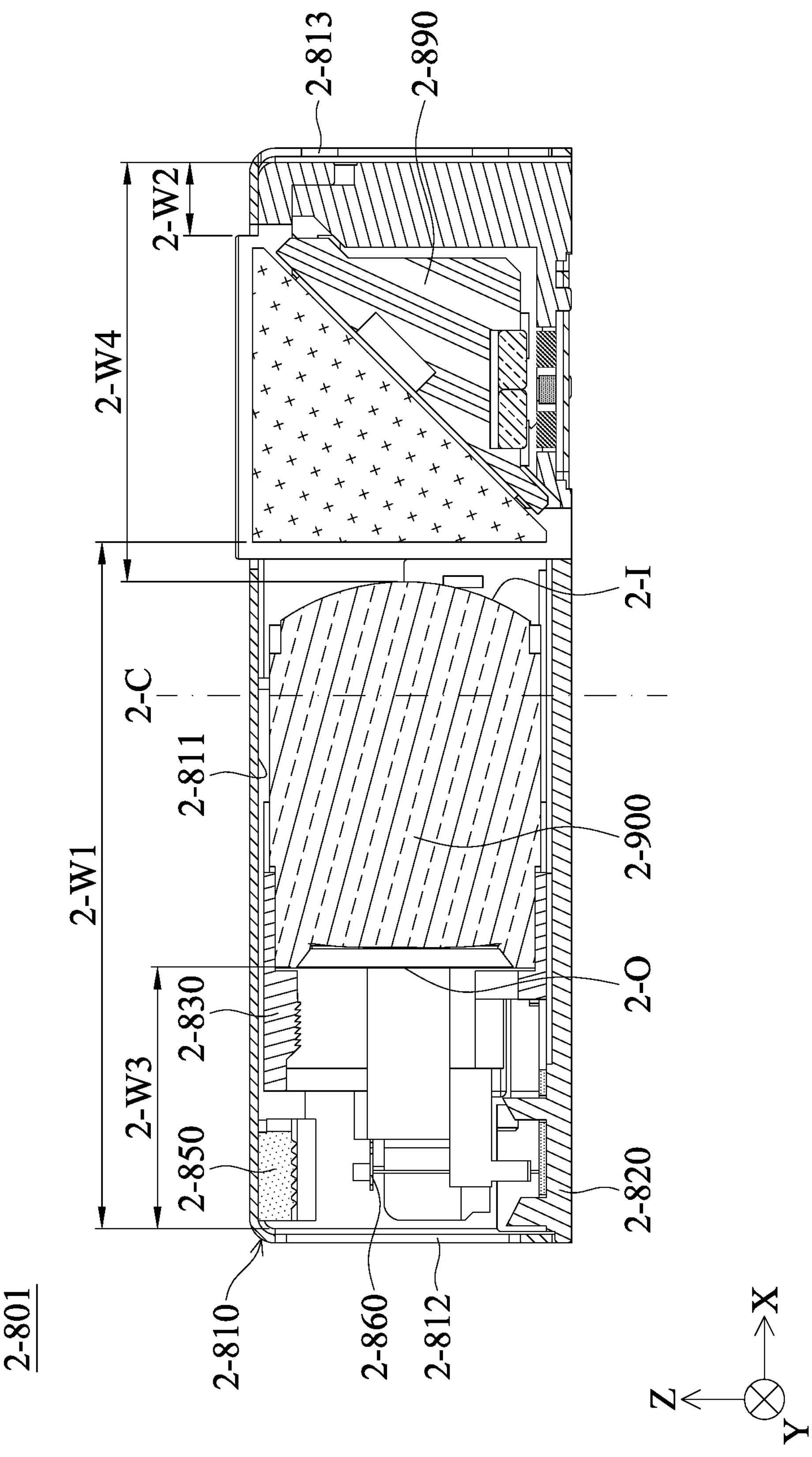
FIG. 13 is a cross-sectional view illustrating along line A-A shown in FIG. 11.

FIG. 13 is a cross-sectional view illustrating along line A-A shown in FIG. 11. As shown in FIG. 13, the optical member 2-900 has an incident end 2-I and an outlet end 2-O. In the present embodiment, the light may enter the optical member 2-900 from the incident end 2-I along the first optical axis 2-O1, and exit the optical member 2-900 from the outlet end 2-O. In the present embodiment, the first side surface 2-812 faces the outlet end 2-O of the optical member 2-900, and the second side surface 2-813 faces the incident end 2-I of the optical member 2-900.

Since the reflection member 2-890 is also disposed in the housing 2-810, the optical member 2-900 is not located at the center of the optical member driving mechanism 2-801. In the present embodiment, the reflection member 2-890 is closer to the second side surface 2-813 than the optical member 2-900, and the optical member 2-900 is closer to the first side surface 2-812 than the reflection member 2-890. In other words, the shortest distance (a first distance 2-W1) between the reflection member 2-890 and the first side surface 2-812 is longer than the shortest distance (a second distance 2-W2) between the reflection member 2-890 and the second side surface 2-813. The shortest distance (a third distance 2-W3) between the optical member 2-900 and the first side surface 2-812 is shorter than the shortest distance (a fourth distance 2-W4) between the optical member 2-900 and the second side surface 2-813. In the present embodiment, the frame 2-850 is disposed between the carrier 2-830 and the housing 2-810, and when viewed in a direction (the X axis) that is parallel to the first optical axis 2-O1, the frame 2-850 and the carrier 2-830 at least partially overlap.

Figure 14:
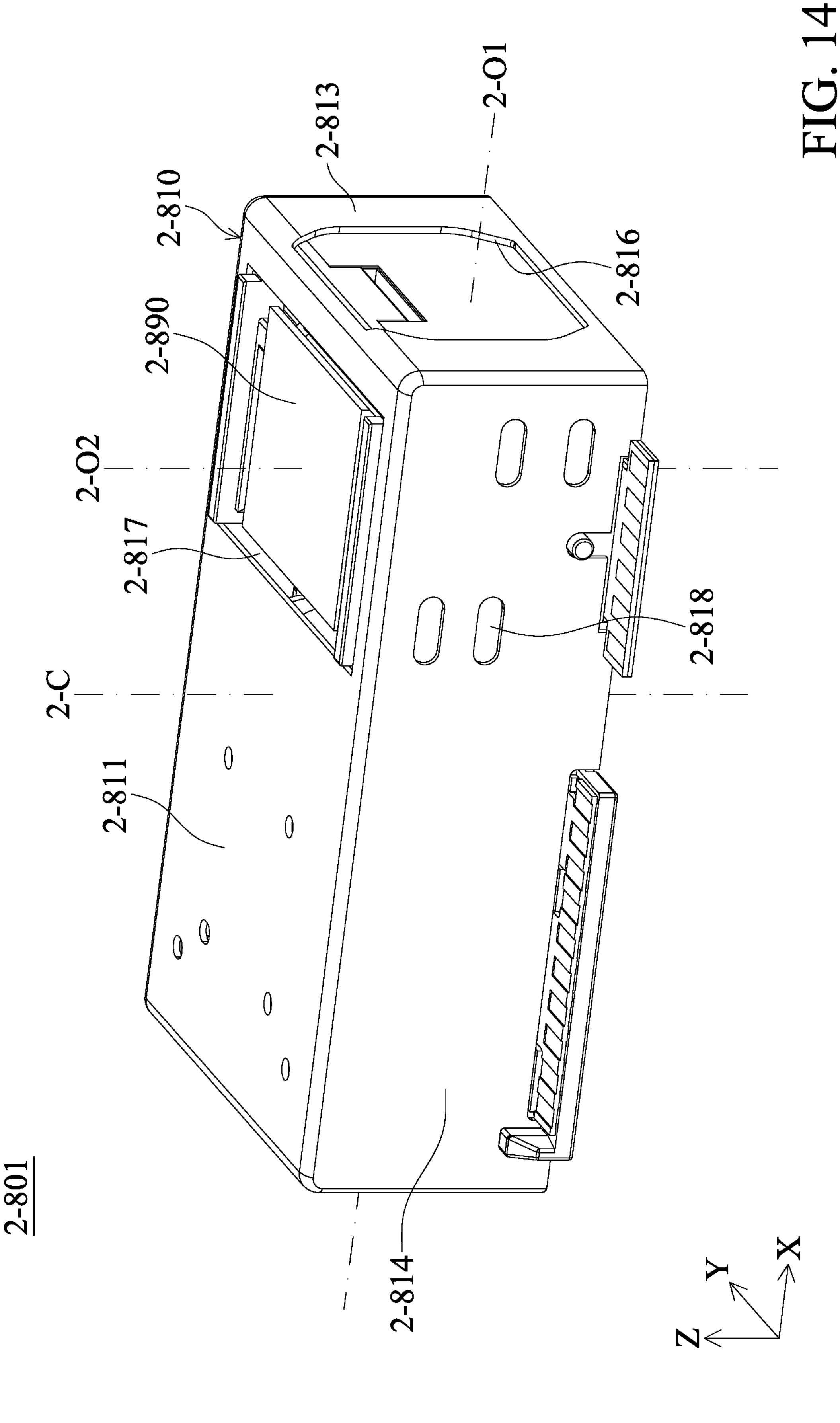
FIG. 14 is a perspective view illustrating the optical member driving mechanism shown in FIG. 11 when viewed in another direction.

FIG. 14 is a perspective view illustrating the optical member driving mechanism 2-801 shown in FIG. 11 when viewed in another direction. As shown in FIG. 14, the housing further has a second side surface 2-813 and a third side surface 2-814. In the present embodiment, the second side surface 2-813 extends from an edge of the top surface 2-811 along a direction (the Z axis) that is perpendicular to the first optical axis 2-O1. In some embodiments, the second side surface 2-813 extends from the edge of the top surface 2-811 along a direction that is not parallel to the first optical axis 2-O1. The housing 2-810 has a second opening 2-816 that is located on the second side surface 2-813, and the first optical axis 2-O1 may pass through the second opening 2-816. In other words, the first side surface 2-812 and the second side surface 2-813 are substantially parallel to each other.

The third side surface 2-814 extends from an edge of the top surface 2-811 along a direction (the Z axis) that is perpendicular to the first optical axis 2-O1, and is located between the first side surface 2-812 and the second side surface 2-813. In the present embodiment, the third side surface 2-814 is perpendicular to the first side surface 2-812 and the second side surface 2-813. In some embodiments, the third side surface 2-814 is not parallel to the first side surface 2-812 or the second side surface 2-813. A plurality of holes 2-818 may be disposed on the third side surface 2-814 and correspond to the reflection member 2-890. For example, an adhesive (not shown) may be disposed in the holes 2-818, such that the reflection member 2-890 may be affixed in the optical member driving mechanism 2-801.

In addition, a third opening 2-817 may be formed on the top surface 2-811, and correspond to the reflection member 2-890, such that the light is able to enter the optical member 2-900 located inside the optical member driving mechanism 2-801. Since the reflection member 2-890 is disposed near the first side surface 2-812, the third opening 2-817 may be closer to the second opening 2-816 instead of the first opening 2-815. In other words, the distance between the third opening 2-817 and the first opening 2-815 may be greater than the distance between the third opening 2-817 and the second opening 2-816.

It should be noted that in the present embodiment, the light would not actually pass through the second opening 2-816. However, during the assembly of the optical member driving mechanism 2-801, the optical member 2-900 may be disposed in the optical member driving mechanism 2-801 via the second opening 2-816 first, and then the reflection member 2-890 is disposed in the optical member driving mechanism 2-801. An optical calibration process is performed to the optical member 2-900 and the reflection member 2-890, and thereby the yield of the optical member driving mechanism 2-801 may be increased. The above design may simplify the manufacturing process.

Figure 15:
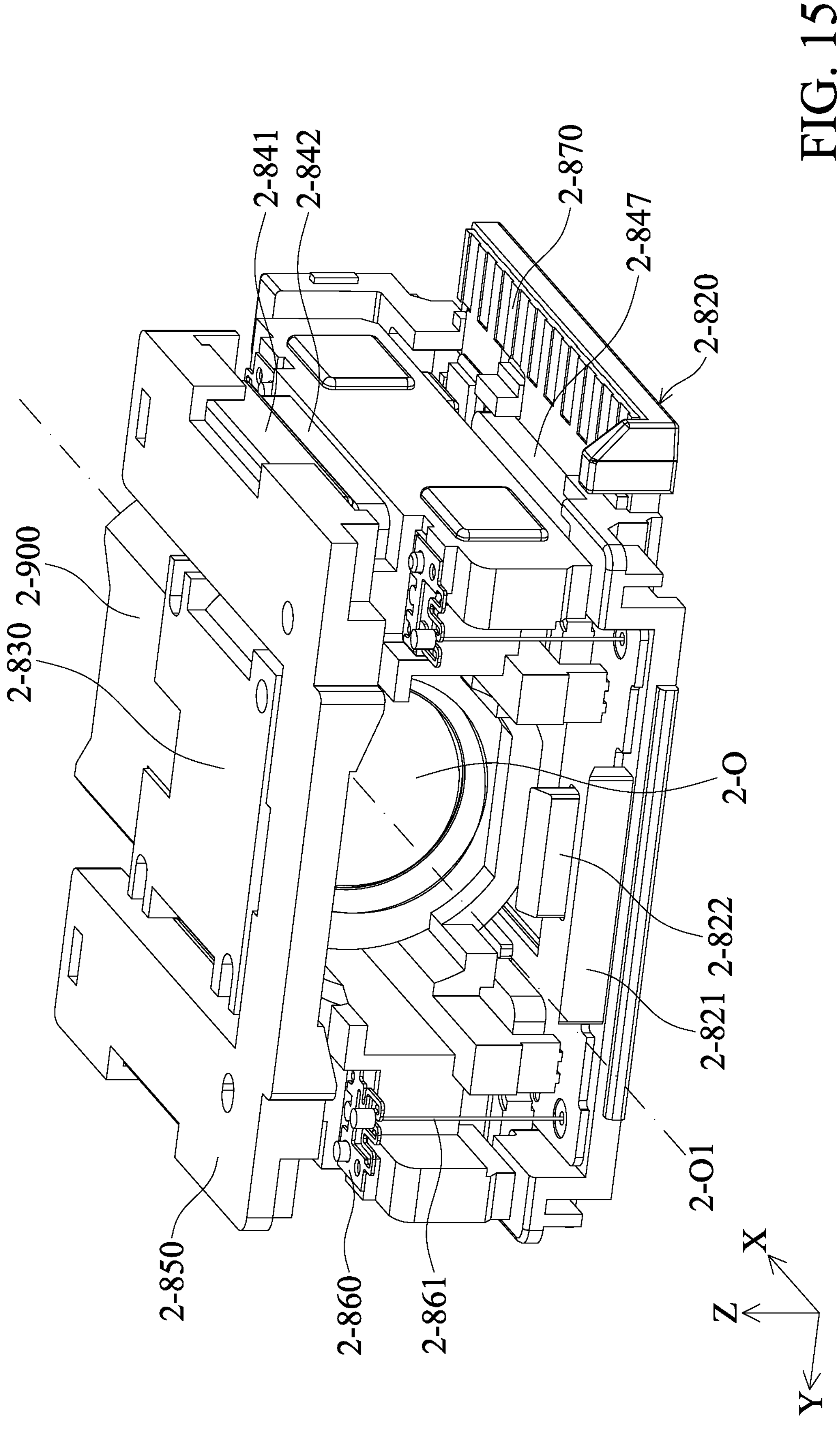
FIG. 15 is a perspective view illustrating the interior structure of the optical member driving mechanism in accordance with an embodiment of the present disclosure.

FIG. 15 is a perspective view illustrating the interior structure of the optical member driving mechanism 2-801 when viewed in the outlet end 2-O of the optical member 2-900. It should be appreciated that in order to clearly show the interior structure of the optical member driving mechanism 2-801, the housing 2-810 and the reflection member 2-890 are not illustrated in the present embodiment. As shown in FIG. 15, the base 2-820 further includes a first barrier 2-821 and a second barrier 2-822, wherein the first barrier 2-821 and the second barrier 2-822 protrude towards the top surface 2-811 of the housing 2-810, and the shortest distance between the first barrier 2-821 and the first side surface 2-812 is shorter than the shortest distance between the second barrier 2-822 and the first side surface 2-812. Thanks to the arrangement of the first barrier 2-821 and the second barrier 2-822, light is prevented from entering the image sensor due to it being reflected by the housing 2-810 and the circuit component 2-870. It should be noted that, although the first barrier 2-821 and the second barrier 2-822 are illustrated in the present embodiment, this merely serves as an example. Those skilled in the art may adjust the positions or number of barriers. In some embodiments, a jagged structure or any other suitable irregular structure may be on the base 2-820 (such as on the first barrier 2-821 and/or the second barrier 2-822) by a laser engraving process, and thereby the reflection inside the optical member driving mechanism 2-801 may be reduced.

In addition, in the present embodiment, when viewed in a direction (the Z axis) that is perpendicular to the first optical axis 2-O1, the first magnetic members 2-841 are partially exposed from the frame 2-850. In the present embodiment, the first magnetic members 2-841 are tripolar magnets such that the assembly process may be simplified, and the assembly precision and the push strength may be enhanced. However, the present disclosure is not limited thereto. In some other embodiments, each of the first magnetic members 2-841 may also be a combination of three magnets. Furthermore, the optical member driving mechanism 2-801 further includes a first bonding material and a second bonding material (not shown), wherein the first bonding material is bonded between the housing 2-810 and the frame 2-850, the second bonding material is bonded between the first magnetic members 2-841 and the frame 2-850. Since in some embodiments, the housing 2-810 and the first magnetic members 2-841 are affixed to the frame 2-850 by different processes, the first bonding material is different from the second bonding material. For example, the first bonding material is a light-curing adhesive, and thereby after the housing 2-810 and the frame 2-850 are affixed, subsequent assembly process (such as the process of affixing the first magnetic members 2-841 and the frame 2-850) may be performed in a short time.

Figure 16:
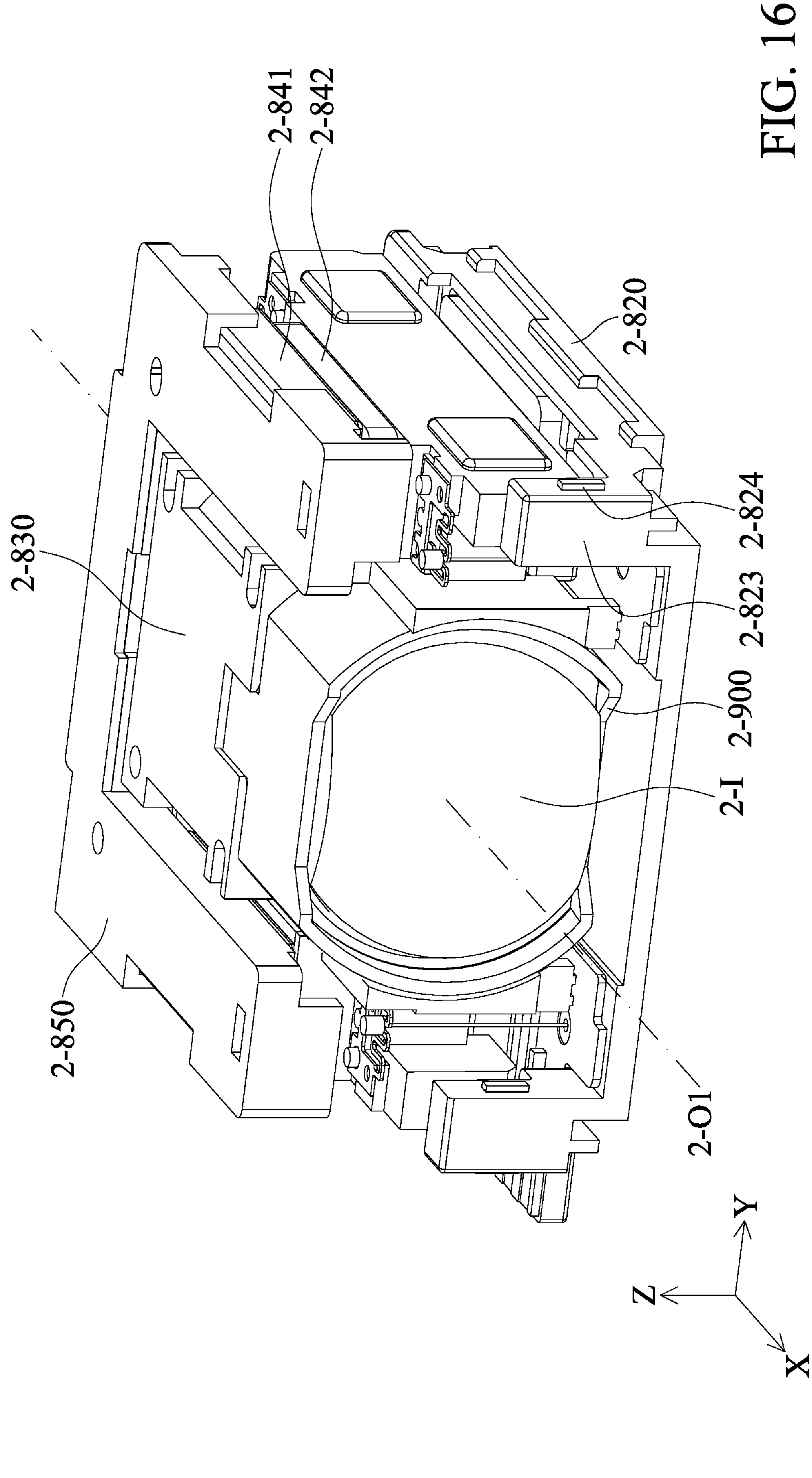
FIG. 16 is a perspective view illustrating the interior structure of the optical member driving mechanism shown in FIG. 15 when viewed in another direction.

FIG. 16 is a perspective view illustrating the interior structure of the optical member driving mechanism 2-801 when viewed in the incident end 2-I of the optical member 2-900. As shown in FIG. 16, the base further includes a stopping portion 2-823 that is disposed between the carrier 2-830 and the second side surface 2-813 (as shown in FIG. 14). Thanks to the arrangement of the stopping portion 2-823, the moving range of the carrier 2-830 may be limited. As a result, collisions between the carrier 2-830 the reflection member 2-890 may be avoided, and the reflection member 2-890 and/or the optical member 2-900 can remain undamaged. In addition, a metallic member 2-824 is embedded into the stopping portion 2-823, enhancing the structural strength of the stopping portion 2-823. Therefore, the stopping portion 2-823 is prevented from multiple collisions and remains undamaged.

Figure 17:
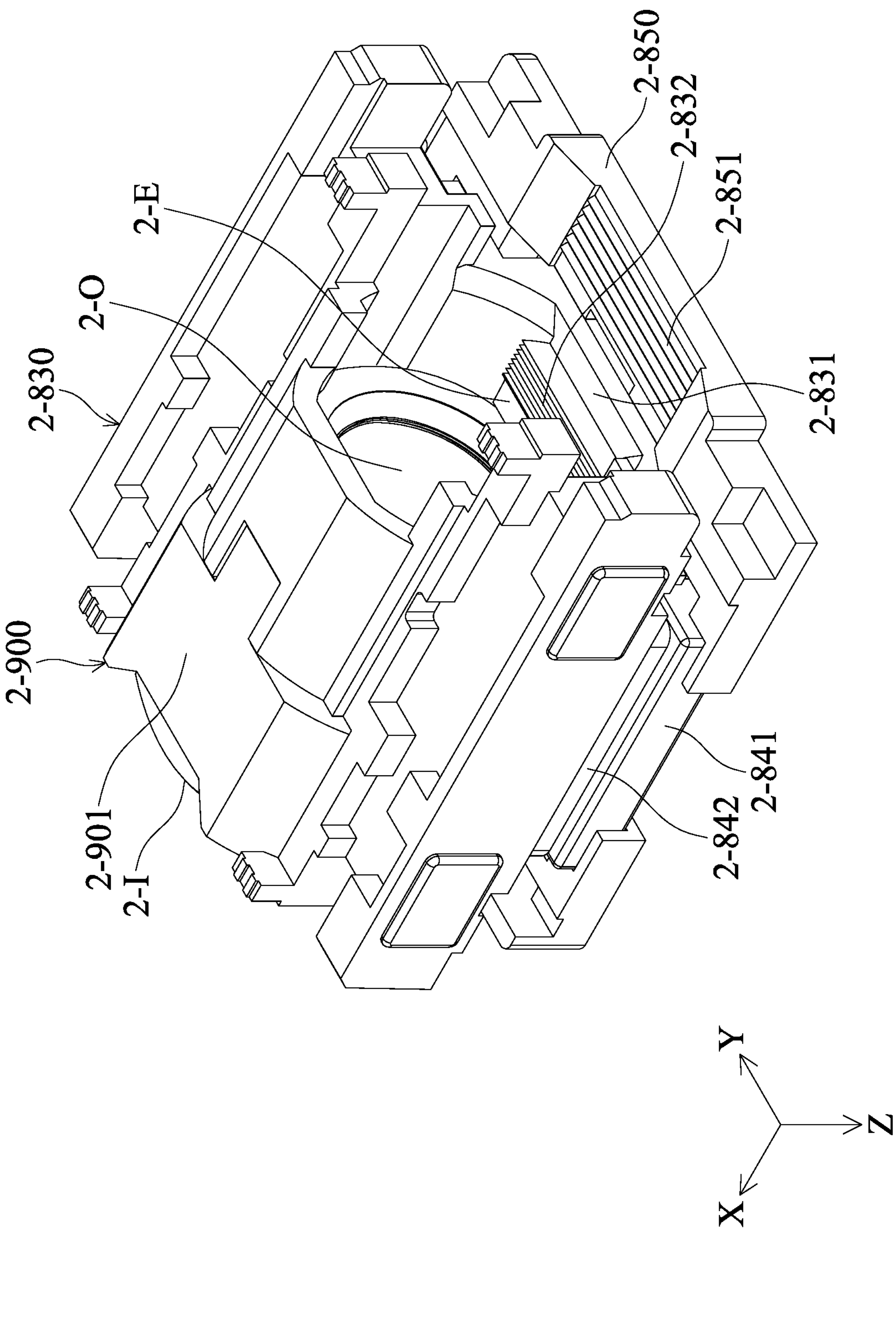
FIG. 17 is a perspective view illustrating the interior structure of the optical member driving mechanism in accordance with an embodiment of the present disclosure.

FIG. 17 is a perspective view illustrating the interior structure of the optical member driving mechanism 2-801 in accordance with an embodiment of the present disclosure. It should be noted that in order to clearly show the structure of the frame 2-850 and the carrier 2-830, the frame 2-850, the carrier 2-830 and the optical member 2-900 are illustrated upside-down. That is, the upper side of FIG. 17 is towards the base 2-820, and the lower side is towards the top surface 2-811 of the housing 2-810. As shown in FIG. 17, the frame 2-850 has a first jagged surface 2-851 that is disposed to face the base 2-820. In addition, the carrier 2-830 further includes a protruding portion 2-831 that protrudes from the optical member 2-900 and extends towards the base 2-820. When viewed in a direction (the X axis) that is parallel to the first optical axis 2-O1, the protruding portion 2-831 and the optical member 2-900 at least partially overlap. The protruding portion 2-831 further has a second jagged surface 2-832 that is disposed to face the base 2-820.

Thanks to the arrangement of the protruding portion 2-831, the possibility that the light directly illuminates the inner surface of the metallic housing 2-810 may be reduced, such that the light reflection may also be reduced. Furthermore, the first jagged surface 2-851 and the second jagged surface 2-832 are configured for weakening the intensity of light reflection after the light illuminates the above jagged surfaces. Since the possibility and/or intensity of the light reflected inside the optical member driving mechanism 2-801 may be reduced, noise may be less likely to enter the image sensor due to reflection. Therefore, image quality may be unaffected.

For example, the jagged structure on the first jagged surface 2-851 and/or the second jagged surface 2-832 may be formed by a laser engraving process. In some embodiments, the size in the Z axis of the above jagged structures may be in a range from 0.1 mm to 0.4 mm, but it is not limited thereto. In addition, the jagged structures may be formed as regular structures or irregular structures as required. It should be noted that although the first jagged surface 2-851 and the second jagged surface 2-832 are both disposed in the present embodiment, it merely serves as an example. Those skilled in the art may determine whether the first jagged surface 2-851 and/or the second jagged surface 2-832 are disposed, or adjust the position of the first jagged surface 2-851 and/or the second jagged surface 2-832.

The optical member driving mechanism 2-801 further includes an extinction sheet 2-E that is disposed between the carrier 2-830 and the optical member 2-900. More specifically, the extinction sheet 2-E is disposed in a gap between the carrier 2-830 and the optical member 2-900. In some embodiments, the extinction sheet 2-E may also be disposed on the second jagged surface 2-832, or disposed between the first barrier 2-821 and the second barrier 2-822, but it is not limited thereto. Thanks to the arrangement of the extinction sheet 2-E, the reflection of the noise may be effectively reduced, avoiding the noise entering the image sensor. For example, the extinction sheet 2-E may be made of resin or any other suitable material, and has a porous structure. In some embodiments, the extinction sheet 2-E may lower the reflectivity of the light with a wavelength between 250 nm and 2500 nm below 1.6%. In some embodiments, the thickness of the extinction sheet 2-E may be in a range from 0.1 mm to 0.5 mm.

Figure 18:
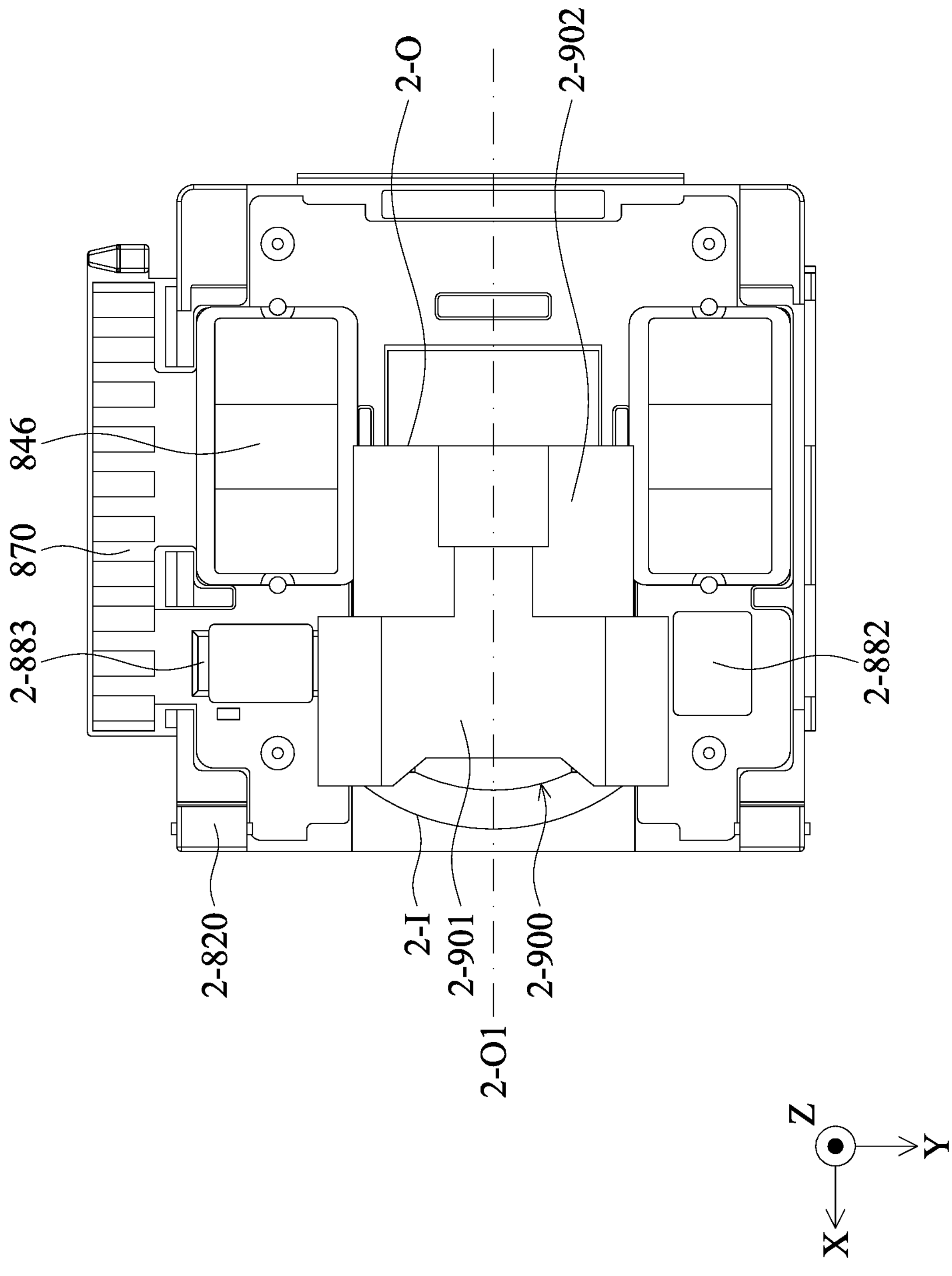
FIG. 18 is a top view illustrating the interior structure of the optical member driving mechanism in accordance with an embodiment of the present disclosure.

In addition, the optical member 2-900 further has a first section 2-901 and a second section 2-902 (as shown in FIG. 18), wherein the first section 2-901 is closer to the incident end 2-I of the optical member 2-900. The first section 2-901 and the second section 2-902 are arranged along the first optical axis 2-O1, wherein the first section 2-901 is closer to the second side surface 2-813 than the second section 2-902. In other words, the shortest distance between the first section 2-901 and the second side surface 2-813 is shorter than the shortest distance between the second section 2-902 and the second side surface 2-813. In a direction (the Y axis) that is perpendicular to the first optical axis 2-O1, the largest size of the first section 2-901 is greater than the largest size of the second section 2-902. That is, the width of the first section 2-901 is greater than the width of the second section 2-902 in the Y axis. Since the size of the first section 2-901 is larger, the carrier 2-830 may cover the second section 2-902, and the first section 2-901 of the optical member 2-900 may be exposed.

Figure 19:
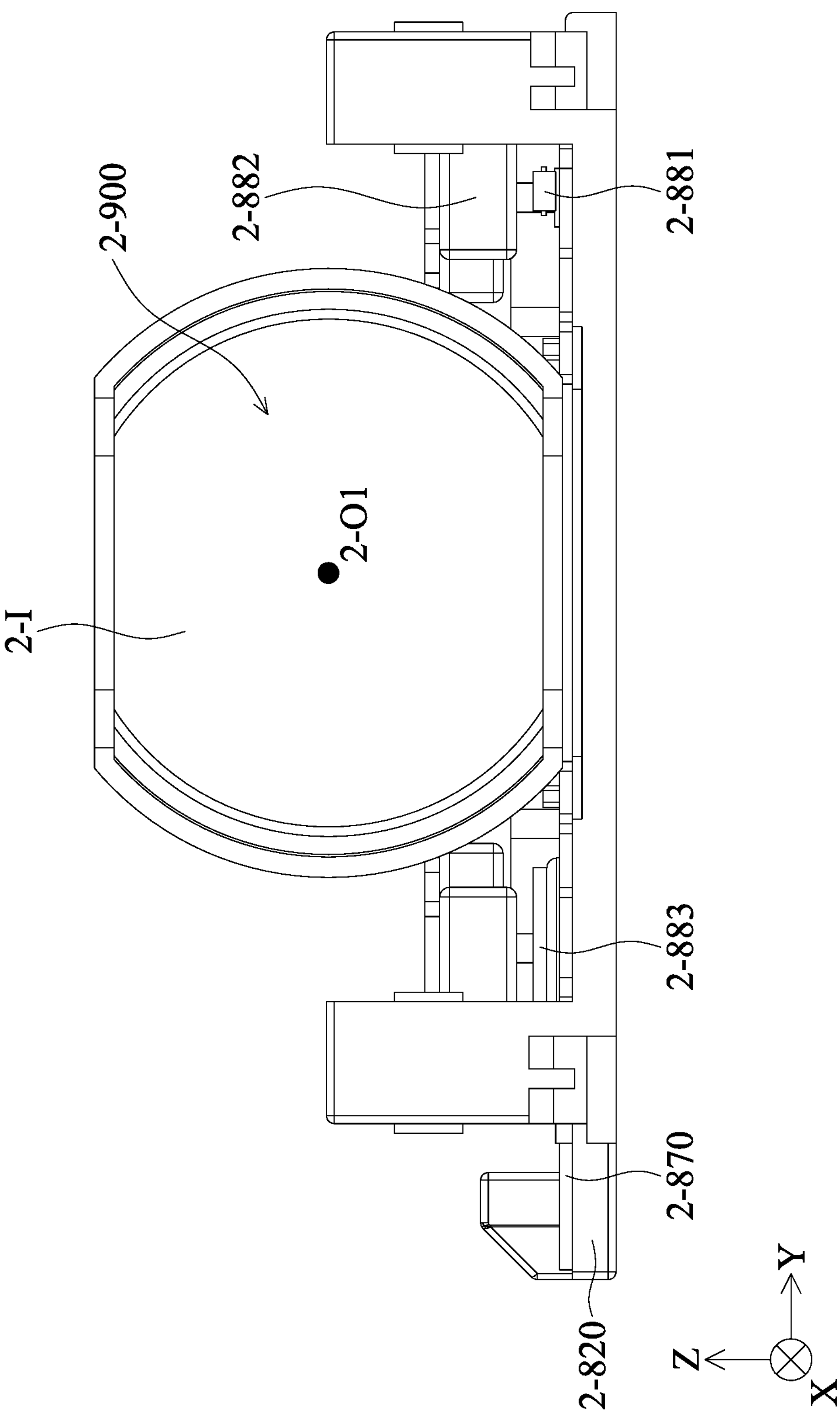
FIG. 19 is a side view illustrating the interior structure of the optical member driving mechanism shown in FIG. 18.

FIG. 18 is a top view illustrating the base 2-820, the circuit component 2-870, the second electromagnetic driving assembly 2-845, the sensing assembly 2-880 and the optical member 2-900, and FIG. 19 is a side view illustrating the structure shown in FIG. 18 when viewed in the incident end 2-I. As shown in FIGS. 18 and 19, when viewed in a direction (the Z axis) that is perpendicular to the first optical axis 2-O1, the integrated circuit component 2-883 of the sensing assembly 2-880 and the optical member 2-900 may partially overlap. In the present embodiment, the second magnetic members 2-846 are tripolar magnets. In some other embodiments, each of the second magnetic members 2-846 may also be a combination of three magnets.

As set forth above, the embodiments of the present disclosure provide an optical member driving mechanism including a reflection member that is disposed in the housing of the optical member driving mechanism. By means of arranging the reflection member in the housing, the reflection member may be effectively protected and remain undamaged. In addition, the embodiments of the present disclosure provide various structures configured to avoid refection, such as jagged surfaces, barriers, and/or extinction plates, etc. Therefore, the noise may be prevented from entering the image sensor due to reflection, preserving image quality.

Third Group of Embodiments

Figure 20:
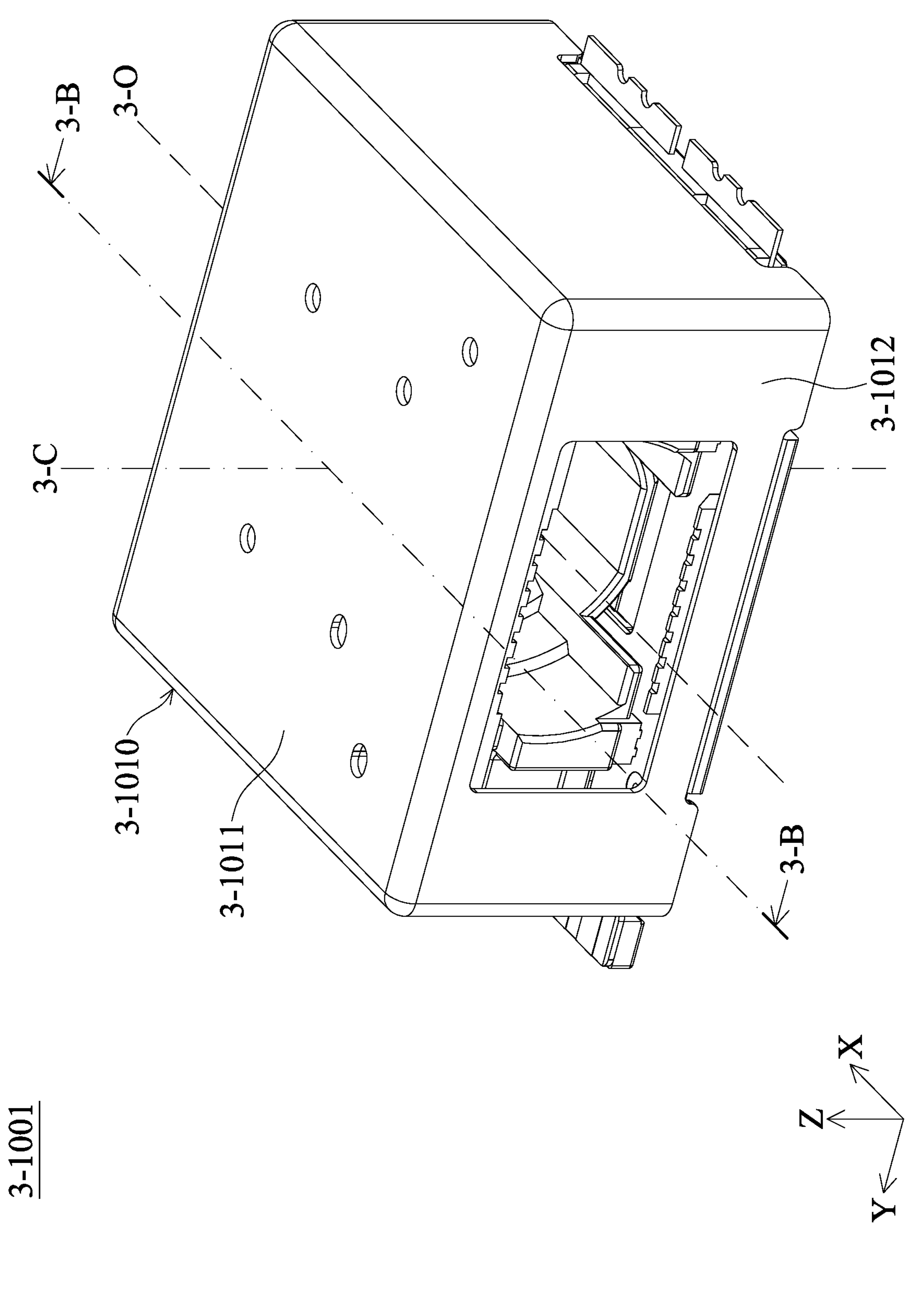
FIG. 20 is a perspective view illustrating an optical member driving mechanism in accordance with an embodiment of the present disclosure.

FIG. 20 is a schematic perspective view illustrating an optical member driving mechanism 3-1001 in accordance with an embodiment of the present disclosure. It should be noted that, in this embodiment, the optical member driving mechanism 3-1001 may be, for example, disposed in the electronic devices with camera function for driving an optical member (not shown), and can perform an autofocus (AF) and/or optical image stabilization (OIS) function.

Figure 22:
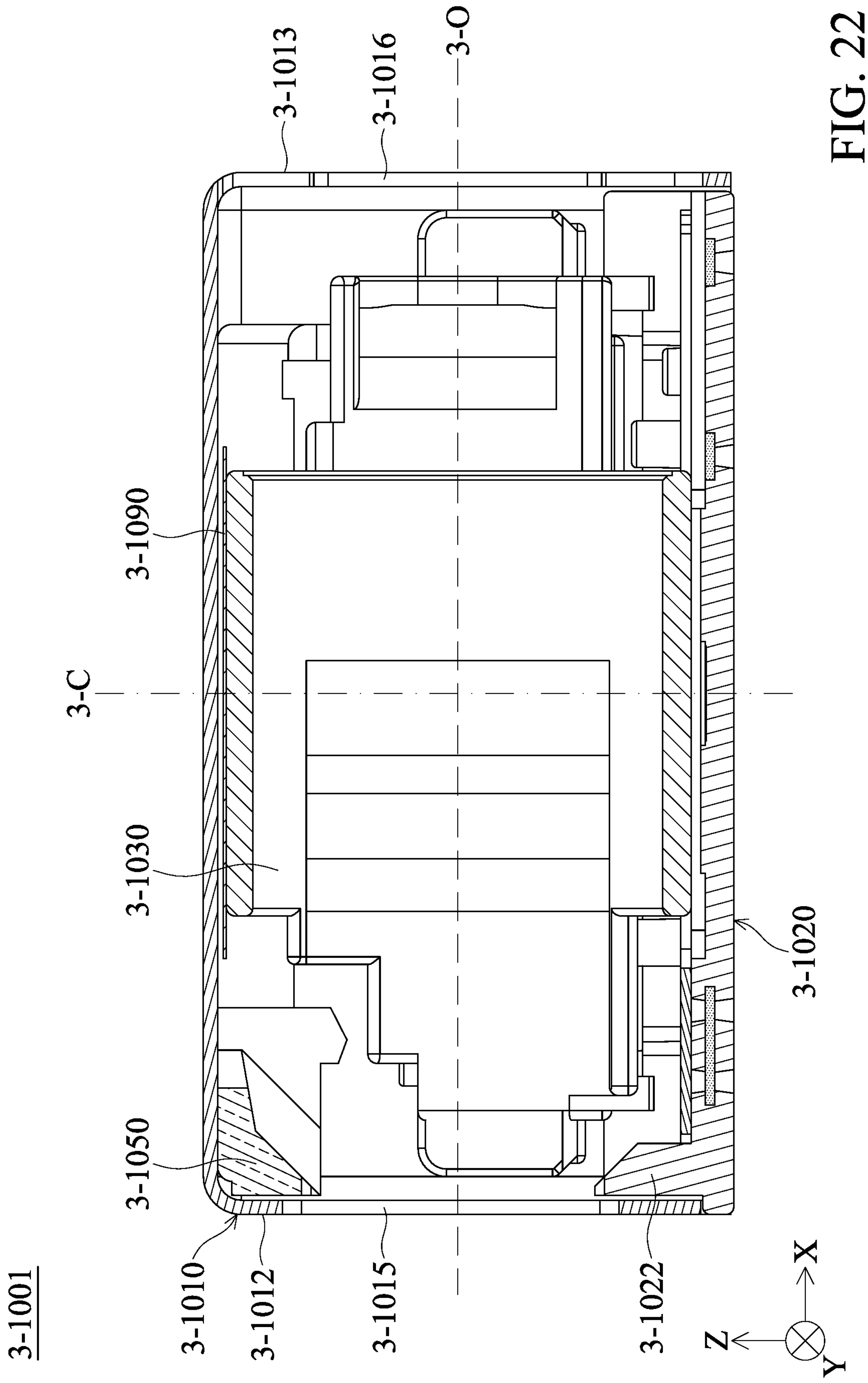
FIG. 22 is a cross-sectional view illustrating along line 3-B-3-B shown in FIG. 20.

As shown in FIG. 20, the optical member driving mechanism 3-1001 has a central axis 3-C that is substantially parallel to the Z axis. The optical member has an optical axis 3-O that is substantially parallel to the X axis. In other words, in the present embodiment, the central axis 3-C is substantially perpendicular to the optical axis 3-O. The optical member driving mechanism 3-1001 includes a housing 3-1010 which has a top surface 3-1011, a first side surface 3-1012 and a second side surface 3-1013 (as shown in FIG. 22) that is opposite to the first side surface 3-1012. The top surface 3-1011 extends in a direction that is parallel to the optical axis 3-O (i.e. the X-Y plane). The first side surface 3-1012 and the second side surface 3-1013 extend from edges of the top surface 3-1011 in a direction (the Z axis) that is perpendicular to the optical axis 3-O. In other words, in the present embodiment, the first side surface 3-1012 and the second side surface 3-1013 are substantially parallel to each other. In some embodiments, the first side surface 3-1012 and the second side surface 3-1013 extend from the edges of the top surface 3-1011 in a direction that is not parallel to the optical axis 3-O. In addition, the housing 3-1010 has a rectangular first opening 3-1015 that is located on the first side surface 3-1012, and the optical axis 3-O may pass through the first opening 3-1015. The light may pass through the optical member which is disposed in the optical member driving mechanism 3-1001. After the light passes through the optical member, it will travel to an image sensor (not shown) that is disposed out of the optical member driving mechanism 3-1001, and thereby an image may be generated on the above electronic devices.

Figure 21:
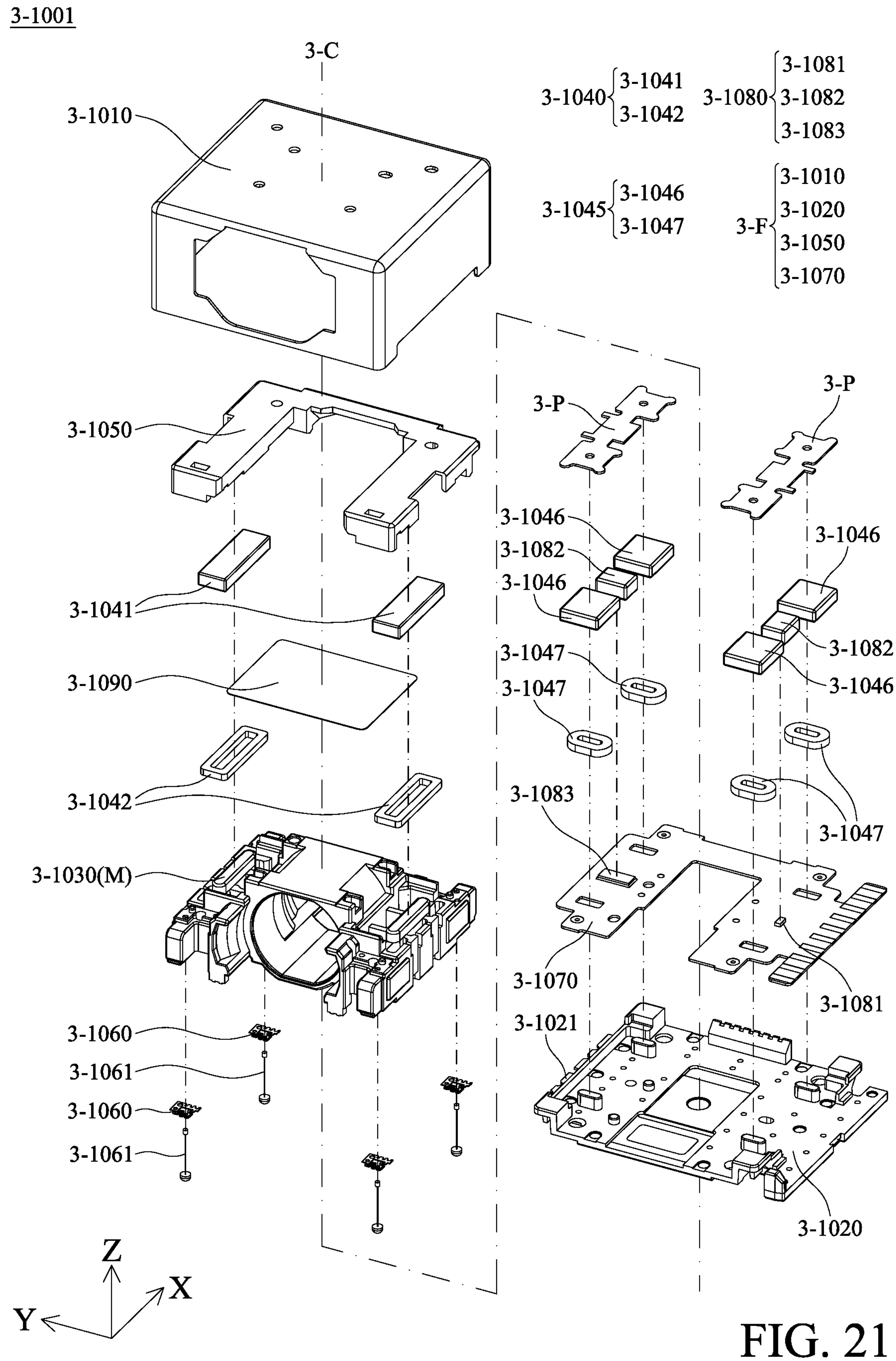
FIG. 21 is an exploded view illustrating the optical member driving mechanism shown in FIG. 20.

FIG. 21 is an exploded view illustrating the optical member driving mechanism 3-1001 shown in FIG. 20. In the present embodiment, the optical member driving mechanism 3-1001 has a substantial rectangular structure. The optical member driving mechanism 3-1001 mainly includes a fixed portion 3-F, a movable portion 3-M, a plurality of first elastic members 3-1060, a plurality of second elastic members 3-1061, a first electromagnetic driving assembly 3-1040 and a second electromagnetic driving assembly 3-1045. The fixed portion 3-F includes a housing 3-1010, a base 3-1020, a frame 3-1050, and a circuit component 3-1070.

The housing 3-1010 is disposed on the base 3-1020, and protect the elements disposed inside the optical member driving mechanism 3-1001. In some embodiments, the housing 3-1010 is made of metal or another material with sufficient hardness to provide good protection. The frame 3-1050 is disposed in and affixed to the housing 3-1010. The circuit component 3-1070 is disposed on the base 3-1020 for transmitting electric signals, performing the autofocus (AF) and/or optical image stabilization (OIS) function. For example, the optical member driving mechanism 3-1001 may control the position of the optical member based on the aforementioned electric signals so as to form an image. In the present embodiment, a metallic member 3-1021 is disposed in the base by insert molding, and thereby the structural strength of the base 3-1020 may be enhanced.

The movable portion 3-M is movable relative to the fixed portion 3-F. The movable portion 3-M mainly includes a carrier 3-1030 which carries the optical member. As shown in FIG. 21, the carrier 3-1030 is movably connected to the housing 3-1010 and the base 3-1020. The first elastic members 3-1060 are disposed on the carrier 3-1030. The second elastic members 3-1061 extend in a vertical direction (the Z axis), and are connected to the first elastic members 3-1060 and the base 3-1020. As a result, the carrier 3-1030 may be connected to the base 3-1020 via the first elastic members 3-1060 and the second elastic members 3-1061. For example, the first elastic members 3-1060 and the second elastic members 3-1061 are made of metal or another suitable elastic material.

The first electromagnetic driving assembly 3-1040 includes first magnetic members 3-1041 and first driving coils 3-1042. The first magnetic members 3-1041 may be disposed on the frame 3-1050, and the corresponding first driving coils 3-1042 are disposed on the carrier 3-1030.

When current is applied to the first driving coils 3-1042, an electromagnetic driving force may be generated by the first driving coils 3-1042 and the first magnetic members 3-1041 (i.e. the first electromagnetic driving assembly 3-1040) to drive the carrier 3-1030 and the optical member carried therein to move along a horizontal direction (the X-Y plane) relative to the base 3-1020, performing the autofocus (AF) and/or optical image stabilization (OIS) function.

In addition, the second electromagnetic driving assembly 3-1045 includes second magnetic members 3-1046 and second driving coils 3-1047. The second magnetic members 3-1046 may be disposed on the carrier 3-1030, and the corresponding second driving coils 3-1047 are disposed on the base 3-1020. For example, the second driving coils 3-1047 may be flat-plate coils such that the difficulty and the required time for assembly may be reduced. When a current is applied to the second driving coils 3-1047, an electromagnetic driving force may be generated by the second electromagnetic driving assembly 3-1045 to drive the carrier 3-1030 and the optical member carried therein to move along the optical axis 3-O (the X axis) relative to the base 3-1020, performing the autofocus (AF) function. The carrier 3-1030 may be movably suspended between the frame 3-1050 and the base 3-1020 by the electromagnetic driving force of the first electromagnetic driving assembly 3-1040, the second electromagnetic driving assembly 3-1045 and the force exerted by the first elastic members 3-1060, the second elastic members 3-1061. Furthermore, a magnetic permeable plate 3-P is disposed on the second magnetic members 3-1046 for concentrating the magnetic field of the second magnetic members 3-1046 so that the efficiency of the second electromagnetic driving assembly 3-1045 may be improved. In some embodiments, the magnetic permeable plate 3-P may be made of metal or another material with sufficient magnetic permeability.

The sensing assembly 3-1080 includes a sensor 3-1081, a reference member 3-1082 and an integrated circuit (IC) component 3-1083. In the present embodiment, the sensor 3-1081 and the integrated circuit component 3-1083 are disposed on the circuit component 3-1070, and the reference member 3-1082 is disposed in the carrier 3-1030. A plurality of reference members 3-1082 may be disposed. For example, the reference member 3-1082 is a magnetic member, the sensor 3-1081 may detect the change of the magnetic field of the reference member 3-1082, and the position of the carrier 3-1030 (and the optical member) may be determined by the integrated circuit component 3-1083. In addition, the integrated circuit component 3-1083 may also detect the relative movement between the carrier 3-1030 and the fixed portion 3-F. The integrated circuit component 3-1083 and the sensor 3-1081 are configured to detect different moving direction of the carrier 3-1030. In some embodiments, the sensor 3-1081 or the reference member 3-1082 is disposed on the fixed portion 3-F, and the other of the sensor 3-1081 or the reference member 3-1082 is disposed on the movable portion 3-M.

FIG. 22 is a cross-sectional view illustrating along line 3-B-3-B shown in FIG. 20. As shown in FIG. 22, the housing 3-1010 has a second opening 3-1016, and the optical axis 3-O may pass through the second opening 3-1016. In the present embodiment, the optical member driving mechanism 3-1001 has an incident end and an outlet end, wherein the incident end corresponds to the second opening 3-1016, and the outlet end corresponds to the first opening 3-1015. In the present embodiment, the light may enter the optical member from the incident end (i.e. the second opening 3-1016) along the optical axis 3-O, and exit the optical member from the outlet end (i.e. the first opening 3-1015). In the present embodiment, the frame 3-1050 is disposed between the carrier 3-1030 and the housing 3-1010. When viewed in a direction (the X axis) that is parallel to the optical axis 3-O, the frame 3-1050 and the carrier 3-1030 at least partially overlap.

Figure 23:
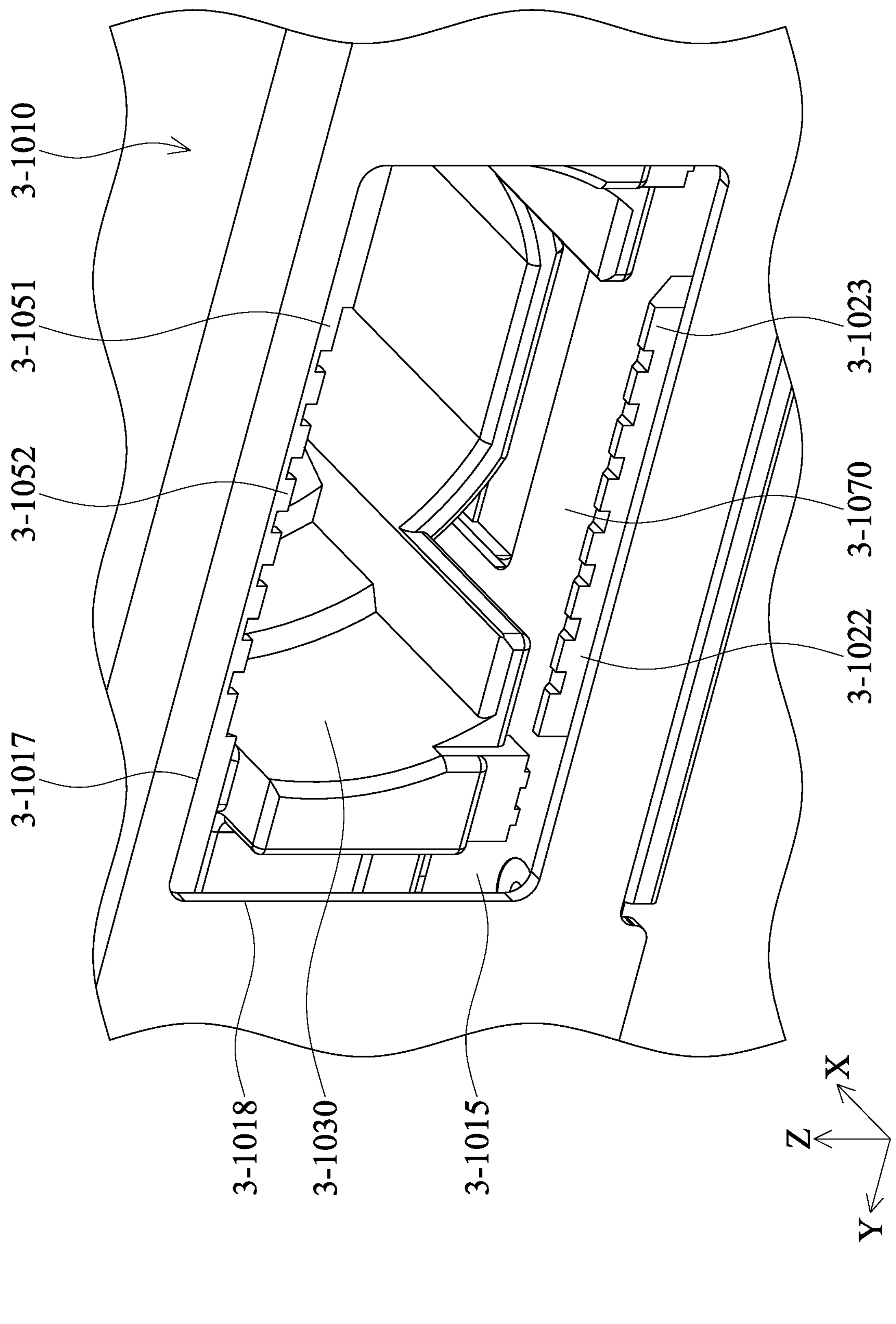
FIG. 23 is an enlarged perspective view illustrating the optical member driving mechanism shown in FIG. 20.

In the present embodiment, the optical member driving mechanism 3-1001 has a light-shielding sheet 3-1090 that is disposed between the carrier 3-1030 and the top surface 3-1011. The light-shielding sheet 3-1090 extends towards the first side surface 3-1012 in a direction that is substantially parallel to the optical axis 3-O. When viewed in a direction (the X axis) that is parallel to the optical axis 3-O, the light-shielding sheet 3-1090 is located on a lengthwise side 3-1017 (as shown in FIG. 23) of the first opening 3-1015. That is, the light-shielding sheet 3-1090 may be located between the optical axis 3-O and the top surface 3-1011. In some embodiments, the carrier 3-1030 may have a protruding portion (not shown) that extends towards the first side surface 3-1012 in a direction that is substantially parallel to the optical axis 3-O. Similarly, when viewed in the direction (the X axis) that is parallel to the optical axis 3-O, the protruding portion is located on the lengthwise side 3-1017 of the first opening 3-1015 and between the optical axis 3-O and the top surface 3-1011.

FIG. 23 is an enlarged perspective view illustrating the optical member driving mechanism 3-1001 shown in FIG. 20 when viewed in the outlet end. As shown in FIG. 23, the base 3-1020 further has a barrier 3-1022 that is disposed to protrude towards the top surface 3-1011. When viewed in a direction (the X axis) that is parallel to the optical axis 3-O, the barrier 3-1022 and the lengthwise side 3-1017 of the first opening 3-1015 at least partially overlap, and a gap is formed between the barrier 3-1022 and a widthwise side 3-1018 of the first opening 3-1015. In other words, when viewed in the same direction as above, the barrier 3-1022 and the widthwise side 3-1018 of the first opening 3-1015 do not overlap. In addition, the frame 3-1050 has a light-shielding structure 3-1051 that is disposed to protrude towards the base 3-1020. When viewed in the direction (the X axis) that is parallel to the optical axis 3-O, the light-shielding structure 3-1051 and the lengthwise side 3-1017 of the first opening 3-1015 also at least partially overlap. Similarly, a gap is formed between the light-shielding structure 3-1051 and the widthwise side 3-1018 of the first opening 3-1015. In other words, when viewed in the same direction as above, the light-shielding structure 3-1051 and the widthwise side 3-1018 of the first opening 3-1015 do not overlap.

In some embodiments, jagged structures 3-1023, 3-1052 may be formed on the barrier 3-1022 and/or the light-shielding structure 3-1051 by a laser engraving process. In some other embodiments, any other regular or irregular structure may be formed on the barrier 3-1022 and/or the light-shielding structure 3-1051 so as to reduce the possibility that the noise reflected in the optical member driving mechanism 3-1001 enters the image sensor, enhancing the image quality. It should be noted that although the barrier 3-1022 and the light-shielding structure 3-1051 are both disposed in the present embodiment, it merely serves as an example. Those skilled in the art may determine whether the barrier 3-1022 and/or the light-shielding structure 3-1051 are disposed, or adjust the position of the barrier 3-1022 and/or the light-shielding structure 3-1051 as required.

Figure 24:
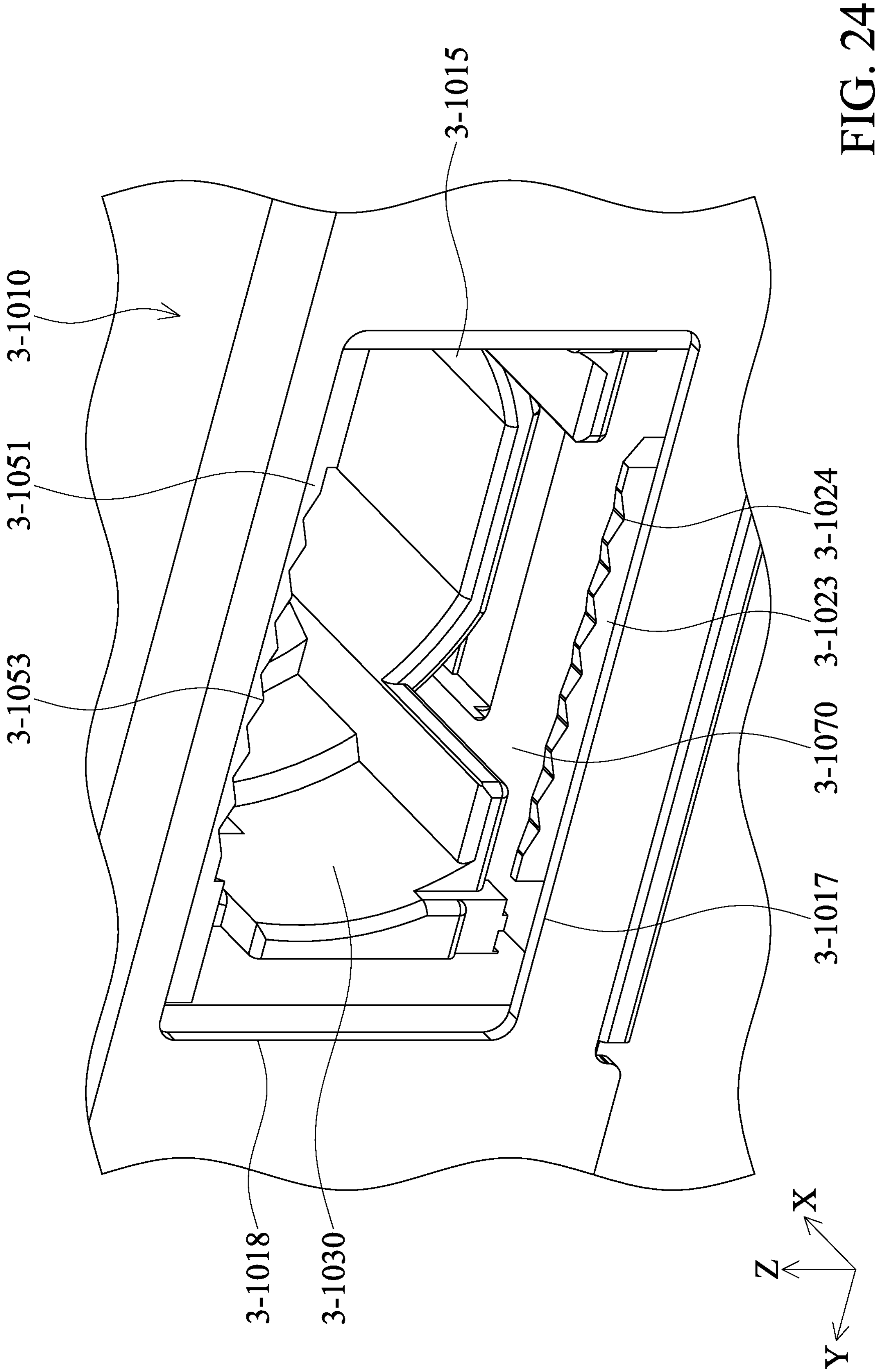
FIG. 24 is an enlarged perspective view illustrating the optical member driving mechanism in accordance with another embodiment of the present disclosure.

FIG. 24 is an enlarged perspective view illustrating the optical member driving mechanism in accordance with another embodiment of the present disclosure. In the present embodiment, the jagged structure 3-1023 includes multiple tapered structure, wherein and has a plurality of peaks 3-1024. The jagged structure 3-1052 also has a plurality of peaks 3-1053. As shown in FIG. 24, When viewed in the direction (the X axis) that is parallel to the optical axis 3-O, the peaks 3-1024, 3-1053 may be exposed from the first opening 3-1015. In some embodiments, the distance between the lengthwise side 3-1017 of the first opening 3-1015 and the peaks 3-1024, 3-1053 is equal to or longer than 0.25 mm, and thereby the noise may be effectively blocked, preventing the noise from entering the image sensor.

Figure 25:
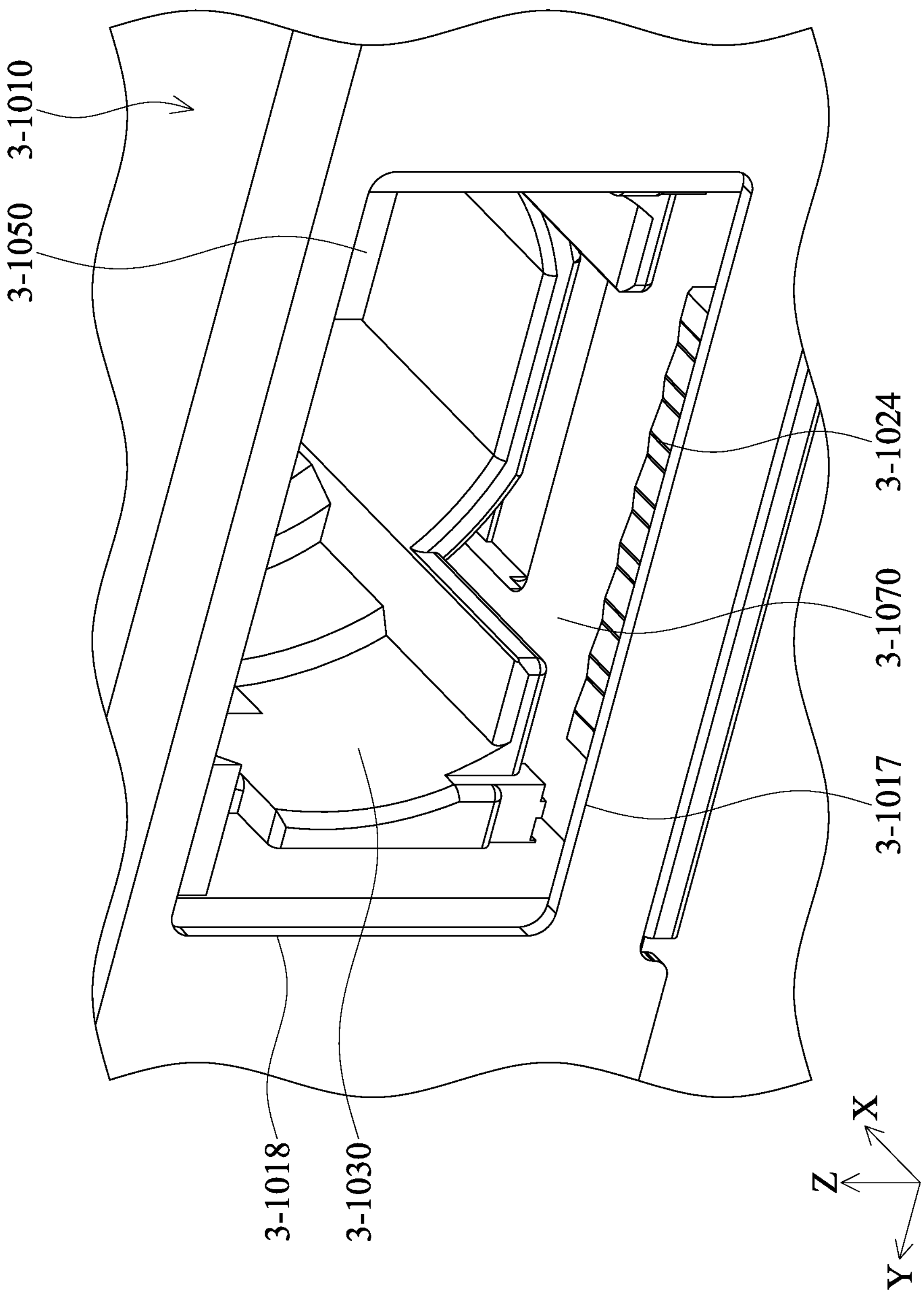
FIG. 25 is an enlarged perspective view illustrating the optical member driving mechanism in accordance with another embodiment of the present disclosure.

FIG. 25 is an enlarged perspective view illustrating the optical member driving mechanism in accordance with another embodiment of the present disclosure. As shown in FIG. 25, when viewed in the direction (the X axis) that is parallel to the optical axis 3-O, the peaks 3-1024, 3-1053 may not be exposed from the first opening 3-1015. Namely, the peaks 3-1024, 3-1053 may overlap with the housing 3-1010. In some embodiments, the distance between the lengthwise side 3-1017 of the first opening 3-1015 and the peaks 3-1024, 3-1053 is equal to or longer than 0.1 mm, and thereby the noise entering the image sensor may be effectively reduced.

Figure 26:
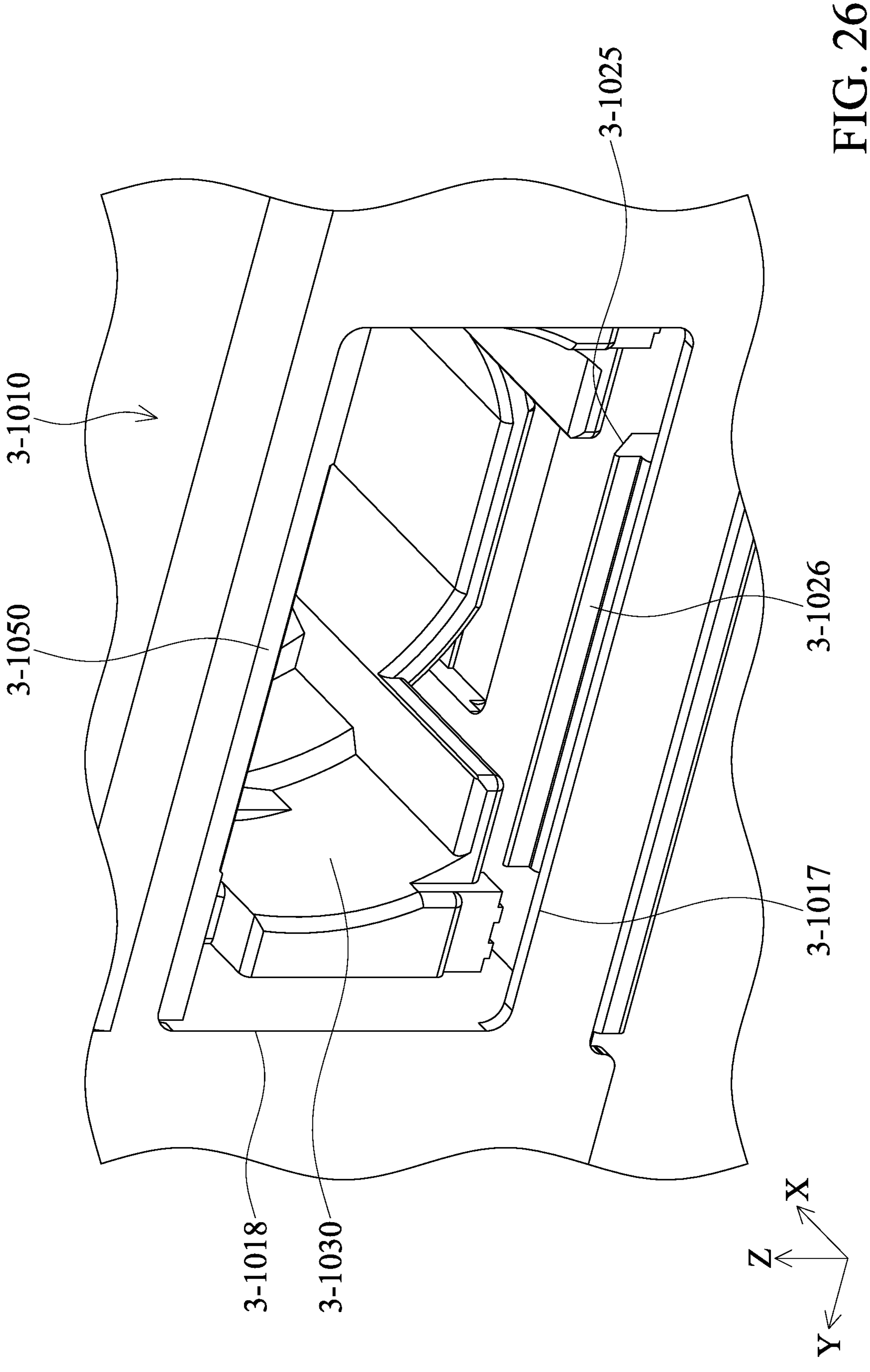
FIG. 26 is an enlarged perspective view illustrating the optical member driving mechanism in accordance with another embodiment of the present disclosure.

FIG. 26 is an enlarged perspective view illustrating the optical member driving mechanism in accordance with another embodiment of the present disclosure. In the present embodiment, the barrier 3-1022 has an upper surface 3-1025 and a cutting surface 3-1026 that intersects with the upper surface 3-1025. A tapered structure is formed by the upper surface 3-1025 and the cutting surface 3-1026. The upper surface 3-1025 is upwardly inclined, namely facing the carrier 3-1030 and the top surface 3-1011. The cutting surface 3-1026 is substantially perpendicular to the optical axis 3-O, facing the first side surface 3-1012. In some embodiments, a fillet between the upper surface 3-1025 and the cutting surface 3-1026 is not greater than 0.05 mm. Similarly, the light-shielding structure 3-1051 has a lower surface (not shown) and a cutting surface that intersects with the lower surface. In some embodiments, a fillet between the lower surface and the cutting surface is not greater than 0.05 mm.

In addition, a rough surface may be formed on the barrier 3-1022. For example, if a surface roughness of one surface is greater than 16, the surface may be called as a rough surface. The upper surface 3-1025 may be disposed as a rough surface. In some embodiments, the surface, facing the top surface 3-1011, of the base 3-1020 may be formed as a rough surface. Thanks to the arrangement of the rough surfaces, after the light illuminates to the rough surfaces, the intensity of the reflected light may be reduced. Since the possibility and/or the intensity of the light reflected inside the optical member driving mechanism 3-1001 is reduced, the noise may be prevented from entering the image sensor due to reflection, therefore preserving image quality.

Figure 27:
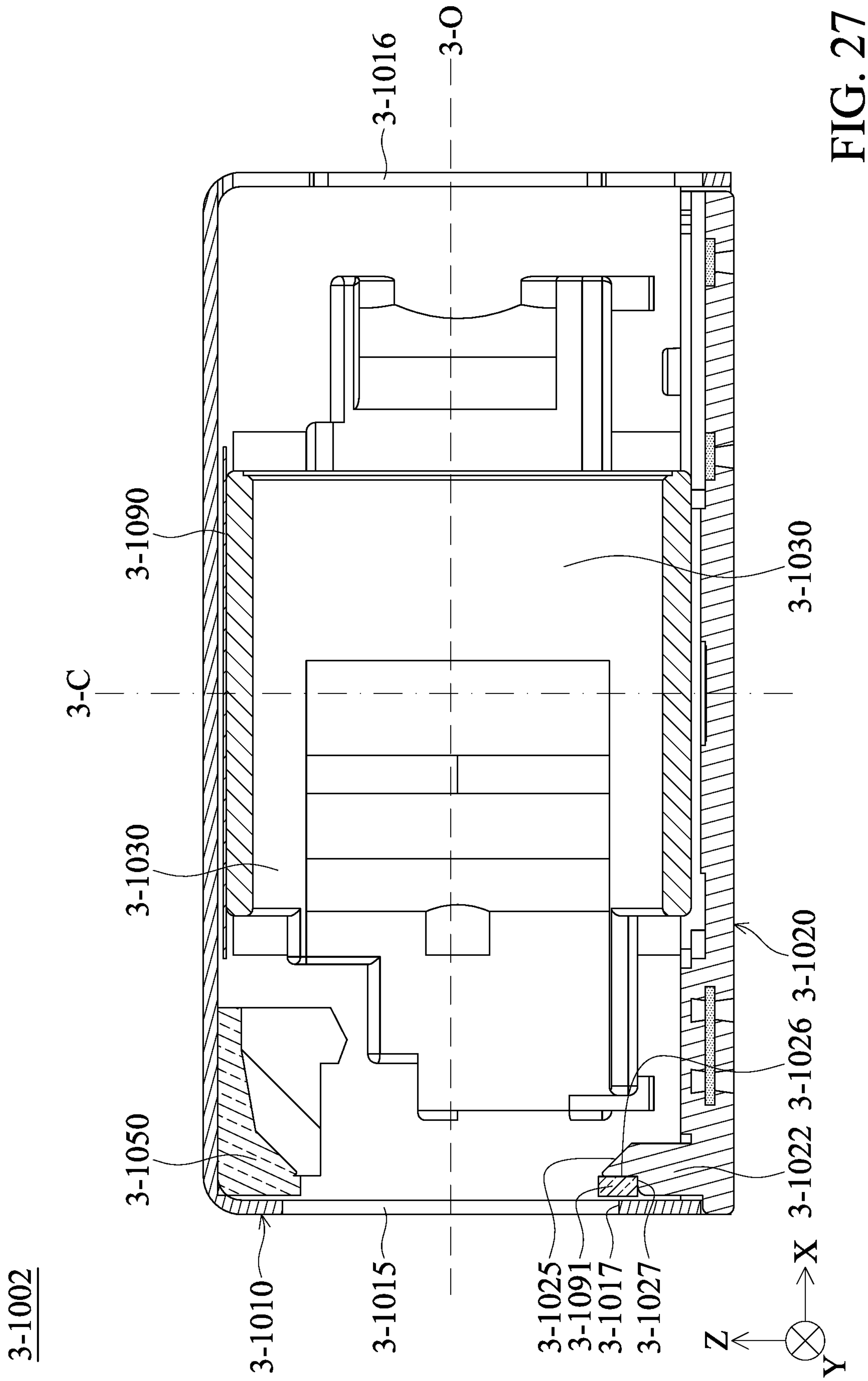
FIG. 27 is a cross-sectional view illustrating the optical member driving mechanism in accordance with another embodiment of the present disclosure.

FIG. 27 is a cross-sectional view illustrating the optical member driving mechanism 3-1002 in accordance with another embodiment of the present disclosure. It should be noted that the optical member driving mechanism 3-1002 in the present embodiment may include the same or similar portions as the optical member driving mechanism 3-1001 shown in FIGS. 20-23. Those portions will be labeled as the same numerals, and for the sake of simplicity, the detailed description will not be repeated in the following paragraphs. The difference between the optical member driving mechanism 3-1002 in the present embodiment and the optical member driving mechanism 3-1001 shown in FIGS. 20-23 is that in the optical member driving mechanism 3-1002, a groove 3-1027 is formed between the barrier 3-1022 and the housing 3-1010. The groove 3-1027 is disposed to face the top surface 3-1011, and the light-shielding member 3-1091 is disposed in the groove 3-1027. As shown in FIG. 27, the shortest distance between the light-shielding member 3-1091 and the top surface 3-1011 may be shorter than the shortest distance between the barrier 3-1022 and the top surface 3-1011.

Figure 28:
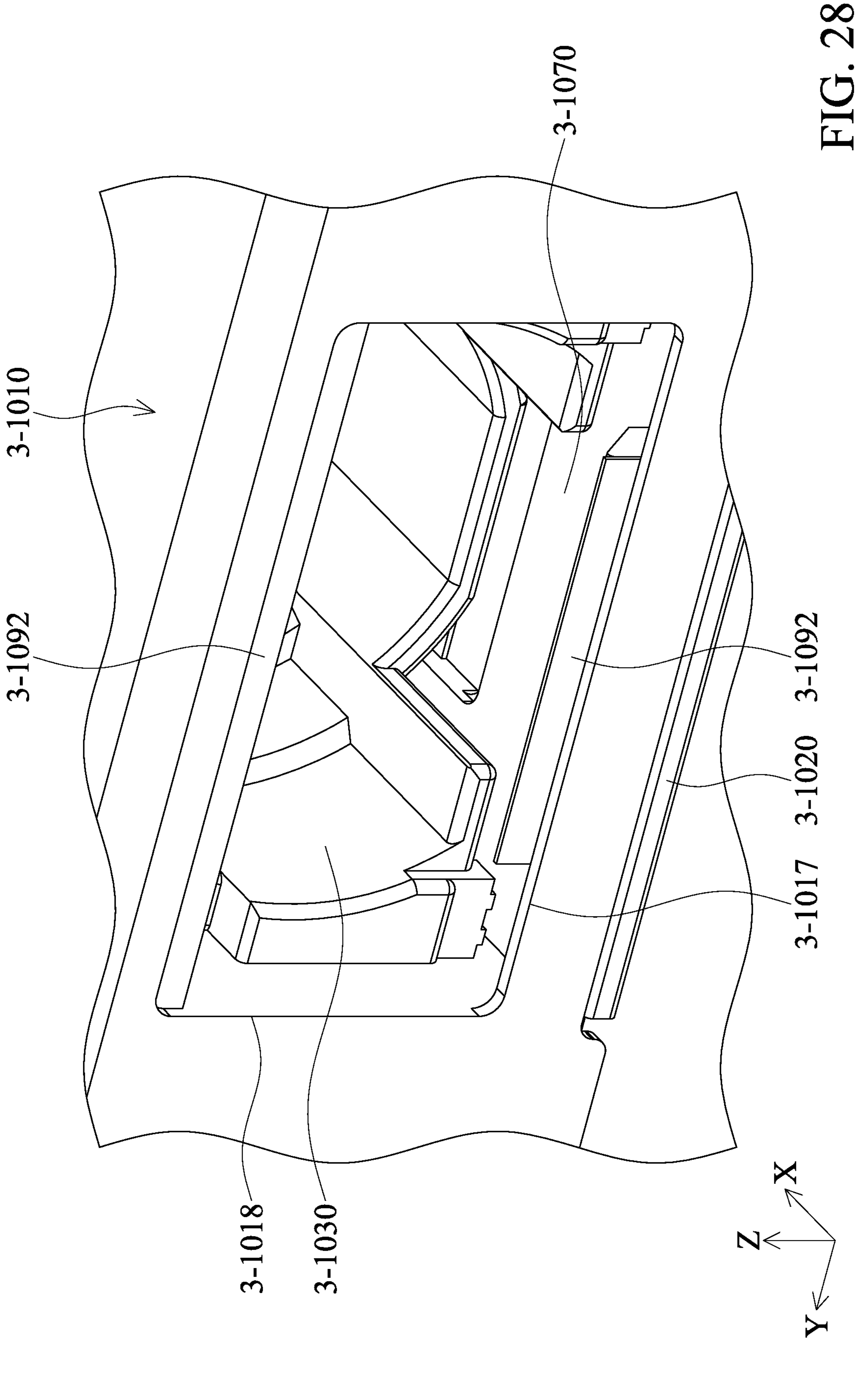
FIG. 28 is an enlarged perspective view illustrating the optical member driving mechanism in accordance with another embodiment of the present disclosure.
Figure 29:
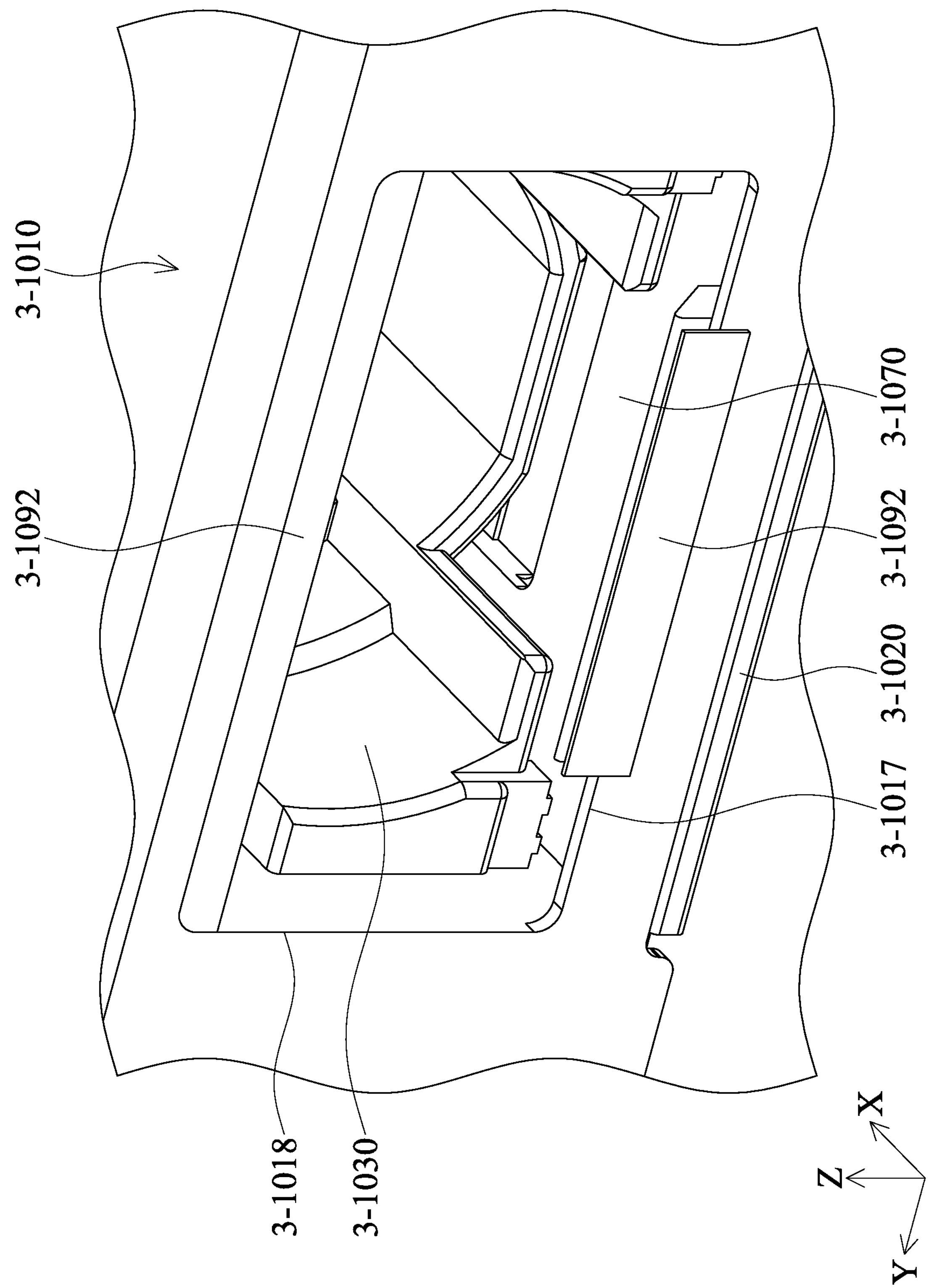
FIG. 29 is an enlarged perspective view illustrating the optical member driving mechanism in accordance with another embodiment of the present disclosure.

FIGS. 28 and 29 are enlarged perspective views illustrating the optical member driving mechanism in accordance with some other embodiments of the present disclosure. As shown in FIG. 28, the light-shielding member 3-1092 is disposed in the housing 3-1010, located between the housing 3-1010 and the barrier 3-1022, and/or between the housing 3-1010 and the frame 3-1050. For example, a groove that faces the base 3-1020 may be formed between the light-shielding structure 3-1051 and the housing 3-1010, and the light-shielding member 3-1092 is disposed in the above groove. Similarly, the shortest distance between the light-shielding member 3-1092 and the base 3-1020 may be shorter than the shortest distance between the light-shielding structure 3-1051 and the base 3-1020.

In the present embodiment, when viewed in the direction (the X axis) that is parallel to the optical axis 3-O, the light-shielding member 3-1092 and the lengthwise side 3-1017 of the first opening 3-1015 at least partially overlap. As shown in FIG. 29, the light-shielding member 3-1092 is disposed out of the housing 3-1010 and located around the first opening 3-1015. Similarly, when viewed in the direction (the X axis) that is parallel to the optical axis 3-O, the light-shielding member 3-1092 and the lengthwise side 3-1017 of the first opening 3-1015 at least partially overlap.

For example, the light-shielding sheet 3-1090 and the light-shielding member 3-1091, 3-1092 may be formed by resin, fiber or any other suitable material (such as SOMA light-shielding material), and may have a porous structure. In some embodiments, the light-shielding sheet 3-1090 and the light-shielding member 3-1091, 3-1092 may be glass that a surface treatment (such as blackening) is performed to. In some embodiments, the light-shielding sheet 3-1090 and the light-shielding member 3-1091, 3-1092 may reduce the reflectivity of the light with a wavelength in a range from 250 nm to 2500 nm lower than 1.6%. In some embodiments, the thickness of the light-shielding sheet 3-1090 and the light-shielding member 3-1091, 3-1092 may be in a range from about 0.1 mm to about 0.5 mm. Thanks to the arrangement of the light-shielding sheet 3-1090 and the light-shielding member 3-1091, 3-1092, the noise reflection may be effectively reduced, preventing the noise from entering the image sensor.

As set forth above, the embodiments of the present disclosure provide an optical member driving mechanism including a light-shielding structure and/or a light-shielding member. The embodiments of the present disclosure provide various structures configured to avoid refection, such as barriers, light-shielding sheet, etc. Therefore, the noise may be prevented from entering the image sensor due to reflection, preserving image quality.

Fourth Group of Embodiments

Figure 30:
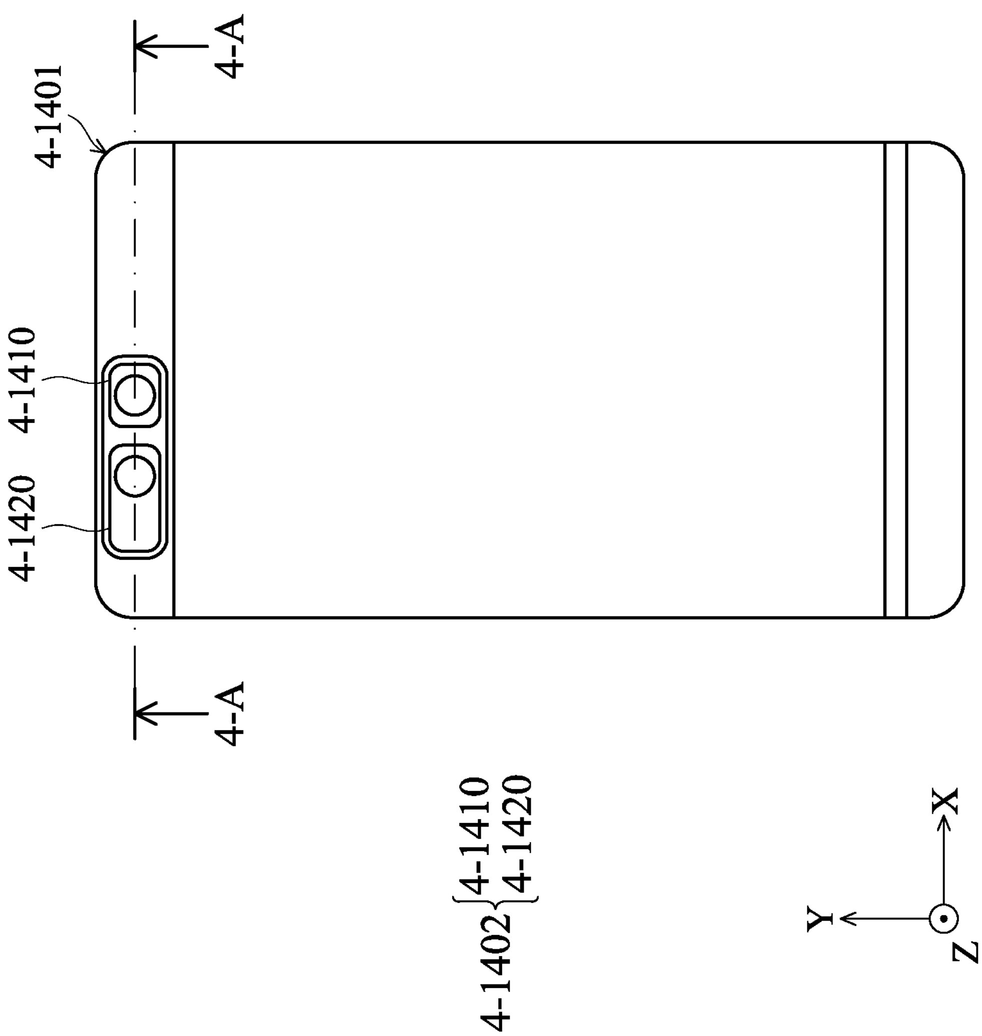
FIG. 30 is a schematic view of an electronic device equipped with an optical system in accordance with some embodiments of this disclosure.

FIG. 30 is a schematic view of an electronic device 4-1401 equipped with an optical system 4-1402 in accordance with some embodiments of this disclosure. In FIG. 30, the electronic device is a smart phone, but this disclosure is not limited thereto. The optical system 4-1402 includes an optical element driving module 4-1410 and a periscope optical module 4-1420.

Figure 31:
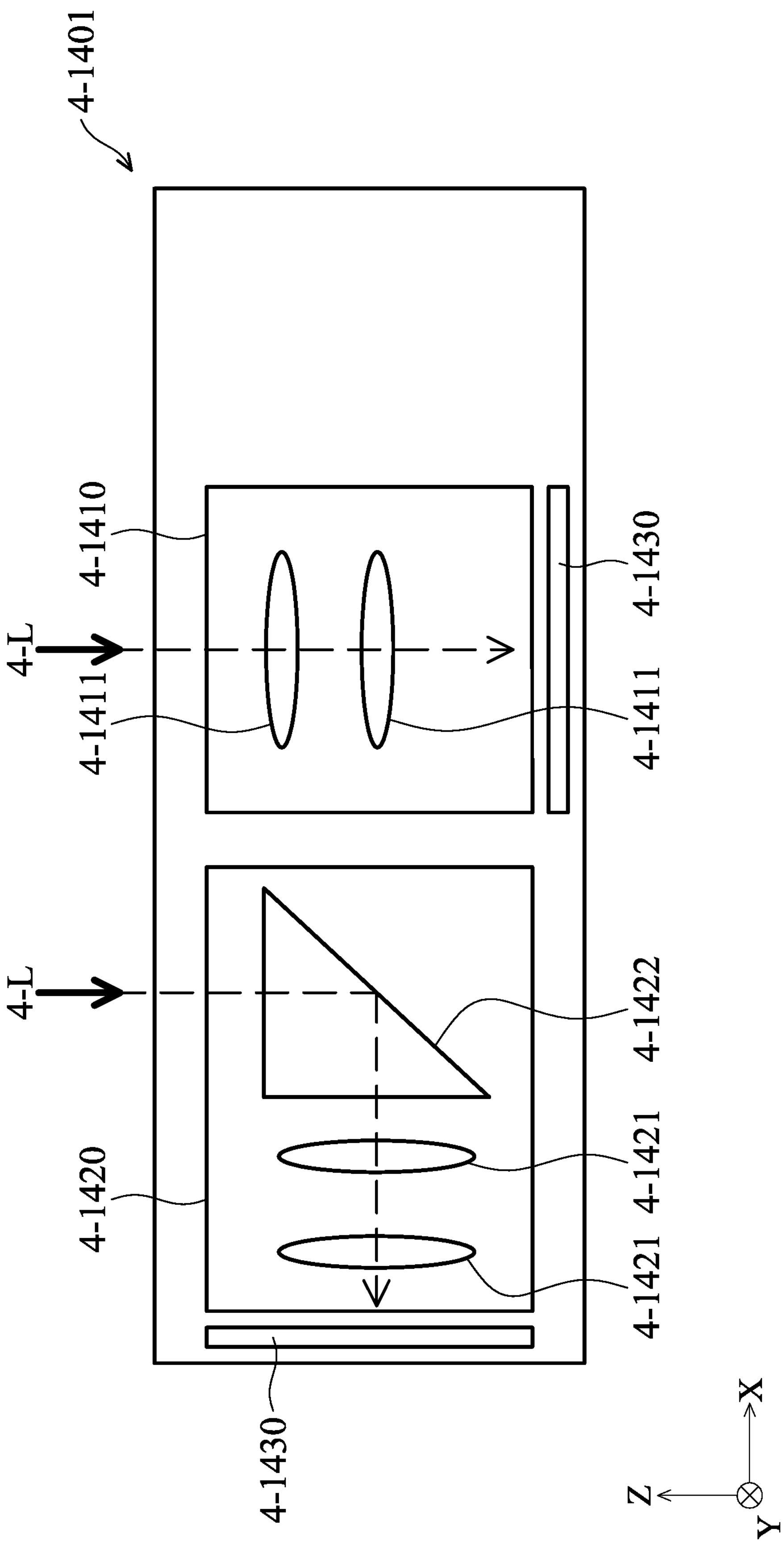
FIG. 31 is a cross-sectional view illustrated along line 4-A-4-A in FIG. 30.

FIG. 31 is a cross-sectional view illustrated along line 4-A-4-A in FIG. 30. In FIG. 31, the forward direction of a light 4-L enters the electronic device 4-1401 is indicated by an arrow. After the light 4-L passes through the optical element driving module 4-1410 and the periscope optical module 4-1420, imaging may be accomplished on two light-detection elements 4-1430 (e.g. charge-coupled detector, CCD). Additionally, the image may be transferred to a processor (not shown) to be further processed.

The optical element driving module 4-1410 includes one or more optical element(s) 4-1411. A driving mechanism is included in the optical element driving module 4-1410 for driving the optical element(s) 4-1411 to move. The arrangement direction of the optical element(s) 4-1411 is parallel to the thickness direction of the electronic device 4-1401. If the number of the optical element(s) 4-1411 is increased, then the thickness of the electronic device 4-1401 is increased.

The periscope optical module 4-1420 includes one or more optical element(s) 4-1421 and a reflecting element 4-1422. By placing the reflecting element 4-1422, the direction of the light 4-L may be changed so that the arrangement direction of the optical element(s) 4-1421 is substantially perpendicular to the thickness direction of the electronic device 4-1401.

When a consumer is shopping for an electronic device, both the appearance and the image function are important factors. A user tends to choose an electronic device that is thin and performs well in capturing images. To enhance the shooting quality, the number of the optical element(s) may be increased. To achieve miniaturization and to place more optical elements, the periscope optical module begins to be developed prosperously.

As described above, the arrangement direction of the optical element(s) 4-1421 in the periscope optical module 4-1420 is different than the arrangement direction of the optical element(s) 4-1411 in the periscope optical module 4-1410. In the periscope optical module 4-1420, the electronic device 4-1401 may be provided with multiple optical elements 4-1421 without affecting the thickness of the electronic device 4-1401 because the arrangement direction of the optical elements 4-1421 is substantially perpendicular to the thickness direction of the electronic device 4-1401.

To sum up, as shown in FIG. 31, when the optical elements 4-1411 of the optical element driving module 4-1410 have the same number and the same size as the optical elements 4-1421 of the periscope optical module 4-1420, the thickness of the periscope optical module 4-1420 is smaller than the thickness of the optical element driving module 4-1410. Thus, selecting the periscope optical module 4-1420 may avoid increasing the thickness of the electronic device 4-1401. In other words, for two electronic devices having the same thickness but equipped with different optical modules, the one equipped with the periscope optical module 4-1420 may hold more optical elements than the one equipped with the optical element driving module 4-1410.

However, for an optical element with a long focal length or a large size, even if it is placed in the periscope optical module 4-1420, the thickness of the electronic device 4-1401 may still be increased. Thus, a periscope optical module for holding an optical element with a long focal length or a large size is provided in this disclosure.

Figure 32:
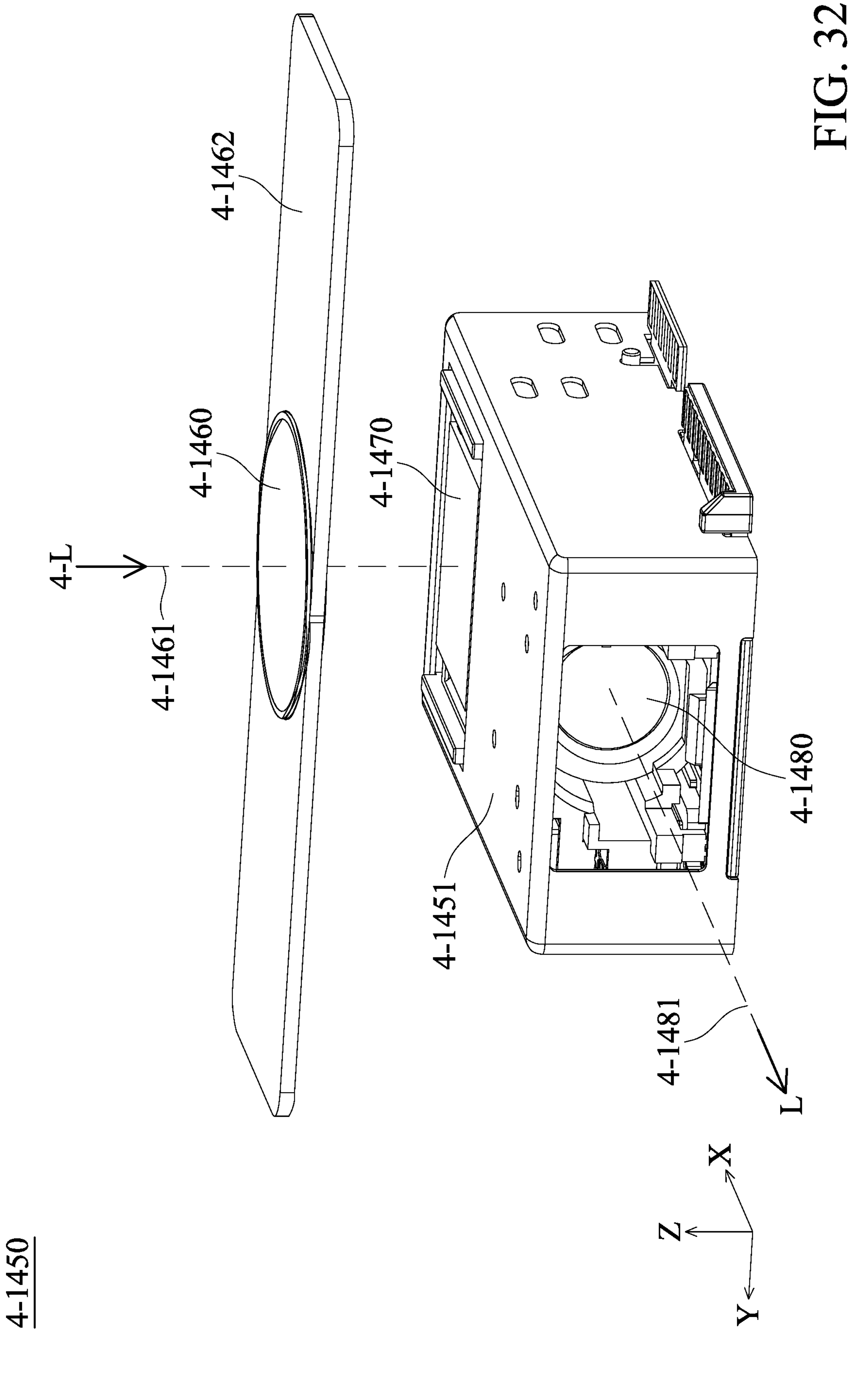
FIG. 32 is a perspective view of a periscope optical module in accordance with some embodiments of this disclosure.

FIG. 32 is a perspective view of a periscope optical module 4-1450 in accordance with some embodiments of this disclosure. The periscope optical module 4-1450 includes a case 4-1451, a first optical element 4-1460, a holder 4-1462, a second optical element 4-1470, and a third optical element 4-1480. When the light 4-L enters the periscope optical module 4-1450, the light 4-L passes through the first optical element 4-1460, the second optical element 4-1470, and the third optical element 4-1480 consecutively.

The first optical element 4-1460 may be an optical element that has longer focal length or bigger size than the third optical element 4-1480, such as a long-focus lens. The first optical element 4-1460 is received in the holder 4-1462.

The second optical element 4-1470 and the third optical element 4-1480 may be protected by the case 4-1451. The shape and the size of the case 4-1451 may be changed arbitrarily. The second optical element 4-1470 has similar features to the reflecting element 4-1422 of FIG. 31. The second optical element 4-1470 may be a mirror, a refractive prism or a beam splitter, etc. To ensure that as much the light 4-L passing through the first optical element 4-1460 as possible is received within the range of the second optical element 4-1470, the second optical element 4-1470 is located under the first optical element 4-1460. Additionally, the position of the second optical element 4-1470 corresponds to the position of the first optical element 4-1460. After the light 4-L passes through the first optical element 4-1460, the forward direction of the light 4-L may be adjusted by the rotation or the movement of the second optical element 4-1470.

Similarly, to ensure that as much the light 4-L as possible is received within the range of the third optical element 4-1480, the third optical element 4-1480 is located on the side of the second optical element 4-1470, and the position of the third optical element 4-1480 corresponds to the position of the second optical element 4-1470. More than one the third optical element 4-1480 may be placed depends on requirements. The third optical element 4-1480 may also correspond to a light-detection element (not shown) located outside the periscope optical module 4-1450 so that the light 4-L is imaged on the light-detection element.

The first optical element 4-1460 and the third optical element 4-1480 may be a lens or the like and may be made of glass, resin or the like. The optical elements made of glass may have better optical performance than the optical elements made of resin, but may be heavier. Since the space for placing the third optical element 4-1480 is more restricted than the space for placing the first optical element 4-1460, the heavy third optical element 4-1480 is usually unwanted. Thus, the first optical element 4-1460 made of glass and the third optical element 4-1480 made of resin may be selected, but any suitable material may be selected according to actual requirements.

Furthermore, the first optical element 4-1460 may be a convex lens (such as a concavo-convex lens), so the focal length of the first optical element 4-1460 is positive, and the light 4-L passing through the first optical element 4-1460 converges. Meanwhile, the third optical element 4-1480 may be a concave lens (such as a convexo-concave lens, a plano-concave lens, or a concavo-concave lens), so the focal length of the third optical element 4-1480 is negative, and the light 4-L passing through the third optical element 4-1480 diverges. Alternatively, the focal length of the first optical element 4-1460 may be negative and the focal length of the third optical element 4-1480 may be positive.

In some embodiments, the periscope optical module 4-1450 further includes an aperture (not shown). The aperture provides an adjustable opening to control the amount of the light 4-L so as to affect the depth of field (DOF) of the image. When the DOF decreased, only the objects near the periscope optical module 4-1450 are clear. The aperture may be disposed between the first optical element 4-1460 and the second optical element 4-1470. Or, the aperture may be disposed between the second optical element 4-1470 and the third optical element 4-1480.

The first optical element 4-1460 has a first optical axis 4-1461, and the first optical axis 4-1461 is an imaginary axis passing through the center of the first optical element 4-1460. The third optical element 4-1480 has a second optical axis 4-1481, and the second optical axis 4-1481 is an imaginary axis passing through the center of the third optical element 4-1480. The first optical axis 4-1461 is not parallel to the second optical axis 4-1481. In this embodiment, the first optical axis 4-1461 is substantially perpendicular to the second optical axis 4-1481 due to the arrangement of the first optical element 4-1460 and the third optical element 4-1480. It should be noted that the first optical axis 4-1461 may be not perpendicular to the second optical axis 4-1481 because of vibration or other reasons.

Since the holder 4-1462 is disposed on the second optical element 4-1470, the holder 4-1462 overlaps the second optical element 4-1470 when viewed along the first optical axis 4-1461.

Figure 33:
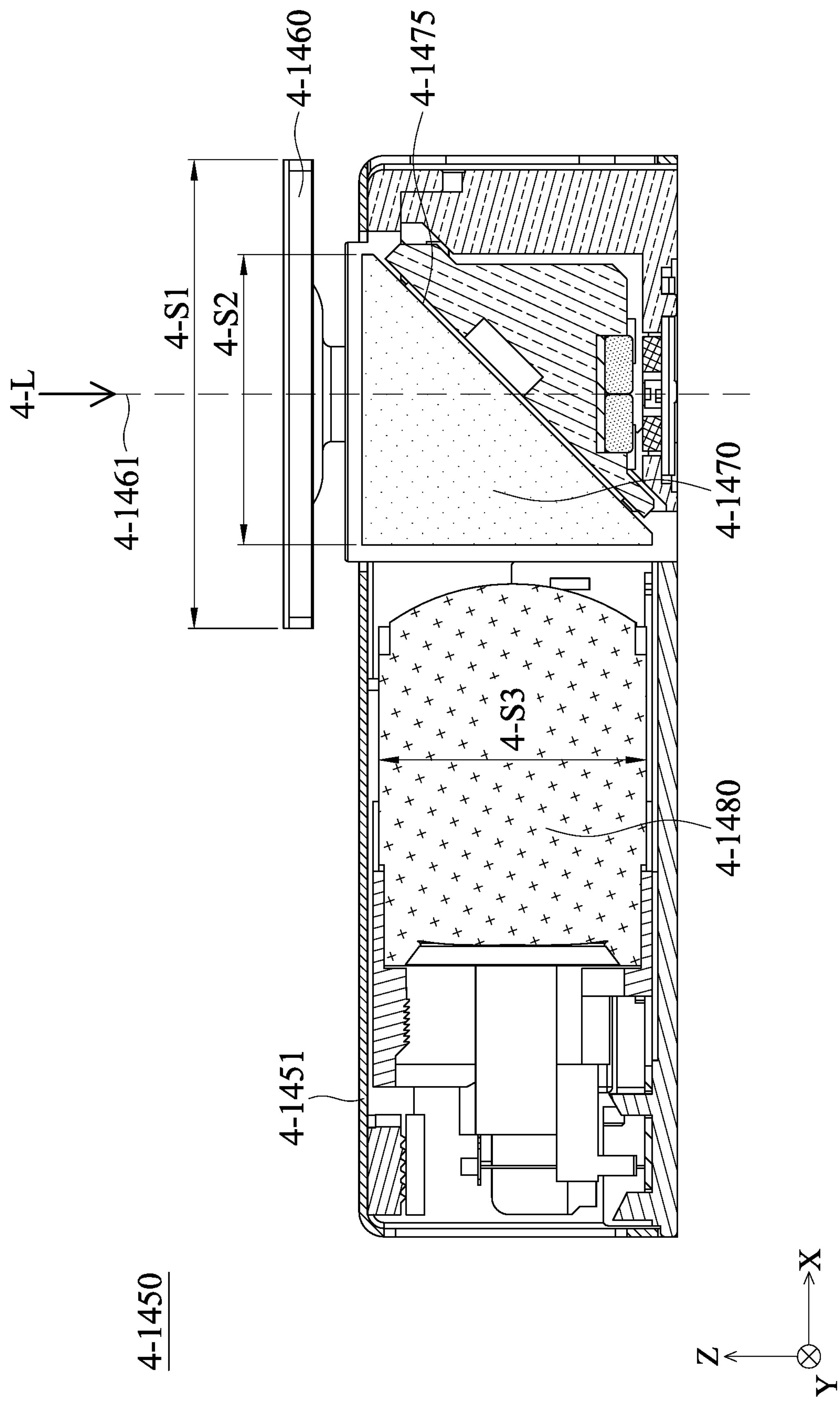
FIG. 33 is a side view of the periscope optical module in FIG. 32.

FIG. 33 is a side view of the periscope optical module 4-1450 in FIG. 32. As shown in FIG. 33, a minimum size 4-S1 of the first optical element 4-1460 in the direction that is perpendicular to the first optical axis 4-1461 is larger than a maximum size 4-S3 of the third optical element 4-1480 in the direction of the first optical axis 4-1461.

By such configuration, the thickness of the periscope optical module 4-1450 is not affected by the minimum size 4-S1 of the first optical element 4-1460 in the direction that is perpendicular to the first optical axis 4-1461. Therefore, the first optical element 4-1460 with a long focal length may be placed under the circumstance that miniaturization of the periscope optical module 4-1450 is also taken into consideration. Furthermore, the quality of the image may be enhanced because the first optical element 4-1460 and third optical element 4-1480 have different focal lengths and different sizes.

To illustrate clearly, "the size" of the optical element actually refers to "the effective optical area" of the optical element. When an image is formed, the size of the image is not proportional to the actual size of the optical element, but proportional to the effective optical area. "The effective optical area" of the optical element means the area that the light actual passes and may be imaged.

For example, the effective optical area may not equal to the actual size of the first optical element 4-1460 because the periphery of the first optical element 4-1460 may be shielded by the holder 4-1462 for receiving the first optical element 4-1460. For such circumstance, the minimum size 4-S1 of the first optical element 4-1460 means the minimum size of the first optical element 4-1460 not shielded by the holder 4-1462 in the direction that is perpendicular to the first optical axis 4-1461, not the actual size of the first optical element 4-1460 in the direction that is perpendicular to the first optical axis 4-1461.

Therefore, the minimum size 4-S1 of the first optical element 4-1460 is larger than the maximum size 4-S3 of the third optical element 4-1480 means the effective optical area of the first optical element 4-1460 is larger than the effective optical area of the third optical element 4-1480.

Figure 34:
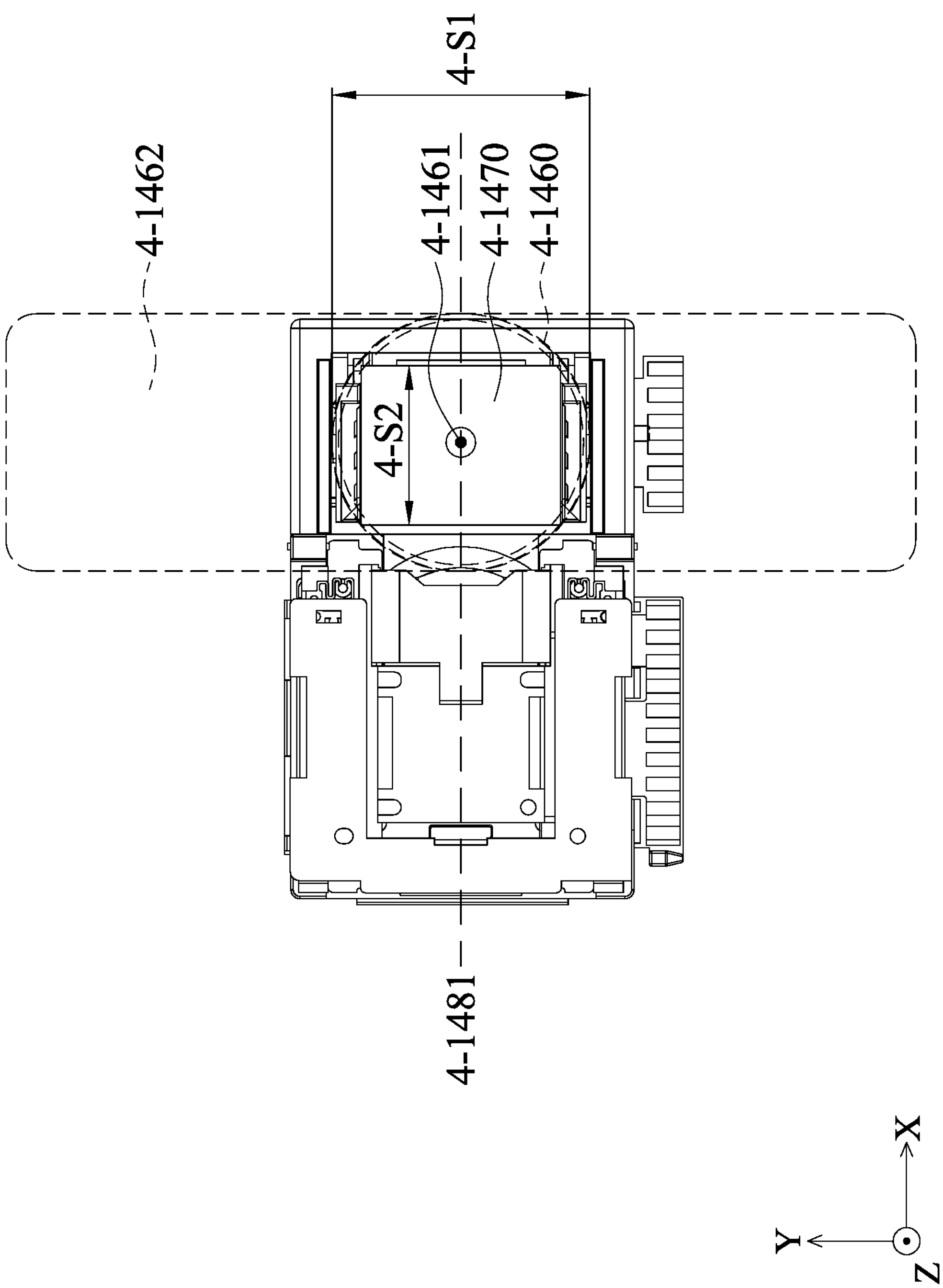
FIG. 34 is a top view of the periscope optical module in FIG. 32.

FIG. 34 is a top view of the periscope optical module 4-1450 in FIG. 32. As shown in FIG. 34, the minimum size 4-S1 of the first optical element 4-1460 in the direction that is perpendicular to the first optical axis 4-1461 is larger than a maximum size 4-S2 of the second optical element 4-1480 in the direction of the second optical axis 4-1481. Yet, a reflecting surface 4-1475 of the second optical element 4-1470 is larger than or equal to the cross-sectional area of the light 4-L after passing through the first optical element 4-1460 to avoid a portion of the light 4-L is not reflected.

It should be noted that in some embodiments, the cross-sectional area of the light 4-L shrinks when the light 4-L passes through the first optical element 4-1460, the second optical element 4-1470, and the third optical element 4-1480 due to the intrinsic properties of the light 4-L such as refraction or reflection. For example, when the light 4-L passes through the first optical element 4-1460, the second optical element 4-1470, and the third optical element 4-1480, the profile of the light 4-L may be conical and the cross-sectional area of the light 4-L shrinks.

Furthermore, the maximum size 4-S2 of the second optical element 4-1470 in the direction of the second optical axis 4-1481 may be designed to be larger than the maximum size 4-S3 of the third optical element 4-1480 in the direction of the first optical axis 4-1461. By such design, the size of the periscope optical module 4-1450 in the direction of the first optical axis 4-1461 may be reduced, i.e. the thickness of the periscope optical module 4-1450 may be reduced.

Figure 35:
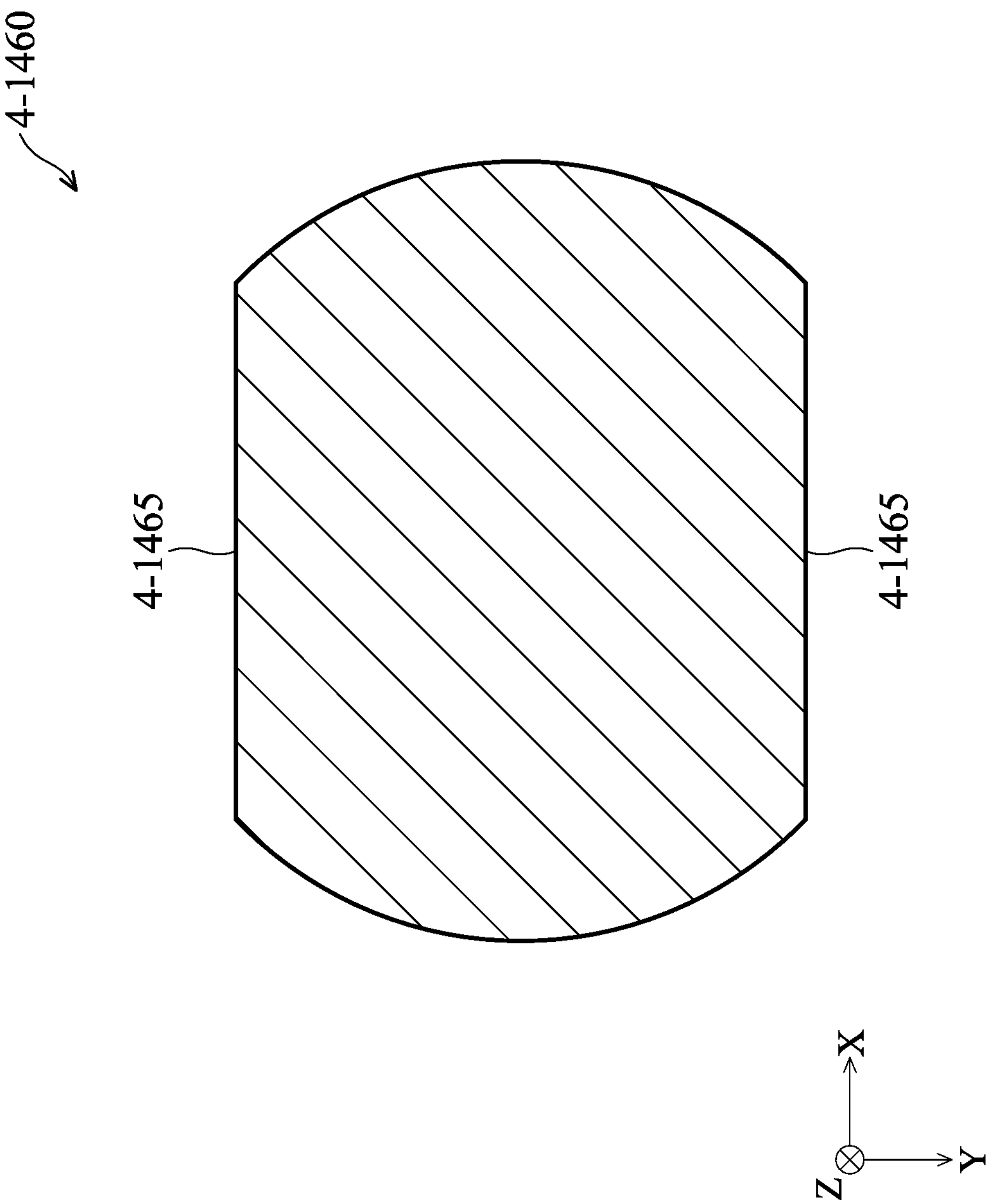
FIG. 35 is a schematic view of a first optical element in accordance with some embodiments of this disclosure.

FIG. 35 is a schematic view of the first optical element 4-1460 in accordance with some embodiments of this disclosure. As shown in FIG. 35, to reduce production cost, lower the weight of the periscope optical module 4-1450 or reduce the thickness of the periscope optical module 4-1450, the first optical element 4-1460 includes two cutting portions 4-1465 formed in the opposite sides of the first optical element 4-1460. The cutting portions 4-1465 may be formed by cutting process or the like. It should be noted that the third optical element 4-1480 may also have similar shape.

It should be mentioned that a portion of the light 4-L may exceed the light-detection element and thus may not be imaged because the shape of the light-detection element is different than the shape of the light 4-L or other reasons. Therefore, the quality of the image is not affected just because the first optical element 4-1460 includes the cutting portions 4-1465.

Figure 36:
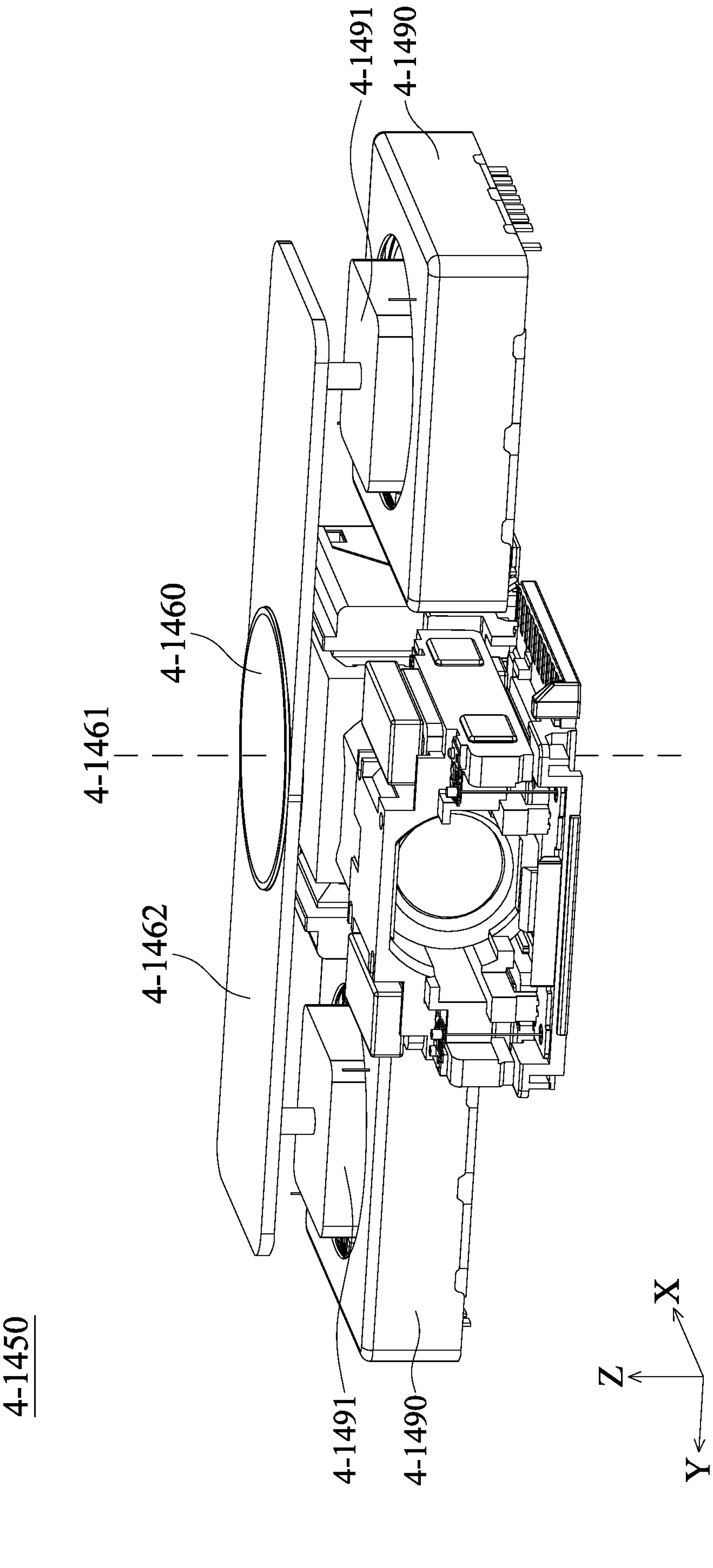
FIG. 36 is a perspective view of the periscope optical module with a first driving assembly.

FIG. 36 is a perspective view of the periscope optical module 4-1450 with a first driving assembly 4-1490. The first optical element 4-1460 may be driven by the first driving assembly 4-1490 to move relative to the second optical element 4-1470. Next, how the first driving assembly 4-1490 works is described in detail. However, the first driving assembly 4-1490 may be omitted and the holder 4-1462 may be affixed by adhesion and the like.

The first driving assembly 4-1490 includes two driving members 4-1491 connecting to and support the holder 4-1462. The movement of the driving members 4-1491 may also drive the holder 4-1462 so that the first optical element 4-1460 may move in different directions (such as X-axis, Y-axis, or Z-axis in the drawings) to achieve auto focus (AF) and optical image stabilization (OIS), respectively. For example, the two driving members 4-1491 may move the same distance toward the first optical axis 4-1461 so that the first optical element 4-1460 may also move toward the first optical axis 4-1461 to achieve AF. In this embodiment, in order to stabilize or balance the first optical element 4-1460 with larger effective optical area (and thus may be heavier), two driving members 4-1491 are used, but the number of the driving members 4-1491 may be changed.

The second optical element 4-1470 is located between the two driving members 4-1491 when viewed along the direction that is perpendicular to the first optical axis 4-1461. Additionally, the driving members 4-1491 of the first driving assembly 4-1490 partially overlaps the second optical element 4-1470 but not overlaps the first optical element 4-1460 when viewed along the direction that is perpendicular to the first optical axis 4-1461.

In addition to the methods for driving the first optical element 4-1460 by the driving members 4-1491, the first driving assembly 4-1490 may include electromagnetic elements, bias elements made of shape memory alloys (SMA), or smooth impact drive mechanisms (SIDM) or the like.

If the first driving assembly 4-1490 is electromagnetic type, then the first driving assembly 4-1490 may include elements such as a coil, a magnetic element, etc. When a current is supplied to the coil, electromagnetic induction may occur between the coil and the magnetic element so as to generate electromagnetic force to drive the first optical element 4-1460 to move.

If the first driving assembly 4-1490 includes bias elements made of SMA, the bias elements may connect to the holder 4-1462. SMA material deforms according to temperature change. Thus, a driving signal (such as current or voltage) may be supplied to the bias elements by a power supply to control the temperature of the bias elements to change the length of the bias elements so as to drive the first optical element 4-1460 to move.

If the first driving assembly 4-1490 is a SIDM, then the first driving assembly 4-1490 may include piezoelectric assembly, moving object, etc. The volume change of the piezoelectric assembly and the inertia and the friction force of the moving object drive the first optical element 4-1460 to move.

Additionally, the configurations of the first driving assembly 4-1490 are not limited to the aforementioned embodiments. FIG. 37 to FIG. 42 are different configurations of the first driving assembly 4-1490 in accordance with some embodiments of this disclosure. It should be noted that FIG. 37 to FIG. 42 are much simplified. The positions of the first optical element 4-1460, the second optical element 4-1470, and the third optical element 4-1480 are relatively the same, and the elements may have structures the same as or similar to the aforementioned embodiments.

Figure 37:
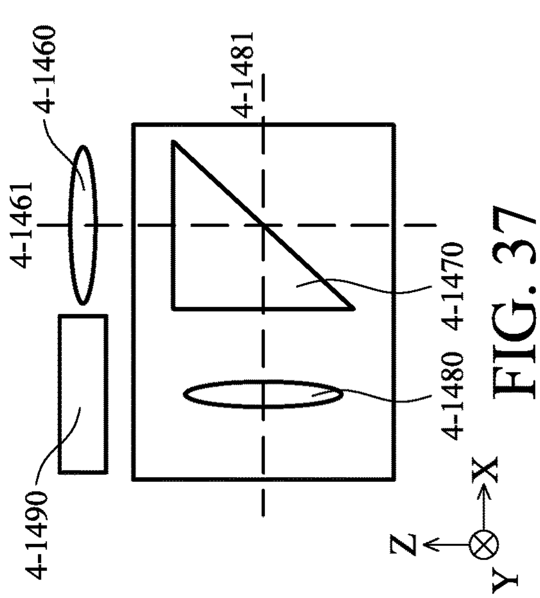
FIG. 37 to FIG. 42 are different configurations of the first driving assembly in accordance with some embodiments of this disclosure.

As shown in FIG. 37, the first driving assembly 4-1490 may be disposed above the third optical element 4-1480 so that the first driving assembly 4-1490 overlaps the third optical element 4-1480 when viewed along the direction of the first optical axis 4-1461. Also, the first driving assembly 4-1490 does not overlap the third optical element 4-1480.

Figure 38:
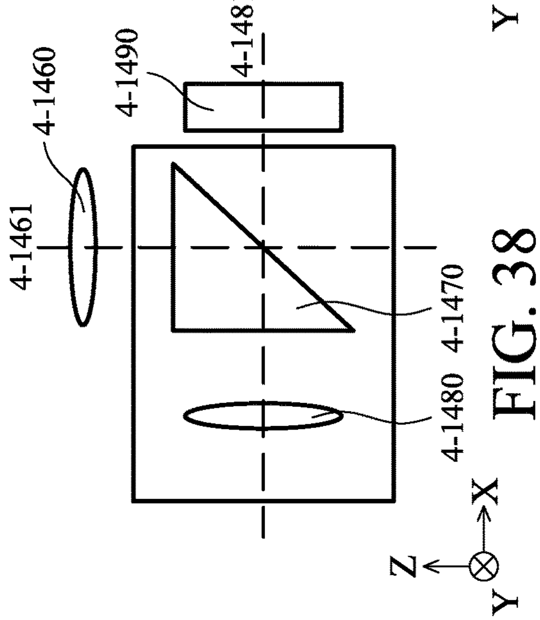

As shown in FIG. 38, the first driving assembly 4-1490 may be disposed adjacent to the second optical element 4-1470 so that the second optical element 4-1470 is located between the third optical element 4-1480 and the first driving assembly 4-1490 when viewed along the direction that is perpendicular to the first optical axis 4-1461. Also, the first driving assembly 4-1490 does not overlap the first optical element 4-1460 when viewed along the direction of the second optical axis 4-1481.

Figure 39:
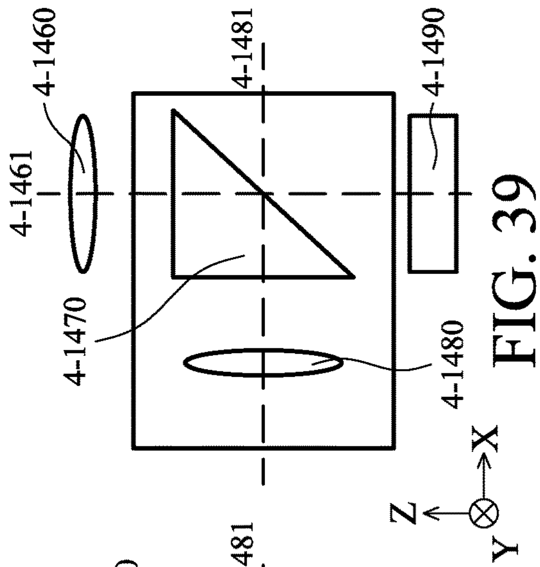

As shown in FIG. 39, the first driving assembly 4-1490 may be disposed below the second optical element 4-1470 so that the second optical element 4-1470 is located between the first optical element 4-1460 and the first driving assembly 4-1490 when viewed along the direction of the first optical axis 4-1461. Also, the first driving assembly 4-1490 does not overlap the first optical element 4-1460 and the third optical element 4-1480 when viewed along the direction of the second optical axis 4-1481.

Figure 40:
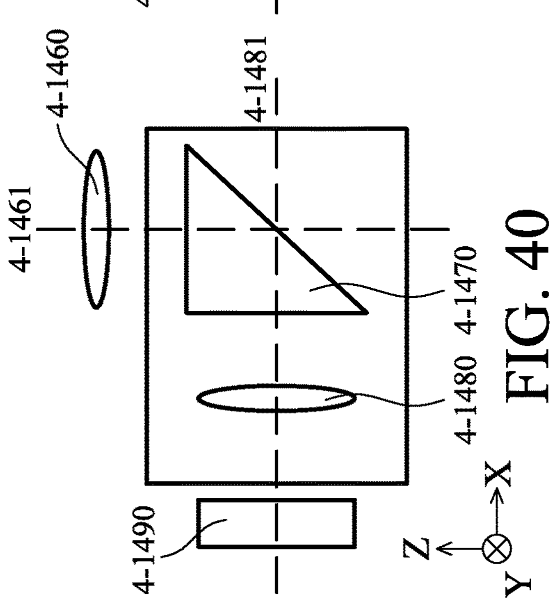

As shown in FIG. 40, the first driving assembly 4-1490 may be disposed adjacent to the third optical element 4-1480 so that the third optical element 4-1480 is located between the second optical element 4-1470 and the first driving assembly 4-1490 when viewed along the direction that is perpendicular to the first optical axis 4-1461. Also, the first driving assembly 4-1490 overlaps the third optical element 4-1480 when viewed along the direction of the second optical axis 4-1481.

Figure 41:
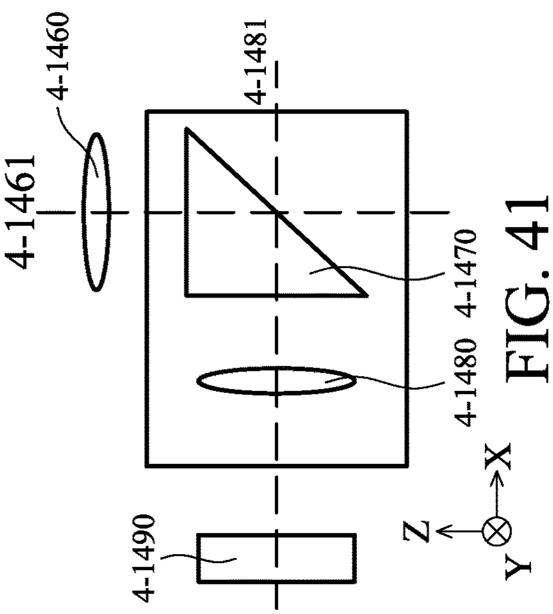

As shown in FIG. 41, the configuration of FIG. 41 is similar to that of FIG. 40. The difference is that the first driving assembly 4-1490 spaced a distance apart from the third optical element 4-1480.

Figure 42:
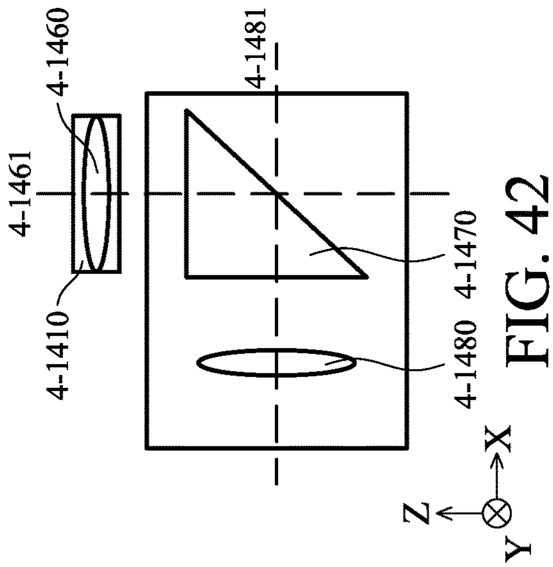

As shown in FIG. 42, in this embodiment, an optical element driving module similar to the optical element driving module 4-1410 of FIG. 31 is used for receiving the first optical element 4-1460. The first driving assembly 4-1490 for driving the first optical element 4-1460 may be omitted because the optical element driving module 4-1410 includes a driving mechanism for driving the first optical element 4-1460 inside.

Figure 43:
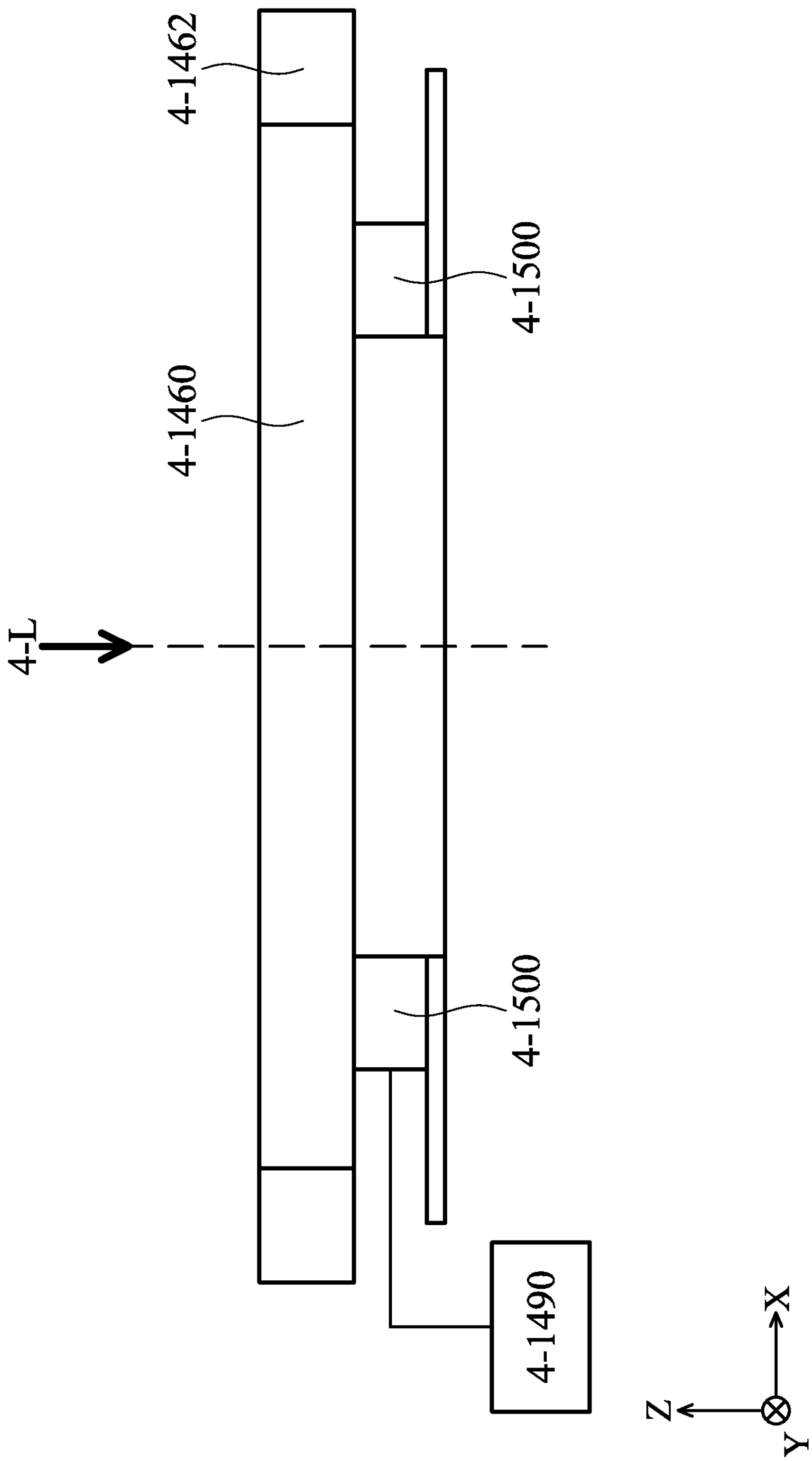
FIG. 43 is a schematic view of a liquid lens driving assembly.
Figure 44:
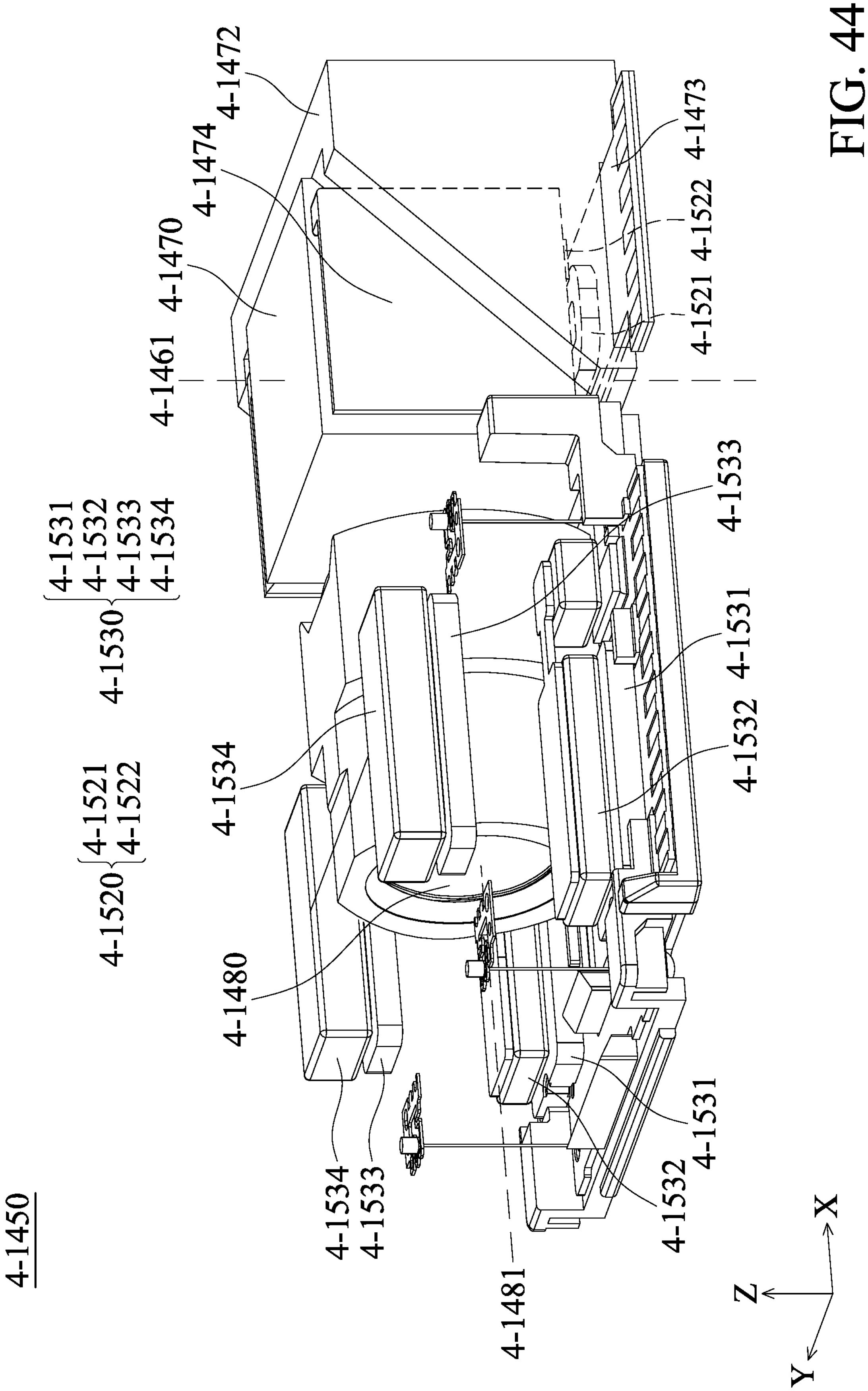
FIG. 44 is a schematic view of a second driving assembly and a third driving assembly.

FIG. 43 is a schematic view of a liquid lens driving assembly 4-1500. In FIG. 43, the first optical element 4-1460 is a liquid lens. Liquid lenses are lenses that the medium is liquid. The focal length of the first optical element 4-1460 may be changed by the liquid lens driving assembly 4-1500 via rotation or squeeze. Furthermore, the first driving assembly 4-1490 may be used for driving the liquid lens driving assembly 4-1500 so that the first driving assembly 4-1490 drives the first optical element 4-1460 (as a liquid lens in this embodiment) and the liquid lens driving assembly 4-1500 to move relative to the second optical element 4-1470 at the same time FIG. 44 is a schematic view of a second driving assembly 4-1520 and a third driving assembly 4-1530. To show clearly, some elements are omitted in FIG. 44. In addition to the first driving assembly 4-1490, the periscope optical module 4-1450 may include the second driving assembly 4-1520 and/or the third driving assembly 4-1530. The second driving assembly 4-1520 drives the second optical element 4-1470 to move or rotate. The third driving assembly 4-1530 drives the third optical element 4-1480 to move relative to the second optical element 4-1470.

It should be noted that the term "the first" driving assembly 4-1490, "the second" driving assembly 4-1520, and "the third" driving assembly 4-1530 do not represent the order or the necessities of different driving assemblies. That is, it does not represent the periscope optical module 4-1450 has to include the first driving assembly 4-1490 to further include the second driving assembly 4-1520. It does not represent the periscope optical module 4-1450 has to include the second driving assembly 4-1520 to further include the third driving assembly 4-1530, either. The driving assemblies are arranged or used depends on the requirements. In some embodiments, the periscope optical module 4-1450 only includes one or two of the first driving assembly 4-1490, the second driving assembly 4-1520, and the third driving assembly 4-1530. For example, the periscope optical module 4-1450 may merely include the third driving assembly 4-1530 for driving the third optical element 4-1480 to move relative to the second optical element 4-1470 while the first driving assembly 4-1490 and the second driving assembly 4-1520 are omitted.

As shown in FIG. 44, the periscope optical module 4-1450 includes a bottom 4-1472, a circuit board 4-1473, and a holding piece 4-1474. The bottom 4-1472 corresponds to the second optical element 4-1470. The circuit board 4-1473 is disposed on the bottom 4-1472. The holding piece 4-1474 may hold the second optical element 4-1470. In this embodiment, the second driving assembly 4-1520 is electromagnetic type, including a coil 4-1521 and a magnetic element 4-1522. The coil 4-1521 is disposed on the circuit board 4-1473 and the magnetic element 4-1522 is disposed on the holding piece 4-1474. Alternatively, the position of the coil 4-1521 and the position of the magnetic element 4-1522 may be exchanged. The generated electromagnetic force between the coil 4-1521 and the magnetic element 4-1522 may drive the second optical element 4-1470 to move or rotate so as to change the forward direction of the light 4-L. For example, the second optical element 4-1470 may rotate around a direction that is perpendicular to the first optical axis 4-1461 and the second optical axis 4-1481.

It should be noted that the first driving assembly 4-1490 include multiple types with regard to the discussion about FIG. 37 to FIG. 42. When the first driving assembly 4-1490 and the second driving assembly 4-1520 are both electromagnetic type, the second driving assembly 4-1520 is not disposed on the side of the bottom 4-1472 adjacent to the first driving assembly 4-1490 to avoid magnetic interference.

The third driving assembly 4-1530 may include configurations the same as or similar to the first driving assembly 4-1490. As described above, for driving the third optical element 4-1480, the third driving assembly 4-1530 may include electromagnetic type, bias elements made of SMA, SIDM, etc.

In this embodiment the third driving assembly 4-1530 includes two coils 4-1531, two magnetic elements 4-1532, two coils 4-1533, and two magnetic elements 4-1534. The generated electromagnetic force between the coils 4-1531 and the magnetic elements 4-1532 may drive the third optical element 4-1480 to move along the direction of the second optical axis 4-1481 to achieve AF. The generated electromagnetic force between the coils 4-1533 and the magnetic elements 4-1534 may drive the third optical element 4-1480 to move along the direction that is not parallel to the second optical axis 4-1481 to achieve OIS.

Figure 45:
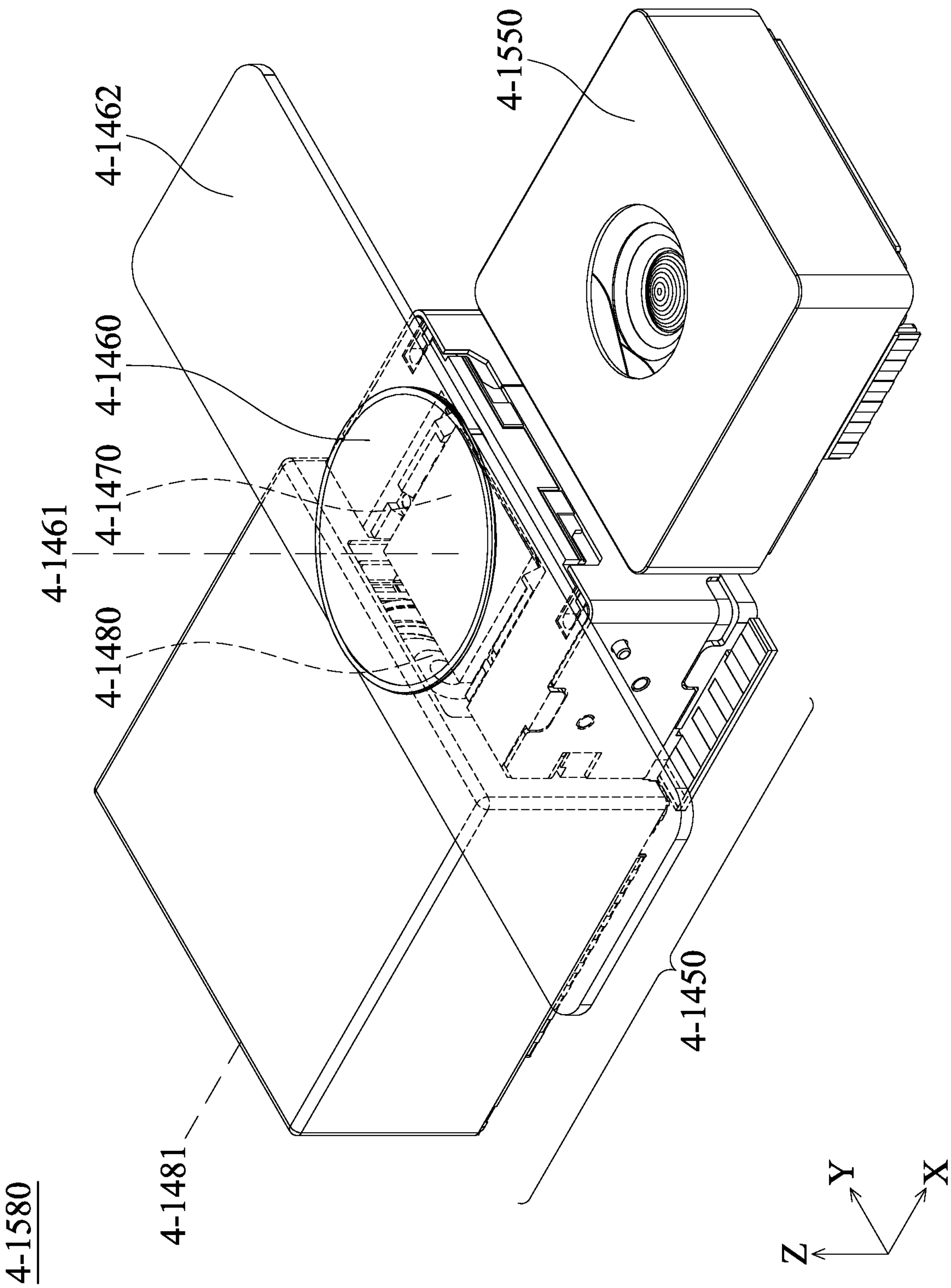
FIG. 45 and FIG. 46 are schematic views of an optical system in accordance with some embodiments of this disclosure.
Figure 46:
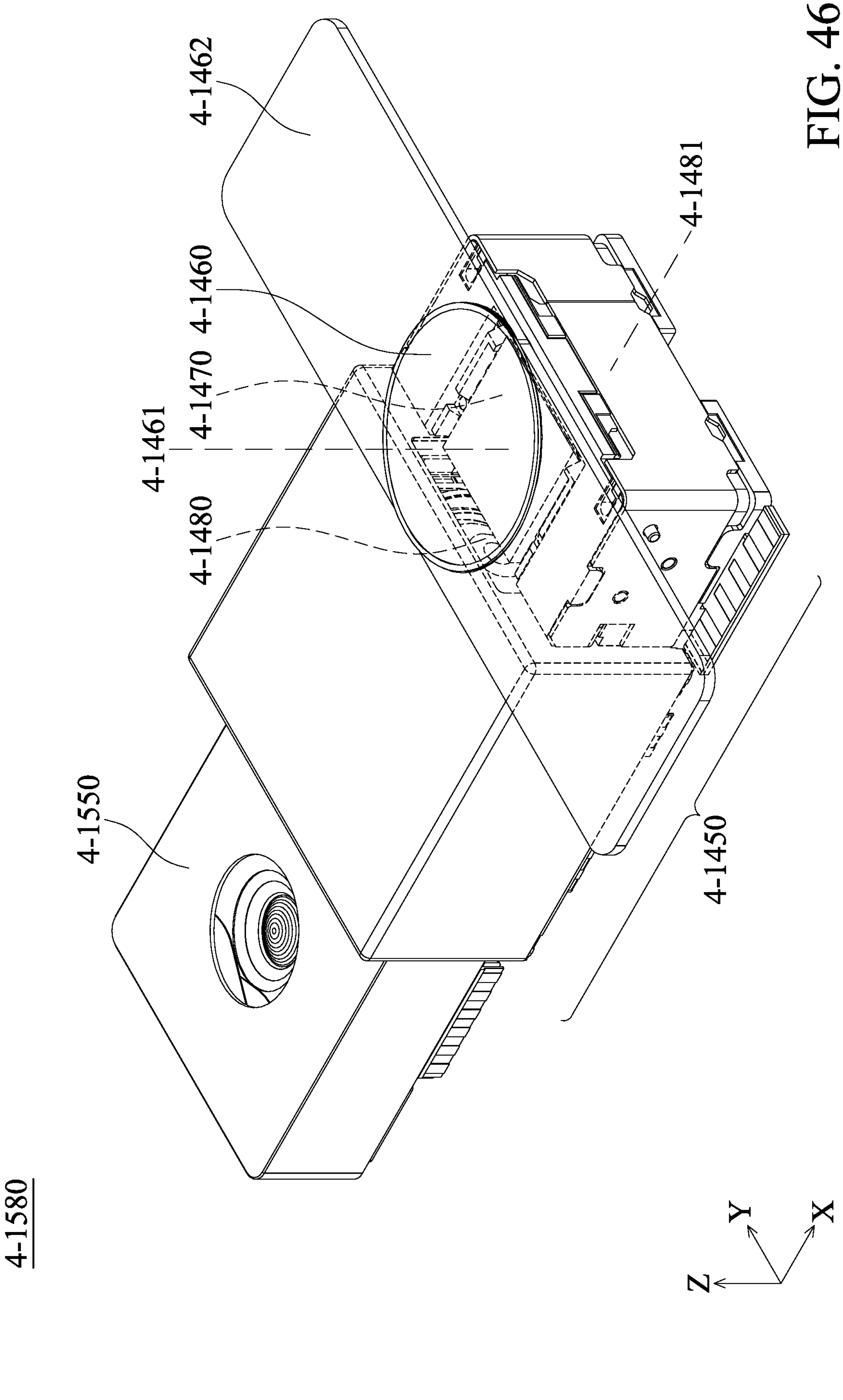

FIG. 45 and FIG. 46 are schematic views of an optical system 4-1580 in accordance with some embodiments of this disclosure. The optical system 4-1580 may be disposed in an electronic device as the electronic device 4-1401 shown in FIG. 30 while the optical system 4-1402 is replaced with the optical system 4-1580. The optical system 4-1580 includes the periscope optical module 4-1450 and an optical element driving module 4-1550. The optical element driving module 4-1550 may be similar to the optical element driving module 4-1410 as shown in FIG. 30. The optical element driving module 4-1550 may be disposed in different positions.

As shown in FIG. 45, the optical element driving module 4-1550 is disposed adjacent to the second optical element 4-1470 of the periscope optical module 4-1450. As shown in FIG. 46, the optical element driving module 4-1550 is disposed adjacent to the third optical element 4-1480 of the periscope optical module 4-1450. In FIG. 45 and FIG. 46, the optical element driving module 4-1550 and the second optical element 4-1470 are arranged along the direction that is perpendicular to the first optical axis 4-1461 and parallel to the second optical axis 4-1481. The periscope optical module 4-1450 and the optical element driving module 4-1550 may include a plurality of optical elements so that when the smart phone 4-1580 is used for shooting, targets such as light-detection, wide-angle, and long-focus may be achieved to enhance the quality of the image.

An improved periscope optical module is provided. Based on the present disclosure, an optical element with larger effective optical area may be disposed in an electronic device without increasing the thickness of the electronic device. Additionally, different assemblies may be used for drive the optical element to achieve displacement compensation and increase correction efficiency. Additional optical element driving module may also be used together with the periscope optical module of this disclosure to enhance the quality of image being photographed by the electronic device.

Fifth Group of Embodiments

Figure 47:
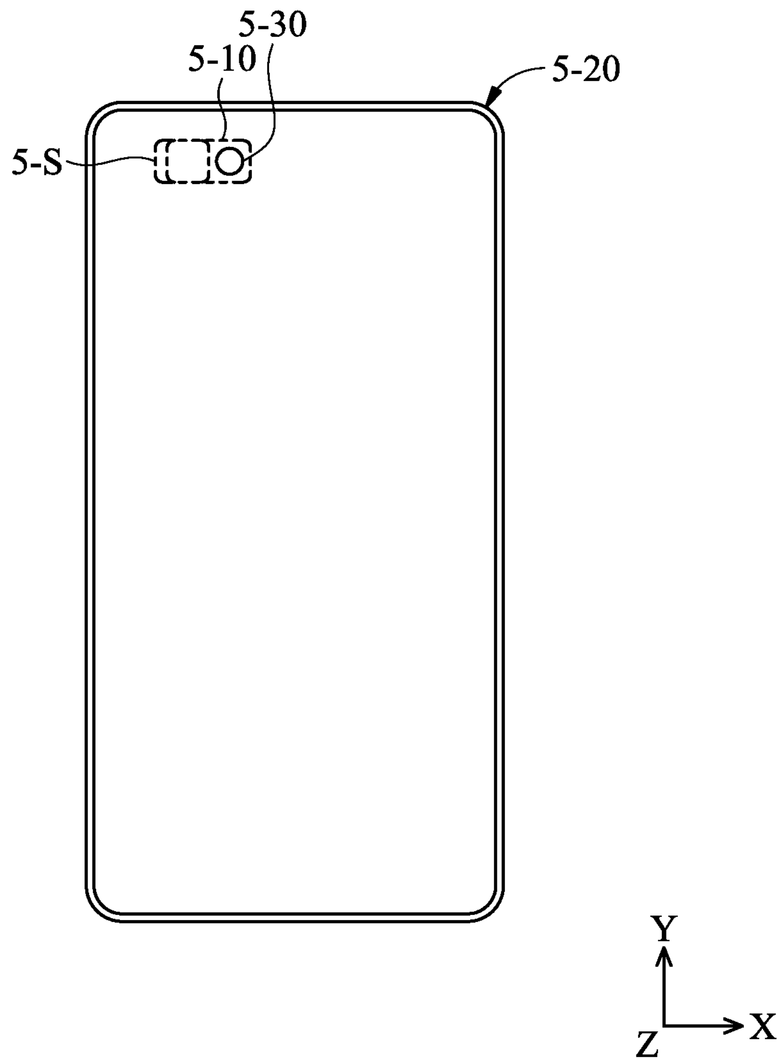
FIG. 47 is a schematic diagram of an electronic device according to an embodiment of the invention.
Figure 48:
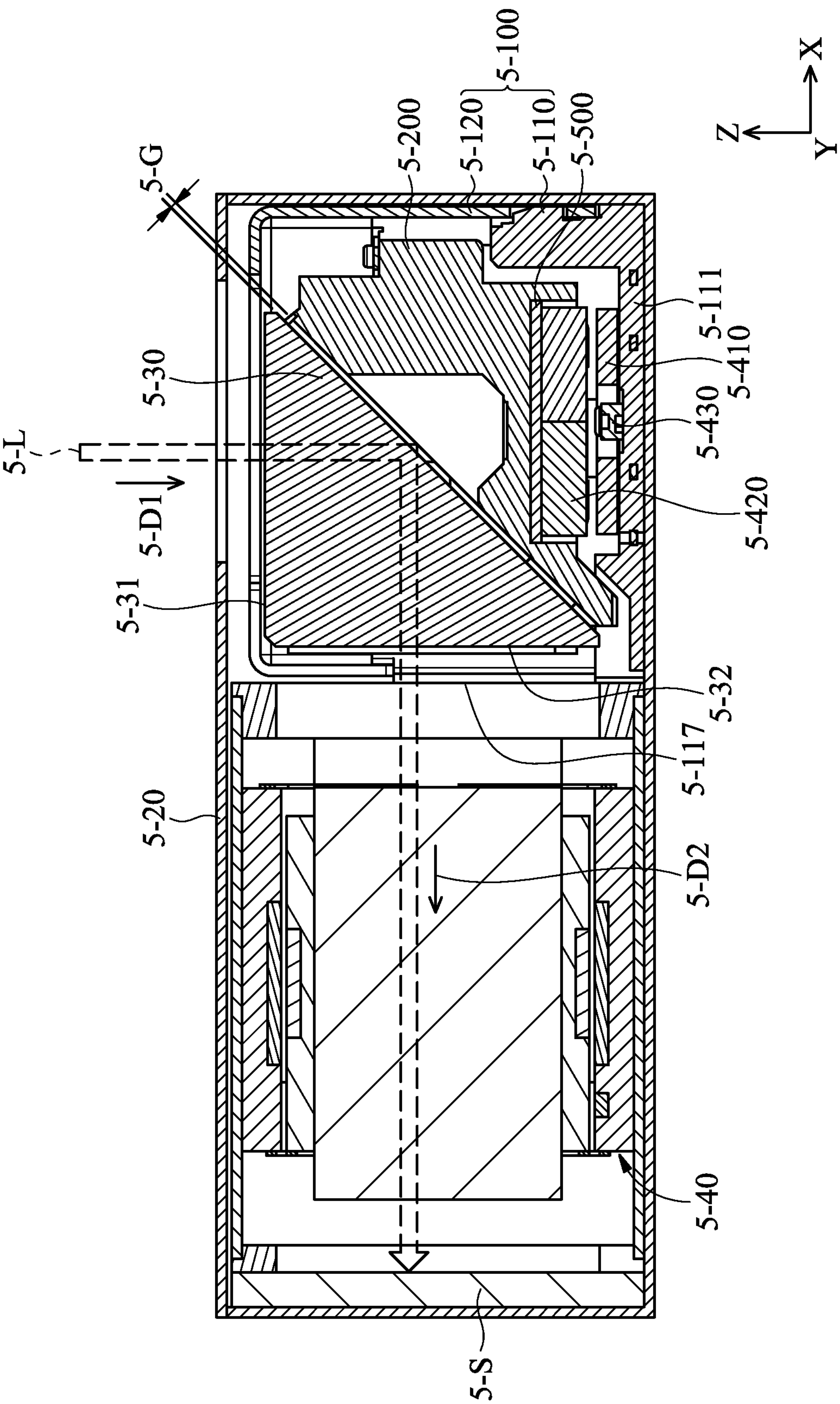
FIG. 48 is a partial cross-sectional view of the electronic device according to an embodiment of the invention.

Referring to FIGS. 47 and 48, in an embodiment of the invention, an optical member driving mechanism 5-10 can be disposed in an electronic device 5-20. The optical member driving mechanism 5-10 is configured to hold an optical member 5-30 and drive the optical member 5-30 to move relative to an image sensor module 5-S in the electronic device 5-20, so as to achieve the purpose of focus adjustment. For example, the electronic device 5-20 can be a digital camera or a smart phone having the function of capturing photographs or making video recordings, and the optical member 5-30 can be a prism or a mirror. When capturing photographs or making video recordings, light 5-L enters the optical member driving mechanism 5-10 along an incident direction 5-D1, and moves along an outgoing direction 5-D2 to reach the image sensor module 5-S after reflected by the optical member 5-30.

In this embodiment, after reflected by the optical member 5-30, the light 5-L reaches the image sensor module 5-S through an optical system 5-40. The optical system 5-40 can be adjusted or omitted as required, and is not limited to the structure shown in figures. It should be noted that, in this embodiment, the light 5-L enters the optical member 5-30 from a first surface 5-31 of the optical member 5-30, and leaves the optical member 5-30 from a second surface 5-32. In some embodiments, the disposing orientation of the optical member driving mechanism 5-10 can be adjusted, the light 5-L can enter the optical member 5-30 from the second surface 5-32 of the optical member 5-30 and leave the optical member 5-30 from the first surface 5-31. In other words, in some embodiments, the incident direction 5-D1 and the outgoing direction 5-D2 can be exchanged.

Figure 51:
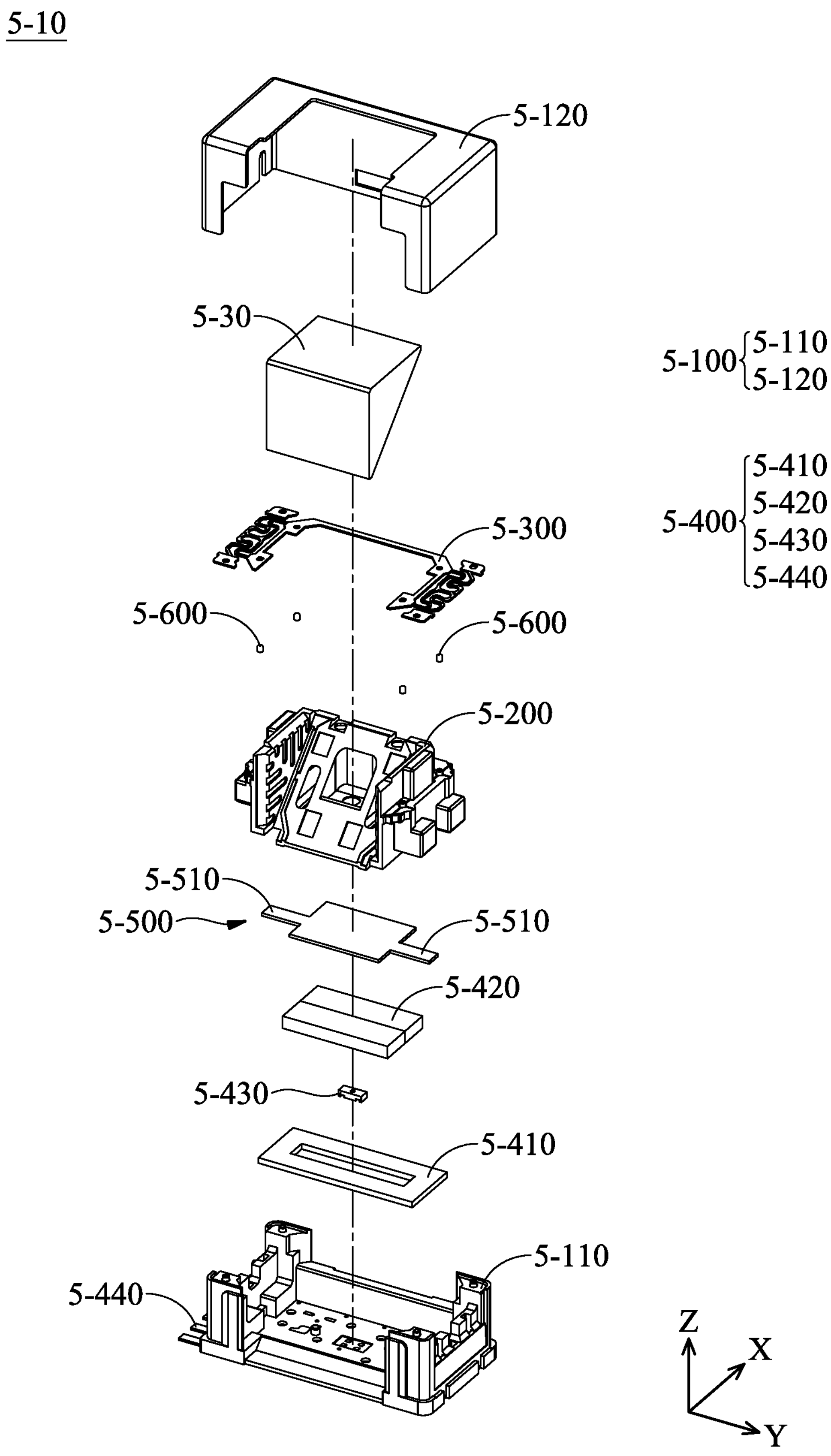
FIG. 51 is an exploded-view diagram of the optical member driving mechanism according to an embodiment of the invention.
Figure 59:
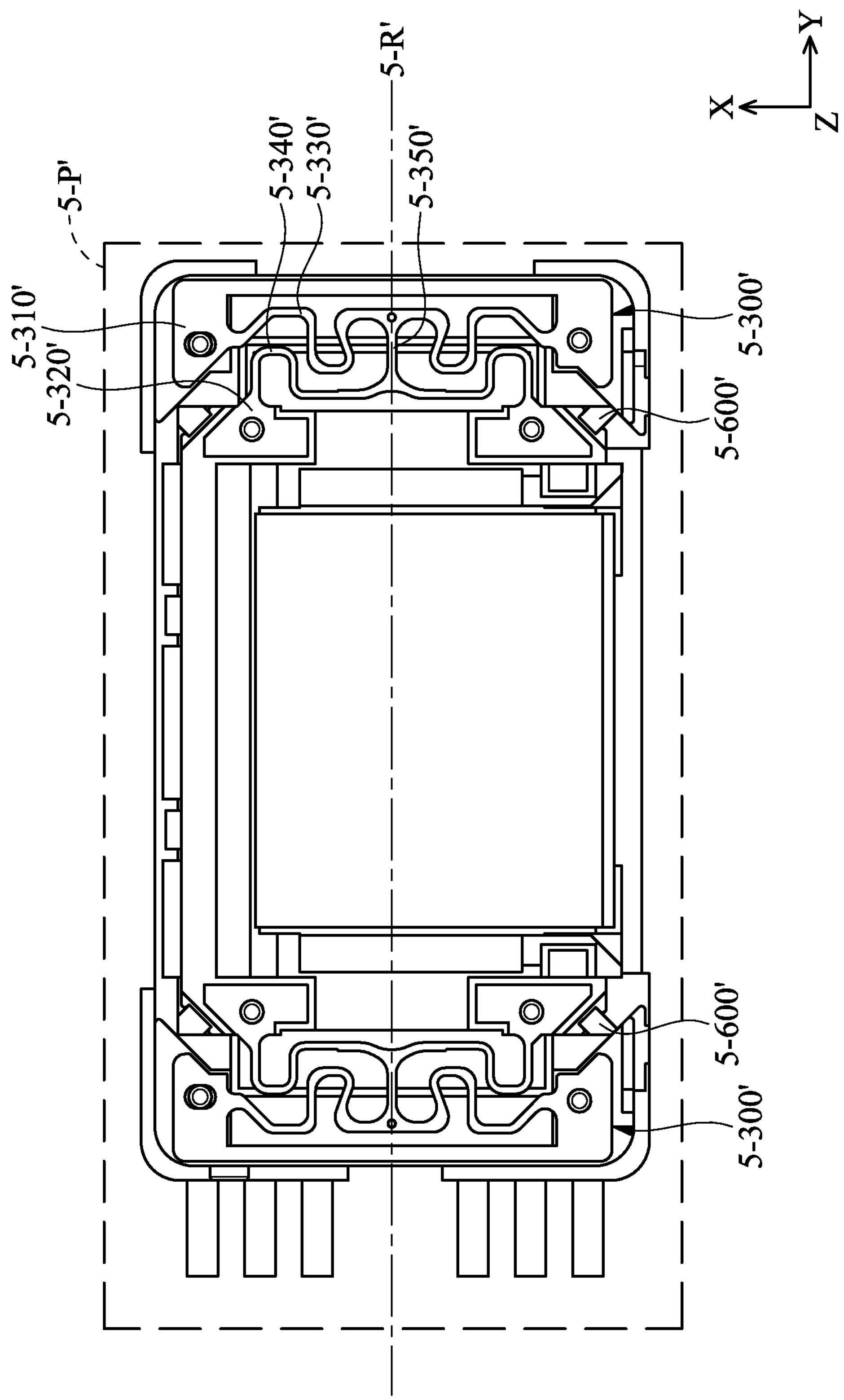
FIG. 59 is a top view of the optical member driving mechanism according to another embodiment of the invention, wherein the housing is omitted.
Figure 60:
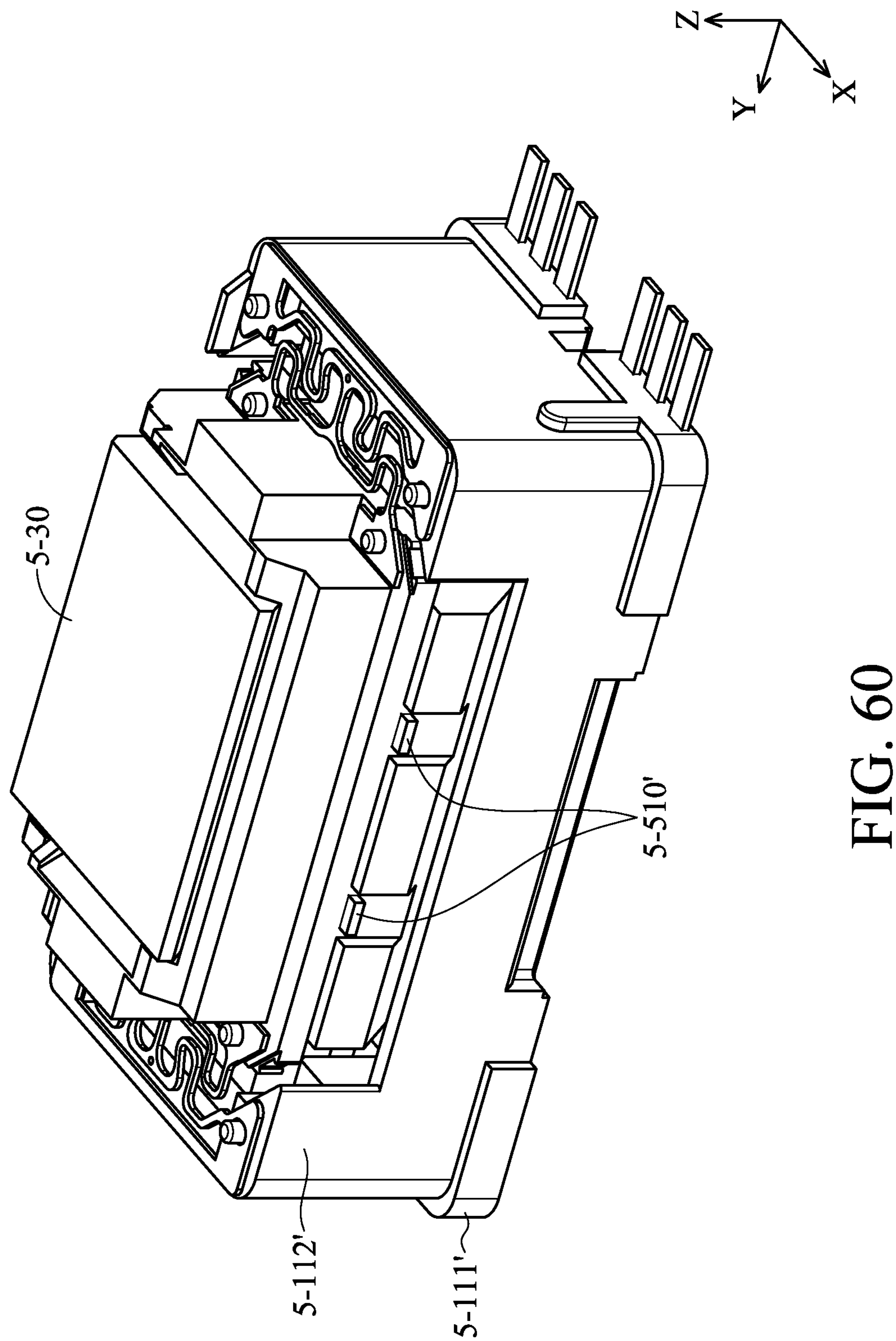
FIG. 60 is a schematic diagram of the optical member driving mechanism according to another embodiment of the invention, wherein the housing is omitted.
Figure 61:
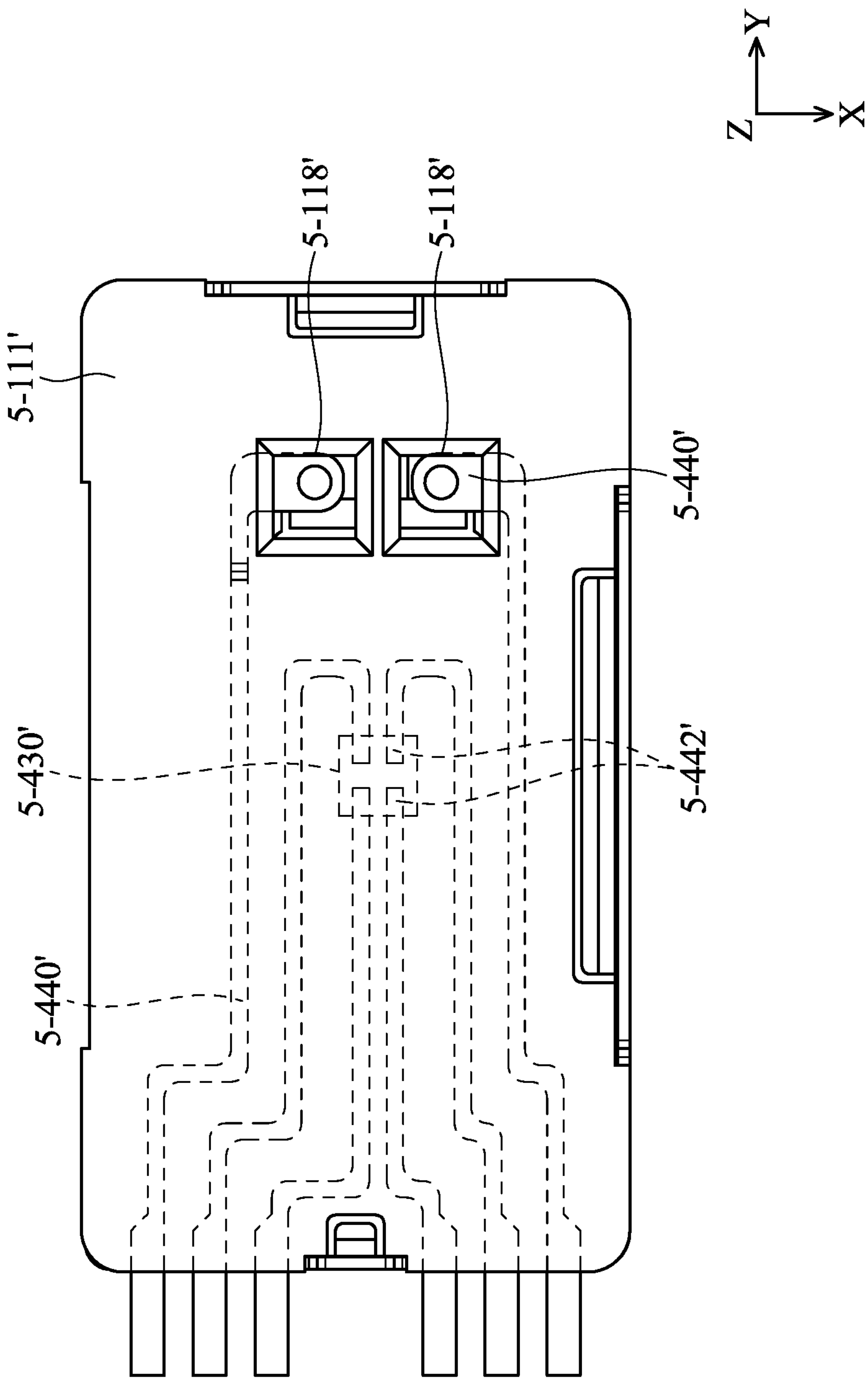
FIG. 61 is a bottom view of the optical member driving mechanism according to an embodiment of the invention.

FIGS. 59 and 60 are schematic diagrams of the optical member driving mechanism 5-10 in different views, and FIG. 51 is an exploded-view diagram of the optical member driving mechanism 5-10. As shown in FIGS. 59-61, the optical member driving mechanism 5-10 primarily includes a fixed portion 5-100, a movable portion 5-200, an elastic member 5-300, a driving assembly 5-400, at least one magnetic permeability member 5-500, and a plurality of damping members 5-600.

Figure 50:
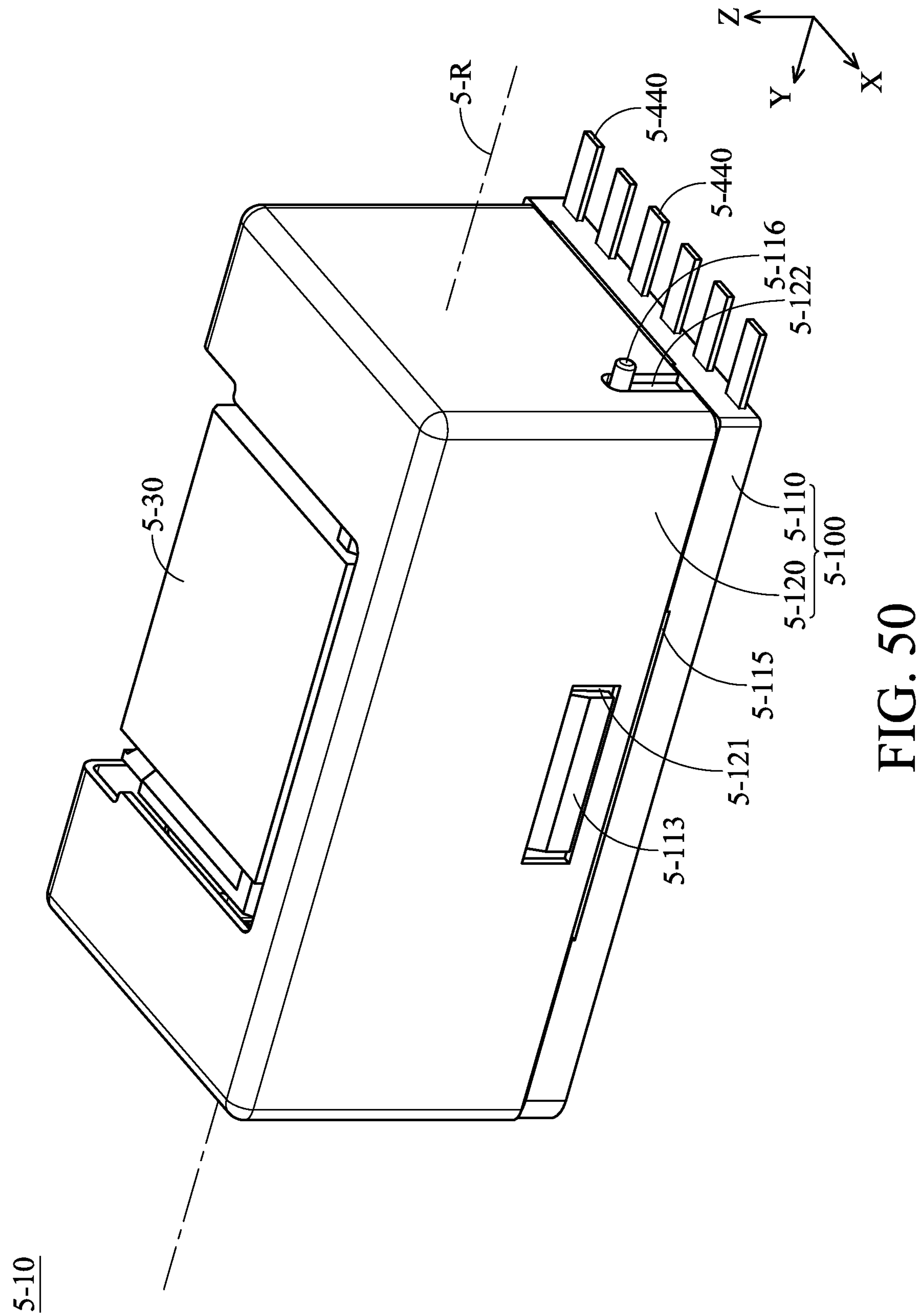
FIG. 50 is a schematic diagram of an optical member driving mechanism in another view according to an embodiment of the invention.
Figure 52:
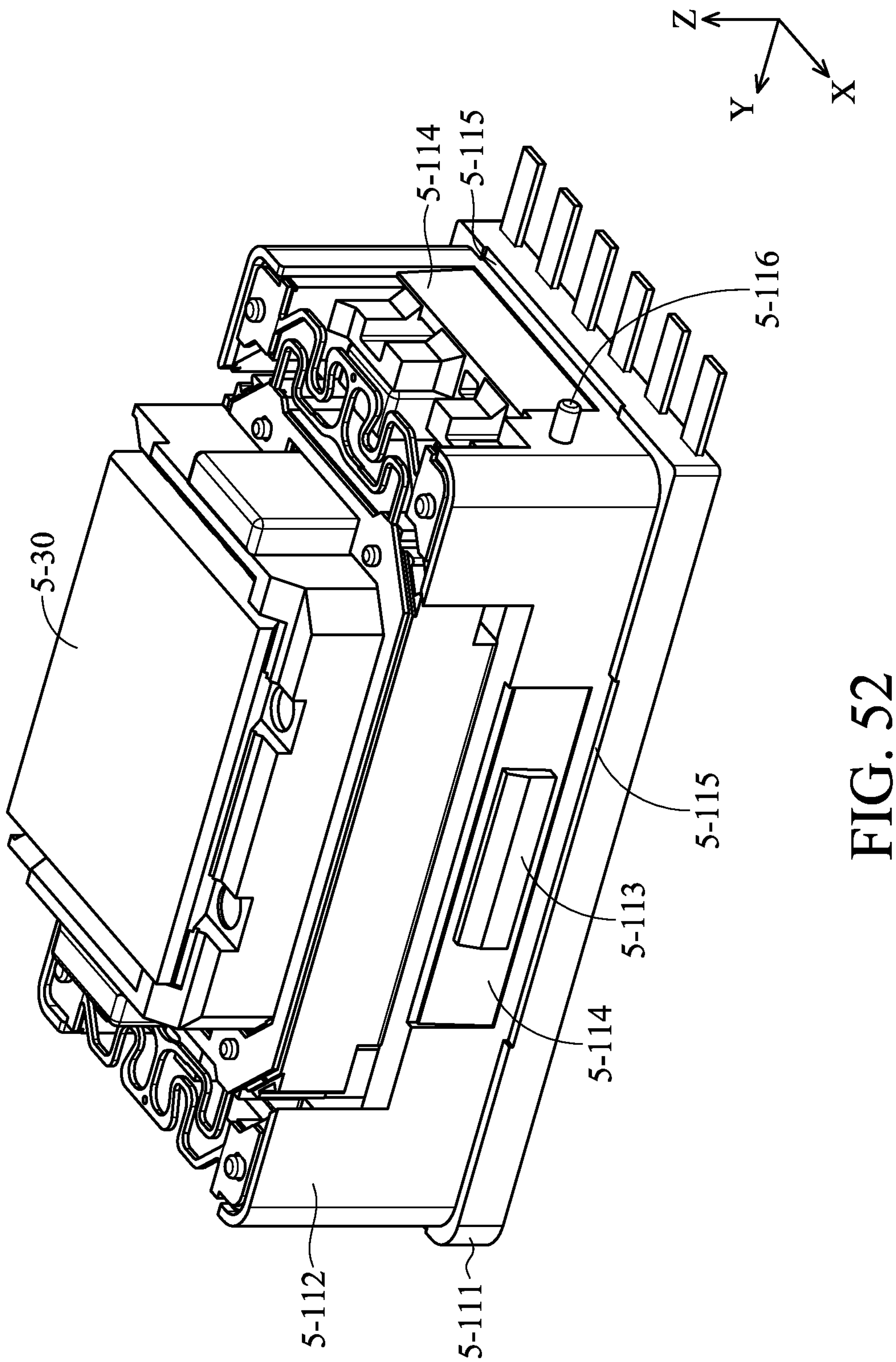
FIG. 52 is a schematic diagram of the optical member driving mechanism according to an embodiment of the invention, wherein the housing is omitted.

The fixed portion 5-100 includes a base 5-110 and a housing 5-120. The base 5-110 and the housing 5-120 can be assembled using snap-fit joints or adhesive member. In detail, as shown in FIGS. 50 and 52, the housing 5-120 has a hole 5-121, and the base 5-110 has a bottom 5-111 and a lateral wall 5-112. The lateral wall 5-112 is connected to the bottom 5-111 and extends along the Z-axis. A protrusion 5-113 and at least one glue recess 5-114 are formed on the lateral wall 5-112, and at least one overflow groove 5-115 communicated with the glue recess is formed on the bottom 5-111, wherein the glue recess 5-114 has an inclined surface. In other words, the portion of the glue recess 5-114 away from the bottom 5-111 is closer to the movable portion 5-200.

When the user desires to join the base 5-110 to the housing 5-120, a glue can be applied in the glue recess 5-114, and then the housing 5-120 can approach the bottom 5-111 of the base 5-111 along −Z-axis. Finally, the protrusion

5-113 can pass through the hole 5-121 (as shown in FIG. 50). Owing to adhesion of the glue and the snap-fit joints between the protrusion 5-113 and the hole 5-121, the base 5-110 and the housing 5-120 can be tightly joined together.

If the glue is redundant, the glue slides along the inclined surface of the glue recess 5-114 to the overflow groove 5-115 during joining. As shown in FIG. 50, when the base 5-110 and the housing 5-120 are joined, the glue recess 5-114 is disposed between the base 5-110 and the housing 5-120, and the overflow groove 5-115 is exposed. Since the overflow groove 5-115 is exposed, the redundant glue can be exhausted and will not remain in the optical member driving mechanism 5-10.

Moreover, in order to ensure that the user assembles the base 5-110 and the housing 5-120 correctly, the base 5-110 has a positioning member 5-116 that protrudes from the lateral wall 5-112, and the housing 5-120 has a positioning slot 5-122 that corresponds to the positioning member 5-116. When the base 5-110 is joined to the housing 5-120, the positioning member 5-116 enters the positioning slot 5-122.

Figure 49:
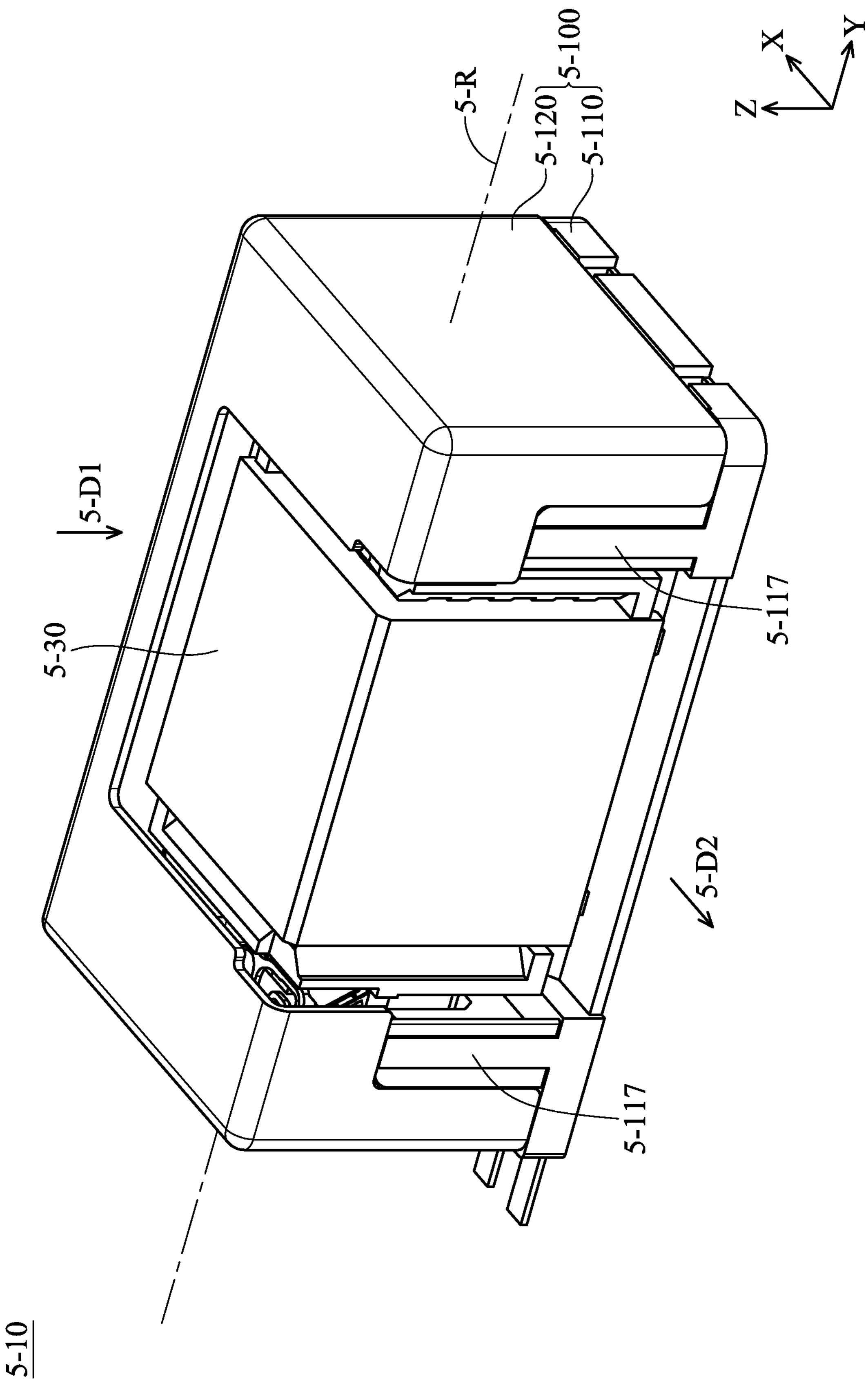
FIG. 49 is a schematic diagram of an optical member driving mechanism according to an embodiment of the invention.

As shown in FIGS. 48 and 49, in this embodiment, the base 5-110 has a plurality of abutting members 5-117 protruding from the lateral wall 5-112 and facing the optical system 5-40. The surfaces of these abutting members 5-117 facing the optical system 5-40 are coplanar, so that the optical member driving mechanism 5-10 can horizontally attach the optical system 5-40.

Figure 53:
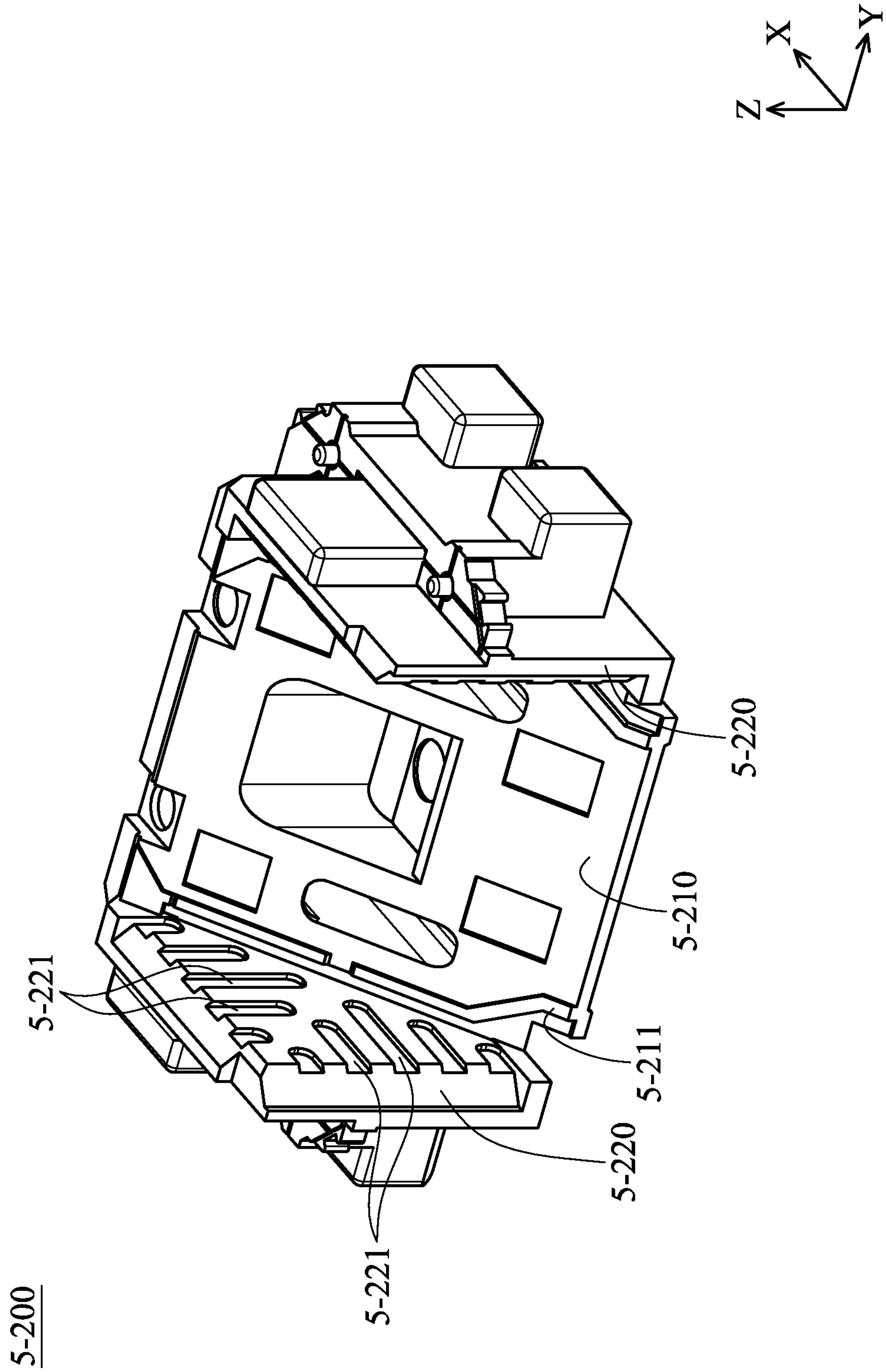
FIG. 53 is a schematic diagram of a movable portion according to an embodiment of the invention.

As shown in FIGS. 51 and 53, the movable portion 5-200 is an optical member holder, and the optical member 5-30 is disposed on a surface 5-210 of the movable portion 5-200. Since at least one supporting portion 5-211 protruding from the surface 5-210 is formed on the peripheral area of the surface 5-210 in this embodiment, a gap 5-G can be formed between the optical member 5-30 and the surface 5-210 when the optical member 5-30 is disposed on the movable portion 5-200 (as shown in FIG. 48). Therefore, the efficiency of reflecting can be enhanced, and the disposing angle of the optical member 5-30 can be adjusted.

The optical member 5-30 can be affixed to the movable portion 5-200 by using an adhesive member. For example, a plurality of grooves 5-221 are formed on the inner surface of the lateral wall 5-220 of the movable portion 5-200. When the optical member 5-30 is disposed on the supporting portion 5-211, the user can infuse glue into the grooves 5-221, so that the optical member 5-30 can be affixed to the movable portion 5-200 from its lateral surfaces.

Figure 54:
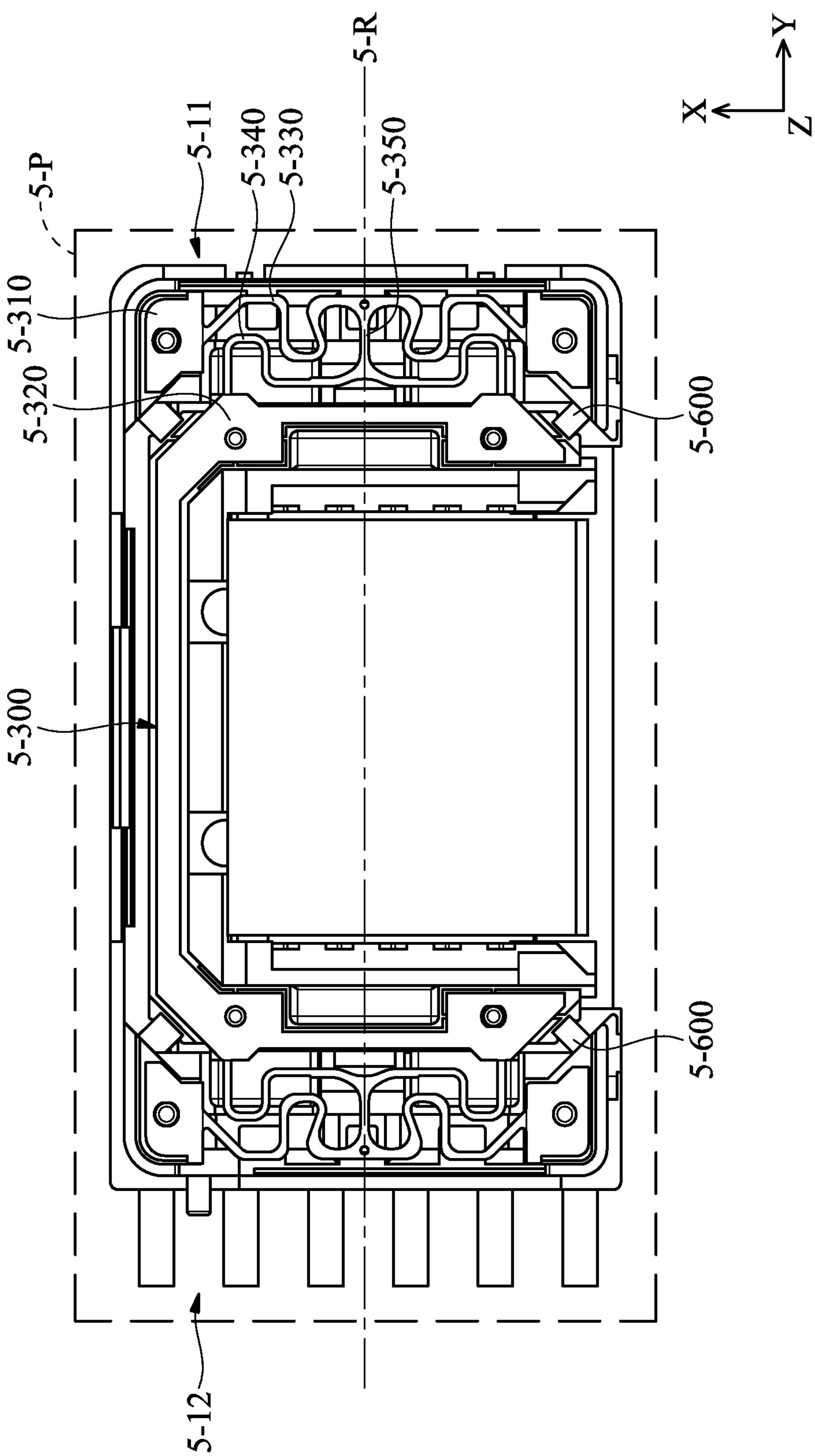
FIG. 54 is a top view of the optical member driving mechanism according to an embodiment of the invention, wherein the housing is omitted.

Referring to FIGS. 51 and 54, the elastic member 5-300 has at least one first engaged section 5-310, at least one second engaged section 5-320, at least one first curved section 5-330, at least one second curved section 5-340, and at least one axis section 5-350. The first engaged section 5-310 is affixed to the fixed portion 5-100, and the second engaged section 5-320 is affixed to the movable portion 5-200. The first curved section 5-330, the second curved section 5-340, and the axis section 5-350 are disposed between the first engaged section 5-310 and the second engaged section 5-320. The first curved section 5-330 connects the first engaged section 5-310 to the axis section 5-350, and the second curved section 5-340 connects the second engaged section 5-320 to the axis section 5-350. The movable portion 5-200 can be suspended on the fixed portion 5-100 by the elastic member 5-300.

It should be noted that, in this embodiment, the optical member driving mechanism 5-10 has a first side 5-11 and a second side 5-12, and the movable portion 5-200 is disposed between the first side 5-11 and the second side 5-12. The elastic member 5-300 has a plate structure and extends from the first side 5-11 to the second side 5-12. The extending direction of the elastic member 5-300 is perpendicular to the incident direction 5-D1 of the light 5-L. At least a portion of the first curved section 5-330 and the second curved section 5-340 overlap as seen from the outgoing direction 5-D2, so as to effectively distribute the stress during the rotation of the movable portion 5-200.

Referring to FIGS. 48, 51 and 54, the driving assembly 5-400 includes at least one first electromagnetic driving member 5-410, at least one second electromagnetic driving member 5-420, a position sensor 5-430, and a plurality of wires 5-440. The first electromagnetic driving member 5-410 and the second electromagnetic driving member 5-420 are respectively affixed to the fixed portion 5-100 and the movable portion 5-200, and the position of the first electromagnetic driving member 5-410 corresponds to the position of the second electromagnetic driving member 5-420. In this embodiment, the first electromagnetic driving member 5-410 is a coil, and the second electromagnetic driving member 5-420 is a magnet. When current flows through the first electromagnetic driving member 5-410, an electromagnetic effect is generated between the first electromagnetic driving member 5-410 and the second electromagnetic driving member 5-420, and the movable portion 5-200 and the optical member 5-30 disposed on the movable portion 5-200 are driven to rotate around a rotation axis 5-R relative to the fixed portion 5-100.

According to the structure of the elastic member 5-300, the rotation axis 5-R will pass through the axis section 5-350 of the elastic member 5-300. It should be noted that, in this embodiment, the rotation axis 5-R does not pass through the turning point of the light 5-L.

Due to the rotation of the optical member 5-30, the position of the light 5-L reaching the image sensor module 5-S can be slightly adjusted, and the purpose of focus adjustment can be achieved.

In some embodiments, the first electromagnetic driving member 5-410 is a magnet, and the second electromagnetic driving member 5-420 is a coil.

The position sensor 5-430 is disposed on the fixed portion 5-100 and corresponds to the second electromagnetic driving member 5-420. The position sensor 5-430 is configured to detect the position of the second electromagnetic driving member 5-420, so as to obtain the rotation angle of the movable portion 5-200 relative to the fixed portion 5-100. For example, the position sensor 5-430 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

Figure 55:
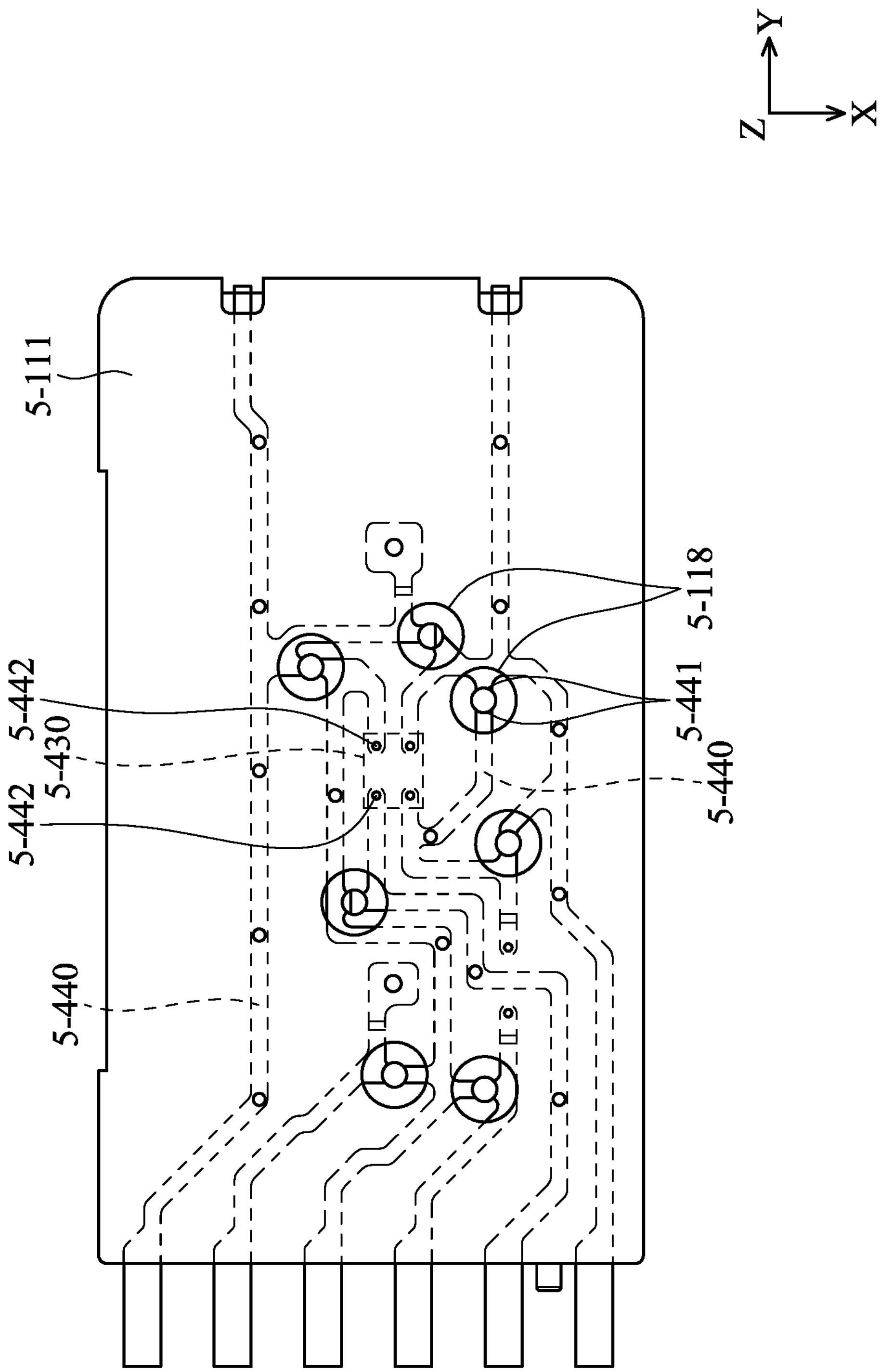
FIG. 55 is a bottom view of the optical member driving mechanism according to an embodiment of the invention.

The wires 5-440 can be embedded in the base 5-110 of the fixed portion 5-100, and can be connected to the first electromagnetic driving member 5-410 and the position sensor 5-430. As shown in FIG. 55, specifically, a plurality of through holes 5-118 are formed on the bottom 5-111, at least a portion of wires 5-440 is exposed from the through holes 5-118, and the interrupt region 5-441 of the wires 5-440 is also exposed from the through hole 5-118. The interrupt region 5-441 can be formed by drilling, therefore, the interrupt region 5-441 can include an arc profile.

The connecting portions 5-442 between the wires 5-440 and the position sensor 5-430 is symmetrical relative to the position sensor 5-430. Thus, the movement of the position sensor 5-430 due to the attachment of the solder in welding can be prevented.

As shown in FIG. 51, the magnetic permeability member 5-500 is disposed on the movable portion 5-200 and disposed between the movable portion 5-200 and the second electromagnetic driving member 5-420. The magnetic permeability member 5-500 is configured to enhance the electromagnetic pushing force. Moreover, the magnetic permeability member 5-500 includes at least one extending portion 5-510 extending through the movable portion 5-200 to increase the mechanical strength of the optical member driving mechanism 5-10.

Referring to FIGS. 51 and 54, the damping members 5-600 are disposed on the corners of the optical member driving mechanism 5-10 having a polygonal structure (a rectangular in this embodiment). For example, the damping members 5-600 can be connected to the fixed portion 5-100 and the movable portion 5-200, or disposed on the elastic member 5-300, so as to suppress the vibration during the rotation of the movable portion 5-200. The damping members 5-600 can be disposed on a virtual plane 5-P to increase the stability of the optical member driving mechanism 5-10, wherein the virtual plane 5-P is perpendicular to the incident direction 5-D1 of the light 5-L.

Figure 56:
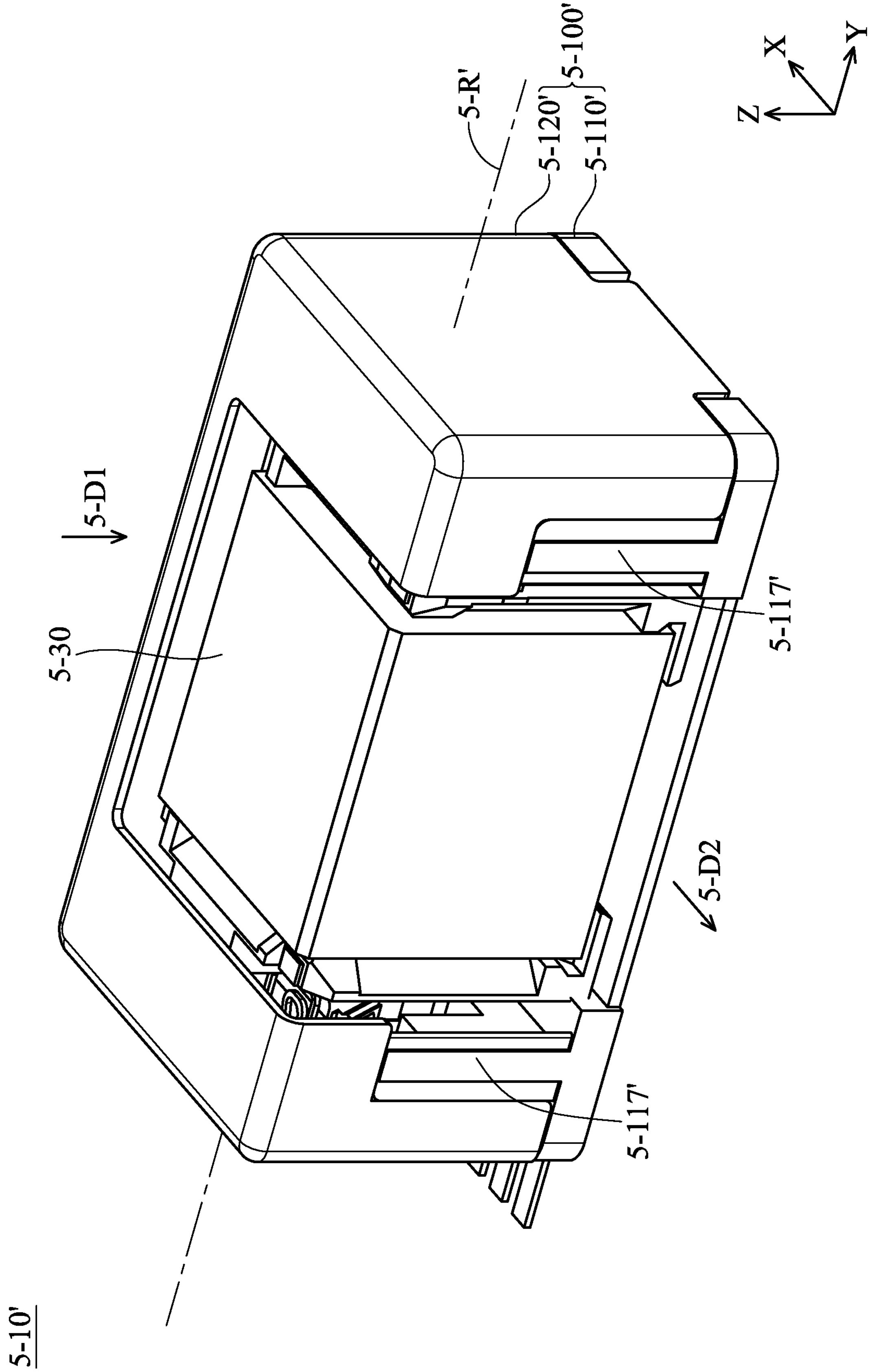
FIG. 56 is a schematic diagram of an optical member driving mechanism according to another embodiment of the invention.
Figure 57:
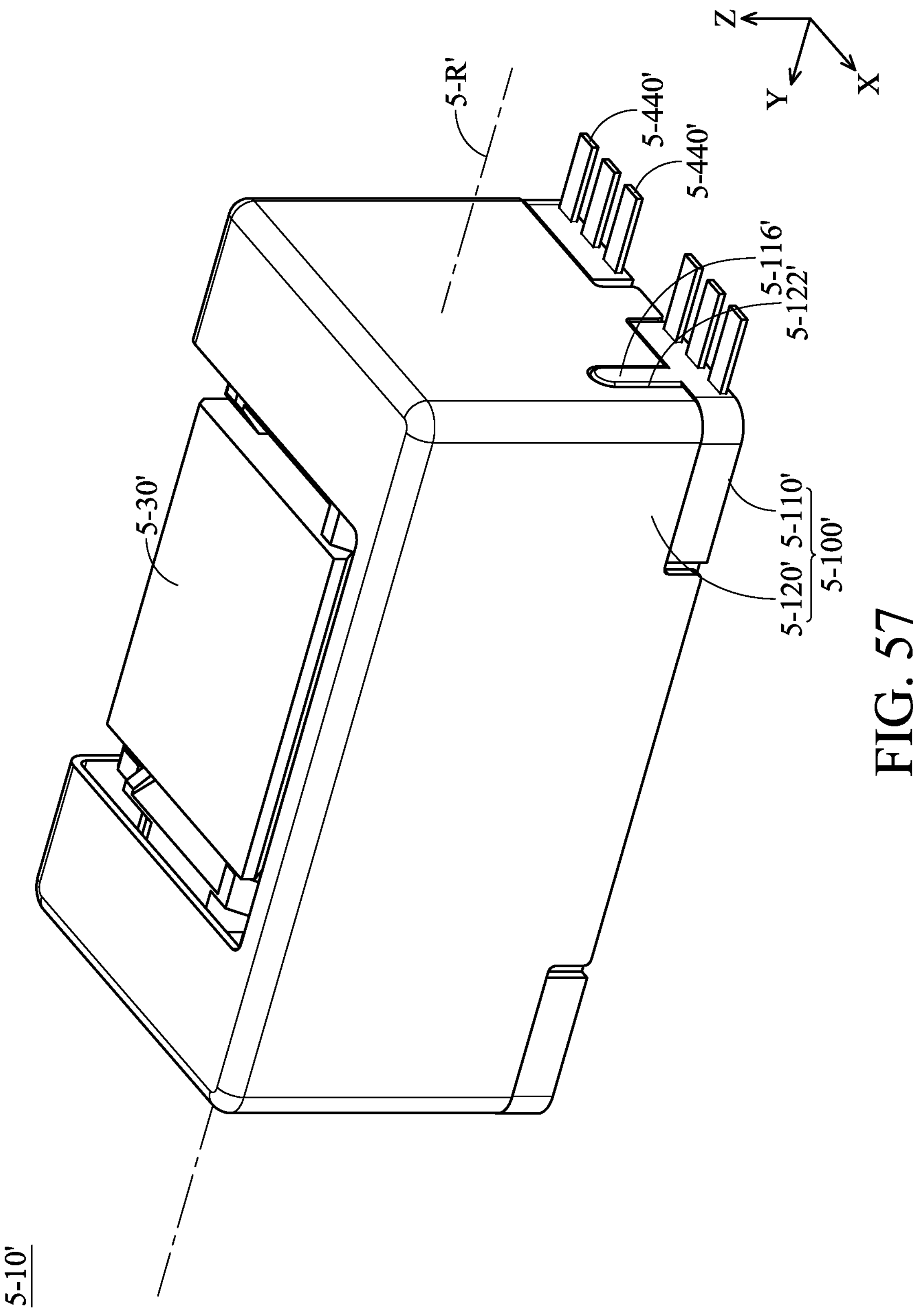
FIG. 57 is a schematic diagram of an optical member driving mechanism in another view according to another embodiment of the invention.
Figure 58:
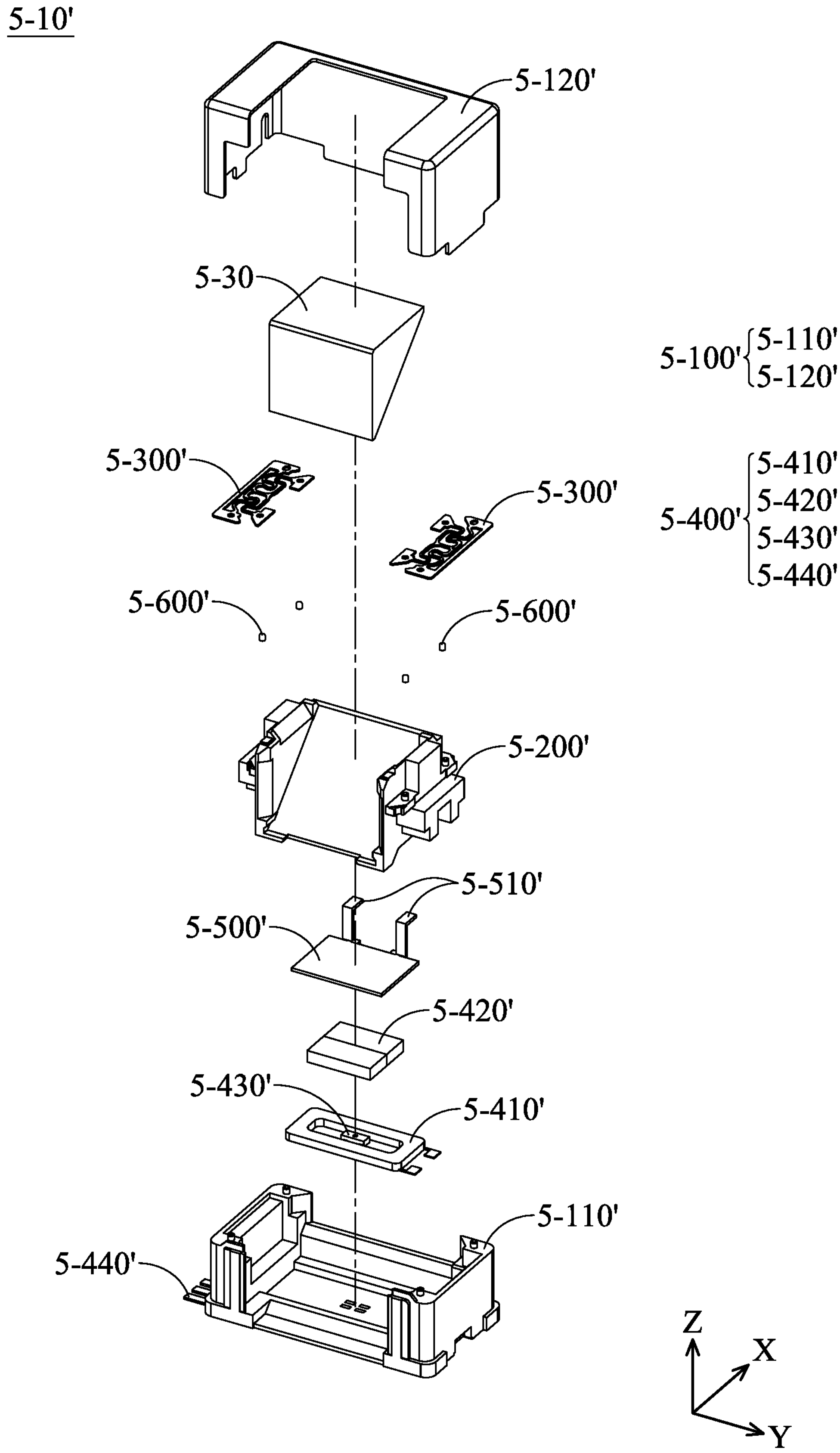
FIG. 58 is an exploded-view diagram of the optical member driving mechanism according to another embodiment of the invention.

Referring to FIGS. 56-58, in another embodiment, the optical member driving mechanism 5-10' includes a fixed portion 5-100', a movable portion 5-200', a plurality of elastic members 5-300', a driving assembly 5-400', at least one magnetic permeability member 5-500', and a plurality of damping members 5-600'.

The fixed portion 5-100' includes a base 5-110' and a housing 5-120'. The base 5-110' and the housing 5-120' can be assembled using snap-fit joints or adhesive member. Moreover, in order to ensure that the user assembles the base 5-110' and the housing 5-120' correctly, the base 5-110' has a positioning member 5-116' that protrudes from the lateral wall 5-112', and the housing 5-120' has a positioning slot 5-122' that corresponds to the positioning member 5-116'. When the base 5-110' is joined to the housing 5-120', the positioning member 5-116' enters the positioning slot 5-122'.

In this embodiment, the base 5-110' has a plurality of abutting members 5-117' protruding from the lateral wall 5-112' and facing the optical system 5-40. The surfaces of these abutting members 5-117' facing the optical system 5-40 are coplanar, so that the optical member driving mechanism 5-10 can horizontally attach the optical system 5-40.

The movable portion 5-200' is an optical member holder, and the optical member 5-30 is disposed on the movable portion 5-200'. As shown in FIG. 59, each of the elastic member 5-300' has at least one first engaged section 5-310', at least one second engaged section 5-320', at least one first curved section 5-330', at least one second curved section 5-340', and at least one axis section 5-350'. The first engaged section 5-310' is affixed to the fixed portion 5-100', and the second engaged section 5-320' is affixed to the movable portion 5-200'. The first curved section 5-330', the second curved section 5-340', and the axis section 5-350' are disposed between the first engaged section 5-310' and the second engaged section 5-320'. The first curved section 5-330' connects the first engaged section 5-310' to the axis section 5-350', and the second curved section 5-340' connects the second engaged section 5-320' to the axis section 5-350'. The movable portion 5-200' can be suspended on the fixed portion 5-100' by the elastic member 5-300'.

Specifically, at least a portion of the first curved section 5-330' and the second curved section 5-340' overlap as seen from the outgoing direction 5-D2, so as to effectively distribute the stress during the rotation of the movable portion 5-200'.

As shown in FIG. 58, the driving assembly 5-400' includes at least one first electromagnetic driving member 5-410', at least one electromagnetic driving member 5-420', a position sensor 5-430', and a plurality of wires 5-440'. The first electromagnetic driving member 5-410' and the second electromagnetic driving member 5-420' are respectively affixed to the fixed portion 5-100' and the movable portion 5-200', and the position of the first electromagnetic driving member 5-410' corresponds to the position of the second electromagnetic driving member 5-420'. In this embodiment, the first electromagnetic driving member 5-410' is a coil, and the second electromagnetic driving member 5-420' is a magnet. When current flows through the first electromagnetic driving member 5-410', an electromagnetic effect is generated between the first electromagnetic driving member 5-410' and the second electromagnetic driving member 5-420', and the movable portion 5-200' and the optical member 5-30 disposed on the movable portion 5-200' are driven to rotate around a rotation axis 5-R' relative to the fixed portion 5-100'.

According to the structure of the elastic member 5-300', the rotation axis 5-R' will pass through the axis section 5-350' of the elastic member 5-300'. It should be noted that, in this embodiment, the rotation axis 5-R' does not pass through the turning point of the light 5-L.

Due to the rotation of the optical member 5-30, the position of the light 5-L reaching the image sensor module 5-S can be slightly adjusted, and the purpose of focus adjustment can be achieved.

In some embodiments, the first electromagnetic driving member 5-410' is a magnet, and the second electromagnetic driving member 5-420' is a coil.

The position sensor 5-430' is disposed on the fixed portion 5-100' and corresponds to the second electromagnetic driving member 5-420'. The position sensor 5-430' is configured to detect the position of the second electromagnetic driving member 5-420', so as to obtain the rotation angle of the movable portion 5-200' relative to the fixed portion 5-100'. For example, the position sensor 5-430' can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

The wires 5-440' can be embedded in the base 5-110' of the fixed portion 5-100', and can be connected to the first electromagnetic driving member 5-410' and the position sensor 5-430'. As shown in FIG. 61, specifically, a plurality of through holes 5-118' are formed on the bottom 5-111', and the user can weld the wires 5-440' to the first electromagnetic driving member 5-410' through the through hole 5-118'. In some embodiments, the wires 5-440' can be mounted by using surface-mount technology (SMT), and there is no need to form the through hole on the bottom 5-111'. The base 5-110' can achieve an integrated appearance.

Furthermore, the connecting portions 5-442' between the wires 5-440' and the position sensor 5-430' is symmetrical relative to the position sensor 5-430'. Thus, the movement of the position sensor 5-430' due to the attachment of the solder in welding can be prevented.

As shown in FIGS. 58 and 60, the magnetic permeability member 5-500' is disposed on the movable portion 5-200' and disposed between the movable portion 5-200' and the second electromagnetic driving member 5-420'. The magnetic permeability member 5-500' is configured to enhance the electromagnetic pushing force. Moreover, the magnetic permeability member 5-500' includes at least one extending portion 5-510' extending through the movable portion 5-200' to increase the mechanical strength of the optical member driving mechanism 5-10'. In this embodiment, the extending portion 5-510' extends to the back side of the optical member driving mechanism 5-10'.

As shown in FIG. 59, the damping members 5-600' are disposed on the corners of the optical member driving mechanism 5-10' having a polygonal structure (a rectangular in this embodiment). For example, the damping members 5-600' can be connected to the fixed portion 5-100' and the movable portion 5-200', or disposed on the elastic member 5-300', so as to suppress the vibration during the rotation of the movable portion 5-200'. The damping members 5-600' can be disposed on the a virtual plane 5-P' to increase the stability of the optical member driving mechanism 5-10', wherein the virtual plane 5-P' is perpendicular to the incident direction 5-D1 of the light 5-L.

In summary, an optical member driving mechanism is provided, including a movable portion, a fixed portion, and a driving assembly. The movable portion is connected to an optical member. The movable portion is movable relative to the fixed portion. The driving assembly is configured to drive the movable portion to move relative to the fixed portion.

Sixth Group of Embodiments

Figure 62:
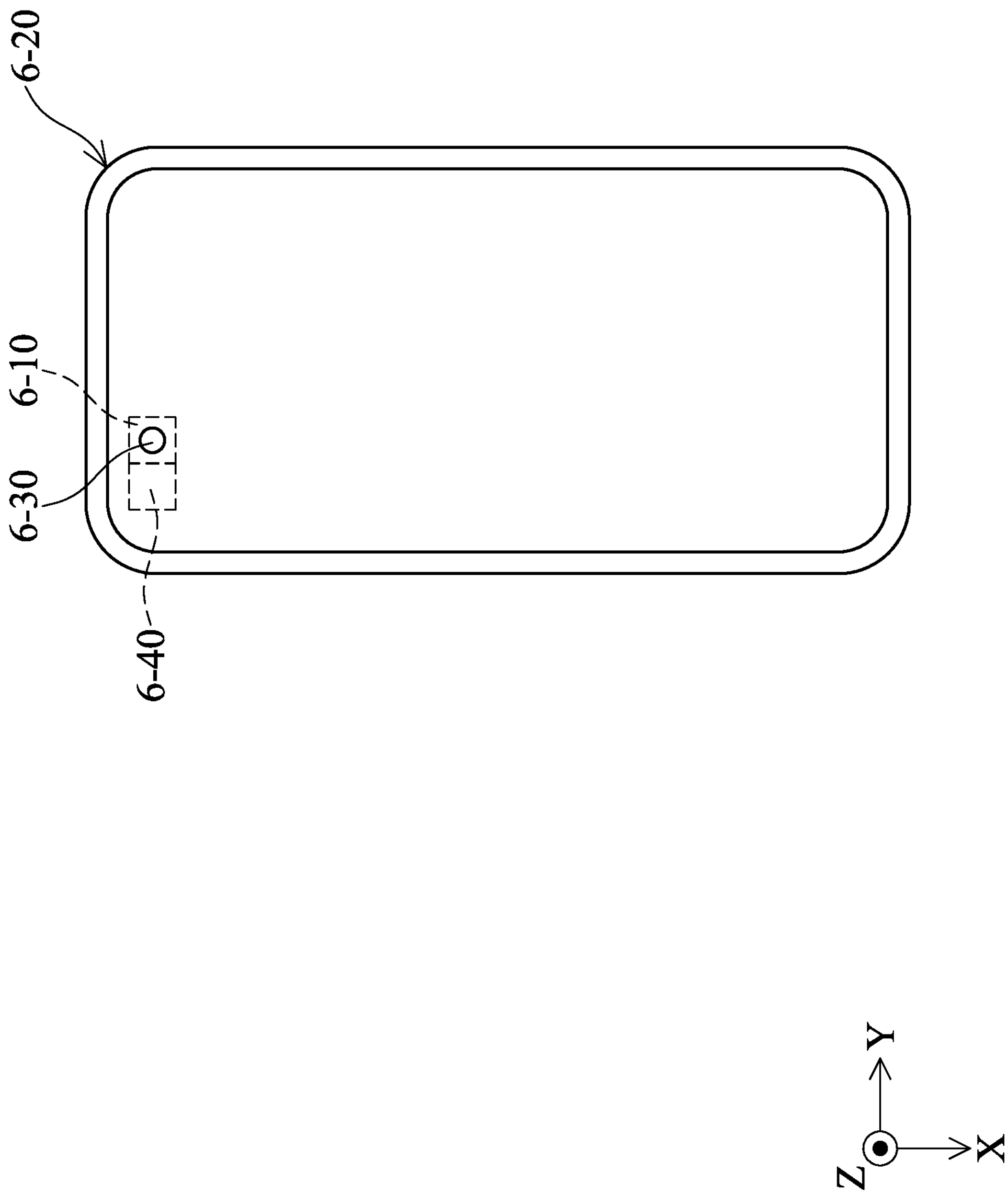
FIG. 62 is a schematic diagram of an electronic device according to an embodiment of the invention.

Referring to FIG. 62, in an embodiment of the invention, an optical member driving mechanism 6-10 can be disposed in an electronic device 6-20. The optical member driving mechanism 6-10 is configured to hold an optical member 6-30 and drive the optical member 6-30 to move relative to an image sensor module (not shown) in the electronic device 6-20, so as to achieve the purpose of focus adjustment. For example, the electronic device 6-20 can be a digital camera or a smart phone having the function of capturing photographs or making video recordings, and the optical member 6-30 can be a prism or a mirror. When capturing photographs or making video recordings, light enters the optical member driving mechanism 6-10 along an incident direction (−Z-axis), and after being reflected by the optical member 6-30, the light moves in the outgoing direction (−Y-axis) through an optical system 6-40 in the electronic device 6-20 until it reaches the image sensor module. The optical system 6-40 is configured to focus or adjust the light path, and can be adjusted or omitted as required.

Figure 63:
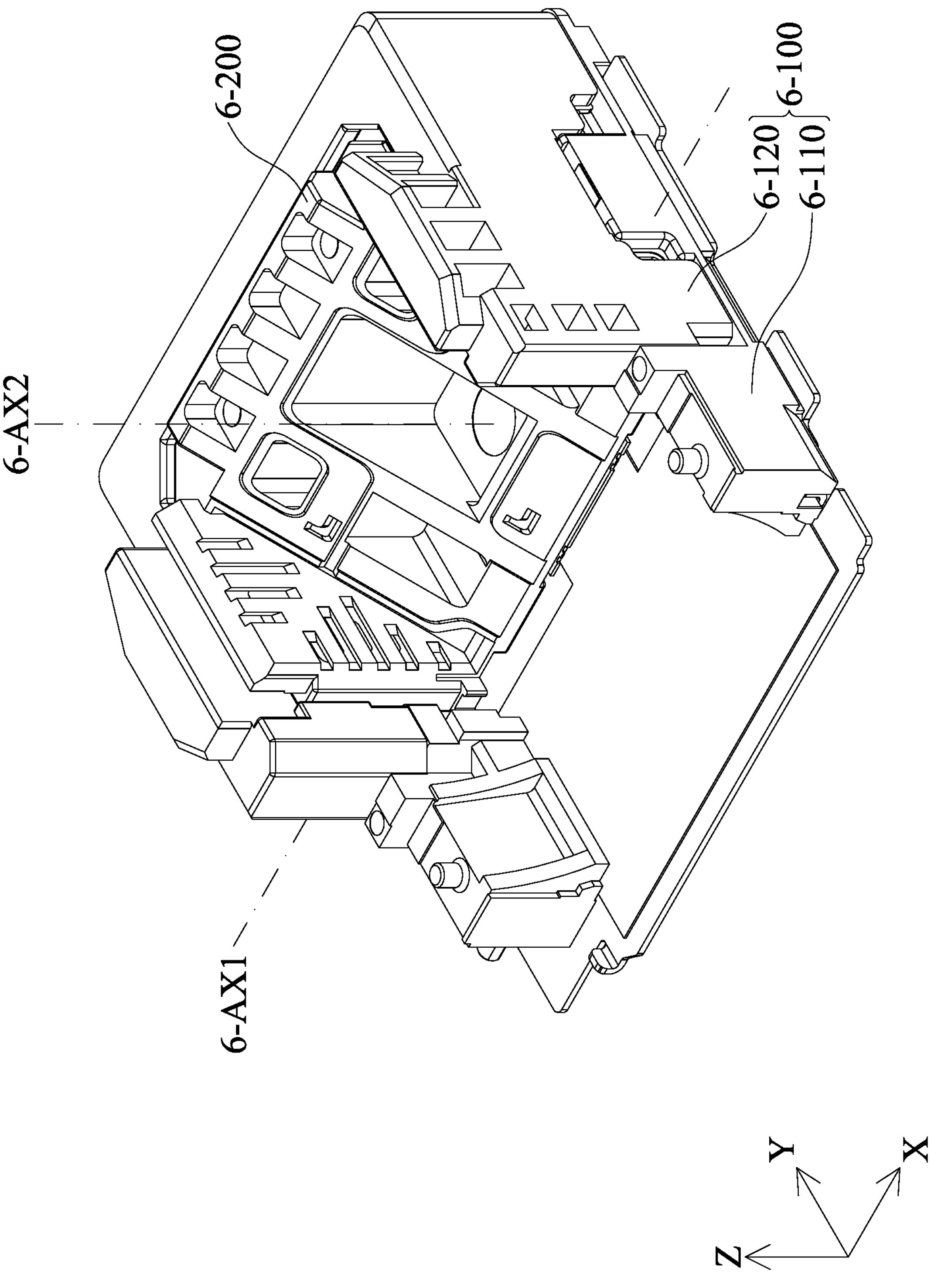
FIG. 63 is a schematic diagram of an optical member driving mechanism according to an embodiment of the invention.
Figure 64:
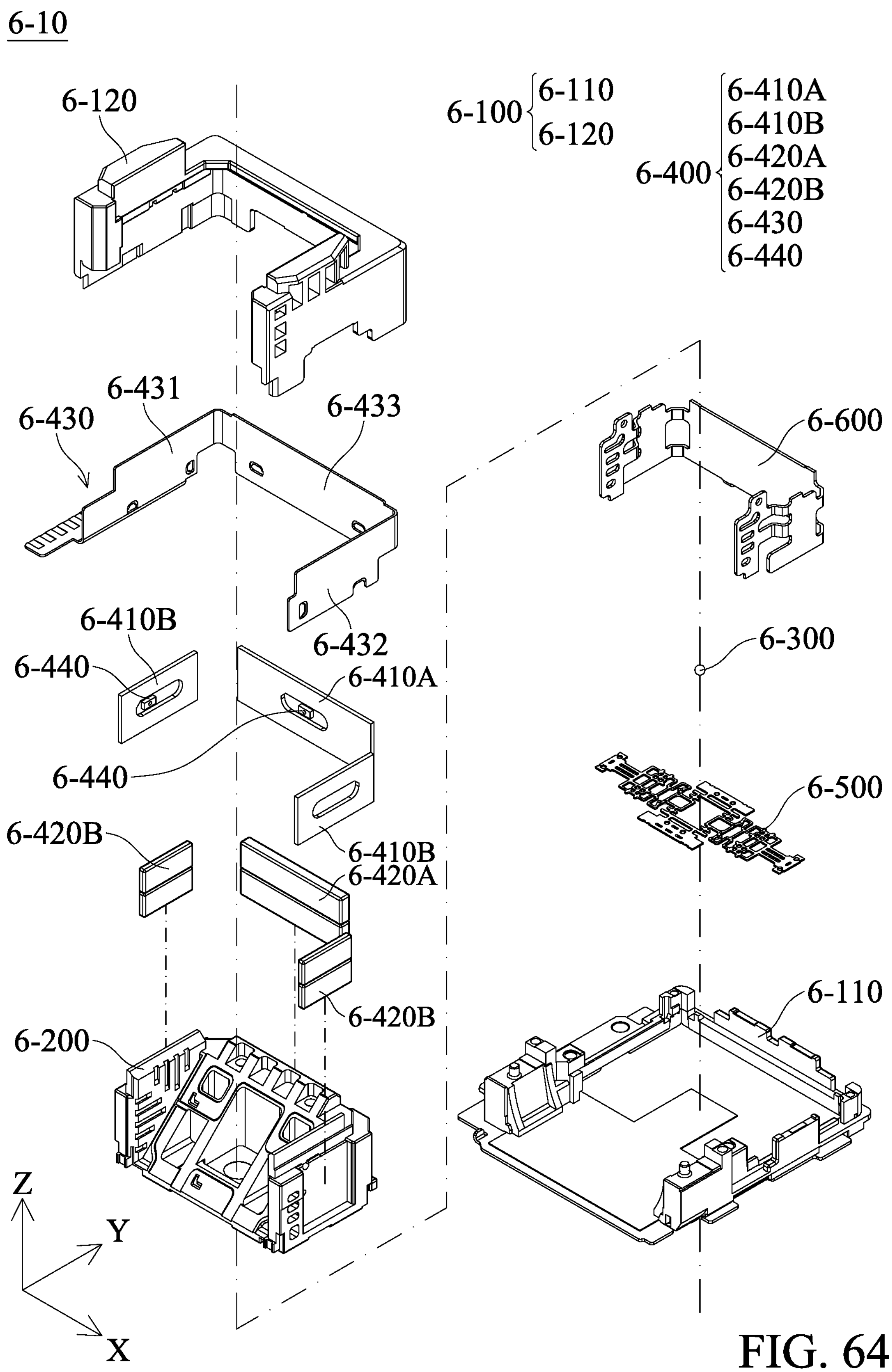
FIG. 64 is an exploded-view diagram of the optical member driving mechanism according to an embodiment of the invention.

Referring to FIGS. 63 and 64, the optical member driving mechanism 6-10 primarily includes a fixed portion 6-100, a movable portion 6-200, a supporting member 6-300, a driving assembly 6-400, an elastic member 6-500, and a magnetic permeability member 9-600.

Figure 67:
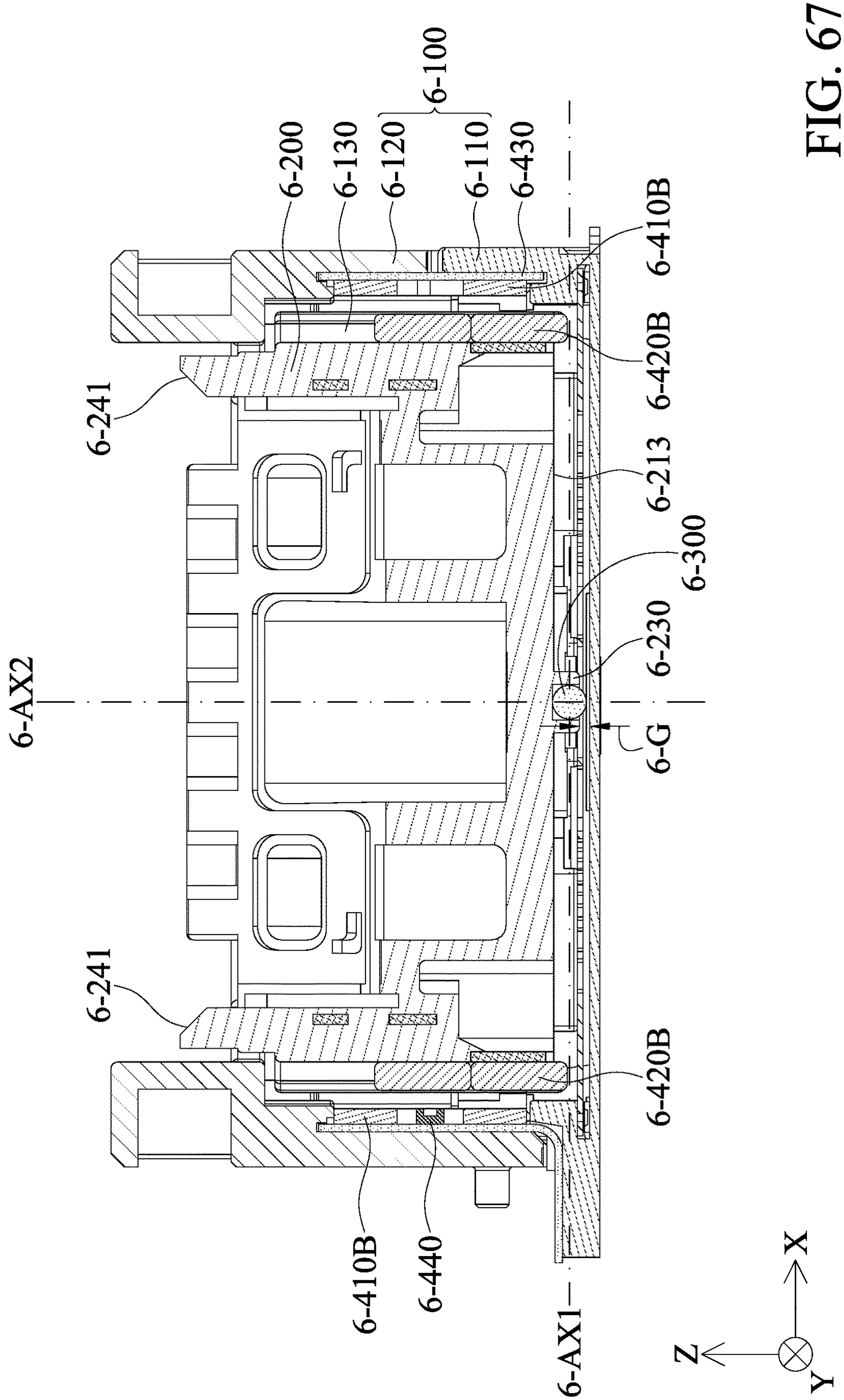
FIG. 67 is a cross-sectional view of the optical member driving mechanism according to an embodiment of the invention.
Figure 68:
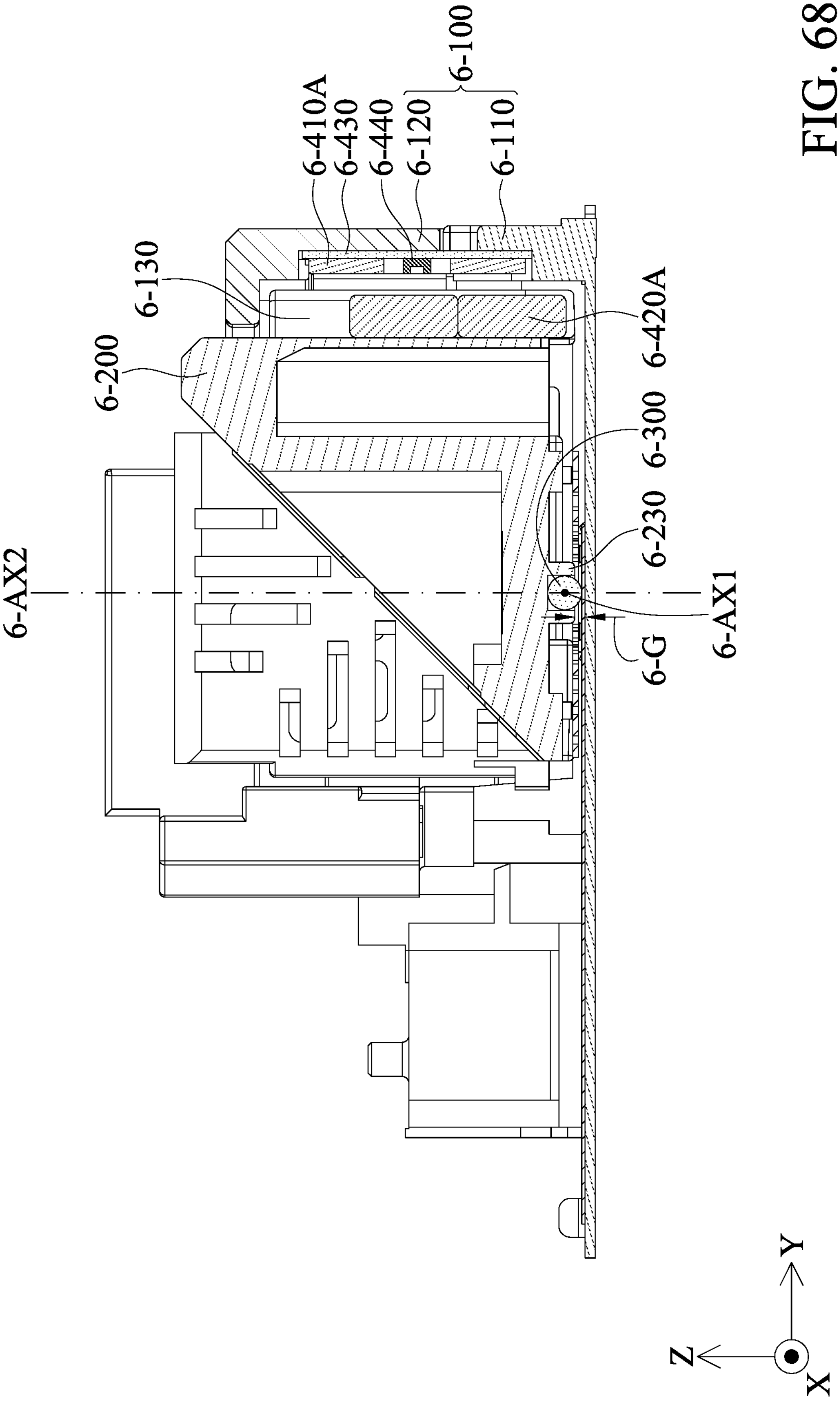
FIG. 68 is another cross-sectional view of the optical member driving mechanism according to an embodiment of the invention.

The fixed portion 6-100 includes a base 6-110 and a housing 6-120. The base 6-110 and the housing 6-120 can be assembled using snap-fit joints or an adhesive member, and an accommodating space 6-130 can be formed after assembly (as shown in FIGS. 67 and 68). The movable portion 6-200 can be an optical member holder, and the optical member 6-30 is disposed on the movable portion 6-200. When the movable portion 6-200 is movably connected to the fixed portion 6-100, the movable portion 6-200 and the optical member 6-30 are accommodated in the accommodating space 6-130 of the fixed portion 6-100.

Figure 65:
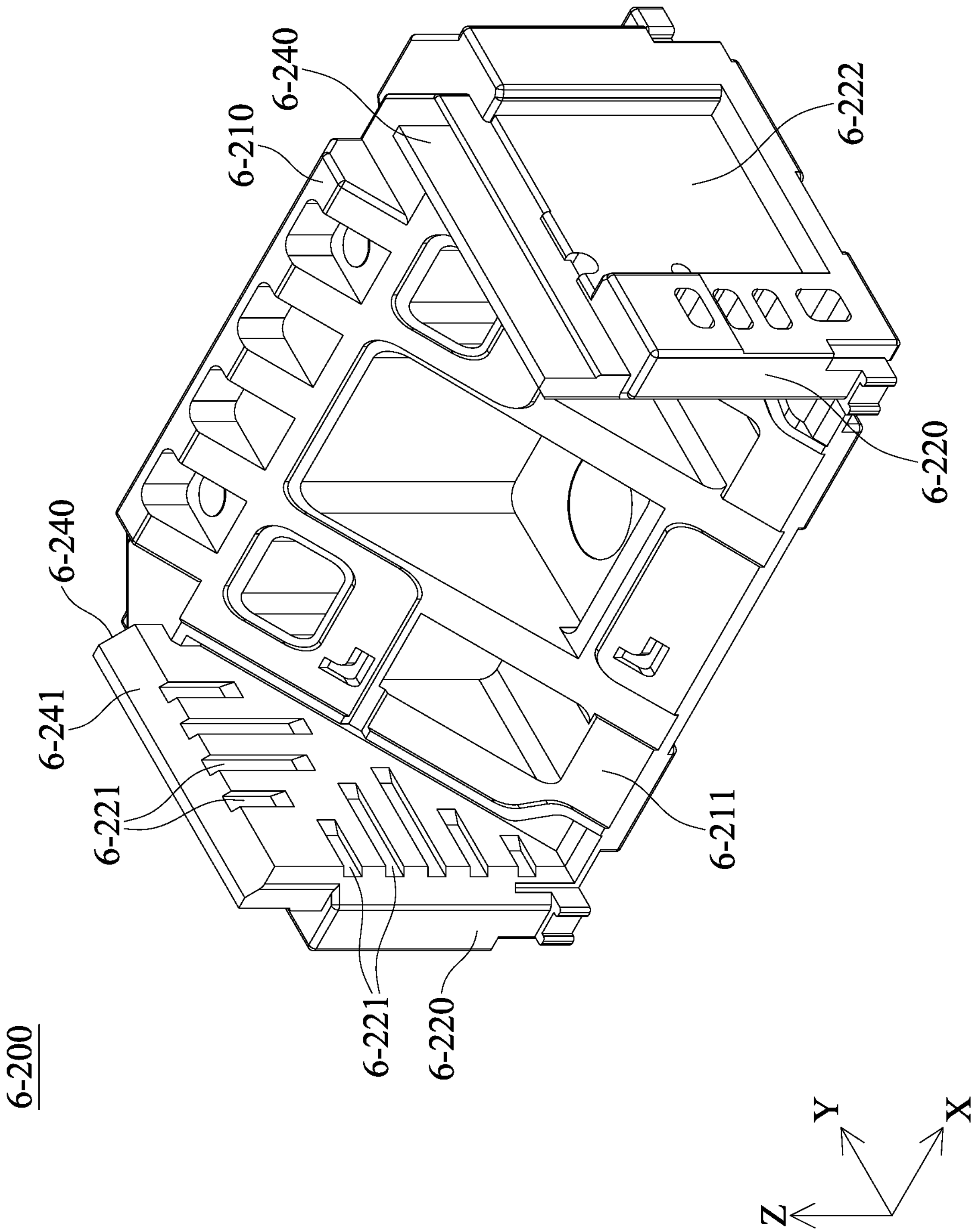
FIG. 65 is a schematic diagram of a movable portion according to an embodiment of the invention.
Figure 66:
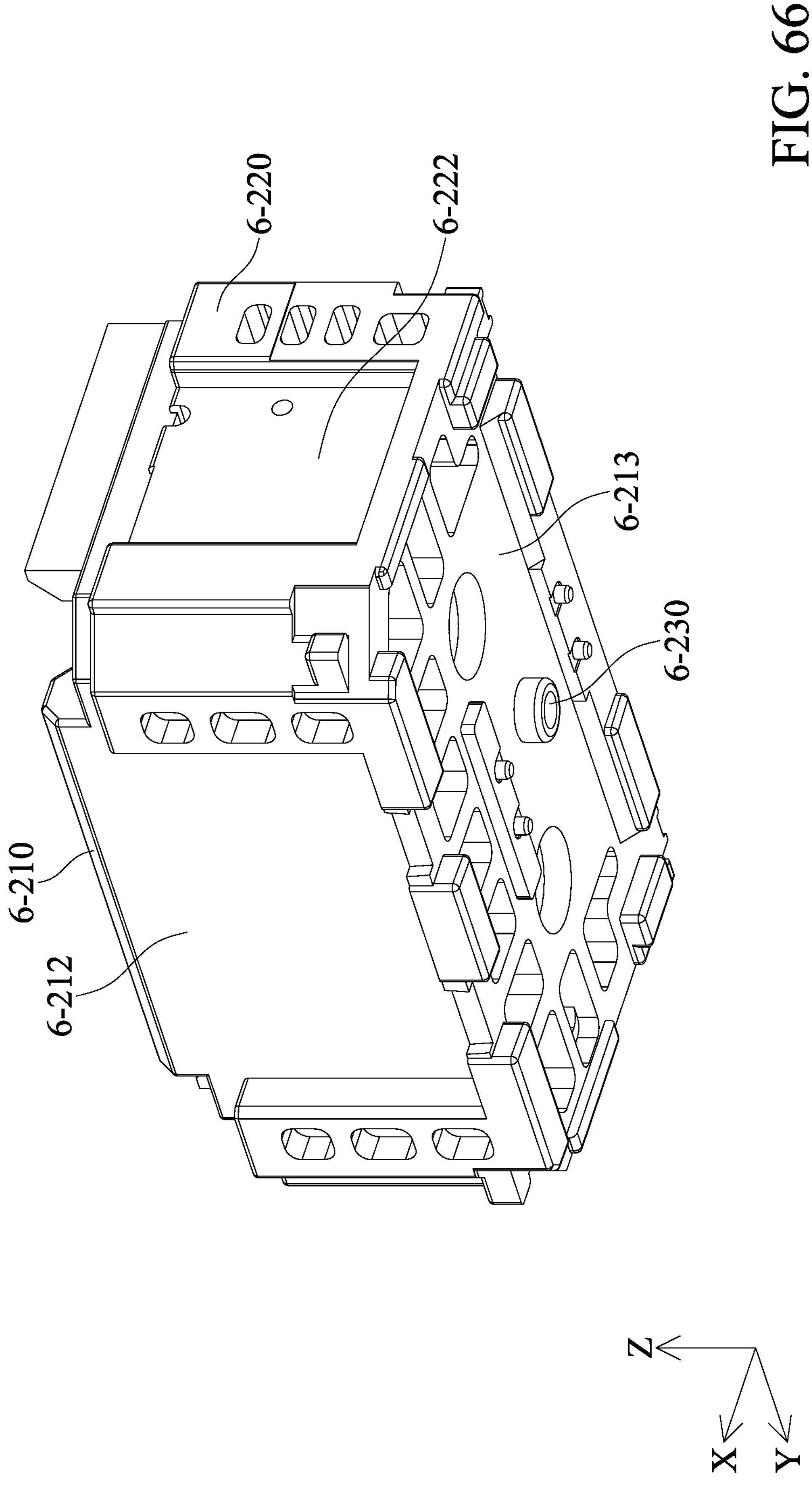
FIG. 66 is a schematic diagram of the movable portion in another view according to an embodiment of the invention.

As shown in FIGS. 65 and 66, the movable portion 6-200 includes a main body 6-210 and two lateral walls 6-220 respectively connected to the opposite side of the main body 6-210. A plurality of grooves 6-221 are formed on the inner surface of each of the lateral walls 6-220, wherein the inner surface faces the main body 6-210. The user can dispose the optical member 6-30 on the inner surface 6-211 of the main body 6-210, and then infuse adhesive glue into the grooves 6-221. Therefore, the optical member 6-30 can be affixed to the movable portion 6-200.

A depression 6-212 is formed on the outer surface of the main body 6-210, and an annular structure 6-230 is formed on the bottom surface 6-213 of the main body 6-210. The annular structure 6-230 protrudes from the bottom surface 6-213. Each of the lateral walls 6-200 has a depression 6-222 and a restricting structure 6-240. The depression 6-222 is formed on the outer surface of each of the lateral walls 6-220, and the restricting structure 6-240 is positioned on the top side of each of the lateral walls 6-220. Each of the restricting structures 6-240 has an inclined surface 6-241 facing the optical member 6-30.

As shown in FIGS. 64, 67 and 68, the supporting member 6-300 can be a ball. After the optical member driving mechanism 6-10 is assembled, the supporting member 6-300 is disposed between the base 6-110 and the movable portion 6-200, and contacts the base 6-110 and the bottom surface 6-213 of the movable portion 6-200. Moreover, the supporting member 6-300 is surrounded by the annular structure 6-230.

Since the thickness of the supporting member 6-300 is greater than the thickness of the annular structure 6-230 in the Z-axis, the movable portion 6-200 is supported by the supporting member 6-300 and does not contact the base 6-110. A gap 6-G can be formed between the movable portion 6-200 and the base 6-110.

In this embodiment, the inner diameter of the annular structure 6-230 is substantially the same as the diameter of the supporting member 6-300, so that the supporting member 6-300 can be positioned. Furthermore, as seen from the Z-axis, the annular structure 6-230 and the supporting member 6-300 overlap the center of the optical member 6-30.

Referring to FIGS. 64, 67 and 68, the driving assembly 6-400 includes first electromagnetic driving members 6-410A and 6-410B, second electromagnetic driving members 6-420A and 6-420B, a circuit board 6-430, and position sensors 6-440.

The circuit board 6-430 is affixed to the housing 6-120 and has a U-shaped structure. In other words, the circuit board 6-430 can be divided into a left segment 6-431, a right segment 6-432, and a middle segment 6-433. The middle segment 6-433 connects the left segment 6-431 to the right segment 6-432, and the normal direction of the middle segment 6-433 is different from the normal direction of the left segment 6-431 and the normal direction of the right segment 6-432.

The first electromagnetic driving members 6-410A and 6-410B are disposed on the circuit board 6-430. In this embodiment, the driving assembly 6-400 includes one first electromagnetic driving member 6-410A and two first electromagnetic driving members 6-410B. The first electromagnetic driving member 6-410A is disposed on the middle segment 6-433 of the circuit board 6-430, and two first electromagnetic driving members 6-410B are respectively disposed on the left segment 6-431 and the right segment 6-432 of the circuit board 6-430.

The second electromagnetic driving members 6-420A and 6-420B are disposed on the movable portion 6-200, and the positions of the second electromagnetic driving members 6-420A and 6-420B respectively corresponds to the positions of the first electromagnetic driving members 6-410A and 6-410B. Therefore, the second electromagnetic driving member 6-420A can be disposed on the main body 6-210 of the movable portion 6-200, and the second electromagnetic driving members 6-420B can be disposed on the lateral walls 6-220. In this embodiment, the second electromagnetic driving members 6-420A and 6-420B can be respectively accommodated in the depressions 6-212 and 6-222, so as to miniaturize the optical member driving mechanism 6-10.

For example, the first electromagnetic driving members 6-410A and 6-410B can be coils, and the second electromagnetic driving members 6-420A and 6-420B can be magnets. Since the first electromagnetic driving member 6-410A corresponds to the second electromagnetic driving member 6-420A, when a current flows through the first electromagnetic driving member 6-410A, an electromagnetic effect is generated between the first electromagnetic driving member 6-410A and the second electromagnetic driving member 6-420A, and the movable portion 6-200 is driven to rotate around a first rotation axis 6-AX1 relative to the fixed portion 6-100. In this embodiment, the first rotation axis 6-AX1 passes through the supporting member 6-300.

Similarly, since the first electromagnetic driving member 6-410B corresponds to the second electromagnetic driving member 6-420B, when a current flows through the first electromagnetic driving member 6-410B, an electromagnetic effect is generated between the first electromagnetic driving member 6-410B and the second electromagnetic driving member 6-420B, and the movable portion 6-200 is driven to rotate around a second rotation axis 6-AX2 relative to the fixed portion 6-100. In this embodiment, the second rotation axis 6-AX2 is perpendicular to the first rotation axis 6-AX1, and the second rotation axis 6-AX2 also passes through the supporting member 6-300.

Due to the rotation of the movable portion 6-200 relative to the fixed portion 6-100, the optical member 6-30 on the movable portion 6-200 can also rotate relative to the fixed portion 6-100. Thus, the moving direction of the reflected light can be lightly adjusted. In some embodiments, the first electromagnetic driving members 6-410A and 6-410B can be magnets, and the second electromagnetic driving members 6-420A and 6-420B can be coils.

Since a part of the movable portion 6-200, a part of the base 6-110, and the supporting member 6-300 are made of metal, and the supporting member 6-300 is a ball, the debris caused by the friction during the rotation of the movable portion 6-200 relative to the fixed portion 6-100 can be reduced.

The position sensors 6-440 are disposed on the circuit board 6-430, and the positions of the position sensors 6-440 correspond to that of the second electromagnetic driving members 6-420A and 6-420B. The position sensors 6-440 are configured to detect the position of the second electromagnetic driving members 6-420A and 6-420B, so as to obtain the rotation angle of the movable portion 6-200 relative to the fixed portion 6-100.

For example, the position sensors 6-440 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

Figure 69:
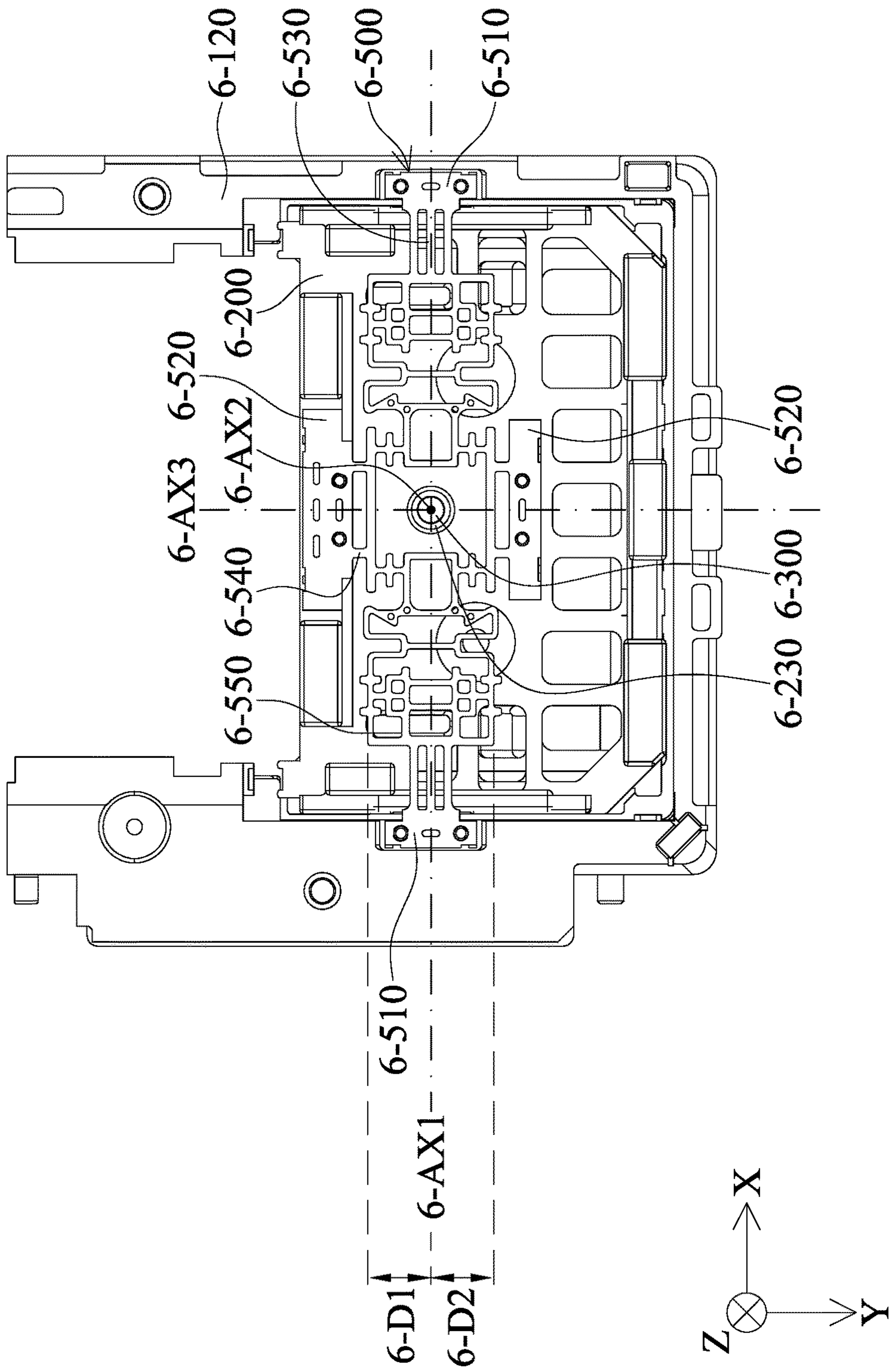
FIG. 69 is a bottom view of the optical member driving mechanism according to an embodiment of the invention, wherein the base is omitted.

Referring to FIG. 69, the elastic member 6-500 includes at least one first engaged section 6-510, at least one second engaged section 6-520, at least one first axis section 6-530, at least one second axis section 6-540, and a plurality of string sections 6-550.

The first engaged section 6-510 and the second engaged section 6-520 are respectively affixed to the fixed portion 6-100 and the movable portion 6-200. The first axis section 6-530 is connected to the first engaged section 6-510, the second axis section 6-540 is connected to the second engaged section 6-520, and the string sections 6-550 connect the first axis section 6-530 to the second axis section 6-540.

Before the current flows through the first electromagnetic driving members 6-410A and 410B, the elastic member 6-500 provides an elastic force to the movable portion 6-200 to push the movable portion 6-200 close to the base 6-110 of the fixed portion 6-100. Therefore, the movable portion 6-200 can tightly abut the supporting member 6-300, the supporting member 6-300 can be tightly clamped between the movable portion 6-200 and the base 6-110, and the separation of the supporting member 6-300 can be avoided.

In this embodiment, the elastic member 6-500 includes two first engaged sections 6-510 and two second engaged sections 6-520. Two first engaged sections 6-510 are arranged along the first rotation axis 6-AX1, and the second engaged sections 6-520 are arranged along another direction 6-AX3. The direction 6-AX3 is perpendicular to the first rotation axis 6-AX1 and the second rotation axis 6-AX2.

In direction 6-AX3, the string sections 6-550 can be divided into a first length 6-D1 and a second length 6-D2 by the first axis section 6-530. In this embodiment, the first length 6-D1 is substantially the same as the second length 6-D2, so that the elastic force applied to the movable portion 6-200 is uniform. Furthermore, as shown in FIG. 69, in this embodiment, the supporting member 6-300 is disposed on the intersection of the first rotation axis 6-AX1 and the second rotation axis 6-AX2.

Figure 70:
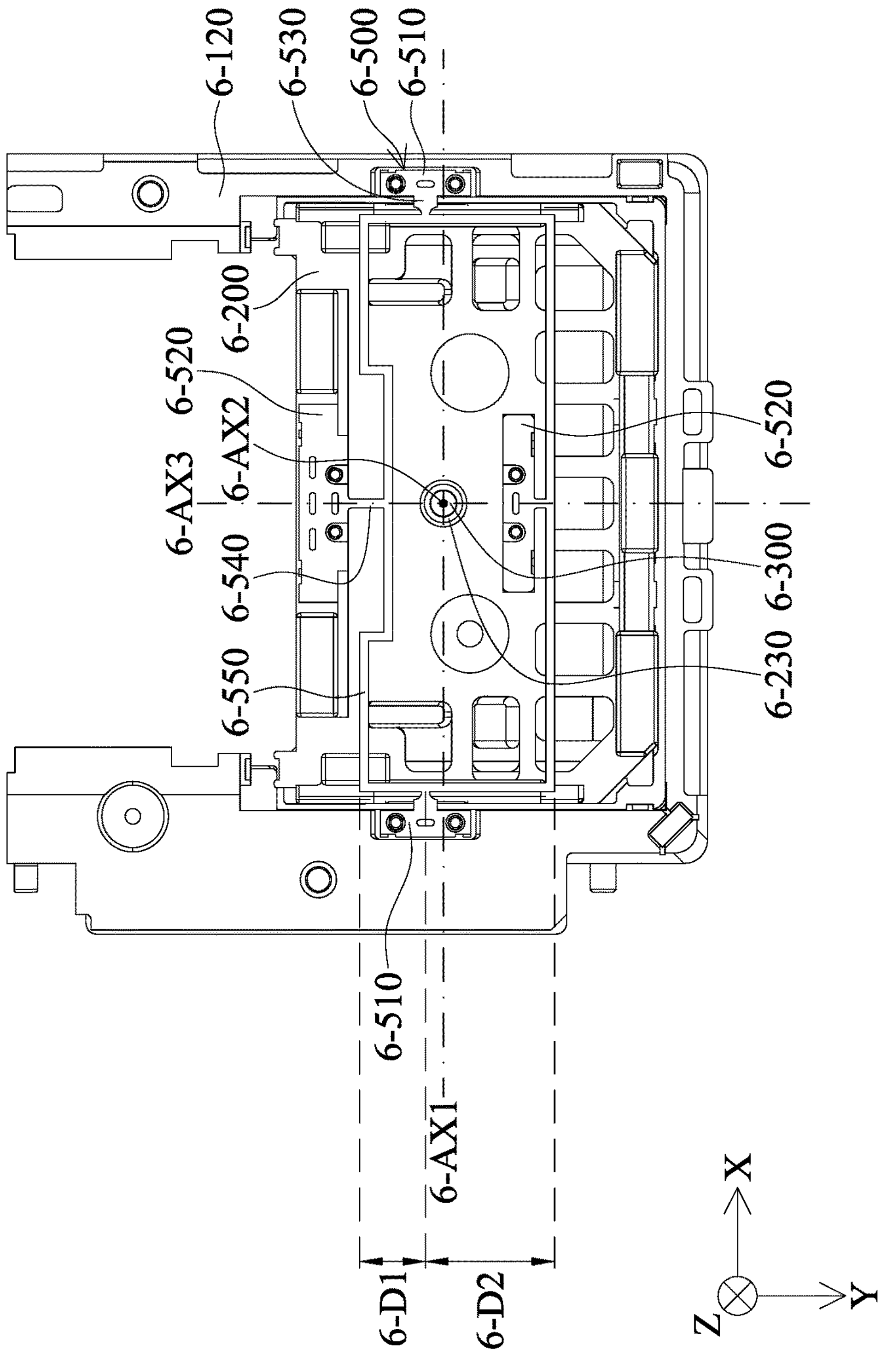
FIG. 70 is a bottom view of the optical member driving mechanism according to another embodiment of the invention, wherein the base is omitted.

The string sections 6-550 can be adjusted as required. For example, referring to FIG. 70, in another embodiment, the string sections 6-550 are divided into a first length 6-D1 and a second length 6-D2 by the first axis section 6-530, and the first length 6-D1 is less than the second length 6-D2. Moreover, in this embodiment, the first axis section 6-530 and the first rotation axis 6-AX1 are parallel, but they are not overlap each other.

Referring to FIG. 64, the magnetic permeability member 9-600 is embedded in the movable portion 6-200 and adjacent to the second electromagnetic driving members 6-420A and 6-420B, so as to enhance the magnetic pushing force of the driving assembly 6-400.

In summary, an optical member driving mechanism is provided, including a movable portion, a fixed portion, and a driving assembly. The movable portion is connected to an optical member. The fixed portion has an accommodating space, and the optical member is received in the accommodating space. The movable portion is movable relative to the fixed portion. The driving assembly is configured to drive the movable portion to move relative to the fixed portion.

Seventh Group of Embodiments

Figure 71:
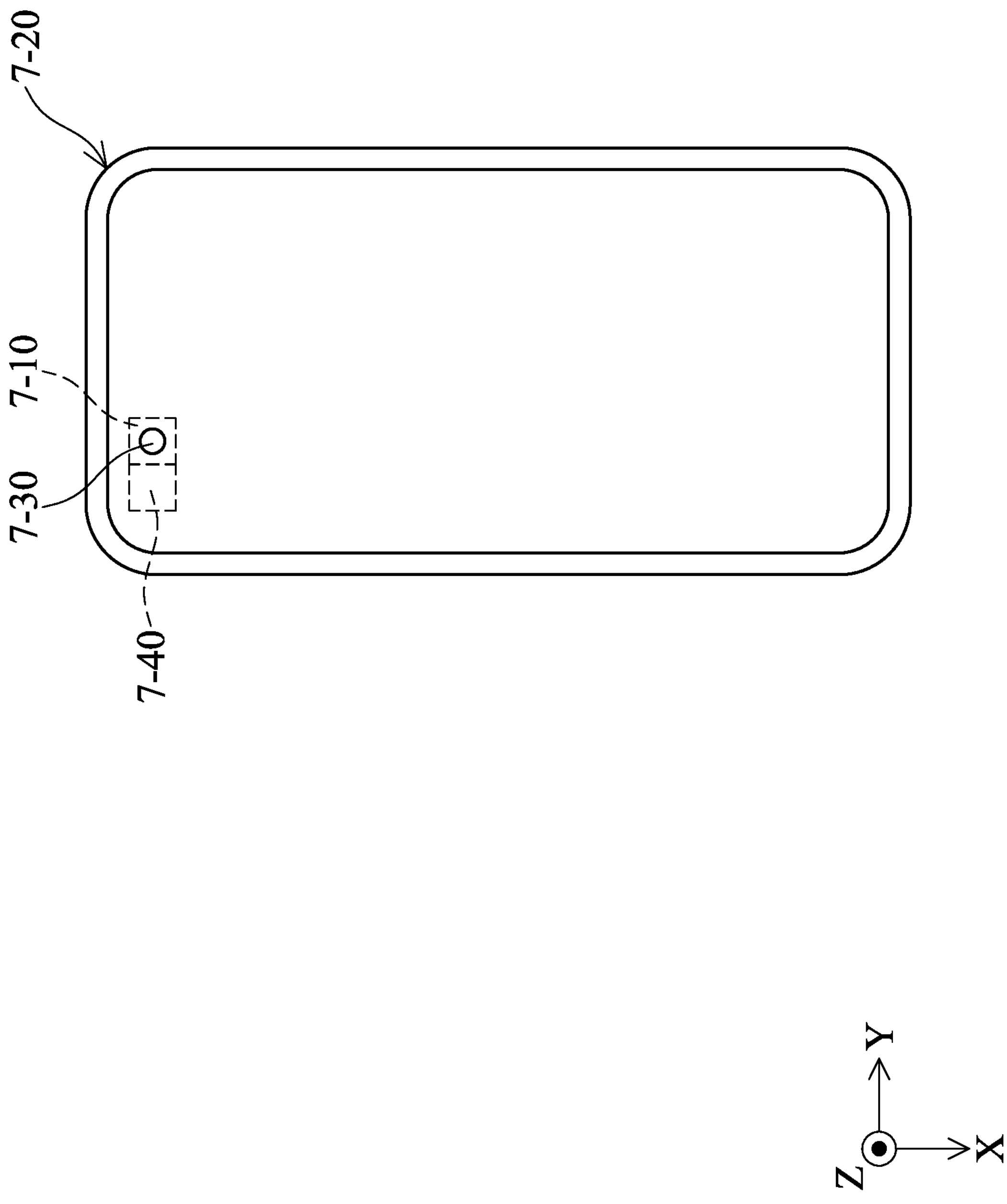
FIG. 71 is a schematic diagram of an electronic device according to an embodiment of the invention.

Referring to FIG. 71, in an embodiment of the invention, an optical member driving mechanism 7-10 can be disposed in an electronic device 7-20. The optical member driving mechanism 7-10 is configured to hold an optical member 7-30 and drive the optical member 7-30 to move relative to an image sensor module (not shown) in the electronic device 7-20, so as to achieve the purpose of focus adjustment. For example, the electronic device 7-20 can be a digital camera or a smart phone having the function of capturing photographs or making video recordings, and the optical member 7-30 can be a prism or a mirror. When capturing photographs or making video recordings, a light enters the optical member driving mechanism 7-10 along an incident direction (−Z-axis), and after reflected by the optical member 7-30, the light moves along an outgoing direction (−Y-axis) through an optical system 7-40 in the electronic device 7-20 and reach the image sensor module. The optical system 7-40 is configured to focus or adjust the light path, and can be adjusted or omitted as required.

Figure 72:
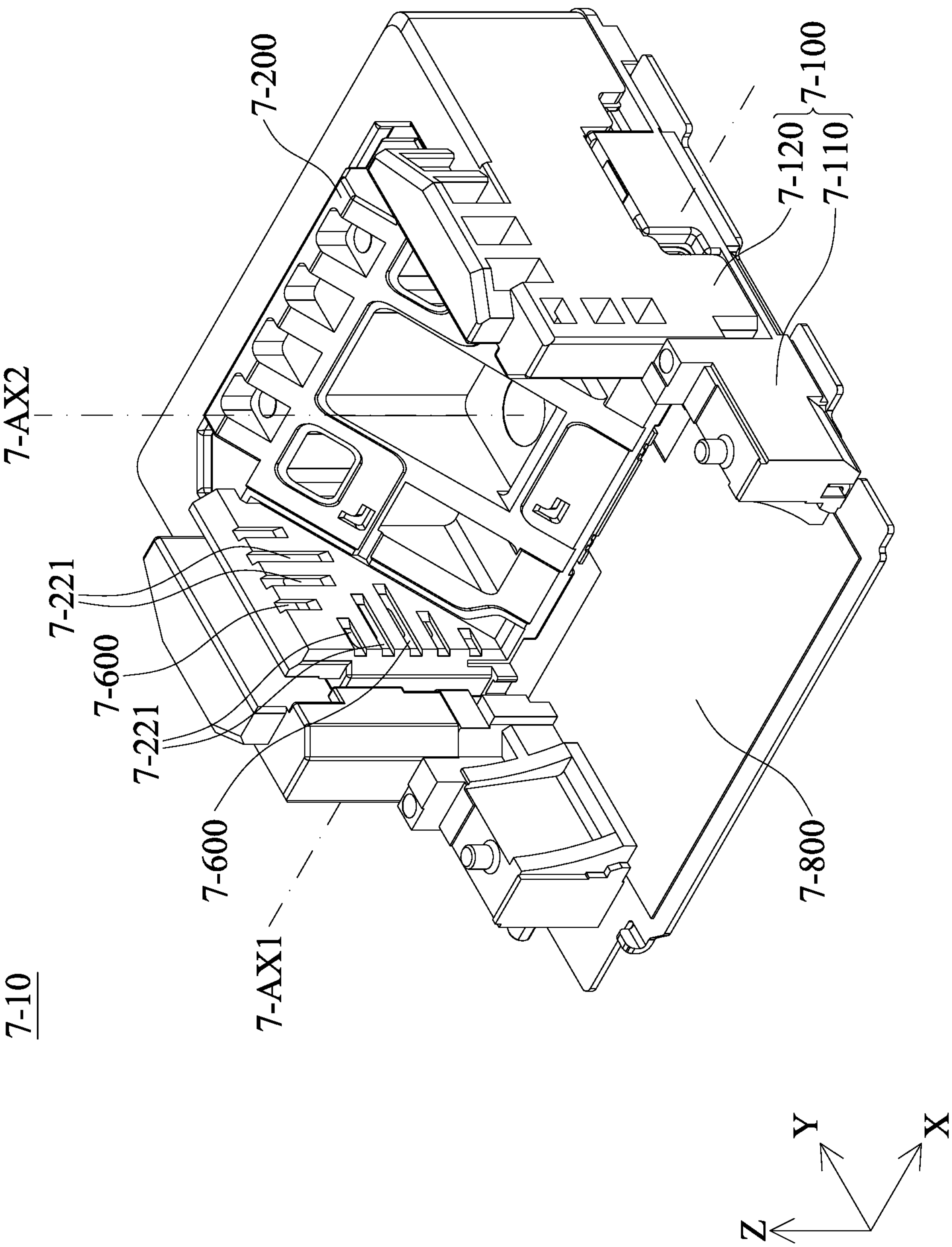
FIG. 72 is a schematic diagram of an optical member driving mechanism according to an embodiment of the invention.
Figure 73:
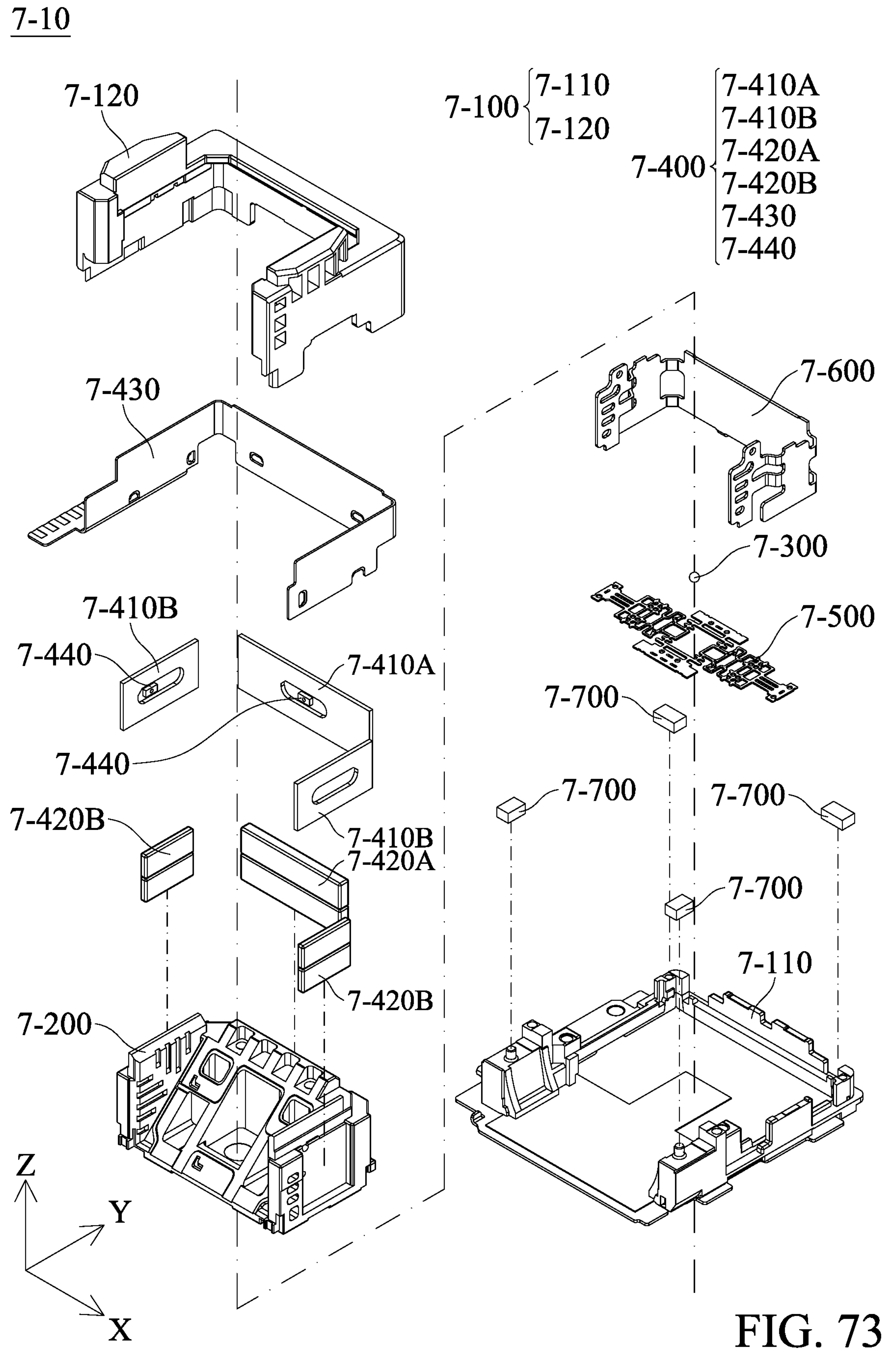
FIG. 73 is an exploded-view diagram of the optical member driving mechanism according to an embodiment of the invention.

Referring to FIGS. 72 and 73, the optical member driving mechanism 7-10 primarily includes a fixed portion 7-100, a movable portion 7-200, a supporting member 7-300, a driving assembly 7-400, an elastic member 7-500, a magnetic permeability member 7-600, and a plurality of damping members 7-700.

Figure 76:
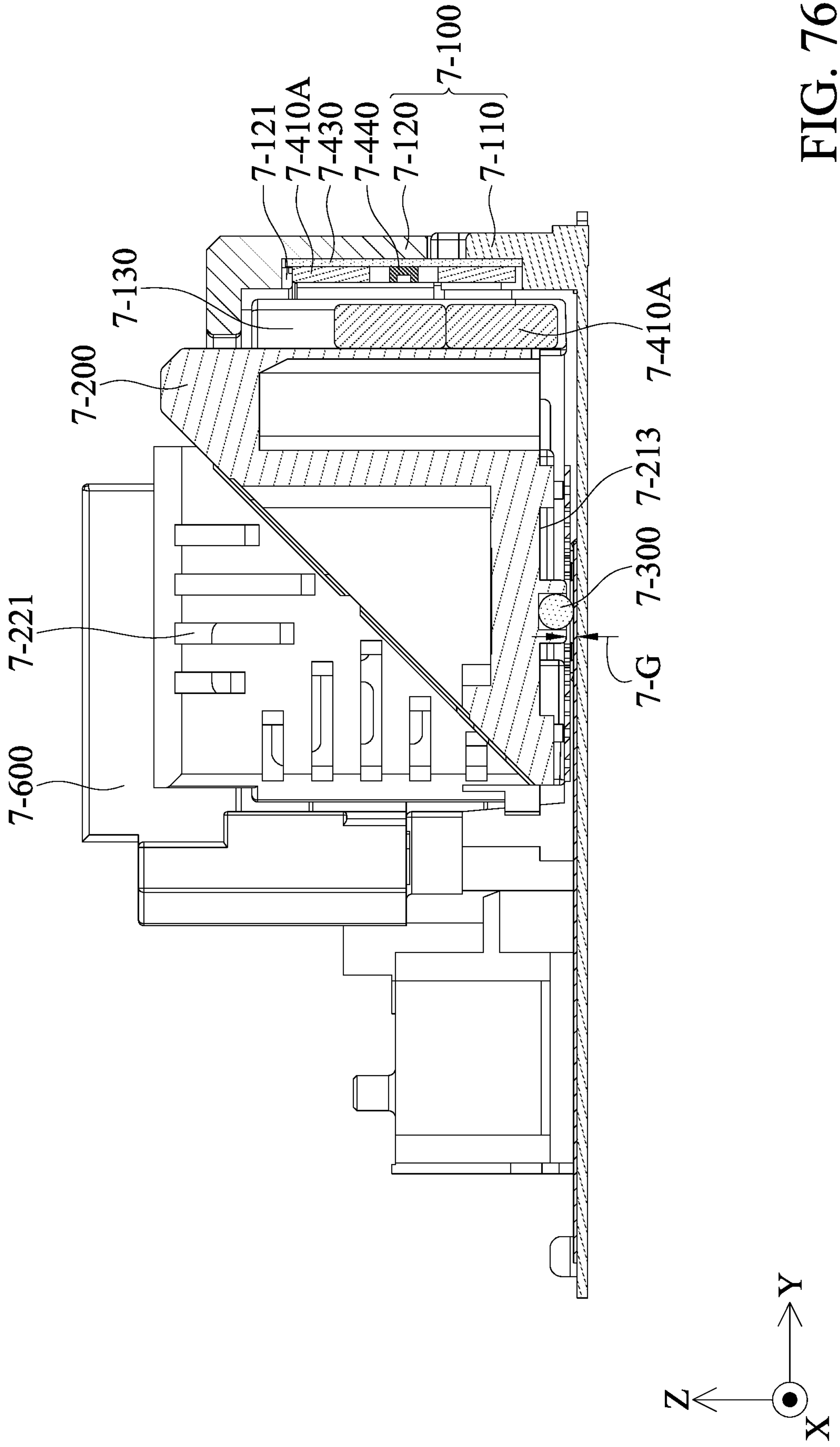
FIG. 76 is a cross-sectional view of the optical member driving mechanism according to an embodiment of the invention.

The fixed portion 7-100 includes a base 7-110 and a housing 7-120. The base 7-110 and the housing 7-120 can be assembled using snap-fit joints or adhesive member, and an accommodating space 7-130 can be formed after assembled (as shown in FIG. 76). The movable portion 7-200 can be an optical member holder, and the optical member 7-30 is disposed on the movable portion 7-200. When the movable portion 7-200 is movably connected to the fixed portion 7-100, the movable portion 7-200 and the optical member 7-30 are accommodated in the accommodating space 7-130 of the fixed portion 7-100.

Figure 74:
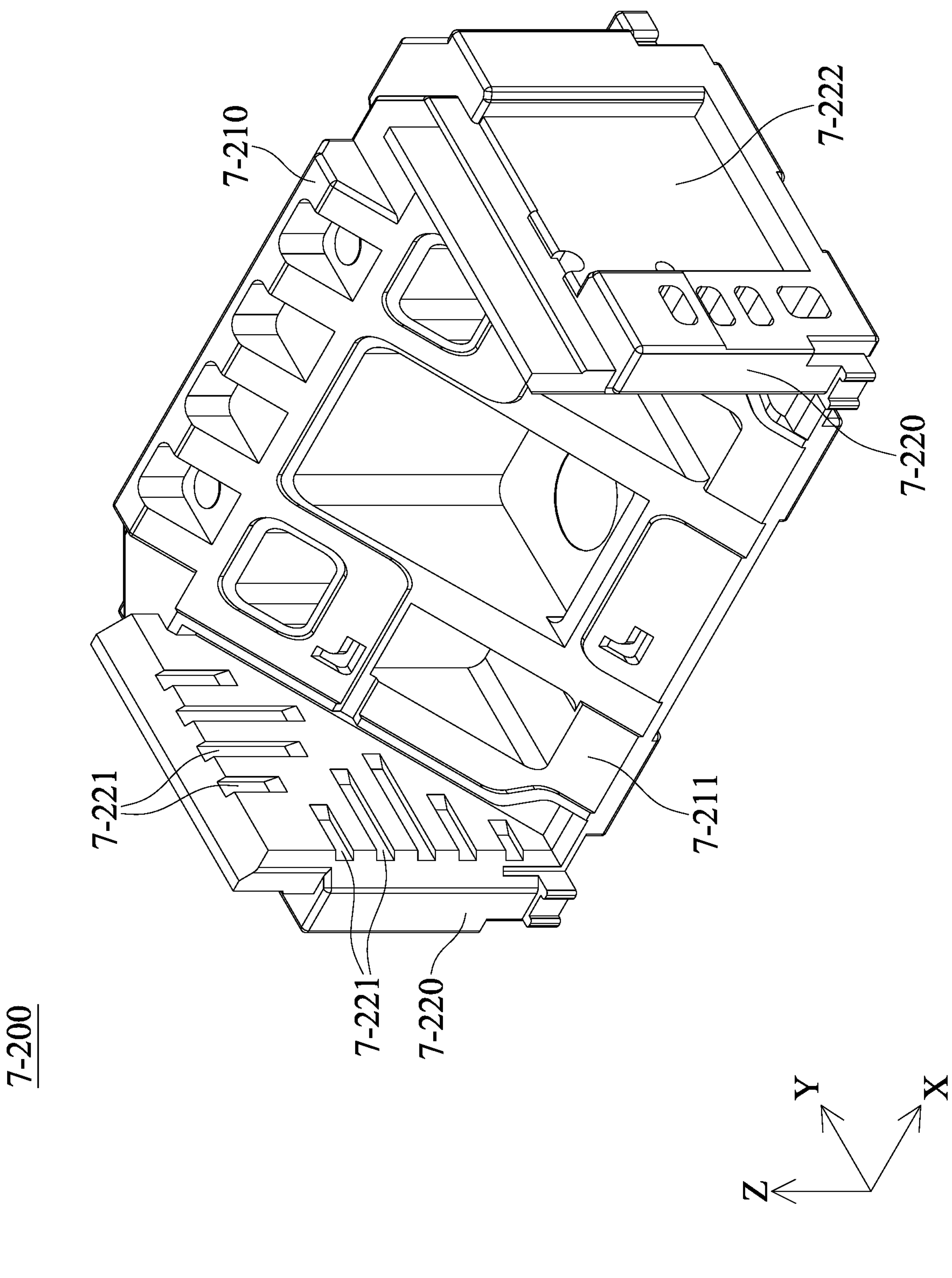
FIG. 74 is a schematic diagram of a movable portion according to an embodiment of the invention.
Figure 75:
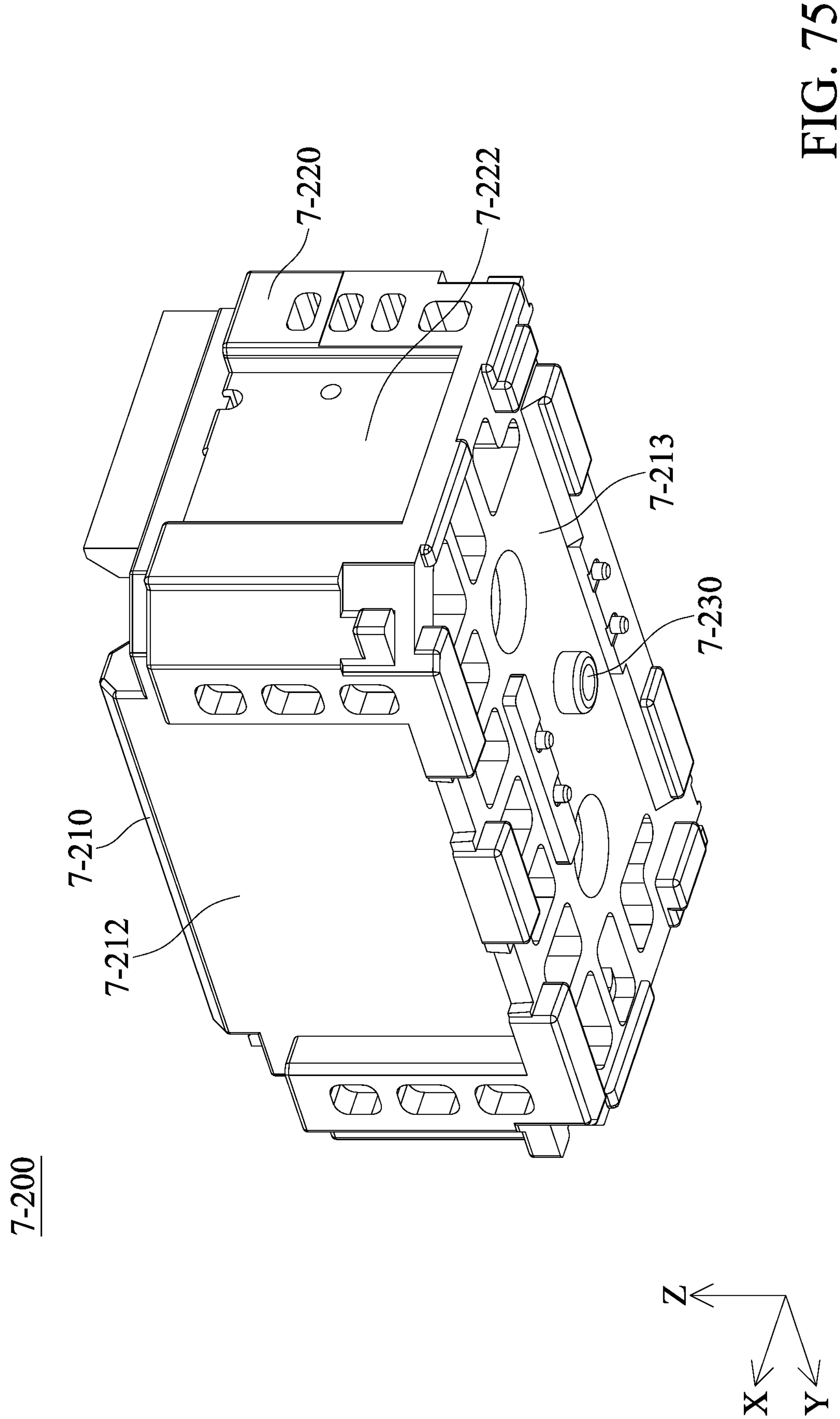
FIG. 75 is a schematic diagram of the movable portion in another view according to an embodiment of the invention.

As shown in FIGS. 74 and 75, the movable portion 7-200 includes a main body 7-210 and two lateral walls 7-220 respectively connected to opposite sides of the main body 7-210. A plurality of grooves 7-221 are formed on the inner surface of each of the lateral walls 7-220. The user can dispose the optical member 7-30 on the inner surface 7-211 of the main body 7-210, and then infuse adhesive glue into the grooves 7-221. Thereby, the optical member 7-30 can be affixed to the movable portion 7-200.

The longitudinal direction of the grooves 7-221 can be different to ensure that the optical member 7-30 will not separate from the movable portion 7-200 when external forces in various directions applied thereon. For example, in this embodiment, the movable portion has a plurality of grooves 7-221 having longitudinal direction along the Z-axis and a plurality of grooves 7-221 having longitudinal direction along the Y-axis. When the user infuses adhesive glue into the grooves 7-221 having longitudinal direction along the Z-axis, adhesive glue can provide a sufficient adhesive force to the optical member 7-30 to ensure that an external force in Y-axis cannot separate the optical member 7-30 from the movable portion 7-200. When the user infuses adhesive glue into the grooves 7-221 having longitudinal direction along the Y-axis, adhesive glue can provide a sufficient adhesive force to the optical member 7-30 to ensure that an external force in Z-axis cannot separate the optical member 7-30 from the movable portion 7-200.

A depression 7-222A is formed on the outer surface of each of the lateral walls 7-200, and a depression 7-212 is formed on the outer surface of the main body 7-210. Moreover, the main body 7-210 further includes an annular structure 7-230, disposed on the bottom surface 7-213 of the main body and protruding from the bottom surface 7-213.

As shown in FIGS. 73 and 76, the supporting member 7-300 can be a ball. After the optical member driving mechanism 7-10 is assembled, the supporting member 7-300 is disposed between the base 7-110 and the movable portion 7-200, and contacts the base 7-110 and the bottom surface 7-213 of the movable portion 7-200. Moreover, the supporting member 7-300 is surrounded by the annular structure 7-230.

Since the thickness of the supporting member 7-300 is greater than the thickness of the annular structure 7-230 in the Z-axis, the movable portion 7-200 is supported by the supporting member 7-300 and does not contact the base 7-110. A gap 7-G can be formed between the movable portion 7-200 and the base 7-110.

Referring to FIGS. 73 and 76-78, the driving assembly 7-400 includes first electromagnetic driving members 7-410A and 7-410B, second electromagnetic driving members 7-420A and 7-420B, a circuit board 7-430, and position sensors 7-440.

Figure 77:
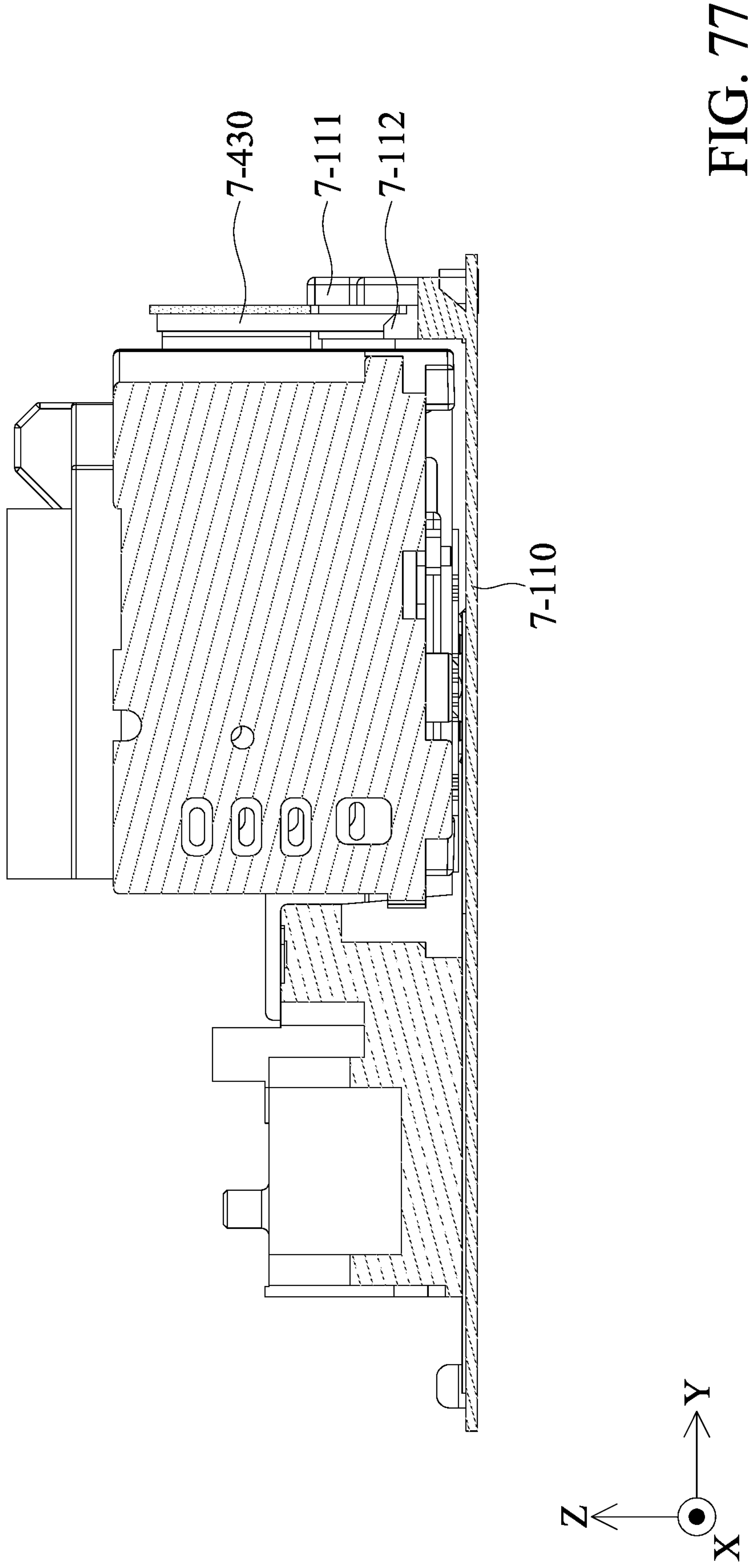
FIG. 77 is another cross-sectional view of the optical member driving mechanism according to an embodiment of the invention, wherein a housing is omitted.
Figure 78:
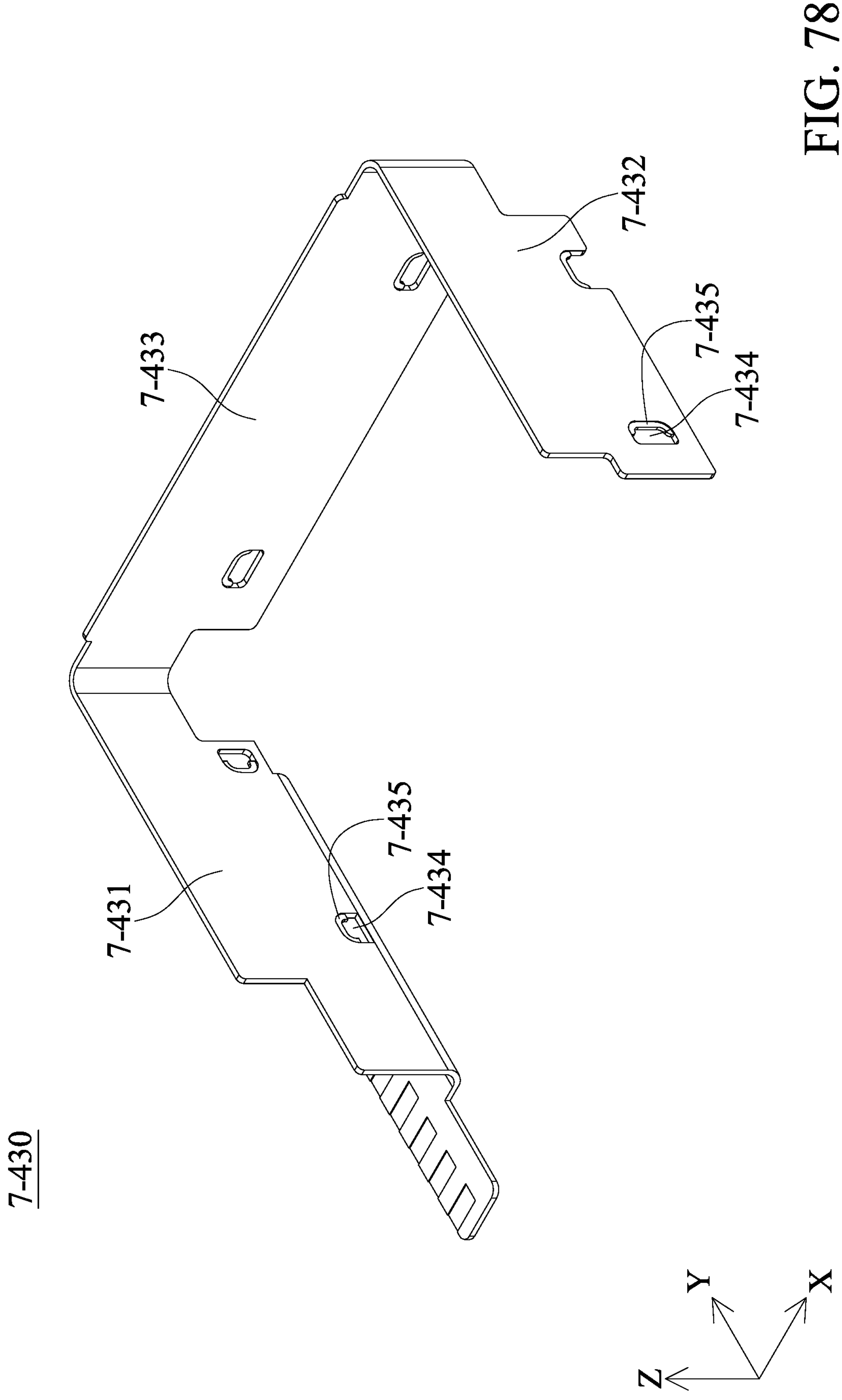
FIG. 78 is a schematic diagram of a circuit board according to an embodiment of the invention.

The circuit board 7-430 is affixed to the housing 7-120. As shown in FIG. 76, the housing 7-120 of the fixed portion 7-100 has a C-shaped structure 7-121. And upper side of the circuit board 7-430 enters the notch of the C-shaped structure 7-121 to position the circuit board 7-430. Similarly, as shown in FIG. 77, the base 7-110 of the fixed portion 7-100 has a first restricting portion 7-111 and a second restricting portion 7-112. The first restricting portion 7-111 and the second restricting portion 7-112 are extended toward the housing 7-120, and the distance between the first restricting portion 7-111 and the movable portion 7-200 is greater than the distance between the second restricting portion 7-112. When the circuit board 7-430 is disposed on the circuit board 7-110, the other side of the circuit board 7-430 is clamped between the first restricting portion 7-111 and the second restricting portion 7-112. Thereby, the circuit board 7-430 can be affixed and positioned by the C-shaped structure 7-121, the first restricting portion 7-111, and the second restricting portion 7-112.

Specifically, the second restricting portion 7-112 has a chamfer or a fillet facing the circuit board 7-430, so as to increase the area where can arrange the circuit and to prevent the circuit board 7-430 from scratching during assembly.

The circuit board 7-430 has a U-shaped structure. In other words, the circuit board 7-430 can be divided into a left segment 7-431, a right segment 7-432, and a middle segment 7-433. The middle segment 7-433 connects the left segment 7-431 to the right segment 7-432, and the normal direction of the middle segment 7-433 is different from the normal direction of the left segment 7-431 and the normal direction of the right segment 7-432. Furthermore, the circuit board 7-430 has a plurality of through holes 7-434, and at least a portion of the circuit 7-435 of the circuit board 7-430 is exposed from the through holes 7-434.

In this embodiment, the driving assembly 7-400 includes one first electromagnetic driving member 7-410A and two first electromagnetic driving members 7-410B. The first electromagnetic driving member 7-410A is disposed on the middle segment 7-433 of the circuit board 7-430, and two first electromagnetic driving members 7-410B are respectively disposed on the left segment 7-431 and the right segment 7-432 of the circuit board 7-430. The first electromagnetic driving members 7-410A and 7-410B can be coils, and can be connected to the circuit 7-435 at the through holes 7-434 by welding.

Figure 79:
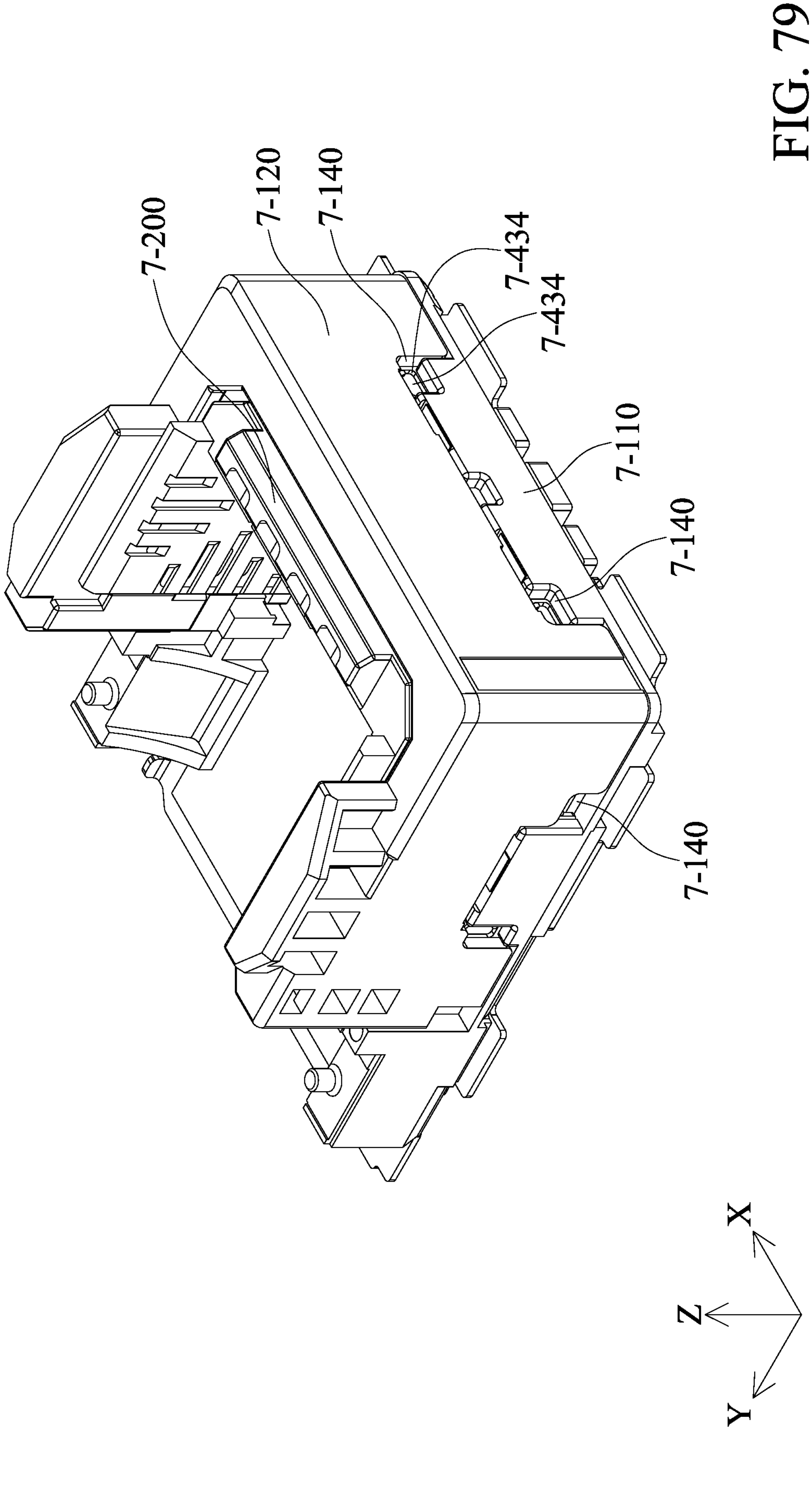
FIG. 79 is a schematic diagram of the optical member driving mechanism in another view according to an embodiment of the invention.

As shown in FIG. 79, when the base 7-110 and the housing 7-120 of the fixed portion 7-100 are joined together, one or more openings 7-140 is formed between the base 7-110 and the housing 7-120, and the positions of the openings 7-140 correspond to the positions of the through holes 7-434. The user can fill the adhesive member (such as a glue, not shown) into the opening 7-140, so that the base 7-110, the housing 7-120, the circuit board 7-430, and the first electromagnetic driving members 7-410A and 7-410B can be affixed more securely.

In some embodiments, the first electromagnetic driving members 7-410A and 7-410B can be mounted on the circuit board 7-430 by using surface-mount technology (SMT), and the through holes 7-434 can be omitted.

Figure 80:
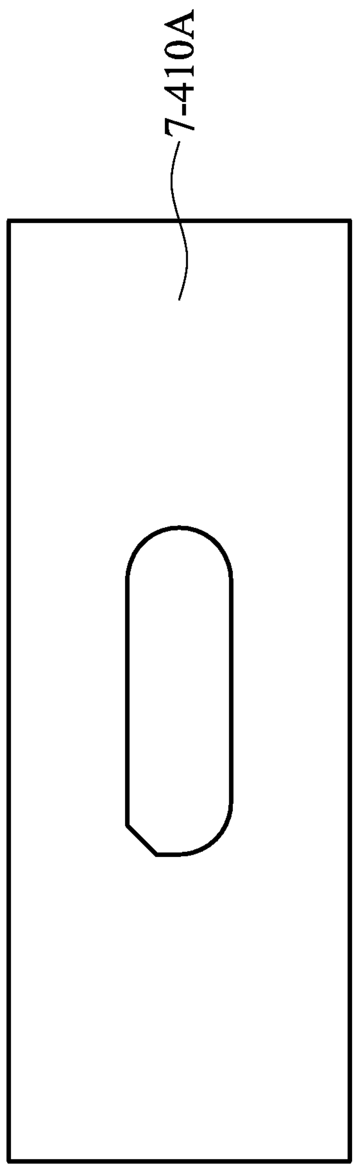
FIG. 80 is a schematic diagram of a first electromagnetic driving member according to an embodiment of the invention.
Figure 81:
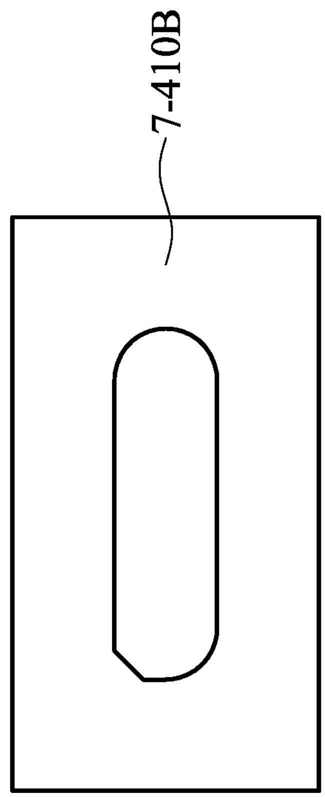
FIG. 81 is a schematic diagram of another first electromagnetic driving member according to an embodiment of the invention.

As shown in FIGS. 80 and 81, the inside tracks of the first electromagnetic driving members 7-410A and 7-410B have asymmetric patterns, so as to ensure that the user mounts the first electromagnetic driving members 7-410A and 7-410B in the correct orientation.

Referring to FIGS. 73 and 76-78, the second electromagnetic driving members 7-420A and 7-420B are disposed on the movable portion 7-200, and the positions of the second electromagnetic driving members 7-420A and 7-420B respectively correspond to the positions of the first electromagnetic driving members 7-410A and 7-410B. The second electromagnetic driving member 7-420A can be disposed on the main body 7-210 of the movable portion 7-200, and the second electromagnetic driving members 7-420B can be disposed on the lateral walls 7-220 of the movable portion 7-200. In this embodiment, the second electromagnetic driving members 7-420A and 7-420B can be respectively accommodated in the depressions 7-212 and 7-222 of the movable portion 7-200, so as to miniaturize the optical member driving mechanism 7-10.

The second electromagnetic driving members 7-420A and 7-420B can be magnets. Since the first electromagnetic driving member 7-410A corresponds to the second electromagnetic driving member 7-420A, when a current flows through the first electromagnetic driving member 7-410A, an electromagnetic effect is generated between the first electromagnetic driving member 7-410A and the second electromagnetic driving member 7-420A, and the movable portion 7-200 is driven to rotate around a first rotation axis 7-AX1 relative to the fixed portion 7-100.

Similarly, since the first electromagnetic driving members 7-410B corresponds to the second electromagnetic driving members 7-420B, when current flow through the first electromagnetic driving members 7-410B, an electromagnetic effect is generated between the first electromagnetic driving members 7-410B and the second electromagnetic driving members 7-420B, and the movable portion 7-200 is driven to rotate around a second rotation axis 7-AX2 relative to the fixed portion 7-100. In this embodiment, the second rotation axis 7-AX2 is perpendicular to the first rotation axis 7-AX1.

Due to the rotation of the movable portion 7-200 relative to the fixed portion 7-100, the optical member 7-30 on the movable portion 7-200 can also rotate relative to the fixed portion 7-100. Thus, the emission direction of the reflected light can be lightly adjusted. In some embodiments, the first electromagnetic driving members 7-410A and 7-410B can be magnets, and the second electromagnetic driving members 7-420A and 7-420B can be coils.

The position sensors 7-440 are disposed on the circuit board 7-430, and the positions of the position sensors 7-440 correspond to that of the second electromagnetic driving members 7-420A and 7-420B. The position sensors 7-440 are configured to detect the position of the second electromagnetic driving members 7-420A and 7-420B, so as to obtain the rotation angle of the movable portion 7-200 relative to the fixed portion 7-100.

For example, the position sensors 7-440 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

The position sensors 7-440 are connected to the circuit board 7-430 through its pins. The user can fill insulation glue between the position sensors 7-440 and the circuit board 7-430 at the position without pins, so as to securely affix the position sensors 7-440.

Figure 82:
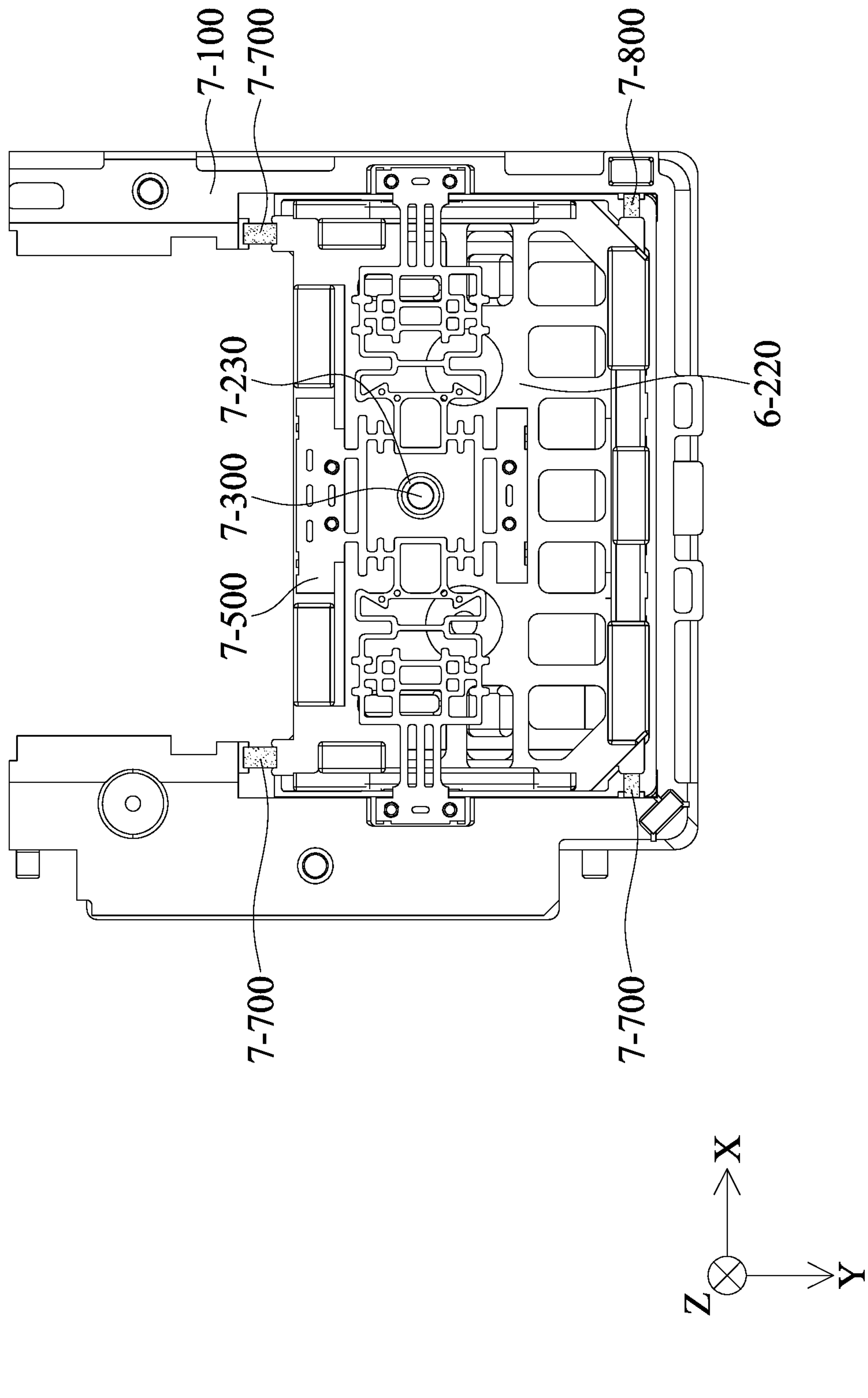
FIG. 82 is a bottom view of the optical member driving mechanism to an embodiment of the invention, wherein a base is omitted.

As shown in FIG. 82, the elastic member 7-500 is connected to the fixed portion 7-100 and the movable portion 7-200 to suspend the movable portion 7-200 in the accommodating space 7-130. The damping members 7-700 are disposed on the side of the movable portion 7-200 adjacent to the base 7-110, and situated at the corners of the movable portion 7-200. The damping members 7-700 can be connected to the fixed portion 7-100 and the movable portion 7-200, or disposed on the elastic member 7-500, so as to suppress the vibration during the rotation of the movable portion 7-200.

Figure 83:
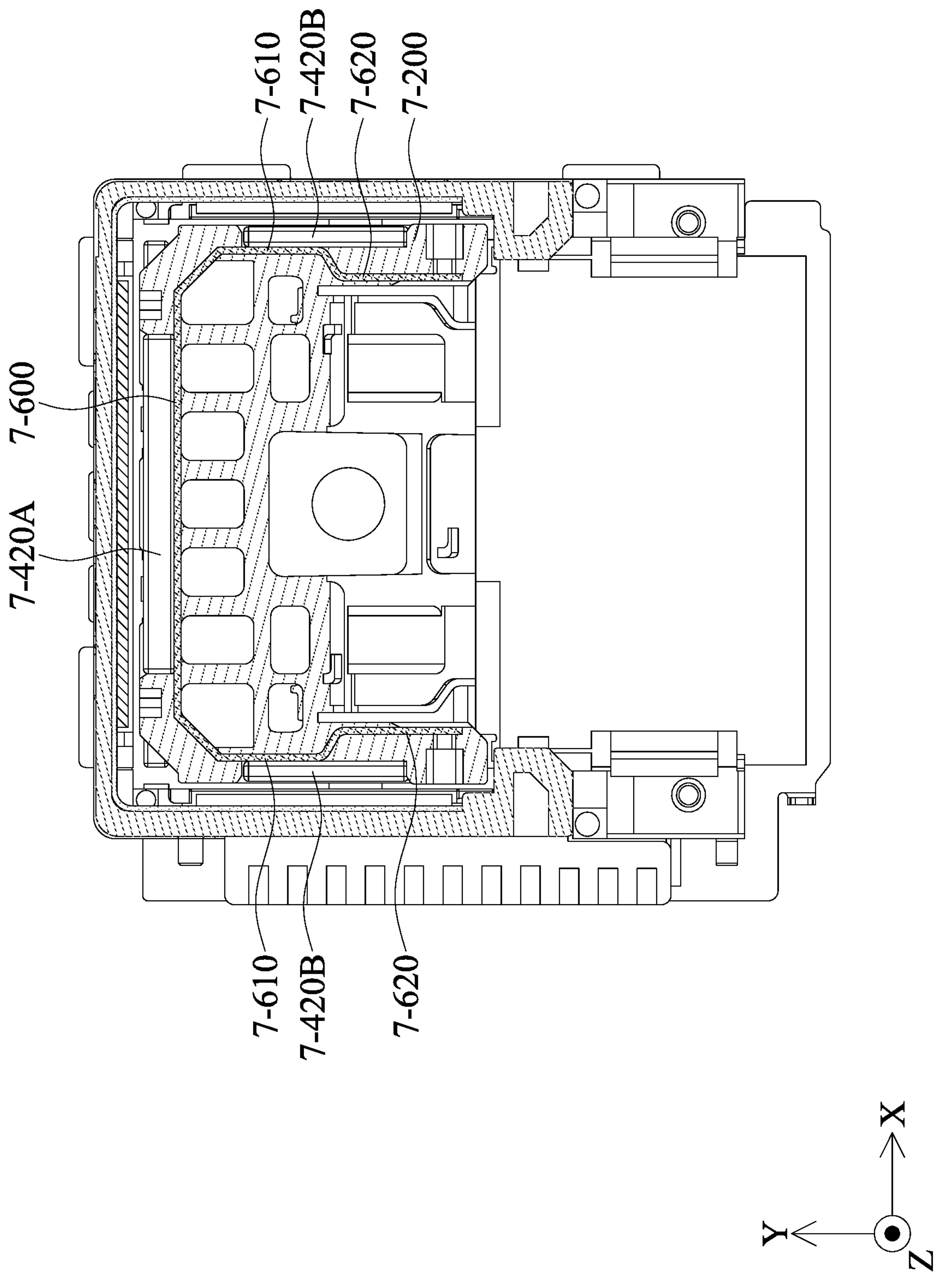
FIG. 83 is another exploded-view diagram of the optical member driving mechanism according to an embodiment of the invention.

Referring to FIGS. 72 and 83, the magnetic permeability member 7-600 is embedded in the movable portion 7-200, and has at least one connecting portion 7-610 and at least one curved portion 7-620. The connecting portion 7-610 is adjacent to the second electromagnetic driving member 7-420B, and the curved portion 7-620 is adjacent to the inner surface of the lateral wall 7-220 of the movable portion 7-200. In other words, the distance between the curved portion 7-620 and the inner surface of the lateral wall 7-220 of the movable portion 7-200 is less than the distance between the connecting portion 7-610 and the inner surface of the lateral wall 7-220 of the movable portion 7-200.

The portion of the magnetic permeability member 7-600 adjacent to the second electromagnetic driving members 7-420A and 7-420B (such as the connecting portion 7-610) can enhance the magnetic pushing force of the driving assembly 7-400. The curved portion 7-620 is exposed from the grooves 7-221 of the movable portion 7-200. Therefore, when the user infuse adhesive glue into the grooves 7-221 to attach the optical member 7-30, the adhesive force of adhesive glue is increased, and the optical member 7-30 can be affixed more securely.

Furthermore, a dark member 7-800 is disposed on the base 7-110 of the fixed portion 7-100. The dark member 7-800 is extended along the outgoing direction of the light, so as to reduce the stray light. In this embodiment, the dark member 7-800 extends to the position between the optical member 7-30 and the base 7-100.

In summary, an optical member driving mechanism is provided, including a movable portion, a fixed portion, and a driving assembly. The movable portion is connected to an optical member. The fixed portion has an accommodating space, and the optical member is received in the accommodating space. The movable portion is movable relative to the fixed portion. The driving assembly is configured to drive the movable portion to move relative to the fixed portion.

Eighth Group of Embodiments

Figure 84:
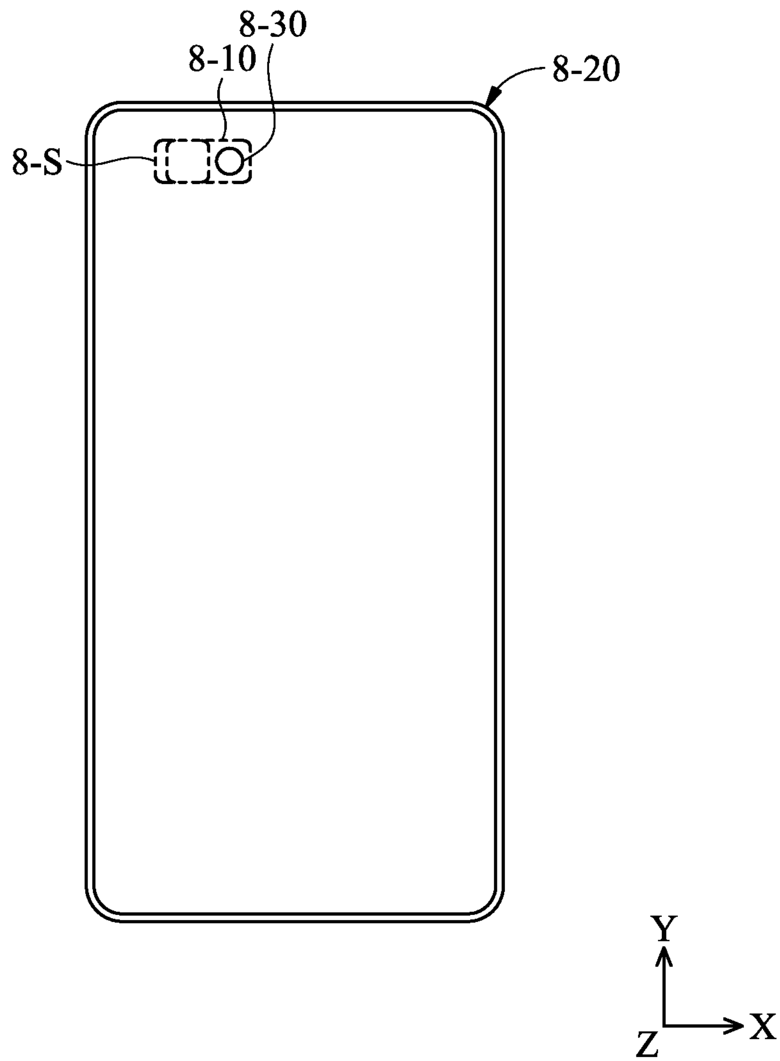
FIG. 84 is a schematic diagram of an electronic device according to an embodiment of the invention.
Figure 85:
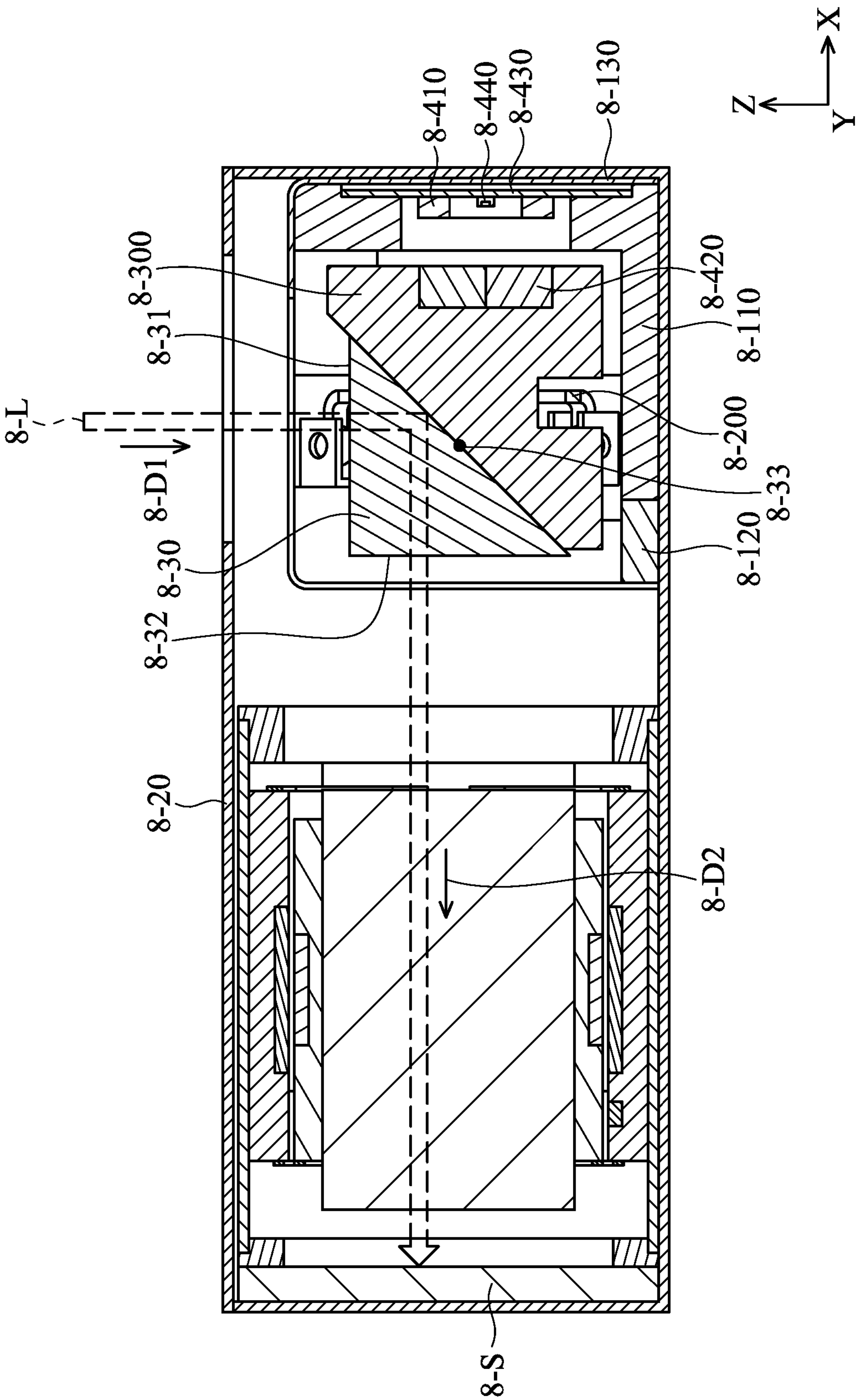
FIG. 85 is a partial cross-sectional view of the electronic device according to an embodiment of the invention.

Referring to FIGS. 84 and 85, in an embodiment of the invention, an optical member driving mechanism 8-10 can be disposed in an electronic device 8-20. The optical member driving mechanism 8-10 is configured to hold an optical member 8-30 and drive the optical member 8-30 to move relative to an image sensor module 8-S in the electronic device 8-20, so as to achieve the purpose of focus adjustment. For example, the electronic device 8-20 can be a digital camera or a smart phone having the function of capturing photographs or making video recordings, and the optical member 8-30 can be a prism or a mirror. When capturing photographs or making video recordings, light 8-L enters the optical member driving mechanism 8-10 along an incident direction 8-D1, and moves along an outgoing direction 8-D2 to reach the image sensor module 8-S after reflected by the optical member 8-30.

It should be noted that, in this embodiment, the light 8-L enters the optical member 8-30 from a first surface 8-31 of the optical member 8-30, and leaves the optical member 8-30 from a second surface 8-32. In some embodiments, the disposing orientation of the optical member driving mechanism 8-10 can be adjusted, the light 8-L can enter the optical member 8-30 from the second surface 8-32 of the optical member 8-30 and leave the optical member 8-30 from the first surface 8-31. In other words, in some embodiments, the incident direction 8-D1 and the outgoing direction 8-D2 can be exchanged.

Figure 86:
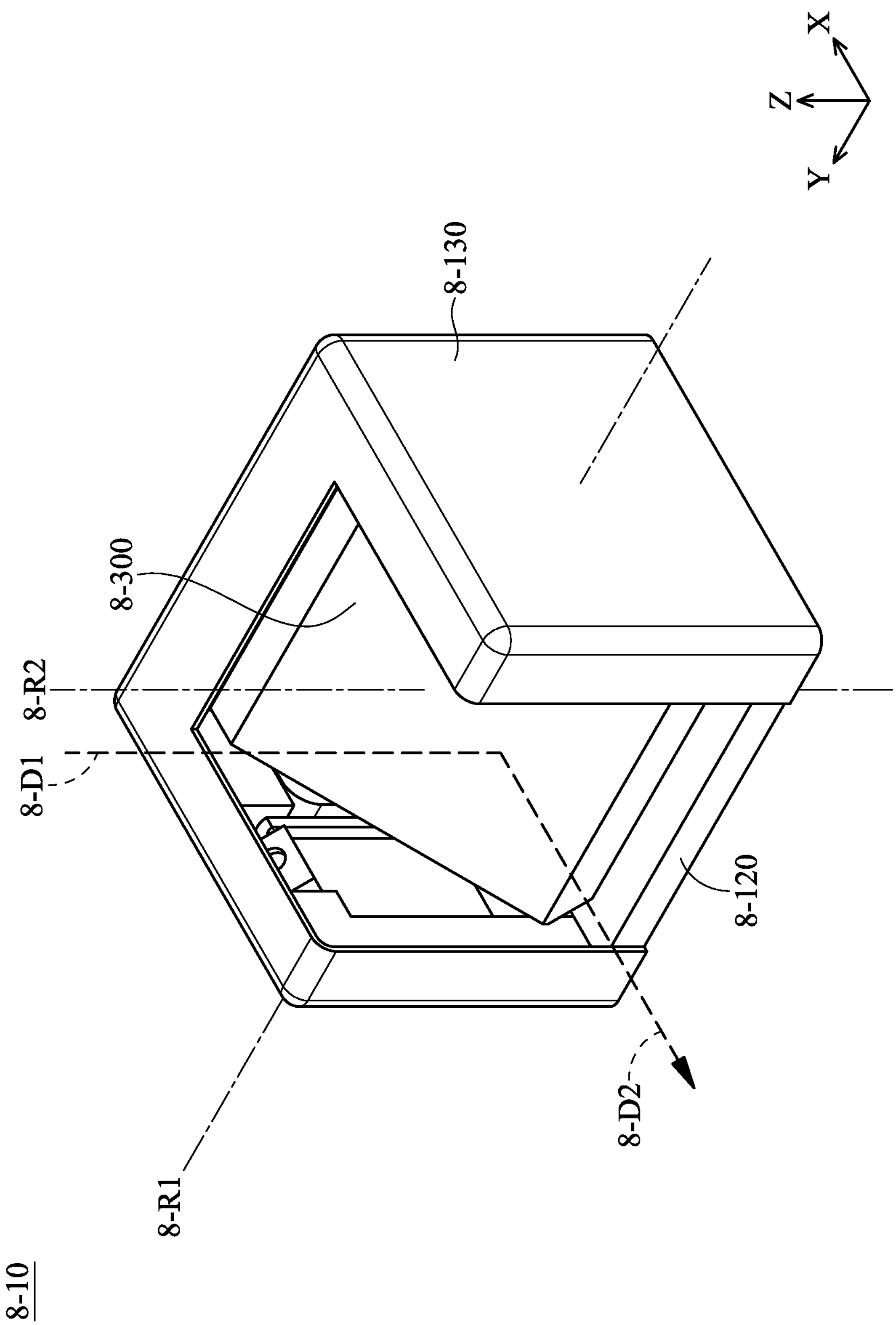
FIG. 86 is a schematic diagram of an optical member driving mechanism according to an embodiment of the invention.
Figure 87:
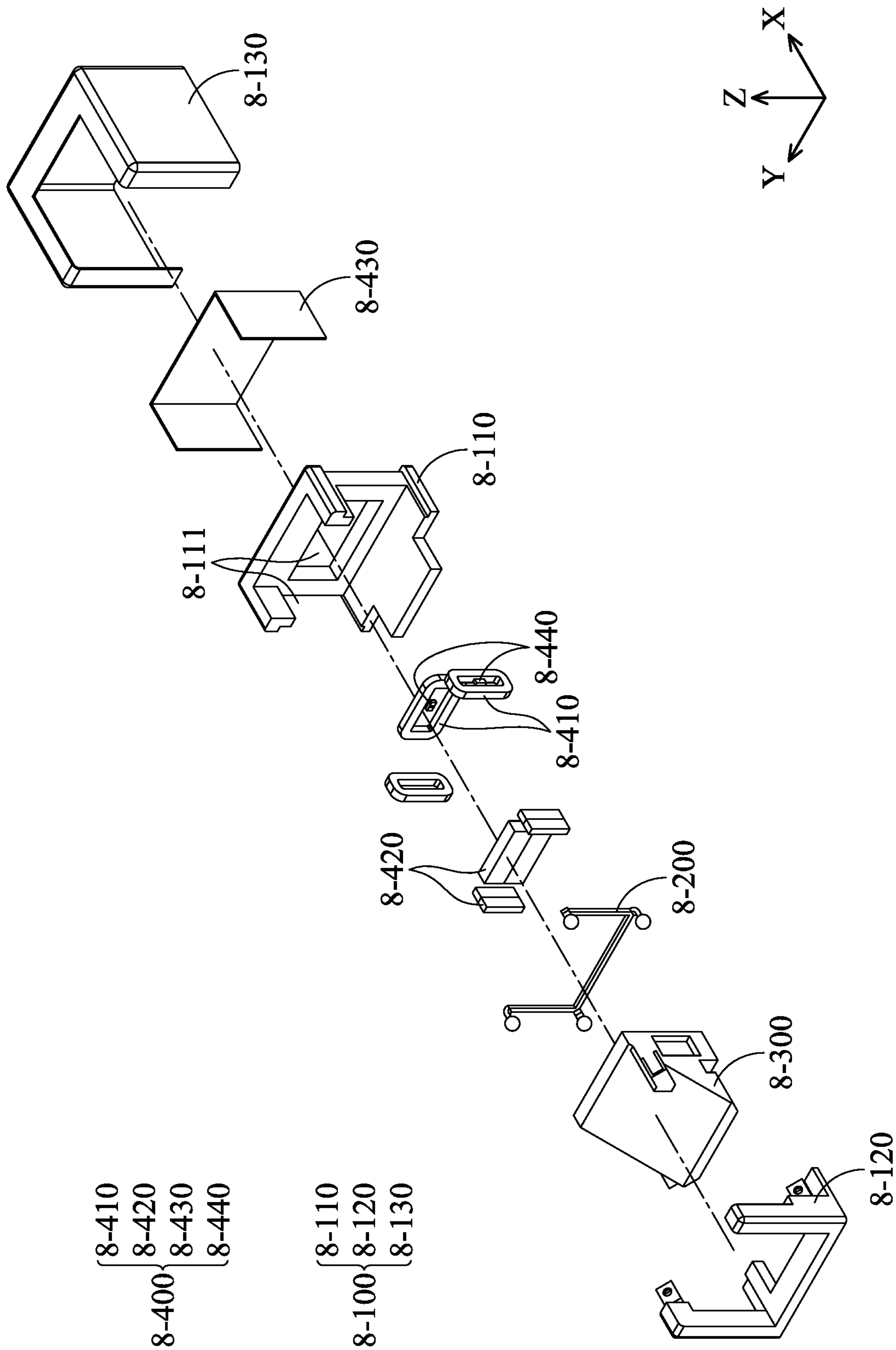
FIG. 87 is an exploded-view diagram of the optical member driving mechanism according to an embodiment of the invention.

FIG. 86 is a schematic diagram of the optical member driving mechanism 8-10, and FIG. 87 is an exploded-view diagram of the optical member driving mechanism 8-10. As shown in FIGS. 86 and 87, the optical member driving mechanism 8-10 primarily includes a fixed portion 8-100, a first movable portion 8-200, a second movable portion 8-300, and a driving assembly 8-400.

The fixed portion 8-100 includes a base 8-110, a frame 8-120, and a case 8-130. The base 8-110 and the frame 8-120 are fixedly assembled to each other, and the case 8-130 covers the base 8-110, the frame 8-120, the first movable portion 8-200, the second movable portion 8-300, and the driving assembly 8-400, so as to protect the aforementioned members from an impact with the external components.

Figure 88:
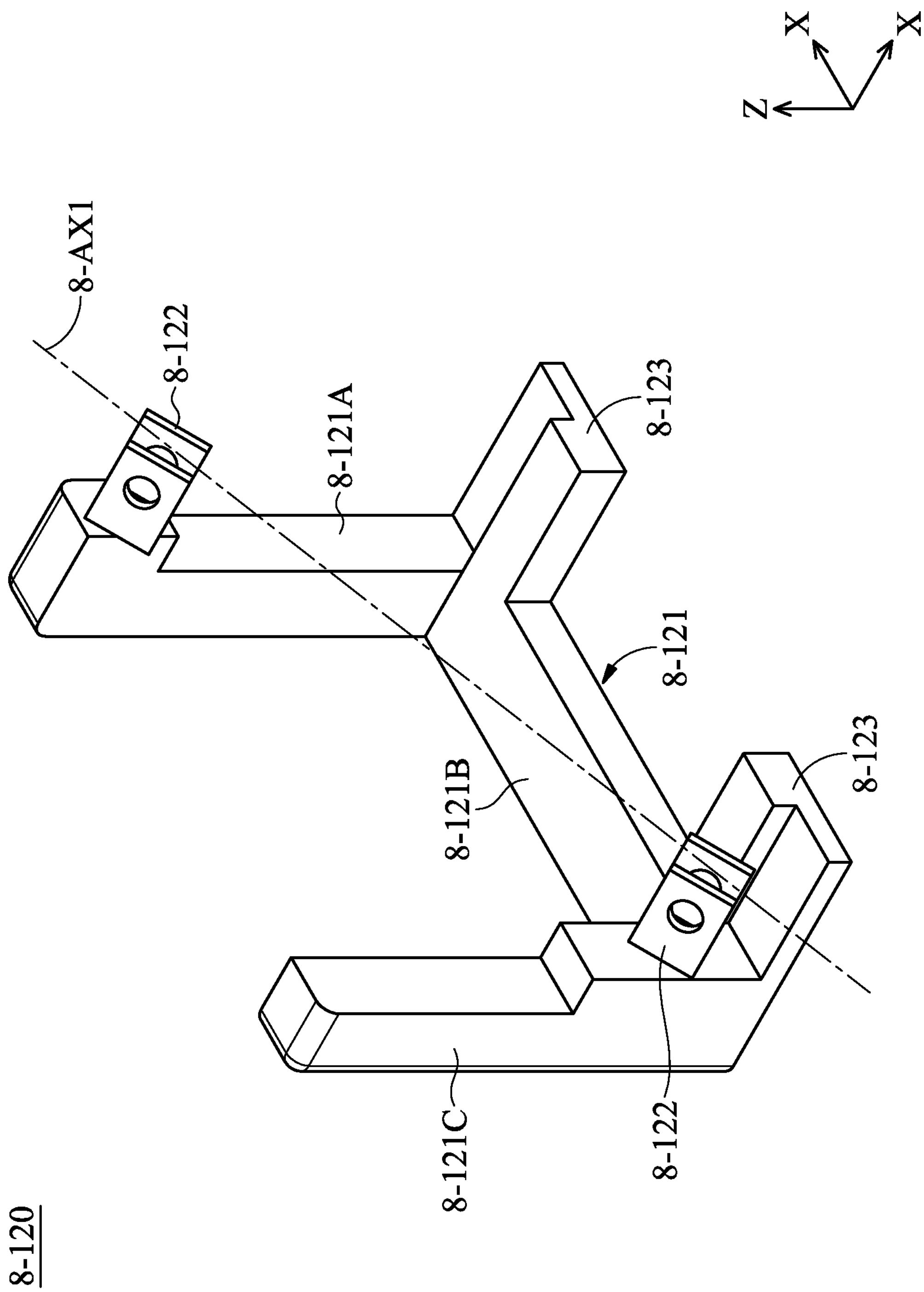
FIG. 88 is a schematic diagram of a frame according to an embodiment of the invention.
Figure 89:
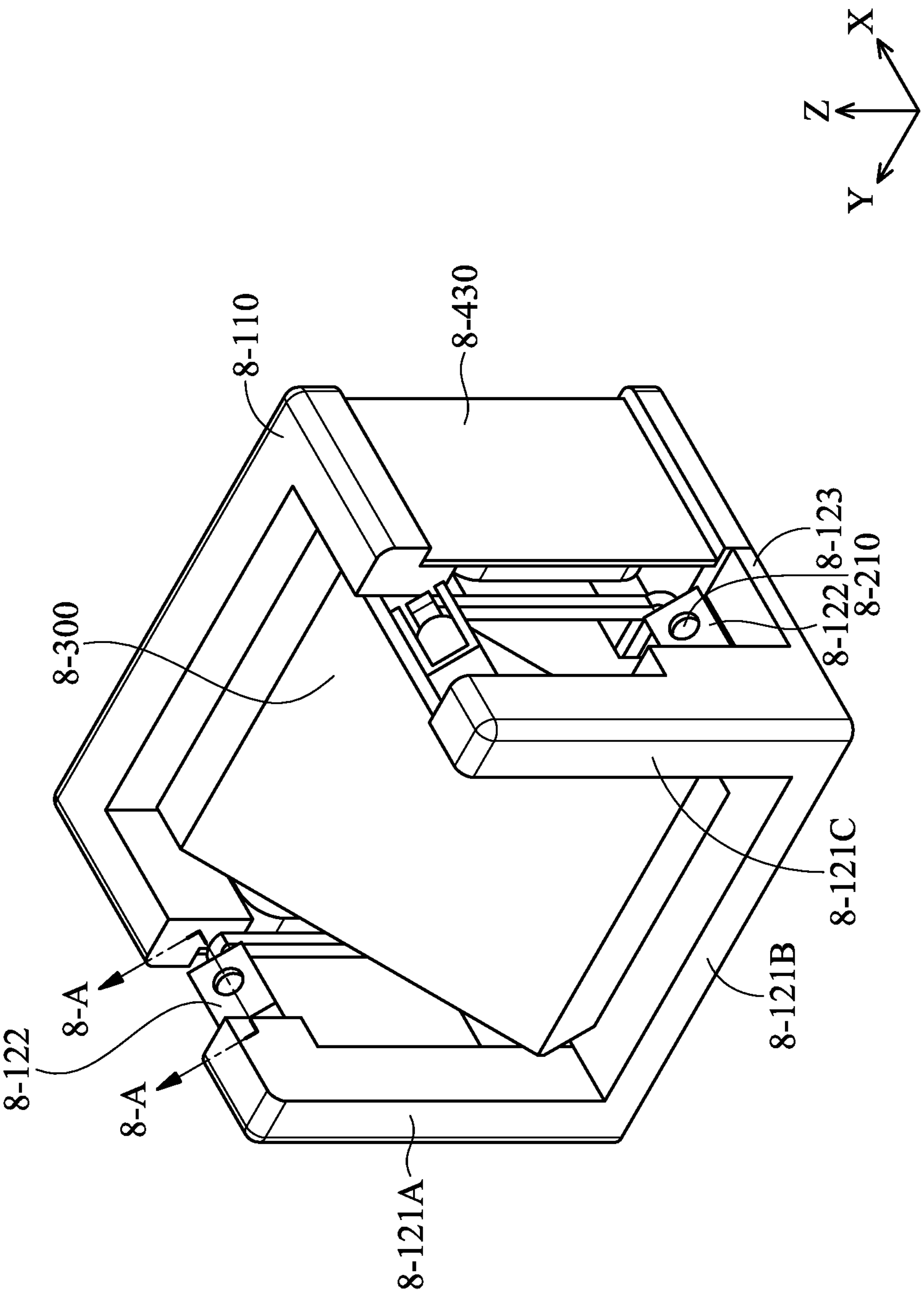
FIG. 89 is a schematic diagram of the optical member driving mechanism according to an embodiment of the invention, wherein a case is omitted.

As shown in FIGS. 87-89, the frame 8-120 includes a main body 8-121 and two first engaged portions 8-122. The main body 8-121 has a C-shaped structure, including a first section 8-121A, a second section 8-121B, and a third section 8-121C. The second section 8-121B connects the first section 8-121A to the third section 8-121C. The longitudinal axis of the second section 8-121B is perpendicular to the longitudinal axis of the first section 8-121A and the longitudinal axis of the third section 8-121C.

Two first engaged portions 8-122 are disposed on the surface of the main body 8-121 facing the base 8-110, and arranged along a first axis 8-AX1. Since the first axis 8-AX1 is inclined relative to the longitudinal axis of the first section 8-121A and the longitudinal axis of the second section 8-121B, one of the first engaged portions 8-122 is adjacent to the connecting portion between the second section 8-121B and the third section 8-121C, and the other one of the first engaged portions 8-122 is adjacent to an end of the first section 8-121A which is not connected to the second section 8-121B.

Furthermore, the frame 8-120 has at least one contacting portion 8-123 extending toward the base 8-110. In the outgoing direction 8-D2, the thickness of the contacting portion 8-123 is greater than the thickness of the first engaged portion 8-122. Therefore, when the base 8-110 is joined to the frame 8-120, the contacting portion 8-123 contacts the base 8-110, and a gap is formed between the first engaged portion 8-122 and the base 8-110.

Figure 90:
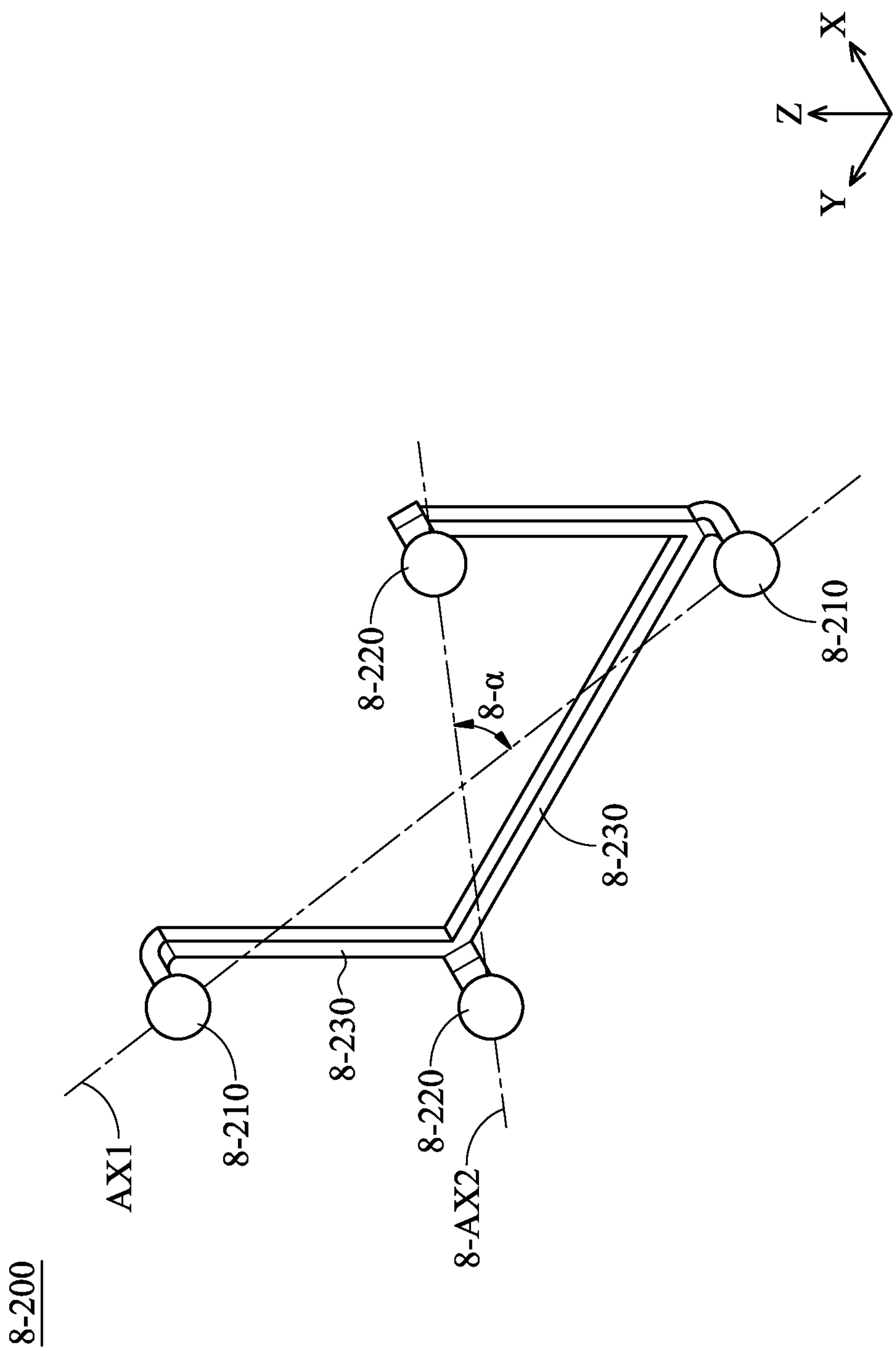
FIG. 90 is a schematic diagram of a first movable portion according to an embodiment of the invention.

Referring to FIG. 90, in this embodiment, the first movable portion 8-200 also has a C-shaped structure, and includes two first supporting portions 8-210, two second supporting portions 8-220, and a plurality of connecting portions 8-230. Two first supporting portions 8-210 are arranged along the first axis 8-AX1, two second supporting portions 8-220 are arranged along a second axis 8-AX2, and the connecting portions 8-230 are connected to the first supporting portions 8-210 and the second supporting portions 8-220. An acute angle 8-α can be formed between the first axis 8-AX1 and the second axis 8-AX2 (for example, the acute angle 8-α can be 45-90 degrees (such as 60 degrees)). Therefore, one of the first supporting portions 8-210 and one of the second supporting portions 8-220 are respectively disposed on the two ends of the C-shaped structure. In this embodiment, the intersection point of the first axis 8-AX1 and the second axis 8-AX2 is adjacent to the center 8-33 of the optical member 8-30 as seen from the incident direction 8-D1.

Figure 91:
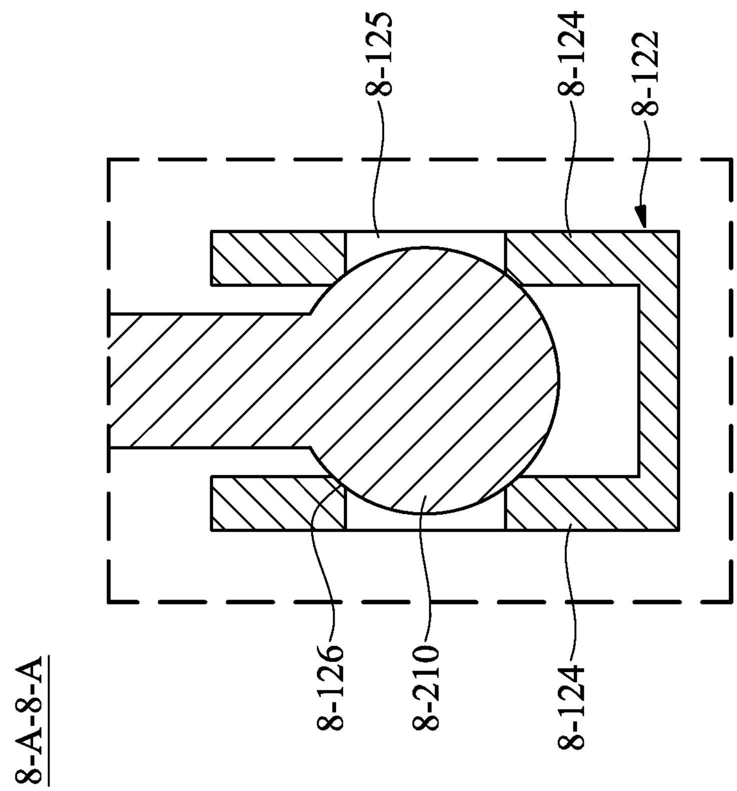
FIG. 91 is a cross-sectional view along the line 8-A-8-A in FIG. 89.

As shown in FIGS. 89 and 91, the first supporting portion 8-210 has a ball structure. Each of the first engaging portions 8-122 has two plates 8-124, and each of the plates 8-124 has a through hole 8-125. The distance between two plates 8-124 is less than the diameter of the first supporting portion 8-210, and the diameter of the through hole 8-125 is less than the diameter of the first supporting portion 8-210. When the first movable portion 8-200 is connected to the fixed portion 8-100, the first supporting portion 8-210 is disposed in the first engaging portion 8-122, and the first supporting portion 8-210 is clamped by two plates 8-124 and enters the through holes 8-125. Therefore, the first movable portion 8-200 can be pivotally connected to the fixed portion 8-100 through the first supporting portion 8-210 and the first engaging portion 8-122. The first movable portion 8-200 can rotate around the first axis 8-AX1 relative to the fixed portion 8-100.

In this embodiment, the first movable portion 8-200 is made of metal, and the portion of the through hole 8-125 contacting the first supporting portion 8-210 has a chamfer or a fillet, so as to reduce the debris caused by the friction between the first supporting portion 8-210 and the first engaging portion 8-122 during the rotation of the first supporting portion 8-210.

Figure 92:
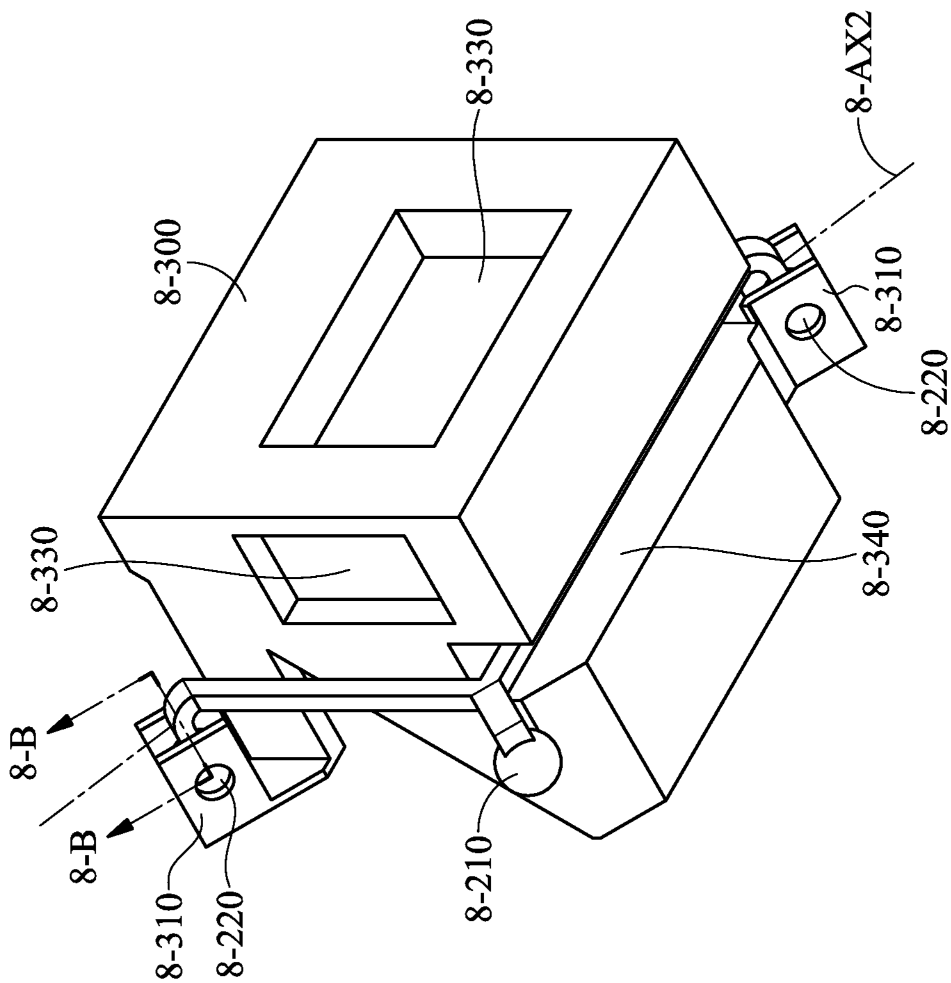
FIG. 92 is a schematic diagram of a second movable portion according to an embodiment of the invention.
Figure 93:
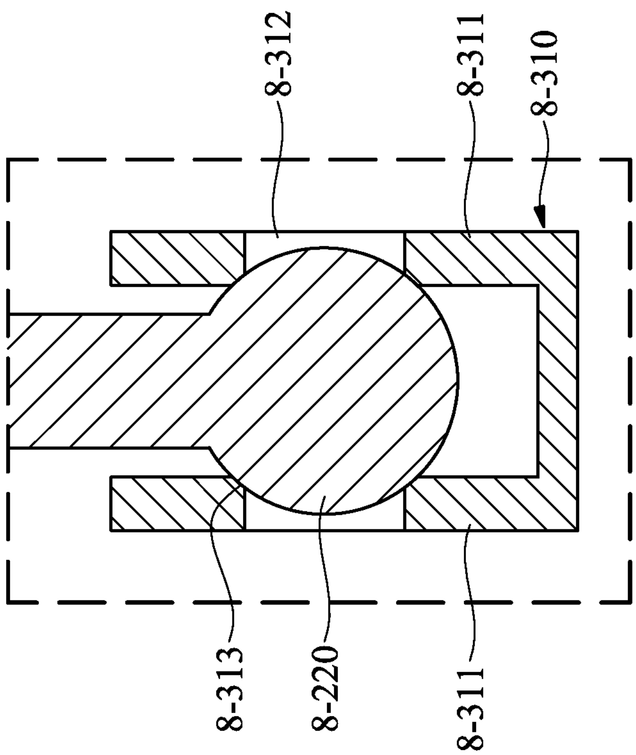
FIG. 93 is a cross-sectional view along the line 8-B-8-B in FIG. 92.

Referring to FIGS. 92 and 93, the second movable portion 8-300 can be an optical member holder, and the optical member 8-30 can be disposed on the second movable portion 8-300. The second movable portion 8-300 has two second engaging portions 8-310 arranged along the second axis 8-AX2. Each of the second engaging portions 8-310 has two plates 8-311, and each of the plates 8-311 has a through hole 8-312. The distance between two plates 8-311 is less than the diameter of the second supporting portion 8-220, and the diameter of the through hole 8-312 is less than the diameter of the second supporting portion 8-220. When the second movable portion 8-300 is connected to the first movable portion 8-200, the second supporting portion 8-220 is disposed in the second engaging portion 8-310, and the second supporting portion 8-220 is clamped by two plates 8-311 and enters the through holes 8-312. Therefore, the second movable portion 8-300 can be pivotally connected to the first movable portion 8-200 through the second supporting portion 8-220 and the second engaging portion 8-310. The second movable portion 8-300 can rotate around the second axis 8-AX2 relative to the first movable portion 8-200.

In this embodiment, the first movable portion 8-200 is made of metal, and the portion of the through hole 8-312 contacting the second supporting portion 8-220 has a chamfer or a fillet, so as to reduce the debris caused by the friction between the second supporting portion 8-220 and the second engaging portion 8-310 during the rotation of the second supporting portion 8-220.

It should be noted that, since the first movable portion 8-200 can rotate around the first axis 8-AX1 relative to the fixed portion 8-100, when the first movable portion 8-200 rotates, the second axis 8-AX2 rotates around the first axis 8-AX1 simultaneously. Thus, the second axis 8-AX2 can rotate to the position where is not perpendicular or parallel to the outgoing direction 8-D2.

Furthermore, the outer surface and the bottom surface of the second movable portion 8-300 respectively include a plurality of depressions 8-330 and a recess 8-340. When the first movable portion 8-200 is joined to the second movable portion 8-300, at least a portion of the first movable portion 8-200 (such as one of the connecting portion s 8-230) is accommodated in the recess 8-340.

Referring to FIG. 87, the driving assembly 8-400 includes at least one first electromagnetic driving member 8-410, at least one second electromagnetic driving member 8-420, a circuit board 8-430, and at least one position sensor 8-440.

The circuit board 8-430 is affixed to the fixed portion 8-100 and clamped between the base 8-110 and the case 8-130. The first electromagnetic driving member 8-410 is disposed on the circuit board 8-430 and passes through the openings 8-111 of the base 8-110. The second electromagnetic driving member 8-420 is dispose on the second movable portion and accommodated in the depressions 8-330. The first electromagnetic driving member 8-410 corresponds to the second electromagnetic driving member 8-420.

In this embodiment, the first electromagnetic driving member 8-410 is a coil, and the second electromagnetic driving member 8-420 is a magnet. When a current flows through the first electromagnetic driving member 8-410, an electromagnetic effect is generated between the first electromagnetic driving member 8-410 and the second electromagnetic driving member 8-420, and a driving force can be applied on the second movable portion 8-300.

As shown in FIG. 87, since the driving mechanism 8-400 includes a plurality of first electromagnetic driving members 8-410 and a plurality of second electromagnetic driving members 8-420, and the first electromagnetic driving members 8-410 and the second electromagnetic driving members 8-420 are disposed at the left side, the right side, and the back side of the second movable portion 8-300, the driving forces in different direction can be applied on the second movable portion 8-300. Moreover, since the first movable portion 8-200 can rotate around the first axis 8-AX1 relative to the fixed portion 8-100, and the second movable portion 8-300 can around the second axis 8-AX2 relative to the first movable portion 8-200, the driving assembly 8-400 can drive the second movable portion 8-300 and the optical member 8-30 disposed thereon to rotate around a rotation axis 8-R1 and/or a rotation axis 8-R2 by providing suitable driving forces. The rotation axes 8-R1 and 8-R2 are parallel or perpendicular to the outgoing direction 8-D2 of the light 8-L, so as that the light emitting to the object can horizontally shift.

The position sensor 8-440 is disposed on the circuit board 8-430 and corresponds to the second electromagnetic driving member 8-420. The position sensor 8-440 is configured to detect the position of the second electromagnetic driving member 8-420, so as to obtain the rotation angle of the second movable portion 8-300 relative to the fixed portion 8-100.

For example, the position sensors 8-440 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

In summary, an optical member driving mechanism is provided. The optical member driving mechanism is configured to hold an optical member and drive the optical member to move. The optical member driving mechanism includes a first movable portion, a fixed portion, and a driving assembly. The first movable portion is movable relative to the fixed portion. The driving assembly is configured to drive the first movable portion to move relative to the fixed portion.

Ninth Group of Embodiments

Figure 94:
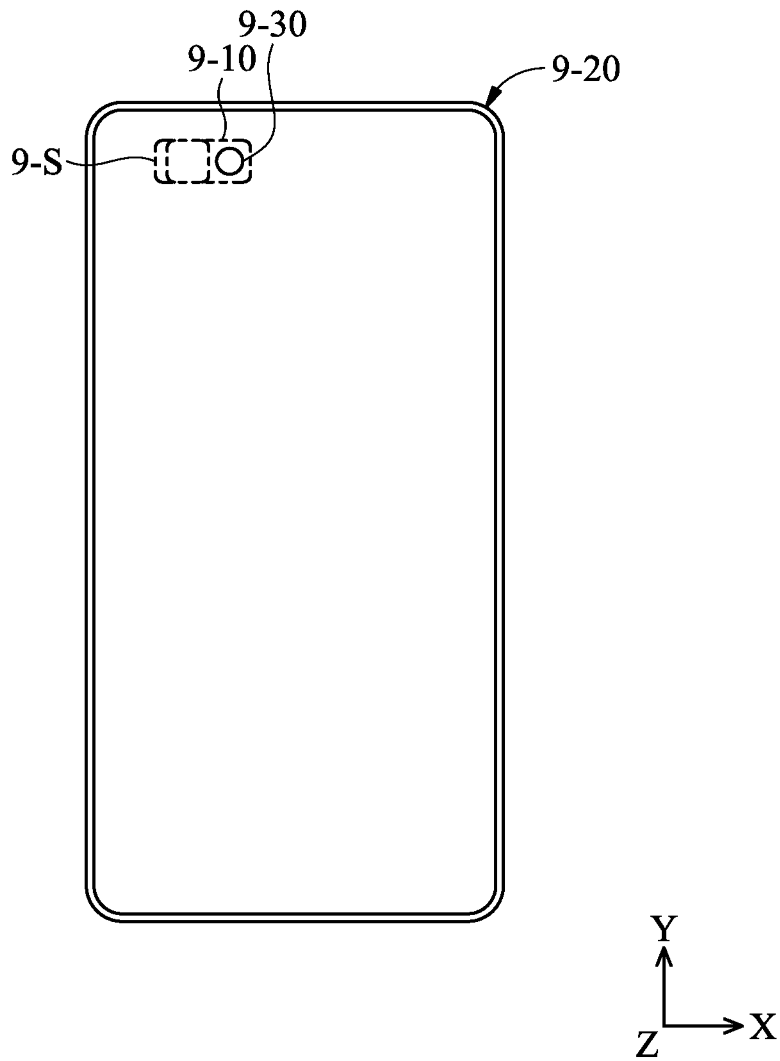
FIG. 94 is a schematic diagram of an electronic device according to an embodiment of the invention.
Figure 95:
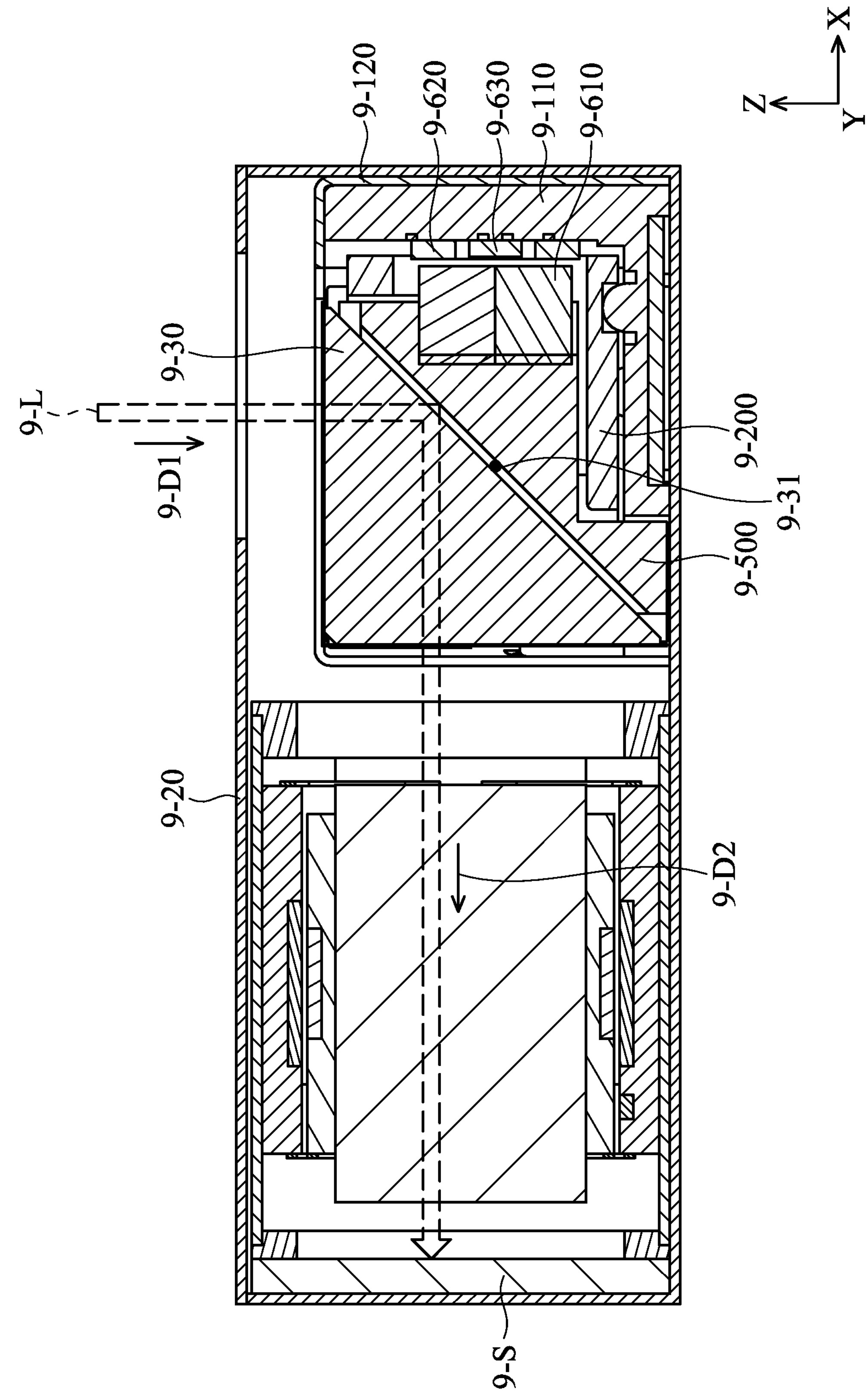
FIG. 95 is a partial cross-sectional view of the electronic device according to an embodiment of the invention.

Referring to FIGS. 94 and 95, in an embodiment of the invention, an optical member driving mechanism 9-10 can be disposed in an electronic device 9-20. The optical member driving mechanism 9-10 is configured to hold an optical member 9-30 and drive the optical member 9-30 to move relative to an image sensor module 9-S in the electronic device 9-20, so as to achieve the purpose of focus adjustment. For example, the electronic device 9-20 can be a digital camera or a smart phone having the function of capturing photographs or making video recordings, and the optical member 9-30 can be a prism or a mirror. When capturing photographs or making video recordings, a light 9-L enters the optical member driving mechanism 9-10 along an incident direction 9-D1, and moves along an outgoing direction 9-D2 to reach the image sensor module 9-S after reflected by the optical member 9-30.

Figure 96:
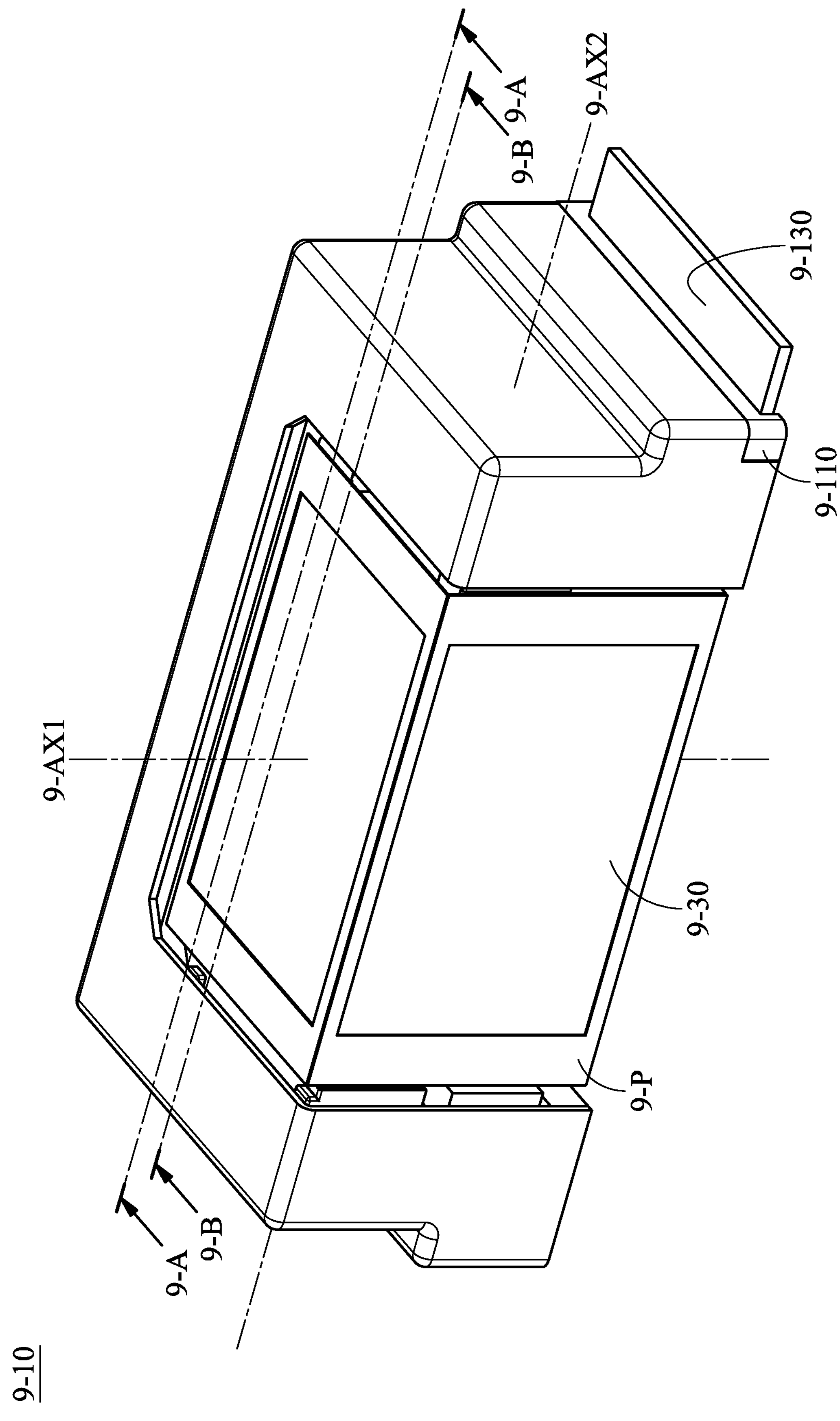
FIG. 96 is a schematic diagram of an optical member driving mechanism according to an embodiment of the invention.
Figure 97:
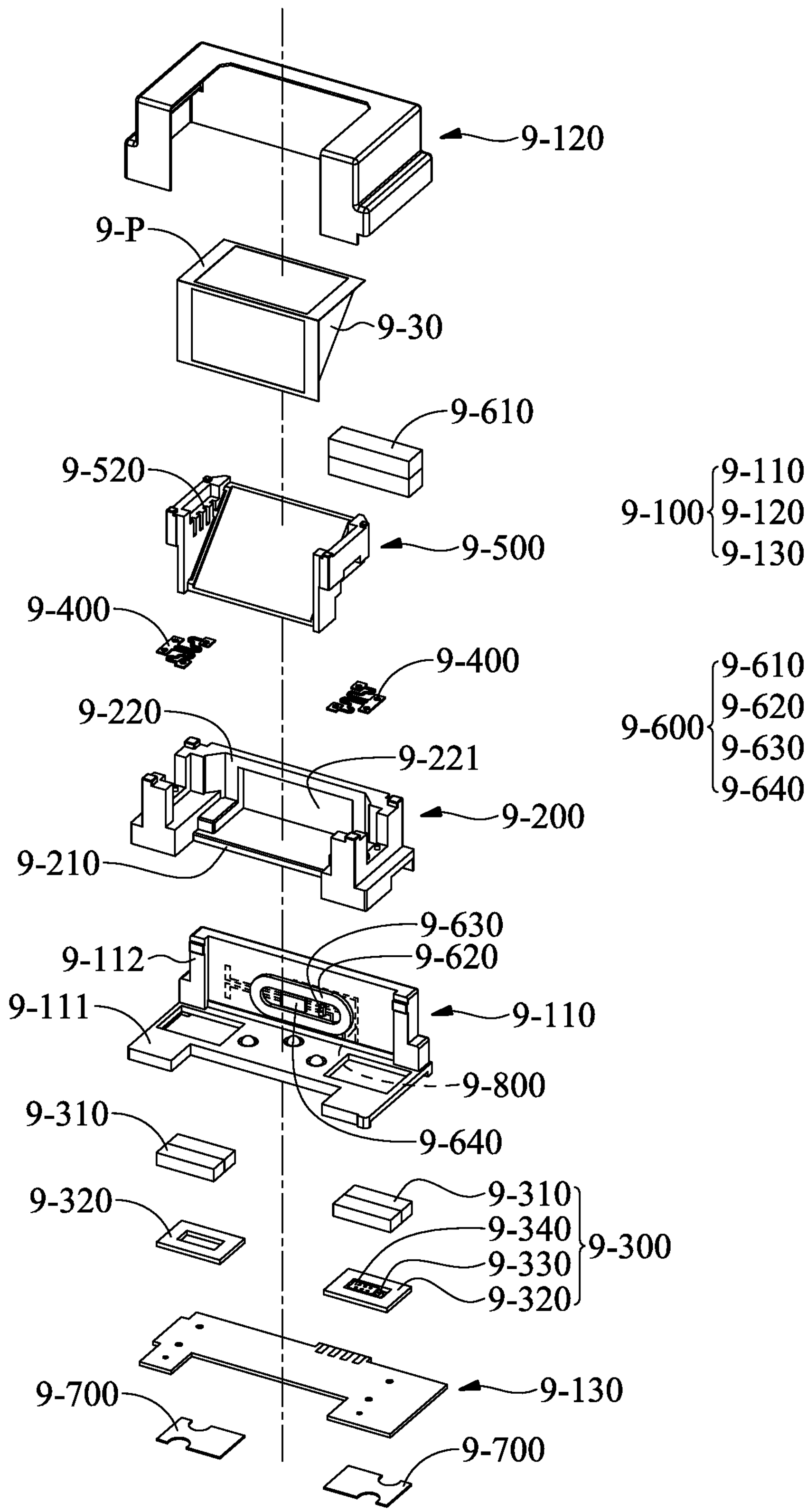
FIG. 97 is an exploded-view diagram of the optical member driving mechanism according to an embodiment of the invention.
Figure 98:
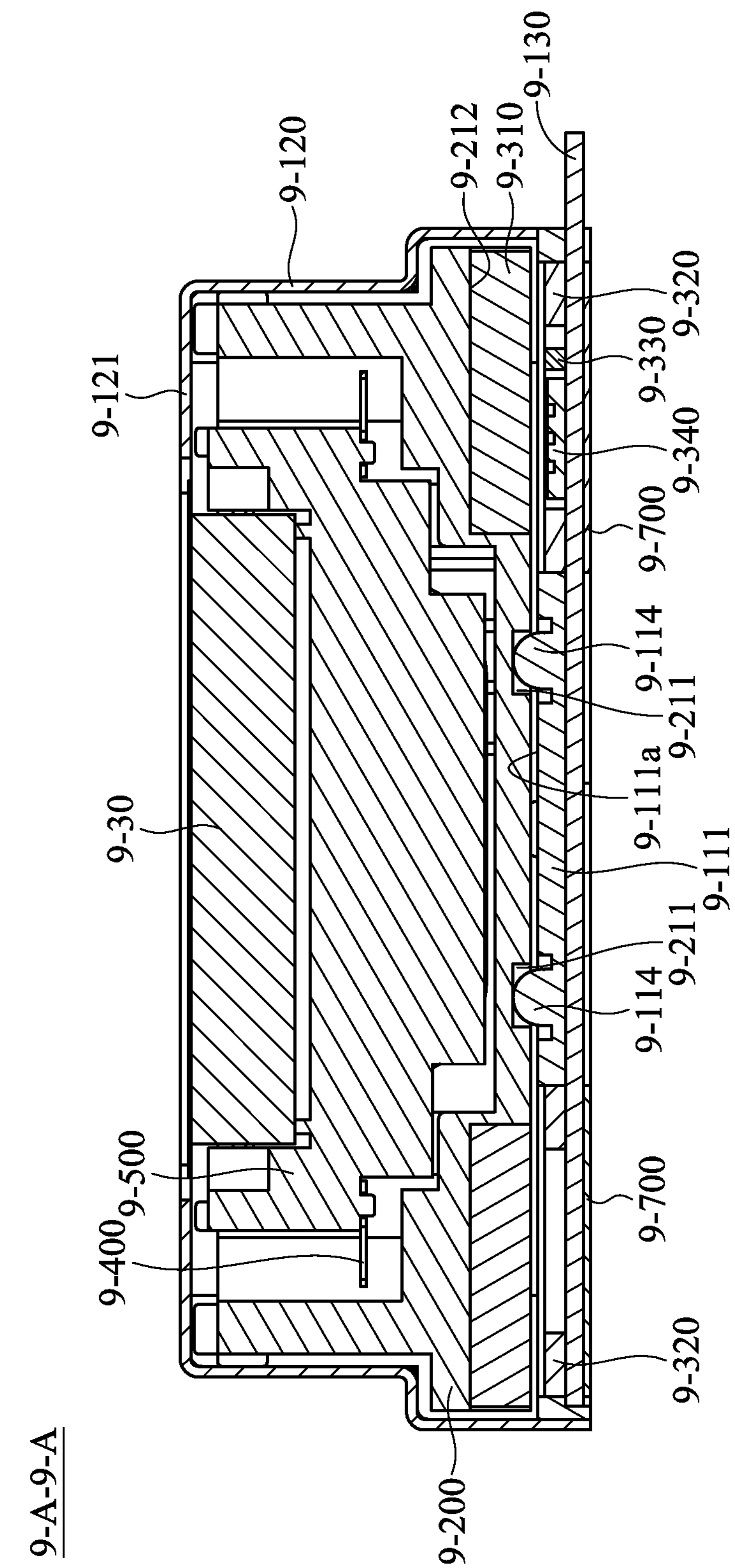
FIG. 98 is a cross-sectional view along the line 9-A-9-A in FIG. 96.

FIG. 96 is a schematic diagram of the optical member driving mechanism 9-10, FIG. 97 is an exploded-view diagram of the optical member driving mechanism 9-10, and FIG. 98 is a cross-sectional view along the line 9-A-9-A. As shown in FIGS. 96-98, the optical member driving mechanism 9-10 primarily includes a fixed portion 9-100, a first movable portion 9-200, a first driving assembly 9-300, at least one elastic member 9-400, a second movable portion 9-500, a second driving assembly 9-600, and at least one magnetic permeability member 9-700.

The fixed portion 9-100 includes a base 9-110, a housing 9-120, and a circuit board 9-130, wherein the base 9-110 and the housing 9-120 can be assembled using snap-fit joints or adhesive member. The base 9-110 has a bottom 9-111 and a back 9-112, and the back 9-112 is substantially perpendicular to the bottom 9-111. The circuit board 9-130 is disposed on the bottom 9-111, and the housing 9-120 and the circuit board 9-130 are disposed on the opposite sides of the bottom 9-111.

Figure 99:
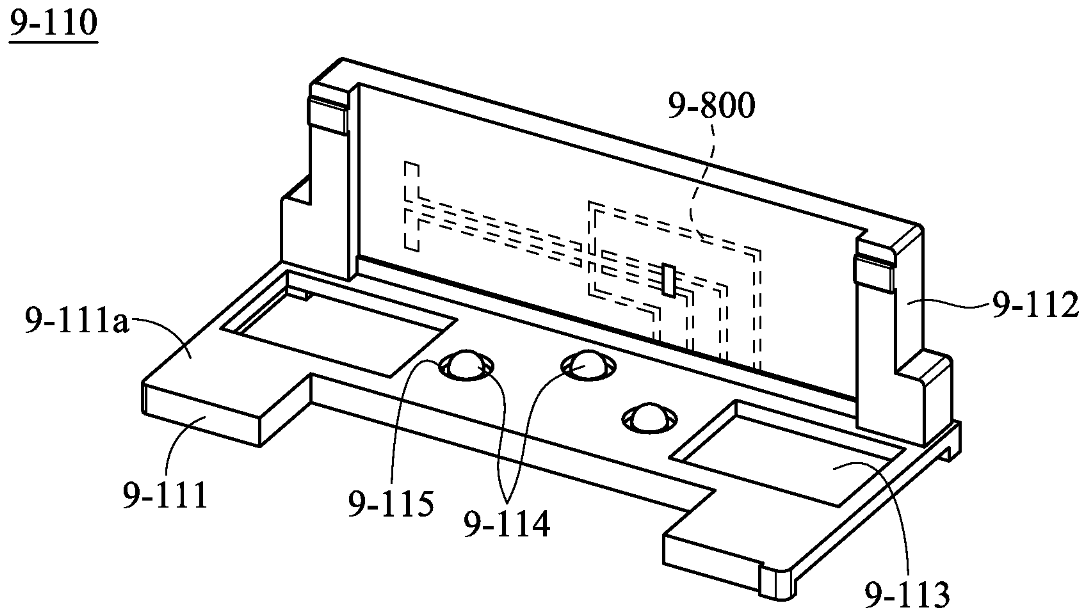
FIG. 99 is a schematic diagram of a base according to an embodiment of the invention.

As shown in FIG. 99, in this embodiment, at least one through hole 9-113 and at least one first guiding member 9-114 are formed on the bottom 9-111 of the base 9-110. The circuit board -130 is exposed from the through hole. The first guiding member 9-114 protrudes from a surface 9-111*a* of the bottom 9-111 facing the first movable portion 9-200. For example, the first guiding member 9-114 is a pillar, and the portion of the pillar protruding from the bottom 9-111 has a ball structure.

Furthermore, in this embodiment, at least one receiving recess 9-115 surrounding the pillar is formed on the surface 9-111*a*, and a plurality of wires 9-800 are embedded in the back 9-112 of the base 9-110. These wires 9-800 can be extended to electrically connect to the circuit board 9-130.

Figure 100:
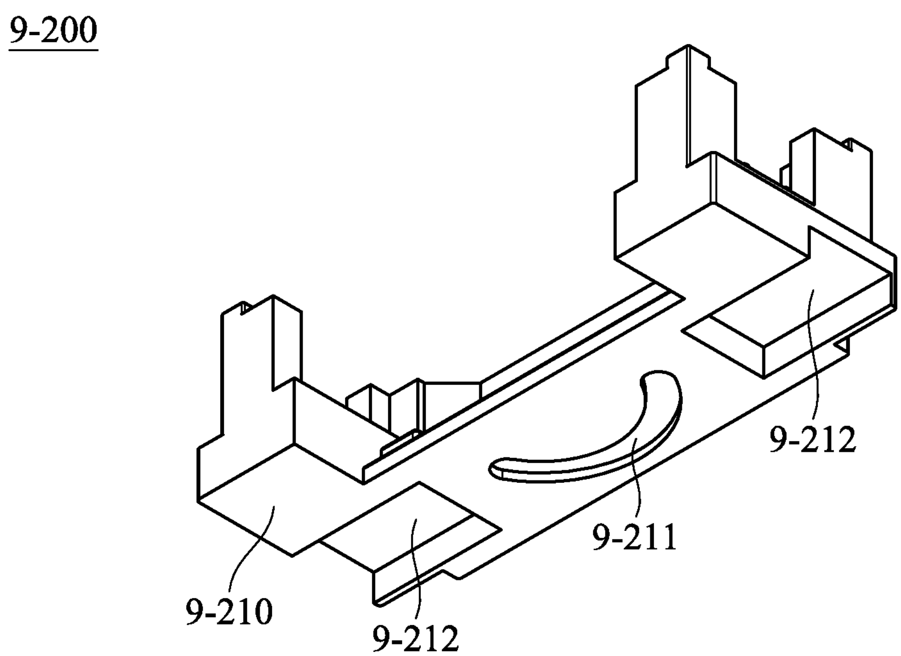
FIG. 100 is a schematic diagram of a first movable portion according to an embodiment of the invention.

The first movable portion 9-200 is a metal frame, and can be divided into a bottom 9-210 and a back 9-220. As shown in FIGS. 98 and 100, a second guiding member 9-211 and at least one accommodating recess 9-212 can be formed on a surface of the bottom 9-210 facing the base 9-110. In this embodiment, the second guiding member 9-211 is a guiding slot having an arc structure. When the first movable portion 9-200 is joined to the base 9-110, the first guiding member 9-114 (the pillar) is movably accommodated in the second guiding member 9-211 (the guiding slot), so as to restrict the direction and range of motion of the first movable portion 9-200. The position of the accommodating recess 9-212 corresponds to the position of the through hole 9-113 of the base 9-110.

Referring to FIGS. 96-98, the first driving assembly 9-300 includes at least one magnet 9-310, at least one coil 9-320, a position sensor 9-330, and a controller 9-340. The magnet 9-310 is affixed to the first movable portion 9-200 and accommodated in the accommodating recess 9-212. The coil 9-320, the position sensor 9-330 and the controller 9-340 are disposed on the circuit board 9-130 and accommodated in the through hole 9-113. Since the position of the accommodating recess 9-212 corresponds to the position of the through hole 9-113 of the base 9-110, the position of the magnet 9-310 corresponds to the position of the coil 9-320. When a current flows through the coil 9-320, an electromagnetic effect is generated between the magnet 9-310 and the coil 9-320, and the first movable portion 9-200 is driven to move relative to the fixed portion 9-100.

Since the pillar of the fixed portion 9-100 is movably disposed in the guiding slot of the first movable portion 9-200, when the first driving assembly 9-300 drives the first movable portion 9-200 to move relative to the fixed portion 9-100, the pillar slides along the guiding slot, and the first movable portion 9-200 rotates around a first rotation axis 9-AX1 (the Z-axis) relative to the fixed portion 9-100. In this embodiment, the first rotation axis 9-AX1 passes through the center of the guiding slot.

Since the first movable portion 9-200 and the base 9-110 are made of metal, and the first guiding member 9-114 has a ball structure, the debris caused by the friction between the first guiding member 9-114 and the second guiding member 9-211 can be reduced. In this embodiment, a lubricant can be coated on the first guiding member 9-114, so that the first movable portion can move more smoothly. Since the receiving recess 9-115 is formed around the first guiding member 9-114, the redundant lubricant can flow into the receiving recess 9-115 and will not cause a short circuit.

Furthermore, the magnetic permeability member 9-700 is disposed on the circuit board 9-130 and corresponded to the magnet 9-310 of the fixed portion 9-100. Therefore, the first movable portion 9-200 can tightly abut against the base 9-110 according to the magnetic attraction force between the magnetic permeability member 9-700 and the magnet 9-310. The separation between the first movable portion 9-200 and the base 9-110 can be avoided.

The position sensor 9-330 is electrically connected to the controller 9-340, and the controller 9-340 is electrically connected to the coil 9-320. The position sensor 9-330 is configured to detect the position of the magnet 9-310, so as to obtain the rotation angle of the first movable portion 9-200 relative to the base 9-110. The controller 9-340 can determine the strength of the current providing to the coil 9-320 according to the detection result of the position sensor 9-330.

For example, the position sensor 9-330 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, and the controller 9-340 can be a driver IC.

Figure 101:
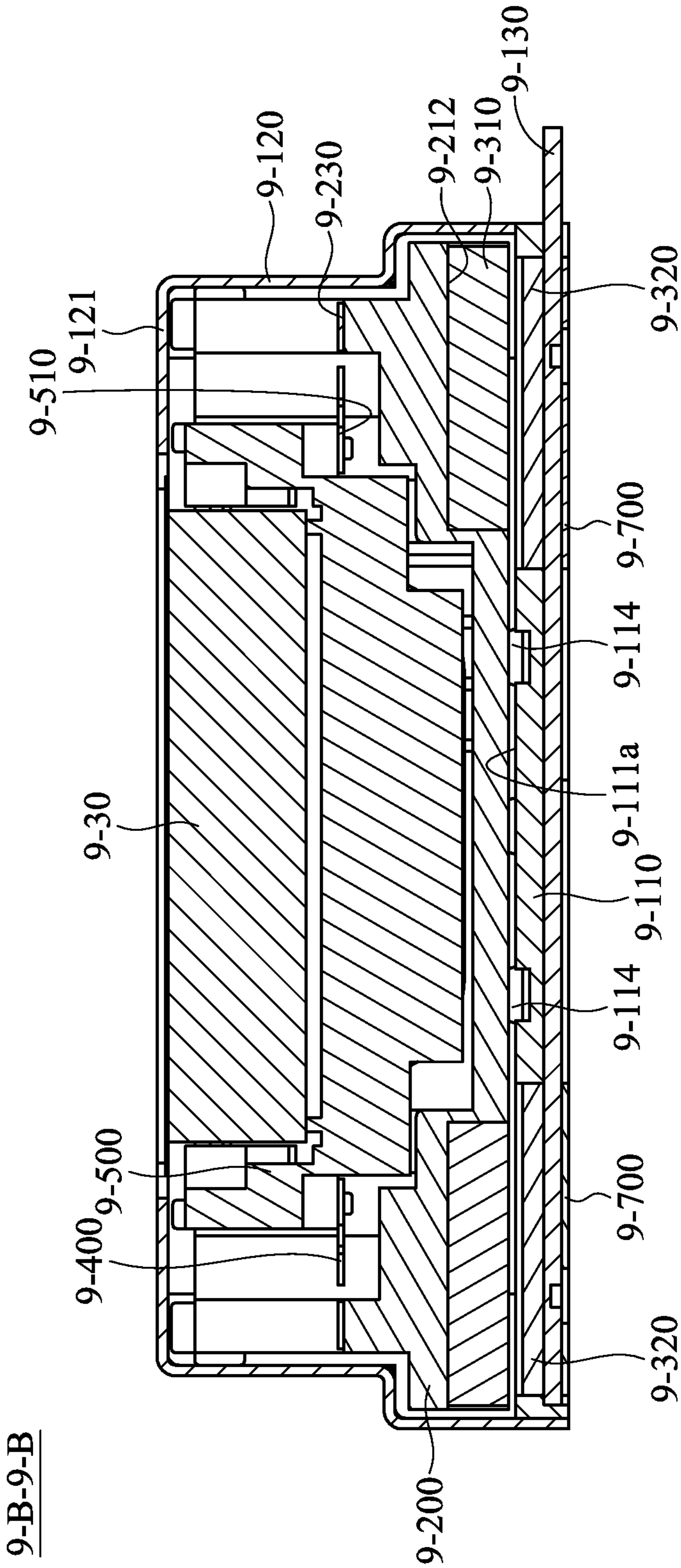
FIG. 101 is a cross-sectional view along the line 9-B-9-B in FIG. 96.
Figure 102:
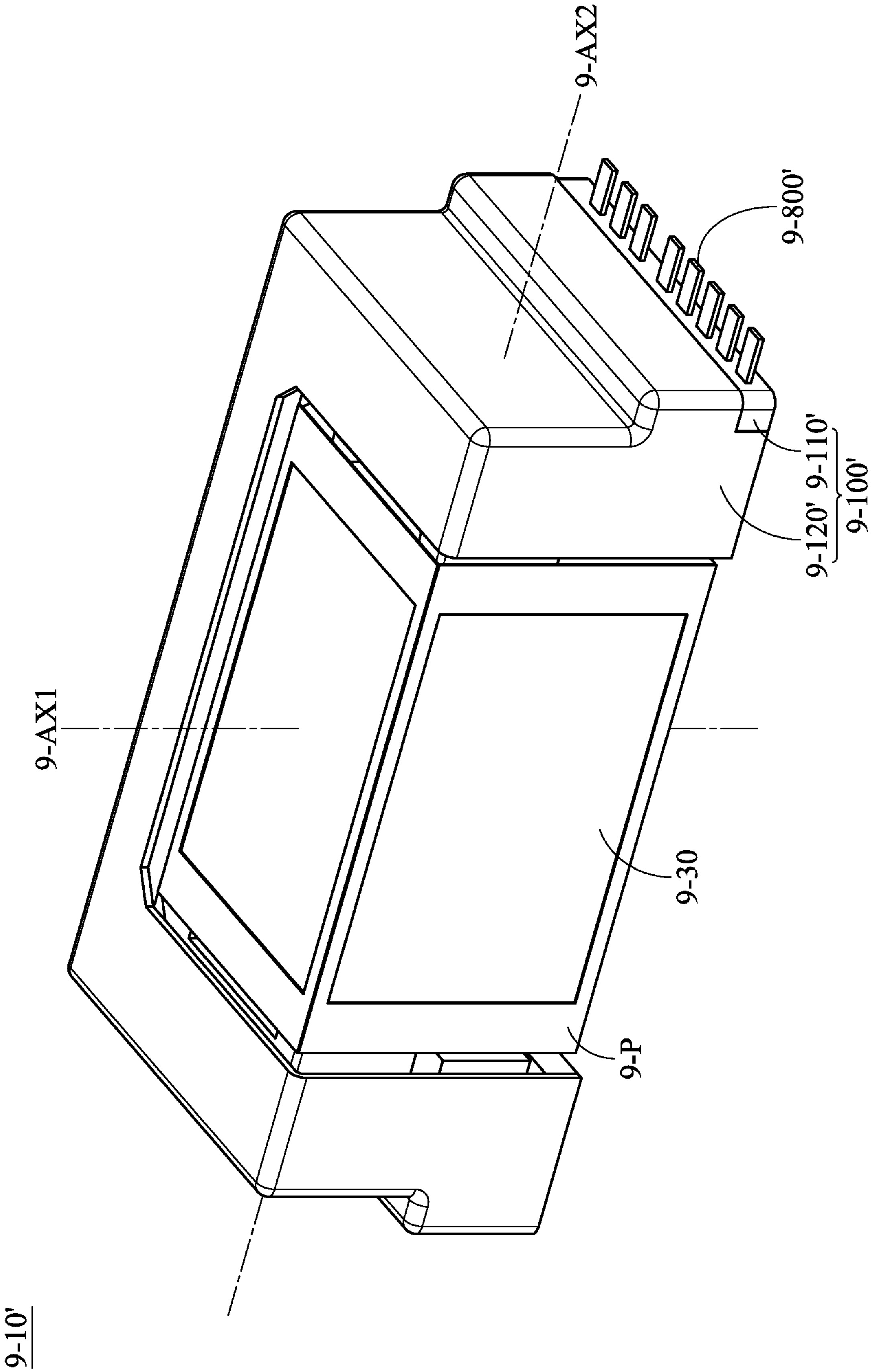
FIG. 102 is a schematic diagram of an optical member driving mechanism according to another embodiment of the invention.
Figure 103:
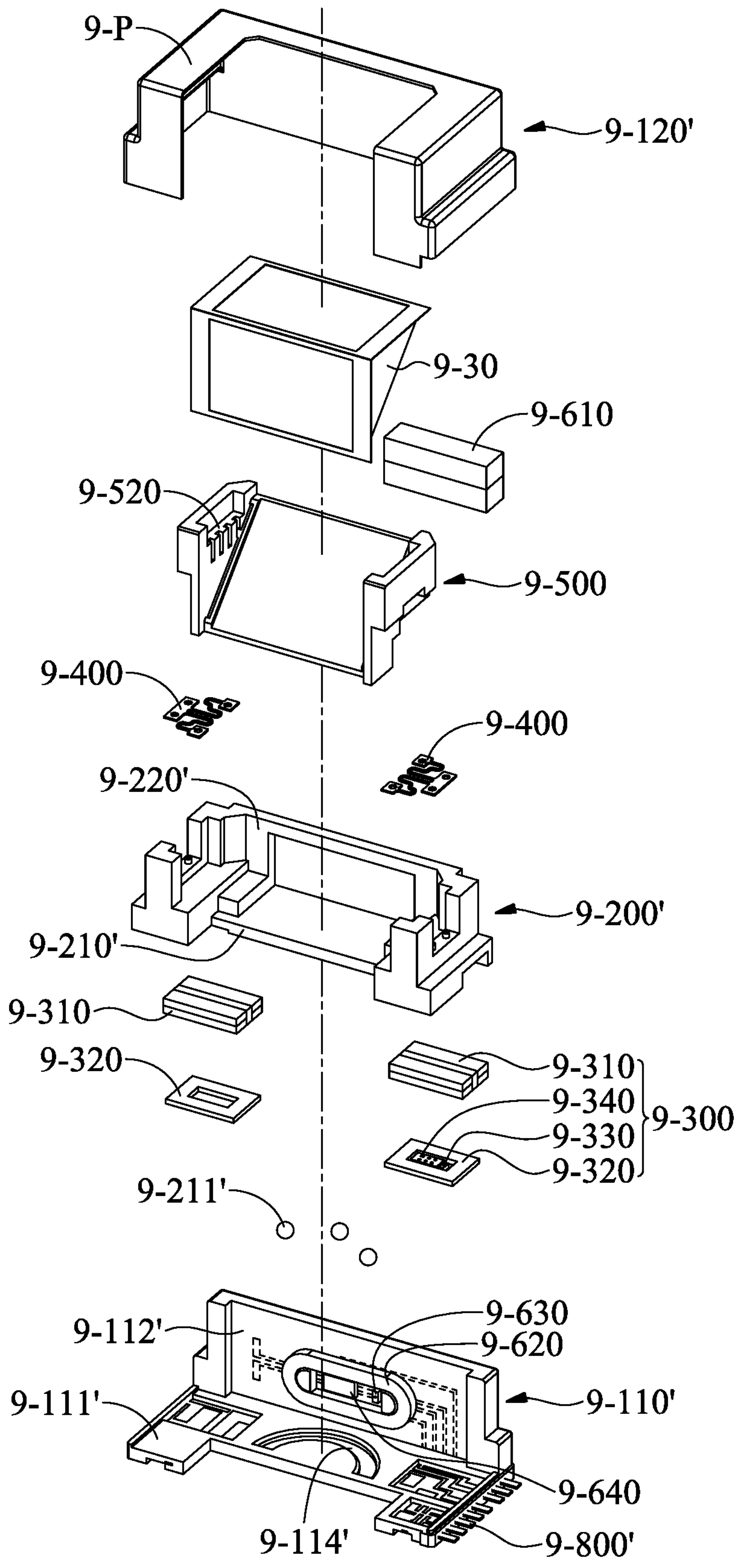
FIG. 103 is a exploded-view diagram of the optical member driving mechanism according to another embodiment of the invention.

The second movable portion 9-500 can be an optical member holder, and it can be suspended on the first movable portion 9-200 via the elastic member 9-400. As shown in FIG. 101, the first movable portion 9-200 has an upper surface 9-230, and the second movable portion 9-500 has a lower surface 9-510. The upper surface 9-230 faces the top wall 9-121 of the housing 9-120, and the lower surface 9-510 faces the base 9-110. The elastic member 9-400 connects the upper surface 9-230 to the lower surface 9-510. Thus, the reverse of the second movable portion 9-500 caused by an external force impacting the optical member driving mechanism 9-10 can be avoided.

As shown in FIG. 98, in this embodiment, the distance between the first movable portion 9-200 and the top wall 9-121 of the housing 9-120 is less than the second movable portion 9-500 and the top wall 9-121 of the housing 9-120.

Referring to FIGS. 95-99, the second driving assembly 9-600 includes at least one magnet 9-610, at least one coil 9-620, a position sensor 9-630, and a controller 9-640. The magnet 9-610 is affixed to the second movable portion 9-500. The coil 9-620, the position sensor 9-630 and the controller 9-640 are affixed to the back 9-112 of the base 9-110. The coil 9-620, the position sensor 9-630 and the controller 9-640 are electrically connected to each other, and correspond to the magnet 9-640 through an opening 9-220 of the first movable portion 9-200.

When a current flows through the coil 9-620, an electromagnetic effect is generated between the magnet 9-610 and the coil 9-620, and the second movable portion 9-500 is driven to rotate around a second rotation axis 9-AX2 (the Y-axis) relative to the fixed movable portion 9-200.

The optical member 9-30 is disposed on the second movable portion 9-500. For example, a plurality of slots 9-520 are formed on the inner surface of the second movable portion 9-500, when the optical member 9-30 is disposed on the second movable portion 9-500, the user can pour an adhesive glue into the slots 9-520, so as to affix the optical member 9-30 to the second movable portion 9-500 at its lateral surfaces. Furthermore, a shield member 9-P (such as a tape or an ink) is disposed on the edge of the optical member 9-30, so as to reduce the stray light.

Since the optical member 9-30 is disposed on the second movable portion 9-500, when the second driving assembly 9-600 drives the second movable portion 9-500 to rotate, the optical member 9-30 is driven simultaneously and rotates around the second rotation axis 9-AX2 relative to the first movable portion 9-200. Moreover, since the second movable portion 9-500 is connected to the first movable portion 9-200 via the elastic member 9-400, when the first driving assembly 9-300 drives the first movable portion 9-200 to rotate, the second movable portion 9-500 and the optical member 9-30 is driven to rotate around the first rotation axis 9-AX1 relative to the fixed portion 9-100 simultaneously.

In this embodiment, the center of the arc structure of the second guiding member 9-211 is aligned with the center 9-31 of the optical member 9-30 as seen from the incident direction 9-D1.

Referring to FIGS. 102-105, in another embodiment, the optical member driving mechanism 9-10' includes a fixed portion 9-100', a first fixed portion 9-200', a first driving assembly 9-300, at least one elastic member 9-400, a second movable portion 9-500, and a second driving assembly 9-600. The structures and the connecting relationships of the first driving assembly 9-300, the elastic member 9-400, the second movable portion 9-500, and the second driving assembly 9-600 in this embodiment are the same as that in the aforementioned embodiment, so that the features thereof are not repeated in the interest of brevity.

The fixed portion 9-100' includes a base 9-110' and a housing 9-120'. The base 9-110' has a bottom 9-111' and a back 9-112', and the back 9-112' is substantially perpendicular to the bottom 9-111'. The difference between this embodiment and the aforementioned embodiment is in that the wires 9-800' are not only embedded in the back 9-112', but also embedded in the bottom 9-111'. The first guiding member 9-114' on the bottom 9-111' is a guiding slot having an arc structure. The center of the arc structure is aligned with the center 9-31 of the optical member 9-30 as seen from the incident direction 9-D1.

The wires 9-800' are magnetic, and at least a portion of the wires 9-800' embedded in the base 9-111' corresponds to the magnet 9-310 of the first driving assembly 9-300. Therefore, the first movable portion 9-200' can tightly abut against the base 9-110' according to the magnetic attraction force between the wires 9-800' and the magnet 9-310. The separation between the first movable portion 9-200' and the base 9-110' can be avoided.

The first movable portion 9-200' is a metal frame, and can be divided into a bottom 9-210' and a back 9-220'. The second guiding member 9-211' disposed on the bottom 9-210' is a ball, and at least one depression 9-240' can be formed on the bottom 9-210' to accommodate the ball. When the first movable portion 9-200' and the base 9-110' are joined, the ball is movably accommodated in the guiding slot. Therefore, when the first driving assembly 9-300 drives the first movable portion 9-200' to move relative to the fixed portion 9-100' the ball rolls along the guiding slot, and the first movable portion 9-200' rotates around the first rotation axis 9-AX1 (the Z-axis) relative to the fixed portion 9-100'.

Figure 104:
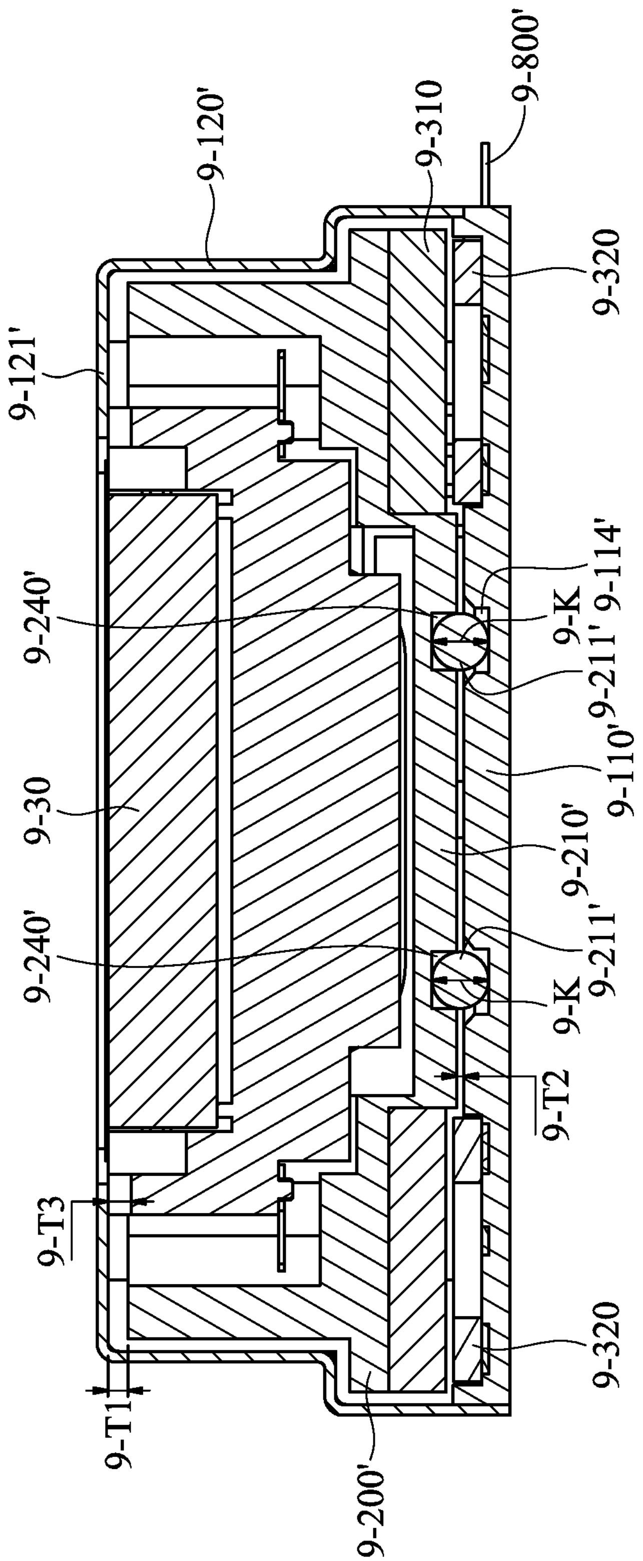
FIG. 104 is a cross-sectional view of the optical member driving mechanism according to another embodiment of the invention.
Figure 105:
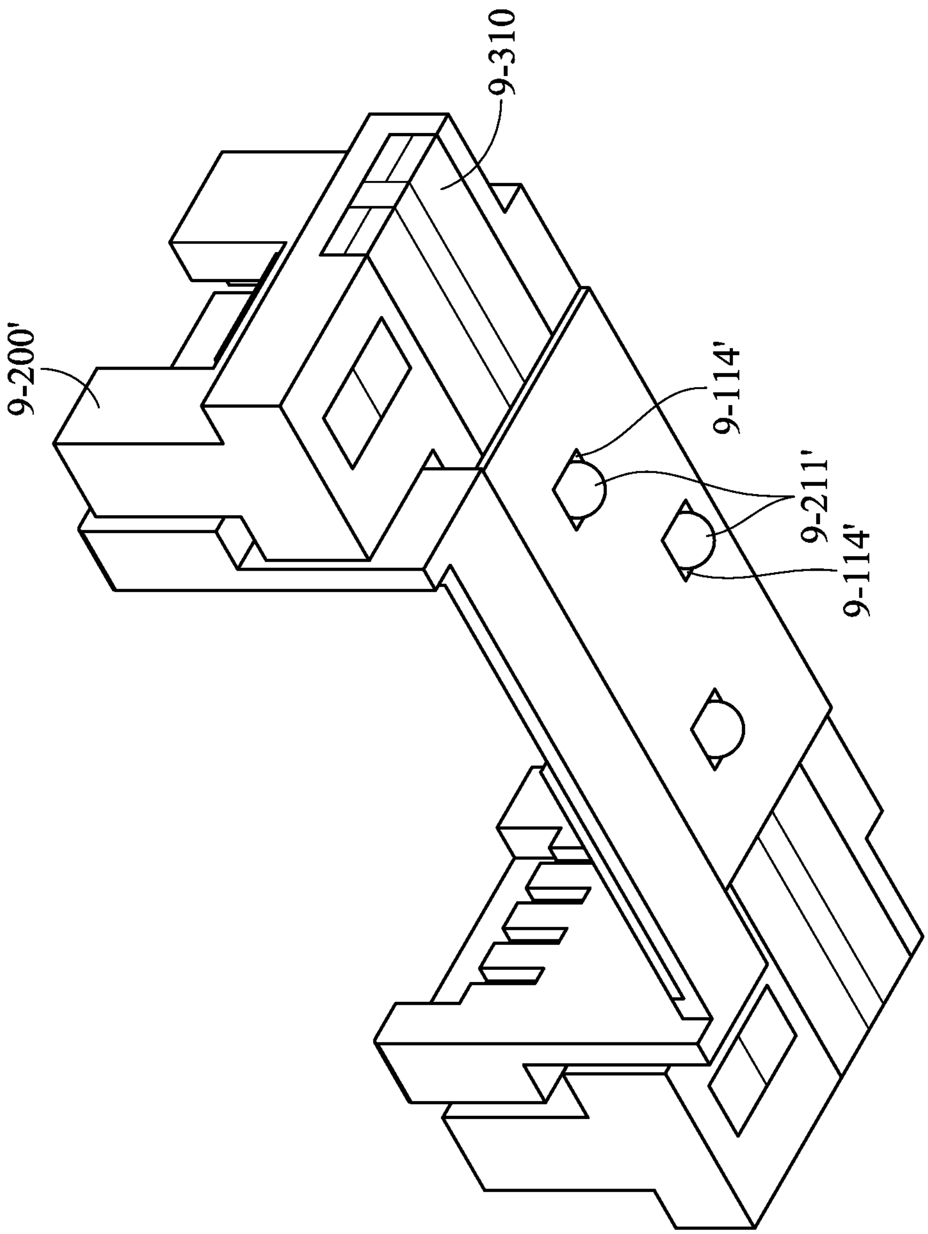
FIG. 105 is a schematic diagram of a second guiding member accommodated in a depression according to another embodiment of the invention.

It should be noted that, as shown in FIG. 104, in this embodiment, in the incident direction 9-D1, the shortest distance between the first movable portion 9-200' and the top wall 9-121' of the housing 9-120' is a first distance 9-T1, the shortest distance between the first movable portion 9-200' and the base 9-110' is a second distance 9-T2, and the second guiding member 9-211' has a thickness 9-K. The thickness 9-K is greater than the sum of the first distance 9-T1 and the second distance 9-T2, so as to prevent the ball (the second guiding member 9-211') separating from the guiding slot (the first guiding member 9-114'), which may be happened when an external force impacts the optical member driving mechanism 9-10' and a greater gap is formed between the first movable portion 9-200' and the base 9-110'. Furthermore, in the incident direction 9-D1, the shortest distance between the second movable portion 9-200' and the top wall 9-121' is a third distance 9-T3, and the first distance 9-T1 is less than the third distance 9-T3.

In summary, an optical member driving mechanism is provided, including a first movable portion, a fixed portion, and a first driving assembly. The first movable portion is connected to an optical member. The first movable portion is movable relative to the fixed portion. The first driving assembly is configured to drive the first movable portion to move relative to the fixed portion.

Tenth Group of Embodiments

Figure 106:
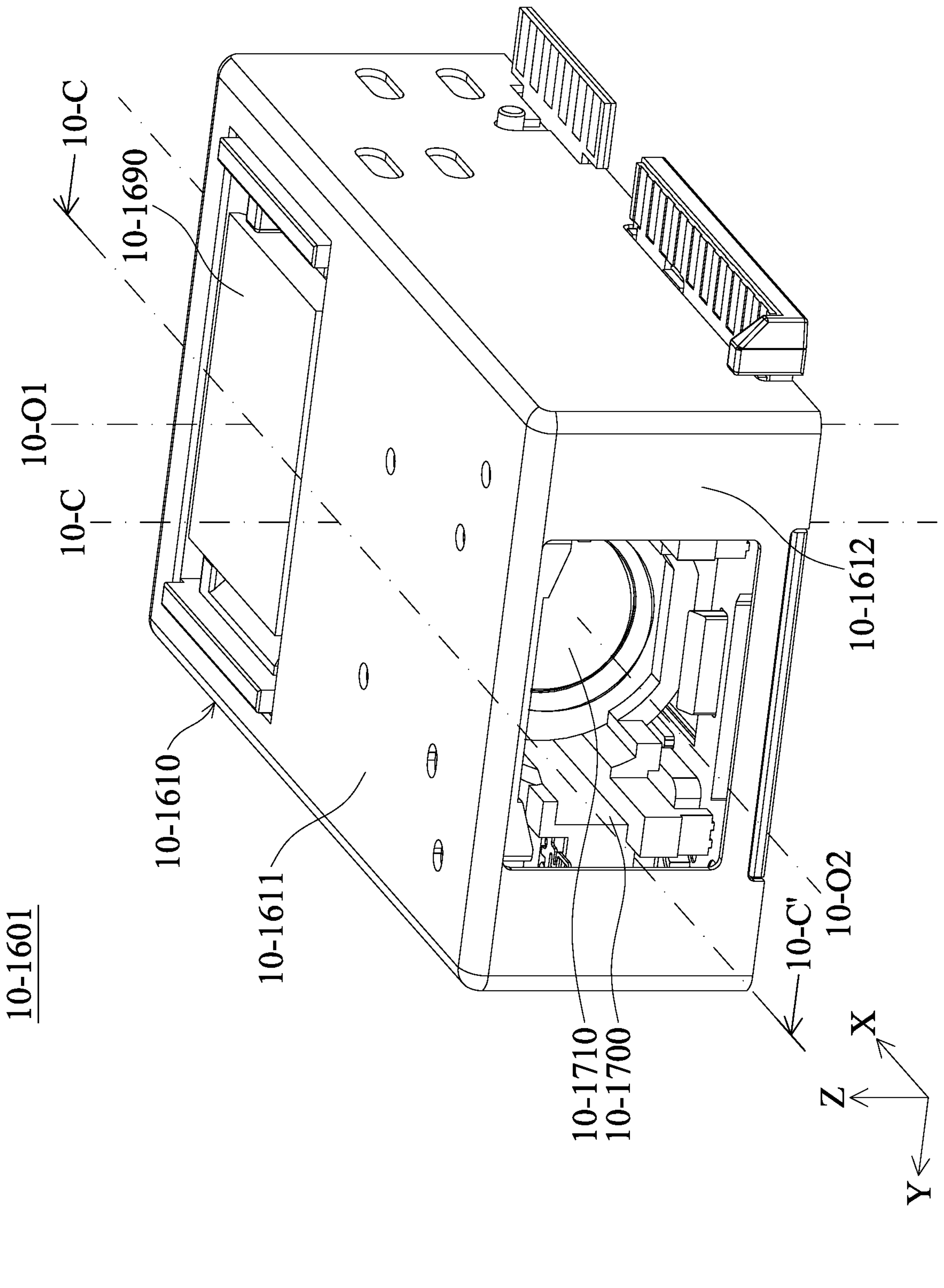
FIG. 106 is a perspective view illustrating an optical member driving mechanism in accordance with an embodiment of the present disclosure.

FIG. 106 is a schematic perspective view illustrating an optical member driving mechanism 10-1601 in accordance with an embodiment of the present disclosure. It should be noted that, in this embodiment, the optical member driving mechanism 10-1601 may be, for example, disposed in the electronic devices with camera function for driving an optical member 10-1690, and can perform an autofocus (AF) and/or optical image stabilization (OIS) function.

As shown in FIG. 106, the optical member driving mechanism 10-1601 has a central axis 10-C that is substantially parallel to the Z axis. The optical member driving mechanism 10-1601 has an incident optical axis 10-O1 and an output optical axis 10-O2. After the light enters the optical member 10-1690 along the incident optical axis 10-O1, the direction of the light may be changed and the light may travel in the output optical axis 10-O2. In the present embodiment, the incident optical axis 10-O1 is substantially parallel to the central axis 10-C (the Z axis), and the output optical axis 10-O2 is substantially parallel to the X axis. The optical member driving mechanism 10-1601 includes a housing 10-1610 which has a top surface 10-1611 and a first side surface 10-1612. The top surface 10-1611 extends in a direction that is parallel to the output optical axis 10-O2 (i.e. the X-Y plane). The first side surface 10-1612 extends from an edge of the top surface 10-1611 along a direction (the Z axis) that is parallel to the incident optical axis 10-O1. In some embodiments, the first side surface 10-1612 extends from the edge of the top surface 10-1611 along a direction that is not parallel to the incident optical axis 10-O1.

The optical member driving mechanism 10-1601 further includes a lens driving assembly 10-1700 that is disposed in the housing 10-1610 of the optical member driving mechanism 10-1601. The lens driving assembly 10-1700 may carry a lens 10-1710 that corresponds to the optical member 10-1690. The lens 10-1710 may perform an optical treatment to the light entering the optical member driving mechanism 10-1601, wherein the light passes through the lens 10-1710 of the lens driving assembly 10-1700 in the output optical axis 10-O2 that is substantially parallel to the X axis. In some embodiments, the light passing the optical member 10-1690 may passes through the lens 10-1710 in the output optical axis 10-O2.

In the present embodiment, the output optical axis 10-O2 is substantially perpendicular to the incident optical axis 10-O1, but it is not limited thereto. In some embodiments, the output optical axis 10-O2 is not parallel to the incident optical axis 10-O1. In conclusion, the optical member 10-1690 may change the direction of the light, such that after the light enters the optical member driving mechanism 10-1601 along the incident optical axis 10-O1, it may exit the optical member driving mechanism 10-1601 along the output optical axis 10-O2. After the light exits the optical member driving mechanism 10-1601, it may travel to an image sensor (not shown) that is disposed out of the optical member driving mechanism 10-1601, and thereby an image may be generated on the electronic device.

Figure 107:
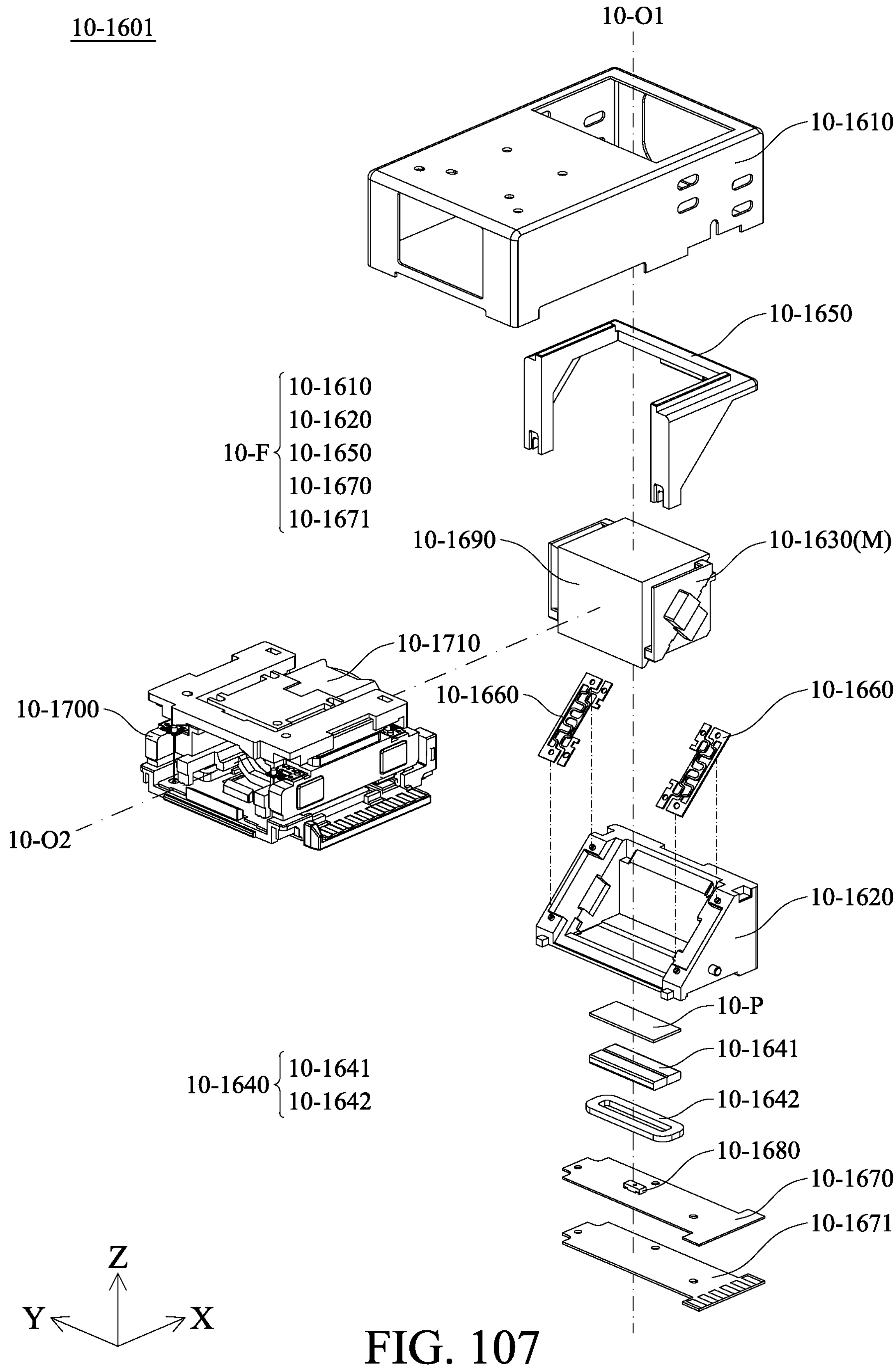
FIG. 107 is an exploded view illustrating the optical member driving mechanism shown in FIG. 106.

FIG. 107 is an exploded view illustrating the optical member driving mechanism 10-1601 shown in FIG. 106. In the present embodiment, the optical member driving mechanism 10-1601 has a substantial rectangular structure. As shown in FIG. 107, the optical member driving mechanism 10-1601 mainly includes a fixed portion 10-F, a movable portion 10-M, an electromagnetic driving assembly 10-1640, a plurality of elastic members 10-1660, and a lens driving assembly 10-1700. The fixed portion 10-F includes a housing 10-1610, a base 10-1620, a frame 10-1650, a circuit component 10-1670 and a bottom plate 10-1671.

The housing 10-1610 is disposed on the base 10-1620, and protect the elements (such as the movable portion 10-M and the lens driving assembly 10-1700) disposed inside the optical member driving mechanism 10-1601 (i.e. disposed in the housing 10-1610). In some embodiments, the housing 10-1610 is made of metal or another material with sufficient hardness to provide good protection. The frame 10-1650 is disposed on the base 10-1620 and affixed to the housing 10-1610. The circuit component 10-1670 is disposed below the base 10-1620 for transmitting electric signals, performing the autofocus (AF) and/or optical image stabilization (OIS) function. For example, the optical member driving mechanism 10-1601 may control the position of the optical member 10-1690 based on the aforementioned electric signals so as to form an image. In the present embodiment, the bottom plate 10-1671 is disposed below the circuit component 10-1670, protecting the circuit component 10-1670 and enhancing the structural strength of the circuit component 10-1670. In other words, the base 10-1620 is disposed between the frame 10-1650 and the circuit component 10-1670, and the circuit component 10-1670 is disposed between the base 10-1620 and the bottom plate 10-1671.

The movable portion 10-M is movable relative to the fixed portion 10-F. The movable portion 10-M mainly includes a carrier 10-1630 which carries the optical member 10-1690. As shown in FIG. 107, the carrier 10-1630 is movably connected to the frame 10-1650 and the base 10-1620. The elastic members 10-1660 are disposed on the carrier 10-1630, and are connected to the base 1020 and the carrier 10-1630. For example, the elastic members 10-1660 are made of metal or another suitable elastic material.

The electromagnetic driving assembly 10-1640 includes a magnetic member 10-1641 and a driving coil 10-1642. The magnetic member 10-1641 is disposed below the carrier 10-1630, and the corresponding driving coil 10-1642 is disposed on the circuit component 10-1670. When current is applied to the driving coil 10-1642, an electromagnetic driving force may be generated by the driving coil 10-1642 and the magnetic member 10-1641 (i.e. the electromagnetic driving assembly 10-1640) to drive the carrier 10-1630 and the optical member 10-1690 to move along a horizontal direction (the X-Y plane) relative to the base 10-1620, performing the autofocus (AF) and/or optical image stabilization (OIS) function. In the present embodiment, when viewed along the incident optical axis 10-O1, the carrier 10-1630 overlaps with the magnetic member 10-1641 and the driving coil 10-1642.

In addition, the carrier 10-1630 may be movably suspended between the frame 10-1650 and the base 10-1620 by the electromagnetic driving force of the electromagnetic driving assembly 10-1640, and the force exerted by the elastic members 10-1660. Furthermore, a magnetic permeable plate 10-P is disposed on the magnetic member 10-1641 for concentrating the magnetic field of the magnetic member 10-1641 so that the efficiency of the electromagnetic driving assembly 10-1640 may be improved. In some embodiments, the magnetic permeable plate 10-P may be made of metal or another material with sufficient magnetic permeability.

In the present embodiment, a sensor 10-1680 is disposed on the circuit component 10-1670, and may detect the change of the magnetic field of the magnetic member 10-1641, and the position of the carrier 10-1630 (and the optical member 10-1690) may be determined. For example, when viewed along the incident optical axis 10-O1 (the Z axis), the sensor 10-1680 and the carrier 10-1630 overlap. In some embodiments, the sensor 10-1680 or the magnetic member 10-1641 is disposed on the fixed portion 10-F, and the other of the sensor 10-1680 or the magnetic member 10-1641 is disposed on the movable portion 10-M.

Figure 108:
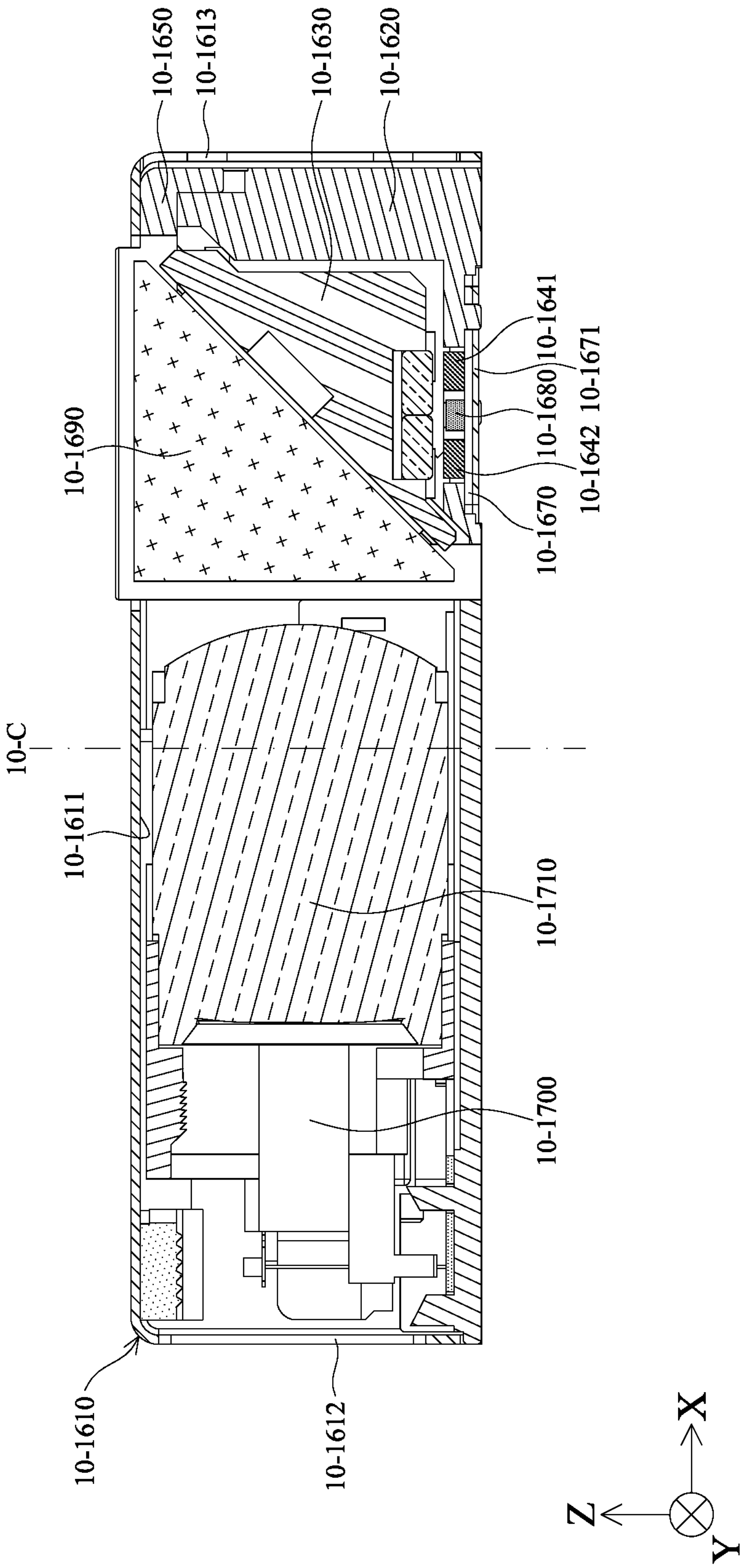
FIG. 108 is a cross-sectional view illustrating along line 10-C-10-C' shown in FIG. 106.

FIG. 108 is a cross-sectional view illustrating along line 10-C-10-C' shown in FIG. 106. As shown in FIG. 108, the optical member driving mechanism 10-1601 has a second side surface 10-1613 that is opposite to the first side surface 10-1612. Since the lens driving assembly 10-1700 is also disposed in the housing 10-1610, the optical member 10-1690 is not located at the center of the optical member driving mechanism 10-1601 (that is, the central axis 10-C does not pass through the optical member 10-1690). In the present embodiment, the shortest distance between the optical member 10-1690 and the second side surface 10-1613 is shorter than the shortest distance between the optical member 10-1690 and the first side surface 10-1612. That is, the optical member 10-1690 is closer to the second side surface 10-1613. In contrary, the lens driving assembly 10-1700 and the lens 10-1710 are closer to the first side surface 10-1612.

Figure 109:
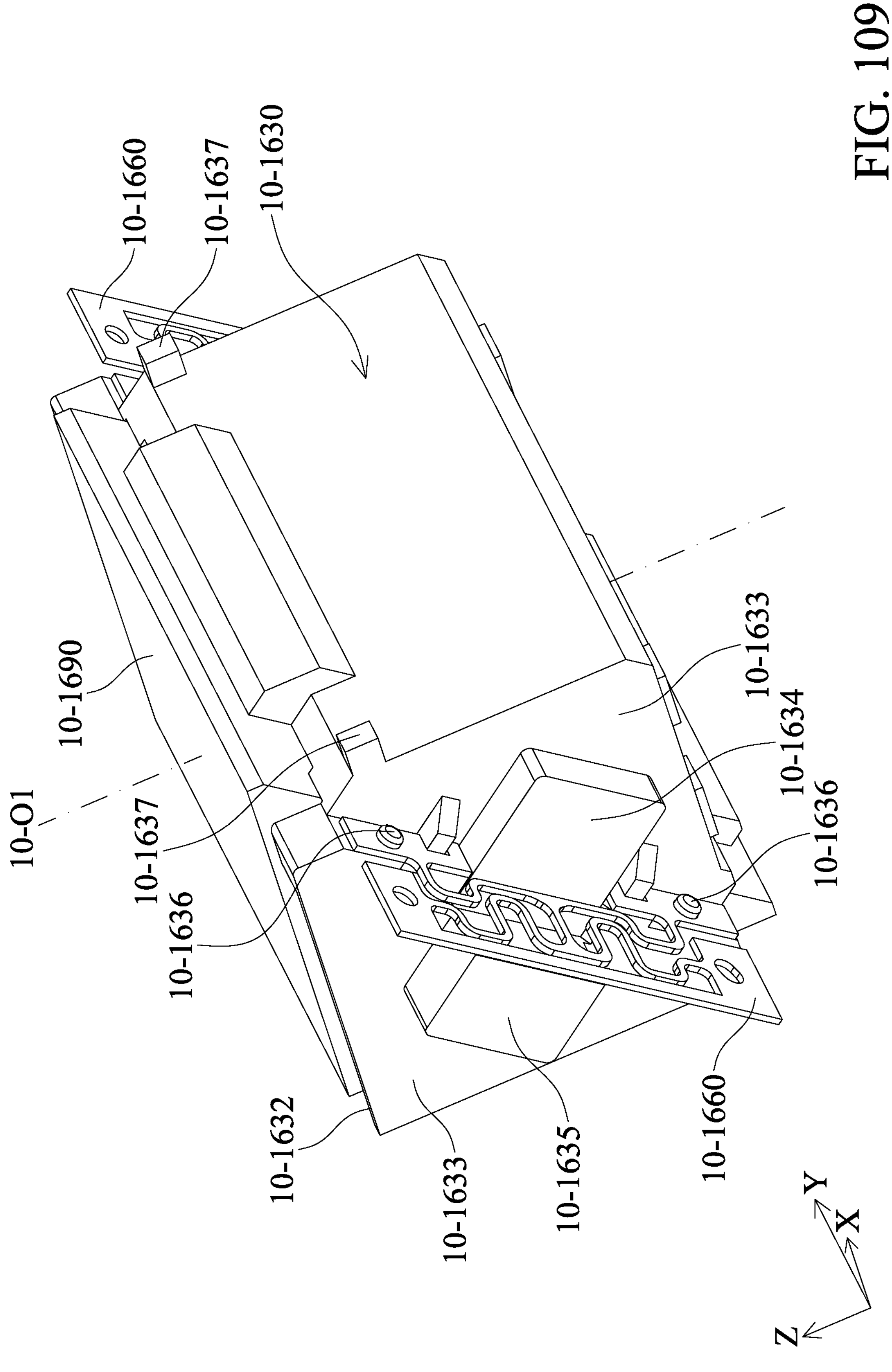
FIG. 109 is a perspective view illustrating a carrier and an elastic member in accordance with an embodiment of the present disclosure.

FIG. 109 is a perspective view illustrating the carrier 10-1630 and the elastic members 10-1660 in accordance with an embodiment of the present disclosure. As shown in FIG. 109, the carrier 10-1630 includes a body 10-1631 and a sidewall 10-1633 that extends from an edge (such as an edge 10-1632) of the body 10-1631. In addition, the carrier 10-1630 further includes a first stopping portion 10-1634 and a second stopping portion 10-1635 that protrude towards the fixed portion 10-F. The arrangement of the first stopping portion 10-1634, the second stopping portion 10-1635 and the fixed portion 10-F will be further discussed in accompany with FIG. 110 as follows. In the present embodiment, the first stopping portion 10-1634 and the second stopping portion 10-1635 laterally protrude from the sidewall 10-1633 to the fixed portion 10-F (i.e. in a horizontal direction). It should be appreciated that although in the present embodiment, the first stopping portion 10-1634 and the second stopping portion 10-1635 are illustrated as rectangular structures, but the present embodiment merely serves as an example. Those skilled in the art may design the first stopping portion 10-1634 and the second stopping portion 10-1635 to be other shapes as required.

When viewed in a direction (the Y axis) that is perpendicular to the incident optical axis 10-O1, the elastic members 10-1660 are disposed between the first stopping portion 10-1634 and the second stopping portion 10-1635. In the present embodiment, the elastic members 10-1660 are connected to the carrier 10-1636 via contacts 10-1636. The contacts 10-1636 face the base 10-1620, and therefore when the optical member 10-1690 is viewed along the incident optical axis 10-O1, the contacts 10-1636 are not exposed from the carrier 10-1630. In other words, when viewed downwards from the top surface 10-1611 of the optical member driving mechanism 10-1601, the contacts 10-1636 are not shown. As a result, when viewed along the incident optical axis 10-O1 (the Z axis), the sidewall 10-1633 may partially overlap with the elastic members 10-1660. In addition, when viewed along the incident optical axis 10-O1, the first stopping portion 10-1634 and the second stopping portion 10-1635 also overlap the elastic members 10-1660. By means of the above design, the required space for arranging the elastic members 10-1660 may be effectively reduced. Therefore, a larger optical member 10-1690 may be disposed with increasing the volume of the optical member driving mechanism 10-1601, and the optical performance of the optical member driving mechanism 10-1601 is enhanced.

Furthermore, the carrier 10-1630 includes protruding columns 10-1637 that protrude towards the fixed portion 10-F. The arrangement of the protruding columns 10-1637 and the fixed portion 10-F will be further discussed in accompany with FIG. 111 as follows. In the present embodiment, the direction in which the protruding columns 10-1637 extend is different from the direction in which the first stopping portion 10-1634 and the second stopping portion 10-1635 extend. For example, the direction in which the protruding columns 10-1637 extend (i.e., the X axis) is substantially perpendicular to the direction in which the first stopping portion 10-1634 and the second stopping portion 10-1635 extend (i.e., the Y axis). By means of the arrangement of the first stopping portion 10-1634, the second stopping portion 10-1635 and the protruding columns 10-1637, the movement of the carrier 10-1630 in the horizontal direction (which is the X-Y plane) may be limited. As a result, the body 10-1631 of the carrier 10-1630 may remain undamaged because the body 10-1631 moves adequately in such a way that the optical member 10-1690 being carried by the carrier 10-1630 is protected. It should be noted that although only one side of the carrier 10-1630 is illustrated, the other side of the carrier may have a structure that is the same or similar to that shown in FIG. 109. For example, the structure of the carrier 10-1630 may be symmetrical on both sides.

Figure 110:
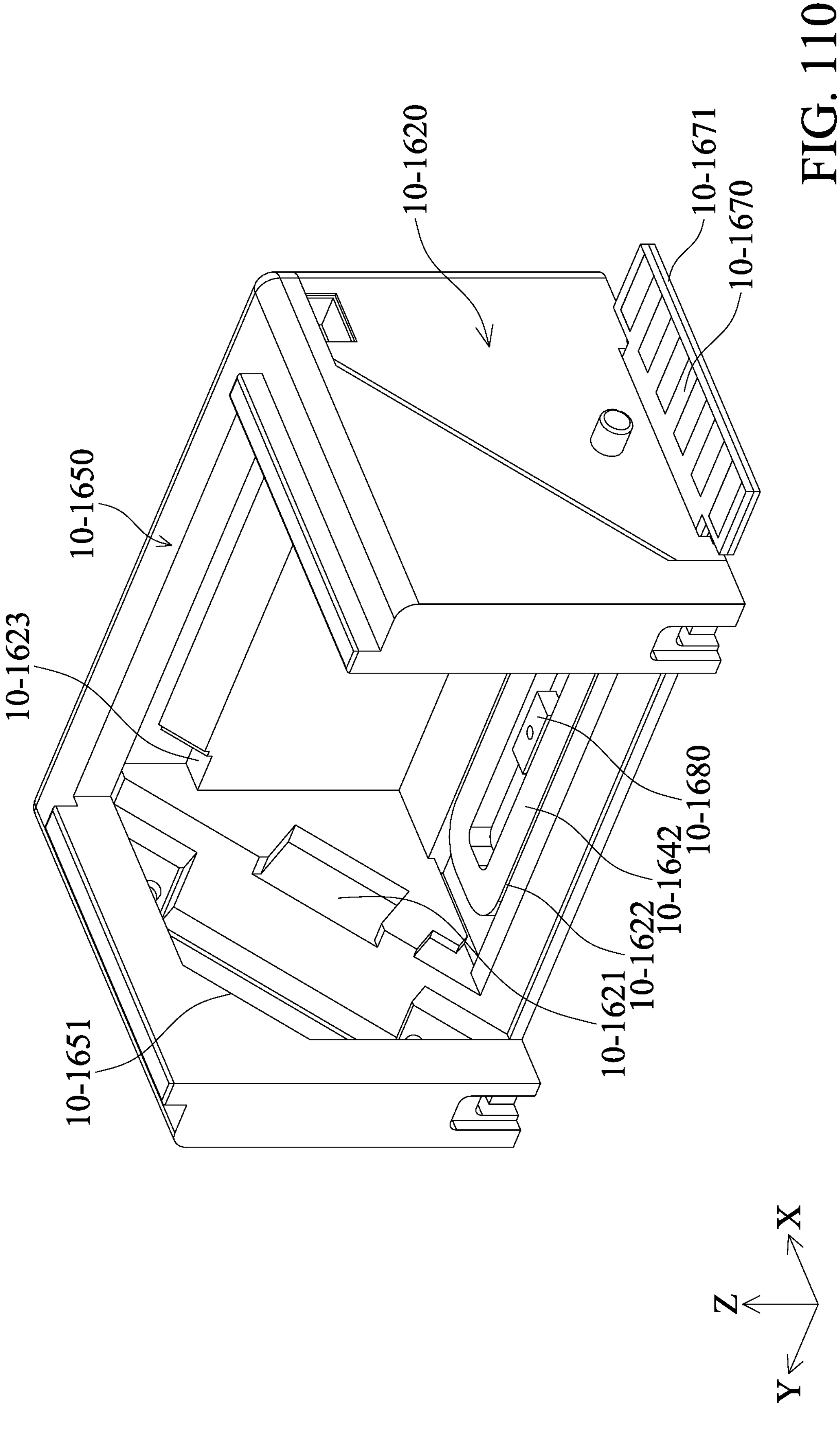
FIG. 110 is a perspective view illustrating a frame and a base in accordance with an embodiment of the present disclosure.

FIG. 110 is a perspective view illustrating the frame 10-1650, the base 10-1620 and the circuit component

10-1670 in accordance with an embodiment of the present disclosure. As shown in FIG. 110, the frame 10-1650 and the base 10-1620 may be combined as a rectangular space to contain the movable portion 10-M (including the carrier 10-1630 and the optical member 10-1690 carried thereon). In the present embodiment, the base 10-1620 has a first groove 10-1621, and the frame 10-1650 has a second groove 10-1651. The first groove 10-1621 is disposed to contain the first stopping portion 10-1634, and the second groove 10-1651 is disposed to contain the second stopping portion 10-1635. In other words, the first groove 10-1621 is disposed corresponding to the shape of the first stopping portion 10-1634, and the second groove 10-1651 is disposed corresponding to the shape of the second stopping portion 10-1635. As a result, the first groove 10-1621 and the second groove 10-1651 may limit the movement of the first stopping portion 10-1634 and the second stopping portion 10-1635. Therefore, the carrier 10-1630 may remain at an adequate position, and the optical member driving mechanism 10-1601 may keep operating normally. In addition, since when viewed along the incident optical axis 10-O1, the first stopping portion 10-1634 and the second stopping portion 10-1635 may overlap with the elastic members 10-1660, when viewed in the same direction (the incident optical axis 10-O1) as above, the first groove 10-1621 and the second groove 10-1651 may overlap with the elastic members 10-1660 (as shown in FIG. 109).

Moreover, the base 10-1620 has a base opening 10-1622 to expose the driving coil 10-1642 and the sensor 10-1680. In this way, the driving coil 10-1642 and the magnetic member 10-1641 (as shown in FIG. 107) may generate an electromagnetic force, and the sensor 10-1680 may detect the change of the magnetic field of the magnetic member 10-1641. It should be noted that in the present embodiment the top surface of the driving coil 10-1642 is slightly higher than the top surface of the sensor 10-1680. By means of the above design, the driving coil 10-1642 may protect the sensor 10-1680, preventing the movable portion 10-M colliding with the sensor 10-1680, and thereby the sensor 10-1680 may remain undamaged. In addition, the base 10-1620 has a recess 10-1623 that is formed to contain the protruding columns 10-1637.

Figure 111:
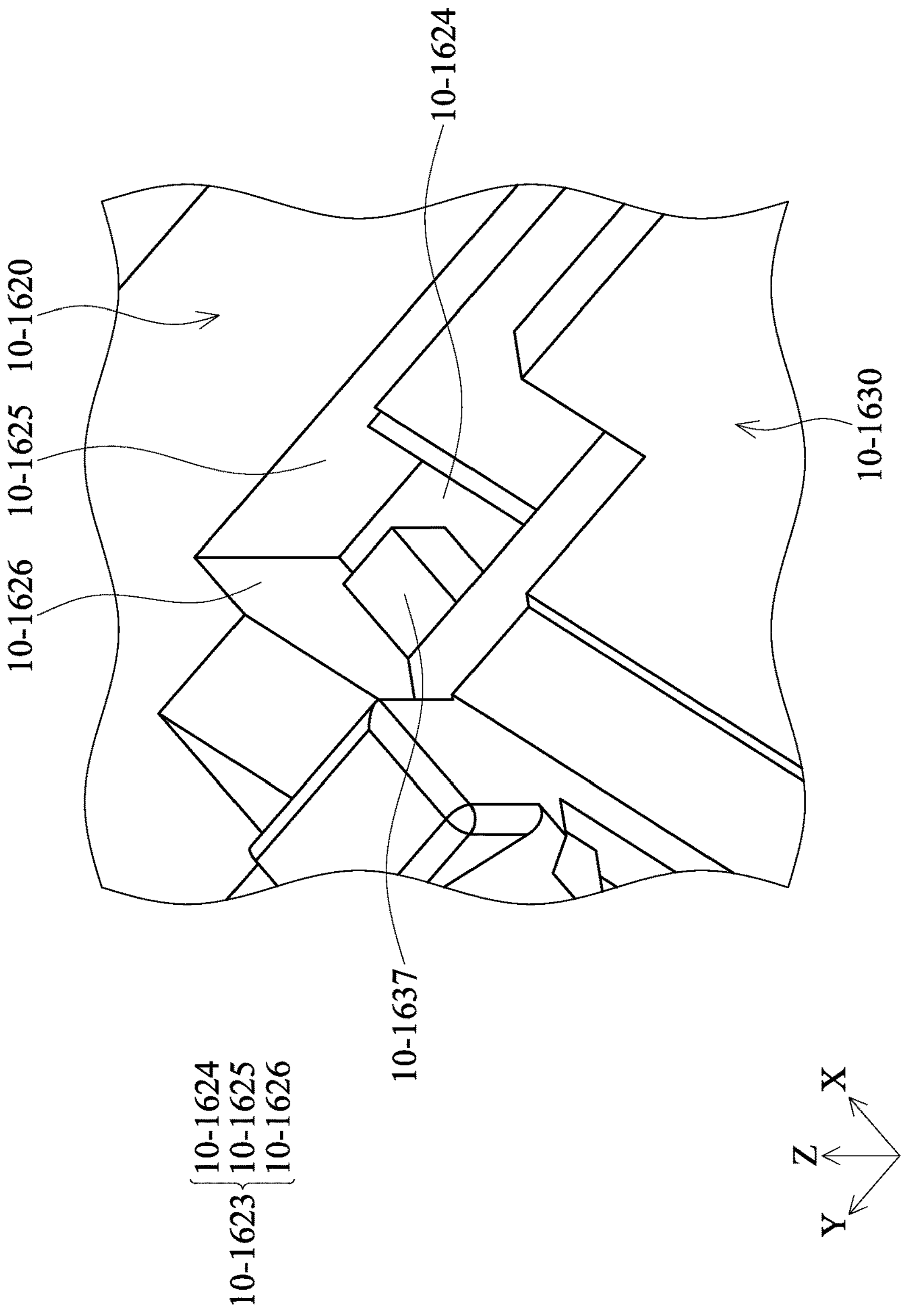
FIG. 111 is an enlarged partial perspective view illustrating the carrier and the base in accordance with an embodiment of the present disclosure.

FIG. 111 is an enlarged partial perspective view illustrating the carrier 10-1630 and the base 10-1620 in accordance with an embodiment of the present disclosure. As shown in FIG. 111, the recess 10-1623 may have a first surface 10-1624, a second surface 10-1625 and a third surface 10-1626. In the present embodiment, the first surface 10-1624 is a bottom surface of the recess 10-1623, and substantially parallel to the X-Y plane. The second surface 10-1625 is a side surface of the recess 10-1623, and substantially parallel to the Y-Z plane. The third surface 10-1626 is another side surface of the recess 10-1623, and substantially parallel to the Z-X plane. In other words, the first surface 10-1624, the second surface 10-1625 and the third surface 10-1626 of the recess 10-1623 are perpendicular to each other.

In some embodiments, a damping material (not shown) may be filled between the recess 10-1623 and the protruding columns 10-1637, such that the damping material contacts the protruding columns 10-1637 and at least one surface (i.e. at least one of the first surface 10-1624, the second surface 10-1625 and the third surface 10-1626) of the recess 10-1623. In some embodiments, the damping material may contact the protruding columns 10-1637 and all surfaces of the recess 10-1623. Thanks to the arrangement of the damping material, the resonance effect that affecting the movable portion 10-M may be reduced. Furthermore, arranging the protruding columns 10-1637 and the recess 10-1623 may increase the surface area of the damping material that contacts the carrier 10-1630 and the base 10-1620. As a result, the arrangement of the damping material may be more stable, and the performance of the damping material may be enhanced.

Figure 112:
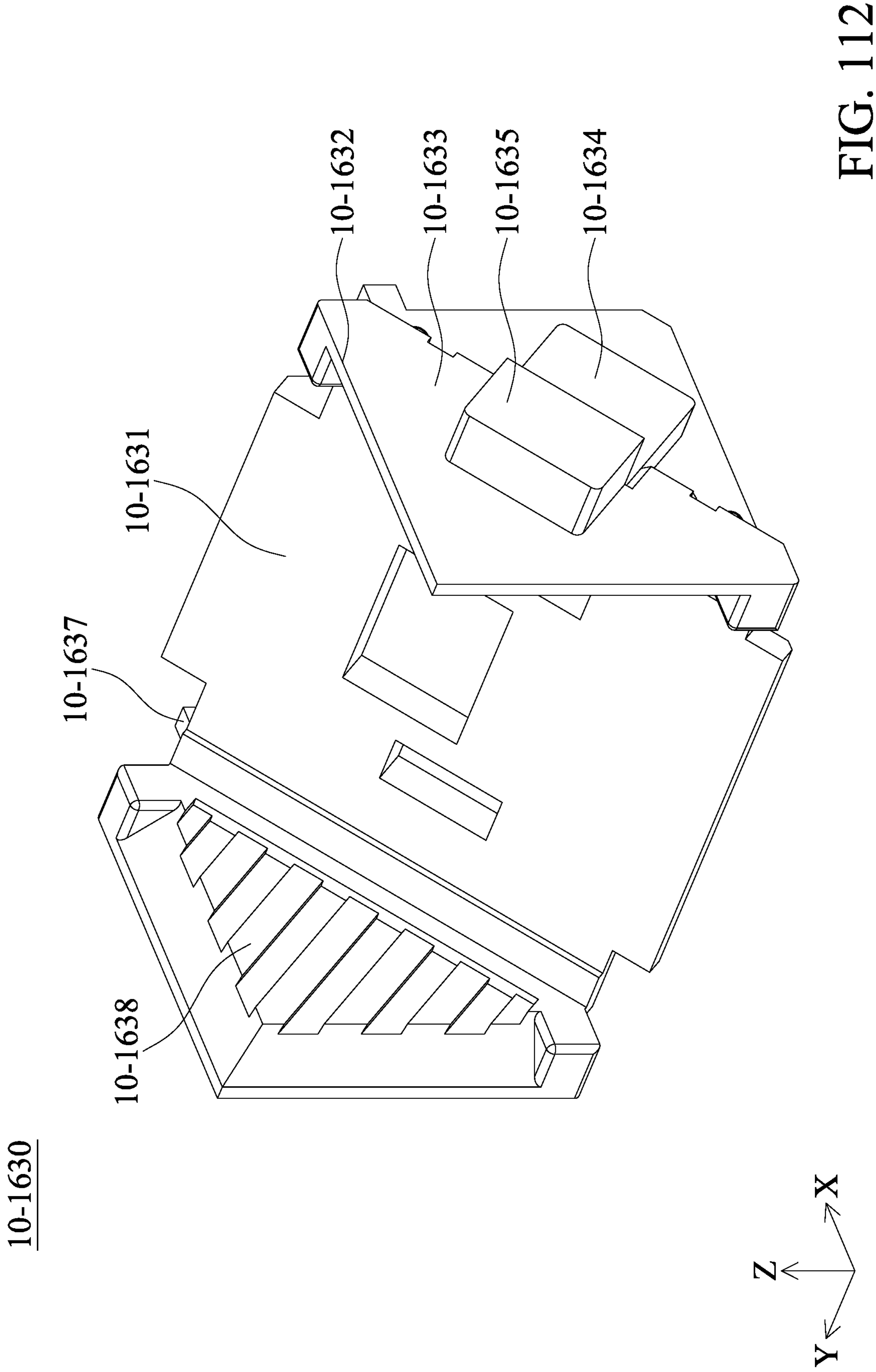
FIG. 112 is a perspective view illustrating the carrier in accordance with an embodiment of the present disclosure.

FIG. 112 is a perspective view illustrating the carrier 10-1630 in accordance with an embodiment of the present disclosure. In the present embodiment, the carrier 10-1630 has a plurality of adhesive grooves 10-1638 that are disposed to face the optical member 10-1690 (as shown in FIG. 109). An adhesive (not shown) may be filled into the adhesive grooves 10-1638 to bond the carrier 10-1630 and the optical member 10-1690. As shown in FIG. 112, the extending direction of the adhesive grooves 10-1638 is not parallel to the incident optical axis 10-O1 (the Z axis) and the output optical axis 10-O2 (the X axis). That is, an acute angle is formed between the extending direction of the adhesive grooves 10-1638 and the incident optical axis 10-O1 (the Z axis), the output optical axis 10-O2 (the X axis). By means of the above design, the difficulty for filling the adhesive into the adhesive grooves 10-1638 may be reduced, and it helps to evenly distribute the filled adhesive between the carrier 10-1630 and the optical member 10-1690.

As set forth above, the embodiments of the present disclosure provide an optical member driving mechanism including an elastic member that overlaps with the sidewall of the carrier. By means of the above design, the required space for arranging the elastic members may be effectively reduced. Therefore, a larger optical member may be disposed with increasing the volume of the optical member driving mechanism, and the optical performance of the optical member driving mechanism is enhanced. In addition, forming an acute angle between the extending direction of adhesive grooves of the carrier and the incident optical axis may reduce the difficulty for filling the adhesive into the adhesive grooves, and it helps to evenly distribute the filled adhesive between the carrier and the optical member.

Eleventh Group of Embodiments

Figure 113:
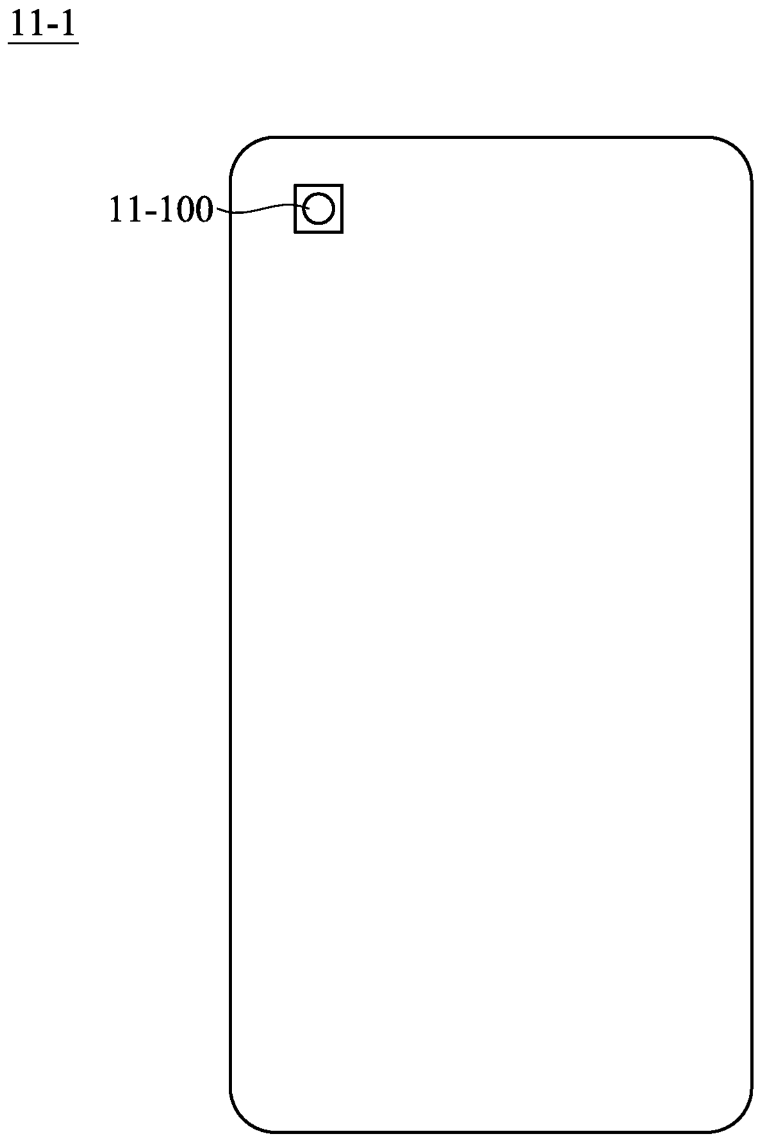
FIG. 113 shows a schematic view of an electrical device with an optical element driving mechanism according to an embodiment of the present disclosure.

Firstly, please refer to FIG. 113, an optical element driving mechanism 11-100 of an embodiment of the present disclosure may be mounted in an electrical device 11-1 for taking photos or videos, wherein the aforementioned electrical device 11-1 may, for example, be a smartphone or a digital camera, but the present disclosure is not limited to these. It should be noted that the position and the size between the optical element driving mechanism 11-100 and the electrical device 11-1 shown in FIG. 113 are only an example, which is not for limiting the position and the size between the optical element driving mechanism 11-100 and the electrical device 11-1. In fact, according to different needs, the optical element driving mechanism 11-100 may be mounted at different positions in the electrical device 11-1.

Figure 114:
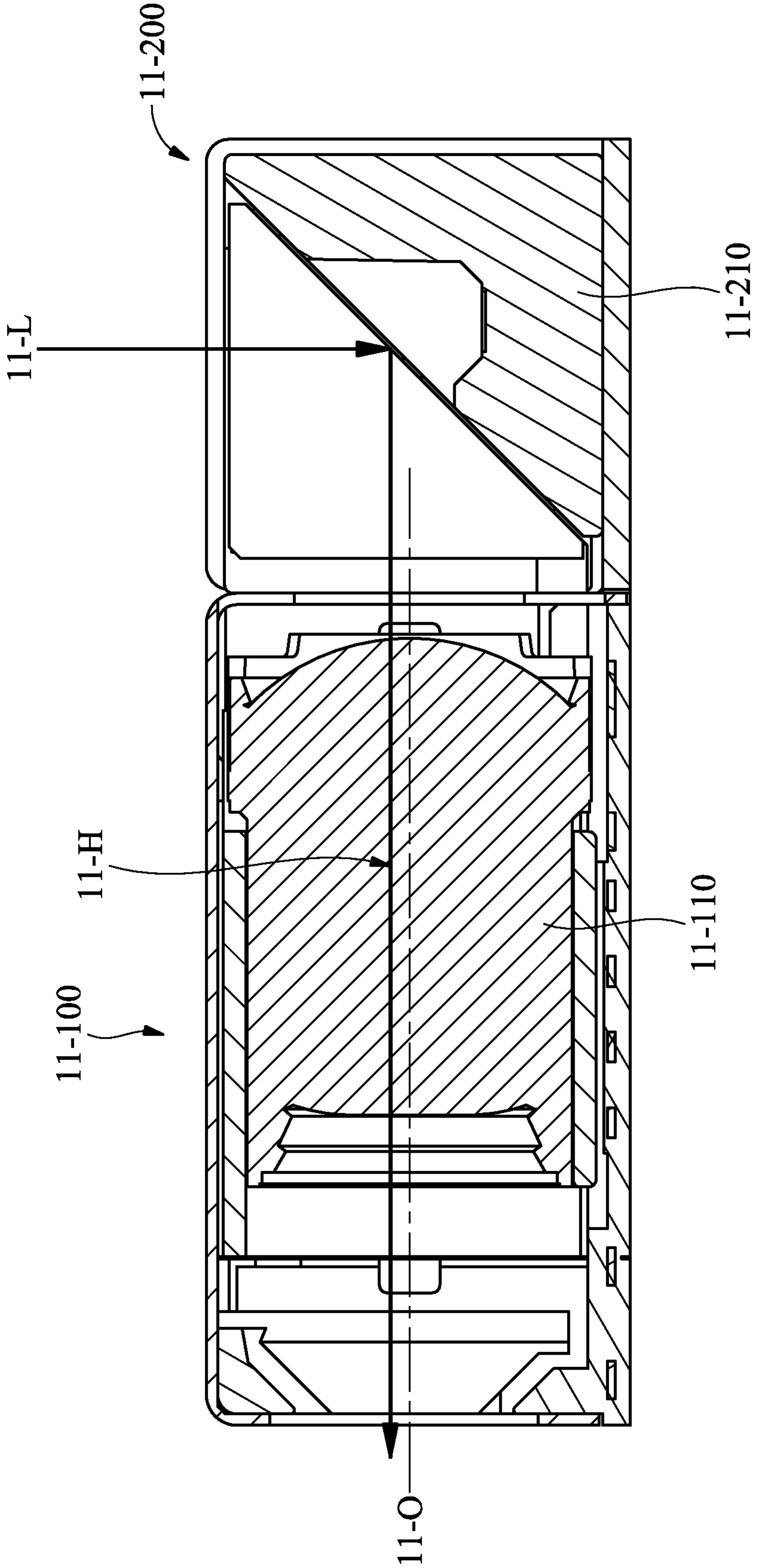
FIG. 114 shows a schematic view of the optical element driving mechanism and a prism module according to an embodiment of the present disclosure.

Please refer to FIG. 114, the optical element driving mechanism 11-100 carries an optical element 11-110 with an optical axis 11-O. A prism module 11-200 may be disposed outside of the optical element driving mechanism 11-100. The prism module 11-200 is located at the upstream of the light entry of the optical element driving mechanism 11-100. A light 11-L incident to a prism 11-210 of the prism module 11-200, and then reflected by the prism 11-210 to an optical path 11-H, and passing through the optical element 11-110 for imaging.

Figure 115:
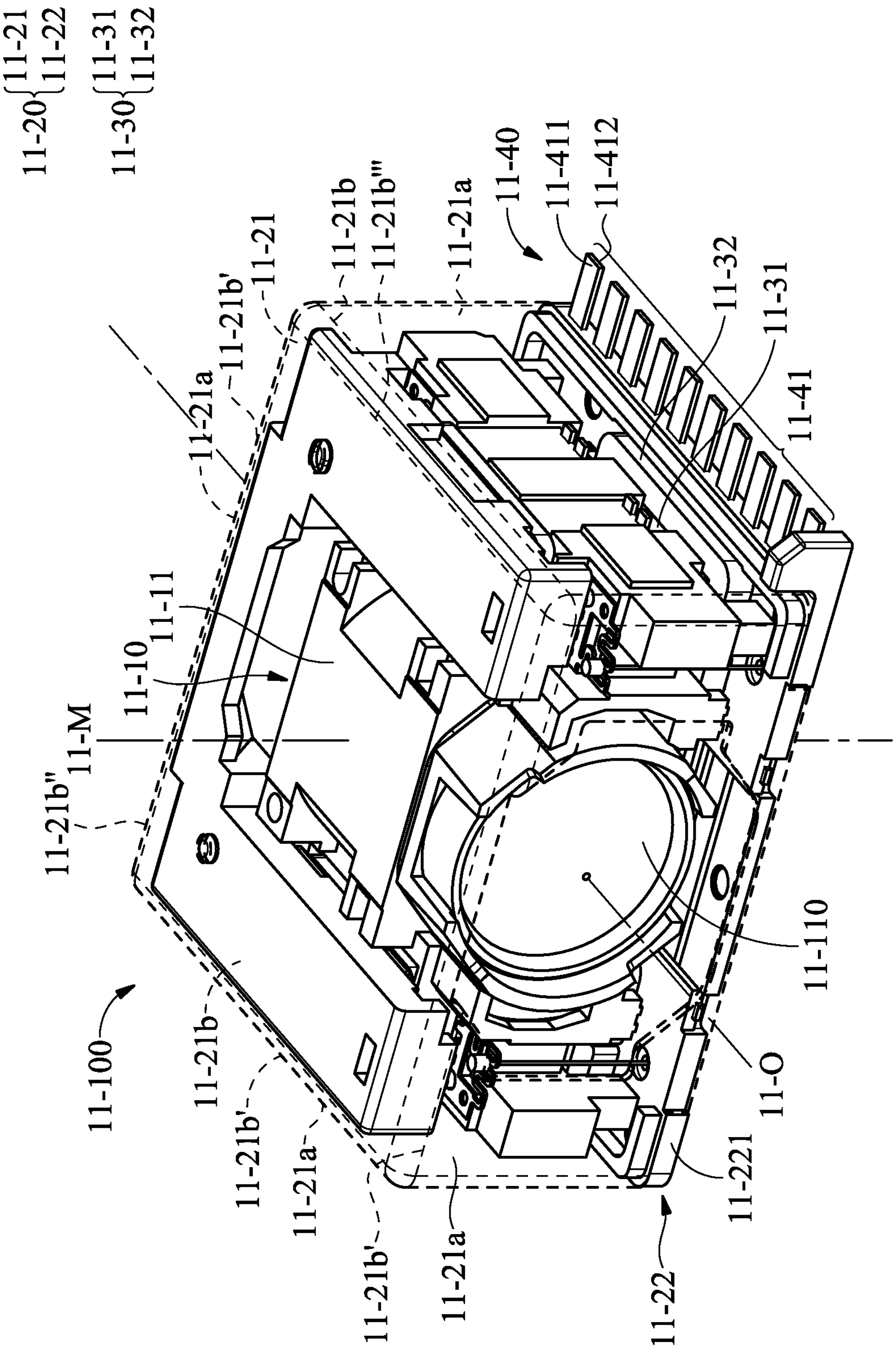
FIG. 115 shows a perspective view of the optical element driving mechanism and an optical element according to an embodiment of the present disclosure, wherein an outer frame of the optical element driving mechanism is shown as a dashed line.
Figure 116:
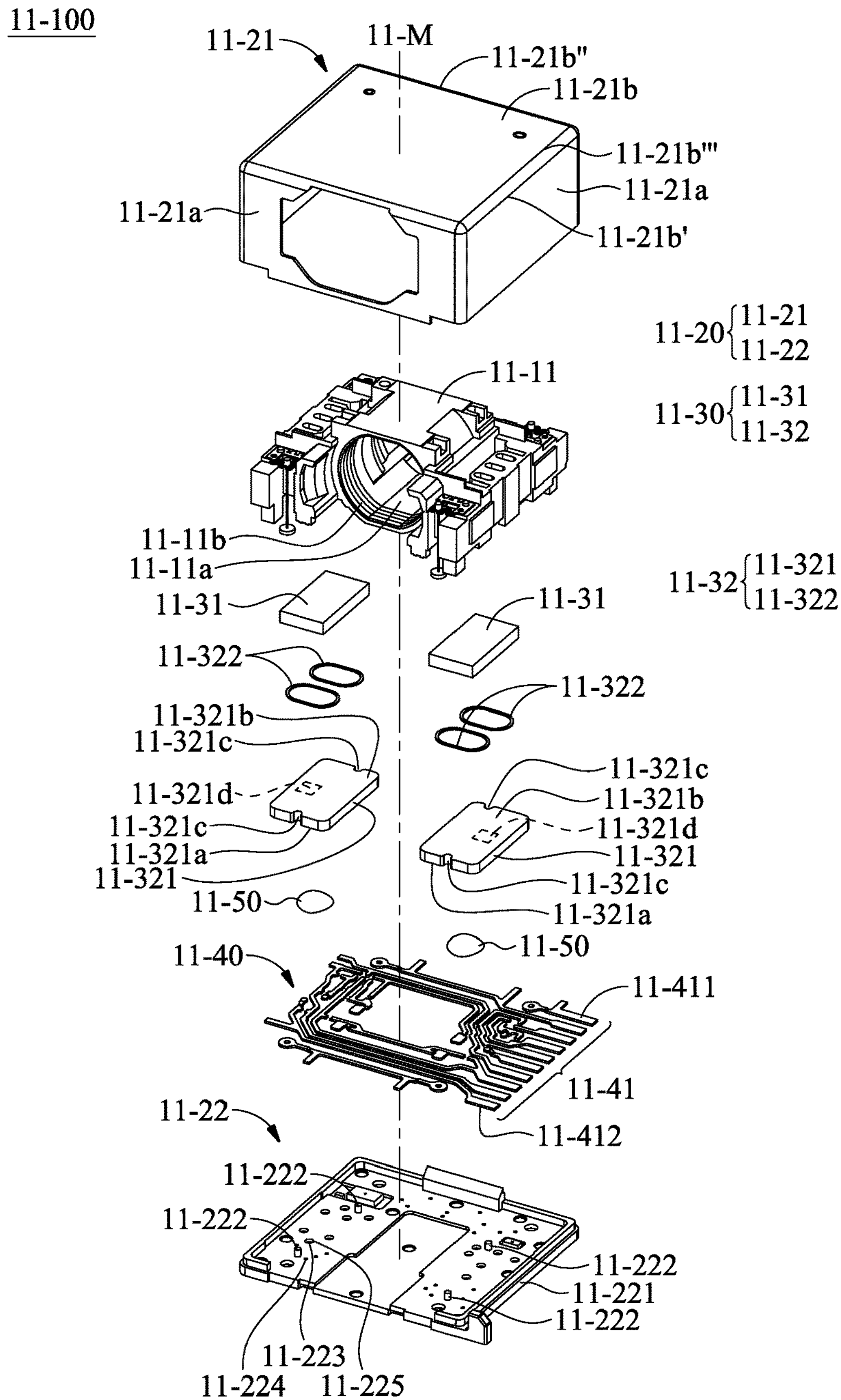
FIG. 116 shows an exploded view of the optical element driving mechanism according to an embodiment of the present disclosure.

Please refer to FIG. 115, the optical element driving mechanism 11-100 includes a movable part 11-10, a fixed part 11-20, a driving assembly 11-30, a circuit assembly 11-40 and an adhesive element 11-50 (please refer to FIG. 116). The adhesive element 11-50 may be the material of a soldering tin or a glue for fixing and securing.

As shown in FIG. 115, the movable part 11-10 is in contact with the optical element 11-110. The movable part includes a holder 11-11. Please refer to FIG. 116, the holder 11-11 of the movable part 11-10 has a hollow ring structure, and has a through hole 11-11*a* and a threaded structure 11-11*b* formed on the through hole 11-11*a*, and the optical element 11-110 may be locked in the through hole 11-11*a* via the threaded structure 11-11*b*.

Please refer to FIG. 115 again, the fixed part 11-20 includes an outer frame 11-21 and a base 11-22, and the fixed part 11-20 has a main axis 11-M. The main axis 11-M is not parallel to the optical axis 11-O. In the present embodiment, the main axis 11-M is perpendicular to the optical axis 11-O. The outer frame 11-21 has four sidewalls 11-21*a* and a top surface 11-21*b*. The sidewall 11-21*a* extends from an edge 11-21*b*' of the top surface 11-21*b* along the main axis 11-M. That is, the sidewall 11-21*a* is significantly parallel to the main axis 11-M. The top surface 11-21*b* intersects with the main axis 11-M, more specifically, the main axis 11-M perpendicularly penetrates the top surface 11-21*b*. The top surface 11-21*b* has a long side 11-21*b*" and a short side 11-21*b*'". The extending direction of the short side 11-21*b*'" is parallel to the optical axis 11-O, while the extending direction of the long side 11-21*b*" is not parallel to the optical axis 11-O. Please refer to FIGS. 115 and 116 at the time, the base 11-22 includes a base plate 11-221, four circuit board positioning structures 11-222, a first opening 11-223, a second opening 11-224 and a plurality of recess 11-225. The base plate 11-221 intersects the main axis 11-M, and securely connects to the outer frame 11-21.

Please refer to FIG. 116, the driving assembly 11-30 includes two driving magnetic elements 11-31 and a driving coil assembly 11-32. The driving assembly 11-30 may drive the movable part 11-10 to move relative to the fixed part 11-20, and the driving assembly 11-30 is electrically connected to the circuit assembly 11-40. The driving coil assembly 11-32 has two circuit boards 11-321 and four driving coils 11-322. The circuit board 11-321 includes a first circuit board surface 11-321*a*, a second circuit board surface 11-321*b*, two coil positioning structures 11-321*c* and a connecting circuit 11-321*d*.

Please refer to FIG. 115, the circuit assembly 11-40 is disposed in the base 11-22 of the fixed part 11-20. The circuit assembly 11-40 includes a plurality of circuits 11-41. The circuit 11-41 has a first circuit surface 11-411 and a second circuit surface 11-412.

Figure 117:
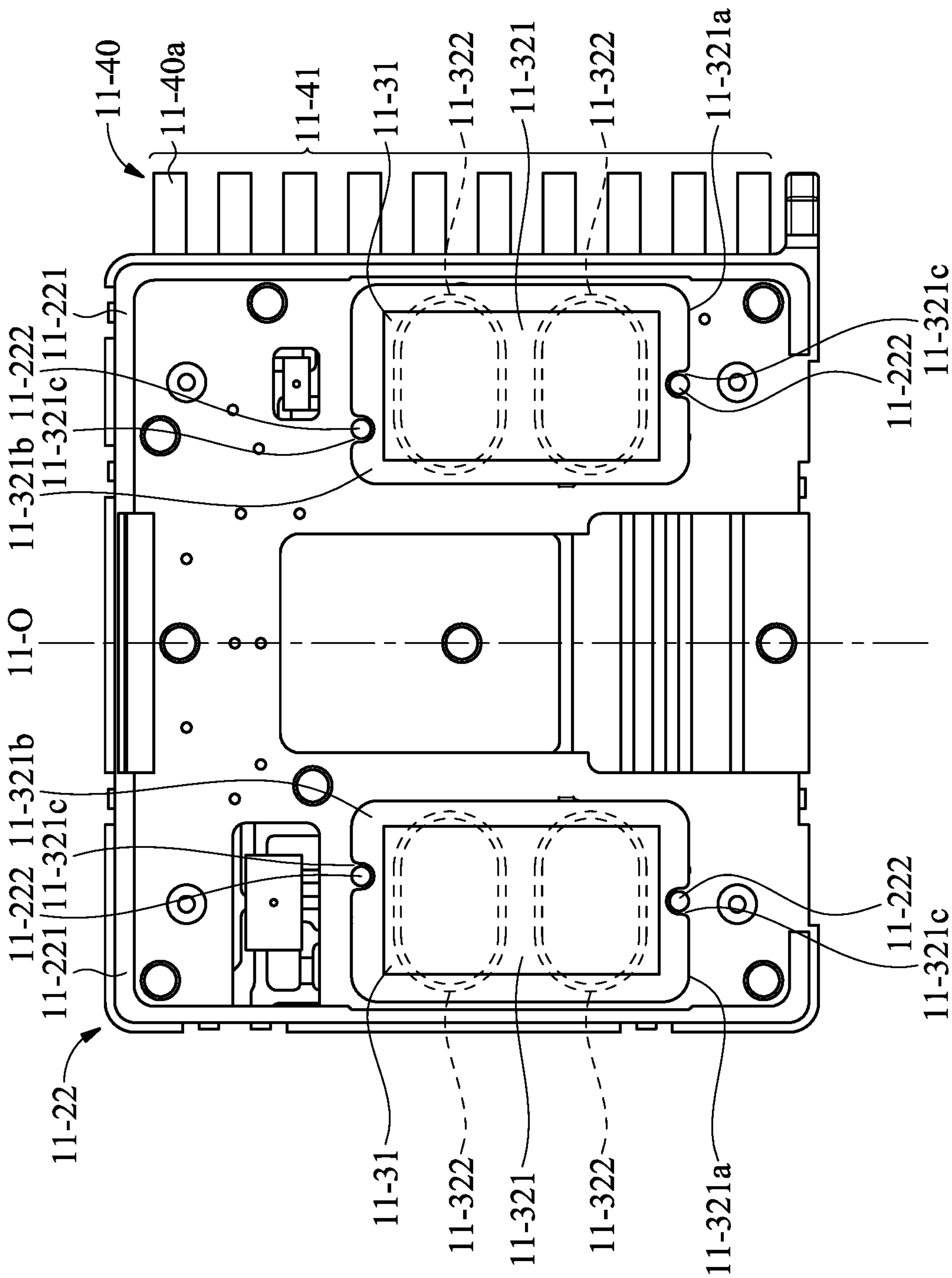
FIG. 117 shows a schematic view of a base, a circuit board, a driving magnetic element and a circuit assembly of the optical element driving mechanism according to an embodiment of the present disclosure.

Please refer to FIG. 117, the circuit board 11-321 is disposed on the base plate 11-221, and the driving magnetic element 11-31 is disposed above the circuit board 11-321. Four driving coils 11-322 are disposed in the circuit boards 11-321 respectively, and the driving coils 11-322 are corresponding to the driving magnetic elements 11-31. It should be noted that the driving coils is not limited to be four. In some embodiments, there may by one, two, three or more driving coils 11-322. The driving coil 11-322 may generate an electromagnetic driving force to drive the holder 11-11 of the movable part 11-10 to move along the optical axis 11-O relative to the fixed part 11-20 when a current is applied to the driving coil 11-322. The first circuit board surface 11-321*a* of the circuit board 11-321 faces the circuit 11-41 of the circuit assembly 11-40, and the second circuit board surface 11-321*b* faces opposite the first circuit board surface 11-321*a* (please also refer to FIG. 121).

As shown in FIG. 117, two coil positioning structures 11-321*c* of each circuit boards 11-321 have a recess or an opening structure, and the coil positioning structures 11-321*c* are located at the opposite sides of the circuit boards 11-321*c*. The circuit board positioning structure 11-222 of the base 11-22 of the fixed part 11-20 corresponds to the coil positioning structure 11-321*c*, and the circuit board positioning structure 11-222 is located in the recess of the coil positioning structure 11-321*c* to prevent the circuit board 11-321 and the driving coil 11-322 in the circuit board 11-321 from moving relative to the base 11-22 during impact. It should be noted that the circuit board 11-321 is not limited to be two, and the coil positioning structure 11-321*c* and the circuit board positioning structure 11-222 are not limited to be four. In some embodiments, there may be one, three, or more circuit boards 11-321, and there may be one, two, three, five, or more coil positioning structures 11-321*c* and the circuit board positioning structures 11-222. Moreover, the positions of the coil positioning structures 11-321*c* are not limited to the opposite sides of the circuit board 11-321. In some embodiments, the coil positioning structures 11-321*c* may be located at any one side, any two sides, any three sides, or any four sides of the circuit board 11-321*c*.

Figure 118:
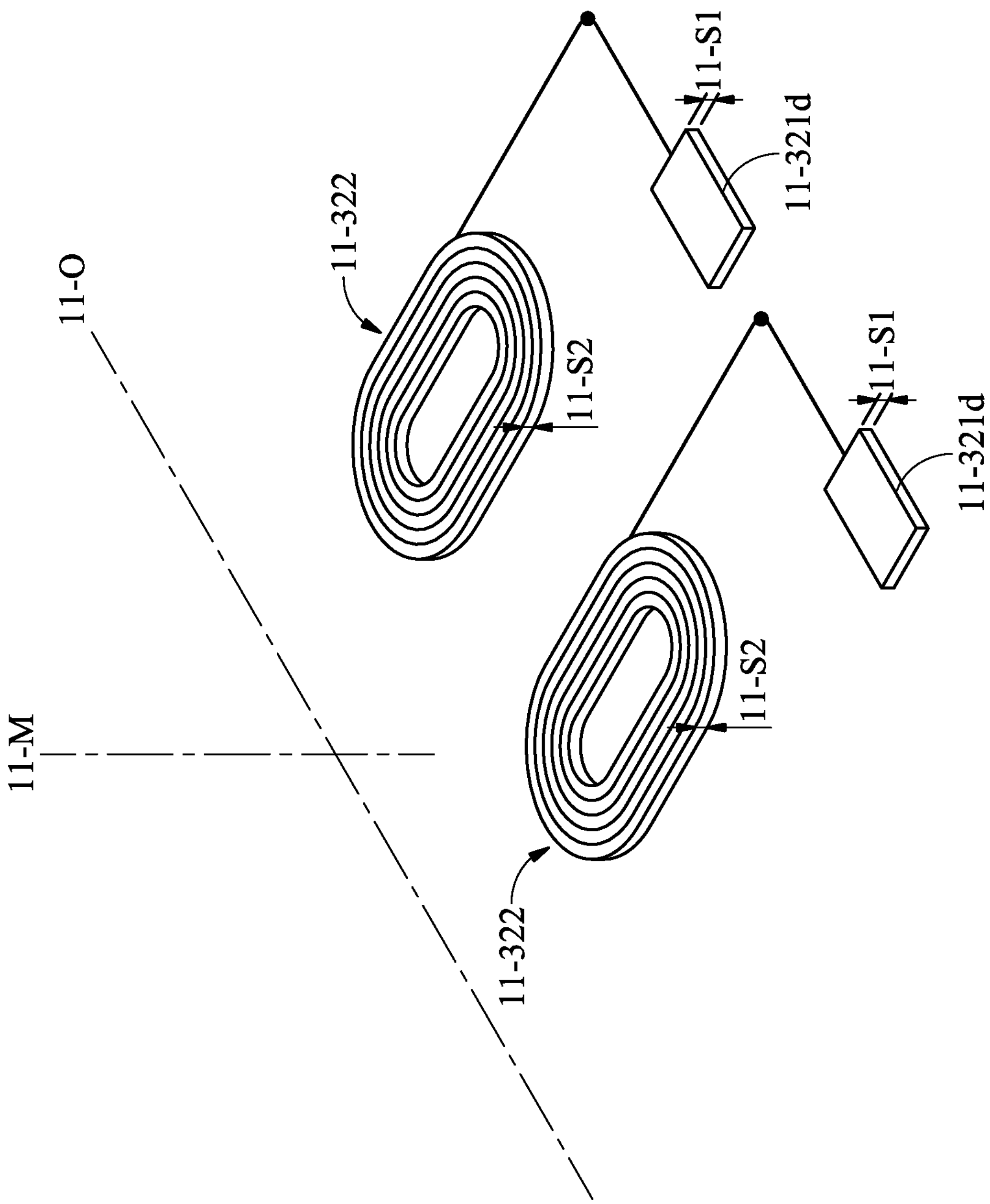
FIG. 118 shows a schematic view of a driving coil and a connecting circuit of the circuit assembly of the optical element driving mechanism according to an embodiment of the present disclosure.

Please refer to FIG. 118, the driving coil 11-322 is arranged along the optical axis 11-O, that is, the direction along which the driving coil 11-322 is arranged is parallel to the extending direction of the short side 11-21*b*'" (please refer to FIG. 115, the sort side 11-21*b*'" is parallel to the optical axis 11-O). The circuit board 11-321 further includes a connecting circuit 11-321*d*. The driving coil 11-322 does not overlap the connecting circuit 11-321*d* when observed in the direction perpendicular to the main axis 11-M. In the present embodiment, the driving coil 11-322 does not overlap the connecting circuit 11-321*d* when observed along the optical axis 11-O (in the present embodiment, the optical axis 11-O is perpendicular to the main axis 11-M). In addition, along the main axis 11-M, a greatest size 11-S2 of the driving coil 11-322 is different from a greatest size 11-S1 of the connecting circuit 11-321*d*. Specifically, along the main axis 11-M, the greatest size 11-S1 of the connecting circuit 11-321*d* is smaller than the greatest size 11-S2 of the driving coil 11-322, so that the connecting circuit 11-321*d* has a lower resistance.

Figure 119A:
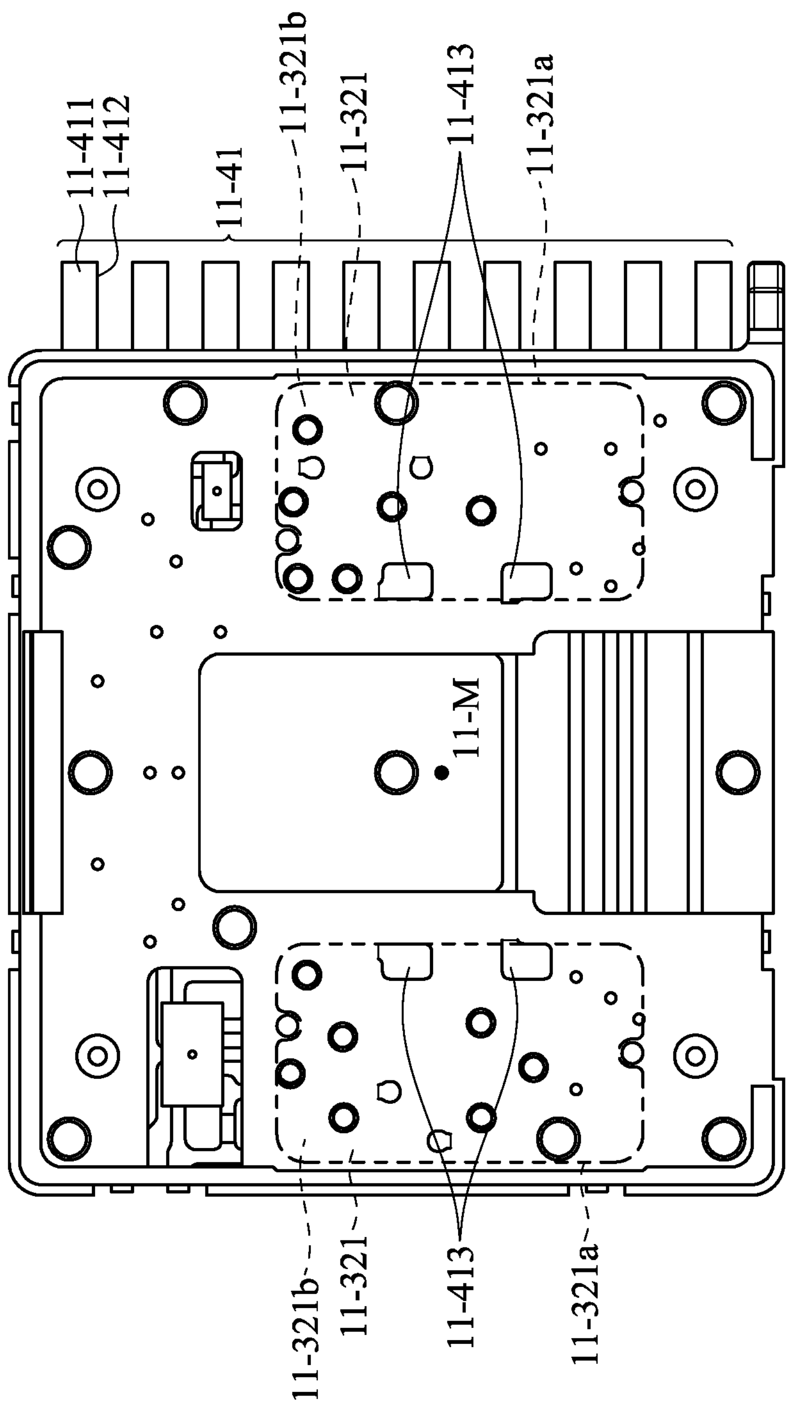
FIG. 119A shows a schematic view of the base, the circuit assembly and the circuit board of the optical element driving mechanism according to an embodiment of the present disclosure.
Figure 119B:
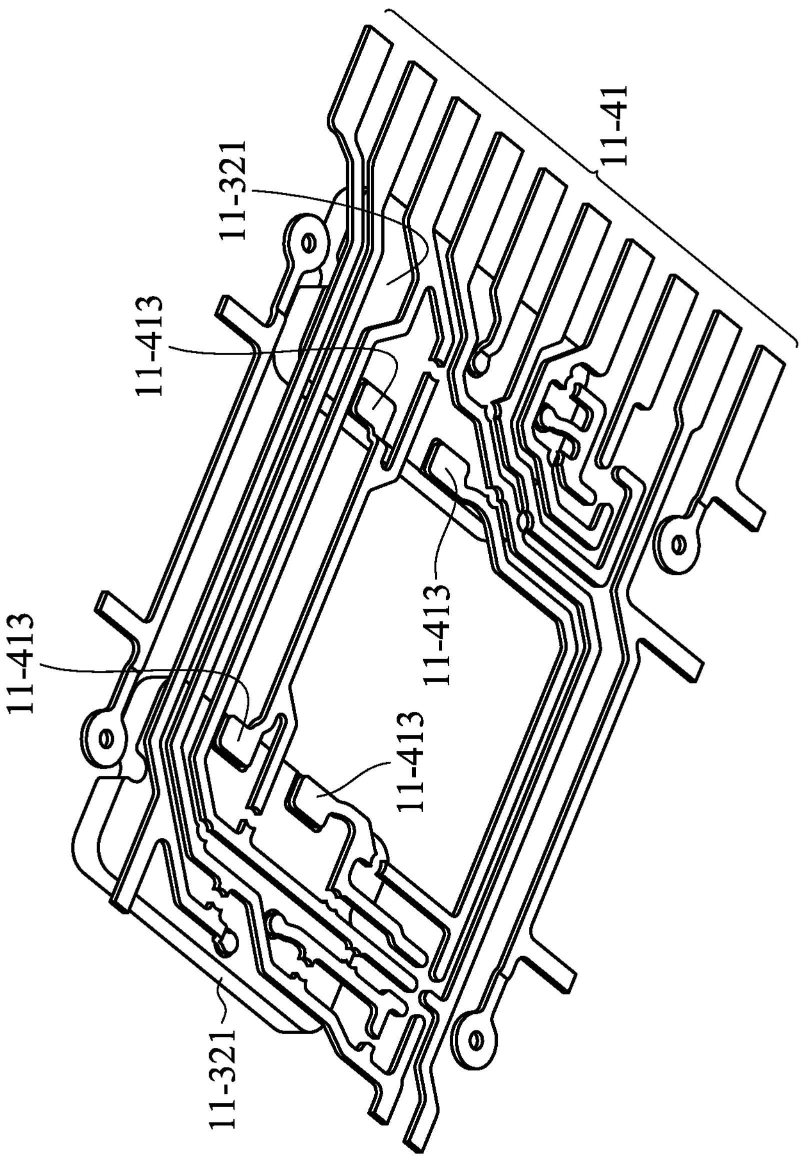
FIG. 119B shows a bottom view of a circuit and the circuit board of the optical element driving mechanism according to an embodiment of the present disclosure.
Figure 119C:
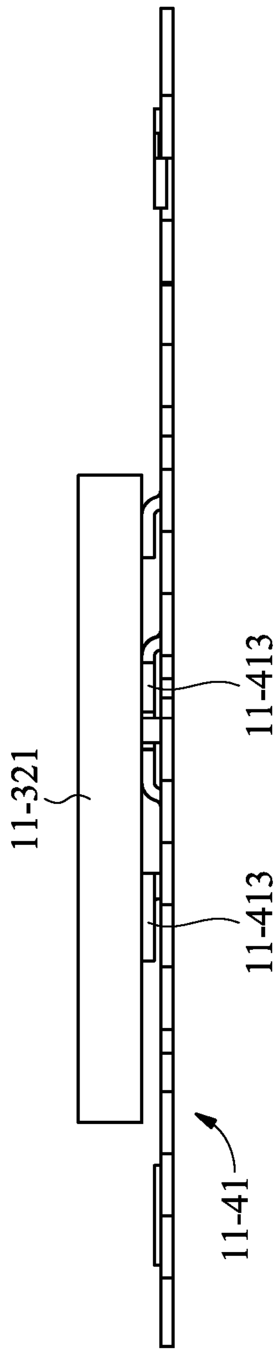
FIG. 119C shows a side view of the circuit assembly and the circuit board of the optical element driving mechanism according to an embodiment of the present disclosure.

Please refer to FIGS. 119A-119C, the first circuit surface 11-411 of the circuit 11-41 faces towards the circuit board 11-321, and the second circuit surface 11-412 faces opposite the first circuit surface 11-411. The circuit 11-41 may have a coil electrical connection part 11-413. The circuit board 11-321 is electrically connected to the circuit 11-41 of the circuit assembly 11-40 via the coil electrical connection part 11-413. The coil electrical connection part 11-413 is disposed between the first circuit board surface 11-321*a* of the circuit board 11-321 and the first circuit surface 11-411 of part of the circuit 11-41. The coil electrical connection part 11-413 at least partially overlaps the first circuit board surface 11-321*a* and the first circuit surface 11-411 when observed along the main axis 11-M. It should be noted that no coil electrical connection part 11-413 is provided on the second circuit board surface 11-321*b* of the circuit board 11-321 and the second circuit surface 11-412 of the circuit 11-41. Moreover, the coil electrical connection part 11-413 at least partially overlaps the second circuit board surface 11-321*b* and the second circuit surface 11-412 when observed along the main axis 11-M.

Figure 120A:
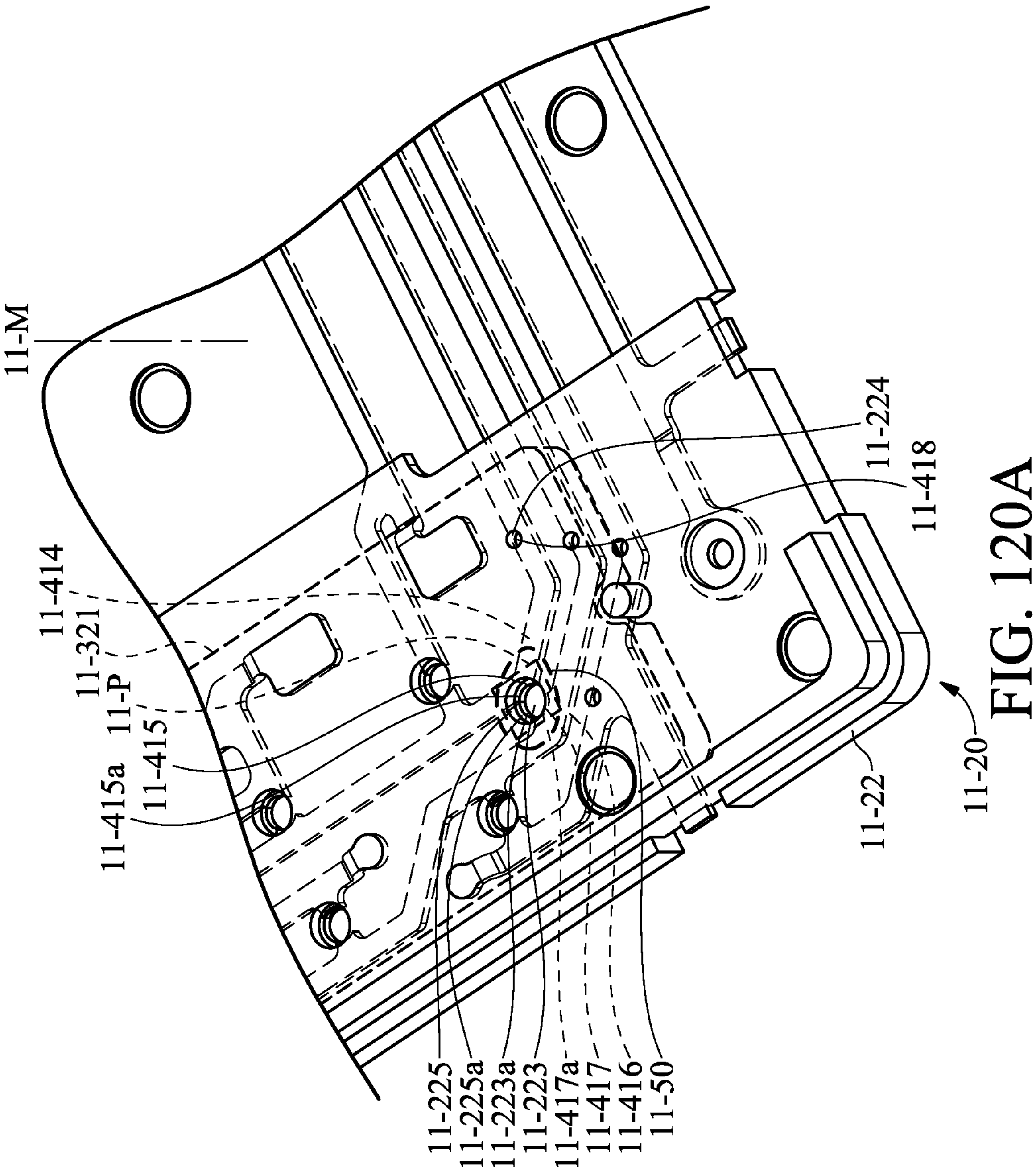
FIG. 120A shows a partial schematic view of the base, the circuit assembly, the circuit board and an adhesive element of the optical element driving mechanism according to an embodiment of the present disclosure, wherein the base and the circuit board are shown as a dashed line.
Figure 120B:
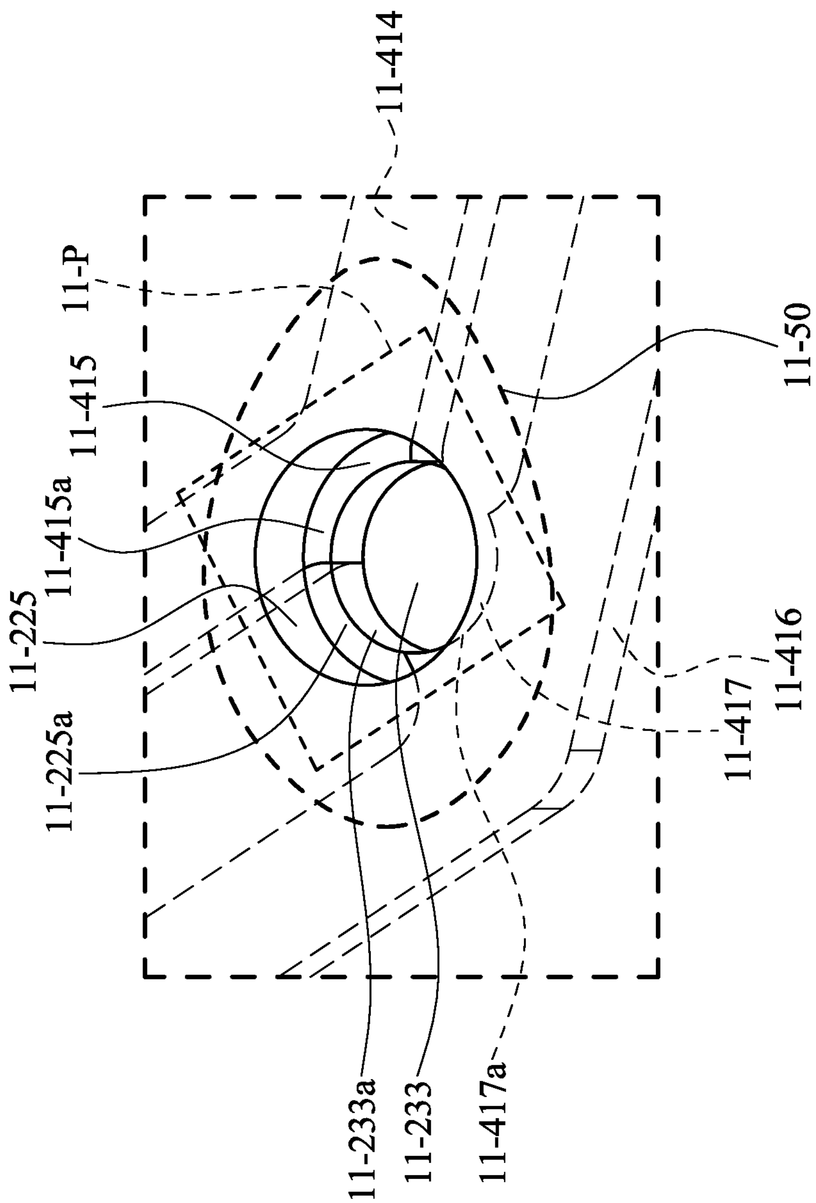
FIG. 120B shows a partial enlarged view of the base, the circuit assembly and the adhesive element of the optical element driving mechanism according to an embodiment of the present disclosure, wherein the base is shown as a dashed line.

Please refer to FIGS. 120A and 120B, FIG. 120A is a partial schematic view of the base 11-22, the circuit assembly 11-40, the circuit board 11-321 and the adhesive element 11-50, and FIG. 120B is a partial enlarged view of the base 11-22, the circuit assembly 11-40 and the adhesive element 11-50. As shown in FIGS. 120A and 120B, the circuit 11-41 may further include a first embedded part 11-414, a first exposed part 11-415, a second embedded part 11-416, and second exposed part 11-417 and a third exposed part 11-418. The first embedded part 11-414 is embedded in the base 11-22 of the fixed part 11-20 and is not exposed. The first exposed part 11-415 is electrically connected to the first embedded part 11-414 and is exposed to the first opening 11-223 of the base 11-22. The second embedded part 11-416 is embedded in the base 11-22 and is not exposed. The second exposed part 11-417 is electrically connected to the second embedded part 11-416 and is exposed to the first opening 11-223. In addition, the first embedded part 11-414 and the first exposed part 11-415 are electrically independent from the second embedded part 11-416 and the second exposed part 11-417. That is, the first opening 11-223 accommodates two circuits that are electrically independent from each other, rather than arranging the two circuits that are electrically independent from each other separately. In this way, processing and manufacturing of the optical element driving mechanism 11-100 may be facilitated, and the effect of miniaturization may be achieved.

As shown in FIG. 120A, the third exposed part 11-418 is partially exposed to the second opening 11-224 of the base 11-22, and the second opening 11-224 does not accommodate other circuits that are electrically independent from the third exposed part 11-418. The functions of the second opening 11-224 are not totally the same as that of the first opening 11-223. The second opening 11-224 may improve the heat dissipation efficiency of the third exposed part 11-418 to avoid the elements of the optical element driving mechanism 11-100 from overheating. Moreover, the second opening 11-224 may facilitate the processing and manufacturing of the optical element driving mechanism 11-100, and keep the third exposed part 11-418 at a desired position.

Please continue to refer to FIGS. 120A and 120B, the first exposed part 11-415 and the second exposed part 11-417 have a surface 11-415*a* and a surface 11-417*a* respectively, and the recess 11-225 of the base 11-22 has a recess surface 11-225*a*. The surface 11-415*a* of the first exposed part 11-415, the surface 11-417*a* of the second exposed part 11-417 and the recess surface 11-225*a* are located on a same imaginary plane 11-P. The first opening 11-223 further includes a first opening side 11-223*a*, the first opening side 11-223*a* is in contact with the recess surface 11-225*a*, but the first opening side 11-223*a* and the recess surface 11-225*a* are not parallel to each other. The first exposed part 11-415 and the second exposed part 11-417 are partially exposed to the first opening side 11-223*a*.

As shown in FIGS. 120A and 120B, the adhesive element 11-50 at least partially overlaps the first opening 11-223 when observed along the main axis 11-M. The adhesive element 11-50 here may be glue instead of soldering tin. Moreover, the adhesive element 11-50 at least partially overlaps the first opening 11-223 when observed in the direction perpendicular to the main axis 11-M. That is, the adhesive element 11-50 is disposed at the first opening 11-223 to fix and protect the first exposed part 11-415 and the second exposed part 11-417. In addition, the circuit board 11-321 at least partially overlaps the first opening 11-223 when observed along the main axis 11-M. In this way, the circuit board 11-321 may shield the first opening 11-223, and further prevent foreign matters such as dust from entering the first opening 11-223.

Figure 121:
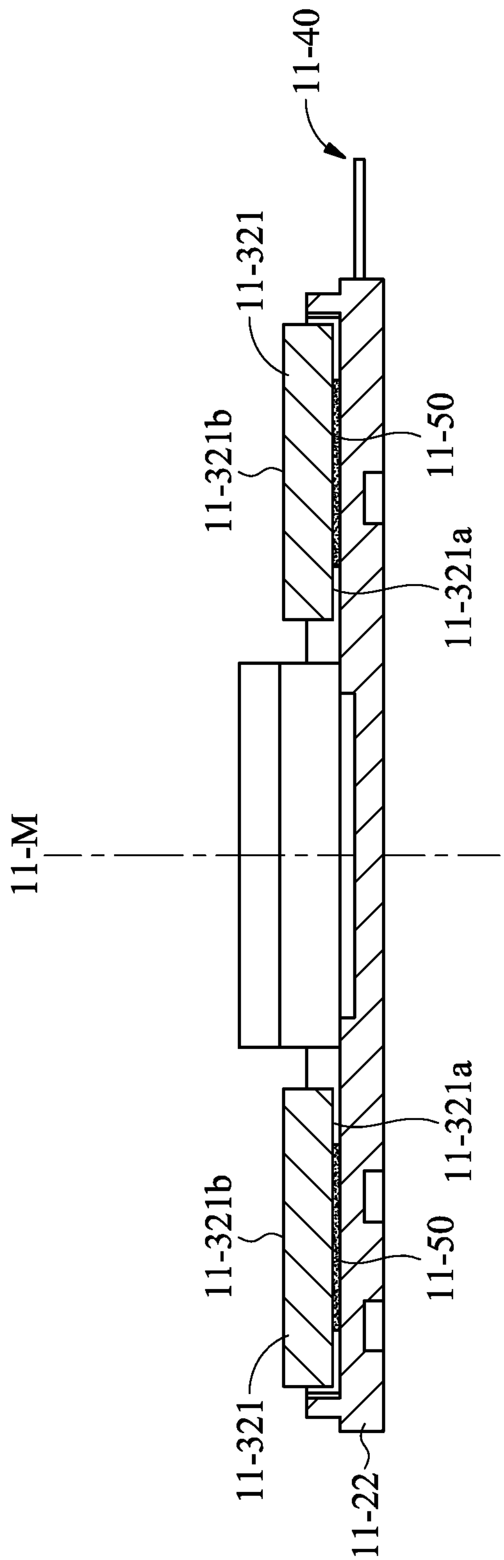
FIG. 121 shows a schematic view of the base, the circuit board and the adhesive element of the optical element driving mechanism according to an embodiment of the present disclosure.

As shown in FIG. 121, the adhesive element 11-50 of the optical element driving mechanism 11-100 is disposed between the circuit board 11-321 and the base 11-22, and the adhesive element 11-50 here may be soldering tin 11-50. It should be noted that, in some embodiments, the soldering tin 11-50 is only disposed between the circuit board 11-321 and the base 11-22. That is, the soldering tin 11-50 at least partially overlaps the circuit board 11-321 and the base 11-22 when observed along the main axis 11-M. However, the soldering tin 11-50 does not overlap the circuit board 11-321 and the base 11-22 when observed in the direction perpendicular to the main axis.

Figure 122:
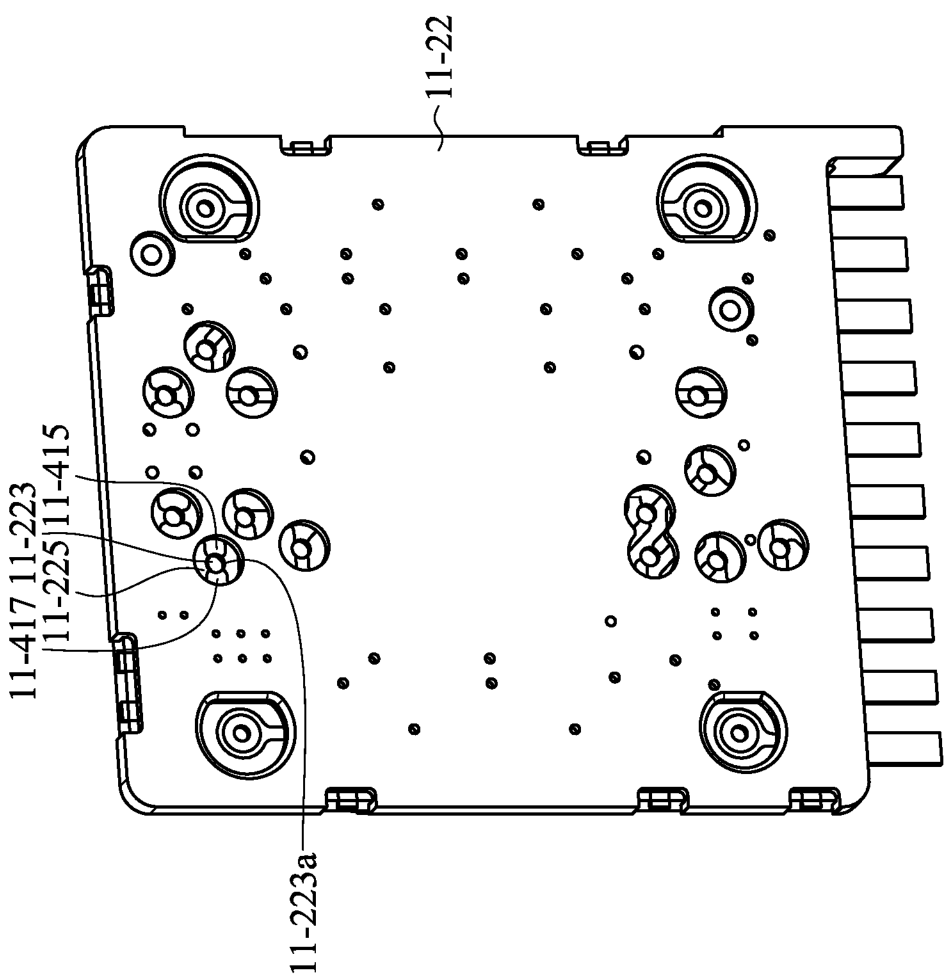
FIG. 122 shows a schematic view of the base and the circuit assembly of the optical element driving mechanism according to an embodiment of the present disclosure.

Please refer to FIG. 122, two sides of the first opening 11-223 of the base 11-22 may be provided with the recesses 11-225. In this way, the first exposed part 11-415 and the second exposed part 11-417 in the first opening 11-223 may be more securely connected to (or electrically connected to) other elements of the optical element driving mechanism 11-100 in the recess 11-225. In addition, since the first exposed part 11-415 and the second exposed part 11-417 are partially exposed to the first opening side 11-223*a*, the heat dissipation efficiency of the first exposed part 11-415 and the second exposed part 11-417 is increased to prevent the elements from overheating.

Figure 123:
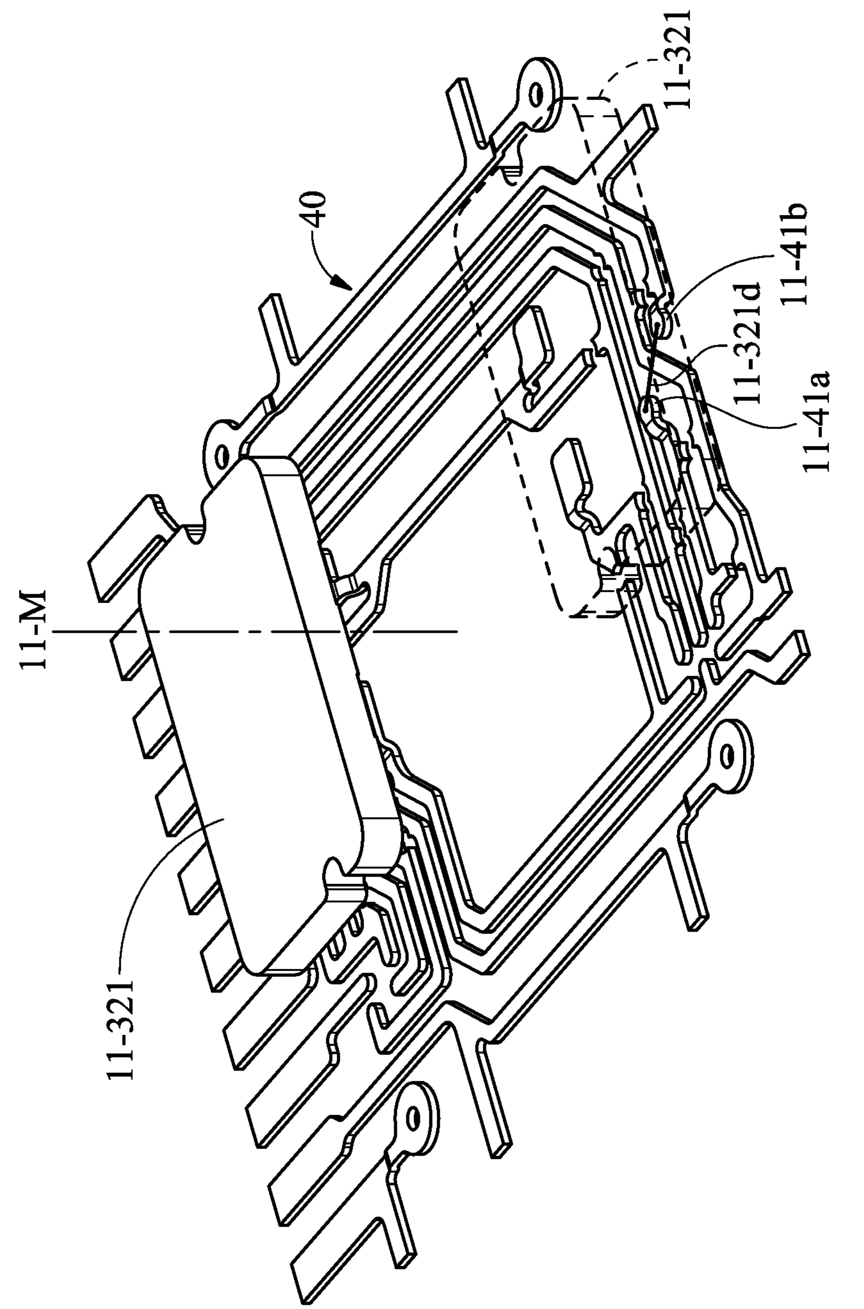
FIG. 123 shows a schematic view of a first segment and a second segment of the circuit assembly and the connecting circuit of the optical element driving mechanism according to an embodiment of the present disclosure.

Please refer to FIG. 123, the circuit 11-41 may further include a first section 11-41*a* and a second section 11-41*b*. The first section 11-41*a* is electrically connected to the second section 11-41*b* via the connecting circuit 11-321*d* of the circuit board 11-321. More specifically, the first section 11-41*a* is electrically connected to the connecting circuit 11-321*d*, and the connecting circuit 11-321*d* is electrically connected to the second section 11-41*b*. In this way, the first section 11-41*a* and the second section 11-41*b* may avoid the two-dimensional restriction by means of three-dimensional electrically connection (in the direction of the main axis 11-M), and the degrees of freedom for routing is increased.

In summary, the circuit assembly 11-40 of the optical element driving mechanism 11-100 is disposed in the base 11-22. That is, the optical element driving mechanism 11-100 of the present disclosure has the feature of circuit embedment. In this way, the optical element driving mechanism 11-100 may be integratedly manufactured, so that the structure of the optical element driving mechanism 11-100 is strengthened and the number of elements required by the optical element driving mechanism 11-100 is reduced, thereby achieving miniaturization of the optical element driving mechanism 11-100. The circuit embedment of the optical element driving mechanism 11-100 of the present disclosure not only has the above-mentioned functions, but also enables the embedded circuit to receive current, so that the circuit may be used as an electric circuit. In this way, the routing of the optical element driving mechanism 11-100 may be facilitated, and the optical element driving mechanism 11-100 does not require additional circuit assemblies, thereby achieving the effect of facilitating manufacturing and miniaturization.

Twelfth Group of Embodiments

Figure 124:
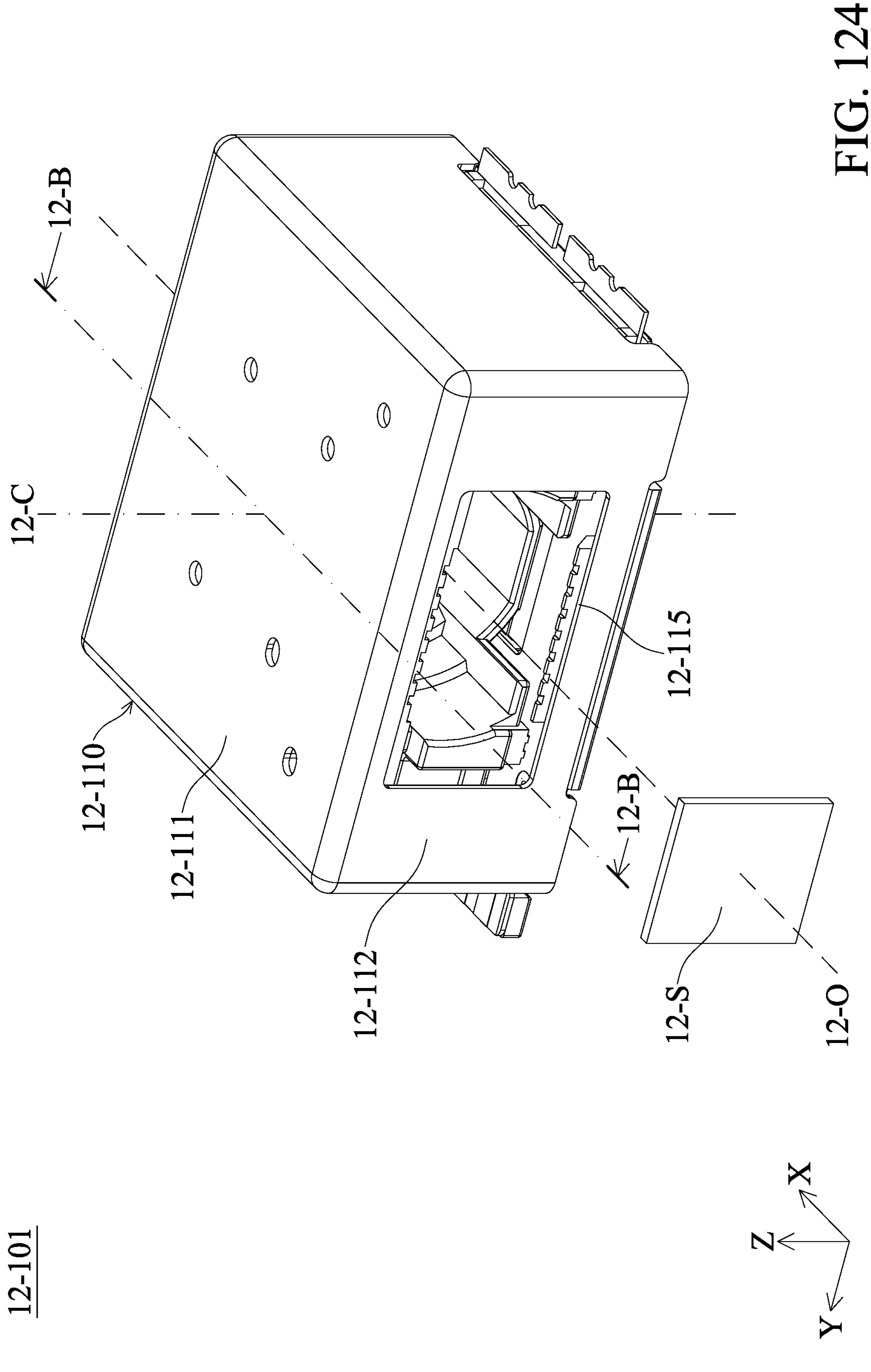
FIG. 124 is a perspective view illustrating an optical member driving mechanism in accordance with an embodiment of the present disclosure.

FIG. 124 is a schematic perspective view illustrating an optical member driving mechanism 12-101 in accordance with an embodiment of the present disclosure. It should be noted that, in this embodiment, the optical member driving mechanism 12-101 may be, for example, disposed in the electronic devices with camera function for driving an optical member (not shown), and can perform an autofocus (AF) and/or optical image stabilization (OIS) function.

Figure 126:
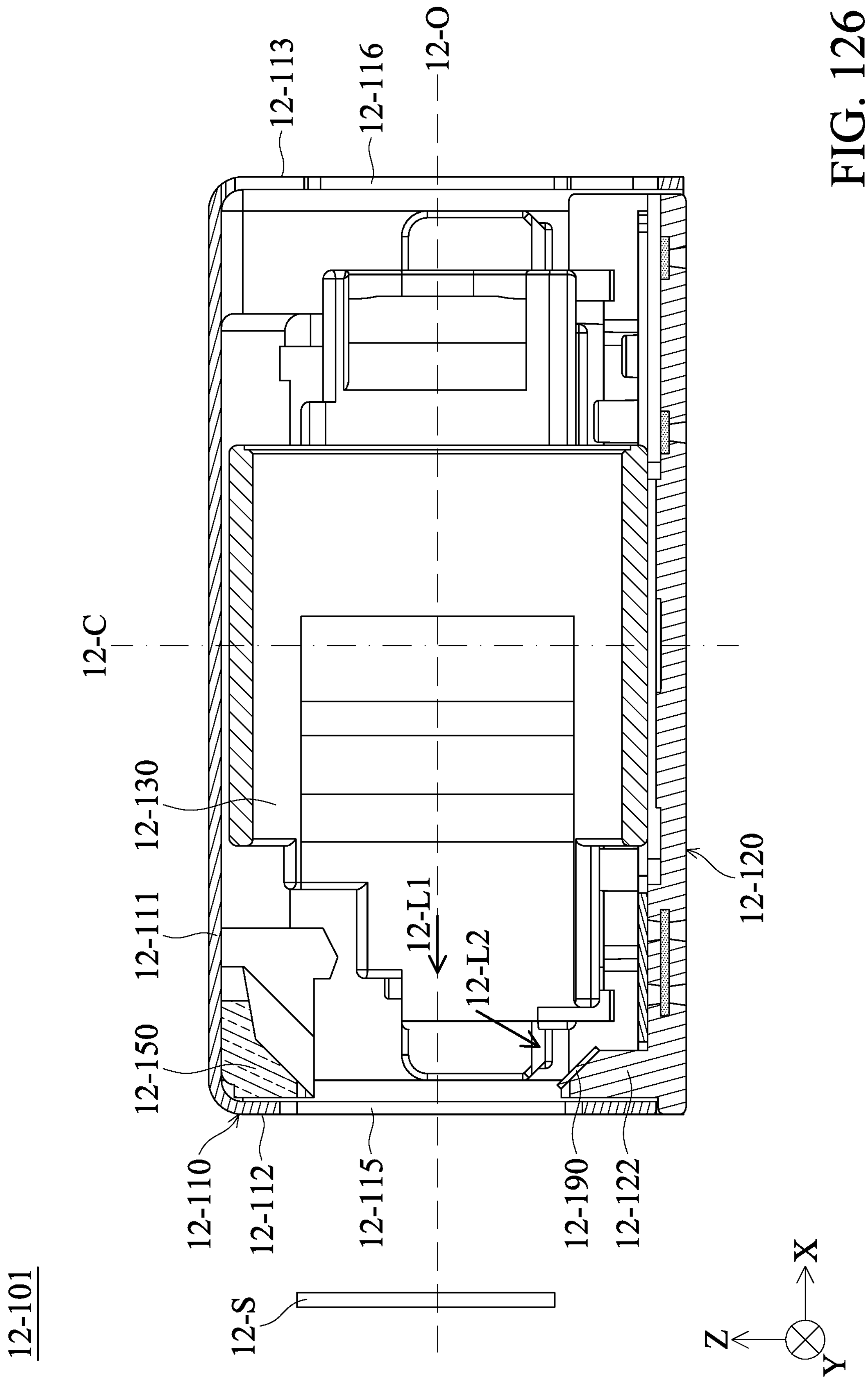
FIG. 126 is a cross-sectional view illustrating along line 12-B shown in FIG. 124.

As shown in FIG. 124, the optical member driving mechanism 12-101 has a central axis 12-C that is substantially parallel to the Z axis. The optical member has an optical axis 12-O that is substantially parallel to the X axis. In other words, in the present embodiment, the central axis 12-C is substantially perpendicular to the optical axis 12-O. The optical member driving mechanism 12-101 includes a housing 12-110 which has a top surface 12-111, a first side surface 12-112 and a second side surface 12-113 (as shown in FIG. 126) that is opposite to the first side surface 1012. The top surface 12-111 extends in a direction that is parallel to the optical axis 12-O (i.e. the X-Y plane). The first side surface 12-112 and the second side surface 12-113 extend from edges of the top surface 12-111 in a direction (the Z axis) that is perpendicular to the optical axis 12-O. In other words, in the present embodiment, the first side surface 12-112 and the second side surface 12-113 are substantially parallel to each other. In some embodiments, the first side surface 12-112 and the second side surface 12-113 extend from the edges of the top surface 12-111 in a direction that is not parallel to the optical axis 12-O.

In addition, the housing 12-110 has a rectangular first opening 12-115 that is located on the first side surface 12-112, and the optical axis 12-O may pass through the first opening 12-115. The light may pass through the optical member (not shown) which is disposed in the housing 12-110. After the light passes through the above optical member, it will travel to an optical member 12-S that is disposed outside of the housing 12-110. That is, the optical member 12-S corresponds to the first opening 12-115 of the housing 12-110. For example, the optical member 12-S is an image sensor, and thereby an image may be generated on the above electronic devices. It should be appreciated that any suitable element (not shown) may be connected between the housing 12-110 and the optical member 12-S in order to maintain the stability of the optical member 12-S for generating an image. In the present embodiment, when viewed along the optical axis 12-O (namely, the direction in which the first optical member and the second optical member are arranged), the optical member 12-S and the optical member which is located inside the housing 12-110 at least partially overlap. In addition, when viewed in a direction (e.g. the central axis 12-C) that is perpendicular to optical axis 12-O, the optical member 12-S and the optical member which is located inside the housing 12-110 do not overlap.

Figure 125:
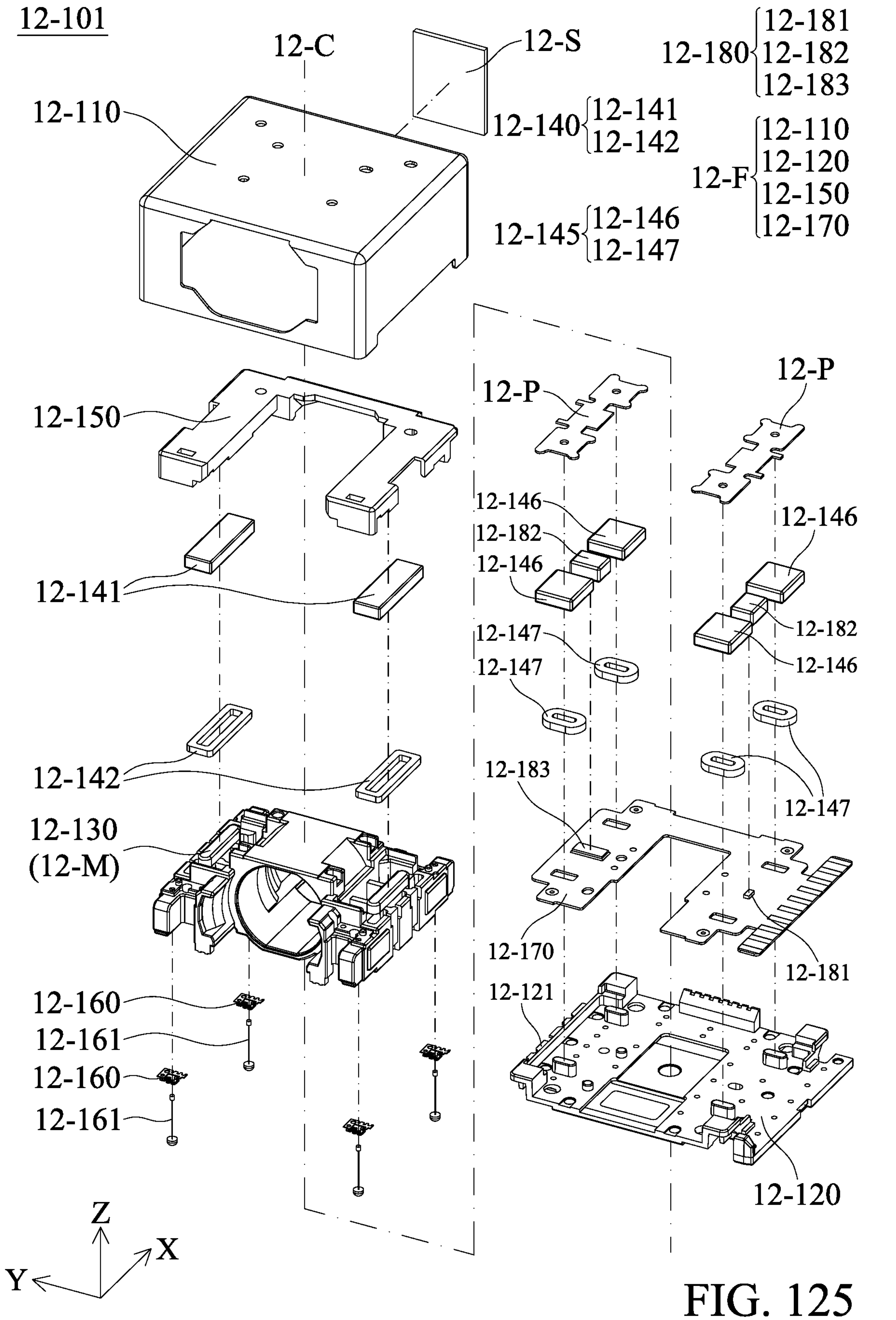
FIG. 125 is an exploded view illustrating the optical member driving mechanism shown in FIG. 124.

FIG. 125 is an exploded view illustrating the optical member driving mechanism 12-101 shown in FIG. 124. In the present embodiment, the housing 12-110 of the optical member driving mechanism 12-101 has a substantial rectangular structure. The optical member driving mechanism 12-101 mainly includes a fixed portion 12-F (e.g. a first portion), a movable portion 12-M (e.g. a second portion), a plurality of first elastic members 12-160, a plurality of second elastic members 12-161, a first electromagnetic driving assembly 12-140 and a second electromagnetic driving assembly 12-145. The fixed portion 12-F includes a housing 12-110, a base 12-120, a frame 12-150, and a circuit component 12-170.

The housing 12-110 is disposed on the base 12-120, and protect the elements disposed inside the optical member driving mechanism 12-101. In some embodiments, the housing 12-110 is made of metal or another material with sufficient hardness to provide good protection. The frame 12-150 is disposed in and affixed to the housing 12-110. The circuit component 12-170 is disposed on the base 12-120 for transmitting electric signals, performing the autofocus (AF) and/or optical image stabilization (OIS) function. For example, the optical member driving mechanism 12-101 may control the position of the optical member based on the aforementioned electric signals so as to form an image. In the present embodiment, a metallic member 12-121 is disposed in the base by insert molding, and thereby the structural strength of the base 12-120 may be enhanced.

The movable portion 12-M is movable relative to the fixed portion 12-F. The movable portion M mainly includes a carrier 12-130 which carries an optical member. As shown in FIG. 125, the carrier 12-130 is movably connected to the housing 12-110 and the base 12-120. The first elastic members 12-160 are disposed on the carrier 12-130. The second elastic members 12-161 extend in a vertical direction (the Z axis), and are connected to the first elastic members 12-160 and the base 12-120. As a result, the carrier 12-130 may be connected to the base 12-120 via the first elastic members 12-160 and the second elastic members 12-161. For example, the first elastic members 12-160 and the second elastic members 12-161 are made of metal or another suitable elastic material.

The first electromagnetic driving assembly 12-140 includes first magnetic members 12-141 and first coils 12-142. The first magnetic members 12-141 may be disposed on the frame 12-150, and the corresponding first coils 12-142 are disposed on the carrier 12-130. When current is applied to the first coils 12-142, an electromagnetic driving force may be generated by the first coils 12-142 and the first magnetic members 12-141 (i.e. the first electromagnetic driving assembly 12-140) to drive the carrier 12-130 and the optical member carried therein to move along a horizontal direction (the X-Y plane) relative to the base 12-120, performing the autofocus (AF) and/or optical image stabilization (OIS) function.

In addition, the second electromagnetic driving assembly 12-145 includes second magnetic members 12-146 and second coils 12-147. The second magnetic members 12-146 may be disposed on the carrier 12-130, and the corresponding second coils 12-147 are disposed on the base 12-120. For example, the second coils 12-147 may be flat-plate coils such that the difficulty and the required time for assembly may be reduced. When a current is applied to the second coils 12-147, an electromagnetic driving force may be generated by the second electromagnetic driving assembly 12-145 to drive the carrier 12-130 and the optical member carried therein to move along the optical axis O (the X axis) relative to the base 12-120, performing the autofocus (AF) function. The carrier 12-130 may be movably suspended between the frame 12-150 and the base 12-120 by the electromagnetic driving force of the first electromagnetic driving assembly 12-140, the second electromagnetic driving assembly 12-145 and the force exerted by the first elastic members 12-160, the second elastic members 12-161. Furthermore, a magnetic permeable plate 12-P is disposed on the second magnetic members 12-146 for concentrating the magnetic field of the second magnetic members 12-146 so that the efficiency of the second electromagnetic driving assembly 12-145 may be improved. In some embodiments, the magnetic permeable plate 12-P may be made of metal or another material with sufficient magnetic permeability.

The sensing assembly 12-180 includes a sensor 12-181, a reference member 12-182 and an integrated circuit (IC) component 12-183. In the present embodiment, the sensor 12-181 and the integrated circuit component 12-183 are disposed on the base 12-120, and the reference member 12-182 is disposed in the carrier 12-130. A plurality of reference members 12-182 may be disposed. For example, the reference member 12-182 is a magnetic member, the sensor 12-181 may detect the change of the magnetic field of the reference member 12-182, and the position of the carrier 12-130 (and the optical member) may be determined by the integrated circuit component 12-183. In some embodiments, the sensor 12-181 or the reference member 12-182 is disposed on the fixed portion 12-F, and the other of the sensor 12-181 or the reference member 12-182 is disposed on the movable portion 12-M.

FIG. 126 is a cross-sectional view illustrating along line B-B shown in FIG. 124. As shown in FIG. 126, the housing 12-110 has a second opening 12-116, and the optical axis 12-O may pass through the second opening 12-116. In the present embodiment, the optical member driving mechanism 12-101 has an incident end and an outlet end, wherein the incident end corresponds to the second opening 12-116, and the outlet end corresponds to the first opening 12-115. In the present embodiment, the light may enter the optical member from the incident end (i.e. the second opening 12-116) along the optical axis 12-O, and exit the optical member from the outlet end (i.e. the first opening 12-115). In the present embodiment, the frame 12-150 is disposed between the carrier 12-130 and the housing 12-110. When viewed in a direction (the X axis) that is parallel to the optical axis 12-O, the frame 12-150 and the carrier 12-130 at least partially overlap.

In addition, the base 12-120 further has a barrier 12-122 that is disposed to protrude towards the top surface 12-111. The barrier 12-122 may have a fillet structure, and when viewed along the optical axis 12-O from the first opening 12-115, the fillet structure is formed on the edge of the first opening 12-115. The optical member driving mechanism 12-101 further includes a matrix structure 12-190 that is disposed on the barrier 12-122 (such as disposed on the fillet structure of the barrier 12-122). The matrix structure 12-190 is disposed between the optical member 12-S and the optical member which is carried by the carrier 12-130. For example, a first light 12-L1 (e.g. the desired light to form an image) entering the optical member driving mechanism 12-101 may travel along the optical axis 12-O, reach the optical member 12-S and form an image after passing through the optical member which is carried by the carrier 12-130. Furthermore, a second light 12-L2 (such as the noise to be removed) may travel along a direction that is not parallel to the optical axis 12-O, and be reflected by the matrix structure 12-190 after passing through the optical member which is carried by the carrier 12-130, remaining inside the housing 12-110. By means of the arrangement of the matrix structure 12-190, the possibility that the second light 12-L2 reaches the optical member 12-S may be effectively reduced, therefore preserving the image quality.

As shown in FIG. 126, the extending direction of the matrix structure 12-190 is not parallel and not perpendicular to the traveling direction (i.e. the optical axis 12-O) of the first light 12-L1. It should be appreciated that those skilled in the art may adjust the extending direction of the matrix structure 12-190 in response to the traveling direction of the second light 12-L2, and it will not be repeated in the following paragraphs. In the present embodiment, when viewed along the optical axis 12-O, the matrix structure 12-190 and the first opening 12-115 at least partially overlap.

Figure 127:
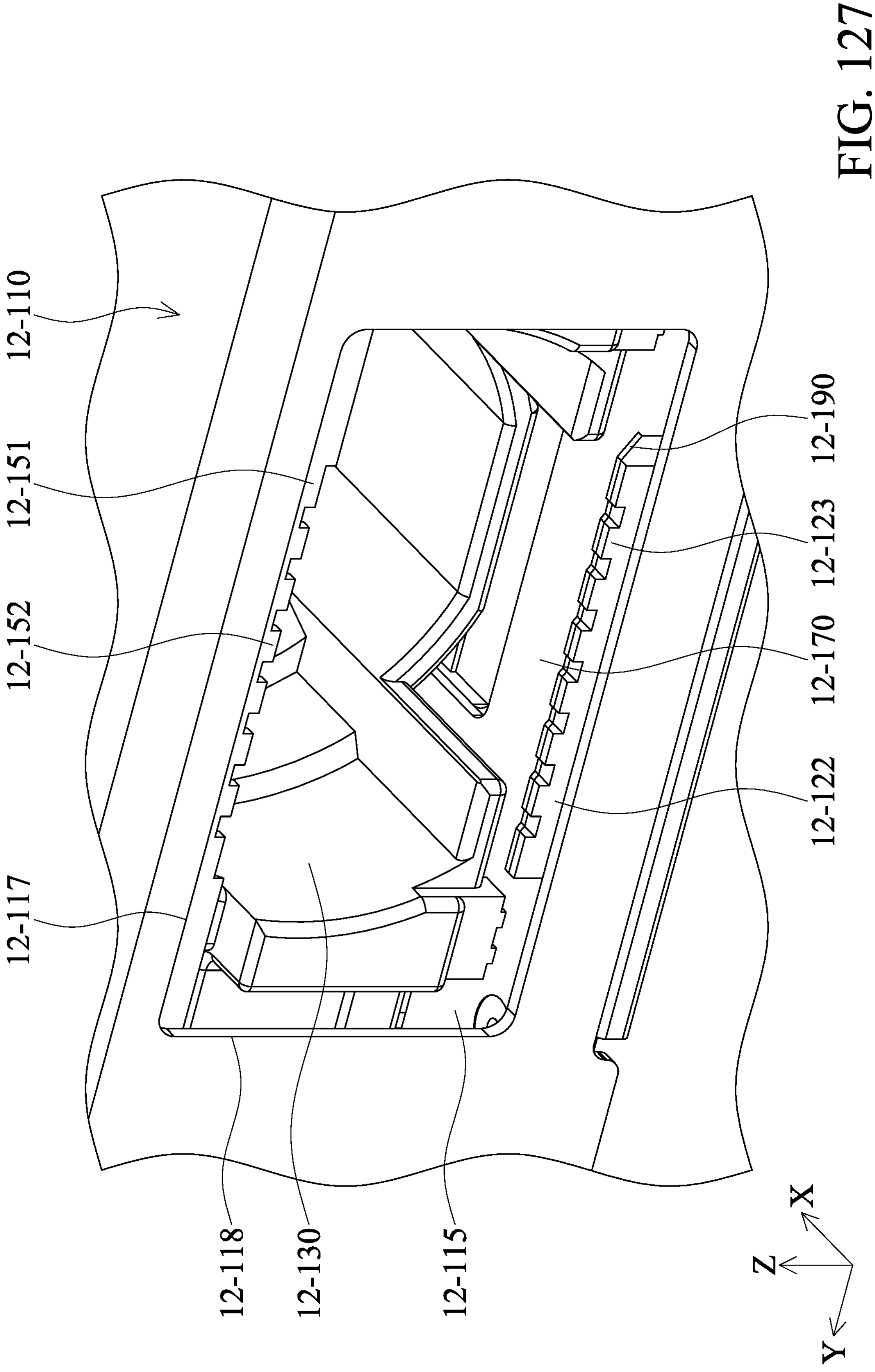
FIG. 127 is an enlarged perspective view illustrating the optical member driving mechanism shown in FIG. 124.

FIG. 127 is an enlarged perspective view illustrating the optical member driving mechanism 12-101 shown in FIG. 124 from the outlet end. As shown in FIG. 127, when viewed in a direction (the X axis) that is parallel to the optical axis 12-O, the barrier 12-122 and a lengthwise side 12-117 of the first opening 12-115 at least partially overlap, and a gap is formed between the barrier 12-122 and a widthwise side 12-118 of the first opening 12-115. In other words, when viewed in the same direction as above, the barrier 12-122 and the widthwise side 12-118 of the first opening 12-115 do not overlap. In addition, the frame 12-150 has a light-shielding structure 12-151 that is disposed to protrude towards the base 12-120. When viewed in the direction (the X axis) that is parallel to the optical axis O, the light-shielding structure 12-151 and the lengthwise side 12-117 of the first opening 12-115 also at least partially overlap. Similarly, a gap is formed between the light-shielding structure 12-151 and the widthwise side 12-118 of the first opening 12-115. In other words, when viewed in the same direction as above, the light-shielding structure 12-151 and the widthwise side 12-118 of the first opening 12-115 do not overlap.

In some embodiments, jagged structures 12-123, 12-152 may be formed on the barrier 12-122 and/or the light-shielding structure 12-151 by a laser engraving process. In some other embodiments, any other regular or irregular structure may be formed on the barrier 12-122 and/or the light-shielding structure 12-151 so as to reduce the possibility that the noise reflected in the optical member driving mechanism 12-101 enters the image sensor, enhancing the image quality. It should be noted that although the barrier 12-122 and the light-shielding structure 12-151 are both disposed in the present embodiment, it merely serves as an example. Those skilled in the art may determine whether the barrier 12-122 and/or the light-shielding structure 12-151 are disposed, or adjust the position of the barrier 12-122 and/or the light-shielding structure 12-151 as required.

Figure 128:
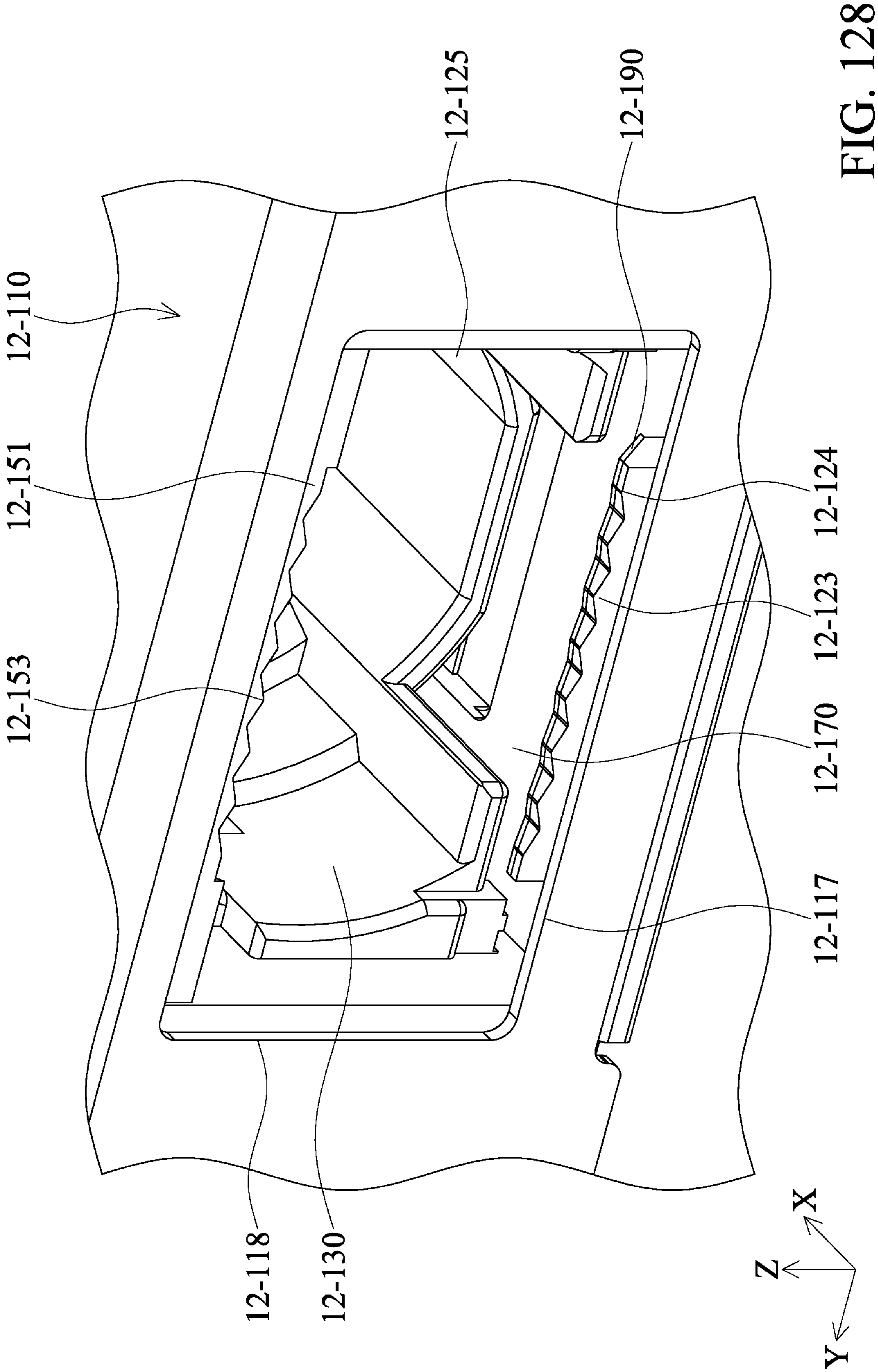

FIG. 128 is an enlarged perspective view illustrating the optical member driving mechanism in accordance with another embodiment of the present disclosure. In the present embodiment, the jagged structure 12-123 includes multiple tapered structure, and has a plurality of peaks 12-124. The jagged structure 12-152 also has a plurality of peaks 12-153. As shown in FIG. 128, When viewed in the direction (the X axis) that is parallel to the optical axis 12-O, the peaks 12-124, 12-153 may be exposed from the first opening 12-115. In some embodiments, the distance between the lengthwise side 12-117 of the first opening 12-115 and the peaks 12-124, 12-153 is equal to or longer than 0.25 mm, and thereby the noise may be effectively blocked, preventing the noise from entering the image sensor. In addition, the matrix structure 12-190 may be disposed on the jagged structure 12-123 and/or the jagged structure 12-152. As a result, the possibility that the noise (e.g. the second light 12-L2 shown in FIG. 126) reaches the optical member 12-S may be further reduced, therefore preserving the image quality.

Figure 129:
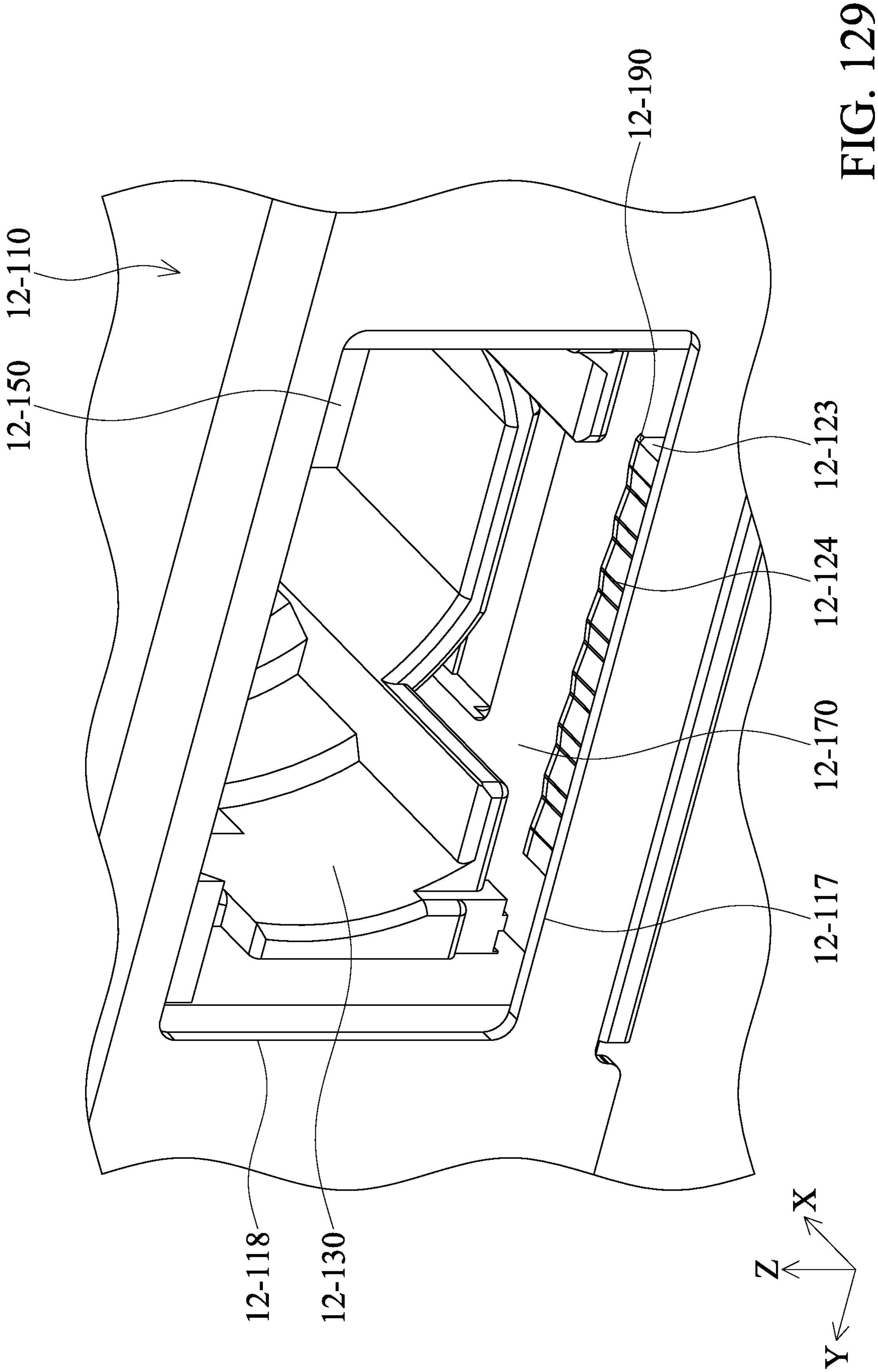

FIG. 129 is an enlarged perspective view illustrating the optical member driving mechanism in accordance with another embodiment of the present disclosure. As shown in FIG. 129, when viewed in the direction (the X axis) that is parallel to the optical axis 12-O, the peaks 12-124, 12-153 may not be exposed from the first opening 12-115. Namely, the peaks 12-124, 12-153 may overlap with the housing 12-110. In some embodiments, the distance between the lengthwise side 12-117 of the first opening 12-115 and the peaks 12-124, 12-153 is equal to or longer than 0.1 mm, and thereby the noise entering the image sensor may be effectively reduced. In addition, the matrix structure 12-190 may be disposed on the jagged structure 12-123 and/or the jagged structure 12-152 (as shown in FIG. 128). As a result, the possibility that the noise reaches the optical member 12-S may be further reduced, therefore preserving the image quality.

Figure 130:
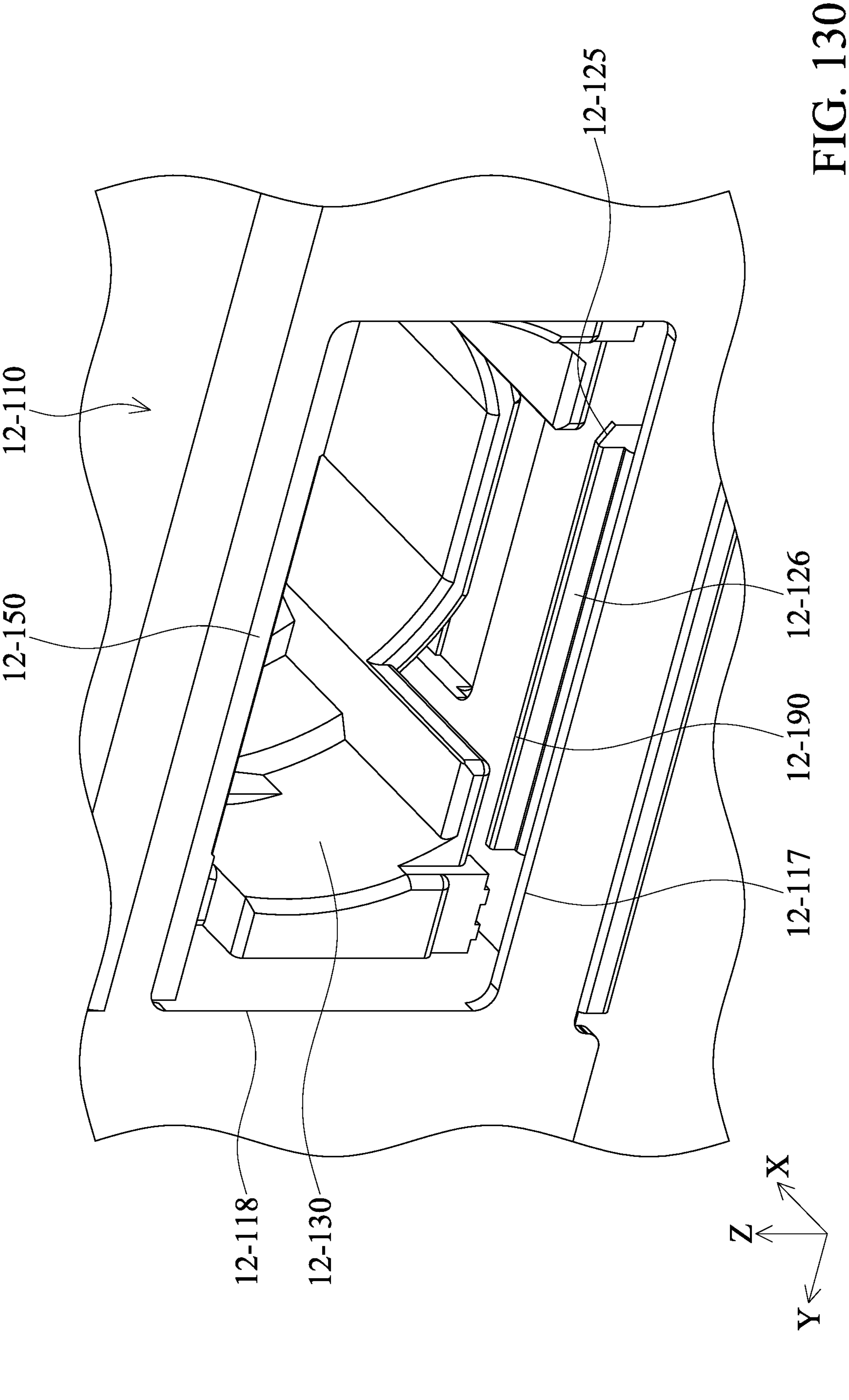

FIG. 130 is an enlarged perspective view illustrating the optical member driving mechanism in accordance with another embodiment of the present disclosure. In the present embodiment, the barrier 12-122 has an upper surface 12-125 and a cutting surface 12-126 that intersects with the upper surface 12-125. A tapered structure is formed by the upper surface 12-125 and the cutting surface 12-126. The upper surface 12-125 is upwardly inclined, namely facing the carrier 12-130 and the top surface 12-111. The cutting surface 12-126 is substantially perpendicular to the optical axis 12-O, facing the first side surface 12-112. In some embodiments, a fillet between the upper surface 12-125 and the cutting surface 12-126 is not greater than 0.05 mm. Similarly, the light-shielding structure 12-151 has a lower surface (not shown) and a cutting surface that intersects with the lower surface. In some embodiments, a fillet between the lower surface and the cutting surface is not greater than 0.05 mm. In addition, the matrix structure 12-190 may be disposed on the upper surface 12-125 of the barrier 12-125 and/or on the lower surface of the light-shielding structure 12-151. As a result, the possibility that the noise reaches the optical member 12-S may be further reduced, therefore preserving the image quality.

It should be understood that multiple embodiments for arranging the matrix structure 12-190 are provided as above, but these embodiments merely serve as examples without limiting the scope of the present disclosure. Those skilled in the art may arrange the matrix structure 12-190 on the fixed portion 12-F (including the housing 12-110, the base 12-120, the frame 12-150 and/or the circuit component 12-170) and/or the movable portion 12-M. In addition, although in the embodiments of the present disclosure, the matrix structure 12-190 is disposed as planar, however in some embodiments the matrix structure 12-190 may be disposed as curved (i.e. having a curvature). In some embodiments, the matrix structure 12-190 may be disposed on an element or portion that is made of metal.

Figure 131:
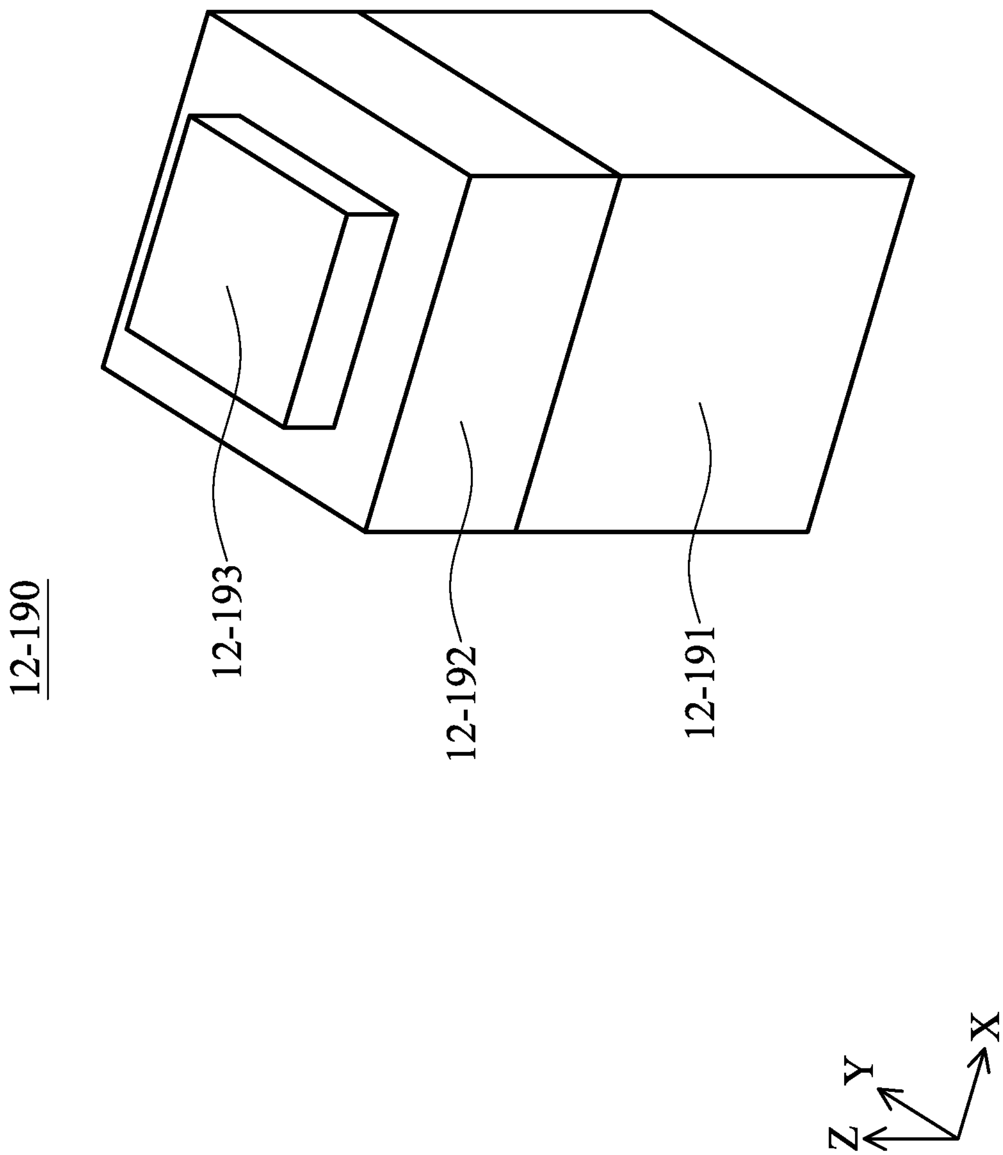

FIG. 131 is a schematic view illustrating the matrix structure 12-190 in accordance with an embodiment of the present disclosure. As shown in FIG. 131, the matrix structure 12-190 is multi-layered and includes a metallic layer 12-191, an insulating layer 12-192 and a protruding portion 12-193. The metallic layer 12-191 is the bottommost layer of the matrix structure 12-190. For example, the material of the metallic layer 12-191 includes gold (Au), silver (Ag), aluminum (Al), any other suitable metallic material or a combination thereof. The insulating layer 12-192 is formed on the metallic layer 12-191. For example, the material of the insulating layer 12-192 includes magnesium fluoride (MgF2), silicon dioxide (SiO2), any other suitable insulating material or a combination thereof. The protruding portion 12-193 is formed on the insulating layer 12-192, wherein the area of the protruding portion 12-193 on the horizontal plane (the X-Y plane) may be smaller than the area of the insulating layer 12-192 on the horizontal plane. That is, when viewed in a vertical direction, the insulating layer 12-192 may be exposed from the protruding portion 12-193. For example, the material of the protruding portion 12-193 includes gold (Au), silver (Ag), aluminum (Al), any other suitable metallic material or a combination thereof. In some embodiments, the metallic layer 12-191 and the protruding portion 12-193 may be formed of the same material. In some other embodiments, the metallic layer 12-191 and the protruding portion 12-193 may be formed of different materials.

Figure 132:
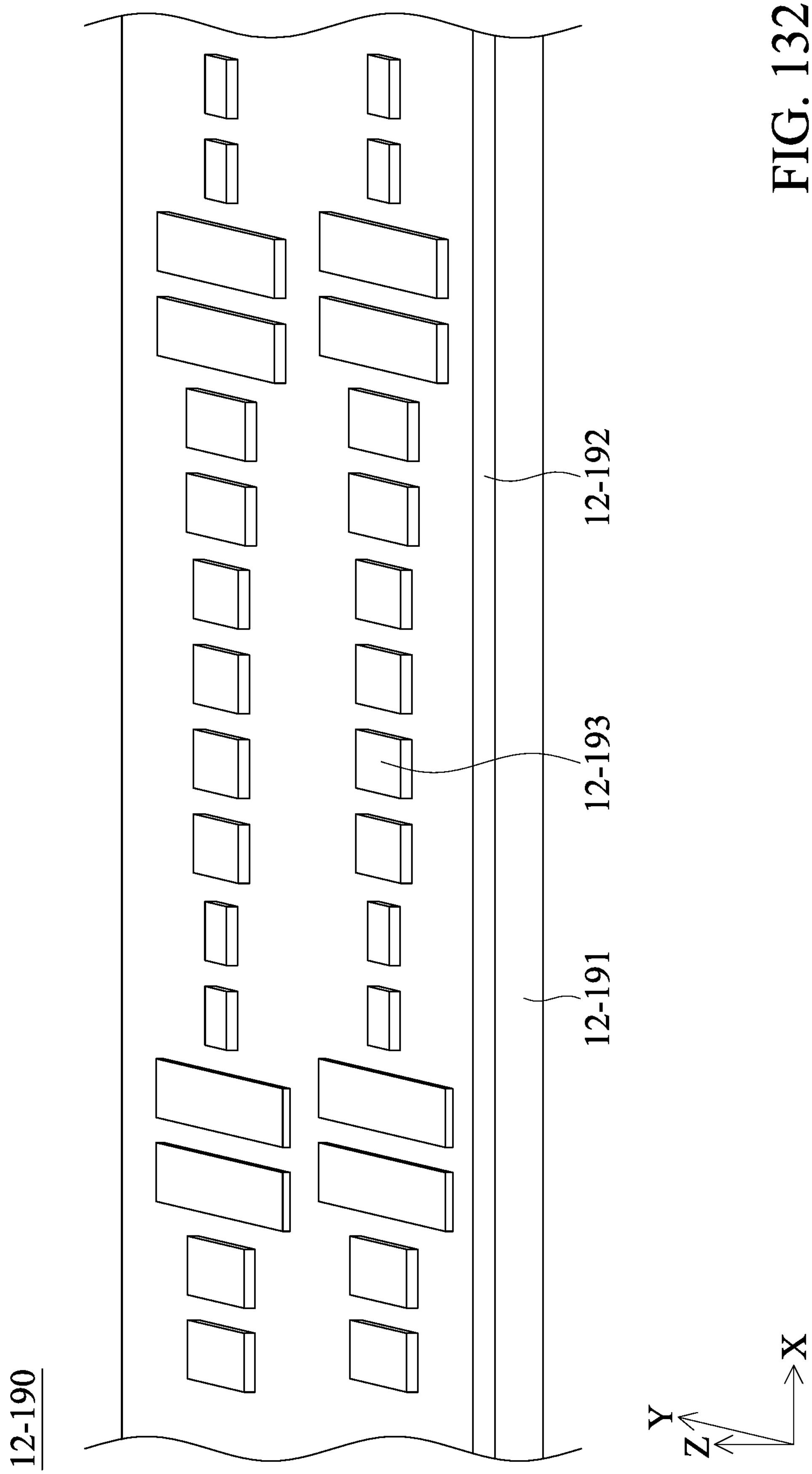

FIG. 132 is a perspective view illustrating the matrix structure 12-190 in accordance with an embodiment of the present disclosure. As shown in FIG. 132, the matrix structure 12-190 has a plurality of protruding portions 12-193 with different sizes. The protruding portions 12-193 are formed on the insulating layer 12-192. By means of arranging the protruding portions 12-193 in a particular manner, the surface plasmon resonance (SPR) generated by the matrix structure 12-190 may be tuned, such that the direction of the light reflected by the matrix structure 12-190 may be controlled. As a result, the possibility that the noise reaches the optical member 12-S may be further reduced, therefore preserving the image quality. It should be understood that the arrangement (such as the sizes or arrangement of each of the protruding portions 12-193) of the matrix structure 12-190 may be adjusted in response to light (e.g. visible light, infrared light, etc.) with certain range of wavelength. Therefore, the function to avoid the noise worsening the image quality may be achieved.

As set forth above, the embodiments of the present disclosure provide an optical member driving mechanism including a matrix structure that corresponds to the noise. By means of the arrangement of the matrix structure, the possibility that the noise reaches the optical member may be further reduced, therefore preserving the image quality. As a result, the optical member driving mechanism may be simplified and miniaturized. In addition, the matrix structure may be disposed with other anti-refection structures (such as barriers), further enhancing the preservation for high-quality image.

Thirteenth Group of Embodiments

Figure 133:
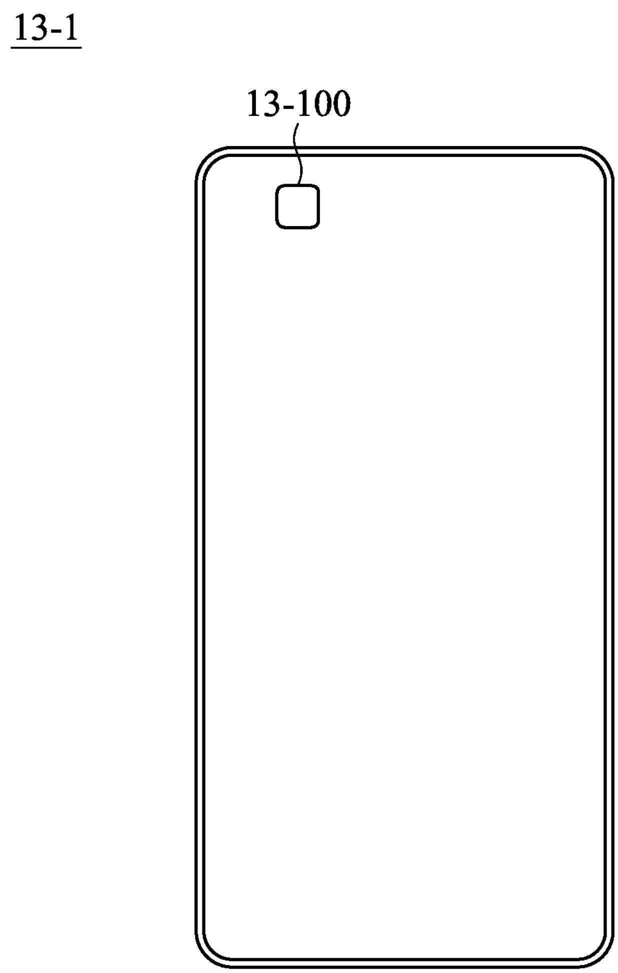

Firstly, please refer to FIG. 133, an optical system 13-100 of an embodiment of the present disclosure may be mounted in an electrical device 13-1 for taking photos or videos, wherein the aforementioned electrical device 13-1 may, for example, be a smartphone or a digital camera, but the present disclosure is not limited to these. It should be noted that the position and the size between the optical system 13-100 and the electrical device 13-1 shown in FIG. 133 are only an example, which is not for limiting the position and the size between the optical system 13-100 and the electrical device 13-1. In fact, according to different needs, the optical system 13-100 can be mounted at different positions in the electrical device 13-1.

Figure 134:
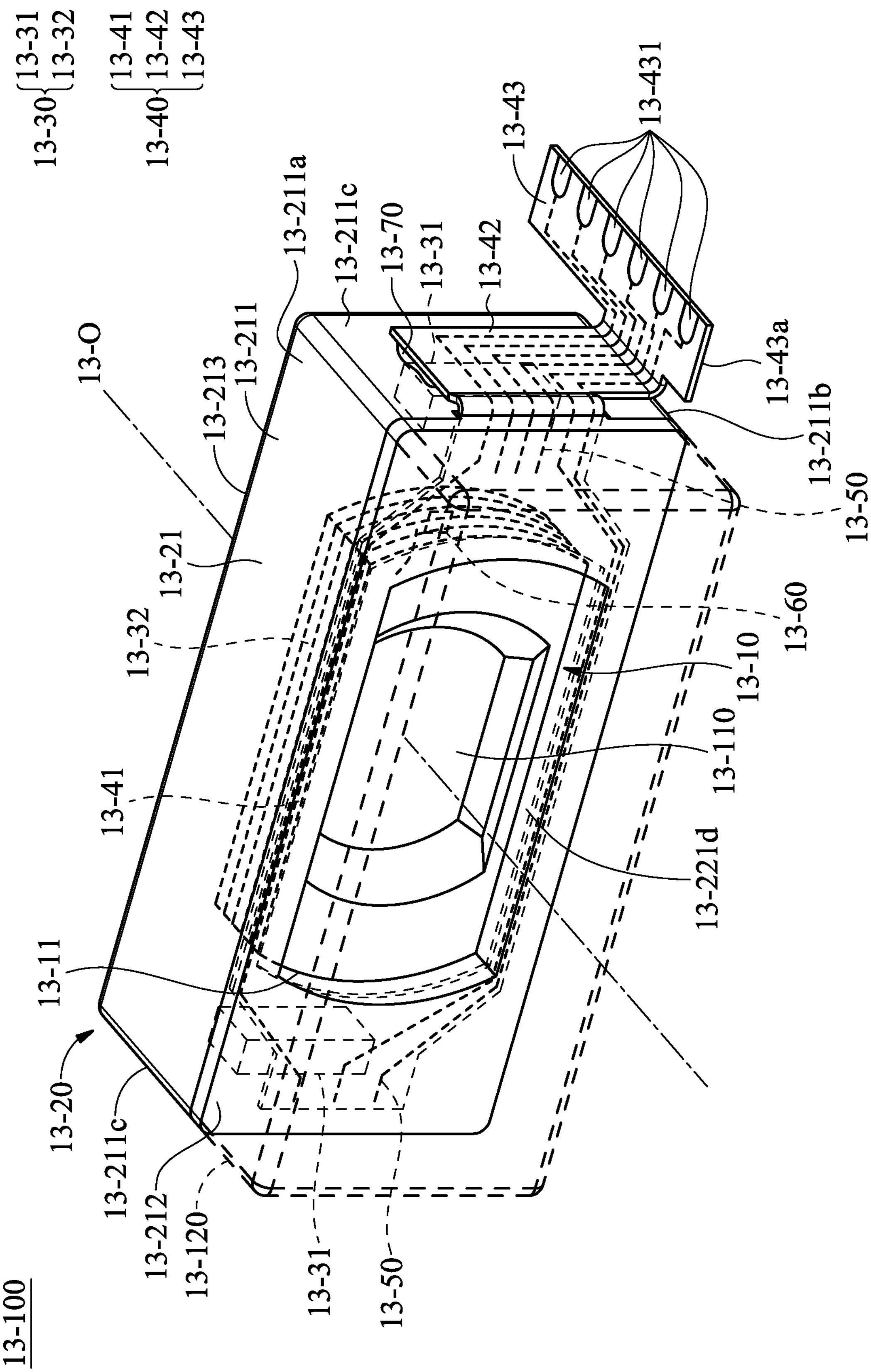
Figure 135:
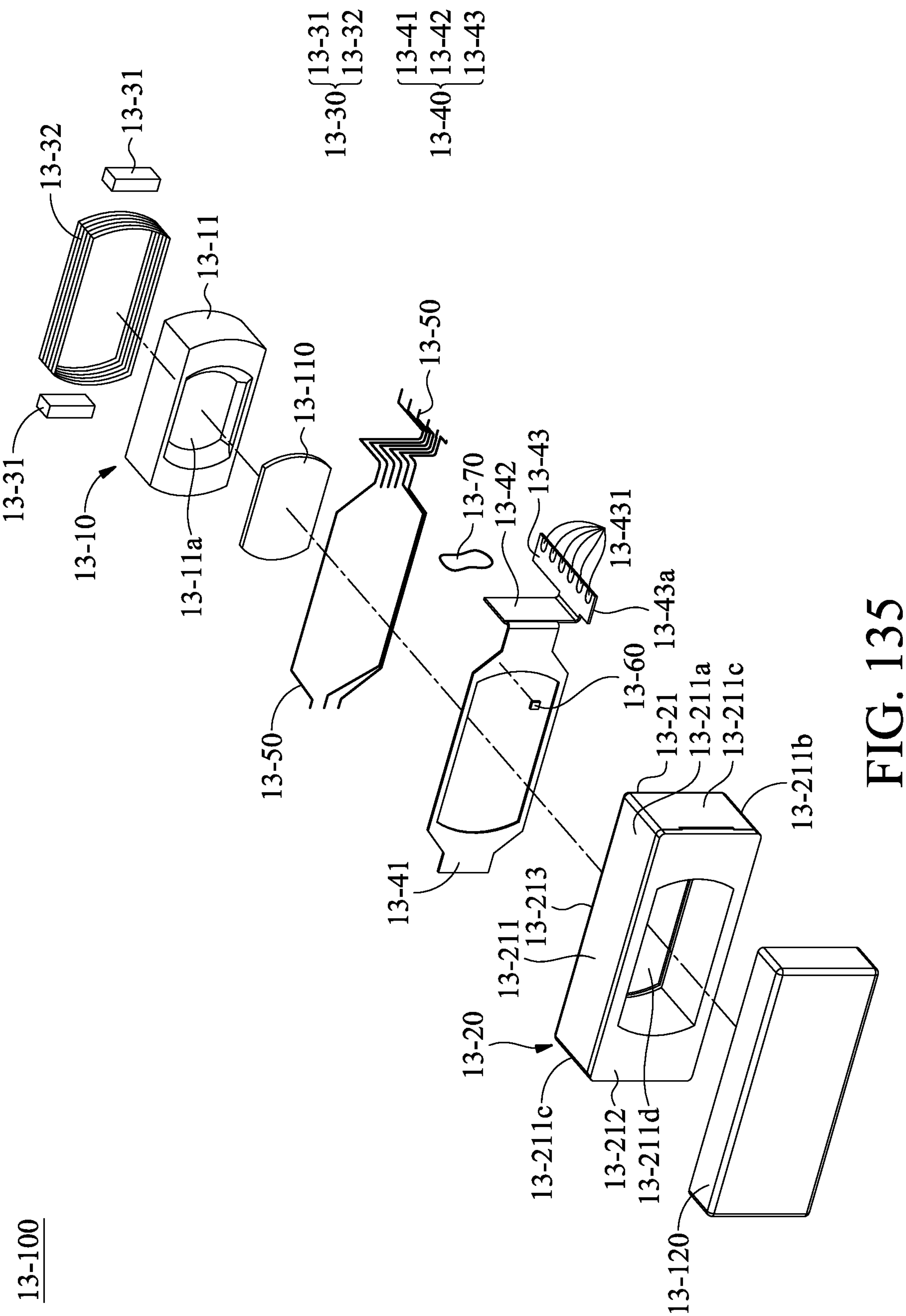

Please refer to FIGS. 134 and 135, the optical system 13-100 includes a first optical element 13-110, a second optical element 13-120, a movable part 13-10, a fixed part 13-20, a driving assembly 13-30, a circuit assembly 13-40, two metal circuit assembly 13-50, at least one sensing assembly 13-60 and a connecting element 13-70.

As shown in FIG. 134, the first optical element 13-110 is connected to the movable part 13-10, and the first optical element 13-110 has an optical axis 13-O. The first optical element 13-110 has two sides that are not curved. The second optical element 13-120 is connected to the fixed part 13-20, and the second optical element 13-120 may be an image sensing element.

As shown in FIG. 135, the movable part 13-10 includes a holder 13-11. The holder 13-11 has a hollow ring structure, and has a through hole 13-11*a* to accommodate the first optical element 13-110.

As shown in FIG. 134, the fixed part 13-20 includes a fixed part outer frame 13-21. The fixed part outer frame 13-21 includes a fixed part outer frame body 13-211, a fixed part outer frame surface 13-212, and a fixed part outer frame bottom surface 13-213. The fixed part outer frame body 13-211 includes a fixed part outer frame body top surface 13-211*a*, a fixed part outer frame body bottom surface 13-211*b*, two fixed part outer frame body sides 13-211*c*, and a fixed part outer frame body opening 13-211*d*. The fixed part outer frame body opening 13-211*d* accommodates the holder 13-11 and the first optical element 13-110.

As shown in FIG. 134, the driving assembly 13-30 may drive the movable part 13-10 to move relative to the fixed parts 13-20. The driving assembly 13-30 includes two driving magnetic elements 13-31 and a driving coil 13-32. The driving magnetic element 13-31 is disposed in the fixed part outer frame body opening 13-211*d* and may be located between the holder 13-11 and the fixed part outer frame body side 13-211*c*. The driving coil 13-32 is disposed on the holder 13-11. Specifically, the driving coil 13-32 surrounds the holder 13-11. When the driving coil 13-32 receives an external current, the driving coil 13-32 can interact with the driving magnetic element 13-31 and generate an electromagnetic driving force to drive the holder 13-11 to move along the optical axis 13-O relative to the fixed part 13-20.

Please refer to FIG. 134, the circuit assembly 13-40 is electrically connected to the driving assembly 13-30. The circuit assembly 13-40 includes a circuit board body 13-41, a circuit board extending part 13-42, and a circuit board pin part 13-43. The circuit board body 13-41 is located between the fixed part outer frame body 13-211 and the fixed part outer frame surface 13-212. The circuit board body 13-41 is connected to the circuit board extending part 13-42, and the circuit board extending part 13-42 is connected to the circuit board pin part 13-43. The circuit board pin part 13-43 includes a plurality of pins 13-431 and a circuit board pin part bottom surface 13-43*a*. The pins 13-431 are arranged along the optical axis 13-O. In the present embodiment, the circuit board pin part 13-43 includes six pins 13-431, wherein two of the pins 13-431 are used for the driving coil 13-32, and the remaining four pins 13-431 are used for the sensing element 13-60.

Please refer to FIG. 135, the metal circuit assembly 13-50 is provided on the circuit assembly 13-40, and the metal circuit assembly 13-50 is electrically connected to the pin 13-431. The sensing assembly 13-60 is provided on the circuit board body 13-41, and the sensing assembly 13-60 may detect the change of the magnetic field generated by the driving magnetic element 13-31, thereby determining the position of the movable part 13-10 and the first optical element 13-110. Accordingly, the driving assembly 13-30 may drive the movable part 13-10 to move relative to the fixed part 13-20 based on the detection result of the sensing assembly 13-60.

In some embodiments, the movable part 13-10 may further include a reference element (not shown), the reference element may be disposed in the movable part 13-10. The sensing assembly 13-60 may detect the change in the magnetic field generated by the reference element, thereby determining the position of the movable part 13-10 and the first optical element 13-110. In some embodiments, either the sensing assembly 13-60 or the reference element may be provided on the fixed part 13-20, while the other one of the sensing assembly 13-60 and the reference element may be disposed in the movable part 13-10.

Figure 136:
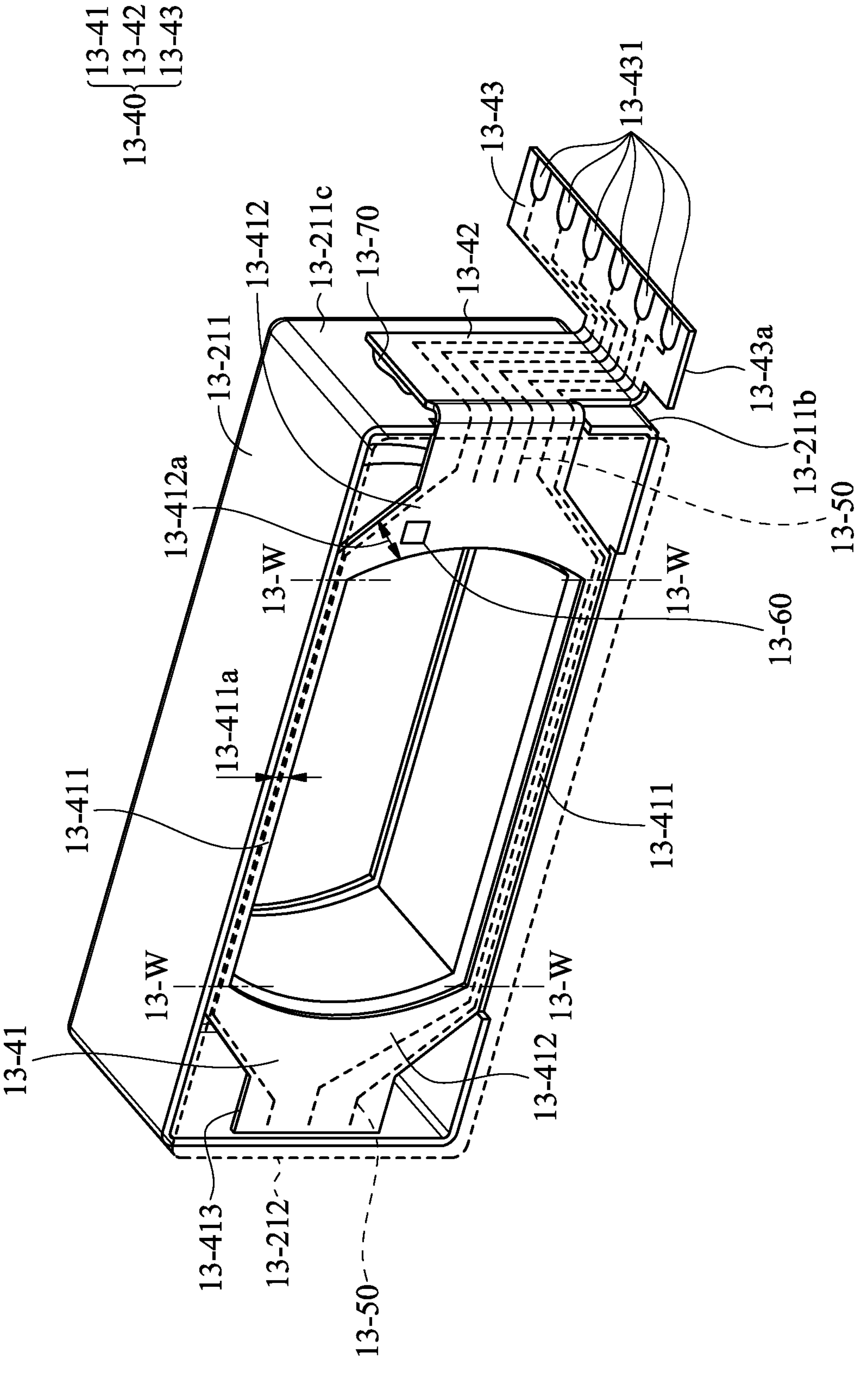

Please refer to FIG. 136, the circuit board body 13-41 has two first sides 13-411 and two second sides 13-412. The boundaries between the two first sides 13-411 and the second sides 13-412 are four dashed lines 13-W. The first side 13-411 has a linear structure, and the second side 13-412 has a curved structure. Moreover, a first width 13-411*a* of the first side 13-411 is substantially uniform, while a second width 13-412*a* of the second side 13-412 is non-uniform. Furthermore, the first width 13-411*a* of the first side 13-411 and the second width 13-412*a* of the second side 13-412 are different. More specifically, a size of the second width 13-412*a* is substantially greater than a size of the first width 13-411*a*. The sensing element 13-60 is disposed on the second side 13-412, and the sensing element 13-60 is electrically connected to the metal circuit assembly 13-50 to detect the movement of the holder 13-11. The circuit board body 13-41 has a two-layered plate structure 13-413. The metal circuit assemblies 13-50 are respectively located in different layers of the two-layered plate structure 13-413. In this way, a short circuit between the metal circuit assemblies 13-50 themselves may be avoided, and it is convenient for electrically connecting the metal circuit assemblies 13-50 to the pins 13-431 of the circuit board pin part 13-43.

As shown in FIG. 136, the circuit board extending part 13-42 is connected to the circuit board body 13-41, and the circuit board extending part 13-42 is attached to the fixed part outer frame body side 13-211*c* of the fixed part outer frame body 13-211. Furthermore, the connecting element 13-70 is provided between the circuit board extending part 13-42 and the fixed part outer frame body side 13-211*c*, so that the circuit board extending part 13-42 may be more securely attached to the fixed part outer frame body side 13-211*c*.

Please continue to refer to FIG. 136, the circuit board pin part bottom surface 13-43*a* is coplanar with and the fixed part outer frame body bottom surface 13-211*b*. In this way, the contact area between the optical system 13-100 and the electrical device 13-1 is increased, and the optical system 13-100 may be mounted in the electrical device 13-1 more securely.

As shown in FIG. 136, the circuit board body 13-41 is coplanar with the fixed part outer frame surface 13-212, the circuit board extending part 13-42 is coplanar with and the fixed part outer frame body side 13-211*c*, and the circuit board pin part 13-43 is coplanar with the fixed part outer frame body bottom surface 13-211*b*. That is, the circuit assembly 13-40 has a three-dimensional structure, and the circuit board body 13-41, the circuit board extending part 13-42, and the circuit board pin part 13-43 are not coplanar. In this way, the volume of the circuit assembly 13-40 may be effectively reduced, thereby miniaturization of the optical system 13-100 is achieved.

Figure 137:
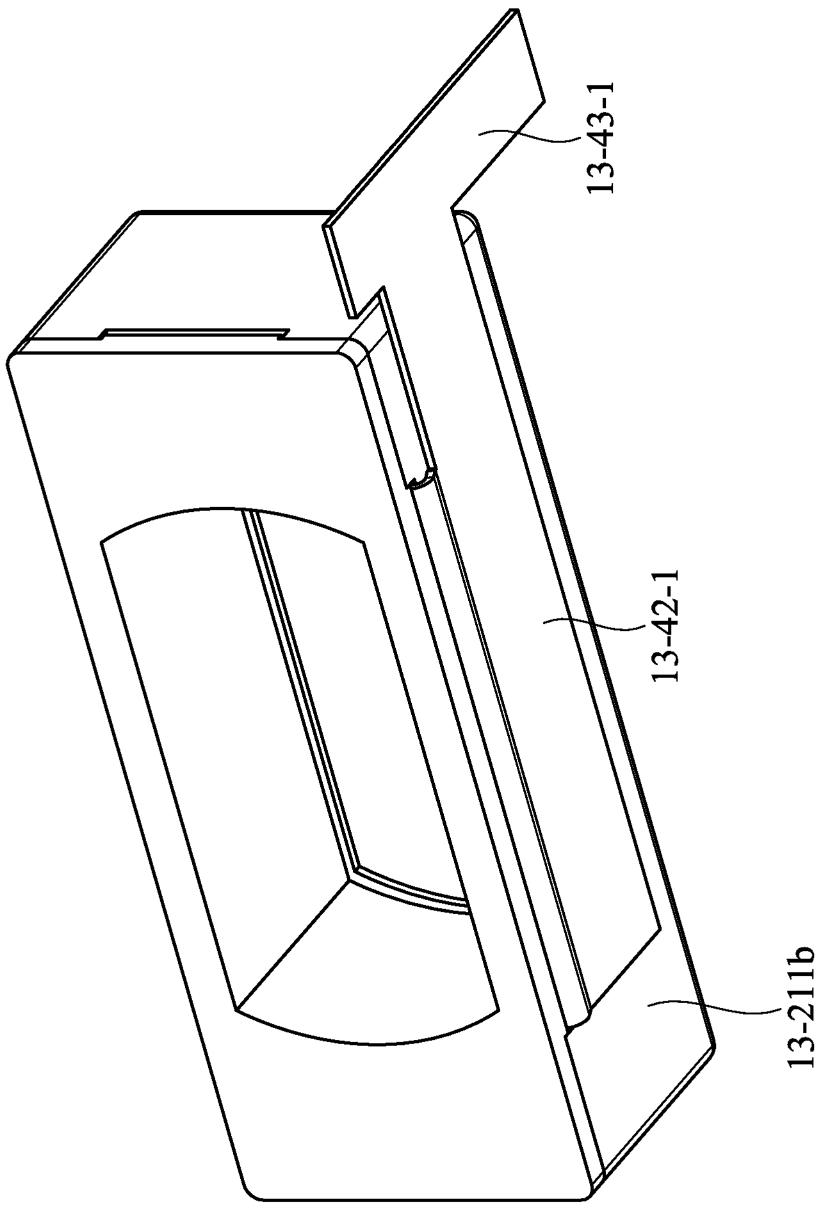

Please refer to FIG. 137, in the modified embodiment shown in FIG. 137, the circuit board extending part 13-42-1 is coplanar with the circuit board pin part 13-43-1, and the circuit board extending part 13-42-1 is attached to the fixed part outer frame body bottom surface 13-211*b*. The difference from the embodiment shown in FIG. 136 is that the contact area between the circuit board extending part 13-42-1 and the fixed part outer frame body bottom surface 13-211*b* in the embodiment shown in FIG. 137 is larger than the contact area between the circuit board extending part 13-42 and the fixed part outer frame body side 13-211*c* of the embodiment shown in FIG. 136. Therefore, the circuit board extending part 13-42-1 of the embodiment shown in FIG. 137 is more securely attached to the fixed part outer frame body 13-211.

Figure 138:
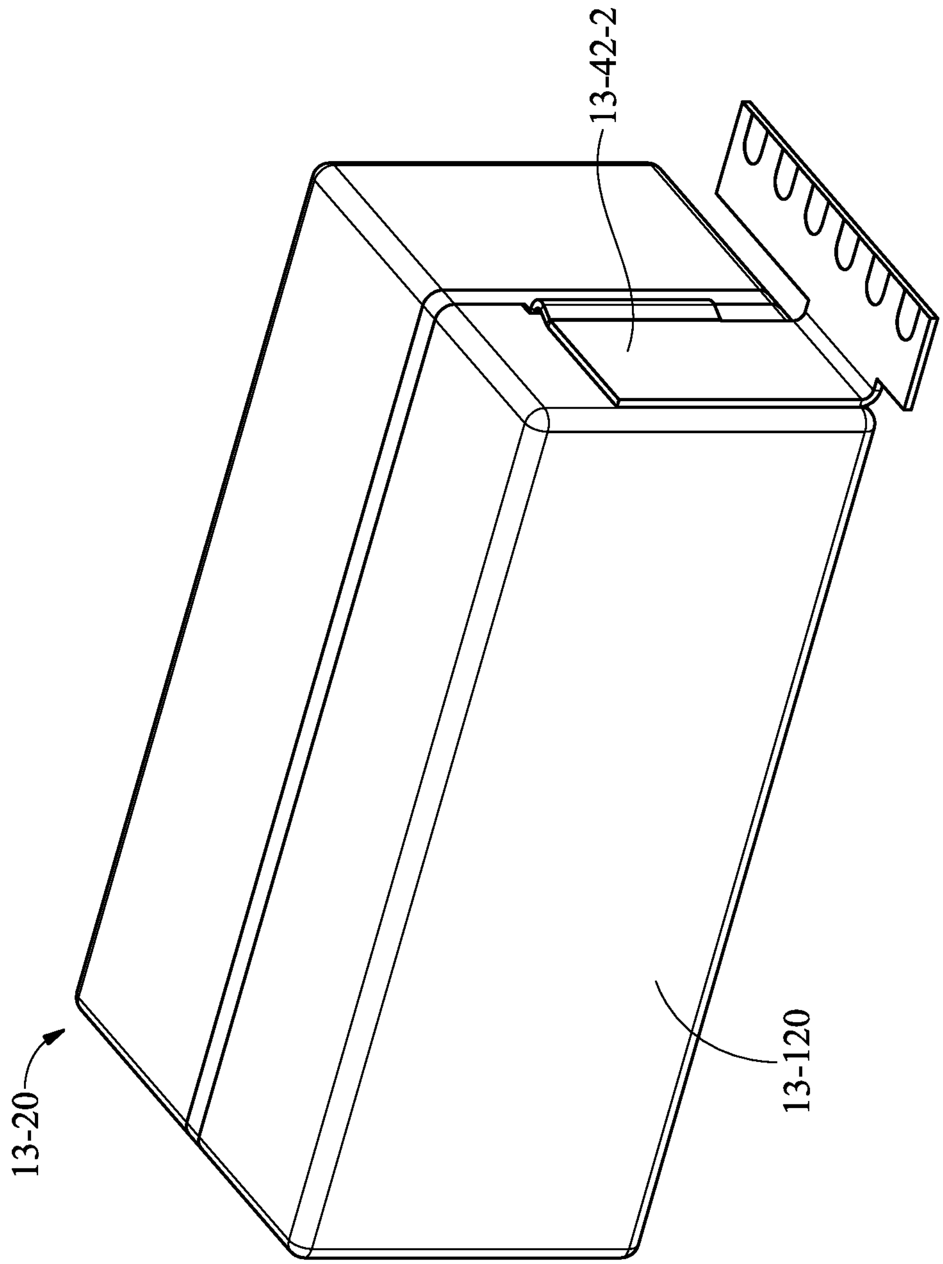

Please refer to FIG. 138, in the modified embodiment shown in FIG. 138, the circuit board extending part 13-42-2 is attached to the second optical element 13-120. In this way, the separation of the second optical elements 13-120 from the fixed part 13-20 is avoided, and the internal structure of the optical system 13-100 is more stable.

Figure 139:
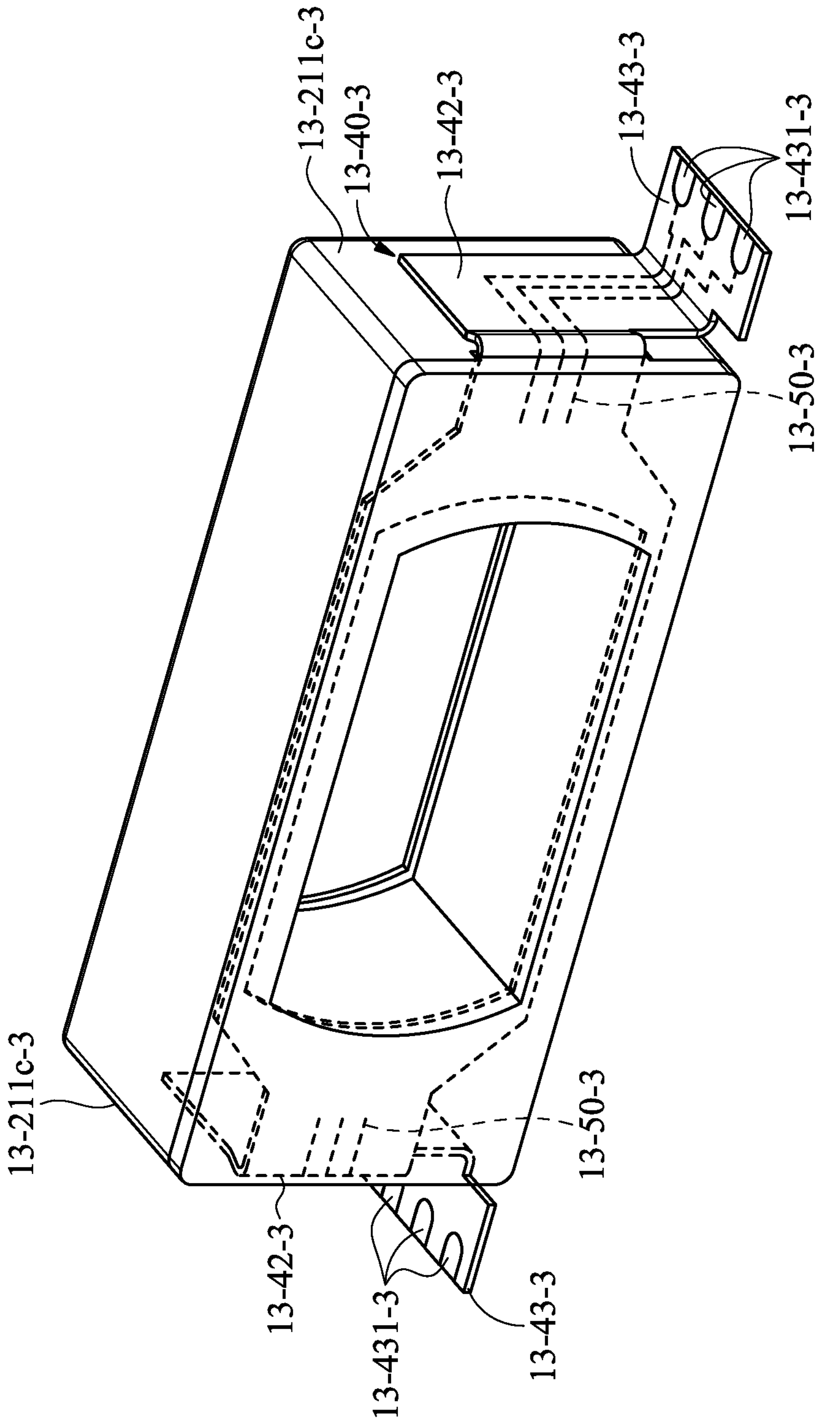

Please refer to FIG. 139, in the modified embodiment shown in FIG. 139, the circuit assembly 13-40-3 includes two circuit board extending parts 13-42-3 and two circuit board pin parts 13-43-3, and the circuit board extending parts 13-42-3 are connected to the circuit board pin parts 13-43-3. Each circuit board extending part 13-42-3 is attached to the corresponding fixed part outer frame body side 13-211*c*-3. Since the circuit assembly 13-40-3 has two circuit board extending parts 13-42-3 and two circuit board pin parts 13-43-3, the circuit board body 13-41-3 does not need to have a two-layered plate structure. The metal circuit assembly 13-50-3 can extend from the respective circuit board extending part 13-42-3 to the circuit board pin part 13-43-3 and is electrically connected to the pin 13-431-3 of the circuit board pin part 13-43-3.

Please refer to FIG. 140, in the modified embodiment shown in FIG. 140, the optical system no longer has circuit assemblies. The metal circuit assembly 13-50-4 of the optical system 13-100-4 is disposed in the fixed part outer frame 13-21-4, and the metal circuit assembly 13-50-4 has a three-dimensional routing and is disposed at the fixed part outer frame body side 13-211*c*-4. Specifically, the metal circuit assembly 13-50-4 extends from the fixed part outer frame bottom surface 13-213-4, turning at the boundary between the fixed part outer frame bottom surface 13-213-4 and the fixed part outer frame body side 13-211*c*-4, extending and turning in the fixed part outer frame body side 13-211*c*-4. Thereafter, the metal circuit assembly 13-50-4 extends toward the fixed part outer frame body bottom surface 13-211*b*-4, turning at the boundary between the fixed part outer frame body side 13-211*c*-4 and the fixed part outer frame body bottom surface 13-211*b*-4, and extending out of the fixed part outer frame body 13-211-4 from the fixed part outer frame body side 13-211*c*-4. Thus, the metal circuit assembly 13-50-4 may directly receive the external current, and the structure of the fixed part outer frame 13-21-4 with the three-dimensional metal circuit assembly 13-50-4 is more solid.

Please refer to FIG. 141, the optical system 13-100 may further include a fixed lens module 13-200, a prism module 13-300 and a side 13-300*a*. The fixed lens module 13-200 is connected to the fixed part 13-20. The fixed lens module 13-200 includes a fixed lens assembly 13-210. The fixed lens assembly 13-210 is fixed and non-movable.

Please refer to FIGS. 142 and 143, FIG. 142 is a top view of the optical system 13-100 of another embodiment, FIG. 143 is a cross sectional view of the optical system 13-100 along a line 13-A-13-A in FIG. 142. The prism module 13-300 is connected to the fixed lens module 13-200 via the connecting element 13-70. Specifically, a gap 13-S is provided between the fixed lens module 13-200 and the prism module 13-300, and the connecting element 13-70 is disposed at the gap 13-S. The connecting element 13-70 here can be glue 13-70. Compared with other connecting methods (e.g. screws, etc.), the glue 13-70 enables to correct the error between the fixed lens module 13-200 and the prism module 13-300 when the error exists between the fixed lens module 13-200 and the prism module 13-300. However, it should be noted that the first optical elements 13-110 and the glue 13-70 do not overlap when observed along the optical axis 13-O, so as to avoid the glue 13-70 from affecting the imaging of the optical system 13-100. The prism module 13-300 includes a prism 13-310 and a prism module pin part 13-320.

As shown in FIG. 143, the prism 13-310 may reflect the incident light 13-L to an optical path 13-H, the light 13-L images on the second optical element 13-120 after passing through the fixed lens assembly 13-210 and the first optical element 13-110.

Please refer to FIG. 141 again, the circuit board pin part 13-43 and the prism module pin part 13-320 are located on the side 13-300*a* of the optical system 13-100. That is, the circuit board pin part 13-43 and the prism module pin part 13-320 are located on the same side. In this way, the connection to the external circuit of the circuit board pin part 13-43 and the prism module pin part 13-320 is facilitated, and the routing of the optical system 13-100 is simplified.

As shown in FIG. 144, in some embodiments, the optical system 13-100 may have two fixed lens modules 13-200, these two fixed lens modules 13-200 are positioned at upstream or downstream of the fixed part 13-20. That is, these two fixed lens modules 13-200 abut the fixed part outer frame surface 13-212 and the fixed part outer frame bottom surface 13-213, respectively. Moreover, the second optical element 13-120 is connected to the fixed lens module 13-200 which abuts the fixed part outer frame surface 13-212. In this way, since there are different combinations for the fixed lens assembly 13-210 and the first optical element 13-110, diverse zooming of the optical system 13-100 are provided.

In summary, the zooming of the optical system 13-100 of the present disclosure is achieved through changing the position of the movable part 13-10 and the first optical element 13-110 by the driving assembly 13-30. Furthermore, the present disclosure enables periscope lens to have diverse zooming by combining the fixed lens module 13-200 and the prism module 13-300.

Fourteenth Group of Embodiments

FIG. 145 is a schematic perspective view illustrating an optical system 14-101 in accordance with an embodiment of the present disclosure. It should be noted that, in this embodiment, the optical system 14-101 may be, for example, disposed in the electronic devices (not shown) with camera function, and a driving assembly inside the optical system may be configured to drive an optical member to move. Controlling the position of the optical member can perform an autofocus (AF) and/or optical image stabilization (OIS) function.

As shown in FIG. 145, the optical system 14-101 includes a first optical module 14-110, a second optical module 14-120, a third optical module 14-130 (as shown in FIG. 146), a fourth optical module 14-140, a fifth optical module 14-150 and a sixth optical module 14-160, all of which correspond to each other. The optical system 14-101 has a first optical axis 14-O1, which is substantially parallel to the Z axis. The optical system 14-101 further has a second optical axis 14-O2, which is substantially perpendicular to the first optical axis 14-O1. After light enters the optical system 14-101 along the first optical axis 14-O1, the direction of the light is changed and the light travels along the second optical axis 14-O2. In some embodiments, the first optical axis 14-O1 is not parallel to the second optical axis 14-O2.

In the present embodiment, the fourth optical module 14-140 includes a driving assembly 14-142. Light may enter the fourth optical module 14-140 along the first optical axis 14-O1, and a fourth optical member 14-141 that is connected to the fourth optical module 14-140 may change the direction of the light which travels along the second optical axis 14-O2. The driving assembly 14-142 may drive the fourth optical member 14-141 to move, and thereby the path of the light may be adjusted, performing an autofocus (AF) and/or optical image stabilization (OIS) function.

After the light turns to the second optical axis 14-O2, it may pass through the first optical module 14-110, the second optical module 14-120, the sixth optical module 14-160 and the fifth optical module 14-150 in order. In other words, the fourth optical module 14-140, the first optical module 14-110, the second optical module 14-120, the sixth optical module 14-160 and the fifth optical module 14-150 are sequentially arranged along the second optical axis 14-O2. As a result, the shortest distance between the first optical module 14-110 and the fifth optical module 14-150 is longer than the shortest distance between the second optical module 14-120 and the fifth optical module 14-150. The sixth optical module 14-160 may be located between the fifth optical module 14-150 and the second optical module 14-120.

In some embodiments, the first optical module 14-110 includes a movable portion 14-111, a fixed portion 14-112 and a driving assembly 14-113, wherein the movable portion 14-111 is configured to connect the first optical member 14-114. The driving assembly 14-113 may drive the movable portion 14-111 to move relative to the fixed portion 14-112, and therefore performing an autofocus (AF) and/or optical image stabilization (OIS) function. The second optical module 14-120 is configured to connect the second optical member 14-121, wherein the second optical member 14-121 corresponds to the first optical member 14-114. For example, the second optical axis 14-O2 may pass through the first optical member 14-114 and the second optical member 14-121. The first optical member 14-114 is movable relative to the second optical member 14-121, and may thereby provide different optical characteristics, as required.

Since merely some of the optical members (such as the first optical member 14-114) are movable, the design of the driving assembly 14-113 may be simplified or the required space of the driving assembly 14-113 may be reduced, achieving the miniaturization of the optical system 14-101. Regarding the detailed arrangement of the first optical module 14-110, the second optical module 14-120 and the fourth optical module 14-140, it may be referred to other embodiments of the present disclosure, and it will not descripted in detail herein.

In some embodiments, an image sensor may be, for example, connected to the fifth optical module 14-150, and therefore the light entering the optical system 14-101 may form an image after reaching the fifth optical module 14-150. In some embodiments, a light filter may be connected to the sixth optical module 14-160, and therefore the optical characteristics of the optical system 14-101 may be improved. In some embodiments, the sixth optical module 14-160 is optional. In some embodiments, the sixth optical module 14-160 may be substituted as a shutter, or a shutter may be disposed between the sixth optical module 14-160 and the fifth optical module 14-150.

FIG. 146 is a cross-sectional view illustrating the optical system 14-101 shown in FIG. 145. As shown in FIG. 146, the third optical module 14-130 is located between the first optical module 14-110 and the second optical module 14-120, and is configured to connect a third optical module 14-131. In some embodiments, the third optical module 14-130 is connected to the first optical module 14-110 and movable relative to the second optical module 14-120. In some other embodiments, the third optical module 14-130 is connected to the second optical module 14-120, and the first optical module 14-110 is movable relative to the second optical module 14-120 and the third optical module 14-130.

It should be noted that the term "optical area" may be used in the following paragraphs and refers to the largest region (on the Y-Z plane) that light may pass through in each element. Although the present embodiment merely shows a cross-section view of the optical system 14-101, those skilled in the art should realize the proportional relationships between each "optical area" and "area" discussed in the present disclosure.

In the present embodiment, the fourth optical member 14-141 has a first area 14-E11 (i.e. a fourth optical area 14-A41) on a plane that is perpendicular to the second optical axis 14-O2 (namely, parallel to the first optical axis 14-O1). A second area 14-E12 is provided on a plane that is perpendicular to the first optical axis 14-O1 (namely, parallel to the second optical axis 14-O2). It should be noted that the first area 14-E11 is smaller than the second area 14-E12 because the fourth optical member 14-141 has a cutting portion below. By setting the cutting portion, the weight of the fourth optical member 14-141 can be reduced without affecting the optical properties, and the effect of reducing the weight of the optical system 14-101 can be achieved.

In addition, the size of the fourth optical module 14-140 may be greater than the sizes of the first optical module 14-110 and the second optical module 14-120. An electrical element (not shown) may be disposed below the first optical module 14-110 and the second optical module 14-120. That way, the space of the optical system 14-101 may be used more effectively. For example, the electrical element may be a battery, a capacitor, a resistor, an inductor or any other suitable electrical element.

The third optical module 14-130 is connected to the third optical member 14-131. For example, the third optical member 14-131 is an aperture, but the disclosure is not limited thereto. The third optical member 14-131 has a third optical area 14-A3 on a plane that is perpendicular to the second optical axis 14-O2. In the present embodiment, the third optical area 14-A3 is smaller than the fourth optical area 14-A4.

As shown in FIG. 146, the first optical module 14-110 is connected to two first optical members 14-114A and 14-114B. The first optical members 14-114A and 14-114B have a first optical area 14-A1. The fourth optical area 14-A41 is larger than the first optical area 14-A1, and the third optical area 14-A3 is smaller than the first optical area 14-A1. It should be understood that the first optical members 14-114A and 14-114B are cut in the present embodiment to remove redundant portions (such as the portion of the first optical member 14-114A shown as dotted lines) of the first optical members 14-114A and 14-114B. That way, the size of the first optical members 14-114A and 14-114B may be reduced without affecting the optical properties, and the miniaturization of the optical system 14-101 can be achieved.

In the present embodiment, the first optical member 14-114B is closer to the third optical module 14-130 than the first optical member 14-114A. For example, the material of the first optical member 14-114A includes glass, and the material of the first optical member 14-114B includes plastic, but they are not limited thereto. In some embodiments, the refractive index of the material of the first optical member 14-114B is smaller than the refractive index of the material of the first optical member 14-114A.

The second optical module 14-120 is connected to the second optical members 14-121A, 14-121B and 14-121C with different sizes. The second optical member 14-121A has a second optical area 14-A21, and the second optical members 14-121B and 14-121C have a second optical area 14-A22. In this embodiment, the first optical area 14-A1 is substantially equal to the second optical area 14-A22, and is greater than the second optical area 14-A21. The second optical members 14-121B and 14-121C also have at least one cutting portion to reduce the size of the second optical members 14-121A, 14-121B, and the miniaturization of the optical system 14-101 can be achieved. Since the second optical member 14-121A is not cut at all, the shape of the second optical member 14-121A is different from the shapes of the second optical members 14-121B and 14-121C in the present embodiment.

It should be understood that although two first optical members 14-114A, 14-114B and three second optical members 14-121A, 14-121B and 14-121C are shown in the present embodiment, but the present disclosure is not limited thereto. Those skilled in the art may adjust positions and numbers of the first optical members and the second optical members as required, as long as the number of the first optical members is less than the number of the second optical members.

In addition, although in this embodiment, the light passes through the first optical module 14-110 and then enters the second optical module 14-120, this merely serves as an example. Those skilled in the art may adjust the positions of the first optical module 14-110 and the second optical module 14-120 as required, so that light passes through the second optical member 14-121 before entering the first optical member 14-114.

A sixth optical member 14-161 may be connected to the sixth optical module 14-160 (as shown in FIG. 145), wherein the sixth optical member 14-161 has a sixth optical area 14-A6. In the present embodiment, the sixth optical area 14-A6 is substantially equal to the second optical area 14-A22. A fifth optical member 14-151 may be connected to the fifth optical module 14-150 (as shown in FIG. 145), wherein the fifth optical member 14-151 has a fifth optical area 14-A5. In this embodiment, the fifth optical area 14-A5 is smaller than the second optical area 14-A22. In other embodiments, the fifth optical area 14-A5 may be substantially equal to the second optical area 14-A22.

FIG. 147 is a cross-sectional view illustrating an optical system 14-102 in accordance with another embodiment of the present disclosure. It should be noted that the optical system 14-102 may include the same or similar elements or portions as that of the optical system 14-101. These elements or portions will be labeled as the same or similar numerals, and will not be discussed in detail below. As shown in FIG. 147, the optical system 14-102 includes a fourth optical member 14-143, wherein the size of the fourth optical member 14-143 is larger than the size of the fourth optical member 14-141. In other words, the fourth optical area 14-A42 (i.e. the second area 14-E22) of the fourth optical member 14-143 may be greater than the fourth optical area 14-A41 of the fourth optical member 14-141. Similarly, since the fourth optical member 14-141 has a cutting portion below, the first area 14-E21 may be smaller than the second area 14-E22. Because the size of the fourth optical member 14-143 is larger than the size of the fourth optical member 14-141, the removed portion of the fourth optical member 14-143 also is larger than the removed portion of the fourth optical member 14-141.

As shown in FIG. 147, the first optical module 14-110 is connected to 14-115A, 14-115B and 14-115C with different sizes. The first optical member 14-121A has a first optical area 14-A11, the first optical member 14-121B has a first optical area 14-A12, and the first optical member 14-121C has a first optical area 14-A13. The first optical area 14-A11 is substantially equal to the first optical area 14-A12, which is greater than the first optical area 14-A13. The fourth optical area 14-A42 is larger than the first optical areas 14-A11, 14-A12 and 14-A13, and the third optical area 14-A3 is smaller than the first optical area 14-A11, 14-A12 and 14-A13. Since the first optical member 14-115C is not cut at all, the shape of the first optical member 14-115C that is closer to the third optical module 14-130 is different from the shapes of the first optical members 14-115A and 14-115B in the present embodiment.

It should be understood that the first optical members 14-115A and 14-115B are cut in the present embodiment to remove redundant portions (such as the portion of the first optical member 14-115A shown as dotted lines) of the first optical members 14-114A and 14-114B. That way, the size of the first optical members 14-115A and 14-115B may be reduced without affecting the optical properties, and the miniaturization of the optical system 14-102 can be achieved. In addition, in response to the larger fourth optical member 14-143, the original size (i.e. the size when the optical member is uncut) of the first optical member 14-115A in the optical system 14-102 may be larger than the original size of the first optical member 14-114A in the optical system 14-101, as shown as the dotted lines.

In the present embodiment, the first optical members 14-115B and 14-115C are closer to the third optical module 14-130 than the first optical member 14-115A. For example, the material of the first optical member 14-115A includes glass, and the material of the first optical members 14-115B and 14-115C includes plastic, but they are not limited thereto. In some embodiments, the refractive index of the material of the first optical members 14-115B and 14-115C is smaller than the refractive index of the material of the first optical member 14-115A.

The second optical module 14-120 is connected to the second optical members 14-122A and 14-122B with different sizes. The second optical member 14-122A has a second optical area 14-A23, and the second optical member 14-122B has a second optical area 14-A24. In this embodiment, the first optical areas 14-A11 and 14-A12 is substantially equal to the second optical area 14-A24. The second optical members 14-122B also has at least one cutting portion to reduce the size of the second optical members 14-122B, and the miniaturization of the optical system 14-102 can be achieved.

It should be understood that although three first optical members 14-115A, 14-115B, 14-115C and two second optical members 14-122A and 14-122B are shown in the present embodiment, but the present disclosure is not limited thereto. Those skilled in the art may adjust positions and numbers of the first optical members and the second optical members as required, as long as the number of the first optical members is greater than the number of the second optical members. In addition, a plurality of third optical modules may be disposed in the optical system in some embodiments, and at least one first optical member or at least one second optical member is disposed between the third optical modules As set forth above, the embodiments of the present disclosure provide an optical system including a plurality of optical members, wherein some of the optical members are movable relative to some of the other optical members. Since some of instead all of the optical members are movable, the design of the driving assembly may be simplified or the required space of the driving assembly may be reduced, achieving the miniaturization of the optical system.

Fifteenth Group of Embodiments

FIG. 148 is a schematic perspective view illustrating an optical system 15-101 in accordance with an embodiment of the present disclosure. It should be noted that, in this embodiment, the optical system 15-101 may be, for example, disposed in the electronic devices (not shown) with camera function, and a driving assembly inside the optical system may be configured to drive an optical member to move. Controlling the position of the optical member can perform an autofocus (AF) and/or optical image stabilization (OIS) function.

As shown in FIG. 148, the optical system 15-101 includes a first optical module 15-110, a second optical module 15-120, a third optical module 15-130 (as shown in FIG. 149), a fourth optical module 15-140, a fifth optical module 15-150 and a sixth optical module 15-160, all of which correspond to each other. The optical system 15-101 has a first optical axis 15-O1, which is substantially parallel to the Z axis. The optical system 15-101 further has a second optical axis 15-O2, which is substantially perpendicular to the first optical axis 15-O1. After light enters the optical system 15-101 along the first optical axis 15-O1, the direction of the light is changed and the light travels along the second optical axis 15-O2. In some embodiments, the first optical axis 15-O1 is not parallel to the second optical axis 15-O2.

In the present embodiment, the fourth optical module 15-140 includes a driving assembly 15-142. Light may enter the fourth optical module 15-140 along the first optical axis 15-O1, and a fourth optical member 15-141 that is connected to the fourth optical module 15-140 may change the direction of the light which travels along the second optical axis 15-O2. The driving assembly 15-142 may drive the fourth optical member 15-141 to move, and thereby the path of the light may be adjusted, performing an autofocus (AF) and/or optical image stabilization (OIS) function.

After the light turns to the second optical axis 15-O2, it may pass through the first optical module 15-110, the second optical module 15-120, the sixth optical module 15-160 and the fifth optical module 15-150 in order. In other words, the fourth optical module 15-140, the first optical module 15-110, the second optical module 15-120, the sixth optical module 15-160 and the fifth optical module 15-150 are sequentially arranged along the second optical axis 15-O2. As a result, the shortest distance between the first optical module 15-110 and the fifth optical module 15-150 is longer than the shortest distance between the second optical module 15-120 and the fifth optical module 15-150. The sixth optical module 15-160 may be located between the fifth optical module 15-150 and the second optical module 15-120.

In some embodiments, the first optical module 15-110 includes a movable portion 15-111, a fixed portion 15-112 and a driving assembly 15-113, wherein the movable portion 15-111 is configured to connect the first optical member 15-114. The driving assembly 15-113 may drive the movable portion 15-111 to move relative to the fixed portion 15-112, and therefore performing an autofocus (AF) and/or optical image stabilization (OIS) function. The second optical module 15-120 is configured to connect the second optical member 15-121, wherein the second optical member 15-121 corresponds to the first optical member 15-114. For example, the second optical axis 15-O2 may pass through the first optical member 15-114 and the second optical member 15-121. The first optical member 15-114 is movable relative to the second optical member 15-121, and may achieve different optical characteristics, as required.

Since some of the optical members (such as the first optical member 15-114) are movable, the design of the driving assembly 15-113 may be simplified or the required space of the driving assembly 15-113 may be reduced, achieving the miniaturization of the optical system 15-101. Regarding the detailed arrangement of the first optical module 15-110, the second optical module 15-120 and the fourth optical module 15-140, it may be referred to other embodiments of the present disclosure (such as embodiments shown in FIGS. 133-144), and it will not described in detail herein.

In some embodiments, an image sensor may be, for example, connected to the fifth optical module 15-150, and therefore the light entering the optical system 15-101 may form an image after reaching the fifth optical module 15-150. In some embodiments, a light filter may be connected to the sixth optical module 15-160, and therefore the optical characteristics of the optical system 15-101 may be improved. In some embodiments, the sixth optical module 15-160 may be optionally disposed. In some embodiments, the sixth optical module 15-160 may be substituted as a shutter, or a shutter may be disposed between the sixth optical module 15-160 and the fifth optical module 15-150.

FIG. 149 is a cross-sectional view illustrating the optical system 15-101 shown in FIG. 148. As shown in FIG. 149, the third optical module 15-130 is located between the first optical module 15-110 and the fourth optical module 15-140, and is configured to connect a third optical module 15-131. As a result, the shortest distance between the first optical module 15-110 and the third optical module 15-130 is shorter than the shortest distance between the second optical module 15-120 and the third optical module 15-130. In some embodiments, the third optical module 15-130 is connected to the first optical module 15-110 and movable relative to the second optical module 15-120. In some other embodiments, the third optical module 15-130 is connected to second optical module 15-120, and the first optical module 15-110 is movable relative to the second optical module 15-120 and the third optical module 15-130.

It should be noted that the term "optical area" may be used in the following paragraphs and refers to the largest region that light may pass through in each element. Although the present embodiment merely shows a cross-section view of the optical system 15-101, those skilled in the art should realize the proportional relationships between each "optical area" and "area" discussed in the present disclosure.

In the present embodiment, the fourth optical member 15-141 has a first area 15-E1 (i.e. a fourth optical area 15-A4) on a plane that is perpendicular to the second optical axis 15-O2 (namely, parallel to the first optical axis 15-O1). A second area 15-E2 is provided on a plane that is perpendicular to the first optical axis 15-O1 (namely, parallel to the second optical axis 15-O2). It should be noted that the first area 15-E1 is smaller than the second area 15-E2 because the fourth optical member 15-141 has a cutting portion 15-143 below. By setting the cutting portion 15-143, the weight of the fourth optical member 15-141 can be reduced without affecting the optical properties, and the effect of reducing the weight of the optical system 15-101 can be achieved.

The third optical module 15-130 is connected to the third optical member 15-131. For example, the third optical member 15-131 is an aperture, but the disclosure is not limited thereto. The third optical member 15-131 has a third optical area 15-A3 on a plane that is perpendicular to the second optical axis 15-O2. In the present embodiment, the third optical area 15-A3 is smaller than the fourth optical area 15-A4.

As shown in FIG. 149, the first optical module 15-110 is connected to the first optical members 15-114A, 15-114B and 15-114C with different sizes. The first optical members 15-114A, 15-114B and 15-114C have first optical areas 15-A11, 15-A12, and 15-A13 of different sizes, respectively. In the present embodiment, the first optical area 15-A11 is smaller than the first optical area 15-A12, and the first optical area 15-A12 is smaller than the first optical area 15-A13. The fourth optical area 15-A4 is larger than the first optical areas 15-A11, 15-A12 and 15-A13, and the third optical area 15-A3 is smaller than the first optical areas 15-A11, 15-A12 and 15-A13. It should be understood that although the first optical members 15-114A, 15-114B and 15-114C are shown as ovals in the present embodiment, the first optical members 15-114A, 15-114B and 15-114C may also be disposed as other shapes.

In this embodiment, the first optical member 15-114A is closer to the third optical module 15-130 than the first optical member 15-114B. For example, the material of the first optical member 15-114A includes plastic, and the material of the first optical member 15-114B includes glass, but is not limited thereto. In some embodiments, the refractive index of the material of the first optical member 15-114A is smaller than the refractive index of the material of the first optical member 15-114B.

The second optical module 15-120 is connected to the second optical members 15-121A and 15-121B. The second optical members 15-121A and 15-121B have a second optical area 15-A2. In this embodiment, the second optical members 15-121A and 15-121B have at least one cutting portion 15-122, respectively, to remove redundant portions of the second optical members 15-121A and 15-121B. By means of the arrangement of the cutting portion 15-122, the size of the second optical members 15-121A, 15-121B can be reduced without affecting the optical properties, and the miniaturization of the optical system 15-101 can be achieved. Since the first optical members 15-114A, 15-114B, and 15-114C are not cut at all, the shapes of the first optical members 15-114A, 15-114B and 15-114C are different from the shapes of the second optical members 15-121A and 15-121B in the present embodiment.

It should be noted that the original dimensions (that is, the dimensions when the cutting portion 15-122 is not formed) of the second optical members 15-121A, 15-121B may be different, and it may be determined based on the surface curvature of the second optical members 15-121A, 15-121B. As shown in FIG. 149, the second optical area 15-A2 may be larger than the fourth optical area 15-A4, and further larger than the first optical areas 15-A11, 15-A12, 15-A13 and the third optical area 15-A3. Furthermore, in some embodiments, the second optical area 15-A2 may be larger than the second area 15-E2 of the fourth optical member 15-141.

The first optical module 15-110 includes a first surface 15-S1, and the second optical module 15-120 includes a second surface 15-S2. The first surface 15-S1 faces the second surface 15-S2. In some embodiments, the first optical module 15-110 (such as the fixed portion 15-112) and the second optical module 15-120 are connected to each other via a connecting element (not shown), and the aforementioned connecting element may be disposed on the first surface 15-S1 and the second surface 15-S2. In addition, although in this embodiment, the light passes through the first optical module 15-110 and then enters the second optical module 15-120, it merely serves as an example. Those skilled in the art may adjust the positions of the first optical module 15-110 and the second optical module 15-120 as required, such that light passes through the second optical member 15-121 before entering the first optical member 15-114.

A sixth optical member 15-161 may be connected to the sixth optical module 15-160 (as shown in FIG. 148), wherein the sixth optical member 15-161 has a sixth optical area 15-A6. In the present embodiment, the sixth optical area 15-A6 is substantially equal to the second optical area 15-A2. A fifth optical member 15-151 may be connected to the fifth optical module 15-150 (as shown in FIG. 148), wherein the fifth optical member 15-151 has a fifth optical area 15-A5. In this embodiment, the fifth optical area 15-A5 is smaller than the second optical area 15-A2. In other embodiments, the fifth optical area 15-A5 may be substantially equal to the second optical area 15-A2.

FIG. 150 is a perspective view illustrating the second optical member 15-121 and the fifth optical member 15-151 in accordance with an embodiment of the present disclosure. As shown in FIG. 150, the second optical member 15-121 has two cutting portions 15-122 on opposite sides, and has a normal length 15-NL between the two cutting portions 15-122. The normal length 15-NL is measured in a direction (such as the Z axis) that is perpendicular to the cutting portion 15-122, and may represent the shortest distance between the two cutting portions 15-122. In addition, the fifth optical member 15-151 has a lengthwise side 15-152 and a widthwise side 15-153. Since the fifth optical member 15-151 is substantially rectangular, the lengthwise side 15-152 and the widthwise side 15-153 are substantially perpendicular to each other. In this embodiment, the length of the lengthwise side 15-152 in the Y axis is greater than the normal length 15-NL.

As set forth above, the embodiments of the present disclosure provide an optical system including a plurality of optical members, wherein some of the optical members are movable relative to some of the other optical members. Since some and not all of the optical members are movable, the design of the driving assembly may be simplified, and the space that is taken up in the driving assembly may be reduced, achieving the miniaturization of the optical system.

Sixteenth Group of Embodiments

FIG. 151 is a schematic perspective view illustrating an optical member driving mechanism 16-101 in accordance with an embodiment of the present disclosure. It should be noted that, in this embodiment, the optical member driving mechanism 16-101 may be, for example, a voice coil motor (VCM), which may be disposed in the electronic devices with camera function for driving an optical member (such as a lens), and can perform an autofocus (AF) function. In addition, the optical member driving mechanism 16-101 has a substantial rectangular structure, wherein a housing 16-110 of the optical member driving mechanism 16-101 has includes a top surface 16-111 and four sidewalls 16-112. An opening 16-113 is formed on the top surface 16-111 and corresponds to the optical member (not shown). That is, an optical axis 16-O may pass through the opening 16-113, such that light may enter into the optical member driving mechanism 16-101 via the optical axis 16-O. In some embodiments, the sidewalls 16-112 extend from the edges of the top surface 16-111 along a direction that is perpendicular to the optical axis 16-O. In some embodiments, the sidewalls 16-112 extend from the edges of the top surface 16-111 along a direction that is not parallel to the optical axis 16-O.

FIG. 152 is an exploded view illustrating the optical member driving mechanism 16-101 shown in FIG. 151. As shown in FIG. 152, the optical member driving mechanism 16-101 mainly includes a housing 16-110, a base 16-120, a movable portion 16-130, a driving assembly 16-140, a frame 16-150, a first elastic member 16-161, a second elastic member 16-162, a circuit board 16-170 and a sensing assembly 16-180. In addition, the housing 16-110, the base 16-120, the frame 16-150 and the circuit board 16-170 may constitute a fixed portion 16-F. The housing 16-110 and the base 16-120 may be assembled as a hollow case. Therefore, the movable portion 16-130, the first driving assembly 16-140, the frame 16-150, the first elastic member 16-161 and the second elastic member 16-162 may be surrounded by the housing 16-110, and thus may be contained in the case. Accordingly, the housing 16-110, the frame 16-150, and the base 16-120 are sequentially arranged along the optical axis 16-O. In other words, the light may sequentially pass through the housing 16-110, the frame 16-150 and the base 16-120, and reach an image sensor (as shown in FIG. 154) that is disposed out of the optical member driving mechanism 16-102 such that an image is generated.

The movable portion 16-130 has a hollow structure, and carries an optical member with an optical axis 16-O. The frame 16-150 is disposed on the base 16-120 and affixed to the housing 16-110. In addition, the movable portion 16-130 is movably connected to the housing 16-110 and the base 16-120. The first elastic member 16-161 is disposed between the housing 16-210 and the movable portion 16-130, and the second elastic member 16-162 is disposed between the movable portion and the base 16-120. To be more specific, the movable portion 16-130 may be connected to the housing 16-110 and the base 16-120 through the first elastic member 16-161 and the second elastic member 16-162, which are made of metallic materials. Therefore, the movable portion 16-130 is movably suspended between the housing 16-110 and the base 16-120, and the movable portion 16-130 may move along the optical axis 16-O between the housing 16-110 and the base 16-120. For example, the first elastic member 16-161 and the second elastic member 16-162 are made of metal or any other suitable material with a certain flexibility.

The first driving assembly 16-140 includes two first coils 16-141 and two first magnetic members 16-142. The first coils 16-141 may be disposed on the movable portion 16-130, and the first magnetic members 16-142 may be disposed on the frame 16-150. When a current is applied to the first coils 16-141, an electromagnetic driving force may be generated by the first coils 16-141 and the first magnetic members 16-142 to drive the movable portion 16-130 and the optical member carried therein to move along the Z-axis (i.e. the optical axis 16-O) relative to the base 16-120. Therefore, the autofocus (AF) function is performed. In other embodiment, the positions of the first coils 16-141 and the first magnetic members 16-142 are interchangeable. In other words, the first coils 16-141 may be disposed on the frame 16-150, and the first magnetic members 16-142 may be disposed on the movable portion 16-130. That way, the autofocus (AF) function may also be achieved.

In addition, the first driving assembly 16-140 further includes second coils 16-143 and second magnetic members 16-144. The second coils 16-143 may be disposed on the movable portion 16-130, and the second magnetic members 16-144 may be disposed on the frame 16-150. When a current is applied to the second coils 16-143, an electromagnetic driving force may be generated by the second coils 16-143 and the second magnetic members 16-144 to drive the movable portion 16-130 and the optical member carried therein to rotate relative to the base 16-120. Therefore, an optical calibration may be performed to the optical member driving mechanism 16-101, or optical member driving mechanism 16-101 may receive light from different positions.

In the present embodiment, the first coils 16-141 and the first magnetic members 16-142 are disposed on opposite sides of the optical member driving mechanism 16-101, and the second coils 16-143 and the second magnetic members 16-144 are disposed at corners of the optical member driving mechanism 16-101. As a result, when viewed in a direction (the Z axis) that is parallel to the optical axis 16-O, the first coils 16-141 and the second coils 16-143 do not overlap. In addition, when viewed in the direction that is parallel to the optical axis 16-O, the first magnetic members 16-142 and the second magnetic members 16-144 do not overlap.

The circuit board 16-170 is disposed on one side of the optical member driving mechanism 16-101 and configured to transmit electric signals. For example, the optical member driving mechanism 16-101 may control the position of the optical member based on the aforementioned electric signals, and therefore the autofocus (AF) function may be achieved. In the present embodiment, a circuit component 16-121 is disposed in the base 16-120 by insert molding technique, and is electrically connected to the first driving assembly 16-140. Therefore, the diversity of circuit design for the optical member driving mechanism 16-101 may be increased. In addition, an electric element 16-171 may be disposed on the circuit board 16-170. For example, the electric element 16-171 may be a resistor, a capacitor, an inductor or any other suitable electric element.

The sensing assembly 16-180 includes a position sensor 16-181 and a reference member 16-182, wherein the position sensor 16-181 is disposed on the circuit board 16-170, and the reference member 16-182 is disposed in the movable portion 16-130. The position sensor 16-181 may detect the change of the magnetic field generated by the reference member 16-182, such that the position of the movable portion 16-130 and the optical member may be determined. Accordingly, the driving assembly 16-140 may drive the movable portion 16-130 to move relative to the fixed portion 16-F based on the result detected by the position sensor 16-181. In some embodiments, the position sensor 16-181 or the reference member 16-182 is disposed on the fixed portion 16-F, and the other of the position sensor 16-181 or the reference member 16-182 is disposed on the movable portion 16-130.

FIG. 153 is a cross-sectional view illustrating along line 16-B shown in FIG. 151. As shown in FIG. 153, the circuit board 16-170 and an exposed portion of the circuit component 16-121 are located on different sides of the optical member driving mechanism 16-101. For example, the circuit board 16-170 and the exposed portion of the circuit component 16-121 are located on opposite sides of the optical member driving mechanism 16-101. The above design may avoid any interference between the circuit board 16-170 and the circuit component 16-121, maintaining normal operation for the optical member driving mechanism 16-101.

FIGS. 154-156 are schematic views illustrating an optical system 16-100 in accordance with an embodiment of the present disclosure. In the present embodiment, the optical system 16-100 includes the optical member driving mechanism 16-101 and a corresponding image sensor 16-102, wherein the optical axis 16-O may pass through the optical member driving mechanism 16-101 and the image sensor 16-102. As shown in FIG. 154, light from a target 16-E may enter the optical member driving mechanism 16-101 along the optical axis 16-O and reach the image sensor 16-102. The image sensor 16-102 may receive the above light and form an image.

As shown in FIGS. 155 and 156, the movable portion 16-130 is rotatable relative to the image sensor 16-102, making the optical axis 16-O not parallel to an arrangement direction of the optical member driving mechanism 16-101 and the image sensor 16-102. Since the optical axis 16-O may offset due to the rotation of the movable portion 16-130, the size of the image sensor 16-102 may be greater than the size of the optical member in the optical member driving mechanism 16-101. Even of the optical axis 16-O offsets, the image sensor 16-102 may still receive light from different directions. As a result, the image sensor 16-102 may receive light in a greater range than usual, and perform a treatment to the images generated by lights from different angles. Therefore, function of taking panoramic image and wide-angle photography may be achieved.

FIGS. 157-159 are schematic views illustrating an optical system 16-200 in accordance with an embodiment of the present disclosure. In the present embodiment, the optical system 16-200 includes the optical member driving mechanism 16-101 and a corresponding image sensor 16-103, wherein the optical axis 16-O may pass through the optical member driving mechanism 16-101 and the image sensor 16-103. As shown in FIG. 157, light from a target 16-E may enter the optical member driving mechanism 16-101 along the optical axis 16-O and reach the image sensor 16-103. The image sensor 16-103 may receive the above light and form an image.

As shown in FIGS. 158 and 159, the movable portion 16-130 is rotatable, making the optical axis 16-O offset. In addition, the image sensor 16-103 is movable in response to the rotation of the movable portion 16-130, such that the offset optical axis 16-O passes through the image sensor 16-103. As a result, the image sensor 16-103 may receive light in a greater range than usual, and perform a treatment to the images generated by lights from different angles so as to achieve function of taking panoramic image and wide-angle photography. Since the image sensor 16-103 is movable in response to the rotation of the movable portion 16-130, the size of the image sensor 16-103 may be not greater than the size of the optical member in the optical member driving mechanism 16-101.

In the present embodiment, the optical system 16-200 further includes a second driving assembly (not shown) that is configured to drive the image sensor 16-103 to move relative to the movable portion 16-130. For example, the second driving assembly may be disposed outside of the sidewall of the optical member driving mechanism 16-101. Accordingly, when viewed in the direction (the Z axis) in which the optical member driving mechanism 16-101 and the image sensor 16-103 are arranged, the first driving assembly 16-140 (as shown in FIG. 152) and the second driving assembly do not overlap. When viewed in a direction (e.g. the Y axis) that is perpendicular to the direction in which the optical member driving mechanism 16-101 and the image sensor 16-103 are arranged, the first driving assembly 16-140 and the second driving assembly overlap.

In addition, in some embodiments, the image sensor 16-103 may be rectangular and have a lengthwise side (e.g. parallel to the X axis) and a widthwise side (e.g. parallel to the Y axis) that is not parallel to the lengthwise side. The image sensor 16-103 moves along a direction that is parallel to the widthwise side (shown as the arrows in FIGS. 158 and 159). In some embodiments, the image sensor 16-103 may be square, circle or any other suitable shapes.

FIGS. 160-162 are schematic views illustrating an optical system 16-300 in accordance with an embodiment of the present disclosure. In the present embodiment, the optical system 16-300 includes the optical member driving mechanism 16-101 and an image sensor 16-103, a photopermeable member 16-104 which correspond to the optical member driving mechanism 16-101. The optical axis 16-O may pass through the optical member driving mechanism 16-101, the image sensor 16-103 and the photopermeable member 16-104. In some embodiments, the photopermeable member 16-104 is connected to the optical member driving mechanism 16-101. For example, the photopermeable member 16-104 may be an aperture, a shutter or any other optical member that light may pass through.

As shown in FIG. 160, light from a target 16-E may enter the optical member driving mechanism 16-101 along the optical axis 16-O via the photopermeable member 16-104 and reach the image sensor 16-103. The image sensor 16-103 may receive the above light and form an image.

As shown in FIGS. 161 and 162, the movable portion 16-130 is rotatable, making the optical axis 16-O offset. In addition, the photopermeable member 16-104 is movable in response to the rotation of the movable portion 16-130, such that the offset optical axis 16-O passes through the photopermeable member 16-104. In the present embodiment, the moving direction of the photopermeable member 16-104 is opposite to the moving direction of the image sensor 16-103 (shown as the arrows in FIGS. 161 and 6C). That way, the optical axis 16-O passes through optical member driving mechanism 16-101, the image sensor 16-103 and the photopermeable member 16-104. As a result, function of taking panoramic image and wide-angle photography may be achieved by the optical system 16-300.

As set forth above, the embodiments of the present disclosure provide an optical system including an image sensor that corresponds to an optical member driving mechanism. The embodiments of the present disclosure provide multiple arrangements for the image sensor to cooperate with the movement of the optical member driving mechanism, forming an image by receiving the light. In addition, the design of a larger image sensor or a movable image sensor may increase the range for receiving the light, and function of taking panoramic image and wide-angle photography may be achieved by performing a treatment to the images.

Seventeenth Group of Embodiments

Refer to FIGS. 163-166, which are a schematic view, an exploded view, a cross-sectional view of a light flux adjustment module 17-401 in some embodiments of the present disclosure, and an enlarged view of a module 17-C in FIG. 165, respectively. The light flux adjustment module 17-401 may be disposed in an electronic device and used to take photographs or record video. The electronic device can be a smartphone or a digital camera, for example. When taking photographs or recording video, these optical modules can receive lights and form images, wherein the images can be transmitted to a processor (not shown) in the electronic device, where post-processing of the images can be performed.

The light flux adjustment module 17-401 mainly includes a case 17-410, a top plate 17-420, a middle plate 17-430, a connecting element 17-440, a first blade 17-450, a second blade 17-460, a drive assembly 17-470 (includes a driving magnetic element 17-472, a driving coil 17-474 and a positioning magnetic element 17-476) and balls 17-480. A space is formed between the case 17-410 and the top plate 17-420, and the first blade 17-450 and the second blade 17-460 are disposed in the space to prevent the first blade 17-450 and the second blade 17-460 from colliding with other elements when operating. Furthermore, the middle plate 17-430 is disposed between the first blade 17-450 and the second blade 17-460 to prevent the first blade 17-450 and the second blade 17-460 from colliding with each other when operating. In some embodiments, the case 17-410, the top plate 17-420, and the middle plate 17-430 may be called as a fixed portion 17-405, the connecting element 17-440 is movably connected to the fixed portion 17-405, and the first blade 17-450 and the second blade 17-460 are movably connected to the fixed portion 17-405 and the connecting element 17-440. The top plate 17-420 is disposed on a side of the first blade 17-450 which is far from the fixed portion 17-405.

The case 17-410, the top plate 17-420, and the middle plate 17-430 include through holes 17-412, 17-422, and 17-432, respectively. In some embodiments, the through holes 17-412, 17-422 and 17-432 forms a window, and a light having an optical axis 17-O passes through the window formed by the through holes 17-412, 17-422, and 17-432. In some embodiments, the through holes 17-412, 17-422, and 17-432 may have an identical size or shape, but the present disclosure is not limited thereto.

The connecting element 17-440 may be disposed at, for example, a side of the fixed portion 17-405, and the drive assembly 17-470 may be used for driving the connecting element 17-440 to move relative to the fixed portion 17-405 in a first moving dimension (e.g. Y direction). Furthermore, the first blade 17-450 and the second blade 17-460 may be disposed at the same side of the fixed portion 17-405, which is different than the side where the connecting element 17-440 is located.

The details of the elements of the light flux adjustment module 17-401 are described later. FIGS. 167 to 171 are schematic views of the case 17-410, the middle plate 17-430, the connecting element 17-440, the first blade 17-450, and the second blade 17-460, respectively.

In FIG. 167, the case 17-410 has a substantially rectangular shape, and has a first column 17-411 (first pivot) and a second column 17-413 (second pivot) that are positioned at corners of the case 17-410 and extended in the Z direction. In other words, the first column 17-411 is parallel to the second column 17-413. Concave portions 17-415 are positioned adjacent to the first column 17-411 and the second column 17-413, which concave in a direction (i.e. −Z direction) that is opposite to the extending direction of the first column 17-411 and the second column 17-413, and the concave portions 17-415 surround the first column 17-411 and the second column 17-413. Furthermore, a recess 17-414 is positioned between the first column 17-411 and the second column 17-413. As shown in FIG. 167, the recess 17-414 may extend in the Y direction, but the present disclosure is not limited thereto. For example, in some embodiments, the recess 17-414 may extend in the X direction, depending on design requirement. Furthermore, dusts may be accommodated in the concave portions 17-415, and error created during manufacturing may be compensated to improve assemble accuracy due to the design of the concave portions 17-415 being positioned adjacent to the first column 17-411 and the second column 17-413.

A first limiting portion 17-416A and a fourth limiting portion 17-416B may be positioned at an edge of the case 17-410, and protrude from the edge to the through hole 17-412. A second limiting portion 17-417B and a third limiting portion 17-417A may be positioned at another edge of the case 17-410 and protrude into the through hole 17-412. The first limiting portion 17-416A is connected to the fourth limiting portion 17-416B, and the second limiting portion 17-417B is connected to the third limiting portion 17-417A. The distance between the first limiting portion 17-416A and the through hole 17-412 is less than the distance between the fourth limiting portion 17-416B and the through hole 17-412 in the X direction. The distance between the third limiting portion 17-417A and the through hole 17-412 is less than the distance between the second limiting portion 17-417B and the through hole 17-412 in the Y direction. Furthermore, the distance between the fourth limiting portion 17-416B and the first column 17-411 is less than the distance between the first limiting portion 17-416A and the first column 17-411, and the distance between the second limiting portion 17-417B and the second column 17-413 is less than the distance between the third limiting portion 17-417A and the second column 17-413. As a result, the size of the window of the light flux adjustment module 17-401 may be adjusted.

Moreover, protruding portions 17-418 may be positioned on the case 17-410 and protrude in the X direction, wherein the protruding portions 17-418 are adjacent to the first limiting portion 17-416A and the fourth limiting portion 17-416B, and adjacent to the second limiting portion 17-417B and the third limiting portion 17-417A. The height of the protruding portion 17-418 may be greater than the thickness of the first blade 17-450 in the Z direction. As a result, the middle plate 17-430 may be prevented from directly contacting the first blade 17-450 if the middle plate 17-430 is disposed on the case 17-410, so the durability of the first blade 17-450 may be enhanced.

In FIG. 168, the middle plate 17-430 includes holes 17-434 and 17-436, and a recess 17-438 positioned between the holes 17-434 and 17-436. The middle plate 17-430 may have a shape corresponding to the case 17-410. For example, the positions of the holes 17-434 and 17-436 may correspond to the second column 17-413 and the first column 17-411 to allow the second column 17-413 and the first column 17-411 passing through the holes 17-434 and 17-436, so the middle plate 17-430 may be affixed to the case 17-410. Moreover, the recess 17-438 may extend in X or Y directions. The top plate 17-420 has a similar shape of the middle plate 17-430, and is not repeated.

In FIG. 169, the connecting element 17-440 includes a main body 17-442, a driving portion 17-444 extended from the main body 17-442, and concaves 17-446 concave in a direction that is opposite to the extending direction of the driving portion 17-444. The concaves 17-446 may be circular to allow the balls 17-480 (FIG. 164) being accommodated in the concaves 17-446, so the connecting element 17-440 may move smoothly relative to the fixed portion 17-405 via the rotation of the balls 17-480. The driving portion 17-444 may be disposed in the recesses 17-414 and 17-438 to allow the driving portion 17-444 move along the extension direction of the recesses 17-414 and 17-438. Furthermore, a concave portion 448 is positioned at a side of the main body 17-442, and the driving magnetic element 17-472 may be disposed in the concave portion 17-448. A tilting portion 17-449 is positioned at sides of the concave portion 17-448, so the driving magnetic element 17-472 may be easily disposed in the concave portion 17-448.

In FIG. 170, the first blade 17-450 includes a first recess 17-451 corresponding to the position of the driving portion 17-444, and a hole 17-452 corresponding to the position of the first column 17-411. As result, the first column 17-411 may be disposed in the hole 17-452, and the driving portion 17-444 may be disposed in the first recess 17-451. Moreover, in some embodiments, the first blade 17-450 further includes a first limiting edge 17-453, a third limiting edge 17-454, a first notch edge 17-456, and a fourth limiting edge 17-455 arranged in a counterclockwise manner. The first limiting edge 17-453, the third limiting edge 17-454 and the fourth limiting edge 17-455 may be straight, and the first notch edge 17-456 may be arc-shaped and adjacent to the window formed of the through holes 17-412, 17-422 and 17-432 (such as adjacent to the window relative to the third limiting edge 17-454). In some embodiments, the first blade 17-450 may include a hollow portion 17-457 extending in a direction that is perpendicular to the optical axis 17-O, for reducing the weight of the first blade 17-450, so the force for driving the first blade 17-450 may be reduced accordingly.

In FIG. 171, the second blade 17-460 includes a second recess 17-461 corresponding to the position of the driving portion 17-444, and a hole 17-462 corresponding to the position of the second column 17-413. As result, the second column 17-413 may be disposed in the hole 17-462, and the driving portion 17-444 may be disposed in the second recess 17-461. Moreover, in some embodiments, the second blade 17-460 further includes a second limiting edge 17-463, a fifth limiting edge 17-464, a second notch edge 17-466, and a sixth limiting edge 17-465 arranged in a counterclockwise manner. The second limiting edge 17-463, the fifth limiting edge 17-464 and the sixth limiting edge 17-465 may be straight, and the second notch edge 17-466 may be arc-shaped and may be adjacent to the window formed of the through holes 17-412, 17-422 and 17-432 (such as adjacent to the window relative to the fifth limiting edge 17-456). In some embodiments, the second blade 17-460 may include a hollow portion 17-467 extending in a direction that is perpendicular to the optical axis 17-O to reduce the weight of the second blade 17-460, so the force for driving the second blade 17-460 may be reduced accordingly. It should be noted that the first recess 17-451 of the first blade 17-450 and the second recess 17-461 of the second blade 17-460 extend in different directions.

FIGS. 172 to 174 are schematic views of the light flux adjustment module 17-401 viewed in different directions, wherein the top plate 17-420 and the middle plate 17-430 are omitted in FIGS. 173 and 174 for clarity. Referring to FIGS. 167 to 174, the driving magnetic element 17-472 and the driving coil 17-474 of the drive assembly 17-470 may interact with each other to generate a magnetic force. In some embodiments, the driving magnetic element 17-472 may be a magnet, and may be disposed on the connecting element 17-440, for example. The driving coil 17-474 may be affixed to another element outside the light flux adjustment module 17-401. As a result, when the magnetic force is generated between the driving magnetic element 17-472 and the driving coil 17-474 (such as passing circuit to the driving coil 17-474), the driving magnetic element 17-472 may bring the connecting element 17-440 to move together via the magnetic force. For example, it may move in the Y direction.

However, the present disclosure is not limited thereto. For example, in some embodiments, the driving magnetic element 17-472 may be affixed to another element outside the light flux adjustment module 17-401, and the driving coil 17-474 may be affixed to the connecting element 17-440, so the connecting element 17-440 may be moved by the interaction between the driving magnetic element 17-472 and the driving coil 17-474. Furthermore, the driving magnetic element 17-472 may be moved in the Z direction (or along the optical axis 17-O). In some embodiments, the positioning magnetic element 17-476 may be disposed on the fixed portion 17-405 and positioned between the fixed portion 17-405 and the driving magnetic element 17-472. When the connecting element 17-440 is stopped, the positioning magnetic element 17-476 may use for attracting the driving magnetic element 17-472 to fix the position of the connecting element 17-440. In some embodiments, a portion of the connecting element 17-440 contacting the driving magnetic element 17-472 may be tilted, so the driving magnetic element 17-472 may be easily disposed in the connecting element 17-440.

In some embodiments, a wiring direction of the driving coil 17-474 (e.g. X direction) is perpendicular to the optical axis 17-O (e.g. Z direction). A portion of the driving coil 17-474 overlaps the connecting element 17-440, the first blade 17-450, and the driving magnetic element 17-472 in the X direction, which is perpendicular to the optical axis 17-O. In some embodiments, the positioning magnetic element 17-476 may partially overlap the driving magnetic element 17-472, and may not overlap the driving coil 17-474. Furthermore, in some embodiments, the positioning magnetic element 17-476 may not overlap the driving magnetic element 17-472 and may partially overlap the driving coil 17-474. As a result, the design may be more flexible, and the required space may be reduced by allowing the elements overlap with each other, so miniaturization may be achieved.

Referring to FIGS. 167 to 174, the driving portion 17-444 passes through the recesses 17-414 and 17-438 and is movably connected to the first recess 17-451 of the first blade 17-450 and the second recess 17-461 of the second blade 17-460 in FIGS. 172 to 174. The first limiting edge 17-453 of the first blade 17-450 contacts the first column 17-411, and the third limiting edge 17-454 contacts the first limiting portion 17-416A, so the first blade 17-450 is limited at a first limit position (i.e. a position of the first blade 17-450 that is farthest from the optical axis 17-O). The size (e.g. diameter) of the window of the light flux adjustment module 17-401 is 17-D1 at this time.

Furthermore, the first blade 17-450 may perform rotation by using the first column 17-411 as its rotation pivot. In other words, the first column 17-411 may act as a stopper and a pivot at the same time, rather than using two separated stopper and pivot, so miniaturization may be achieved.

Moreover, the second limiting edge 17-463 of the second blade contacts the second column 17-413, the fifth limiting edge 17-464 contacts the third limiting portion 17-417A, so the second blade 17-460 is limited at a second limit position (i.e. a position of the second blade 17-460 that is farthest from the optical axis 17-O). Furthermore, the second blade 17-460 may rotate by using the second column 17-413 as its rotation pivot. In other words, the second column 17-413 may act as a stopper and a pivot at the same time, rather than using two separated stopper and pivot, so miniaturization may be achieved.

In some embodiments, the first blade 17-450 and the second blade 17-460 may be plate-shaped and positioned on different planes. For example, the first blade 17-450 and the second blade 17-460 may be positioned on a first virtual plane and a second virtual plane (not shown), respectively. The first virtual plane and the second virtual plate may intersect rather than fully overlap with each other. As a result, the first blade 17-450 and the second blade 17-460 may move on different planes rather than collide with each other, as shown in FIGS. 173 and 174.

In some embodiments, the drive assembly 17-470 (which includes the driving magnetic element 17-472, the driving coil 17-474, and the positioning magnetic element 17-476) is disposed on a side of the case 17-410. Other elements may be disposed on a side of case 17-410 which is opposite to the drive assembly 17-470 to balance the weight of the light flux adjustment module 17-401. For example, magnetic elements or sensors may be disposed opposite to the drive assembly 17-470, but the present disclosure is not limited thereto. A sensor and the driving element 17-470 may be disposed on an identical side for detecting the movement of the driving magnetic element 17-472 along the optical axis 17-O.

FIGS. 175 to 177 are schematic views of the light flux adjustment module 17-401 viewed in different directions, wherein the connecting element 17-440 is moved by passing current to the driving coil 17-474. The top plate 17-420 and the middle plate 17-430 are omitted in FIGS. 176 and 177 for clarity. When compared with the conditions in FIGS. 172 to 174, the driving portion 17-444 of the connecting portion 17-440 moves to −X direction. Because the driving portion 17-444 is disposed in the first recess 17-451 of the first blade 17-450 and in the second recess 17-461 of the second blade 17-460 at the same time, the first blade 17-450 and the second blade 17-460 may be driven concurrently. In particular, the first blade 17-450 may rotate in a clockwise manner (i.e. second moving dimension) using the first column 17-411 as the rotation pivot, and the second blade 17-460 may rotate in a counterclockwise manner (i.e. third moving dimension) using the second column 17-413 as the rotation pivot in FIG. 175. In other words, the first blade 17-450 and the second blade 17-460 rotate in opposite directions, and rotate or stop concurrently. By this design, two different blades (e.g. the first blade 17-450 and the second blade 17-460) may be driven by a single connecting element 17-440 to move in different directions, wherein the connecting element 17-440 only moves in a single direction. As a result, the light flux adjustment module 17-401 may have fewer elements to achieve miniaturization. It should be noted that the first moving dimension (i.e. linear movement in the X direction) of the connecting element 17-440, the second moving dimension (i.e. rotation) of the first blade 17-450, and the third moving dimension (i.e. rotation) of the second blade 17-460 are different. However, the present disclosure is not limited thereto, and the result of the present disclosure may be achieved as long as the movement manners are different. At this time, the first notch edge 17-456 of the first blade 17-450 and the second notch edge 17-466 of the second blade 17-460 come closer to each other.

FIGS. 178 to 180 are schematic views of the light flux adjustment module 17-401 viewed in different directions when the connecting element 17-440 is further driven. The top plate 17-420 and the middle plate 17-430 are omitted in FIGS. 179 and 180 for clarity. The fourth limiting edge 17-455 of the first blade 17-450 contacts the second limiting portion 17-417B of the case 17-410, and the sixth limiting edge 17-465 of the second blade 17-460 contacts the fourth limiting portion 17-416B of the case 17-410 to restrict the first blade 17-450 and the second blade 17-460 at a third limit position and a fourth limit position, respectively, which are the positions of the first blade 17-450 and the second blade 17-460 that are most adjacent to the optical axis 17-O. In some embodiments, the range between the first limit position and the third limit position may be called as a first limit movement range, and the range between the second limit position and the fourth limit position may be called as a second limit movement range.

The first notch edge 17-456 of the first blade 17-450 and the second notch edge 17-466 of the second blade 17-460 also forms a window having a size 17-D2 (e.g. diameter) less than the size 17-D1 of the window formed of the through holes 17-412, 17-422 and 17-432 (FIG. 172). As a result, the size of the window of the light flux adjustment module 17-401 may be changed to adjust the light flux of the light having the optical axis 17-O passing through the window.

It should be noted that the hollow portion 17-457 of the first blade 17-450 overlaps the hollow portion 17-467 of the second blade 17-460 when viewed along the optical axis 17-O in FIGS. 172 to 180. Furthermore, when the first blade 17-450 and the second blade 17-460 are moving, the area of the hollow portion 17-457 that overlaps the hollow portion 17-467 and the area of the first recess 17-451 that overlaps the second recess 17-461 are changed accordingly. In other words, when the connecting element 17-440 moves in a movable range, the first blade 17-450 at least partially overlaps the second blade 17-460, and the first blade 17-450 crosses the second blade 17-460 (e.g. extend in different directions) when viewed along the optical axis 17-O. The fact that the first blade 17-450 partially crosses (or overlaps) the second blade 17-460 allows the first blade 17-450 and the second blade 17-460 being disposed in a relative small space, so miniaturization may be achieved.

In some embodiments, the first blade and the second blade may have no window. In other words, the window formed of the through holes 17-412, 17-422, and 17-432 may be totally blocked after than first blade assembling with the second blade, so the first blade and the second may act as a shutter.

FIG. 181 is an exploded view of an optical element driving mechanism 17-500 in some embodiments of the present disclosure, FIG. 182 is a schematic of the optical element driving mechanism 17-500 when an outer case 17-510 is omitted, and FIG. 183 is a side view of some elements of the optical element driving mechanism 17-500. The optical element driving mechanism 17-500 may mainly include the light flux adjustment module 17-401, an optical element 17-505, an outer case 17-510, a bottom 17-520, a holder 17-530, a plurality of optical element driving coils 17-540, a plurality of driving magnetic elements 17-542, a resilient element 17-550, and a resilient element 17-552.

The outer case 17-510 and the bottom 17-520 may be combined with each other to form a case of the optical element driving mechanism 17-500, and may be called as a fixing portion 17-F. It should be noted that an outer case opening 17-512 and a bottom opening 17-522 are formed on the outer case 17-510 and the bottom 17-520, respectively. The center of the outer case opening 17-512 corresponds to the optical axis 17-O, the bottom opening 17-522 corresponds to an image sensor (not shown) outside the optical element driving mechanism 17-500. As a result, the optical element 17-505 disposed in the optical element driving mechanism 17-500 can perform image focusing with the image sensor along the optical axis 17-O.

The holder 17-530 has a through hole 17-532, and the optical element 17-505 may be fixed in the through hole 17-532. The optical element driving coil 17-540 may be disposed on the outer surface of the holder 17-530 and disposed in the case of the optical element driving mechanism 17-500, which is formed of the outer case 17-510 and the bottom 17-520, and the driving magnetic element 17-542 may be disposed on the outer case 17-510. Specifically, a magnetic force may be created by the interaction between the driving magnetic element 17-542 and the optical element driving coil 17-540 to move the holder 17-530 and the optical element driving coil 17-540 together along the direction of the optical axis 17-O to achieve rapid focusing. As a result, the holder 17-530 and the optical element driving coil 17-540 may be called as a movable portion 17-M together. In some embodiments, the driving magnetic element 17-542 may be disposed on the outer surface of the holder 17-530, and the optical element driving coil 17-540 may be disposed on the outer case 17-510 to allow the driving magnetic element 17-542 move with the holder 17-530.

In this embodiment, the holder 17-530 and the optical element 17-505 disposed therein are movably disposed in the outer case 17-510 and the bottom 17-520. More specifically, the holder 17-530 may be connected to and suspended in the outer case 17-510 and the bottom 17-520 by the resilient element 17-550 and the resilient element 17-552 made of a metal material, for example. When current is applied to the optical element driving coil 17-540, the optical element driving coil 17-540 can act with the magnetic field of the driving magnetic element 17-542 (such as a magnet) to generate an electromagnetic force to move the holder 17-530 and the optical element 17-505 along the optical axis 17-O direction relative to the outer case 17-510 and the bottom to achieve auto focusing.

Furthermore, the bottom 17-520 may be, for example, a flexible printed circuit (FPC), to be electrically connected to other electronic elements inside or outside the optical element driving mechanism 17-500 to achieve auto focus and optical image stabilization. Furthermore, electronic signal may be transfer through the resilient element 17-552 to the optical element driving coil 17-540 to control the movement of the holder 17-530 in X, Y, or Z directions.

For example, the light flux adjustment module 17-401 may be disposed in the case formed of the outer case 17-510 and the bottom 17-520, and may be disposed on a light incident side of the optical element 17-505 (a side far from the bottom 17-520) to control the amount of the light entering the optical element 17-505. In some embodiments, the light flux adjustment module 17-401 may be fixed to the outer case 17-510, and the optical element 17-505 may move relative to the light flux adjustment module 17-401. In some embodiments, the light flux adjustment module 17-401 may be affixed to the optical element 17-505 (such as on the holder 17-530) to move with the optical element 17-505 relative to the case 17-510. In FIG. 183, the light flux adjustment module 17-401 is partially disposed adjacent to the optical element 17-505 (i.e. overlap with the optical element 17-505 in X or Y direction) to effectively utilize the space of the optical element driving mechanism 17-500.

FIG. 184 is a schematic view when the elements of the optical element driving mechanism 17-500 are assembled as a driving component 17-506, except for light flux adjustment module 17-401, the optical element 17-505, and the outer case 17-510. In some embodiments, the optical element driving mechanism 17-500 may be assembled in a subsequence of positioning the optical element 17-505 in the driving component 17-506, positioning the light flux adjustment module 17-401 on the driving component 17-506, and positioning the outer case 17-510 on the driving component 17-506. However, the present disclosure is not limited thereto. For example, the optical element driving mechanism 17-500 may be assembled in a subsequence of assembling the light flux adjustment module 17-401 with the driving component 17-506, providing the optical element 17-505 in the driving component 17-506 from another side of the driving component 17-506 (the side without the light flux adjustment module 17-401), and the providing the outer case 17-510 on the driving component 17-506. In this way, the required number of elements during assembling may be reduced, so the height of the optical element driving mechanism 17-500 may be reduced to achieve miniaturization. In some embodiments, the light flux adjustment module 17-401 may be disposed between the bottom 17-520 and the resilient element 17-550.

FIGS. 185 and 186 are schematic views of an optical element driving mechanism 17-501 and an optical element driving mechanism 17-502 in some embodiments of the present disclosure, respectively. The optical element driving mechanisms 17-501 and 17-502 further include a sensor 17-560 and a circuit element 17-562. In FIG. 185, the sensor 17-560 and the circuit element 17-562 of the optical element driving mechanism 17-501 and the drive assembly 17-470 (such as the driving coil 17-474) of the light flux adjustment module 17-401 may be disposed on an identical side. As a result, the space at the side of the optical element driving mechanism 17-501 may be further utilized to achieve miniaturization. In FIG. 186, the sensor 17-560 and the circuit element 17-562 of the optical element driving mechanism 17-502 may be disposed on a different side to the drive assembly 17-470 (such as the driving coil 17-474) of the light flux adjustment module 17-401, such as disposed on opposite sides. As a result, magnetic interference that possibly occurs may be prevented. In some embodiments, a plurality of sensors 17-560 may be disposed on an identical side of the optical element driving mechanism 17-500 to separately detect the movement between the fixing portion 17-F and the movable portion 17-M, and the movement between the fixed portion 17-405 and the connecting portion 17-440. All of the plurality of the sensors 17-560 may be partially disposed on the circuit element 17-562.

In some embodiments, the light flux adjustment module 17-401 may be operated after the adjustment of the focal length of the optical element 17-505 is finished, and the position of the driving magnetic element 17-472 is fixed. As a result, the focal length of the optical element 17-505 may be adjusted when the intensity of light incident to the optical element 17-505 is relatively high, so the accuracy of the adjustment may be enhanced. Therefore, before the light flux adjustment module 17-401 is shut down, a signal may be sent to the light flux adjustment module 17-401 for turning on the light flux adjustment module 17-401 (i.e. make the window not covered by the first blade 17-450 and the second blade 17-460).

The light flux adjustment module 17-401 provided in the present disclosure also may be applied in an optical system having two lenses. For example, the optical system 17-600 in FIG. 187 includes an optical element driving mechanism 17-503 and an optical element driving mechanism 17-504, wherein the light flux adjustment module 17-401 is disposed on the optical element driving mechanism 17-503, and does not disposed on the optical element driving mechanism 17-504. The optical element driving mechanisms 17-503 and 17-504 may be mechanisms with different functions, such as being mechanisms having a wide angle lens and a long focal length lens, respectively. In this embodiment, the drive assembly 17-470 of the light flux adjustment module 17-401 may be disposed on a side far from the optical element driving mechanism 17-504 to prevent possible magnetic interference. In some embodiments, the light flux adjustment module 17-401 may be provided on the optical element driving mechanism 17-504, and the drive assembly 17-470 of the optical element driving mechanism may be disposed on a side far from the optical element driving mechanism 17-503, too.

In some embodiments, the light flux adjustment module 17-401 may be applied in a periscope optical system. For example, as shown in FIG. 188, a periscope optical system 17-507 may include an optical element driving module 17-570, an optical path adjustment module 17-580, and an optical sensor 17-590. External light (such as light 17-508) which enters the optical element 17-507 through a light incident hole 17-571 may be reflected by the optical path adjustment module 17-580 to pass through the optical element driving mechanism 17-570, and the be received by the image sensor 17-590. In other words, the direction of the light 17-508 may be changed by the optical path adjustment module 17-580.

The detailed structures of the optical element driving module 17-570 and the light path adjustment module 17-580 are described below. As shown in FIG. 188, the optical element driving module 17-570 mainly includes a driving mechanism 17-572 and a camera module 17-573, wherein the driving mechanism 17-572 is used for moving the camera module 17-573 relative to the image sensor 17-590. For example, the driving mechanism 17-572 may include a camera module holder 17-574, a frame 17-575, two spring sheets 17-576, at least one coil 17-577, and at least one magnetic element 17-578.

The camera module 17-573 is affixed to the cameral module holder 17-574. Two spring sheets 17-576 are connected to the cameral module holder 17-574 and the frame 17-575, and respectively disposed on opposite sides of the cameral module holder 17-574. Thus, the camera module holder 17-574 can be movably hung in the frame 17-575. The coil 17-577 and the magnetic element 17-578 are respectively disposed on the cameral module holder 17-574 and the frame 17-575, and correspond to each other. When current flows through the coil 17-577, an electromagnetic effect is generated between the coil 17-577 and the magnetic element 17-578, and the cameral module holder 17-574 and the camera module 17-573 disposed thereon can be driven to move relative to the image sensor 17-590.

The optical path adjustment module 17-580 mainly includes an optical element 17-581, an optical element holder 17-582, a frame 17-583, at least one hinge 17-584, a driving module 17-585, and a position sensor 17-586. The driving module 17-585 can include a first electromagnetic drive assembly 17-587 and a second electromagnetic drive assembly 17-588, respectively disposed on the frame 17-583 and the optical element holder 17-582 and corresponding to each other.

The optical element holder 17-582 may be affixed to the hinge 17-584, and the hinge 17-584 is rotatable and disposed on the frame 17-583 (such as rotate through a bearing, not shown). Therefore, the optical element holder 17-582 can be pivotally connected to the frame 17-583 via the hinge 17-584. Since the optical element 17-581 is disposed on the optical element holder 17-582, when the optical element holder 17-582 rotates relative to the frame 17-583, the optical element 17-581 disposed thereon also rotates relative to the frame 17-583. The optical element 17-581 can be a prism or a reflecting mirror.

For example, the first electromagnetic drive assembly 17-587 may include a driving coil, and the second electromagnetic drive assembly 17-588 may include a magnet. When a current flows through the driving coil (the first electromagnetic drive assembly 17-587), an electromagnetic effect is generated between the driving coil and the magnet. Thus, the optical element holder 17-582 and the optical element 17-581 can be driven to rotate relative to the frame 17-583, so as to adjust the position of the external light 17-508 on the image sensor 17-590. With structured light, infrared ray or ultrasonic waves, this disclosure may achieve the effects of depth sensing, spatial scanning, etc. Additionally, this disclosure may be applied to spatial planning, compensating for the impact of the environment, improving the blurring of images or videos when the light is bad or weather is poor, and enhancing the quality of shooting or recording.

The position detector 17-586 can be disposed on the frame 17-583 and correspond to the second electromagnetic drive assembly 17-588, so as to detect the position of the second electromagnetic drive assembly 17-588 to obtain the rotation angle of the optical element 17-581. For example, the position detectors 17-586 can be Hall sensors, magnetoresistance effect sensors (MR sensor), giant magnetoresistance effect sensors (GMR sensor), tunneling magnetoresistance effect sensors (TMR sensor), or fluxgate sensors.

In some embodiments, the light flux adjustment module 17-401 may be disposed between the camera module 17-573 and the optical element 17-581 and arranged with each other in the X direction for controlling the amount of light passing through the camera module 17-573, as shown in FIG. 188. When viewed in the Y direction, the optical element driving mechanism 17-570 at least partially overlaps the light flux adjustment module 17-401. For example, the optical element driving mechanism 17-570 at least partially overlaps the drive assembly 17-470. Moreover, the camera module 17-573 at least partially overlaps the light flux adjustment module 17-401 (such as partially overlaps the drive assembly 17-470). Moreover, the camera module 17-573 may be partially disposed in the light flux adjustment module 17-401 (such as partially disposed in the window formed of the through holes 17-412, 17-422 and 17-432). As a result, required space may be reduced to achieve miniaturization.

In summary, a light flux adjustment module is provided for adjusting light flux of light having an optical axis, including a fixed portion, a connecting element, a first blade, and a drive assembly. The fixed portion includes a window, and the light passes through the window. The connecting element is movably connected to the fixed portion. The first blade is movably connected to the connecting element and the fixed portion, and the first blade is adjacent to the window. The drive assembly is used for driving the connecting element to move relative to the fixed portion in a first moving dimension. When the connecting element is moved relative to the fixed portion in the first direction, the first blade is driven by the connecting element to move relative to the fixed portion in a second moving dimension, and the first moving dimension and the second moving dimension are different. Moreover, optical element driving mechanisms and optical systems using the light flux adjustment module are provided in the present disclosure as well. The light flux adjustment module may adjust the amount of light passed through, enhance the image quality, and achieve miniaturization.

Eighteenth Group of Embodiments

Please refer to FIG. 189, which shows a front view of an electronic device 18-10 according to an embodiment of the present disclosure. The electronic device 18-10 can be a portable electronic device. As shown in FIG. 189, an optical element driving mechanism 18-100 can be disposed on an upper side of a touch panel 18-12 of the electronic device 18-10, and the optical element driving mechanism 18-100 can be an optical camera system and can be configured to hold and drive an optical element 18-OE. The optical element driving mechanism 18-100 can be installed in various electronic devices or portable electronic devices, such as a smartphone (for example, the electronic device 18-10), for allowing a user to perform the image capturing function. In this embodiment, the optical element driving mechanism 18-100 can be a voice coil motor (VCM) with an auto-focusing (AF) function, but it is not limited thereto. In other embodiments, the optical element driving mechanism 18-100 can also perform the functions of auto-focusing and optical image stabilization (OIS).

As shown in FIG. 189, when viewed along the optical axis 18-O (the Z-axis direction) of the optical elements OE, the optical element driving mechanism 18-100 has a rectangular structure. That is, the optical element driving mechanism 18-100 has a long side 18-100L and a short side 18-100S which are not equal. In addition, the long side 18-100L of the optical element driving mechanism 18-100 and a long side 18-10L of the electronic device 18-10 are not parallel. In addition, the optical element driving mechanism 18-100 may have a photosensitive element 18-150, configured to receive the light which travels through the optical element 18-OE along the optical axis 18-O. The photosensitive element 18-150 may also have a rectangular structure, and a longitudinal axis (along the X-axis) of the photosensitive element 18-150 is not parallel to a longitudinal axis (along the Y-axis) of the electronic device 18-10. However, in other embodiments, the longitudinal axis of the photosensitive element 18-150 can be parallel to the longitudinal axis of the electronic device 18-10.

Based on the above design of the optical element driving mechanism 18-100, the performance of photographing can be improved, and both miniaturization and image quality improvement can be achieved at the same time.

Next, please refer to FIG. 190 to FIG. 192. FIG. 190 is an exploded diagram of the optical element driving mechanism 18-100 according to an embodiment of the present disclosure, FIG. 191 is a partial exploded diagram of the optical element driving mechanism 18-100 according to an embodiment of the present disclosure, and FIG. 192 is a cross-sectional view of the optical element driving mechanism 18-100 along line 18-A-18-A' in FIG. 191 according to an embodiment of the present disclosure. As shown in FIG. 190, in the present embodiment, the optical element driving mechanism 18-100 can include a fixed assembly 18-FA, a movable assembly 18-MA, and a driving assembly 18-DA. The movable assembly 18-MA is movably connected to the fixed assembly 18-FA, and the movable assembly 18-MA is configured to hold the optical element 18-OE. The driving assembly 18-DA is configured to drive the movable assembly 18-MA to move relative to the fixed assembly 18-FA.

In this embodiment, as shown in FIG. 190, the fixed assembly 18-FA includes a casing 18-102 and a base 18-112. The movable assembly 18-MA includes a lens holder 18-108 and the aforementioned optical element 18-OE, and the lens holder 18-108 is used for holding the optical element 18-OE.

As shown in FIG. 190, the casing 18-102 has a hollow structure, and a casing opening 18-1021 is formed thereon, and a base opening 18-1121 is formed on the base 18-112. The center of the casing opening 18-1021 corresponds to the optical axis 18-O of the optical element 18-OE, and the base opening 18-1121 corresponds to a photosensitive element (such as the photosensitive element 18-150 in FIG. 189) disposed under the base 18-112. The external light can enter the casing 18-102 from the casing opening 18-1021 to be received by the photosensitive element 18-150 after passing through the optical element 18-OE and the base opening 18-1121 so as to generate a digital image signal.

Furthermore, the casing 18-102 is disposed on the base 18-112 and may have an accommodating space 18-1023 for accommodating the movable assembly 18-MA (including the aforementioned optical element 18-OE and the lens holder 18-108) and the driving assembly 18-DA.

The movable assembly 18-MA may further include a first elastic member 18-106 and a second elastic member 18-110. The outer portion (the outer ring portion) of the first elastic member 18-106 is fixed to the inner wall surface of the casing 18-102, the outer portion (the outer ring portion) of the second elastic member 18-110 is fixed to the base 18-112, and the inner portions (the inner ring portions) of the first elastic member 18-106 and the second elastic member 18-110 are respectively connected to the upper and lower sides of the lens holder 18-108, so that the lens holder 18-108 can be suspended in the accommodating space 18-1023.

In this embodiment, the driving assembly 18-DA may include a first magnet 18-M11, a second magnet 18-M12, a first coil 18-CL11, and a second coil 18-CL12. The first coil 18-CL11 and the second coil 18-CL12 are disposed on the lens holder 18-108, and the first magnet 18-M11 and the second magnet 18-M12 are disposed on the inner wall surface of the casing 18-102 respectively corresponding to the first coil 18-CL11 and the second coil 18-CL12.

In this embodiment, the first coil 18-CL11 and the second coil 18-CL12 may be wound coils and be disposed on opposite sides of the lens holder 18-108. When the first coil 18-CL11 and the second coil 18-CL12 are provided with electricity, the first coil 18-CL11 and the second coil 18-CL12 respectively act with the first magnet 18-M11 and the second magnet 18-M12 to generate an electromagnetic force, so as to drive the lens holder 18-108 and the held optical element 18-OE to move relative to the base 18-112 along the optical axis 18-O (the Z-axis).

Furthermore, please refer to FIG. 193, which is a cross-sectional view of the optical element driving mechanism 18-100 along line B-B' in FIG. 191 according to an embodiment of the present disclosure. In this embodiment, the optical element 18-OE may define a first section 18-SG1, a second section 18-SG2, and a central section 18-CG disposed between the first section 18-SG1 and the second section 18-SG2. When viewed in a direction perpendicular to the optical axis 18-O (for example, along the X-axis), the maximum size of the first section 18-SG1 is different from the maximum size of the second section 18-SG2 (for example, along the Y-axis).

As shown in FIG. 193, the central section 18-CG has an intermediate surface ICS that is not parallel to the optical axis 18-O, and the lens holder 18-108 of the movable assembly 18-MA has an opening 18-108H (the moving assembly opening) for accommodating the optical element 18-OE, and the opening 18-108H corresponds to the optical axis 18-O.

When viewed in the direction perpendicular to the optical axis 18-O, as shown in FIG. 193, the maximum size of the base opening 18-1121 (the fixed assembly opening) is different from the maximum size of the opening 18-108H, and the central section 18-CG is located between the opening 18-108H and the base opening 18-1121. In this embodiment, the base opening 18-1121 is larger than the opening 18-108H, but it is not limited thereto. In other embodiments, the opening 18-108H can be larger than the base opening 18-1121.

The first section 18-SG1 includes a first lens barrel 18-OE1 and a first lens 18-LS1. The second section 18-SG2 includes a second lens barrel 18-OE2 and a second lens 18-LS2, and the diameters of the first lens 18-LS1 and the second lens 18-LS2 are different.

In this embodiment, the lens holder 18-108 is fixedly connected to at least one of the first lens barrel 18-OE1, the second lens barrel 18-OE2, and the central section 18-CG by an adhesive element, such as glue.

Specifically, please refer to FIG. 190 and FIG. 194. FIG. 194 is a perspective cross-sectional diagram of the optical element driving mechanism 18-100 according to an embodiment of the present disclosure. The lens holder 18-108 can include a body 18-1081 and a contacting portion 18-1082, and the contacting portion 18-1082 can be a platform disposed between the optical element 18-OE and the body 18-1081. Therefore, a gap is formed between the central section 18-CG and the lens holder 18-108 of the movable assembly 18-MA, and then adhesive element 18-GU can be disposed in the gap.

Furthermore, as shown in FIG. 194, the lens holder 18-108 of the movable assembly 18-MA has a first surface 18-S1 and a second surface 18-S2 which are perpendicular to each other, and a first portion 18-GU1 of the adhesive element 18-GU is connected to the first surface 18-S1. A second portion 18-GU2 of the adhesive element 18-GU is connected to the second surface 18-S2, and the size of the first portion 18-GU1 is larger than that of the second portion 18-GU2.

Please refer to FIG. 191 and FIG. 193. The lens holder 18-108 of the movable assembly 18-MA may have a polygonal structure. In this embodiment, the lens holder 18-108 has a rectangular structure, and the lens holder 18-108 has a first side 18-1083, a second side 18-1084, and two concave grooves 18-108C. The concave groove 18-108C is disposed on the first side 18-1083 of the lens holder 18-108, and the concave groove 18-108C is formed along a direction parallel to the optical axis 18-O. When viewed along the optical axis 18-O, the concave groove 18-108C only partially overlaps the first section 18-SG1 or the second section 18-SG2. As shown in FIG. 193, in this embodiment, the concave groove 18-108C partially overlaps the second section 18-SG2.

Furthermore, the optical element 18-OE may have a first corresponding portion 18-OEP exposed from the concave groove 18-108C and directly facing a side wall 18-1025 of the casing 18-102, and the side wall 18-1025 is parallel to the optical axis 18-O. When viewed in the direction perpendicular to the optical axis 18-O, as shown in FIG. 193, no part of the movable assembly 18-MA is located between the first corresponding portion 18-OEP and the side wall 18-1025. Specifically, no element is disposed between the first corresponding portion 18-OEP and the side wall 18-1025.

As shown in FIG. 191 and FIG. 193, the lens holder 18-108 further has a projecting portion 18-108P. The projecting portion 18-108P and the concave groove 18-108C are arranged along the direction parallel to the optical axis 18-O. The projecting portion 18-108P extends along the direction parallel to the optical axis 18-O. When viewed along the optical axis 18-O, as shown in FIG. 193, the projecting portion 18-108P, the concave groove 18-108C, and the second section 18-SG2 are partially overlapped.

Furthermore, as shown in FIG. 191 and FIG. 192, the lens holder 18-108 of the movable assembly 18-MA is elastically connected to the fixed assembly 18-FA via the first elastic member 18-106 and the second elastic member 18-110. The inner portion (a first movable connecting portion 18-1061) of the first elastic member 18-106 is fixedly disposed on the projecting portion 18-108P, and the inner portion (a second movable connecting portion 18-1101) of the second elastic member 18-110 is fixedly disposed on the bottom of the lens holder 18-108.

In addition, please refer to FIG. 195, which is a bottom view of a part of the structure of the optical element driving mechanism 18-100 according to an embodiment of the present disclosure. At least a part of the first movable connecting portion 18-1061 does not overlap the second movable connecting portion 18-1101 when viewed in the direction parallel to the optical axis 18-O.

Please refer to FIG. 191 and FIG. 196. FIG. 196 is a top view of a part of the structure of the optical element driving mechanism 18-100 in accordance with an embodiment of the present disclosure. In this embodiment, the base 18-112 can have at least one protrusion 18-112P, and the protrusion 18-112P and the concave groove 18-108C are located on the first side 18-1083 of the lens holder 18-108. The protrusion 18-112P partially overlaps the concave groove 18-108C when viewed along the optical axis 18-O (the Z-axis).

Please refer to FIG. 197 and FIG. 198. FIG. 197 is a partial structural diagram of the optical element driving mechanism 18-100 according to another embodiment of the present disclosure, and FIG. 198 is a top view of the optical element driving mechanism 18-100 in FIG. 197 according to another embodiment of the present disclosure. In this embodiment, the optical element driving mechanism 18-100 can further include a position sensing assembly 18-160 for sensing the movement of the movable assembly 18-MA relative to the fixed assembly 18-FA, such as sensing the movement of the lens holder 18-108 relative to the base 18-112. The position sensing assembly 18-160 can include a magnet 18-161, a position sensor 18-163, and a circuit board 18-165. The magnet 18-161 is disposed on the first side 18-1083 of the lens holder 18-108, and the position sensor 18-163 is disposed on the circuit board 18-165 and is configured to sense the change of the magnetic field of the magnet 18-161.

As shown in FIG. 198, when viewed in a direction parallel to the first side 18-1083 (for example, viewed in the X-axis), the magnet 18-161 partially overlaps the concave groove 18-108C.

Furthermore, a portion of the driving assembly 18-DA (the second coil 18-CL12 and the second magnet 18-M12) is disposed on the second side 18-1084 of the lens holder 18-108. When viewed along the X-axis, a central axis 18-AX of the second magnet 18-M12 is offset from the central axis (the optical axis 18-O) of the optical element 18-OE. That is, a length 18-L12 of the second magnet 18-M12 is smaller than a length 18-L11 of the first magnet 18-M11. Based on this design, it can prevent the position sensing assembly 18-160 from being interfered with by the magnetic field generated by the second magnet 18-M12.

Please refer to FIG. 199, which is a cross-sectional view of the optical element driving mechanism 18-100 according to another embodiment of the present disclosure. In this embodiment, the casing 18-102 is made of a plastic material, and the position sensor 18-163 of the position sensing assembly 18-160 is disposed at the casing 18-102.

Specifically, the casing 18-102 includes a side wall 18-1025, and the side wall 18-1025 has a first side surface 18-1026 and a second side surface 18-1027 opposite to each other. The second side surface 18-1027 faces the optical element 18-OE, and an accommodating groove 18-102C is formed on the first side surface 18-1026 and is configured to accommodate the position sensor 18-163. In other embodiments, the casing 18-102 may not have the accommodating groove 18-102C, and the position sensor 18-163 may be disposed directly on the first side surface 18-1026.

As shown in FIG. 199, the optical element driving mechanism 18-100 may further include a protective element 18-PE disposed in the accommodating groove 18-102C and covering the position sensor 18-163. The protective element 18-PE may be glue configured to fix and protect the position sensor 18-163.

In this embodiment, as shown in FIG. 199, the optical element driving mechanism 18-100 may further include a circuit member 18-170 embedded in the casing 18-102 of the fixed assembly 18-FA, and the circuit member 18-170 is configured to be electrically connected to the position sensor 18-163 and an external circuit. The circuit member 18-170 can be implemented by insert molding technology, but it is not limited to this embodiment.

The present disclosure provides an optical element driving mechanism 18-100 disposed in a portable electronic device. Because the optical element driving mechanism 18-100 has a rectangular structure, the area of the touch panel 18-12 of the portable electronic device can be designed to be larger. In addition, the optical element driving mechanism 18-100 having the rectangular structure can improve the performance of the photographing, achieve the purpose of miniaturization, and improve image quality at the same time.

In addition, in some embodiments of the present disclosure, the lens holder 18-108 has a rectangular structure, and two concave grooves 18-108C are disposed on the two first sides 18-1083 of the rectangular structure. The concave grooves 18-108C are configured to accommodate a portion of the optical element 18-OE, so that the lens holder 18-108 with a rectangular structure can accommodate a larger optical element 18-OE, thereby improving the quality of the image.

Nineteenth Group of Embodiments

FIG. 200 is a perspective view of an optical element driving mechanism 19-1 and an optical element 19-2 in accordance with some embodiments of this disclosure. When an electronic device (e.g. a smart phone) is provided with the optical element driving mechanism 19-1, the optical element driving mechanism 19-1 may be disposed in the front of the smart phone as a front lens along with the optical element 19-2. The optical element 19-2 has an optical axis 19-O. The optical axis 19-O is an imaginary axis passing through the center of the optical element 19-2. FIG. 201 is an exploded view of the optical element driving mechanism 19-1 in FIG. 200. The optical element driving mechanism 19-1 includes a fixed part 19-P1, a movable part 19-P2, a driving assembly 19-40, and a sensing assembly 19-80. The movable part 19-P2 moves relative to the fixed part 19-P1 and may hold the optical element 19-2. The driving assembly 19-40 drives the movable part 19-P2 to move relative to the fixed part 19-P1. The sensing assembly 19-80 senses the movement of the movable part 19-P2 relative to the fixed part 19-P1.

The fixed part 19-P1 has a main axis 19-M. The main axis 19-M passes through the center of the optical element driving mechanism 19-1. It should be noted that when the optical element 19-2, the optical element driving mechanism 19-1 and a light-detection element (not shown) (e.g. a charge-coupled detector, CCD) are aligned, the optical axis 19-O of the optical element 19-2 also passes through the center of the optical element driving mechanism 19-1 so that the optical axis 19-O of the optical element 19-2 coincides with the main axis 19-M of the fixed part 19-P1. However, movement, vibration, or tilt of the movable part 19-P2 may cause the optical axis 19-O of the optical element 19-2 not coincide with the main axis 19-M of the fixed part 19-P1 because the optical element 19-2 is disposed in the movable part 19-P2.

In this embodiment, the fixed part 19-P1 includes a case 19-10, a circuit assembly 19-60, and a bottom 19-70. The movable part 19-P2 includes a first elastic element 19-20, a holder 19-30, and two second elastic elements 19-50. The driving assembly 19-40 includes two magnetic elements 19-41 and two coils 19-42. The sensing assembly 19-80 includes a sensed object 19-81 and a sensor 19-82. It should be noted that the elements may be added or omitted according with the requirements of the users.

The case 19-10, the circuit assembly 19-60, and the bottom 19-70 of the fixed part 19-P1 are arranged sequentially along the main axis 19-M. The case 19-10 is located over the circuit assembly 19-60 and the bottom 19-70. The case 19-10 may be made of metal material or non-metal material such as plastics. The case 19-10 made of non-metal material may isolate electromagnetic wave. In this way, the electromagnetic wave interference generated by an antenna close to the optical element driving mechanism 19-1 may be reduced.

The case 19-10 includes a top surface 19-11 and four sidewalls 19-12 extending from the edge of the top surface 19-11 along the main axis 19-M. The bottom 19-70 has an opening 19-71. The sidewalls 19-12 of the case 19-10 are connected to the bottom 19-70 and the space formed therein may accommodate the movable part 19-P2, the driving assembly 19-40, and the sensing assembly 19-80, and the like.

The circuit assembly 19-60 is disposed on the bottom 19-70. The circuit assembly 19-60 may be a circuit board such as a flexible print circuit (FPC) or a flexible-hard composite board. The circuit assembly 19-60 is connected to an outside-connection circuit member 19-120. The current may be supplied to the optical element driving mechanism 19-1 via the outside-connection circuit member 19-120. How the current flows through the optical element driving mechanism 19-1 is described in detail in the following content.

The first elastic element 19-20, the holder 19-30, and the second elastic elements 19-50 of the movable part 19-P2 are arranged along the main axis 19-M sequentially. The holder 19-30 has a through hole 19-31 for holding the optical element 19-2. A screw and its corresponding threaded structure may be configured between the through hole 19-31 and the optical element 19-2, so that the optical element 19-2 may be affixed in the holder 19-30.

The first elastic element 19-20 and the second elastic elements 19-50 may be made of metal material. The holder 19-30 may be movably connected to the case 19-10 and the bottom 19-70 by being held elastically by the first elastic element 19-20 and the second elastic elements 19-50. Held between the first elastic element 19-20 and the second elastic elements 19-50, the holder 19-30 is not in direct contact with the case 19-10 and the bottom 19-70. Additionally, the range of motion of the holder 19-30 is also restricted to avoid the holder 19-30 and the optical element 19-2 therein get damaged because of collision with the case 19-10 or the bottom 19-70 when the optical element driving mechanism 19-1 moves or is impacted.

The position of each of the magnetic elements 19-41 of the driving assembly 19-40 corresponds to the position of each of the coils 19-42 of the driving assembly 19-40. The magnetic elements 19-41 and the coils 19-42 are disposed close to the holder 19-30. The magnetic elements 19-41 may be permanent magnets. The arrangement direction of the pair of magnetic poles (N-pole and S-pole) of the magnetic elements 19-41 is parallel to the main axis 19-M. The magnetic elements 19-41 and the coil 19-42 are substantially rectangular. The long side of each of the magnetic elements 19-41 corresponds to the long side of each of the coils 19-42. When the current is supplied to the coils 19-42, magnetic force may be generated between the magnetic elements 19-41 and the coils 19-42 for driving the holder 19-30 and the optical element 19-2 therein to move along the optical axis 19-O. Each of the coils 19-42 has a winding axis 19-421 that is perpendicular to the main axis 19-M and parallel to the plane on which the circuit assembly 19-60 is located. Compared to the configuration of the winding axis 19-421 that is parallel to the main axis 19-M, the configuration of the coils 19-42 in this embodiment may reduce the size of the optical element driving mechanism 19-1 in a direction that is perpendicular to the main axis 19-M. Furthermore, when viewed along the main axis 19-M, the driving assembly 19-40 partially overlaps the circuit assembly 19-60, which may also reduce the size of the optical element driving mechanism 19-1 in a direction that is perpendicular to the main axis 19-M.

The position of the sensed object 19-81 of the sensing assembly 19-80 corresponds to the position of the sensor 19-82 of the sensing assembly 19-80. Please refer to FIG. 202 first. FIG. 202 is a schematic view of the optical element driving mechanism 19-1. The sensed object 19-81 is disposed close to the holder 19-30. The holder 19-30 includes a receiving space 19-32 for receiving the sensed object 19-81. The sensor 19-82 is disposed on the bottom 19-70. Particularly, the sensor 19-82 is mounted to the surface of the circuit assembly 19-60 that faces the bottom 19-70 by surface mount technology (SMT) and the like. The bottom 19-70 includes a receiving portion 19-72 for receiving the sensor 19-82. The receiving portion 19-72 may penetrate through (e.g. as a through hole) or may not penetrate through (e.g. as a recess) the bottom 19-70. Therefore, the circuit assembly 19-60 is disposed between the holder 19-30 and the sensor 19-82. The sensed object 19-81 may be a magnetic element such as a magnet. The sensor 19-82 may be a giant magneto resistance (GMR) sensor, a tunneling magneto resistance (TMR) sensor, and the like. When the holder 19-30 moves, the sensed object 19-81 close to the holder 19-30 also moves, and thus the magnetic field of the sensed object 19-81 changes. The sensor 19-82 may sense the change of the magnetic field of the sensed object 19-81 in order to know the position of the holder 19-30 and adjust the position of the holder 19-30, achieving the effects of controlling the movement of the holder 19-30.

Next, please refer to FIG. 203 to FIG. 206. FIG. 203 is a perspective view of the holder 19-30. FIG. 204 is a top view of the circuit assembly 19-60. FIG. 205 is a top view of the bottom 19-70. FIG. 206 is a cross-sectional view of a portion of the optical element driving mechanism 19-1.

As shown in FIG. 203, the holder 19-30 includes three stopping portions 19-33. The sensed object 19-81 is disposed on one of the corners of the holder 19-30, and the three stopping portions 19-33 of the holder 19-30 are disposed on the other three corners of the holder 19-30. As shown in FIG. 204, the circuit assembly 19-60 includes three concave portions 19-63. As shown in FIG. 205, the bottom 19-70 includes three recesses 19-73. When the holder 19-30, the circuit assembly 19-60, and the bottom 19-70 arranged in a stack, the sensed object 19-81 disposed on the holder 19-30 corresponds to the sensor 19-82 disposed on the bottom 19-70. The three stopping portions 19-33 correspond to the three concave portions 19-63 of the circuit assembly 19-60 and the three recesses 19-73 of the bottom 19-70.

The stopping portions 19-33 may restrict the range of motion of the holder 19-30 relative to the bottom 19-70. As shown in FIG. 206, when the holder 19-30 moves, the stopping portions 19-33 pass through the concave portions 19-63 of the circuit assembly 19-60 and are not blocked by the circuit assembly 19-60. Specifically, when the holder 19-30 moves toward the bottom 19-70, a portion of the stopping portions 19-33 is located in the concave portions 19-63. At the same time, when viewed along a direction that is perpendicular to the main axis 19-M, the stopping portions 19-33 partially overlap the circuit assembly 19-60.

When the driving assembly 19-40 drives the holder 19-30 to move along the optical axis 19-O and reach the limit, the stopping portions 19-33 contact the recesses 19-73 of the bottom 19-70, and thus the rest of the portions of the holder 19-30 cannot contact the bottom 19-70 so as to prevent the rest of the portions of the holder 19-30 from colliding with the bottom 19-70. Therefore, the holder 19-30 and the optical element 19-2 therein don't get damaged because the bottom 19-70 does not collide with bottom 19-70 thanks to the stopping portions 19-33.

Furthermore, the number and the positions of the stopping portions 19-33 may be adjusted. There may be one or more stopping portions 19-33. For example, in this embodiment, there are three stopping portions 19-33, so there are three contact areas between the three stopping portions 19-33 and the bottom 19-70. In such an embodiment, three contact areas may effectively attribute collision force and enhance the stability of the optical element driving mechanism 19-1. Additionally, in this embodiment, the stopping portions 19-33 are part of the holder 19-30 and the recesses 19-73 that are in contact with the stopping portions 19-33 are part of the bottom 19-70. However, the bottom 19-70 may include a stopping portion (not shown) to substitute the recesses 19-73, so that the stopping portions 19-33 of the holder 19-30 correspond to the stopping portion of the bottom 19-70. Alternatively, only one of the holder 19-30 and the bottom 19-70 includes one or more stopping portions. For example, the sensor 19-82 is disposed in one of the corners of the bottom 19-70 while the one or more stopping portions are disposed in the other corners of the bottom 19-70.

Additionally, as shown in FIG. 205, the bottom 19-70 includes four supporting platforms 19-75. The height of the supporting platforms 19-75 is higher than that of the rest of the portions of the bottom 19-70. That is, the supporting platforms 19-75 are closer to the top surface 19-11 of the case 19-10 than the rest of the portions of the bottom 19-70. When viewed along the main axis 19-M, the supporting platforms 19-75 do not overlap the sensor 19-82. The functions of the supporting platforms 19-75 will be described further in the following content.

FIG. 207 is a perspective view of a portion of the bottom 19-70. In the following drawings, only one of the supporting platforms 19-75 is shown. The optical element driving mechanism 19-1 further includes a loop member 19-90. A portion of the loop member 19-90 is embedded in the bottom 19-70 by insert molding and the like. The loop member 19-90 including a first electrical connection portion 19-91 and a second electrical connection portion 19-92 is used as the conduction wire of the bottom 19-70 to be electrically connected to other elements. As shown in FIG. 207, the first electrical connection portion 19-91 is revealed from the supporting platform 19-75 of the bottom 19-70.

FIG. 208 is a perspective view of a portion of one of the second elastic elements 19-50, the circuit assembly 19-60 and the bottom 19-70. FIG. 209 is a schematic view of a portion of the optical element driving mechanism 19-1. FIG. 208 and FIG. 209 further illustrate the second elastic element 19-50 and the circuit assembly 19-60. As shown in FIG. 208, the second elastic element 19-50 includes a connection portion 19-51 and a deformation portion 19-52. The connection portion 19-51 is fixedly disposed on the supporting platform 19-75 of the bottom 19-70. Therefore, the deformation of the second elastic element 19-50 is mainly achieved by extending or shortening the deformation portion 19-52. Additionally, the deformation of the second elastic element 19-50 meets the target of holding the holder 19-30 elastically together with the first elastic element 19-20. The supporting platform 19-75 does not overlap the circuit assembly 19-60 when viewed along the main axis 19-M. Therefore, the first electrical connection portion 19-91 does not overlap the circuit assembly 19-60 when viewed along a direction that is perpendicular to the main axis 19-M, either.

As shown in FIG. 208 and FIG. 209, the loop member 19-90 is electrically connected to the second elastic element 19-50 at the first electrical connection portion 19-91 and electrically connected to the circuit assembly 19-60 at the second electrical connection portion 19-92. The distance between the first electrical connection portion 19-91 and the top surface 19-11 of the case 19-10 in the direction of the main axis 19-M is different than the distance between the second electrical connection portion 19-92 and the top surface 19-11 of the case 19-10 in the direction of the main axis 19-M. Furthermore, the height of the supporting platform 19-75 is higher than the circuit assembly 19-60. That is, the supporting platform 19-75 is closer to the top surface 19-11 of the case 19-10 in the direction of the main axis 19-M.

When the second elastic element 19-50 deforms, the second elastic element 19-50 does not contact the circuit assembly 19-60. It is because the connection portion 19-51 is disposed on the supporting platform 19-75 and the deformation portion 19-52 is spaced apart a distance from the circuit assembly 19-60. The problem of black spots on the images or video caused by the particle or debris generated by the collision of the elements is prevented by the existence of the supporting platform 19-75.

Next, how the loop member 19-90 is electrically connected to the circuit assembly 19-60 at the second electrical connection portion 19-92 will be described with reference to FIG. 210 and FIG. 211. FIG. 210 and FIG. 211 are perspective views of a portion of the optical element driving mechanism 19-1 illustrated in a different perspective. FIG. 210 and FIG. 211 show the optical element driving mechanism 19-1 from the bottom. The optical element driving mechanism 19-1 further includes an electrical connection piece 19-100. The electrical connection piece 19-100 may be any material (such as Tin) that may make any elements be electrically connected to other elements. A portion of the electrical connection piece 19-100 is disposed on the surface of the circuit assembly 19-60 which faces the bottom 19-70. The portion of the loop member 19-90 that revealed from the bottom surface of the bottom 19-70 is electrically connected to the circuit assembly 19-60 via the electrical connection piece 19-100. That is, the electrical connection piece 19-100 is disposed between the circuit assembly 19-60 and the bottom 19-70 to ensure the current passes through normally. In some embodiments, the electrical connection piece 19-100 may be omitted, and the circuit assembly 19-60 is electrically connected to the loop member 19-90 by any methods for making any elements be electrically connected to other elements such as fusion, application of conductive glue, and the like.

The optical element driving mechanism 19-1 may further include an adhesion element 19-110. Compared to FIG. 210, FIG. 211 further illustrates one of the sidewalls 19-12 of the case 19-10 and the adhesion element 19-110. When the case 19-10 is connected to the bottom 19-70, the sidewall 19-12 is close to a side of the electrical connection piece 19-100, so that the electrical connection piece 19-100 partially overlaps the sidewall 19-12 of the case 19-10 when viewed along a direction that is perpendicular to the main axis 19-M. The adhesion element 19-110 may be an adhesion material or an insulating material such as resin. The adhesion element 19-110 is disposed between the circuit assembly 19-60 and the bottom 19-70. Additionally, the adhesion element 19-110 directly contacts the surface of the circuit assembly 19-60 and the surface of the bottom 19-70. In some embodiments, the adhesion element 19-110 directly contacts the case 19-10 to strengthen the connection between the case 19-10 and the bottom 19-70.

As shown in FIG. 211, the adhesion element 19-110 directly contacts the electrical connection piece 19-100 and covers the electrical connection piece 19-100. Normally, the adhesion element 19-110 has good elasticity and good covering ability and thus the adhesion element 19-110 may protect the electrical connection piece 19-100, i.e. the position where the circuit assembly 19-60 is electrically connected to the loop member 19-90. Additionally, the adhesion element 19-110 may reduce the probability of particles such as dust or mist entering the optical element driving mechanism 19-1. If the adhesion element 19-110 is made of insulating material, insulation may be achieved. The steps for applying the adhesion element 19-110 is normally referred to as "glue dispensing", which may be conducted manually or mechanically.

FIG. 212 is a perspective view of a portion of the bottom 19-70 illustrated in another different perspective to show the outside-connection circuit member 19-120 and an electronic element 19-130. The sensor 19-82 partially overlaps the bottom 19-70 when viewed along a direction that is perpendicular to the main axis 19-M. Additionally, the bottom surface of the bottom 19-70 is farther away from the top surface 19-11 of the case 19-10 than the bottom surface of the sensor 19-82 in the direction of the main axis 19-M, so that the receiving portion 19-72 may protect the sensor 19-82. In some embodiments, the size of the sensor 19-82 in the direction of the main axis 19-M is smaller than the receiving portion 19-72 of the bottom 19-70 in the direction of the main axis 19-M. Furthermore, the bottom surface of the bottom 19-70 is farther away from the top surface 19-11 of the case 19-10 than the bottom surface of the sensor 19-82. Furthermore, the sensor 19-82 is disposed in the receiving portion 19-72 and thus other spaces are not occupied, which is also advantageous for miniaturization of the optical element driving mechanism 19-1. Also, the adhesion element 19-110 may also be disposed in the receiving portion 19-72 to further strengthen the structure of the optical element driving mechanism 19-1. Under such circumstances, the adhesion element 19-110 directly contacts the sensor 19-82, the circuit assembly 19-60, and the bottom 19-70.

As shown in FIG. 212, the optical element driving mechanism 19-1 further includes the electronic element 19-130. The bottom 19-70 includes two baffles 19-77. The baffles 19-77 contact the outside-connection circuit member 19-120 to increase the structural strength. The electronic element 19-130 may be a capacitance, an inductance, a filter, an integrated circuit, and the like. The electronic element 19-130 is disposed on a side of the circuit assembly 19-60 which is close to the outside-connection circuit member 130. Similarly, the adhesion element 19-110 may also be disposed on the electronic element 19-130, so that the adhesion element 19-110 directly contacts the circuit assembly 19-60 and the electronic element 19-130.

As described above, the adhesion element 19-110 may adhere several elements to each other at the same time by only applying the adhesion element 19-110 (i.e. glue dispensing) one time. By such operation, the process is simplified, the production efficiency is enhanced, and the adhesion strength is increased.

FIG. 213 is a bottom view of the optical element driving mechanism 19-1, which shows the whole bottom 19-70 while FIG. 210 to FIG. 212 only illustrate a portion of the bottom 19-70. As shown in FIG. 213, the bottom 19-70 is rectangular, including two opposite long sides 19-L1 and two opposite short sides 19-L2. For example, each of the long sides 19-L1 may be 9.5 mm, and each of the short sides 19-L2 may be 8.5 mm. The loop member 19-90 and the outside-connection circuit member 19-120 are respectively disposed on the two opposite short sides 19-L2 to avoid increasing the length of the long sides 19-L1 and enhance the usage of the space to achieve miniaturization.

FIG. 214 is a perspective view of a portion of the holder 19-30. The holder 19-30 includes two protrusions 19-301 located on opposite sides of the holder 19-30 and extends toward the sidewall 19-12 of the case 19-10. For simplicity, only one of the protrusions 19-301 and one of the coils 19-42 are shown here. A portion of the coil 19-42 surrounds the protrusion 19-301. For example, the lead extending from the coil 19-42 winds the protrusion 19-301, so that the coil 19-42 may be electrically connected to other elements. When viewed along the main axis 19-M, the top surface of protrusion 19-301 is rectangular including two opposite long sides 19-3011 and two opposite short sides 19-3012. Also, when viewed along a direction that is perpendicular to the main axis 19-M, the cross-section of the protrusion 19-301 is also rectangular, and the ratio of the long side of the cross-section of the protrusion 19-301 to the short side of the cross-section of the protrusion 19-301 is between about 1.5 to about 3.0. If the ratio of the long side of the cross-section of the protrusion 19-301 to the short side of the cross-section of the protrusion 19-301 is less than 1.5, for example, the ratio of the long side of the cross-section of the protrusion 19-301 to the short side of the cross-section of the protrusion 19-301 is 1.0 and thus the cross-section of protrusion 19-301 is square-shaped, the lead may drop off the protrusion 19-301 because the lead may rotate easily. If the ratio of the long side of the cross-section of the protrusion 19-301 to the short side of the cross-section of the protrusion 19-301 is greater than 3.0, then the protrusion 19-301 may be too big and be disadvantageous for miniaturization of the optical element driving mechanism 19-1.

To prevent the lead from dropping off, the protrusion 19-301 further includes two projections 19-302 disposed on the edge of the protrusion 19-301. Particularly, the projections 19-302 are disposed on the short side of the rectangular top surface of the protrusion 19-301. That is, when viewed from the extending direction of the protrusion 19-301, the projections 19-302 are disposed on the short sides 19-3012 of the protrusion 19-301. However, there may be only one projection 19-302, or, the projections 19-302 may be omitted. When viewed along the main axis 19-M, the profile of the protrusion 19-301 and the projections 19-302 is substantially T-shaped.

FIG. 215 is a perspective view of a portion of the holder 19-30 and the second elastic element 19-50. A portion of the second elastic element 19-50 is disposed on the top surface of the protrusion 19-301 and abuts the edge of the protrusion 19-301. Particularly, the second elastic element 19-50 abuts the long side of the rectangular top surface of the protrusion 19-301. That is, when viewed from the extending direction of the protrusion 19-301, a portion of the second elastic element 19-50 is disposed on the long side 19-3011 of the protrusion 19-301, so the second elastic element 19-50 may have greater mechanical strength. The electrical connection piece 19-100 may be disposed on the top surface of the protrusion 19-301, so that the coil 19-42 is electrically connected to the second elastic element 19-50.

How the current passes through the optical element driving mechanism 19-1 is described in detail herein. The outside-connection circuit member 19-120 is connected to a power supply (not shown) outside the optical element driving mechanism 19-1. The outside-connection circuit member 19-120 includes several pins for the current to flow in or flow out. The direction of the current is controlled according to the desired movement direction for correction, for example, whether the holder 19-30 moves toward or away from the bottom 19-70.

The current first flows through the circuit in the circuit assembly 19-60 that connects to the outside-connection circuit member 19-120 and flows through the sensor 19-82 disposed in the circuit assembly 19-60. Next, the current flows to the loop member 19-90 via the second electrical connection portion 19-92, and then the current flows to the second elastic element 19-50 via the first electrical connection portion 19-91. As shown in FIG. 215, the second elastic element 19-50 is electrically connected to the coil 19-42 at the protrusion 19-301 of the holder 19-30. Therefore, the current flows to the coils 19-42 so as to generate electromagnetic force with the magnetic elements 19-41. Next, the current flows to the protrusion 19-301 on the opposite side, and flows through the coil 19-42 on the opposite side, the second elastic element 19-50, the loop member 19-90, the circuit assembly 19-60, and the outside-connection circuit member 19-120 consecutively. Finally, the current flows out the optical element driving mechanism 19-1. To sum up, the outside-connection circuit member 19-120 is electrically connected to the sensor 19-82 via the circuit assembly 19-60. Also, the sensor 19-82 is electrically connected to the driving assembly 19-40 via the current that consecutively flows through the circuit assembly 19-60, the loop member 19-90, and the second elastic element 19-50.

Next, some other different embodiments will be described. Additionally, the same elements are denoted by the same symbols, similar elements are denoted by similar symbols, and related contents are not repeated.

FIG. 216 is perspective view of a portion of an optical element driving mechanism 19-1A in accordance with some other embodiments of this disclosure. The difference between the optical element driving mechanism 19-1A and the optical element driving mechanism 19-1 is that the loop member 19-90 of the optical element driving mechanism 19-1A includes at least one projecting portion 19-90A corresponding to the second elastic element 19-50 and the circuit assembly 19-60 at the same time. Under such circumstances, the electrical connection piece 19-100 directly contacts the second elastic element 19-50, the circuit assembly 19-60, and the loop member 19-90 to make aforementioned elements be electrically connected to each other by only applying the electrical connection piece 19-100 (e.g. Tin welding) one time without applying the electrical connection piece 19-100 more than one time at different positions respectively (such as the first electrical connection portion 19-91 and the second electrical connection portion 19-92 as shown in FIG. 209). Therefore, the process is simplified and the production efficiency is enhanced. For the convenience of illustration, there are two projecting portions 19-90A in FIG. 216, but only one electrical connection piece 19-100 is shown.

FIG. 217 is a bottom view of an optical element driving mechanism 19-1B in accordance with some other embodiments of this disclosure. Please also refer to FIG. 213 in order to understand the difference between the optical element driving mechanism 19-1B and the optical element driving mechanism 19-1. The difference between the optical element driving mechanism 19-1B and the optical element driving mechanism 19-1 is that the loop member 19-90 is electrically connected to the circuit assembly 19-60 at the position that is close to the opening 19-71 of the bottom 19-70. Therefore, the electrical connection piece 19-100 is disposed on the edge of the opening 19-71 of the bottom 19-70, and a portion of the bottom 19-70 is located between the electrical connection piece 19-100 and the sidewall 19-12 of the case 19-10. When the case 19-10 is made of metal, short cut caused by the contact between the electrical connection piece 19-100 and the sidewall 19-12 of the case 19-10 is prevented by such configuration. In other words, the position where the loop member 19-90 is electrically connected to the circuit assembly 19-60 may be configured arbitrarily with regard to the factors such as the material of the case 19-10.

FIG. 218 is a schematic view of an optical element driving mechanism 19-1C in accordance with some other embodiments of this disclosure. Please also refer to FIG. 202 in order to understand the difference between the optical element driving mechanism 19-1C and the optical element driving mechanism 19-1. In this embodiment, the circuit assembly 19-60 of the optical element driving mechanism 19-1C is disposed under the bottom 19-70. However, the sensor 19-82 is mounted on the surface of the circuit assembly 19-60 that faces the bottom 19-70 by SMT and the like. The sensor 19-82 is received in the receiving portion 19-72 of the bottom 19-70.

FIG. 219 is a schematic view of an optical element driving mechanism 19-1D in accordance with some other embodiments of this disclosure. FIG. 219 is a variant of FIG. 218. In this embodiment, the bottom 19-70 of the optical element driving mechanism 19-1D further includes two extending portions 19-70A. The circuit assembly 19-60 is disposed between the spaces between the extending portions 19-70A to prevent the circuit assembly 19-60 from being damaged because the circuit assembly 19-60 contacts or collides with other elements.

As described above, an optical element driving mechanism is provided. The case may be made of metal material or non-metal material. When the case is made of metal, the electromagnetic wave interference may be isolated. The bottom is rectangular. The circuit assembly is disposed on the bottom to achieve miniaturization. The sensor is disposed on the circuit assembly to sense the sensed object and enhance the sensing accuracy. Furthermore, the bottom includes the corresponding receiving portion to protect the sensor.

Twentieth Group of Embodiments

Referring to FIG. 220, FIG. 220 is a schematic view showing the camera module optical system 20-100. The camera module optical system 20-100 can be used, for example, to drive and sustain an optical element 20-LS (such as a lens assembly), and can be disposed inside an electronic device (such as a camera, a tablet or a mobile phone). When light (incident light) from the outside enters the camera module optical system 20-100, the light can pass through the optical element 20-LS to an image sensor module 20-IM to obtain an image. The detailed structure of the camera module optical system 20-100 will be described below.

The camera module optical system 20-100 comprises an optical module 20-OM, a image sensor module 20-IM, and an adjustment assembly 20-AS. The adjustment assembly 20-AS is located between the optical module 20-OM and the image sensor module 20-IM, and disposed on a bottom surface 20-OMB of the optical module 20-OM. Viewing along a first direction 20-D1 that is perpendicular to a main axis 20-Q of the optical system 20-100 (or perpendicular to an optical axis 20-O of the optical element 20-LS), the adjustment assembly 20-AS does not overlap the optical module 20-OM.

The aforementioned optical module 20-OM may be a lens module including a housing 20-H, a movable portion 20-V and a base 20-10. The housing 20-H and the movable portion 20-V are disposed on the base 20-10, the housing 20-H and the base 20-10 form an accommodating space, and the movable portion 20-V is disposed in the accommodating space. The movable portion 20-V includes a frame 20, a holder 20-30, a driving assembly 20-MC, and an elastic assembly 20-ES. The accommodating space formed by the housing 20-H connected to and disposed on the base 20-10 can receive the movable portion 20-V (including the holder 20-30, the drive assembly 20-MC and elastic assembly 20-ES) for protection.

The holder 20-30 is used to carry the optical element 20-LS, and is movably connected to the base 20-10 and the frame 20 through the elastic assembly 20-ES. The driving assembly 20-MC is disposed on the holder 20-30 and the frame 20, and is used to drive the holder 20-30 and the optical element 20-LS to move relative to the base 20-10 and the frame 20 to adjust the posture or position of the optical element 20-LS, thereby achieving the purpose of optical auto-focusing (AF) or optical image stabilization (OIS).

In detail about the elastic assembly 20-ES, the elastic assembly 20-ES includes a first elastic element 20-E1 and a second elastic element 20-E2, which are respectively disposed on the upper and lower sides of the holder 20-30, and movably connected to the holder 20-30, the base 20-10 and the frame 20, so that the holder 20-30 can move relative to the base 20-10 and the frame 20.

The aforementioned driving assembly 20-MC may be an electromagnetic driving assembly, which includes a magnetic element 20-M and a coil 20-C, which are respectively disposed on the bottom surface 20-30B of the movable portion 20-30 and base 20-11 and arranged along the extension direction 24-DE. The magnetic element 20-M and the coil 20-C correspond to each other. When a driving signal is applied to the driving assembly 20-MC (for example, by applying an electric current through an external power source to the coil 20-C), a magnetic force is generated between the magnetic element 20-M and the coil 20-C, thereby the driving assembly 20-MC can drive the movable portion 20-30 to move relative the base 20-10, to achieve the effect of anti-shake or auto-focus of optical image. In this embodiment, the driving assembly 20-MC is a moving coil type; in another embodiment, it may be a moving magnetic type. In addition, before the driving signal is applied, the aforementioned elastic assembly 20-ES can keep the movable portion in an initial position relative to the base 20-10.

In some embodiments, the driving mechanism 20-100 may include a position sensing element, which may be a position sensor, for example, a magnetoresistive sensor (MRS) or optical sensor, for sensing the relative positional relationship between the movable portion 20-V and the base 20-10, to facilitate a control unit to adjust the positions between the two via the driving assembly 20-MC. The position sensing element can be surrounded by the coil 20-C. This configuration can make full use of space and make the size of the entire driving mechanism small. The position sensing element may share the magnetic element 20-M with the coil 20-C.

In some embodiments, the camera module optical system 20-100 may further include a permeability element disposed between the frame 20 and the magnetic element 20-M of the driving assembly 20-MC. The magnetic force can be concentrated in a predetermined direction, so as to enhance the magnetic driving force of the driving assembly 20-MC for driving the holder 20-30, and reduce the effect of magnetic interference. In another embodiment, the frame 20 can be embedded with the aforementioned permeability element so that it has a permeability material. In addition to strengthening the magnetic force (between the magnetic element 20-M and the coil 20-C) in a predetermined direction, it can also enhance the overall mechanical strength of the movable portion 20-V.

Referring to FIG. 221, the aforementioned adjustment assembly 20-AS includes a plurality of adjustment columns 20-A1, which are disposed on the bottom surface 20-OMB of the base 20-10 and extend along a second direction 20-D2 (the second direction 20-D2 is not perpendicular to the optical axis 20-O, such as parallel or approximately parallel to the Z axis), and is used to adjust the relative positions of the optical module 20-OM and the image sensor module 20-IM. Specifically, the adjustment assembly 20-AS are used to adjust the optical axis 20-O of the optical element 20-LS set in the optical module 20-OM and the main axis 20-Q of the image sensor module 20-IM so that they overlap or are parallel. In this embodiment, the adjustment assembly 20-AS includes four adjustment columns 20-A1, which are disposed at the edges of the bottom surface 20-OMB of the optical module 20-OM and located on different sides of the bottom surface 20-OMB. It should be noted that, in other embodiments, the adjusting assembly 20-AS may include three adjusting columns 20-A1, which are disposed at the edges of the bottom surface 20-OMB of the optical module 20-OM, and all three are located on the different sides of the bottom surface 20-OMB.

In detail, referring to FIG. 222, when the image sensor module 20-IM and the optical module 20-OM are assembled, the contact surface 20-41 of the bottom plate 20-40 of the image sensor module 20-IM (can be used to carry an image sensor of the image sensor module in the 20-IM) will be in contact with the adjustment assembly 20-AS. At this time, a measuring device 20-501 (for example, an angle measuring device) of the assembly and adjustment mechanism 20-56 measures the angle difference between the optical axis 20-O of the optical module 20-OM and the main axis 20-Q of the image sensor module 20-IM, to provide a measurement information. Next, a positioning device 20-601 of the assembly and adjustment mechanism 20-56 adjusts the relative positions between the optical module 20-OM and the image sensor module 20-IM according to the aforementioned measurement information, so that the optical axis 20-O and the main axis 20-Q coincide or are parallel. In some embodiments, the measurement device 20-501 can determine an angle difference between the optical axis 20-O in the optical module 20-OM and the main axis 20-Q of the image sensor module 20-IM according to the degree of blur and focus of the image generated by the incident light passing through the optical module 20-OM to the image sensor module 20-IM.

Continuing to refer to FIG. 222, when the main axis 20-Q is relatively inclined or skewed relative to the optical axis 20-O (for example, the optical element 20-LS placed in the holder 20-30 and is not fully aligned with the center of the holder 20-30 will make the optical axis 20-O, the center of the holder 20-30 and the main axis 20-Q not parallel or coincide), which means that the image sensor module 20-IM is not aligned with the optical module 20-OM. In this situation, the positioning device 20-601 drives the image sensor module 20-IM to squeeze the adjustment assembly 20-AS to deform, so that the height of at least a part of the adjustment assembly 20-AS in the Z-axis direction is reduced, to make the image sensor module 20-IM align the optical module 20-OM. As shown in FIGS. 222 to 223, when the image sensor module 20-IM squeezes the adjustment assembly 20-AS, its bottom plate 20-40 contacts and presses against the aforementioned adjustment columns 20-A1, so that the adjustment columns 20-A1 changes its original shape. At this time, the positioning device 20-601 is used to align the image sensor module 20-IM with the optical module 20-OM to achieve alignment between the two components.

The positioning device 20-601 includes a holding (or clamping) member 20-6011, a limiting member 20-6012, and a positioning member 20-6013. The holding member 20-6011 is used to hold the optical module 20-OM. The limiting member 20-6012 is used to limit the optical module 20-OM, and the positioning member 20-6013 is used to carry the image sensor module 20-IM and assemble it to the optical module 20-OM. In this embodiment, the holding member 20-6011 holds the top portion of the optical module 20-OM, and the limiting member 20-6012 are located on both sides of the optical module 20-OM to limit the optical module 20-OM. Avoid excessive shaking or movement. When the positioning member 20-6013 pushes the image sensor module 20-IM toward the optical module 20-OM, the bottom plate 20-40 of the image sensor module 20-IM contacts the adjustment columns 20-A1, and the measuring device 20-501 determines whether the optical axis 20-O and main axis 20-Q are parallel or coincide, to adjust the forces for the image sensor module 20-IM pressing toward the adjustment columns 20-A1 at different positions, such as different forces 20-F1, 20-F2 and 20-F3, so that the shapes of the adjustment columns 20-A1 are changed (or the shape of at least one column 20-A1 is changed due to the angle difference), to make the optical axis 20-O and the main axis 20-Q be parallel or coincide.

In some embodiments, the contact surface 20-41 of the bottom plate 20-40 includes a metal material, which can be connected to an external heating circuit to heat up, so that the adjustment column 20-A1 on the contact surface 20-41 becomes a molten state, for changing its shape. In some embodiments, the contact surface 20-41 is flat.

In this way, the camera module optical system 20-100 is provided with an adjustment assembly 20-AS located between the optical module 20-OM and the image sensor module 20-IM, and the shape of the adjustment assembly AS can be changed. The assembly of the correction in image sensor module IM and the optical module 20-OM can be accurately adjusted so that the main axis 20-Q can be parallel or coincident with the optical axis 20-O, to improve the image quality obtained by the device.

FIG. 224 shows a camera module optical system 200 and adjustment according to another embodiment of the present invention, which is different from the camera module optical system 20-100 in FIG. 220. The camera module optical system 200 in this embodiment has two optical modules: a first optical module 20-OM1 and a second optical module 20-OM2, both of which may be the same or similar, or they may have a slightly different appearance and proportions. The adjustment assembly 20-AS has a plurality of first adjustment columns 20-A1 (first adjustment sub-assembly) and a plurality of second adjustment columns 20-A2 (second adjustment sub-assembly). The first optical module 20-OM1, the first adjustment columns 20-A1, a second optical module 20-OM2, the second adjustment columns 20-A2, and the image sensor module 20-IM are sequentially arranged along the first optical axis 20-O1 of the first optical element 20-LS1 (or the second optical axis 20-O2 of the second optical element LS2, the main axis 20-Q).

When it is intended to assemble the first and second optical modules 20-OM1, 20-OM2, and the image sensor module 20-IM, the holding member 20-6011 of the positioning device 601 clamps and limits the first and the second optical module 20-OM1, 20-OM2, and the positioning member 20-6012 carry the image sensor module 20-IM. First, the first adjustment columns 20-A1 on the upper surface 20-OMB1 of the second optical module 20-OM2 is pressed against the bottom surface of the base 20-10 of the first optical module 20-OM1. When 20-OM1 and 20-OM2 are relatively inclined, the shape of the first adjustment columns 20-A1 are configured to change via the first adjustment assembly 20-A1 being contact with the base 20-10, so that to performance the alignment of the first and second optical modules 20-OM1 and 20-OM2.

Next, the bottom plate 20-40 of the image sensor module 20-IM is pressed against the second adjustment columns 20-A2 provided on the lower surface 20-OMB2. When the image sensor module 20-IM and the second optical module 20-OM2 are relatively inclined, the second adjustment columns 20-A2 are pressed against the bottom plate 20-40 to change its shape until the image sensor module 20-IM is aligned with the second optical module 20-OM2. In this way, through the above mechanism, the first and second optical modules 20-OM1, 20-OM2, and the image sensor module 20-IM can be aligned, and the first and second optical axes 20-O1, 20-O2 are parallel or coincident with the main axis 20-Q.

In other embodiments, the first adjustment columns 20-A1 may be disposed on the bottom surface of the first optical module 20-OM1, and the upper surface 20-OMB1 of the second optical module 20-OM2 is pressed toward the first adjustment columns 20-A1. In other embodiments, the second adjustment columns 20-A2 may be disposed on the bottom plate 20-40 of the image sensor module 20-IM, and the lower surface 20-OMB2 of the second optical module 20-OM2 is pressed toward the second adjustment columns 20-A2.

The positions of the first and second adjustment columns 20-A1 and 20-A2 described above can be combined or mixed, and the first and second optical modules 20-OM1, 20-OM2, and the image sensor module 20-IM as active movers can also be combined or mixed.

FIG. 225 shows a schematic diagram of adjustment columns 20-A1 (or may be 20-A2) and several different opponent members 20-BO1, 20-BO2, and 20-BO3. The opponent members 20-BO1 to BO3 can be the bottom 20-40 of the image sensor module 20-IM in FIG. 222, or the base 20-10 of the first optical module 20-OM1, parts of the upper and lower surfaces 20-OMB1, 20-OMB2 of the second optical module 20-OM2 or the bottom plate 20-40 of the image sensor module 20-IM in FIG. 224.

In this embodiment, the adjustment column 20-A1 has a cylindrical structure having a maximum width of 20-W1, and the contact surface of the opponent member 20-BO1 has a maximum width of 20-W2, where the width 20-W1 is smaller than the width 20-W2, or say the maximum width 20-W2 is larger than the maximum width 20-W1. This can ensure that when the opponent member 20-BO1 is pressed against the adjustment column 20-A1, it can completely cover the adjustment column 20-A1, so as to change the shape of the adjustment column 20-A1 and improve the alignment accuracy between the modules.

In some embodiments, the opponent member 20-BO2 has protrusions 20-BOT extending toward the adjustment column 20-A1 (or 20-A2). With the embodiments in FIGS. 220 and 224, for example, it extends toward the optical module 20-OM, 20-OM1, 20-OM2, or the image sensor module 20-IM. The plurality of adjusting columns 20-A1 correspond to and contact the plurality of protrusions 20-BOT, and the maximum width 20-W3 of the protrusion 20-BOT is larger than the maximum width 20-W1 of the adjustment column 20-A1. For clarity and simplicity, only one adjustment column 20-A1 and one protrusion 20-BOT are shown in FIG. 225.

In some embodiments, the opponent member 20-BO3 has a plurality of recesses 20-BOR, the openings of which are directed toward the optical module 20-OM (or 20-OM1, 20-OM2, or the image sensor module 20-IM), the plurality of adjustment columns 20-A1 correspond to and contact the recesses 20-BOR, and the maximum width 20-W4 of the recess 20-BOR is larger than the maximum width 20-W1 of the adjustment column 20-A1.

FIG. 226 shows a schematic diagram of plurality of adjustment columns having different shapes, including: 20-A1*a*, 20-A1*b*, 20-A1*c*. The adjustment column 20-A1*a* can have a cylindrical or trapezoidal structure. The trapezoidal adjustment columns have two types: 20-A1*b*, and 20-A1*c*. About the adjustment column 20-A1*b*, its maximum width of the side adjacent to the opponent member 20-BO is smaller than the maximum width of another side away from the opponent member 20-BO. About the adjustment column 20-A1*c*, its maximum width of the side adjacent to the opponent member 20-BO It is greater than the maximum width of the side far from the opponent member 20-BO.

FIG. 227 shows a schematic view of the ends of a plurality of different adjusting columns 20-A1 (or 20-A2) having different shapes, such as adjusting columns 20-A1*a*', 20-A1*b*', 20-A1*c*' and 20-A1*d*'. The end of the adjustment column 20-A1*a*' has a stepped structure to form an extension 20-A1*a*'1 and a limiting surface 20-A1*a*'2. When the opponent member 20-BO is pressed against the extension 20-A1*a*'1 to change the shape of the column 20-A1*a*', the limiting surface 20-A1*a*'2 can be used as a surface that limits the opponent member 20-BO doing excessive movement, which can prevent the opponent member 20-BO from overly pressing the adjustment column 20-A1*a*'. The extension portion 20-A1*b*'1 of the adjustment column 20-A1*b*' has a tapered structure.

The adjustment column 20-A1*c*' has an extension portion 20-A1*c*'1 and a depression portion 20-A1*c*'2, and the depression portion 20-A1*c*'2 is located on both sides of the extension portion 20-A1*c*'1. When the opponent member 20-BO is pressed against the extension portion 20-A1*c*'1 to change the shape of the column 20-A1*c*', the deformed extension portion 20-A1*c*'1 can move toward the depression portion 20-A1*c*'2, wherein the depression portion 20-A1*c*'2 has a space to accommodate deformation of the extension 20-A1*c*'1. The extension portion 20-A1*d*'1 of the adjustment column 20-A1*d*'1 has a tapered structure.

In summary, an embodiment of the present invention provides a camera module optical system, having a main axis, including an optical module and an adjustment assembly. The optical module is configured to hold an optical element having an optical axis. The adjustment assembly is configured to adjust the optical axis of the optical module parallel to the main axis. The optical module and the adjustment assembly are arranged along the main axis, wherein the adjustment assembly does not overlap the optical module when viewed in a first direction that is perpendicular to the main axis.

The embodiment of the present invention has at least one of the following advantages or effects. Through the adjustment assembly, a plurality of optical modules can be aligned with each other, and one or more optical modules and an image sensor module can be aligned with each other, so as to improve the quality of the device. In addition, since the adjustment assembly can change its shape during adjustment process (usually being squeezed and reduced in height in the vertical direction), the adjustment between the optical module and the image sensor module can be more accurate and greatly improved product quality.

Twenty-First Group Embodiments

Referring to FIG. 228, FIG. 228 is a schematic view showing the optical element driving mechanism 21-100. The optical element driving mechanism 21-100 can be used, for example, to drive and sustain an optical element 21-LM (such as a reflector lens or mirror), and can be disposed inside a camera module of an electronic device (such as a camera, a tablet or a mobile phone), as shown in FIG. 228. When light (incident light) from the outside enters the camera module, by the optical element 21-LM driven via the optical element driving mechanism 21-100, the light can be changed from the original incident direction, and the angle direction thereof can be adjusted to enter the optical lens in the camera module, and the light can pass through the optical lens to an photosensitive element (such as image sensor) to obtain an image. With the above configuration, the thickness of the camera module of the electronic device in the Z-axis direction can be greatly saved, so as to achieve miniaturization. The detailed structure of the optical element driving mechanism 21-100 will be described below.

Referring to FIGS. 228 and 229, wherein FIG. 228 is an exploded view of the optical element driving mechanism 21-100, which includes a fixed portion 21-F, a movable portion 21-30, a driving assembly 21-MC and a connecting assembly 21-CO. The fixed portion 21-F includes a base 21-11 and a case 21-12. The case 21-12 is connected to and disposed on the base 21-11 to form a receiving space 21-SP which is configured to accommodate receive the movable portion 21-30 and the driving assembly 21-MC for protection. A connecting rod 21-RD of the movable part 21-30 can be connected to an optical element 21-LM, and the movable portion 21-30 is located over the base 21-11 and is movably connected to the case 21-12 through the connecting assembly 21-CO. The driving assembly 21-MC is disposed between the base 21-11 and the movable portion 21-30, and is configured to drive the movable portion 21-30 relative to the base 21-11 and the case 21-12 to move, to adjust the position of the optical element, thereby achieving the purpose of optical auto-focusing (AF) or optical image stabilization (OIS).

Referring to FIGS. 230, 231 and 232, The movable portion 21-30 has an extended connection portion 21-302 which is adjacent to the base 21-11 and away from the upper shell 21-12T of the case 21-12 (FIG. 233). In addition, the base 21-11 has a recessed portion 21-R. Seen from the extension direction 21-DE, the movable portion 21-30 is located above the recessed portion 21-R. Seen from the first or second direction 21-D1, 21-D2, the sidewall of the recessed portion 21-R overlaps the movable portion 21-30, which helps to limit the movement of the movable portion 21-30.

The connecting assembly 21-CO may be disposed between the base 21-11 and the movable portion 21-30. As shown in FIG. 231, a first recess 21-303 and two second recesses 21-304 may be positioned at the bottom of the movable portion 21-30, and the first recess 21-303 and the third recesses 21-304 may extend along a first direction 21-D1 (X axis) for accommodating the connecting assembly 21-CO. The connecting assembly 21-CO may reduce the friction between the base 21-11 and the movable portion 21-30. Furthermore, because the first recess 21-303 and the third recesses 21-304 extend along the first direction 21-D1 (X axis), the connecting assembly 21-CO may roll in the first recess 21-303 and the third recesses 21-304, to allow the movable portion 21-30 to move relative to the base 21-11 (a portion of the fixed portion 21-F) in the first direction 21-D1, and the optical element 21-LM connected to the movable portion 21-30 may be driven. In other words, the connecting assembly directly connects the base 21-11 and the movable portion 21-30.

In some embodiments, the length 21-L1 of the first recess 21-303 is greater than the length 21-L2 of any of the third recesses 21-304, to allow more connecting elements (such as two first connecting elements 21-CO1 and one second connecting element 21-CO2 in FIG. 232) may be disposed in the first recess 21-303. As a result, the friction between the movable portion 21-30 and the base 21-11 may be further decreased.

In some embodiments, the first recess 21-303 extends along a extending line 21-E1, and the two third recesses 21-304 are symmetrical to the extending line 21-E1 for balancing the center of gravity of the movable portion 21-30 when the movable portion 21-30 is disposed on the base 21-11, and the optical element driving mechanism 21-100 may be further stabilized during operation.

The connecting rod 21-301 of the movable portion 21-30 extends along the first direction 21-D1 (X-axis) to connect the optical element 21-LM. The connecting rod 21-RD is connected to the optical element 21-LM through an opening 21-OP of the case 21-12. The opening 21-OP has a greater diameter than the diameter of connecting rod 21-RD.

Referring to FIG. 232, a second recess 21-111 and two fourth recesses 21-112 may be positioned on the base 21-11, and the second recess 21-111 and the fourth recesses 21-112 may extend along the first direction 21-D1 (X axis) for accommodating the connecting assembly 21-CO. Because the second recess 21-111 and the fourth recesses 21-112 extend along the first direction 21-D1 (X axis), the connecting assembly 21-CO may roll in the second recess 21-111 and the fourth recesses 21-112, to allow the movable portion 21-30 to move relative to the base 21-11 (a portion of the fixed portion 21-F) in the first direction 21-D1, and the optical element 21-LM connected to the movable portion 21-30 may be driven.

In some embodiments, the length 21-L3 of the second recess 21-111 is greater than the length 21-L4 of any of the fourth recesses 21-112, to allow more connecting elements (such as two first connecting elements 21-CO1 and one second connecting element 21-CO2 in FIG. 232) may be disposed in the second recess 21-111. As a result, the friction between the movable portion 21-30 and the base 21-11 may be further decreased. In some embodiments, the length 21-L3 of the second recess 21-111 may be substantially identical to the length 21-L1 of the first recess 21-303, and the length 21-L4 of the fourth recess 21-112 may be substantially identical to the length 21-L2 of the third recess 21-304.

In some embodiments, the second recess 21-111 extends along a extending line 21-E2, and the two fourth recesses 21-112 are symmetrical to the extending line 21-E2 to balance the center of gravity of the movable portion 21-30 when the movable portion 21-30 is disposed on the base 21-11, and the optical element driving mechanism 21-100 may be further stabilized when operating.

Moreover, in some embodiments, as shown in FIGS. 232 and 233, the second connecting element 21-CO2 may be disposed between two first connecting elements 21-CO1, and the first connecting element 21-CO1 and the second connecting element 21-CO2 have different diameters. For example, the diameter of the first connecting element 21-CO1 may be greater than the diameter of the second connecting element 21-CO2. As a result, the contact area between the connecting elements may be reduced to decrease the friction when the connecting assembly 21-CO is rolling.

Referring to FIGS. 231, 233 and 235, the bottom of the movable portion 21-30 further includes a recess (or groove) 21-301, and the opening of the recess 21-301 faces the base 21-11. The aforementioned driving assembly 21-MC is disposed in the recess 21-301. In detail, the driving assembly 21-MC may be an electromagnetic driving assembly, which includes a magnetic element 21-M and a coil 21-C, which are respectively disposed on the bottom surface 21-30B of the movable portion 21-30 and base 21-11. The magnetic element 21-M and the coil 21-C correspond to each other. When a driving signal is applied to the driving component 21-MC (for example, by applying an electric current through an external power source), a magnetic force is generated between the magnetic element 21-M and the coil 21-C, thereby driving the movable portion 21-30 to move relative the fixed portion 21-F (including base 21-11 and case 21-12), to achieve the effect of anti-shake or auto-focus of optical image. In this embodiment, the driving assembly 21-MC is a moving magnetic type; in another embodiment, it may be a moving coil type.

In this embodiment, the optical element driving mechanism 21-100 includes a permeability element 21-MG disposed between the movable portion 21-30 and the driving assembly 21-MC. In detail, it is located between the bottom surface 21-30B and the magnetic element 21-M, so that the magnetic force of the magnetic element 21-M can be concentrated in a predetermined direction to enhance the magnetic force of the driving assembly 21-MC to drive the movable portion 21-30, and the magnetic interference can be decreased. In another embodiment, the permeability element 21-MG can be embedded in a part of the bottom surface 21-30B of the movable portion 21-30 which is corresponding to the magnetic element 21-M, so that the movable portion 21-30 includes permeability conductive material, and the magnetic element 21-M can be directly contacted and fixed on the bottom surface 21-30B. In addition to strengthening the magnetic force (between the magnetic element 21-M and the coil 21-C) in a predetermined direction, it can also strengthen the overall mechanical strength of the movable portion 21-30.

The optical element driving mechanism 21-100 includes a position-sensing element 21-SN, which may be a position sensor, for example, a magnetoresistive sensor (MRS) or an optical sensor, which is used to sense the relative positional relationship between the movable portion 21-30 and the base 21-11, which facilitates a control unit (not shown) to adjust the positions between the two by the driving assembly 21-MC. It is worth noting that the position-sensing element 21-SN is provided in the hollow portion of the coil 21-C, or that the position-sensing element 21-SN is surrounded by the coil 21-C. This configuration can make full use of space and is good for miniaturization. In this embodiment, the position-sensing element 21-SN can share the magnetic element 21-M with the coil 21-C. In other words, the position-sensing element 21-SN is disposed between the movable portion 21-30 and the base 21-11, and the driving assembly 21-MC surrounds the position-sensing element 21-SN.

A circuit component 21-CA is disposed on the base 21-11, and is used to electrically connect the driving assembly 21-MC and the position-sensing element 21-SN. In this embodiment, the circuit assembly 21-CA is formed by insert molding on the body of the base 21-11. In another embodiment, the base 21-11 may include a circuit board component, such as a printed circuit board (PCB), which is disposed on the body of the base 21-11 and is electrically connected to the driving assembly 21-MC and position-sensing element 21-SN.

Referring to FIGS. 233, 234, 235 and 236, wherein FIGS. 5A and 6A are cross-sectional views when the movable portion 21-30 moves relative to the fixed portion 21-F, and FIGS. 234 and 236 are top views of the movable portion 21-30 and the fixed portion 21-F in FIGS. 233 and 235. When the driving assembly 21-MC drives the movable portion 21-30 to move relative to the fixed portion 21-F, the connecting rod 21-RD of the movable portion 21-30 also drives the optical element 21-LM to move relative to the fixed portion 21-F. FIGS. 235 and 236 show that the movable portion 21-30 moves relative to the fixed portion 21-F in the first direction 21-D1 (X-axis), and drives the optical element 21-LM to move in the first direction 21-D1.

It should be noted that as shown in FIG. 234, when the movable portion 21-30 has not moved relative to the base 21-11, the first recess 21-303 overlaps the second recess 21-111, the third recess 21-304 overlaps the fourth recess 21-112, and the connecting assembly 21-CO is disposed at the positions where the recesses overlap each other. In other words, the connecting assembly 21-CO is disposed in the first recess 21-303 and the second recess 21-111 concurrently, and/or disposed in the third recess 21-304 and the fourth recess 21-112 concurrently. As shown in FIG. 236, when the movable portion 21-30 moves relative to the base 21-11, the first recess 21-303 at least partially overlaps the second recess 21-111, the third recess 21-304 at least partially overlaps the fourth recess 21-112, and the connecting assembly 21-CO is still disposed at the positions where the recesses overlap each other. In other words, even if the movable portion 21-30 moves relative to the base 21-11, the connecting assembly 21-CO still positions in the recesses to limit the range of moving of the connecting assembly 21-CO.

In this way, the movable portion 21-30 can be movably set over the base 21-11 through the connecting assembly 21-CO, and the movable portion 21-30 is driven by the drive assembly 21-MC to move relative to the base 21-11, so that the optical element 21-LM moves together. By adjusting the incident angle of the reflected light from the optical element 21-LM into the optical lens, it can achieve the effects of optical focusing or optical image stabilization.

It should be noted that the connecting assembly 21-CO may be disposed not only on the bottom of the movable portion 21-30, but also on the sides of the movable portion. For example, FIG. 237 is a schematic view of a base 21-13, a movable portion 21-31, and the connecting assembly 21-CO in other embodiments of the present disclosure, and FIG. 238 is a cross-sectional view illustrated along the line 21-A-21-A in FIG. 237. Recesses 21-311 may be positioned at the sides of the movable portion 21-30, the base 21-13 has recesses 21-131 that are positioned corresponding to the recesses 21-311, and the connecting assembly 21-CO may be disposed in the recesses 21-311 and the recesses 21-131.

As a result, the friction between the movable portion 21-31 and the base 21-13 may also be reduced. It should be noted that the opening directions of the two recesses 21-311 on the movable portion 21-30 are opposite, and the opening directions of the two recesses 21-131 on the base 21-13 are also opposite.

In summary, an optical element driving mechanism is provided, including a fixed portion, a movable portion, a driving assembly, and a connecting assembly. The fixed portion includes a base and a case. The movable portion is movable relative to the fixed portion and is used for connecting an optical element. The driving assembly is disposed between the fixed portion and the movable portion for moving the movable portion relative to the fixed portion. The connecting assembly is disposed between the fixed portion and the movable portion.

The embodiment of the present invention has at least one of the following advantages or effects, in that the movable portion is disposed on the base in a movable manner through the connecting assembly, and the movable portion is driven to move with the optical element together relative to the base by the driving assembly, to adjust the incident angle of the light reflected by the optical element into the optical lens, the effects of optical focusing and optical image stabilization can be achieved. By connecting the movable portion and the base through the connecting assembly, as compared with setting a suspension movable frame, the embodiment of the present invention can greatly reduce the space occupied by the suspension component inside the driving mechanism, and is conducive to miniaturization. Furthermore, due to the lightness and flexibility of the connecting assembly, the sensitivity and accuracy of the movable portion can be improved when it is moving, thereby increasing the accuracy of moving the optical element.

Twenty-Second Group of Embodiments

FIG. 239 is a schematic perspective view illustrating an optical member driving mechanism 22-101 in accordance with an embodiment of the present disclosure. It should be noted that, in this embodiment, the optical member driving mechanism 22-101 may be, for example, disposed in the electronic devices with camera function for driving an optical member (not shown), and can perform an autofocus (AF) and/or optical image stabilization (OIS) function.

As shown in FIG. 239, the optical member driving mechanism 22-101 has a main axis 22-C that is substantially parallel to the Z axis. The optical member driving mechanism 22-101 includes a housing 22-110 which has a top surface 22-111. The top surface 22-111 extends in a direction (i.e. the X-Y plane) that is parallel to the main axis 22-C. In addition, the optical member driving mechanism 22-101 includes a movable portion 22-130 that is movable relative to the housing 22-110. The movable portion 22-130 has a top surface 22-131, wherein the top surface 22-131 extends in a direction (i.e. the X-Y plane) that is parallel to the main axis 22-C. For example, the top surfaces 22-111 and 22-131 are located on the same horizontal plane, but the present disclosure is not limited thereto.

The movable portion 22-130 further has a reflection surface 22-132, wherein the reflection surface 22-132 is not parallel to the direction of motion of the movable portion 22-130. In the present embodiment, the reflection surface 22-132 is substantially perpendicular to the top surface 22-131, but the present disclosure is not limited thereto. In some other embodiments, the reflection surface 22-132 is not parallel to the top surface 22-131. In some embodiments, an optical element (not shown) may be disposed on the reflection surface 22-132, such that the light may be reflected after illuminating the above optical member. In other words, the optical member driving mechanism 22-101 may be configured to change the traveling direction of the light, and therefore perform an autofocus (AF) and/or optical image stabilization (OIS) function. In the present embodiment, when viewed in a direction (the Y axis) that is perpendicular to the reflection surface 22-132, the optical member may at least partially overlap the housing 22-110 or the movable portion 22-130. In addition, when viewed in a direction (e.g. the X axis, the Z axis) that is parallel to the reflection surface 22-132, the optical member does not overlap the housing 22-110 or the movable portion 22-130.

FIG. 240 is an exploded view illustrating the optical member driving mechanism 22-101 shown in FIG. 239. In the present embodiment, the optical member driving mechanism 22-101 has a substantial rectangular structure. The optical member driving mechanism 22-101 mainly includes a fixed portion 22-F, a movable portion 22-130, a driving assembly 22-140 and a guiding assembly 22-150. In the present embodiment, the fixed portion 22-F includes a housing 22-110 and a base 22-120.

The housing 22-110 is disposed on the base 22-120, and protect the elements disposed inside the optical member driving mechanism 22-101. In some embodiments, the housing 22-110 is made of metal or another material with sufficient hardness to provide good protection. The circuit component 22-170 is embedded in the base 22-120 for transmitting electric signals, such that the optical member driving mechanism 22-101 may control the position of the optical member disposed on the movable portion 22-130 according to the aforementioned electric signals. In the present embodiment, the circuit component 22-170 is disposed in the base 22-120 by insert molding, and thereby the required space for the optical member driving mechanism 22-101 may be reduced.

The movable portion 22-130 is movable relative to the fixed portion 22-F and is configured to carry an optical member. As shown in FIG. 240, the movable portion 22-130 is movably connected to the housing 22-110 and the base 22-120. The driving assembly 22-140 includes a magnetic member 22-141 and a coil 22-142. The magnetic member 22-141 is disposed on the movable portion 22-130, and the corresponding coil 22-142 is disposed on the base 22-120. When current is applied to the coil 22-142, an electromagnetic driving force may be generated by the coil 22-142 and the magnetic member 22-141 (i.e. the driving assembly 22-140) to drive the movable portion 22-130 and the optical member carried thereon to move along a horizontal direction (the Y axis) relative to the base 22-120, and therefore performing the autofocus (AF) and/or optical image stabilization (OIS) function. Furthermore, a magnetic permeable plate 22-P is disposed on the magnetic member 22-141 for concentrating the magnetic field of the magnetic member 22-141 so that the efficiency of the driving assembly 22-140 may be improved. For example, the magnetic permeable plate 22-P may be made of metal or another material with sufficient magnetic permeability.

In the present embodiment, an integrated circuit component 22-180 is disposed on the base 22-120. For example, the integrated circuit component 22-180 may detect the change of the magnetic field of the magnetic member 22-141, and the position of the movable portion 22-130 (and the optical member carried thereon) may be determined by the integrated circuit component 22-180. In some embodiments, the integrated circuit component 22-180 or the magnetic member 22-141 is disposed on the fixed portion 22-F, and the other of the integrated circuit component 22-180 or the magnetic member 22-141 is disposed on the movable portion 22-130.

In the present embodiment, the guiding assembly 22-150 includes a first track 22-151, a first rolling member 22-161 and a second rolling member 22-162. The first track 22-151 is disposed on and exposed from the base 22-120. In some embodiments, the first track 22-151 is disposed in the base 22-120 by insert molding. The first track 22-151 may include metallic material, and thereby the durability of the first track 22-151 may be enhanced. The size of the first rolling member 22-161 is different from the size of the second rolling member 22-162, and the first rolling member 22-161 and the second rolling member 22-162 are disposed on the first track 22-151 correspondingly. By means of the arrangement of the guiding assembly 22-150, the movable portion 22-130 is supported on the base 22-120, and the mode of movement for the movable portion 22-130 relative to the fixed portion 22-F may be limited. In the present embodiment, the movable portion 22-130 moves along the first track 22-151 in a horizontal direction (the Y axis).

FIG. 241 is a cross-sectional view illustrating along line B-B shown in FIG. 239. As shown in FIG. 241, the guiding assembly 22-150 further includes a second track 22-152 that is disposed on the movable portion 22-130 and corresponds to the first track 22-151. In other words, when viewed in a direction that is parallel to the main axis 22-C, the first track 22-151 and the second track 22-152 at least partially overlap. Similarly, the second track 22-152 may include metallic material, and thereby the durability of the second track 22-152 may be enhanced. In some embodiments, the first track 22-151 and the second track 22-152 completely overlap. The first rolling member 22-161 is disposed between the first track 22-151 and the second track 22-152, and abuts the first track 22-151 and the second track 22-152 at the same time. In some embodiments, a lubricant (not shown) is disposed on the first track 22-151 and/or the second track 22-152. As a result, the lubricant may be located between the first rolling member 22-161 and the first track 22-151, the second track 22-152, making the movement of the first rolling member 22-161 smoother. In some embodiments, the first track 22-151 may be parallel to the second track 22-152.

FIG. 242 is a perspective view illustrating the base 22-120 and the guiding assembly 22-150 in accordance with an embodiment of the present disclosure. As shown in FIG. 242, the base 22-120 further includes a magnetic permeable structure 22-123 that is embedded in the base 22-120. A magnetic attraction force may be generated by the magnetic permeable structure 22-123 and the magnetic member 22-141, and therefore helping to arrange the movable portion 22-130 on the base 22-120. In addition, the magnetic permeable structure 22-123, the circuit component 22-170 and the first track 22-151 are located at different heights in the base 22-120, respectively. It should be appreciated that the "height" discussed in the present disclosure means different positions in the Z axis. In the present embodiment, the circuit component 22-170 is located between the magnetic permeable structure 22-123 and the first track 22-151, but the present disclosure is not limited thereto.

The first track 22-151 has at least one bending portion 22-153 that extends in a direction that is not parallel to the extending direction (the Y axis) of the first track 22-151. The bending portion 22-153 may extend towards the interior of the base 22-120, and therefore helping to stably arrange the first track 22-151 on the base 22-120. The first track 22-151 further includes a first recess 22-156 and second recesses 22-157, wherein either the first recess 22-156 or the second recesses 22-157 are disposed on three sides of the base 22-120. In the present embodiment, the first recess 22-156 and the second recesses 22-157 are disposed on different sides of the base 22-120, and the first recess 22-156 is located between two second recesses 22-157. The length of the first recess 22-156 in the Y axis is longer than the length of the second recesses 22-157 in the Y axis. In some embodiments, the cross-section of the first recess 22-156 is V-shaped, and the cross-section of the second recesses 22-157 is U-shaped. By means of the above design, the difficult for arranging the first rolling member 22-161 and/or the second rolling member 22-162 may be reduced, and the tolerance may be dealt with in time.

In the present embodiment, the first rolling members 22-161 and the second rolling member 22-162 are disposed in the first recess 22-156. The second rolling member 22-162 is adjacent to the first rolling members 22-161 (such as located between two first rolling members 22-161). The arrangement of the first rolling members 22-161 and the second rolling member 22-162 may have a positive effect to the rolling of the first rolling members 22-161 and the second rolling member 22-162. In addition, single first rolling member 22-161 is disposed in the second recess 22-157.

FIG. 243 is a perspective view illustrating the base 22-120 and the circuit component 22-171 in accordance with an embodiment of the present disclosure. As shown in FIG. 243, the circuit component 22-171 is disposed on the base 22-120. For example, circuit component 22-171 may be a printed circuit board (PCB), a flexible printed circuit board (FPC) or any other suitable circuit component. The circuit component 22-171 may be electrically connected to the integrated circuit component 22-180, and therefore transmitting electric signals. In addition, an electric component 22-181 is disposed on the circuit component 22-171. For example, the electric component 22-181 may be a capacitor, a resistor, an inductor or any other suitable electric component. In the present embodiment, when viewed in a direction (the Z axis) that is perpendicular to the direction of motion of the movable portion 22-130, the circuit component 22-171 and the first track 22-151 do not overlap.

FIG. 244 is a perspective view illustrating the movable portion 22-130 in accordance with an embodiment of the present disclosure. As shown in FIG. 244, a metallic member 22-133 is embedded in the movable portion 22-130, wherein the metallic member 22-133 and the second track 22-152 are disposed at different heights. In some embodiments, the metallic member 22-133 has a material with a certain magnetic permeability, such that a magnetic attraction force may be generated by the metallic member 22-133 and the magnetic member 22-141, and therefore helping to arrange the magnetic member 22-141 at a correct position. The metallic member 22-133 further includes an extending portion 22-134, which extends along a direction (the Z axis) that is not parallel to the direction of motion of the movable portion 22-130. By means of the arrangement of the extending portion 22-134, the structural strength of the movable portion 22-130 may be enhanced.

FIG. 245 is a perspective view illustrating the interior structure of the optical member driving mechanism 22-101 in accordance with an embodiment of the present disclosure. It should be appreciated that in order to clearly show the interior structure of the optical member driving mechanism 22-101, the housing 22-110 is not illustrated in the present embodiment. As shown in FIG. 245, the movable portion 22-130 further includes a stopping structure 22-135 that extends towards the housing 22-110. By means of the arrangement of the stopping structure 22-135, the position of the movable portion 22-130 may be located. In addition, the movable portion 22-130 has containing spaces 22-136 that are adjacent to the stopping structure 22-135. In the present embodiment, the stopping structure 22-135 is located between two containing spaces 22-136. A damping material (not shown) may be disposed in the containing spaces 22-136, and therefore the damping material is located between the movable portion 22-130 and the housing 22-110. In some embodiments, the shortest distance between the damping material and the housing 22-110 is not longer than the shortest distance between the stopping structure 22-135 and the housing 22-110. The arrangement of the damping material may help to reduce the impact between the movable portion 22-130 and the housing 22-110. For example, the damping material may include gel or any other material with certain flexibility.

FIG. 246 is a top view illustrating the base 22-120 in accordance with an embodiment of the present disclosure. As shown in FIG. 246, the base 22-120 has a top surface 22-121 that faces the movable portion 22-130. A plurality of holes 22-124A, 22-124B are formed on the top surface 22-121, wherein the size of the holes 22-124A is different from the size of the holes 22-124B. The arrangement of the holes 22-124A and 22-124B may help for the thermal-dissipation of the optical member driving mechanism 22-101.

FIG. 247 is a bottom view illustrating the base 22-120 in accordance with an embodiment of the present disclosure. As shown in FIG. 247, the base 22-120 has a bottom surface 22-122 that is opposite to the top surface 22-121. A plurality of holes 22-124C, 22-124D are formed on the bottom surface 22-122, wherein the size of the holes 22-124C is different from the size of the holes 22-124D. Similarly, the arrangement of the holes 22-124C and 22-124D may also help for the thermal-dissipation of the optical member driving mechanism 22-101. In addition, in some embodiments, the holes 22-124A, 22-124B located on the top surface 22-121 do not communicate with the holes 22-124C, 22-124D located on the bottom surface 22-122. In some embodiments, when viewed in the extending direction (the Z axis) of the above holes, holes 22-124A, 22-124B do not overlap holes 22-124C, 22-124D.

As set forth above, the embodiments of the present disclosure provide an optical member driving mechanism including a guiding assembly that is configured to limit the mode of movement for the movable portion relative to the fixed portion. Since the guiding assembly includes metallic material, and therefore the structural strength and durability of the guiding assembly may be enhanced.

Twenty-Third Group of Embodiments

Referring to FIG. 248, FIG. 248 is a schematic view showing the driving mechanism for an optical element 23-100. The driving mechanism for an optical element 23-100 can be used, for example, to drive and sustain an optical element (such as a reflector lens or mirror), and can be disposed inside a camera module of an electronic device (such as a camera, a tablet or a mobile phone). When light (incident light) from the outside enters the camera module, by the optical lens driven via the driving mechanism for an optical element 23-100, the light can be changed from the original incident direction, and the angle direction thereof can be adjusted to enter the optical lens in the camera module, and the light can pass through the optical lens to an photosensitive element (such as image sensor) to obtain an image. With the above configuration, the thickness of the camera module of the electronic device in the Z-axis direction can be greatly saved, so as to achieve miniaturization. The detailed structure of the driving mechanism for an optical element 23-100 will be described below.

Referring to FIGS. 248 and 249, wherein FIG. 249 is an exploded view of the driving mechanism for an optical element 23-100, which comprises a support body 23-10, a movable portion 23-30, a driving assembly 23-MC and an elastic assembly 23-ES. The support body 23-10 includes a base 23-11 and a casing 23-12. The casing 23-11 is connected to and disposed on the base 23-11 to form a receiving space 23-SP which is configured to accommodate receive the movable portion 23-30, the driving assembly 23-MC and the elastic assembly 23-ES for protection. A connecting element 23-RD of the movable part 23-30 can be connected to an optical element 23-LM, and the movable portion 23-30 is located over the base 23-11 and is movably connected to the casing 23-12 through the elastic assembly 23-ES. The driving assembly 23-MC is disposed between the base 23-11 and the movable portion 23-30, and is configured to drive the movable portion 23-30 relative to the base 23-11 and the casing 23-12 to move, to adjust the position of the optical element, thereby achieving the purpose of optical auto-focusing (AF) or optical image stabilization (OIS). In some embodiments, the connecting element 23-RD is a connecting rod extending along a direction (X-axis) that is perpendicular to the extending direction (Z-axis) of the elastic component 23-ES.

Referring to FIGS. 250 and 251, in this embodiment, the elastic assembly 23-ES has four elastic elements: a first elastic element 23-E1, a second elastic element 23-E2, a third elastic element 23-E3 and a fourth elastic element 23-E4. Each elastic element has a sheet structure and can be a leaf spring. The first elastic element 23-E1 and the second elastic element 23-E2 are disposed on the front side of the movable portion 23-30 (the first side 23-30S1), and the second elastic element 23-E3 and the fourth elastic element 23-E4 are disposed on the rear side of the moving part 23-30 (the second side 23-30S2). The first to fourth elastic elements 23-E1 to 23-E4 connect the upper side of the casing 23-12 (or its upper shell 23-12T) and the movable portion 23-30, so that the movable portion 23-30 is suspended from the casing 23-12 and is suspended in the receiving space 23-SP, and there is a gap 23-G between the movable portion 23-30 and the upper surface of the base 23-11 (FIG. 252).

The extending direction 23-DE (Z-axis) of the elastic elements 23-E1 to 23-E4 are toward the base 23-11, the first and second elastic elements 23-E1, 23-E2, and the third and fourth elastic elements 23-E3, 23-E4 are arranged in parallel in a first direction 23-D1 (X-axis), and the first and second elastic elements 23-E1 and 23-E2 are at different positions in a second direction 23-D2 (Y-axis) direction, and the third and fourth elastic elements 23-E3, 23-E4 are at different positions in the second direction 23-D2 (Y-axis) direction, wherein the second direction 23-D2 is perpendicular to the first direction 23-D1.

The movable portion 23-30 has an extended connection portion 23-302 which is adjacent to the base 23-11 and away from the upper shell 23-12T of the casing 23-12. The first and second elastic elements 23-E1 and 23-E2 are connected to the extended connection portion 23-302 and the upper shell 23-12T of the casing 23-12. The third and fourth elastic elements 23-E3 and 23-E4 connect a connecting surface 23-30C of the movable portion 23-30 on the second side 20-30S2 with the upper shell 23-12T. Seen from the first direction 23-D1, the first to fourth elastic elements 23-E1 to 23-E4 do not overlap each other. In some embodiments, in the first direction 23-D2, the first and second elastic elements 23-E1, 23-E2 overlap each other, and the third and fourth elastic elements 23-E3, 23-E4 overlap each other. The above-mentioned configuration helps to stabilize the movable portion 23-30 to be suspended inside the casing 23-12. In addition, in some embodiments, the base 23-11 has a recessed portion 23-R. Seen from the extension direction 23-DE, the movable portion 23-30 is located above the recessed portion 23-R. Seen from the first or second direction 23-D1, 23-D2, the sidewall of the recessed portion 23-R overlaps the movable portion 23-30, which helps to limit the movement of the movable portion 23-30 to avoid causing excessive shaking.

The connecting element 23-RD of the aforementioned movable portions 23-30 extends along the first direction 23-D1 (X-axis) to connect the optical element 23-LM, and the connecting element 23-RD is perpendicular to the extending direction DE (Z-axis) of each of elastic elements 23-E1 to 23-E4. The connecting element 23-RD is connected to the optical element 23-LM through an opening 23-OP of the casing 23-12. The opening 23-OP has a larger diameter or a caliber than the connecting element 23-RD.

Referring to FIGS. 251 and 252, the bottom of the movable portion 23-30 has a recess (or groove) 23-301, and the opening of the recess 23-301 faces the base 23-11 and faces the recessed portion 23-R of the base 23-11. The aforementioned driving assembly 23-MC is disposed in the recess 23-301. In detail, the driving assembly 23-MC may be an electromagnetic driving assembly, which includes a magnetic element 23-M and a coil 23-C, which are respectively disposed on the bottom surface 23-30B of the movable portion 23-30 and base 23-11 and arranged along the extension direction 24-DE. The magnetic element 23-M and the coil 23-C correspond to each other. When a driving signal is applied to the driving component 23-MC (for example, by applying an electric current through an external power source), a magnetic force is generated between the magnetic element 23-M and the coil 23-C, thereby driving the movable portion 23-30 to move relative the support body 23-10 (including base 23-11 and casing 23-12), to achieve the effect of anti-shake or auto-focus of optical image. In this embodiment, the driving assembly 23-MC is a moving magnetic type; in another embodiment, it may be a moving coil type. In addition, before the driving signal is applied, the aforementioned elastic component 23-ES can keep the movable portion in an initial position relative to the support body 23-10.

In this embodiment, the driving mechanism 23-100 includes a permeability element 23-GM disposed between the movable portion 23-30 and the driving assembly 23-MC. In detail, it is located between the bottom surface 23-30B and the magnetic element 23-M, so that the magnetic force of the magnetic element 23-M can be concentrated in a predetermined direction to enhance the magnetic force of the driving assembly 23-MC to drive the movable portion 23-30, and the magnetic interference can be decreased. In another embodiment, the permeability element 23-GM can be embedded in a part of the bottom surface 23-30B of the movable portion 23-30 which is corresponding to the magnetic element 23-M, so that the movable portion 23-30 includes permeability conductive material, and the magnetic element 23-M can be directly contacted and fixed on the bottom surface 23-30B. In addition to strengthening the magnetic force (between the magnetic element 23-M and the coil 23-C) in a predetermined direction, it can also strengthen the overall mechanical strength of the movable portion 23-30.

The driving mechanism 23-100 includes a position sensing element 23-EN, which may be a position sensor, for example, a magnetoresistive sensor (MRS) or optical sensor, which is used to sense the relative positional relationship between the movable portion 23-30 and the base 23-11, which facilitates a control unit (not shown) to adjust the positions between the two by the driving assembly 23-MC. It is worth noting that the position sensing element 23-EN is provided in the hollow portion of the coil 23-C, or that the position sensing element 23-EN is surrounded by the coil 23-C. This configuration can make full use of space and is good for miniaturization. In this embodiment, the position sensing element 23-EN can share the magnetic element 23-M with the coil 23-C.

A circuit component 23-CA is disposed on the base 23-11, and is used to electrically connect the driving assembly 23-MC and the position sensing element 23-EN. In this embodiment, the circuit assembly 23-CA is formed by insert molding on the body of the base 23-11. In another embodiment, the base 23-11 may include a circuit board component, such as a printed circuit board (PCB), which is disposed on the body of the base 23-11 and is electrically connected to the driving assembly 23-MC and position sensing element 23-EN.

Referring to FIGS. 252 and 253, when the driving assembly 23-MC drives the movable portion 23-30 to move relative to the support body 23-10, the connecting element 23-RD of the movable portion 23-30 also drives the optical element 23-LM to move relative to the support body 23-10. FIG. 253 shows that the movable portion 23-30 moves in the first direction 23-D1 (X-axis) relative to the support body 10, and drives the optical element 23-LM to move in the first direction 23-D1. Through the magnetic element 23-M and the coil 23-C of the driving assembly 23-MC, the movable portion 23-30 (with the optical element 23-LM together) can also be moved in the second direction 30-D2. That is, the driving unit 23-MC can move the movable portion 23-30 and the optical element 23-LM relative to the support body 23-10 on the XY plane.

In this way, the movable portion 23-30 is suspended through the elastic assembly 23-ES so that it can be movably set over the base 23-11, and the movable portion 23-30 is driven by the drive assembly 23-MC to move relative to the support body 23-10, so that the optical element 23-LM moves together. By adjusting the incident angle of the reflected light from the optical element 23-LM into the optical lens, it can achieve the effects of optical focusing or optical image stabilization.

It should be noted that, with respect to the aforementioned elastic assembly 23-ES, in some embodiments, one elastic element may be provided on each of the first side 23-30S1 and the second side 23-30S2 of the movable portion 23-30. For example, providing the first elastic element 23-E1 and the first elastic element 23-E4, can also hang the movable portion 23-30 on the casing 23-12. In other embodiments, the elastic assembly 23-ES may also include only one elastic element, which connects the upper shell 23-12T of the casing 23-12 and the top surface 23-30T of the movable portion 23-30 to suspend it in receiving space 23-SP.

In summary, an embodiment of the present invention provides a driving mechanism for an optical element, including a support body, a movable portion, an elastic assembly, and a driving assembly. The movable portion is located in the support body and is movable relative to the support body, and is used to connect an optical element. The elastic assembly is movably connected to the support body and the movable portion. The driving assembly is disposed on the support body and the movable portion, and is configured to drive the movable portion to move relative to the support body. In some embodiments, the movable portion is suspended in the support body through the elastic element, and when the movable portion is driven by the driving assembly to move relative to the support body, the movable portion is configured to drive the optical element to move. The support body includes a base and a casing, the casing is connected to and disposed on the base, the elastic assembly movably connects the casing and the movable portion, and the driving assembly is disposed between the base and the movable portion, and the movable portion is suspended from the casing through the elastic element.

The embodiment of the present invention has at least one of the following advantages or effects, in that the movable portion is suspended from the casing by an elastic assembly so that it is disposed on on the base in a movable manner, and the movable portion is driven to move with the optical element together relative to the base by the driving assembly, to adjust the incident angle of the light reflected by the optical element into the optical lens, the effects of optical focusing and optical image stabilization can be achieved. By suspending the movable portion through the elastic assembly, as compared with setting a suspension movable frame, the embodiment of the present invention can greatly reduce the space occupied by the suspension component inside the driving mechanism, and is conducive to miniaturization. Furthermore, due to the lightness and flexibility of the elastic assembly, the sensitivity and accuracy of the movable portion can be improved when it is moving, thereby increasing the accuracy of moving the optical element.

Twenty-Fourth Group of Embodiments

Referring to FIG. 254, FIG. 254 is a schematic view showing an optical system 24-100 according to an embodiment of the present invention. The optical system 24-100 can be disposed inside an electronic device (such as a camera, a tablet or a mobile phone). For example, when light (incident light) from the outside enters the optical system 24-100 along an incident direction, the light can pass through an optical element 24-LS (such as a lens assembly) disposed in the optical system 24-100, and then to an image sensor module 24-IM, to obtain an image. The detailed structure the optical system 24-100 will be described below.

The optical system 24-100 comprises an optical module 24-OM, an image sensor module 24-IM, and an adjustment assembly 24-AS. The adjustment assembly 24-AS is located between the optical module 24-OM and the image sensor module 24-IM, and disposed on a bottom surface 24-OMB of the optical module 24-OM. Viewing along a first direction 24-D1 that is perpendicular to a main axis 24-P of the optical system 24-100 (or perpendicular to an optical axis 24-O of the optical element 24-LS), the adjustment assembly 24-AS does not overlap the optical module 24-OM.

The aforementioned optical module 24-OM may be a lens driving module including a housing 24-H, a movable portion 24-V and a base 24-10. The housing 24-H and the movable portion 24-V are disposed on the base 24-10, the housing 24-H and the base 24-10 form an accommodating space, and the movable portion 24-V is disposed in the accommodating space. The movable portion 24-V includes a frame 24-20, a holder 24-30, a driving assembly 24-MC, and an elastic assembly 24-ES. The accommodating space formed by the housing 24-H connected to and disposed on the base 24-10 can receive the movable portion 24-V (including the holder 24-30, the drive assembly 24-MC and elastic assembly 24-ES) for protection.

The holder 24-30 is used to carry the optical element 24-LS, and is movably connected to the base 24-10 and the frame 24-20 through the elastic assembly 24-ES. The driving assembly 24-MC is disposed on the holder 24-30 and the frame 24-20, and is used to drive the holder 24-30 and the optical element 24-LS to move relative to the base 24-10 and the frame 24-20 to adjust the posture or position of the optical element 24-LS, thereby achieving the purpose of optical auto-focusing (AF) or optical image stabilization (OIS).

In detail about the elastic assembly 24-ES, the elastic assembly 24-ES includes a first elastic element 24-E1 and a second elastic element 24-E2, which are respectively disposed on the upper and lower sides of the holder 24-30, and movably connected to the holder 24-30, the base 24-10 and the frame 24-20, so that the holder 24-30 can move relative to the base 24-10 and the frame 24-20.

The aforementioned driving assembly 24-MC may be an electromagnetic driving assembly, which includes a coil 24-C and a magnetic element 24-M, which are respectively disposed on movable portion 24-30 and the frame 20. The magnetic element 24-M and the coil 24-C correspond to each other. When a driving signal is applied to the driving assembly 24-MC (for example, by applying an electric current through an external power source to the coil 24-C), a magnetic force is generated between the magnetic element 24-M and the coil 24-C, thereby the driving assembly 24-MC can drive the movable portion 24-30 with the optical element 24-LS to move relative the base 24-10, to achieve the effect of anti-shake or auto-focus of optical image. In this embodiment, the driving assembly 24-MC is a moving coil type; in another embodiment, it may be a moving magnetic type. In addition, before the driving signal is applied, the aforementioned elastic assembly 24-ES can keep the movable portion in an initial position relative to the base 24-10.

Referring to FIGS. 254 and 255, the aforementioned adjustment assembly 24-AS includes a plurality of adjustment columns 24-A1, which are disposed on the bottom surface 24-OMB of the base 24-10 and extend along a second direction 24-D2 (the second direction 24-D2 is not perpendicular to the optical axis 24-O, such as parallel or approximately parallel to the Z-axis), and is used to adjust the relative positions of the optical module 24-OM and the image sensor module 24-IM. Specifically, the adjustment assembly 24-AS are used to adjust the optical axis 24-O of the optical element 24-LS set in the optical module 24-OM and the central axis 24-Q of the image sensor module 24-IM so that they overlap or are parallel.

In this embodiment, the adjustment assembly 24-AS includes four adjustment columns 24-A1, which are disposed at the edges of the bottom surface 24-OMB of the optical module 24-OM and located on different sides of the bottom surface 24-OMB. It should be noted that, in other embodiments, the adjusting assembly 24-AS may include three adjusting columns 24-A1, which are disposed at the edges of the bottom surface 24-OMB of the optical module 24-OM, and all three are located on the different sides of the bottom surface 24-OMB.

Figure 256:
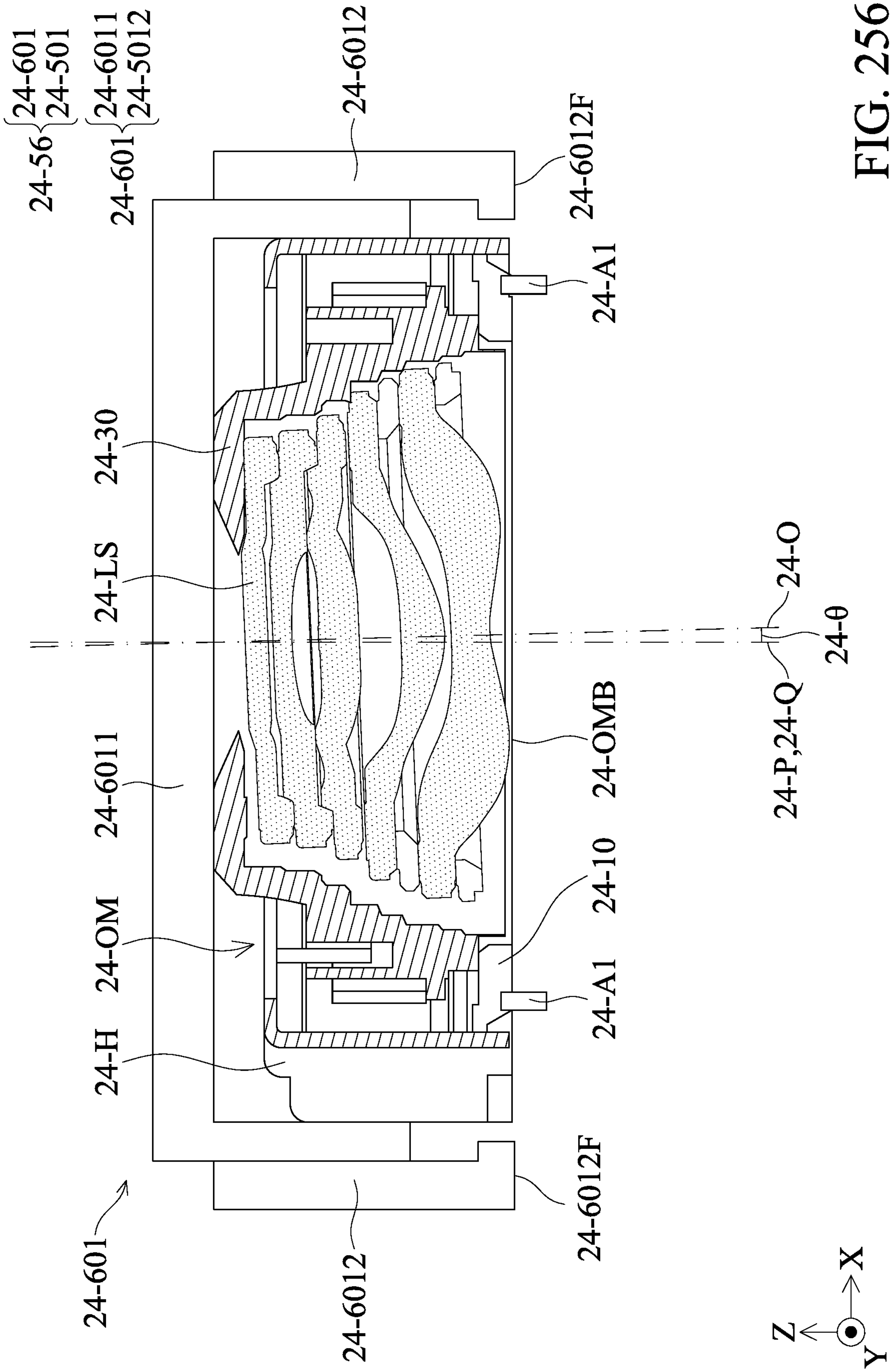

Referring to FIG. 256, when performing the assembling process of the image sensor module 24-IM and the optical module 24-OM, a positioning device 24-601 positions the optical module 24-OM into a first position, wherein the positioning device 24-601 includes a holding member 24-6011 and a limiting member 24-6012. The holding member 24-6011 is used to clamp the top of the optical module 24-OM. The limiting member 24-6012 is provided on two sides of the holding member 24-6011 or the optical module 24-OM, and used to limit or restrict the position of the optical module 24-OM, to avoid damage caused by excessive shaking during the assembly process. In addition, when viewed from a direction that is perpendicular to the main axis 24-P, the adjustment assembly 24-AS protrudes from a limiting surface 24-6012F of the limiting member 24-6012, and the limiting surface 24-6012F is protruding from the base 24-10 of the optical module 24-OM.

Figure 257:
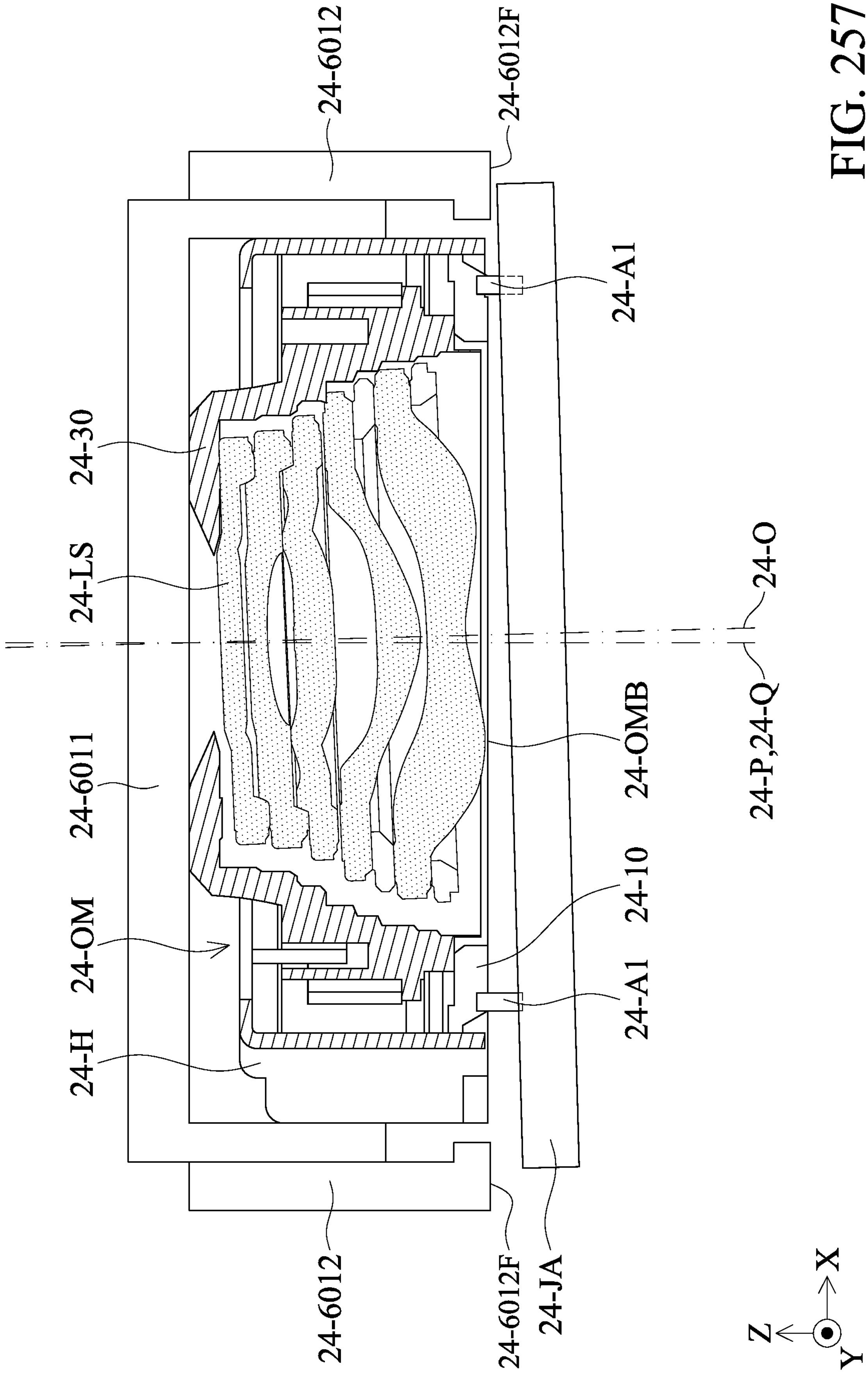

Continuing to refer to FIG. 256, when the optical element 24-LS is disposed on the optical module 24-OM and the main axis 24-P is relatively inclined or skewed relative to the optical axis 24-O (for example, the optical element 24-LS placed in the holder 24-30 and is not fully aligned with the center of the holder 24-30 will make the optical axis 24-O and the main axis 24-P not parallel or coincide), the angle difference 24-O between the two is obtained by a measuring device 24-501 (such as an angle measuring device), to provide a measuring information 24-S1. Next, the measuring device 24-501 transmits the measurement information 24-S1 to an adjusting device 24-JA. The adjusting device 24-JA changes the shape or appearance of the adjusting assembly 24-AS according to the aforementioned measurement information 24-S1, as shown in FIG. 257. The adjusting device 24-JA can be a thermal welding member, such as a thermal welding head, and the shape of the adjusting assembly 24-AS can be changed by hot melting. In addition, since the limiting surface 24-6012F of the limiting member 24-6012 protrudes from the base 24-10 of the optical module 24-OM, when the adjusting device 24-JA presses the adjustment assembly 24-AS and the optical module 24-OM, the damage to optical module 24-OM can be avoided to protect the optical module 24-OM.

In this embodiment, due to the inclination angle of the optical axis 24-O (relative to the main axis 24-P) determined via the measuring device 24-501, the adjusting device 24-JA changes the adjustment columns 24-A1, so that the connecting line 24-CL of the free ends of the adjustment columns 24-A1 is perpendicular to the optical axis 24-O, or say an alignment plane 24-CP that is formed by connecting lines of at least three free ends of the adjustment columns 24-A1 is perpendicular to the optical axis 24-O.

Figure 258:
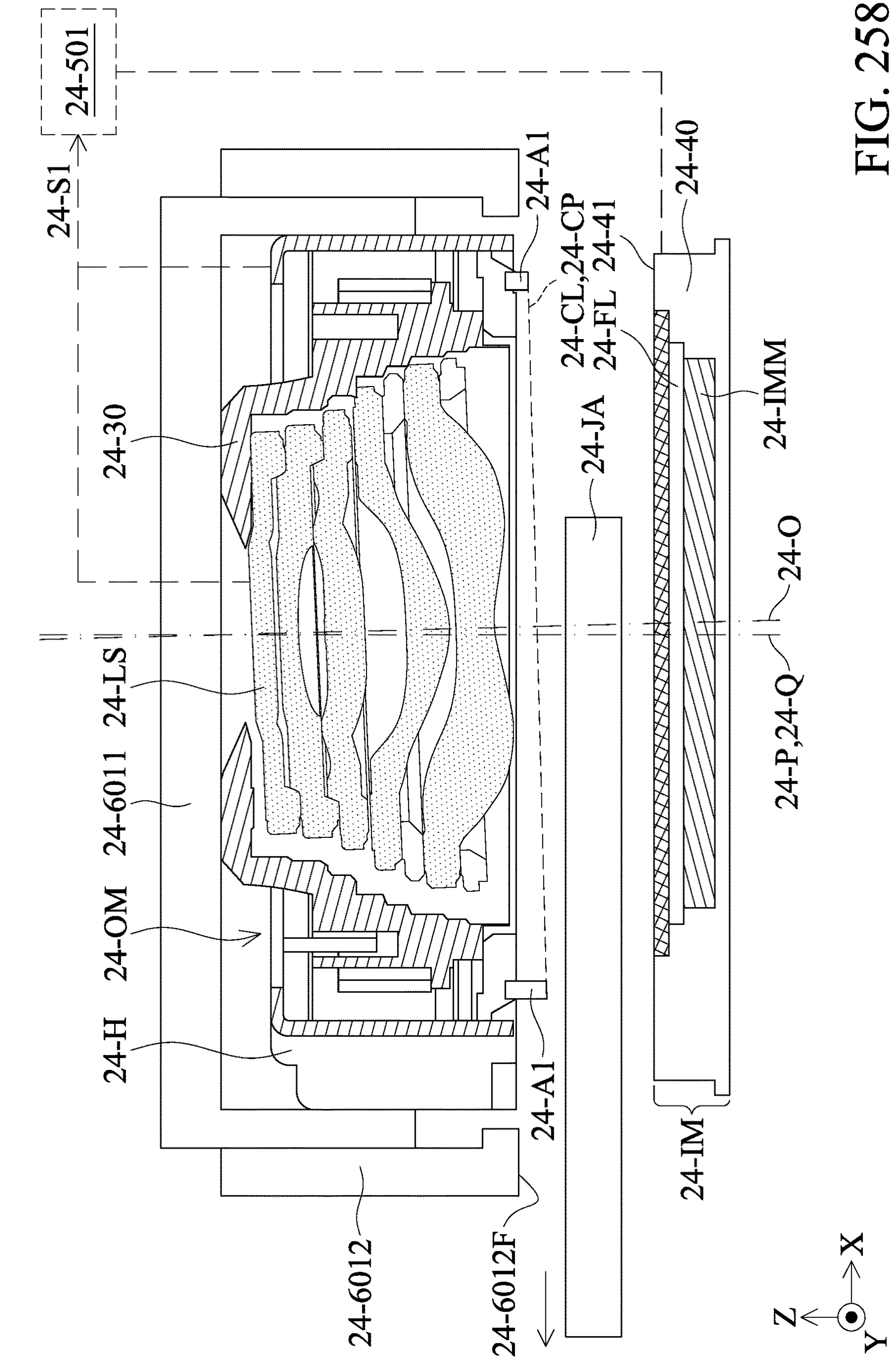
Figure 259:
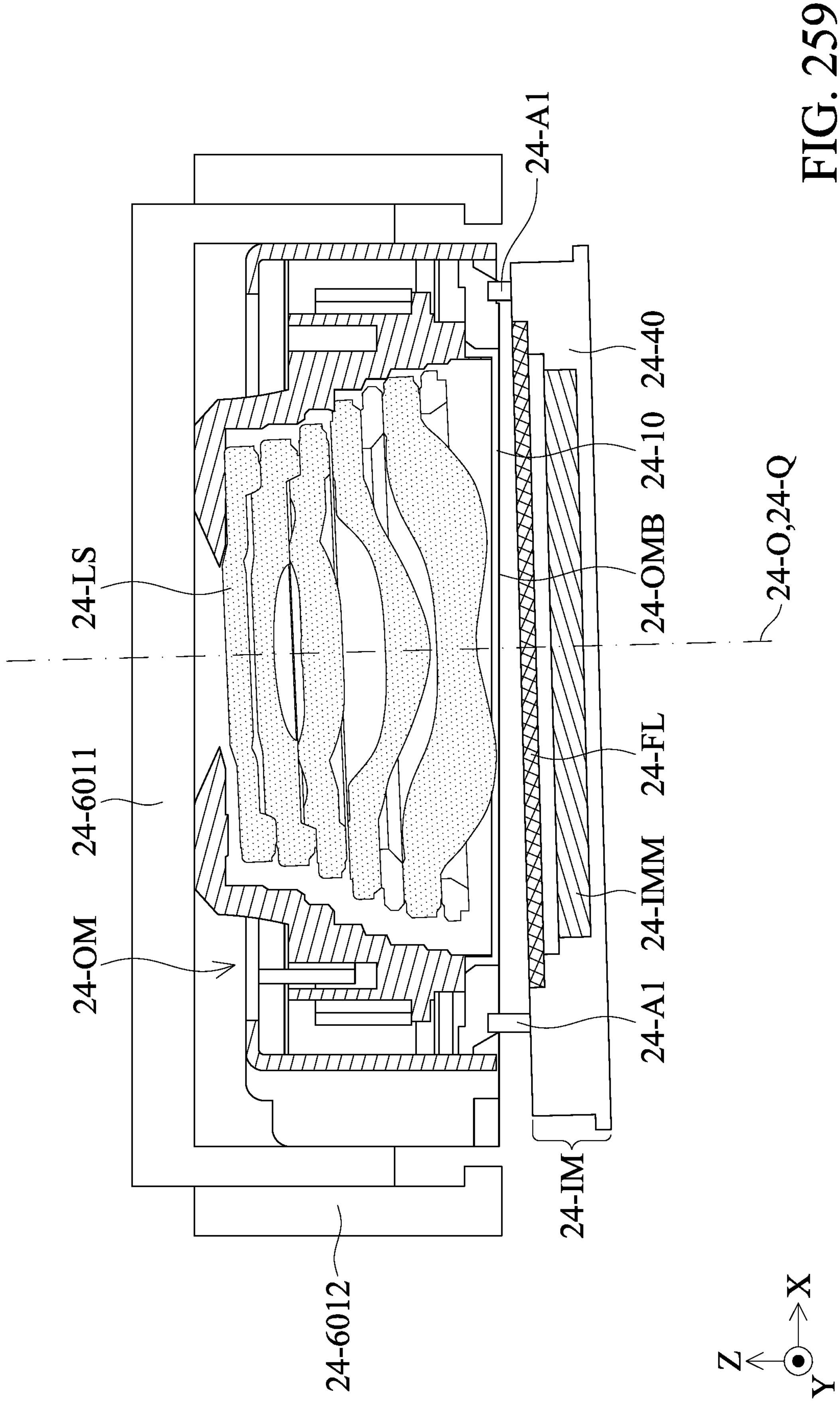

As shown in FIGS. 257 to 258, the height of the right adjustment column 24-A1 on the Z-axis is more reduced than that of the left adjustment column 24-A1 on the Z-axis, so that the alignment plane 24-CP is perpendicular to the optical axis 24-O. And then, the adjusting device 24-JA is removed. In this way, the image sensor module IM is then placed on these adjusted adjustment columns 24-A1. As shown in FIG. 259, the central axis 24-Q of the image sensor module 24-IM is parallel or coincides the optical axis 24-O, to achieve good alignment between the modules.

In some embodiments, the measuring device 24-501 may determine an angular difference between the optical axis 24-O in the 24-OM and the central axis 24-Q of the image sensor module 24-IM based on the degree of blur and focus of the image obtained by light through the optical module 24-OM to the image sensor module 24-IM.

In some embodiments, the image sensor module 24-IM includes a filter element 24-FL, which is disposed on the image sensor element 24-IMM, which may be an infrared filter that filters infrared light to the image sensor element 24-IMM. In the direction that is perpendicular to the main axis 24-P or in the main axis 24-P direction, the filter element 24-FL is located between the aforementioned adjustment columns 24-A1 and does not overlap with the adjustment columns 24-A1. In some embodiments, in the main axis 24-P direction, the filter element 24-FL is embedded in the base 24-10 and overlaps at least a part of the adjustment columns 24-A1.

According to the above embodiment, the present invention provides a method for adjusting the optical system 24-800. As shown in FIG. 260, first, a positioning device positions the optical module (step 24-802), and then a measuring device measures an angular difference between the main axis of the first optical module and the optical axis of an optical element sustained by the first optical module to obtain measurement information (step 24-804). Then, an adjusting device changes the shape of an adjustment assembly of the first optical module according to the measurement information (step 24-806), and assembling the first optical module with an optical object (such as an image sensor module or the second optical module in FIG. 264), wherein the optical axis of the optical element is parallel to the central axis of the optical object (step 24-808).

In this way, the method for adjusting the optical system 24-800 is provided with an adjustment module 24-AS between the optical module 24-OM and the image sensor module 24-IM, and the appearance of the adjustment assembly 24-AS can be changed, so that the assembly of the image sensor module 24-IM and the optical module 24-OM can be accurately adjusted, and the central axis 24-Q and the optical axis 24-O are parallel or coincide, so as to improve the image quality of the device.

In some embodiments, as shown in FIG. 261, another adjusting device 24-JA' may be disposed on the bottom plate 24-40 of the image sensor module 24-IM, which includes a flat or planar metal plate 24-JA'1 facing the adjustment assembly 24-AS, and can be connected to an external heat source through a heating circuit of the adjusting device 24-JA' to make it heat up. When the image sensor module 24-IM and the optical module 24-OM are being assembled, the shape of the adjustment columns 24-A1 can be changed by the heat provided via the flat metal plate 24-JA'1 of the adjusting device 24-JA'. In this way, compared with an externally independent adjusting device 24-JA in FIG. 257, after the steps of the adjusting device 24-JA' in this embodiment changing the adjustment assembly 24-AS is complete, the adjusting device 24-JA' continues in contact with the adjustment assembly 24-AS, which can save the procedure of removing the adjusting device 24-JA'.

In some embodiments, after the adjusting device changed the shape of the adjustment assembly of the first optical module according to the measurement information (step 24-804), the position of the optical module 24-OM can be adjusted through the positioning device 24-601, as shown in FIGS. 258 and 261, which shows that the optical module 24-OM moves from the first position (FIG. 258) to the second position (FIG. 261). So that the optical axis is parallel to the central axis, and then the optical module 24-OM and the image sensor module 24-IM are assembled, as shown in FIG. 262. In this embodiment, the optical module 24-OM is placed on the image sensor module 24-IM.

As shown in FIG. 263, in some embodiments, the measuring device 24-501' belongs to a part of the optical module 24-OM, and may be a position-sensing assembly disposed on the base 24-10 of the optical module 24-OM. In some embodiments, it also can be the position sensor for the driving assembly 24-MC. This can save an external measuring device.

FIGS. 264 to 266 show the optical system 24-200 of another embodiment in the present invention. Different from the optical system 24-100 in FIG. 254, the optical system 24-200 in this embodiment has two optical modules: a first optical module 24-OM1 and a second optical module 24-OM2, wherein they can be the same or similar components, or with slightly different appearances and proportion scale. The adjustment assembly 24-AS has a plurality of first adjustment columns 24-A1 (first adjustment sub-assembly) and a plurality of second adjustment columns 24-A2 (second adjustment sub-assembly). The first optical module 24-OM1, the first adjustment columns 24-A1, the second optical module 24-OM2, the second adjustment columns 24-A2, and the image sensor module 24-IM are sequentially arranged along the first optical axis 24-O1 of the first optical element 24-LS1 (or the second optical axis 24-O2 of the second optical element 24-LS2, the main axis 24-P of the first optical module 24-OM1, the central axis 24-Q of the image sensor module 24-IM).

When the first and second optical modules 24-OM1, 24-OM2, and image sensor module 24-IM are to be assembled, first, as shown in FIG. 264, the holding member 24-6011A of the positioning device 24-601 holds the first optical module 24-OM1 for positioning. When the first optical element 24-LS1 and the first optical module 24-OM1 are relatively inclined, the angle difference between the main axis 24-P and the first optical axis 24-O1 is obtained by the measuring device 24-501, and the first measurement information 24-S1 is obtained.

Next, as shown in FIG. 265, the upper surface 24-UB1 of the second optical module 24-OM2 is pressed against the adjustment sub-assembly 24-A1 on the bottom surface 24-OMB of the base 24-10 of the first optical module 24-OM1, and the shape of first adjustment columns 24-A1 is changed according to the aforementioned first measurement information 24-S1, for example, through the adjusting device 24-JA provided on the optical object in FIG. 261 (or the external adjusting device 24-501 as shown in FIG. 257, which causes the first adjustment columns 24-A1 to be heated to change its shape), wherein the limiting surface 24-6012F1 of the limiting member 24-6012 provides a restricting function, which can avoid hurting the first optical module 24-OM1, and align the first and second optical axes 24-O1, 24-O2 of the first and second optical modules 24-OM1, 24-OM2.

Next, as shown in FIG. 266, the angle difference between the second optical axis 24-O2 and a central axis 24-Q of the image sensor module 24-IM is measured by the measuring device 24-501, to obtain a second measuring information 24-S2. The positioning device 24-601 then moves the assembled first and second optical modules 24-OM1, 24-OM2 into an alignment position according to the second measurement information 24-S2, so that the first and second optical axes 24-O1, 24-O2 can be parallel or coincide with the central axis 24-Q of the image sensor module 24-IM, and then the first and second optical modules 24-OM1, 24-OM2 is assembled with the image sensor module 24-IM. The shape of the second adjustment sub-assembly 24-A2 (located on the lower surface 24-UB2 of the second optical module 24-OM1) can be changed by the contact of the image sensor module 24-IM (for example, using the method in FIG. 261). Furthermore, the limiting surface 24-6012F2 of the limiting member 24-6012 can avoid damage to the second optical module 24-OM2. In this way, the first and second optical axes 24-O1, 24-O2, and the central axis 24-Q can be made parallel or coincide, so that the optical system 24-200 has excellent alignment between modules.

According to the above embodiment, the present invention provides a method for adjusting an optical system 24-900, as shown in FIG. 267. First, a positioning device positions a first optical module and a second optical module (step 24-902), and a measuring device measures the angle difference between the main axis of the first optical module and the first optical axis of the first optical element carried by the first optical module, to obtain first measurement information (step 24-904). An adjusting device changes the shape of the first adjustment sub-assembly of the adjustment assembly connected to the first optical module according to the first measurement information (step 24-906).

In some embodiments, the method for adjusting the optical system 24-900 further comprises: the measuring device measuring the angle difference between the second optical axis and the central axis of the image sensor module, to obtain second measurement information (step 24-908), and the positioning device positions the assembled first and second optical module into an alignment position according to the second measurement information, and makes the first optical axis and the second optical axis parallel to the central axis of the image sensor module (steps 24-910). The step 24-910 includes: adjusting the shape of a second adjustment sub-assembly of the adjustment assembly using an adjusting device, and assembling the second optical module with the image sensor module.

It should be noted that the features of the various embodiments can be combined and used as long as they do not violate or conflict the scope of the disclosure. In addition, as for the adjustment columns, first and second adjustment columns in FIGS. 254 to 267, the structure of those adjustment columns as disclosed in FIGS. 226 and 227 can be used, and the first, second optical modules 24-OM1, 24-OM2, and the image sensor module 24-IM may have the structures of the opponent members 20-OB1 to 20-OB3 as shown in FIG. 225.

In summary, an embodiment of the present invention provides a method for adjusting the optical system, including a positioning device positioning a first optical module; a measuring device measuring an angular difference between the main axis of the first optical module and the optical axis of an optical element sustained by the first optical module to obtain measurement information; an adjusting device changing the shape of an adjustment assembly of the first optical module according to the measurement information; and assembling the first optical module with an optical object, wherein the optical axis of the optical element is parallel to the central axis of the optical object.

The embodiment of the present invention has at least one of the following advantages or effects. Through the adjustment assembly, a plurality of optical modules can be aligned with each other, and one or more optical modules and an image sensor module can be aligned with each other, so as to improve the quality of the device. In addition, since the adjustment assembly can change its shape during adjustment process (usually being squeezed and reduced in height in the vertical direction), the adjustment between the optical module and the image sensor module can be more accurate and greatly improved product quality.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical member driving mechanism, comprising:

a movable portion comprising a carrier for carrying an optical member with an optical axis; and a fixed portion, wherein the movable portion is movable relative to the fixed portion, and the fixed portion comprises a housing and a base, the housing is disposed on the base, and the housing has:

a top surface extending in a direction that is parallel to the optical axis; and a side surface extending in a direction that is not parallel to the optical axis from an edge of the top surface, wherein the side surface has a rectangular opening;

wherein the base further comprises a barrier protruding towards the top surface, when viewed in a direction that is parallel to the optical axis, the barrier and a lengthwise side of the opening at least partially overlap, and a gap is formed between the barrier and a widthwise side of the opening;

wherein the barrier has a jagged structure disposed to face the top surface.

2. The optical member driving mechanism as claimed in claim 1, wherein the jagged structure has a plurality of peaks, and when viewed in a direction that is perpendicular to the optical axis, the peaks are exposed from the opening.

3. The optical member driving mechanism as claimed in claim 1, wherein the jagged structure has a plurality of peaks, and when viewed in a direction that is parallel to the optical axis, the peaks overlap with the opening.

4. The optical member driving mechanism as claimed in claim 1, wherein the barrier further has an upper surface and a cutting surface that intersects with the upper surface, and a fillet between the upper surface and the cutting surface is not greater than 0.05 mm.

5. The optical member driving mechanism as claimed in claim 1, further comprising a light-shielding member disposed out of the housing, wherein when viewed in a direction that is parallel to the optical axis, the light-shielding member overlaps with the lengthwise side of the opening.

6. The optical member driving mechanism as claimed in claim 1, wherein the carrier has a protruding portion extending towards the side surface in a direction that is substantially parallel to the optical axis, and when viewed in a direction that is perpendicular to the optical axis, the protruding portion is located on the lengthwise side of the opening.

7. The optical member driving mechanism as claimed in claim 1, wherein the fixed portion further comprises a frame disposed between the carrier and the housing, wherein the frame has a light-shielding structure protruding towards the base.

8. The optical member driving mechanism as claimed in claim 7, wherein when viewed in a direction that is parallel to the optical axis, the light-shielding structure at least partially overlaps with the lengthwise side of the opening, and a gap is formed between the light-shielding structure and the widthwise side of the opening.

9. The optical member driving mechanism as claimed in claim 7, wherein the light-shielding structure further has a lower surface and a cutting surface that intersects with the lower surface, and a fillet between the lower surface and the cutting surface is not greater than 0.05 mm.

10. The optical member driving mechanism as claimed in claim 1, further comprising an electromagnetic driving assembly for driving the movable portion to move relative to the fixed portion, wherein the electromagnetic driving assembly comprises a magnetic member and a coil, the magnetic member or the coil is disposed on the movable portion, and the other of the magnetic member or the coil is disposed on the fixed portion.

11. An optical member driving mechanism, comprising:

a movable portion comprising a carrier for carrying an optical member with an optical axis; and a fixed portion, wherein the movable portion is movable relative to the fixed portion, and the fixed portion comprises a housing and a base, the housing is disposed on the base, and the housing has:

a top surface extending in a direction that is parallel to the optical axis; and a side surface extending in a direction that is not parallel to the optical axis from an edge of the top surface, wherein the side surface has a rectangular opening;

wherein the base further comprises a barrier protruding towards the top surface, when viewed in a direction that is parallel to the optical axis, the barrier and a lengthwise side of the opening at least partially overlap, and a gap is formed between the barrier and a widthwise side of the opening;

wherein a groove is formed between the barrier and the housing, and the groove is disposed to face the top surface.

12. The optical member driving mechanism as claimed in claim 11, further comprising a light-shielding member disposed in the groove, wherein a shortest distance between the light-shielding member and the top surface is shorter than a shortest distance between the barrier and the top surface.

13. An optical member driving mechanism, comprising:

a movable portion comprising a carrier for carrying an optical member with an optical axis; and a fixed portion, wherein the movable portion is movable relative to the fixed portion, and the fixed portion comprises a housing and a base, the housing is disposed on the base, and the housing has:

a top surface extending in a direction that is parallel to the optical axis; and a side surface extending in a direction that is not parallel to the optical axis from an edge of the top surface, wherein the side surface has a rectangular opening;

wherein the base further comprises a barrier protruding towards the top surface, when viewed in a direction that is parallel to the optical axis, the barrier and a lengthwise side of the opening at least partially overlap, and a gap is formed between the barrier and a widthwise side of the opening;

wherein the barrier has a rough surface disposed to face the top surface.

14. An optical member driving mechanism, comprising:

a movable portion comprising a carrier for carrying an optical member with an optical axis; and a fixed portion, wherein the movable portion is movable relative to the fixed portion, and the fixed portion comprises a housing and a base, the housing is disposed on the base, and the housing has:

a top surface extending in a direction that is parallel to the optical axis; and a side surface extending in a direction that is not parallel to the optical axis from an edge of the top surface, wherein the side surface has a rectangular opening;

wherein the base has a rough surface disposed to face the top surface.

15. An optical member driving mechanism, comprising:

a movable portion comprising a carrier for carrying an optical member with an optical axis; and a fixed portion, wherein the movable portion is movable relative to the fixed portion, and the fixed portion comprises a housing and a base, the housing is disposed on the base, and the housing has:

a top surface extending in a direction that is parallel to the optical axis; and a side surface extending in a direction that is not parallel to the optical axis from an edge of the top surface, wherein the side surface has a rectangular opening;

wherein the movable portion further comprises a light-shielding sheet disposed between the carrier and the top surface, the light-shielding sheet extends towards the side surface in a direction that is substantially parallel to the optical axis, and when viewed in a direction that is perpendicular to the optical axis, the light-shielding sheet is located on a lengthwise side of the opening.

16. An optical member driving mechanism, comprising:

a movable portion comprising a carrier for carrying an optical member with an optical axis; and a fixed portion, wherein the movable portion is movable relative to the fixed portion, and the fixed portion comprises a housing and a base, the housing is disposed on the base, and the housing has:

a top surface extending in a direction that is parallel to the optical axis; and a side surface extending in a direction that is not parallel to the optical axis from an edge of the top surface, wherein the side surface has a rectangular opening;

wherein the fixed portion further comprises a frame disposed between the carrier and the housing, wherein the frame has a light-shielding structure protruding towards the base;

wherein the light-shielding structure has a jagged structure disposed to face the base.

17. An optical member driving mechanism, comprising:

a movable portion comprising a carrier for carrying an optical member with an optical axis; and a fixed portion, wherein the movable portion is movable relative to the fixed portion, and the fixed portion comprises a housing and a base, the housing is disposed on the base, and the housing has:

a top surface extending in a direction that is parallel to the optical axis; and a side surface extending in a direction that is not parallel to the optical axis from an edge of the top surface, wherein the side surface has a rectangular opening;

wherein the fixed portion further comprises a frame disposed between the carrier and the housing, wherein the frame has a light-shielding structure protruding towards the base;

wherein a groove is formed between the light-shielding structure and the housing, and the groove is disposed to face the top surface.

18. The optical member driving mechanism as claimed in claim 17, further comprising a light-shielding member disposed in the groove, wherein a shortest distance between the light-shielding member and the base is shorter than a shortest distance between the barrier and the base.

* * * * *